United States Patent [19]

Millard et al.

[11] 4,096,567

[45] Jun. 20, 1978

[54] INFORMATION STORAGE FACILITY WITH MULTIPLE LEVEL PROCESSORS

[76] Inventors: William H. Millard, 2816 Darius Way, San Leandro, Calif. 94577; Allan J. Killian, 427 Boynton, Berkeley, Calif. 94707; Bruce A. Van Natta, 14860 Wicks Blvd., San Leandro, Calif. 94577

[21] Appl. No.: 714,212

[22] Filed: Aug. 13, 1976

[51] Int. Cl.[2] ...................... G06F 15/16; G06F 15/40; G06F 13/00

[52] U.S. Cl. ...................................................... 364/200

[58] Field of Search ..................................... 340/172.5; 364/200 MS File

[56] References Cited

U.S. PATENT DOCUMENTS

| | | | |
|---|---|---|---|
| 3,376,554 | 4/1968 | Kotok | 340/172.5 |
| 3,419,849 | 12/1968 | Anderson | 340/172.5 |
| 3,510,844 | 5/1970 | Aranyi | 340/172.5 |
| 3,566,363 | 2/1971 | Driscoll, Jr. | 340/172.5 |
| 3,593,299 | 7/1971 | Driscoll | 340/172.5 |
| 3,675,209 | 7/1972 | Trost | 340/172.5 |
| 3,725,864 | 4/1973 | Clark | 340/172.5 |
| 3,810,105 | 5/1974 | England | 340/172.5 |
| 3,905,023 | 9/1975 | Perpiglia | 340/172.5 |
| 3,934,232 | 1/1976 | Curley | 340/172.5 |
| 4,001,783 | 1/1977 | Monahan | 340/172.5 |

*Primary Examiner*—James D. Thomas
*Attorney, Agent, or Firm*—Townsend and Townsend

[57] ABSTRACT

An information storage facility with multiple level processors for relieving one or more external host computers or intelligent terminals from conventional time consuming record searching functions, such as record formatting, indexing, buffering and the like. Three processor levels are provided: a communications level for handling external communications, a DBMS level for performing syntax scanning, hashing and coding/decoding routines, and data access functions e.g. indexing, searching, buffering, blocking, deblocking, storage management, and error recovery functions; and a storage level for performing data storage and retrieval, error recovery and storage device management.

A direct memory access bus is also provided which enables high speed data transfer among the several processors included within the storage facility and also external host computers or intelligent terminals.

8 Claims, 162 Drawing Figures

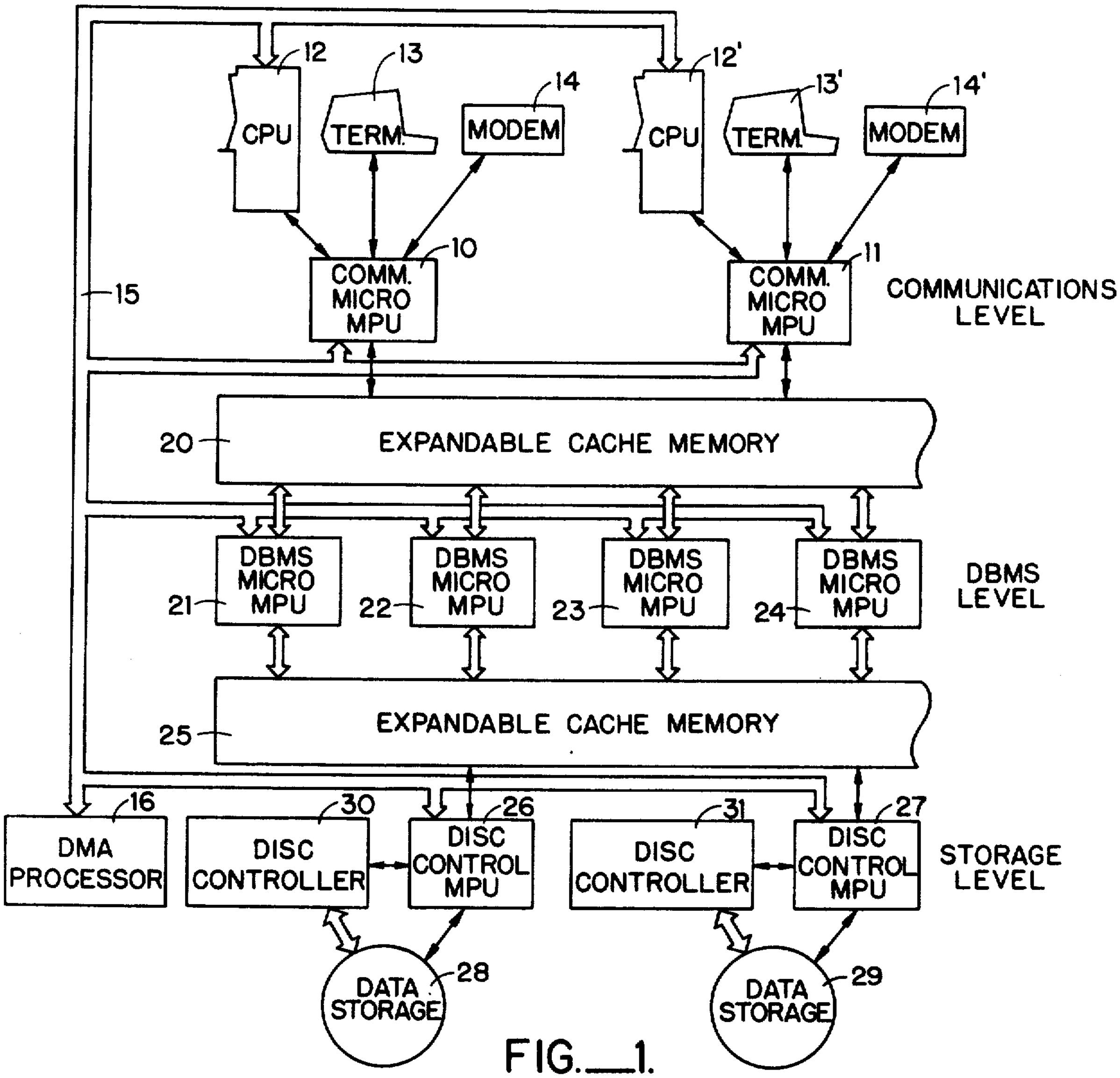
FIG.—1.
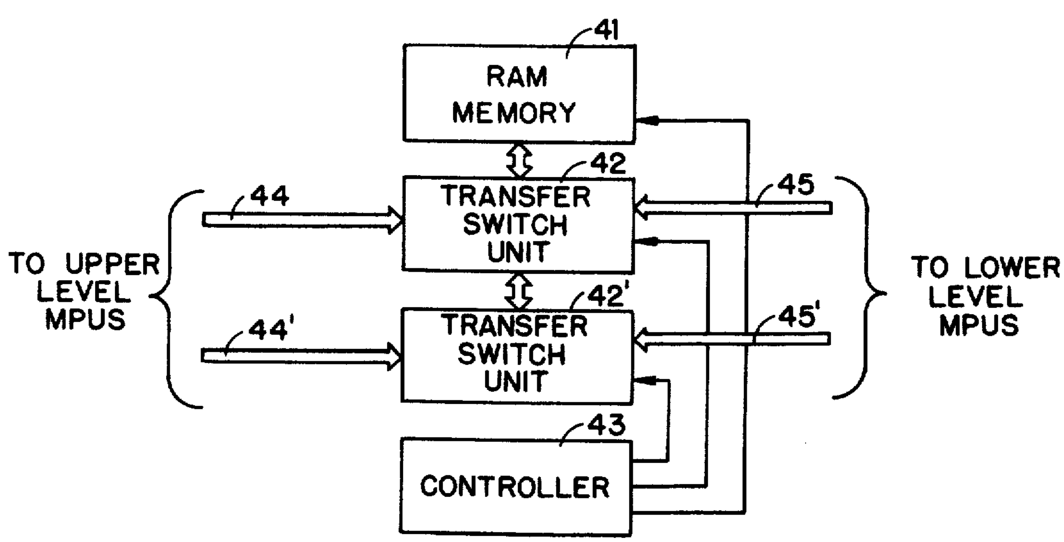
FIG.—10.

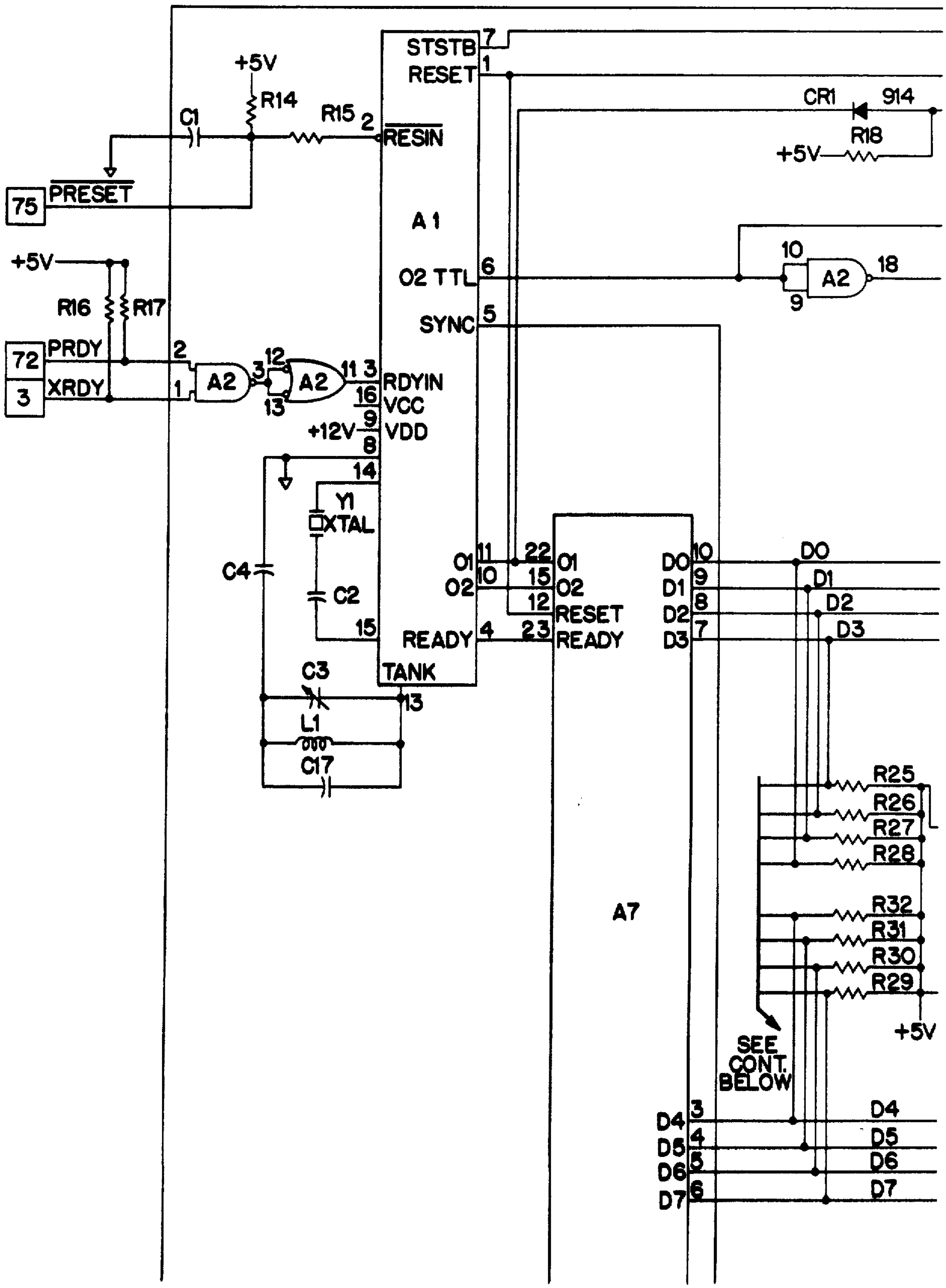
FIG.—3A.

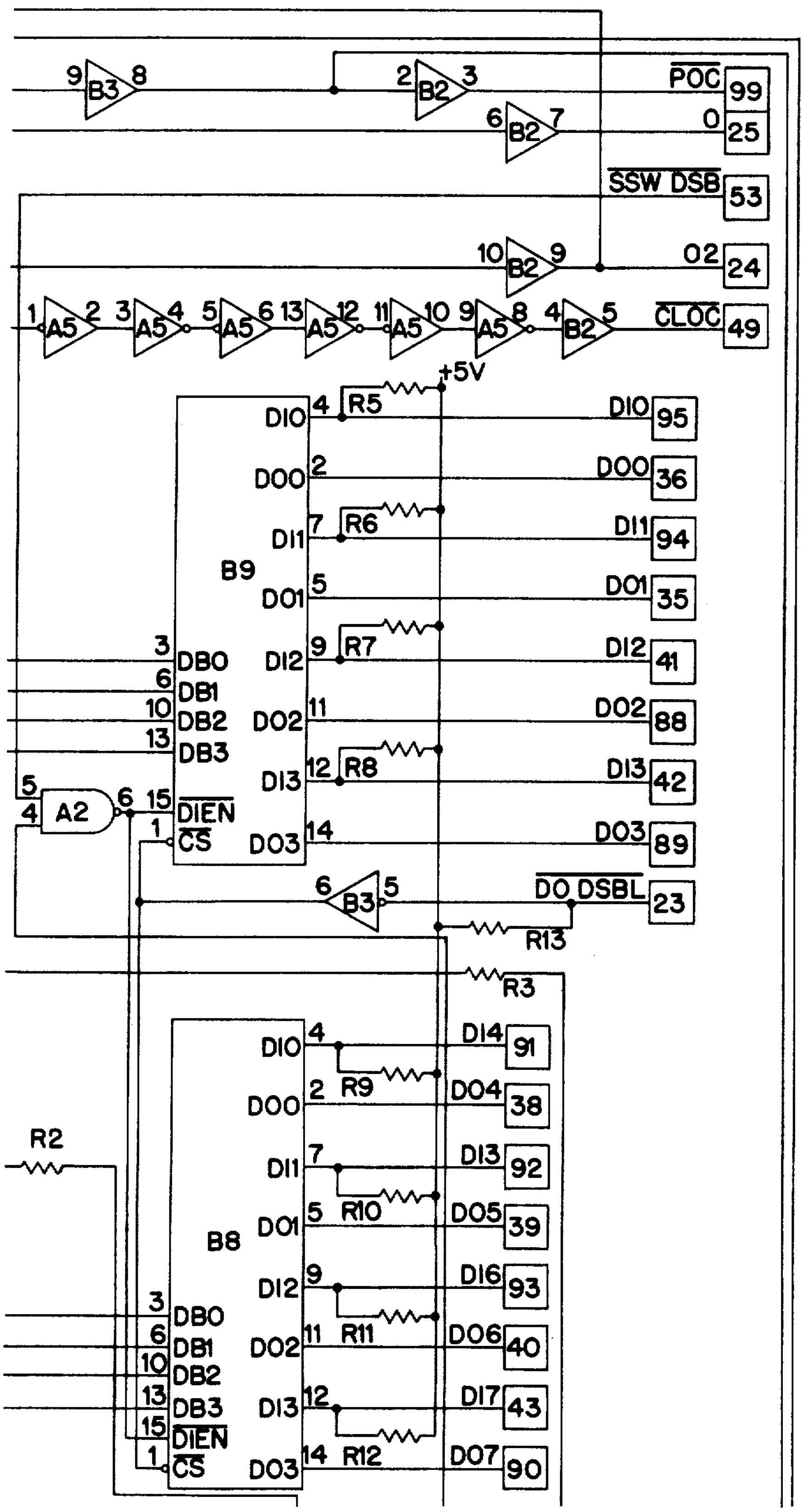
| | |
|---|---|
| A1 | 8224 |
| A2 | 74LS00 |
| A3 | 74LS02 |
| A4 | 7474 |
| A7 | 8080A |
| A9 | DATA BUS SOCKET |
| A10 | 8212 |
| A5 | 741S04 |
| R1 THRU R13, R15 THRU R17, R19 THRU R21 | 1K 1/4 W |
| R14, R18, R25 THRU R32 | 4.7K 1/4W |
| R22 | 470 1/2W |
| CR2 | 1N751 |
| CR1 | 1N914 |
| C1, C5, C7, C9, C10 | 33mF |
| C4, C6, C8, C18, C11 THRU C16 | .1mF |
| C2 | 39pF |
| C17 | 56pF |
| B2, B4 THRU B7, B10 | 8T97 |
| B3 | 74LS04 |
| B8, B9 | 8216 |
FIG.—3B.

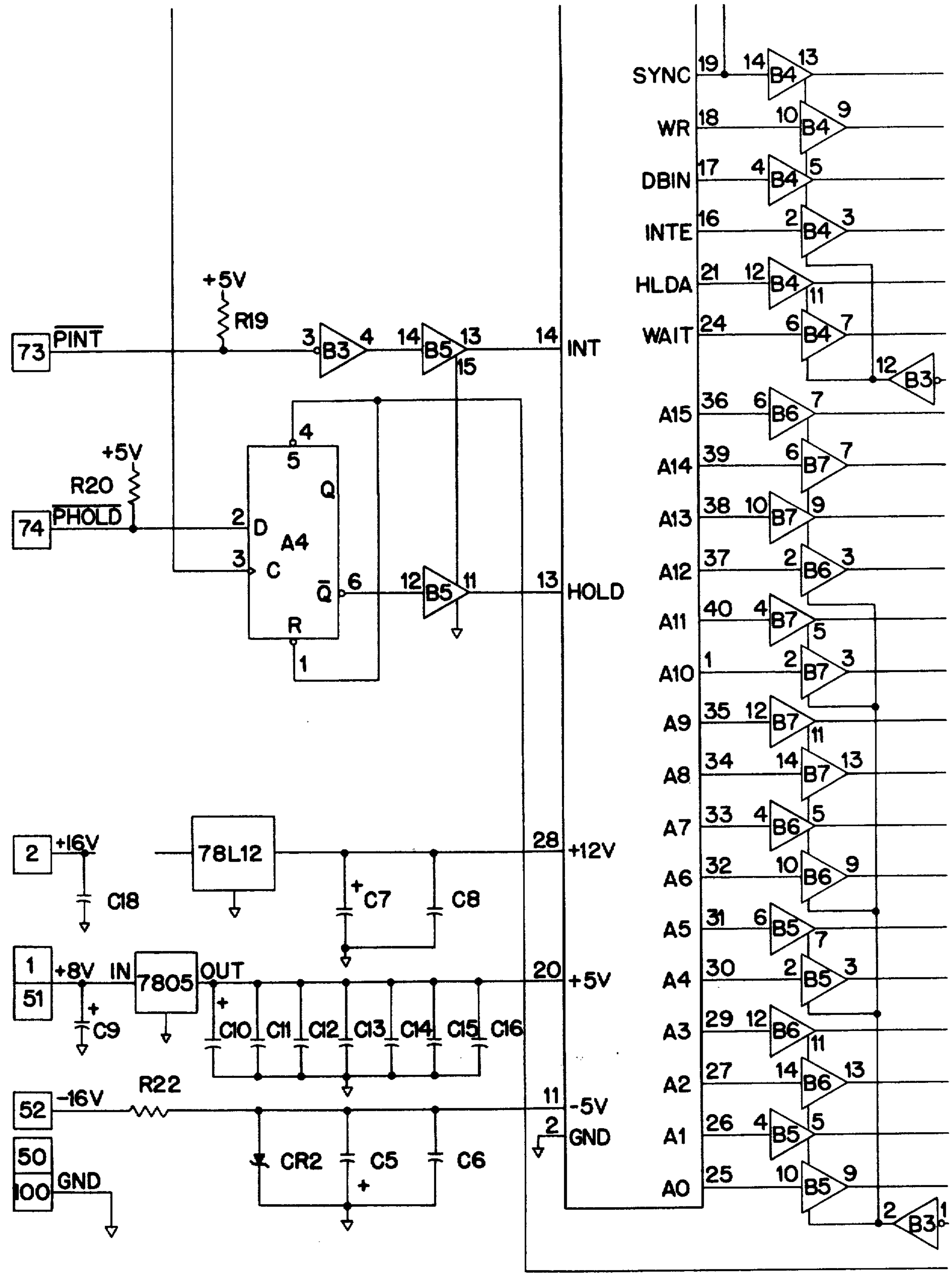
FIG.—3C.

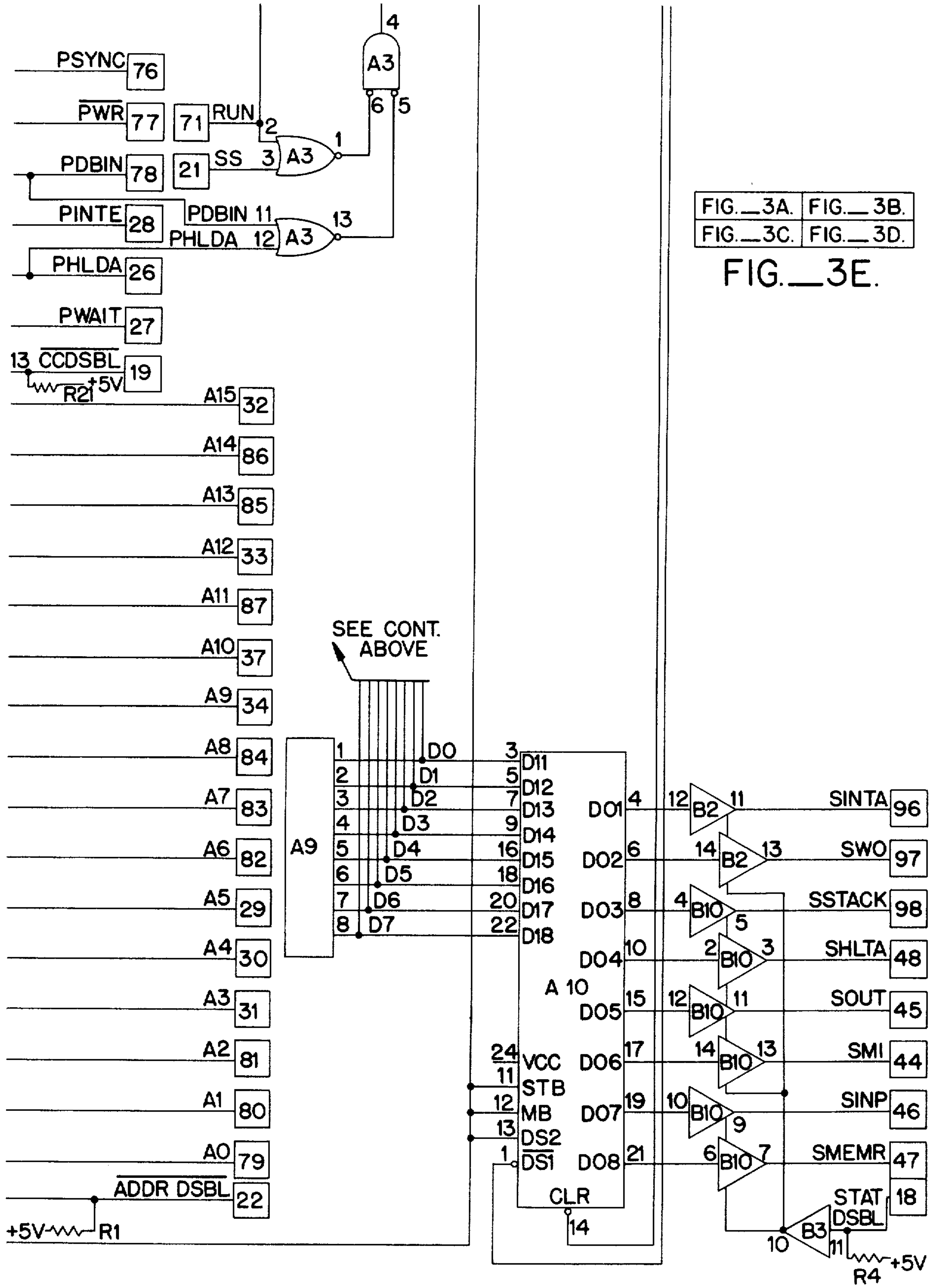
| | |
|---|---|
| FIG._3A. | FIG._3B. |
| FIG._3C. | FIG._3D. |
FIG._3E.
FIG._3D.

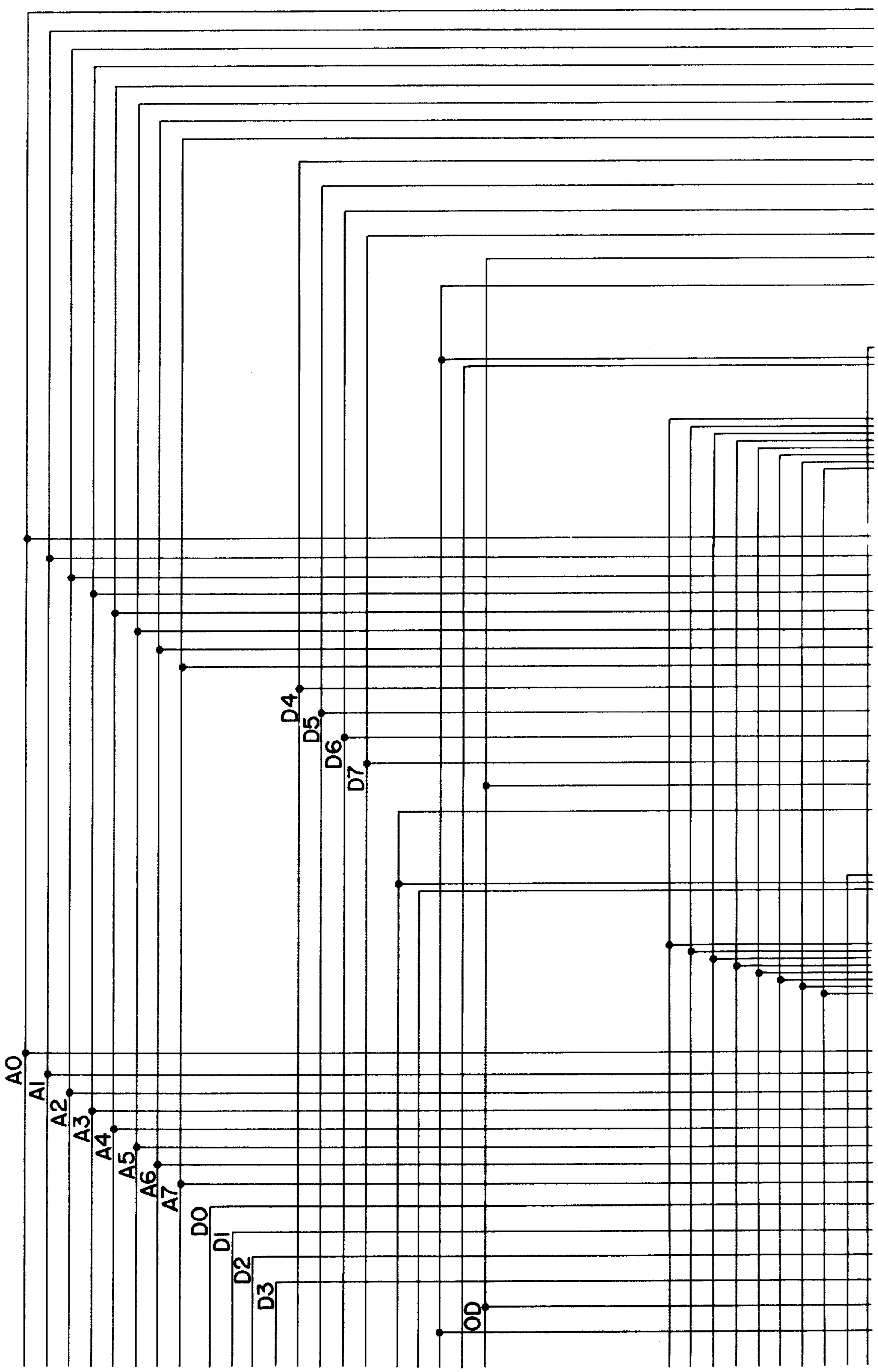
FIG.__4B.

| | |
|---|---|
| A1 THRU A16 | 8111 |
| B1 THRU B16 | 8111 |
| C7 | 74LS02 |
| C9<br>C12 | 74LS04 |
| C10 | 8205 |
| C11 | 16 PIN DIP JUMPER SOCKET |
| C13 | 74LS30 |
| C14 | 8T97 |
| C15<br>C16 | 8216 |
| C1 THRU C32<br>C36 THRU C38 | .1mF |
| C33<br>C34 | 33mF |
| C35 | .01mF |
| R1 THRU R5 | 1K 1/4W |
| R6 | 7.5 |
| R7 | 470 |

FIG._4C.

| | | |
|---|---|---|
| FIG._4A. | FIG._4B. | FIG._4C. |
| FIG._4D. | FIG._4E. | |

FIG._4F.

| | |
|---|---|
| A5 | 74LS08 |
| A6 | 74LS00 |
| A7<br>A8<br>A9<br>A10 | 8T97 |
| A11 | 8212 |
| A14 | 74S124 |
| B2 | 74LS193 |
| B3 | 74LS08 |
| B4 | 74LS30 |
| B5 | 74LS10 |
| B6 | 7425 |
| B7<br>B8<br>B9<br>B10 | 74LS193 |
| C1 | 74LS04 |
| C2 | 74LS08 |
| C3 | 74LS00 |
| C4 | JUMPER SOCKET |
| C5 | 74LS04 |
| C6 | 74LS27 |
| C7<br>C8<br>C9<br>C10 | 74LS193 |
| C1<br>C2 | 33uF 25V |
| C3 THRU C21 | .1uF 25V |
| C22 | 15pf |
| D1<br>D2 | 74LS74 |
| D3 | 74LS02 |
| D4 | JUMPER SOCKET |
| D5 | 74LS04 |
| D6 THRU D10<br>D12 | 8T97 |
| D13 | 74LS32 |
| R1 THRU R12 | 1K 1/4W |
| R13 | 5K |
| R14 | 2.2K |
| R15 | 5K Pot |

FIG._65D.

| | | | |
|---|---|---|---|
| FIG._65A. | FIG._65B. | FIG._65C. | FIG._65D. |
| FIG._65E. | FIG._65F. | FIG._65G. | |

FIG._65H.

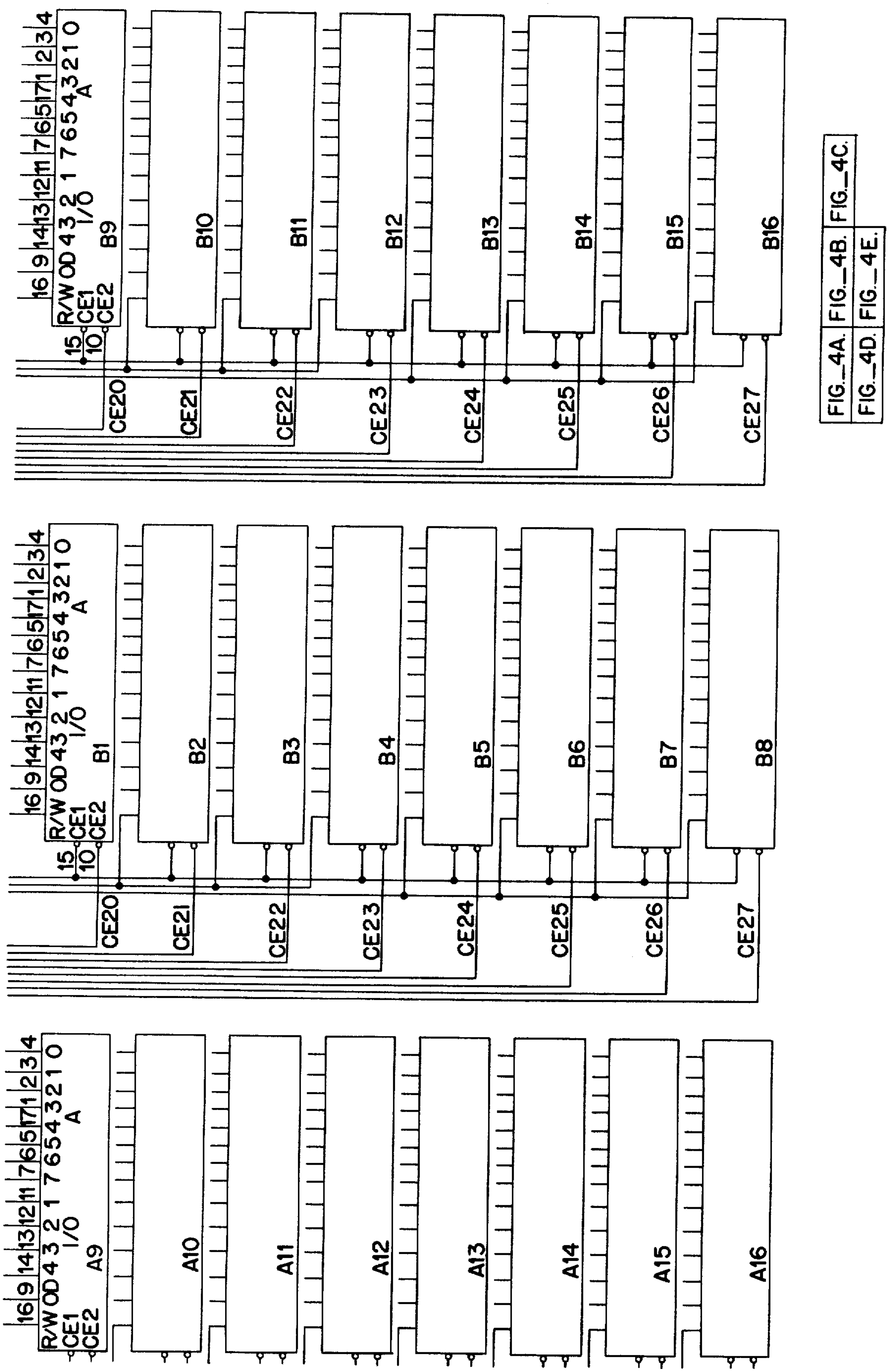
FIG._4F.
FIG._4E.

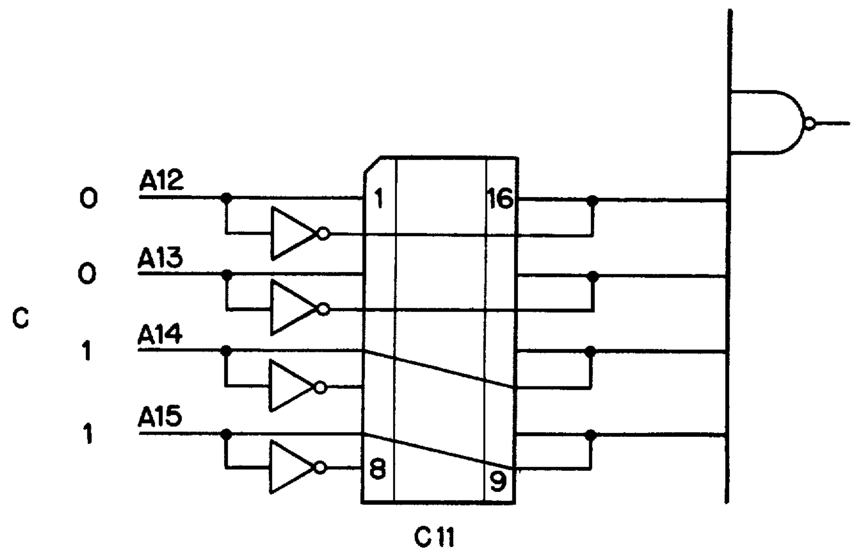
FIG.__4G.
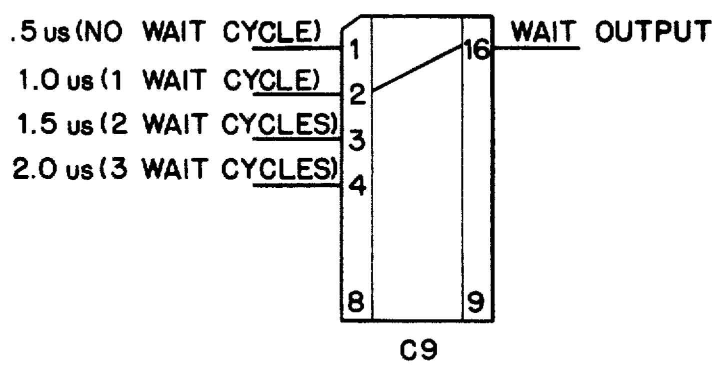
FIG.__5F.
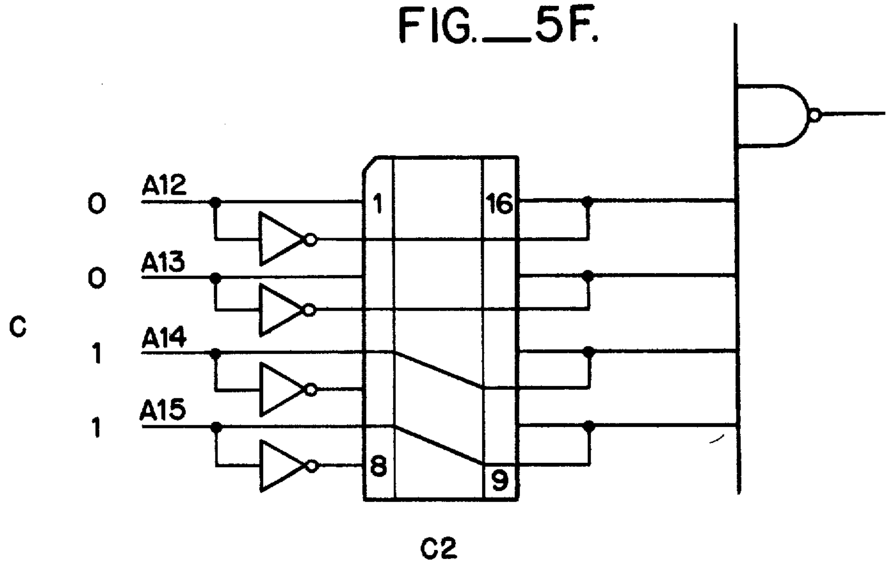
FIG.__5G.

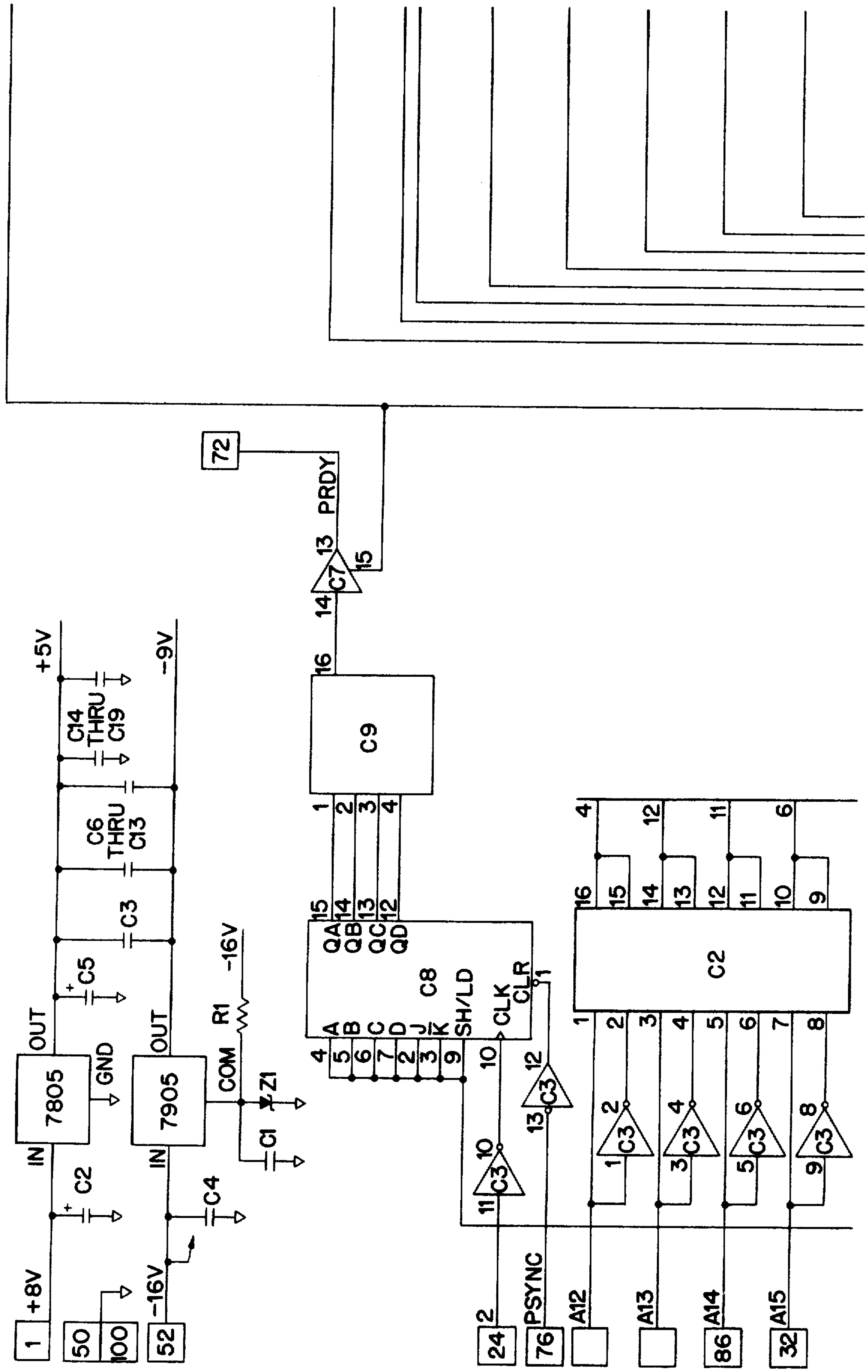
FIG._5A.

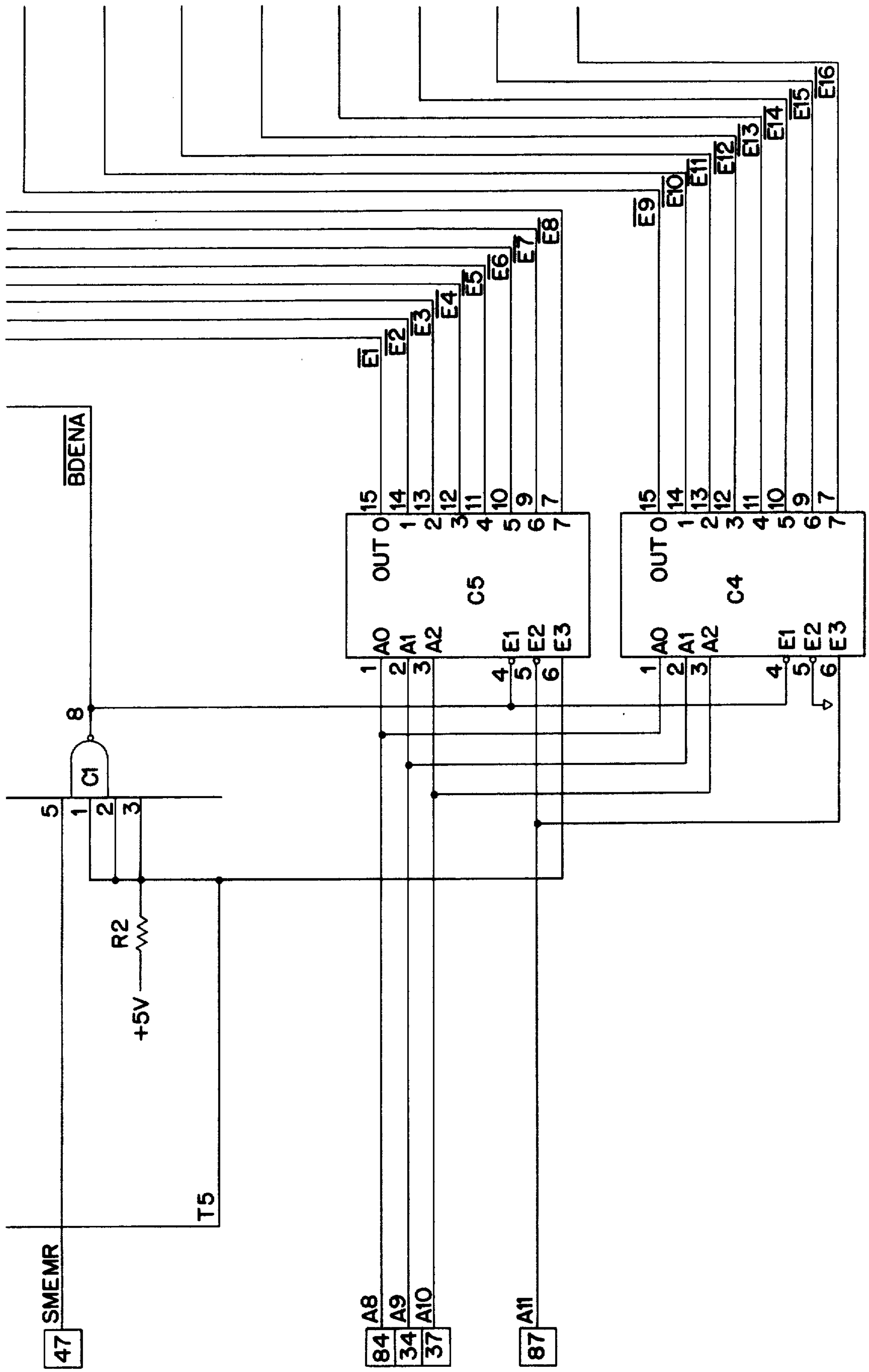
FIG._5C.

| | |
|---|---|
| A1 THRU A8 | 1702A |
| B1 THRU B8 | 1702A |
| C1 | 74LS30 |
| C2, C9 | JUMPER SOCKET |
| C3 | 74LS04 |
| C4, C5 | 8205 |
| C6, C7 | 8T97 |
| C8 | 74195 |
| C2 THRU C5 | 33mF |
| C1, C6 THRU C19 | .1mF |
| Z1 | 1N748 |
| R1, R2 | 1K 1/4W |

| | |
|---|---|
| FIG. 5A. | FIG. 5B. |
| FIG. 5C. | FIG. 5D. |

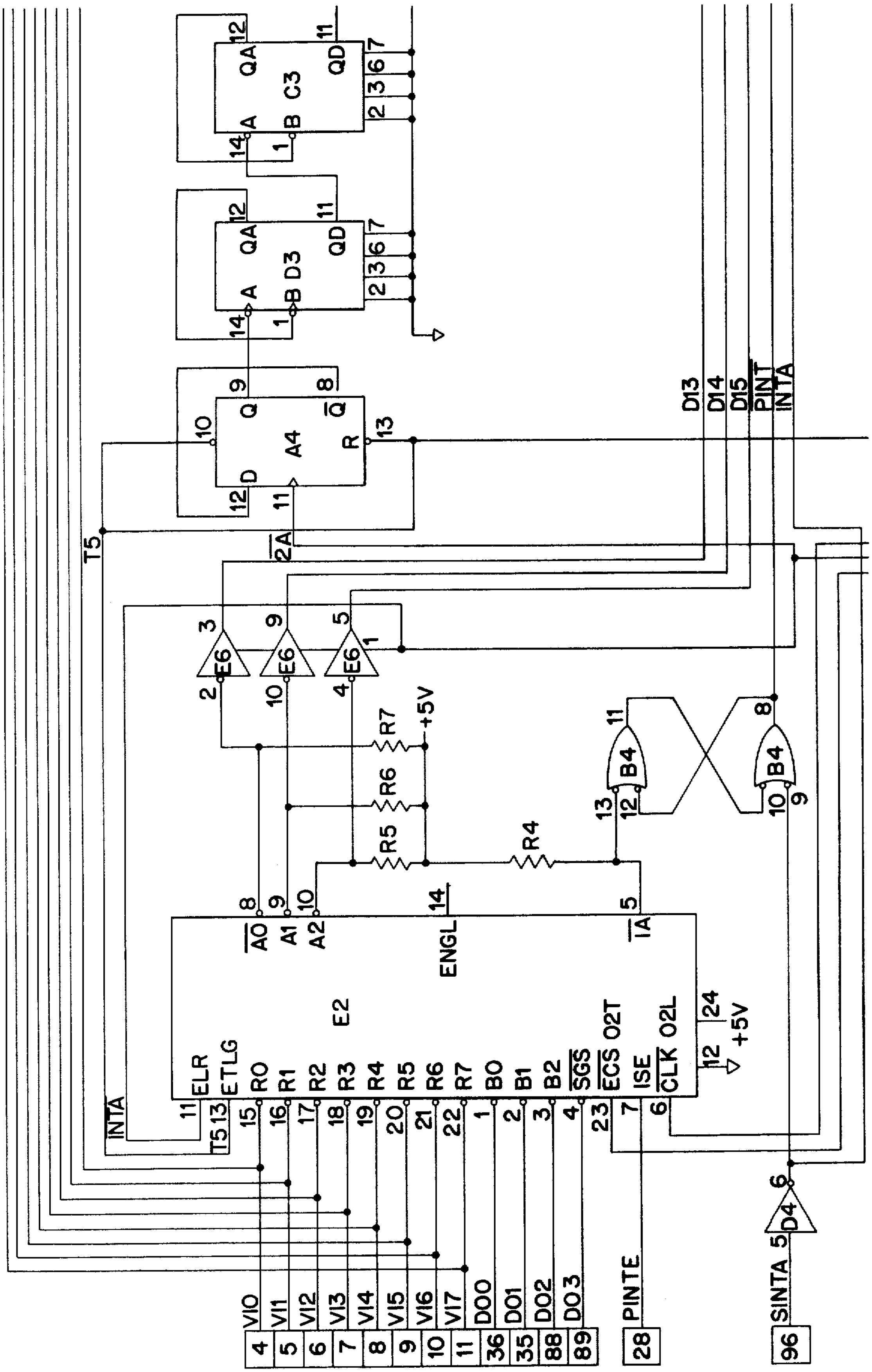
FIG.—6A.

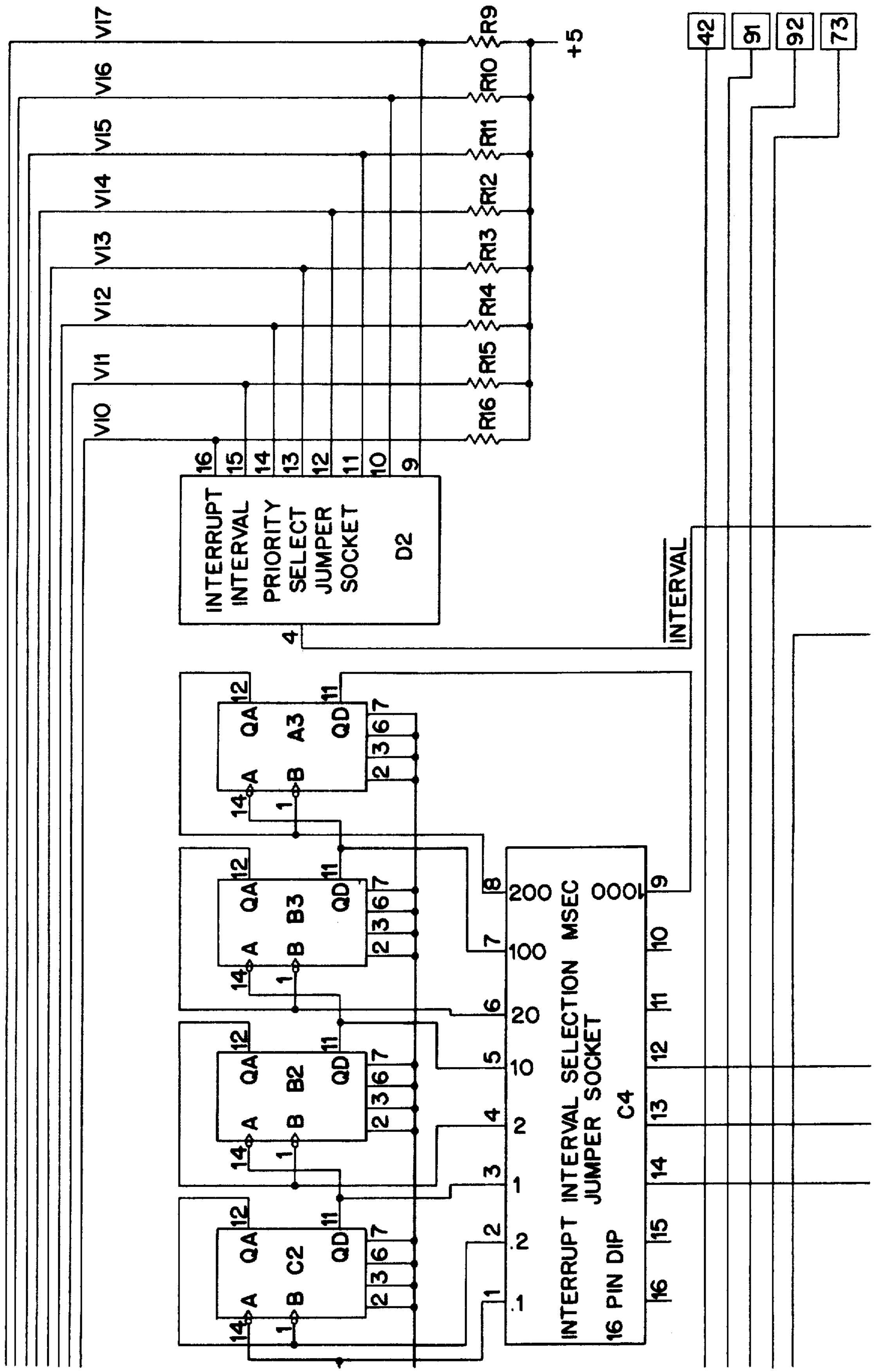
FIG.__6B.

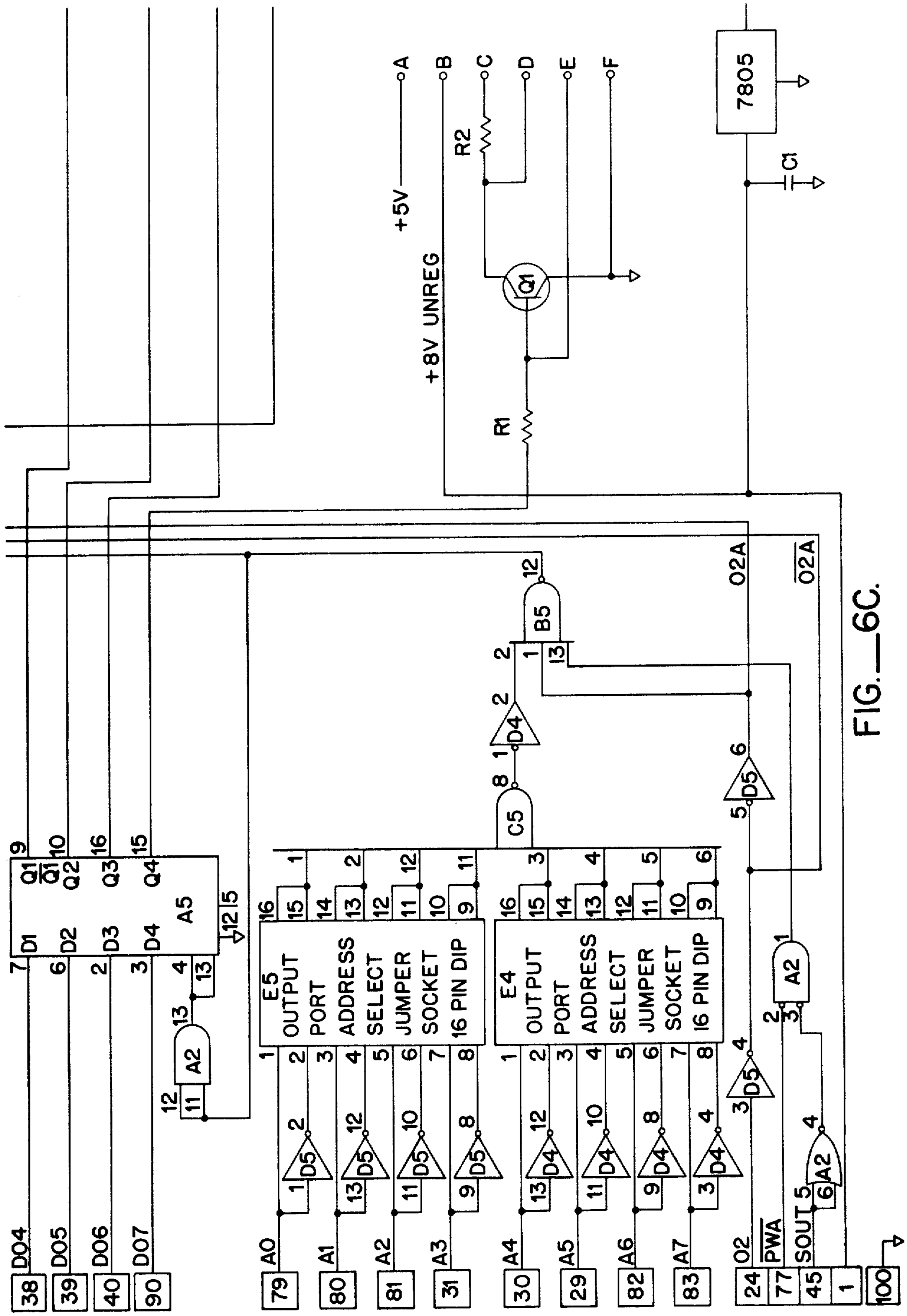
FIG.—6C.

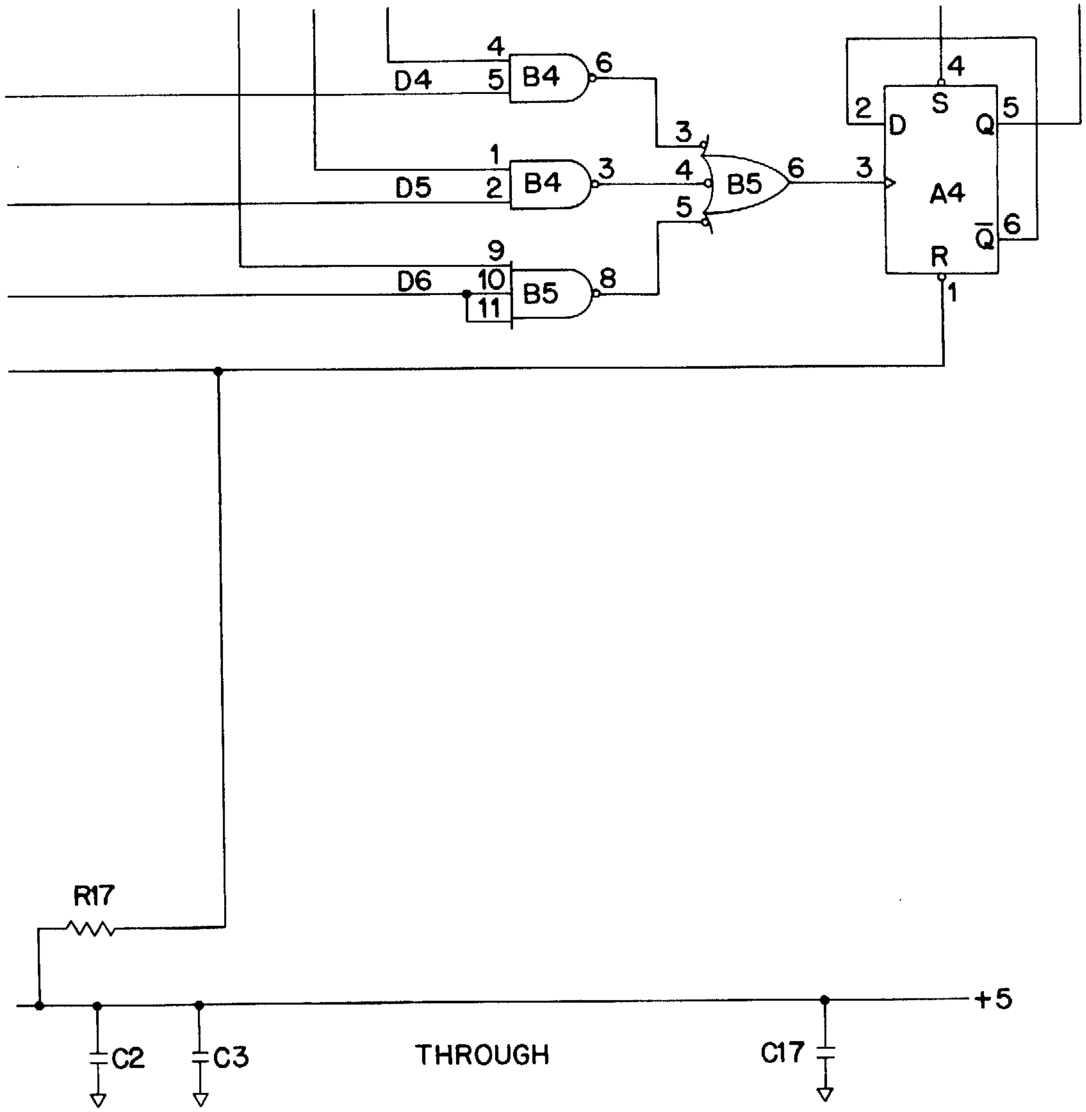
FIG.__6D.
| | |
|---|---|
| A2 | 74LS02 |
| A3 | 7490 |
| A4 | 7474 |
| A5 | 74LS75 |
| B2, B3 | 7490 |
| B4 | 7400 |
| B5 | 7410 |
| C2, C3 | 7490 |
| C4 | JUMPER SOCKET |
| C5 | 74LS30 |
| D2 | JUMPER SOCKET |
| D3 | 7490 |
| D4, D5 | 74LS04 |
| E2 | 8214 |
| E4, E5 | JUMPER SOCKET |
| E6 | 8T98 |
| C1, C2 | 33 mF |
| C3 THRU C17 | 1 mF |
| Q1 | 2N3904 |
| R1, R3 THRU R15 | 1K 1/4W |
| R2 | 220 1/4W |
| | |
|---|---|
| FIG.__6A. | FIG.__6B. |
| FIG.__6C. | FIG.__6D. |
FIG.__6E.

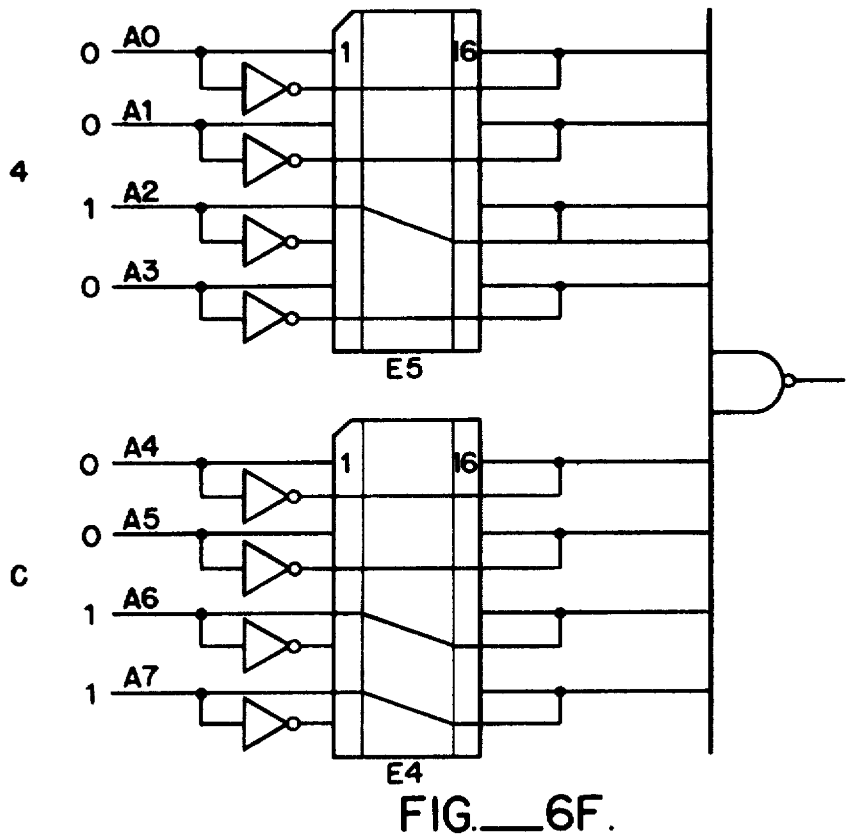
FIG.__6F.
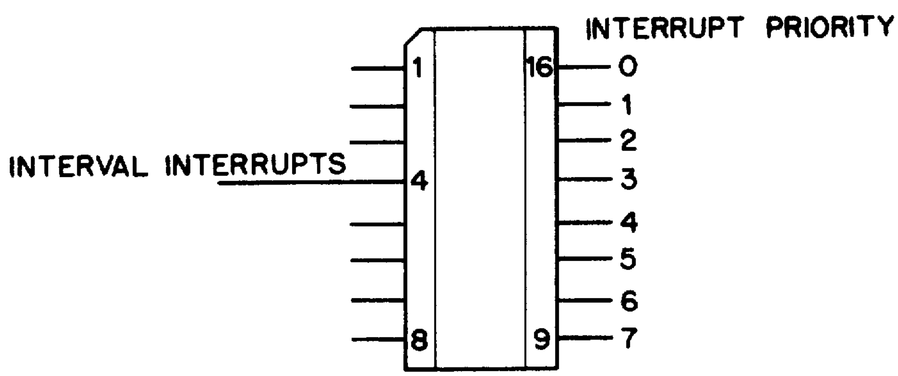
FIG.__6G.
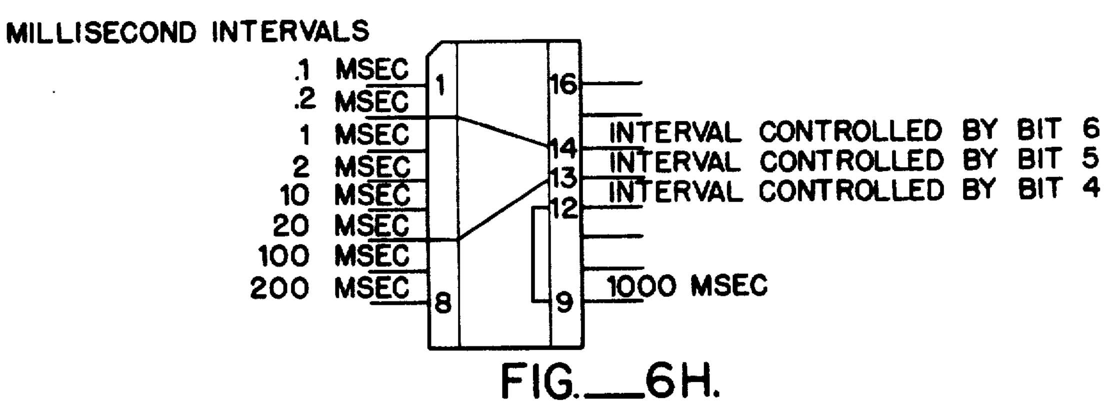
FIG.__6H.

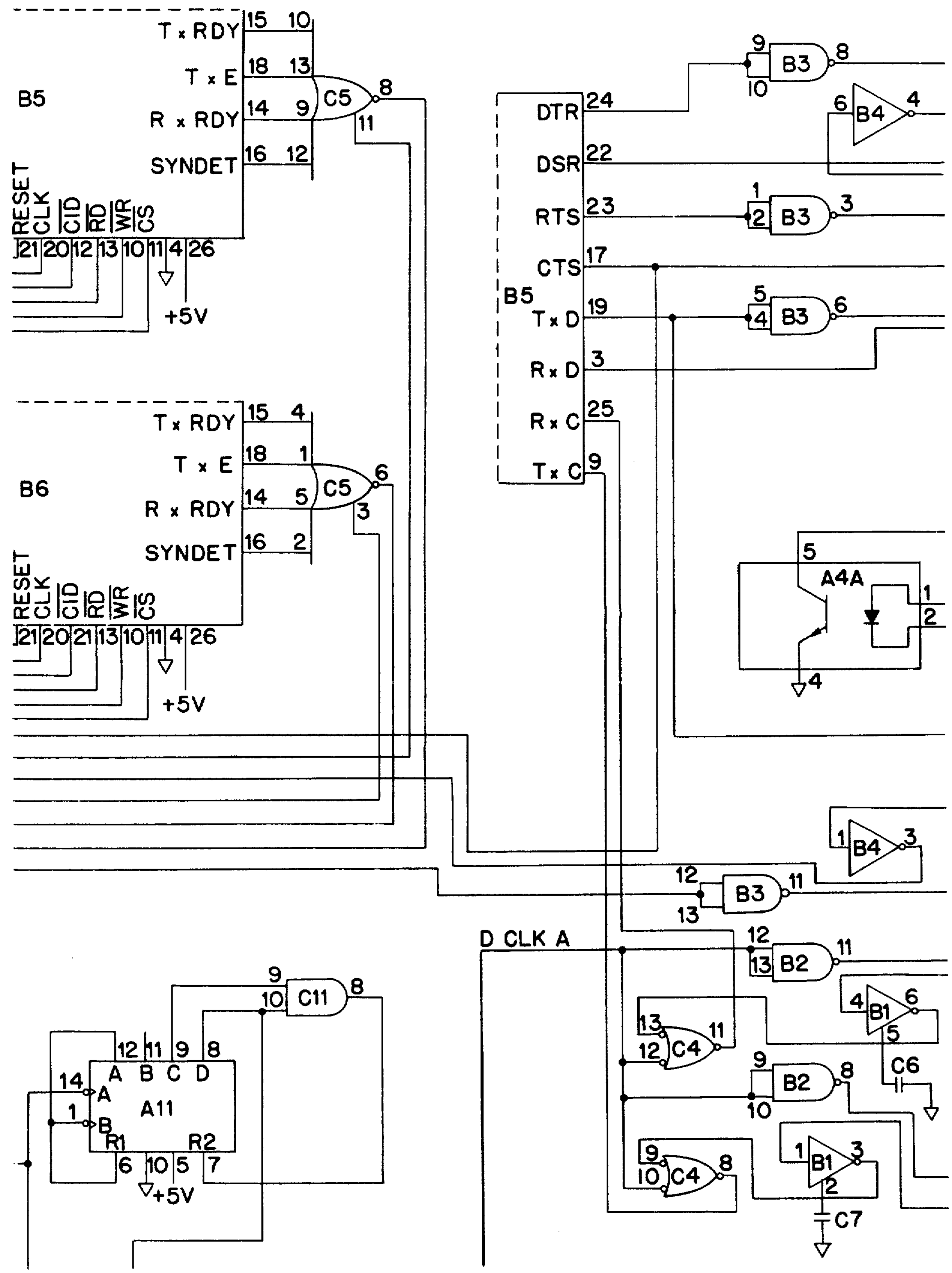
FIG._7B.

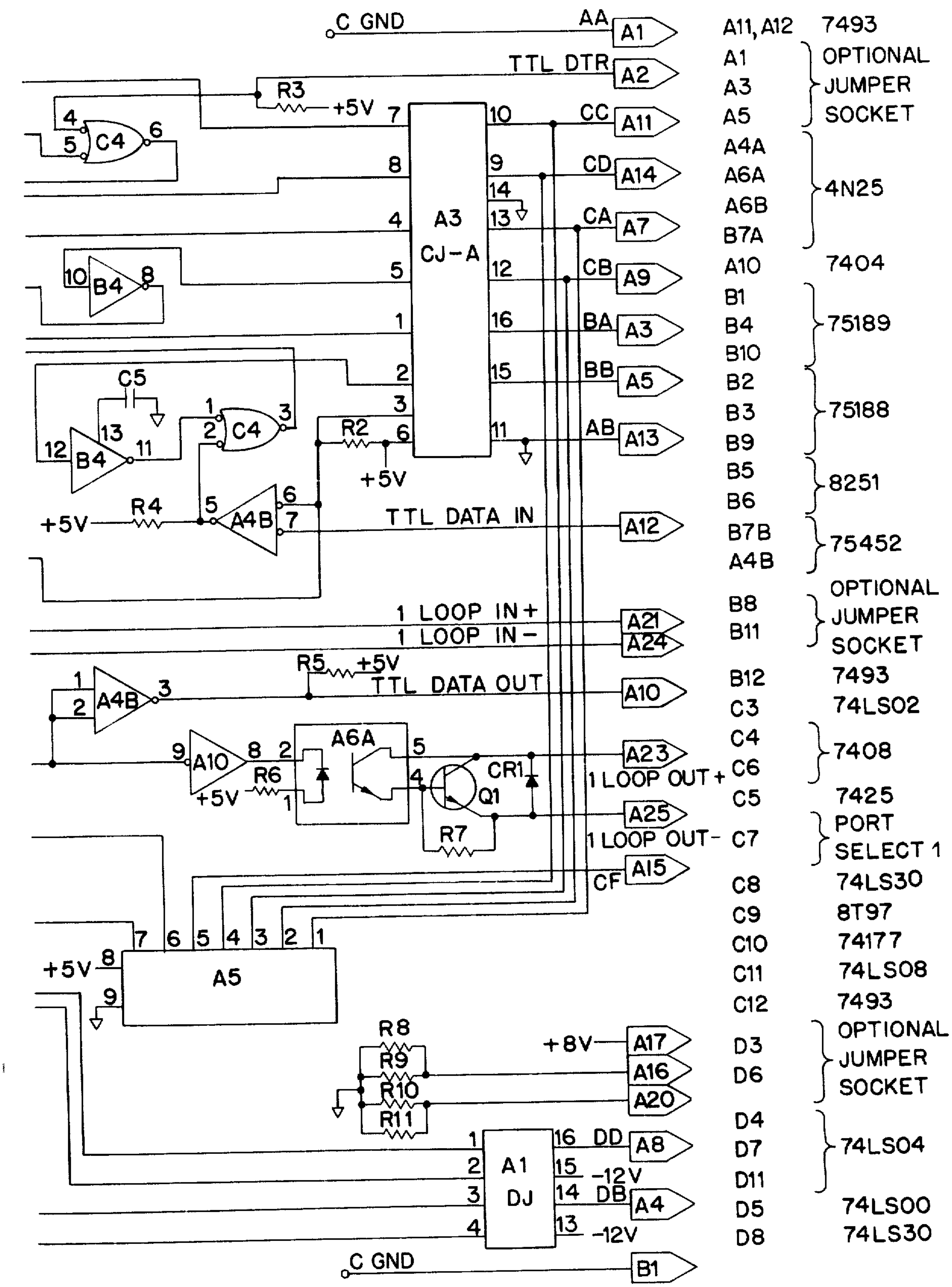
FIG._7C.

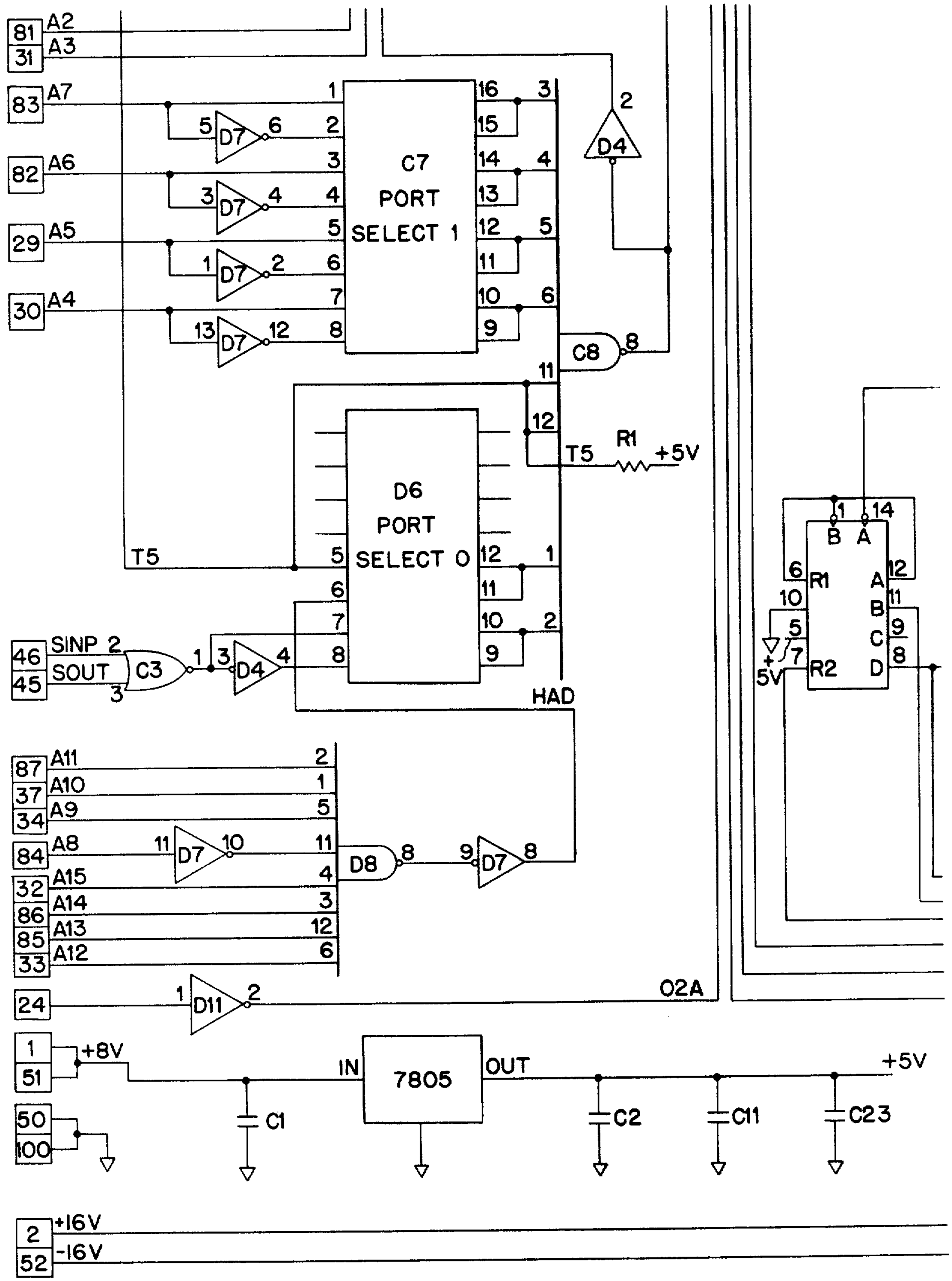
FIG._7D.

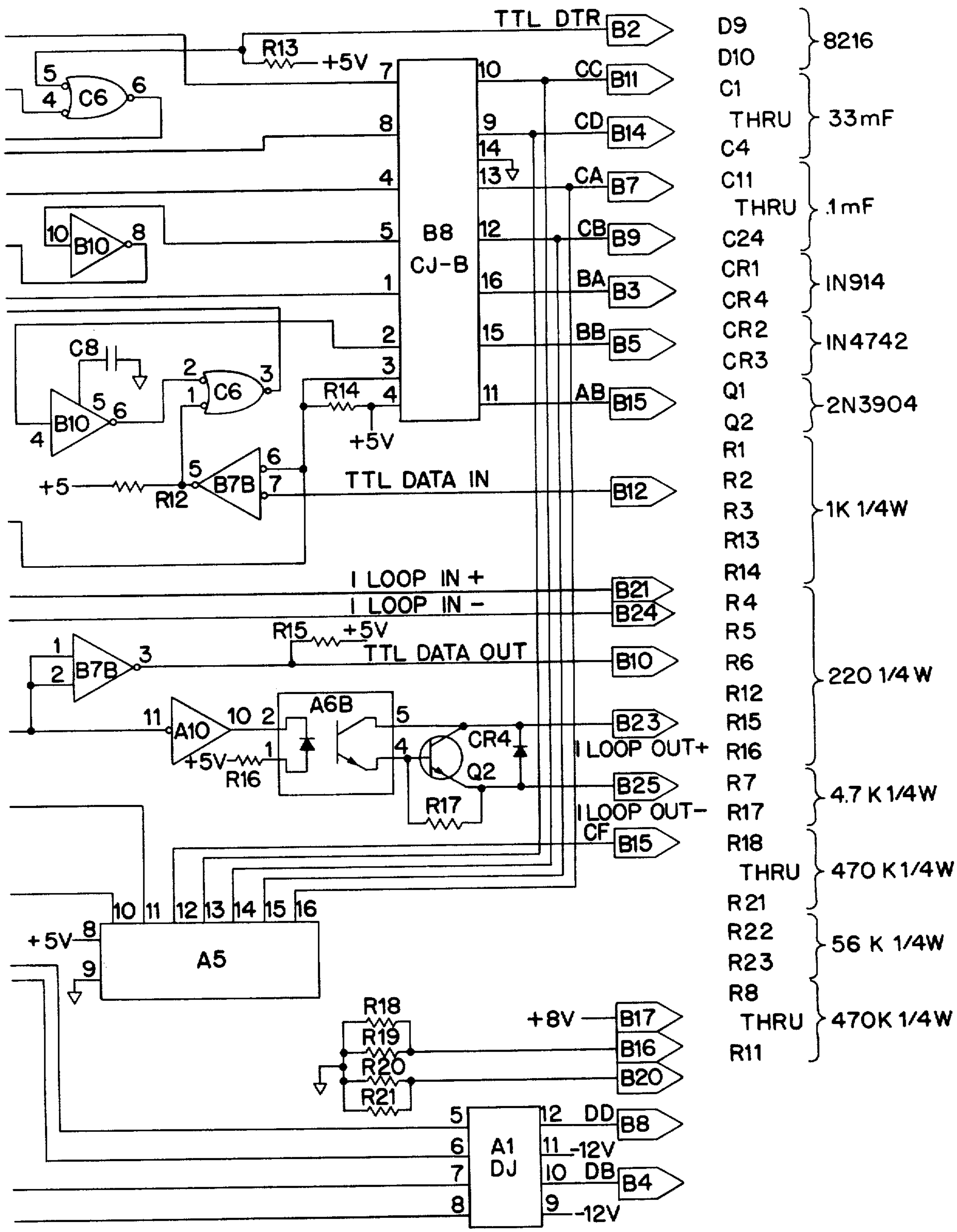
FIG._7F.
| | | |
|---|---|---|
| FIG._7A. | FIG._7B. | FIG._7C. |
| FIG._7D. | FIG._7E. | FIG._7F. |
FIG._7G.

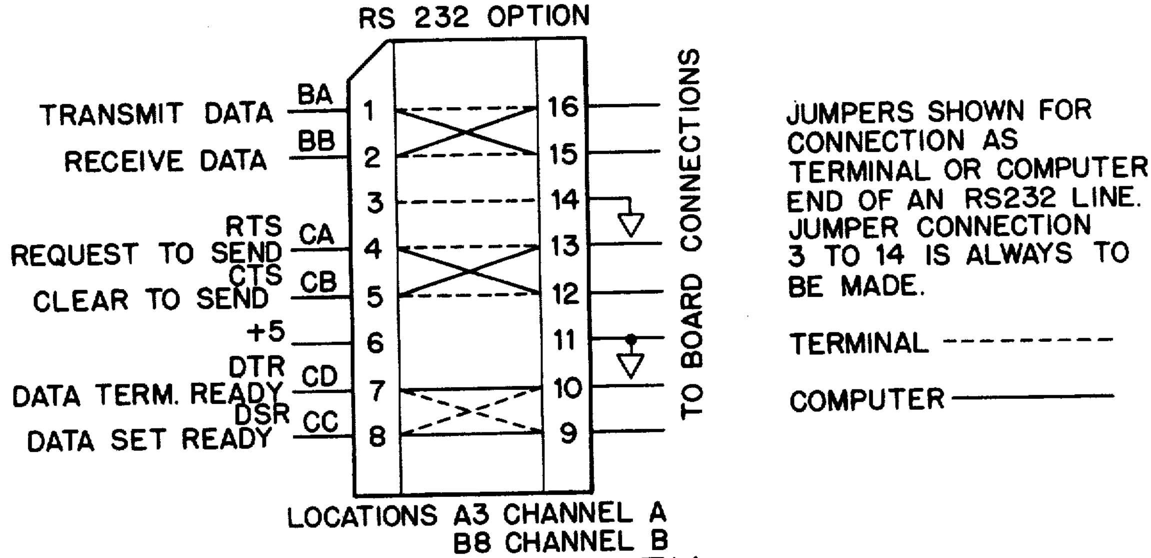
FIG.—7H.
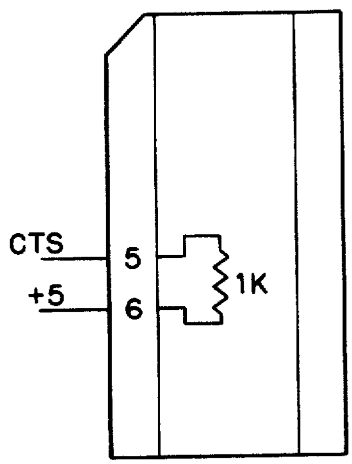
CURRENT LOOP OPTION
FIG.—7I.
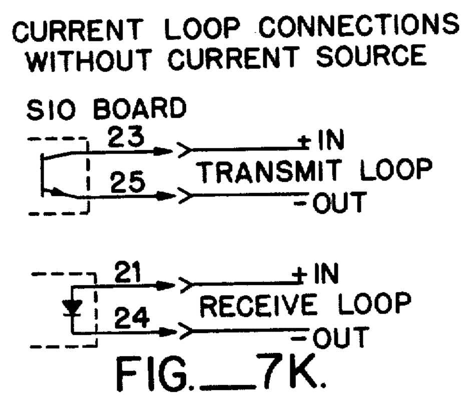
FIG.—7K.
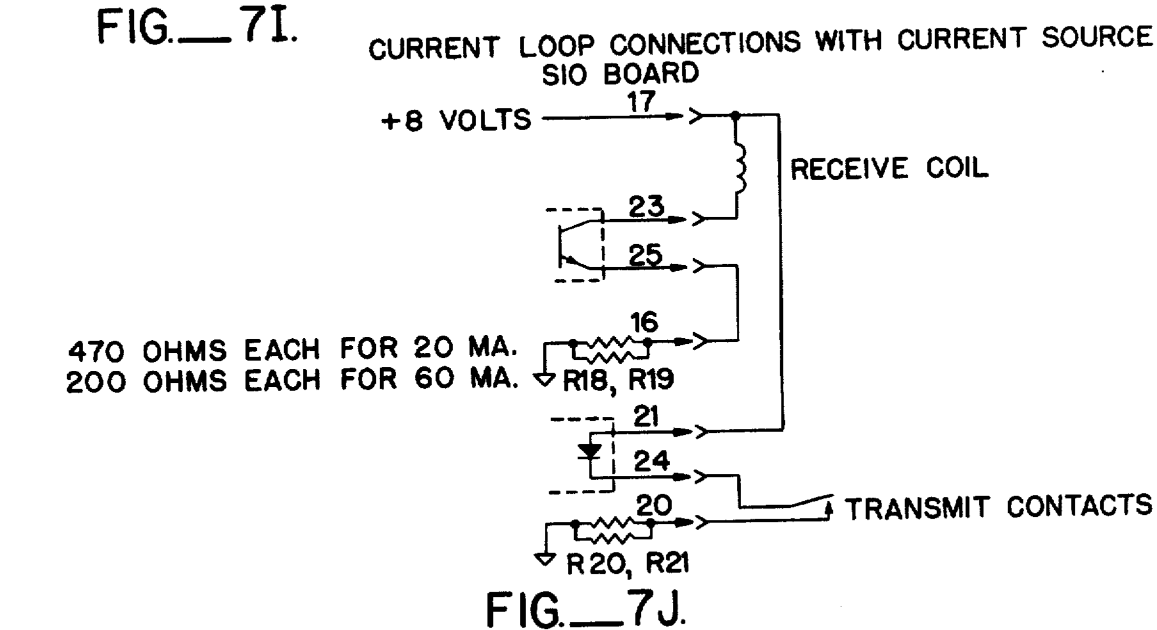
FIG.—7J.

BAUD RATE SELECT JUMPER DIAGRAM

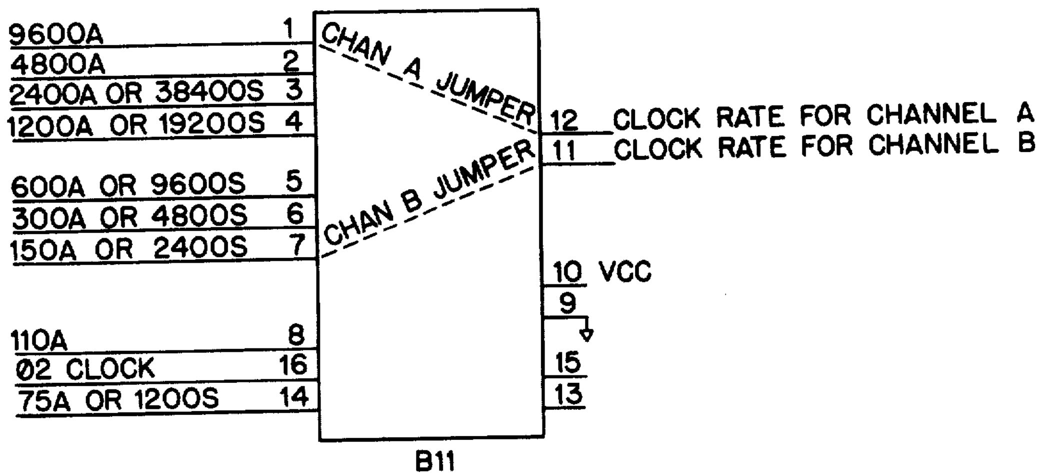

TO SELECT A DESIRED BAUD RATE SIMPLY JUMPER IT ACROSS TO THE DESIRED CHANNEL.

THE SUFFIX: S = SYNCHRONOUS
A = ASYNCHRONOUS

EXAMPLE. SHOWS: 9600 ASYNCHRONOUS TO CHANNEL A
150 ASYNCHRONOUS OR 2400 SYNCHRONOUS TO CHANNEL B.

FIG.—7L.

S10 RS232 INTERCHANNEL CONTROL JUMPERS AND CARRIER DETECT

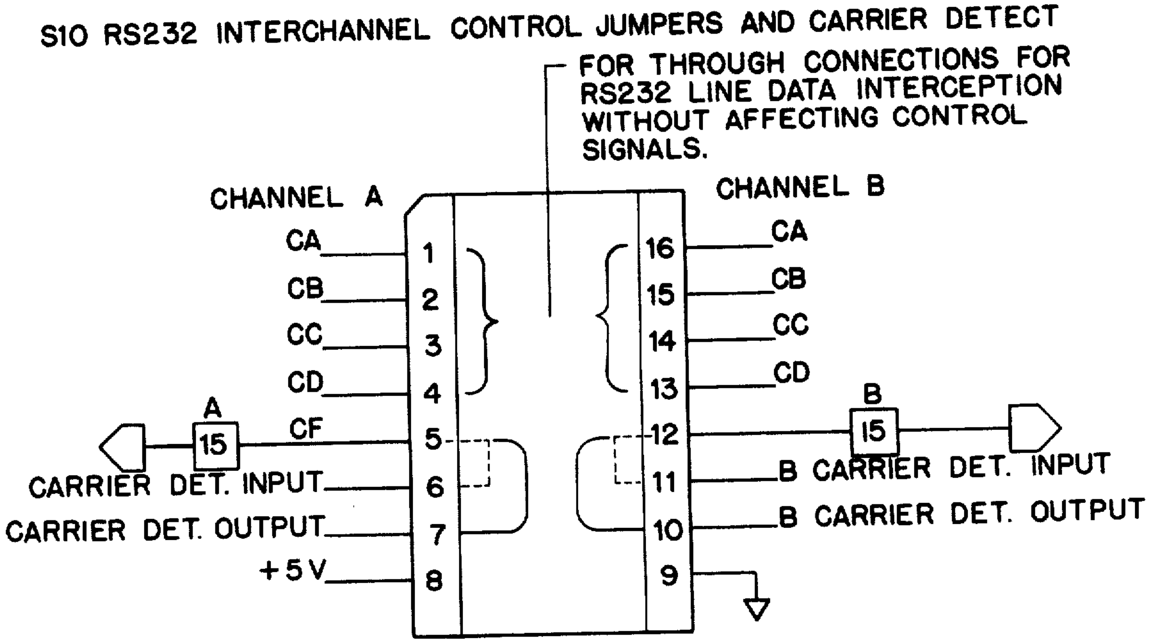

TO RECEIVE CARRIER DETECT- - - - - TERM.
TO ORIGINATE CARRIER DETECT———— COMP.

FIG.—7M.

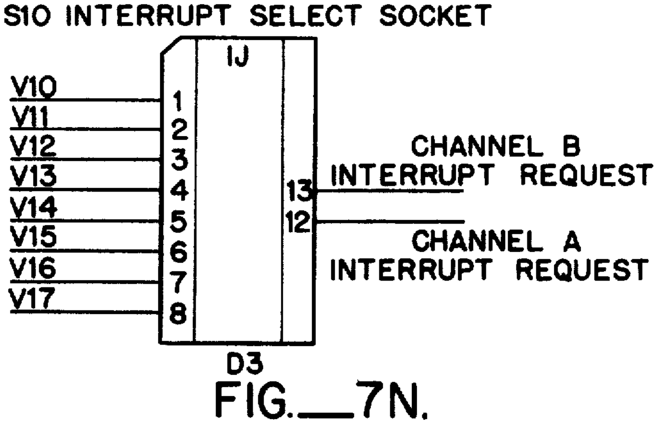
FIG._7N.
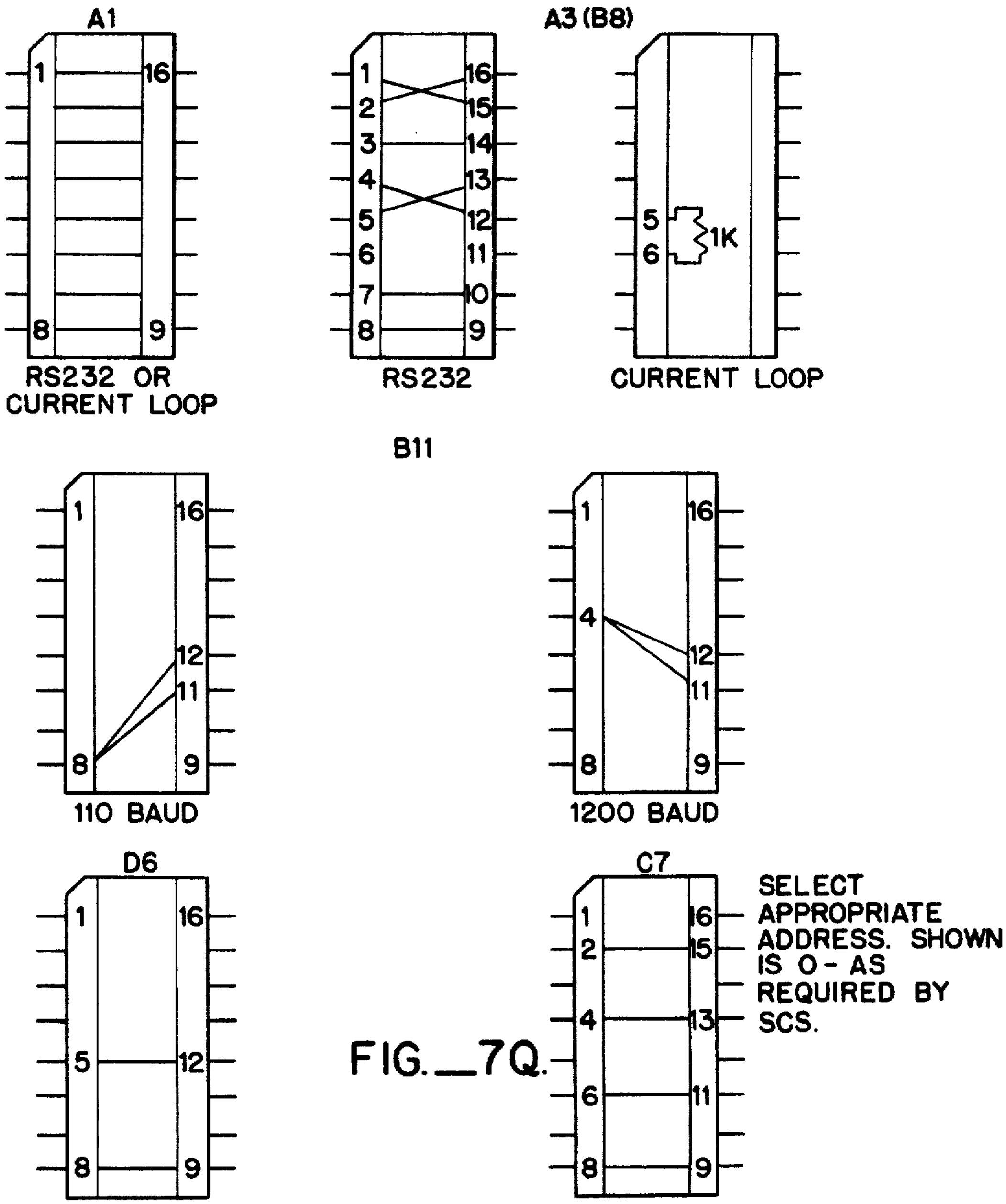
FIG._7Q.

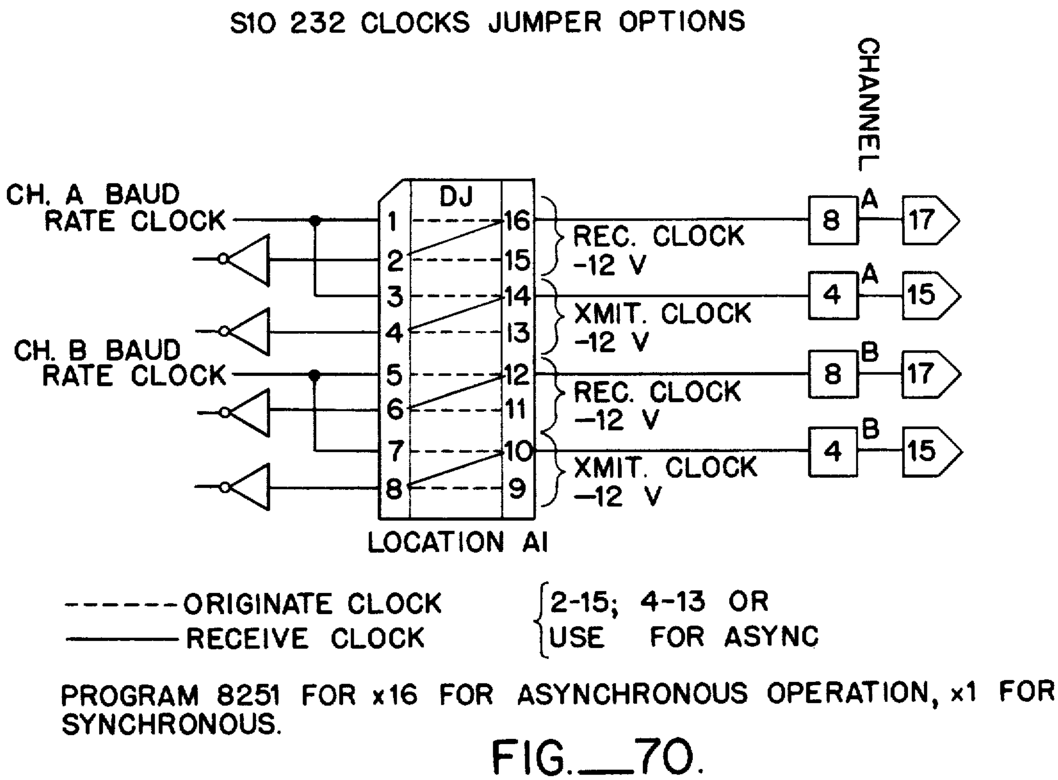
FIG.—7O.
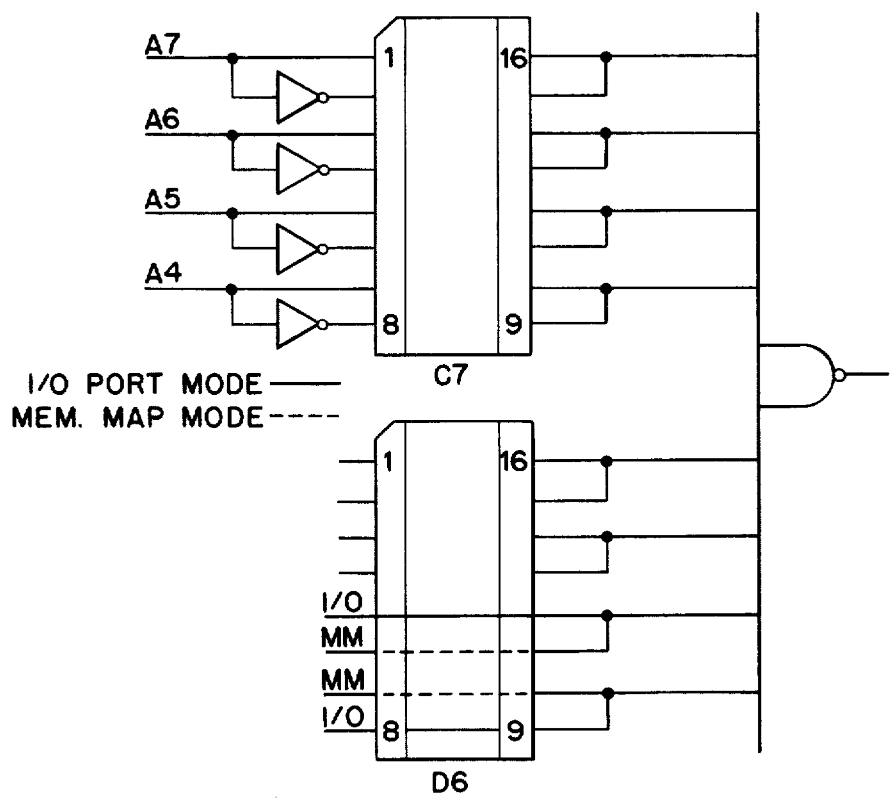
FIG.—7P.

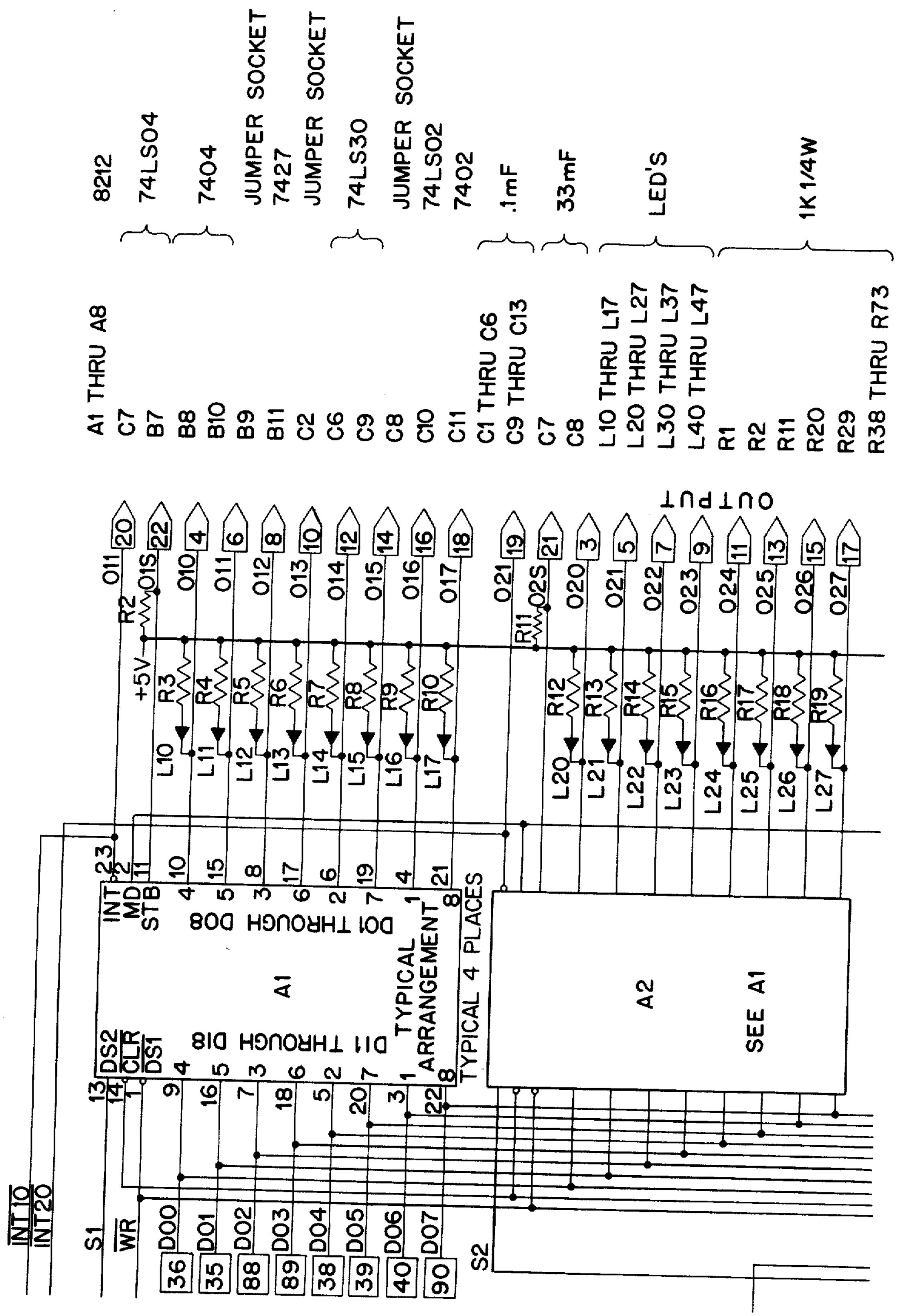
FIG._8B.

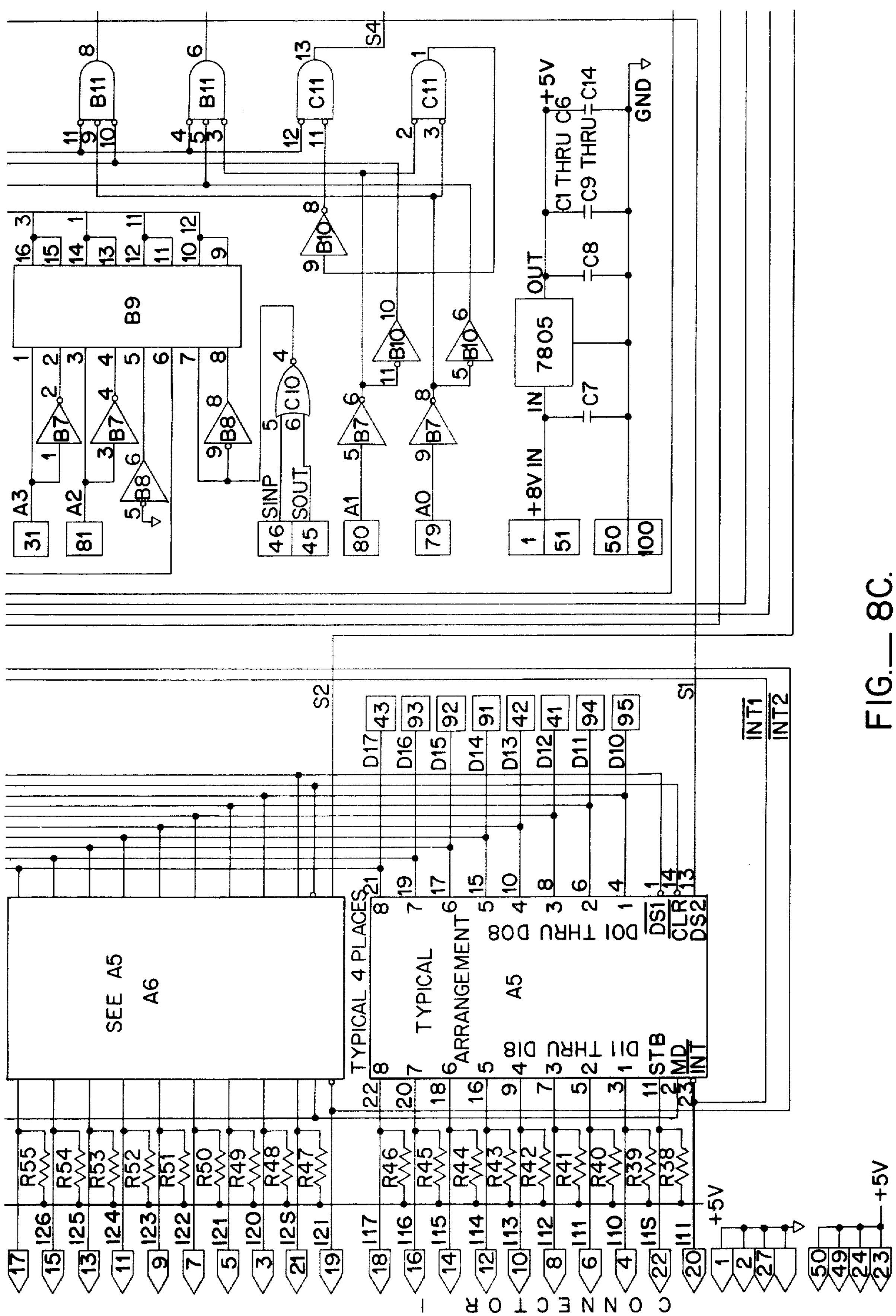
FIG._8C.

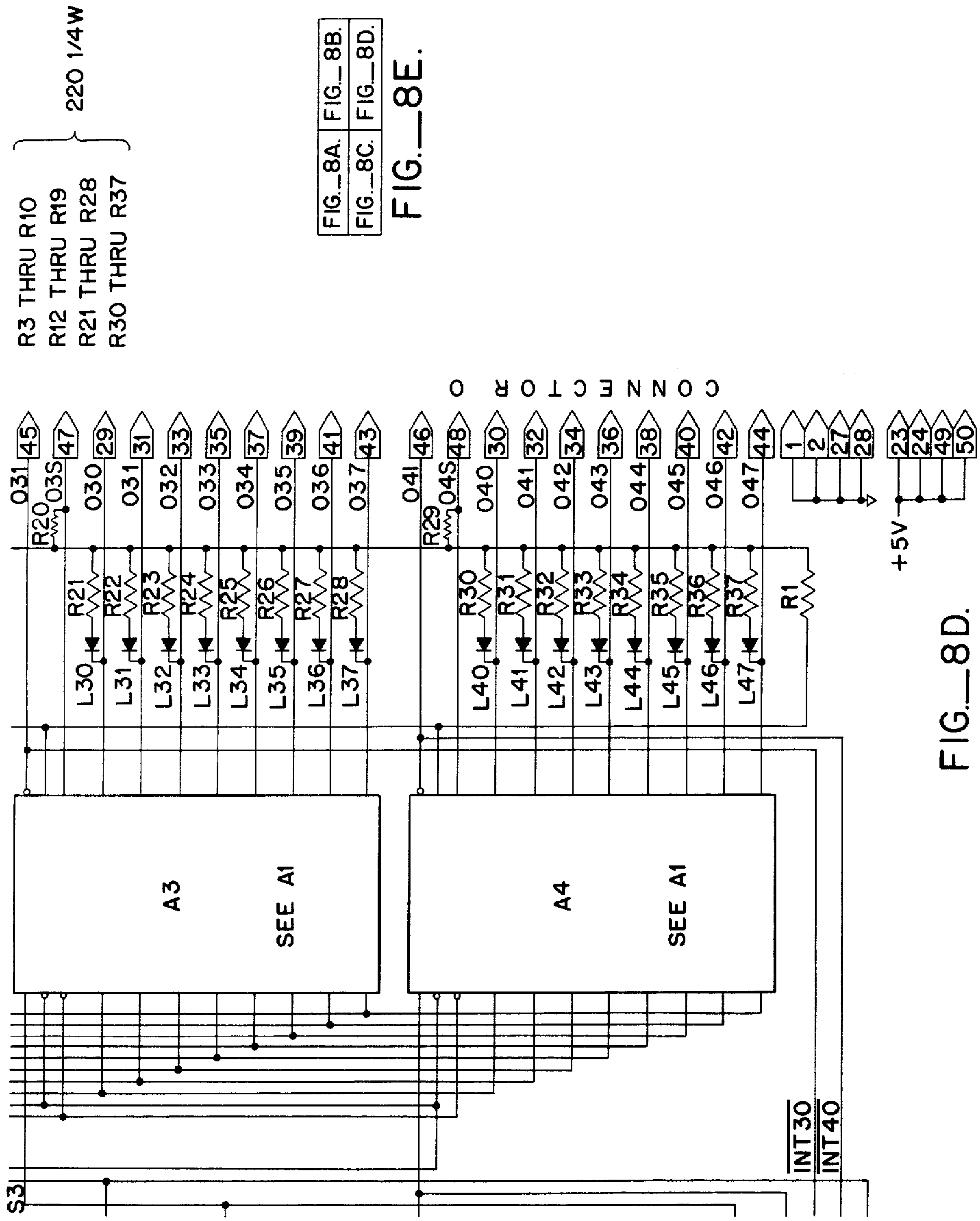
FIG._8D.

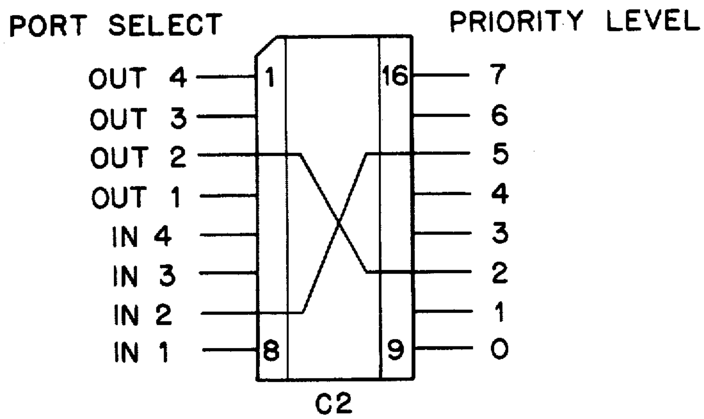
FIG._8F.
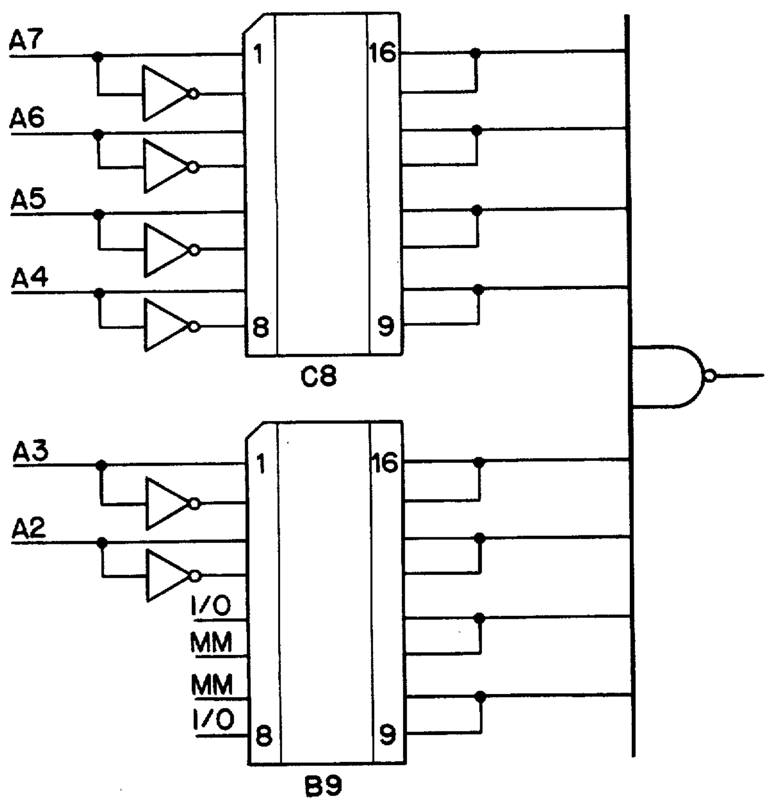
FIG._8G.

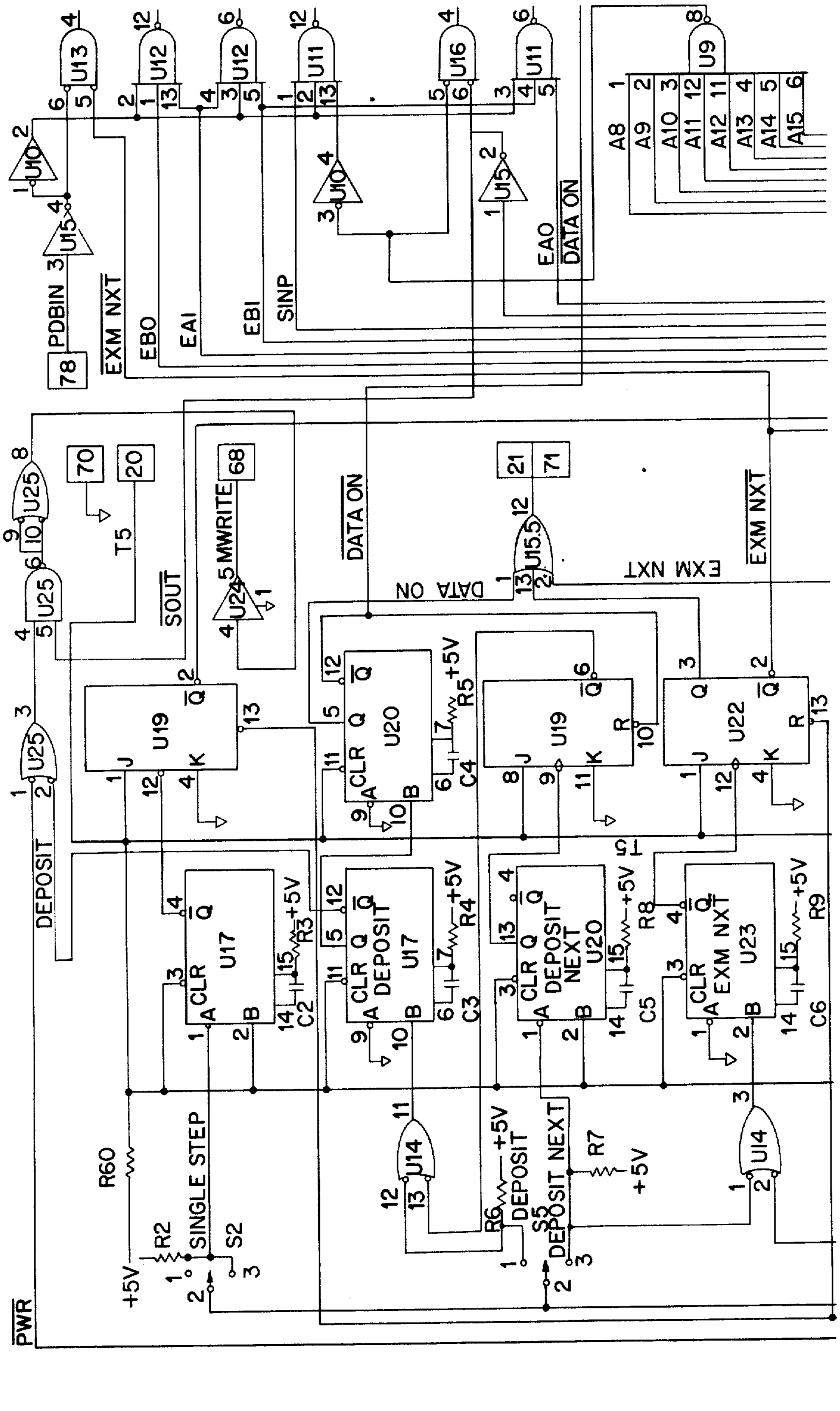
FIG._9A.

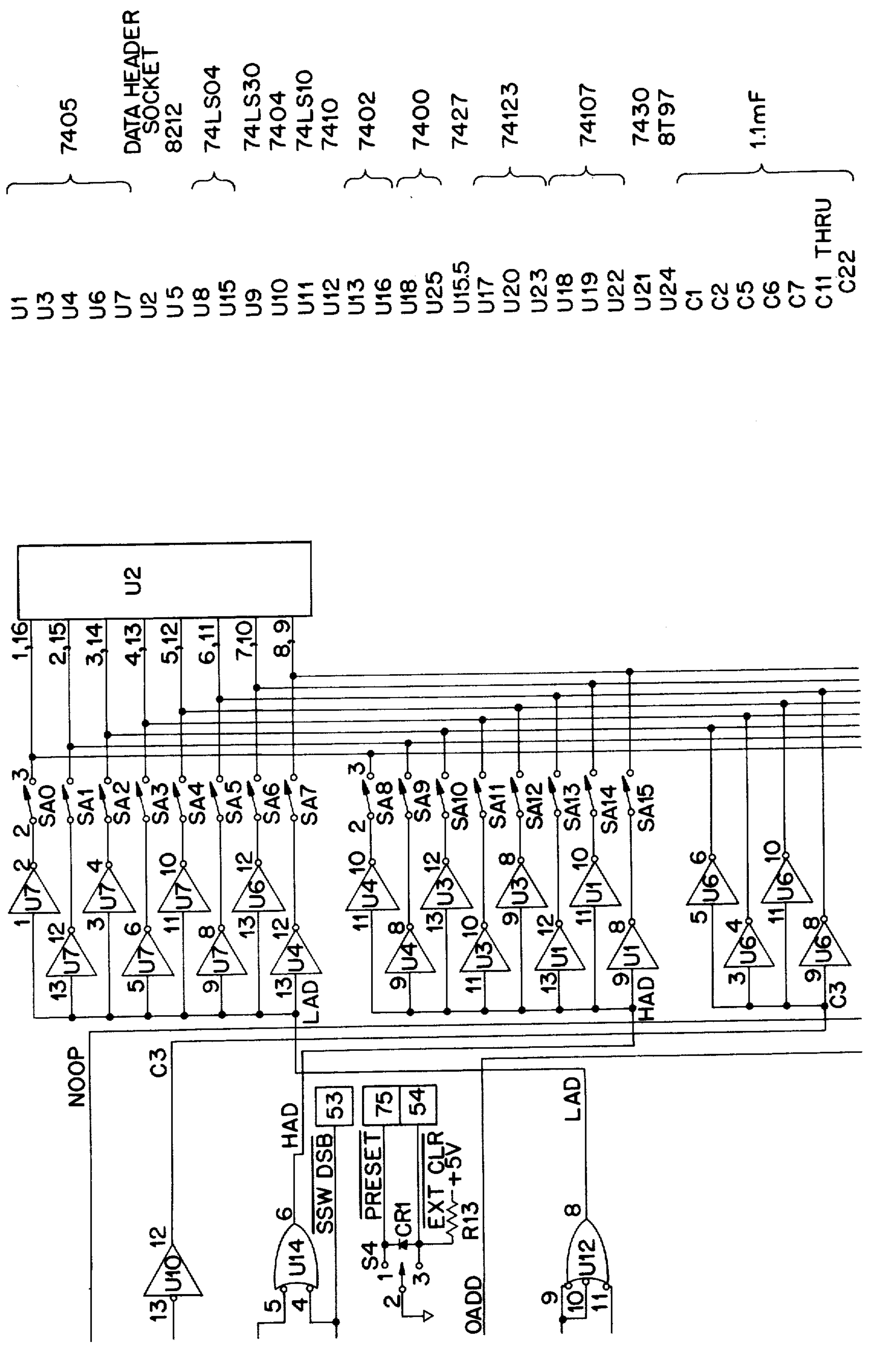
FIG.__9B.

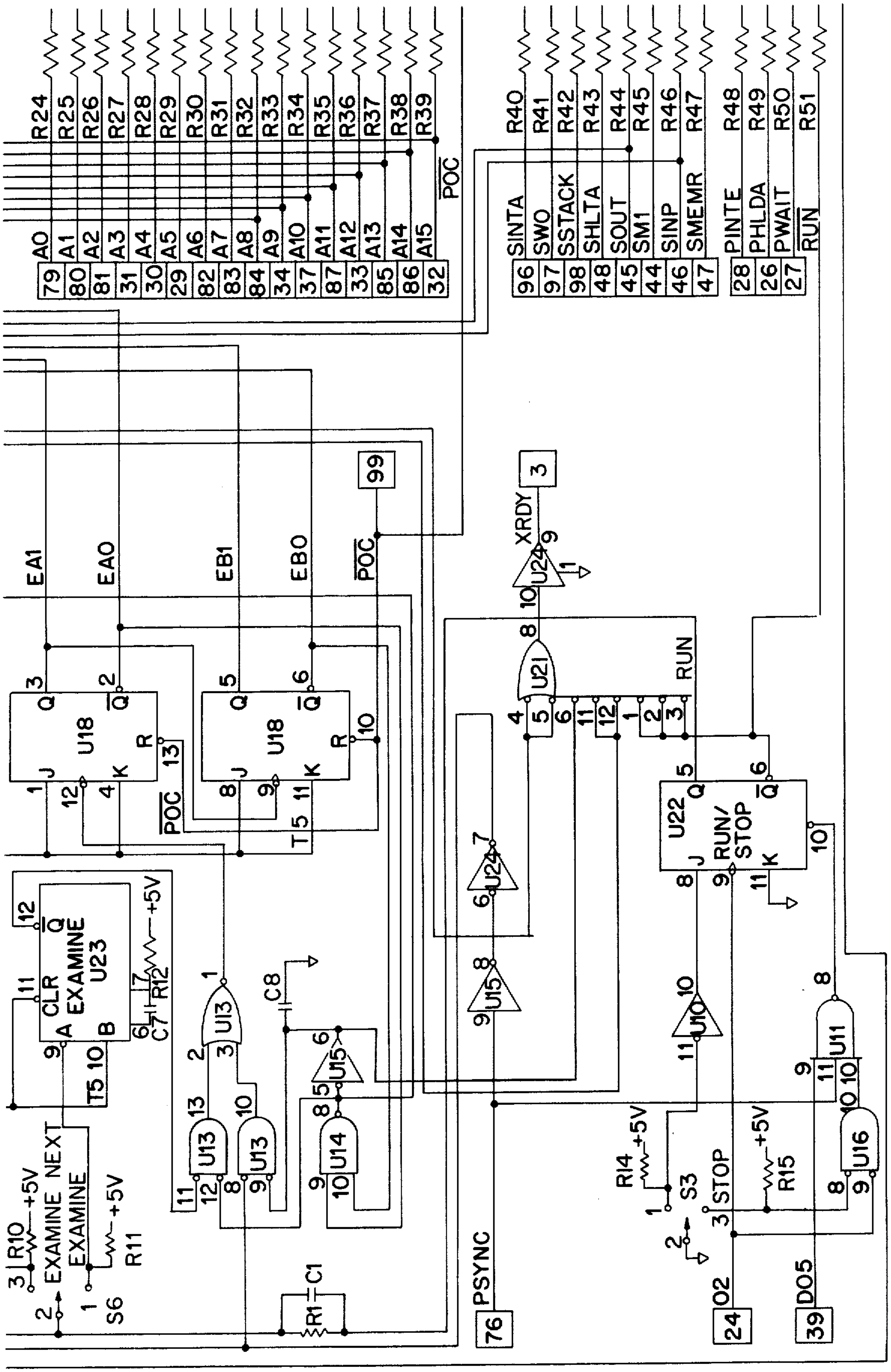
FIG._9C.

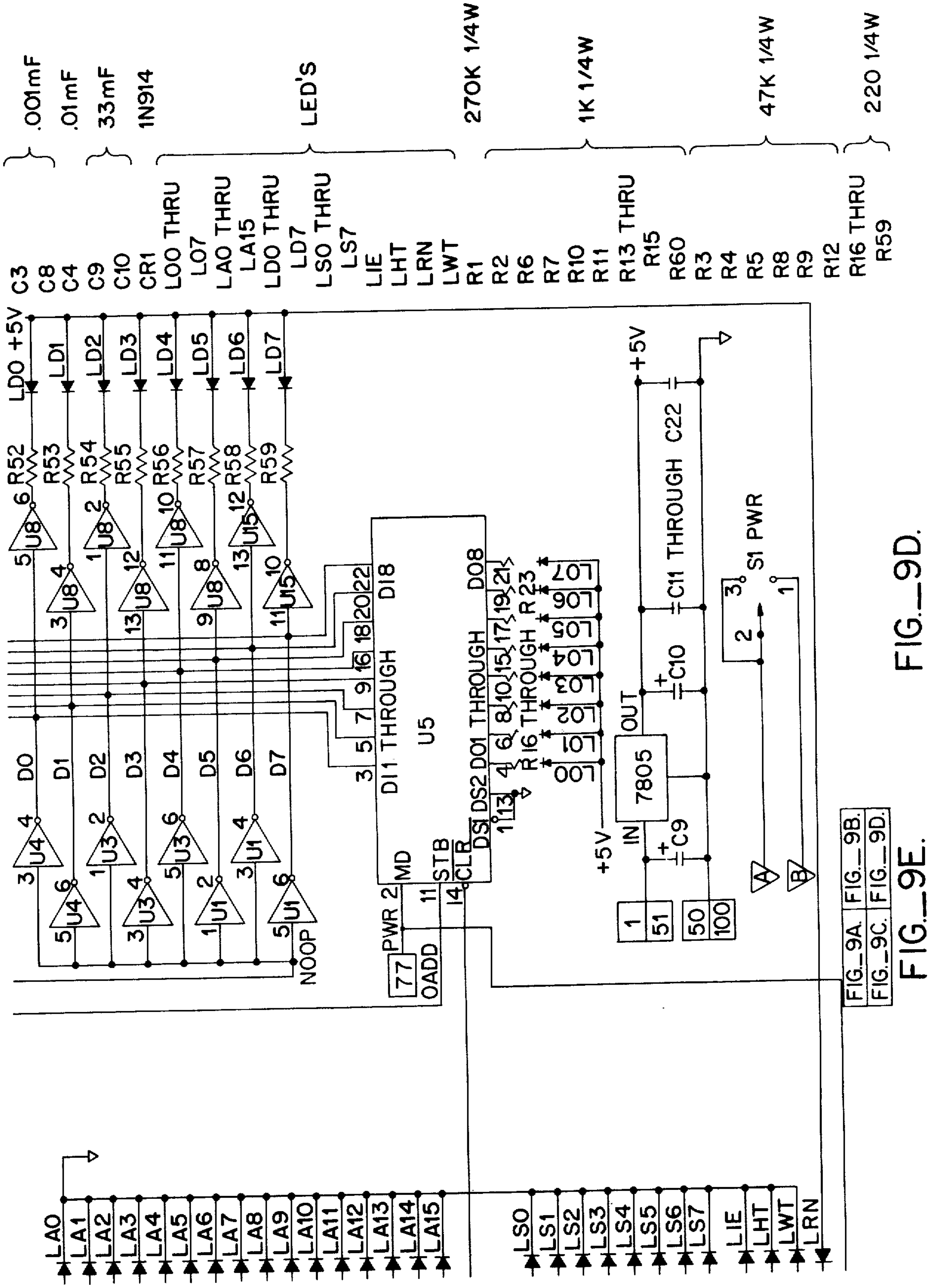
FIG._9D.
FIG._9E.

| | |
|---|---|
| FIG.__11A. | FIG.__11B. |
| FIG.__11C. | FIG.__11D. |
FIG.__11E.
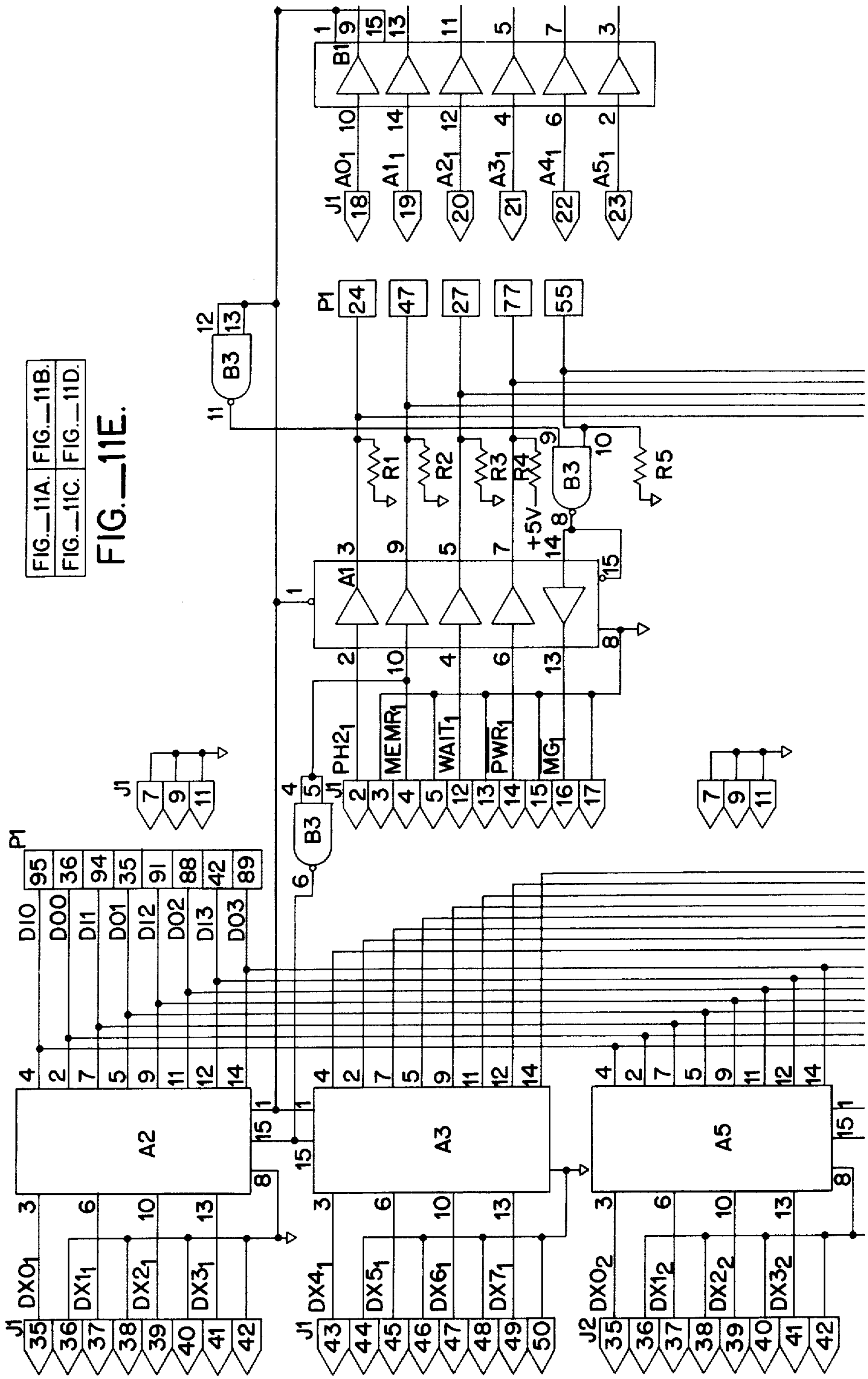
FIG.__11A.

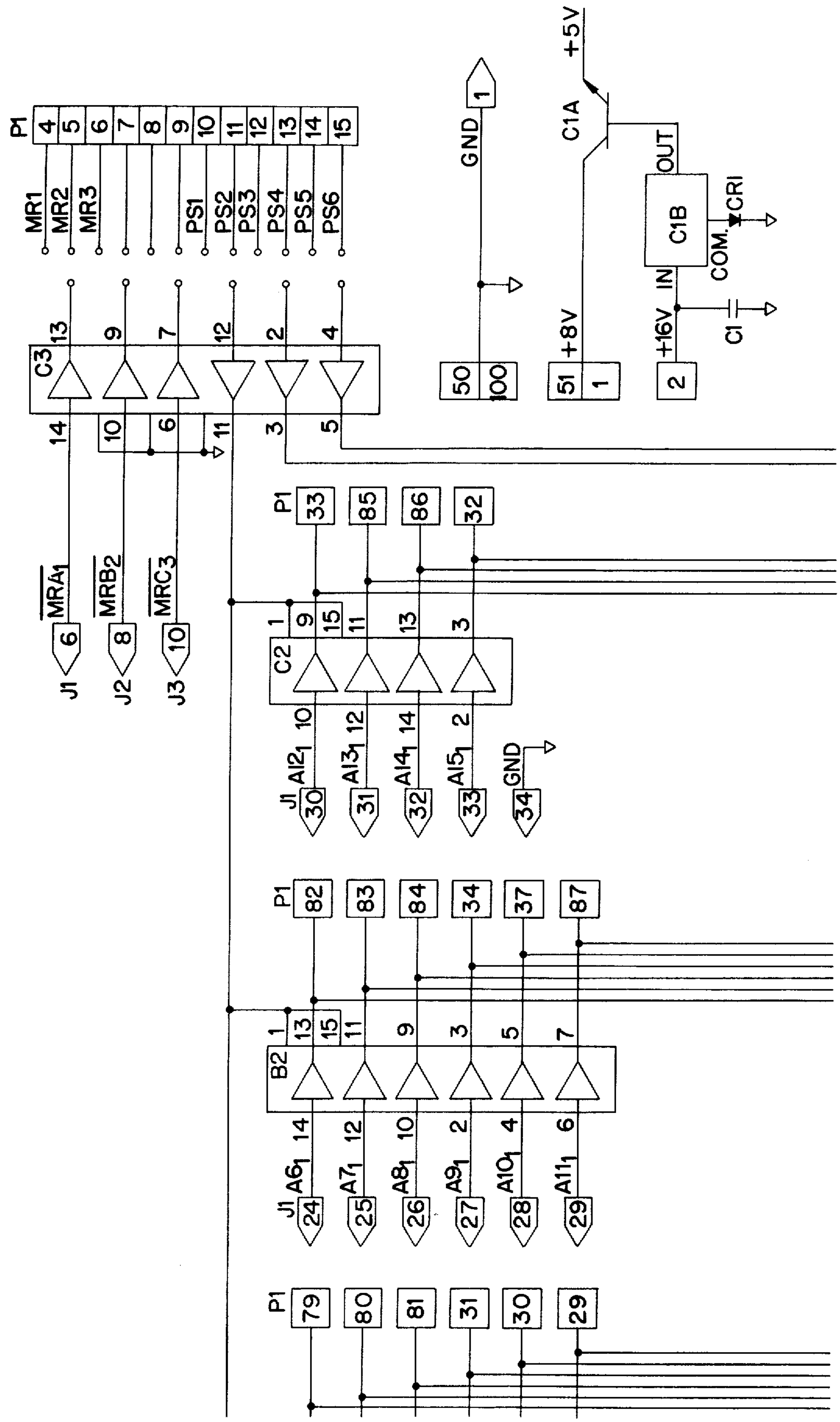
FIG.—11B.

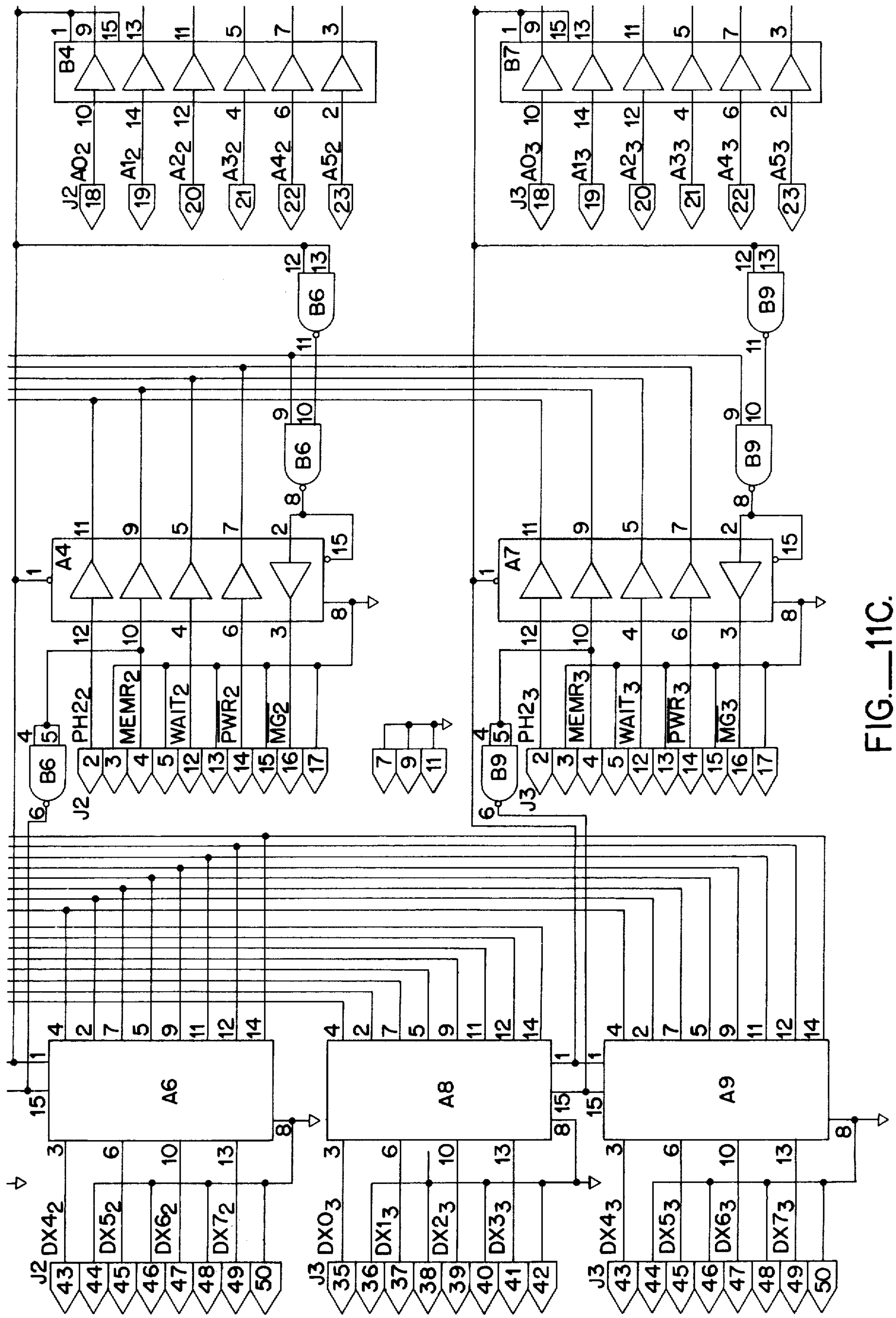
FIG.—11C.

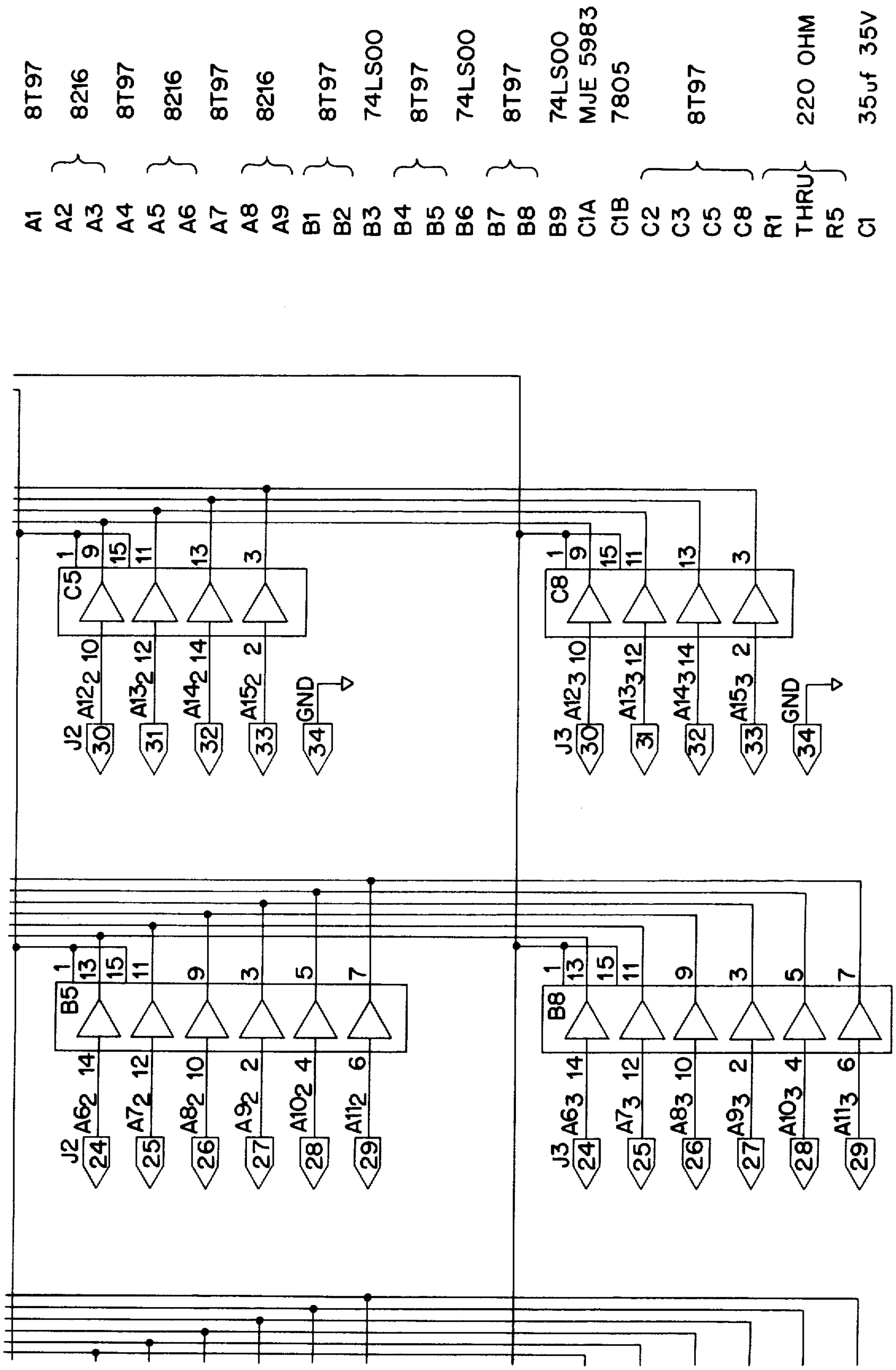
FIG.__11D.

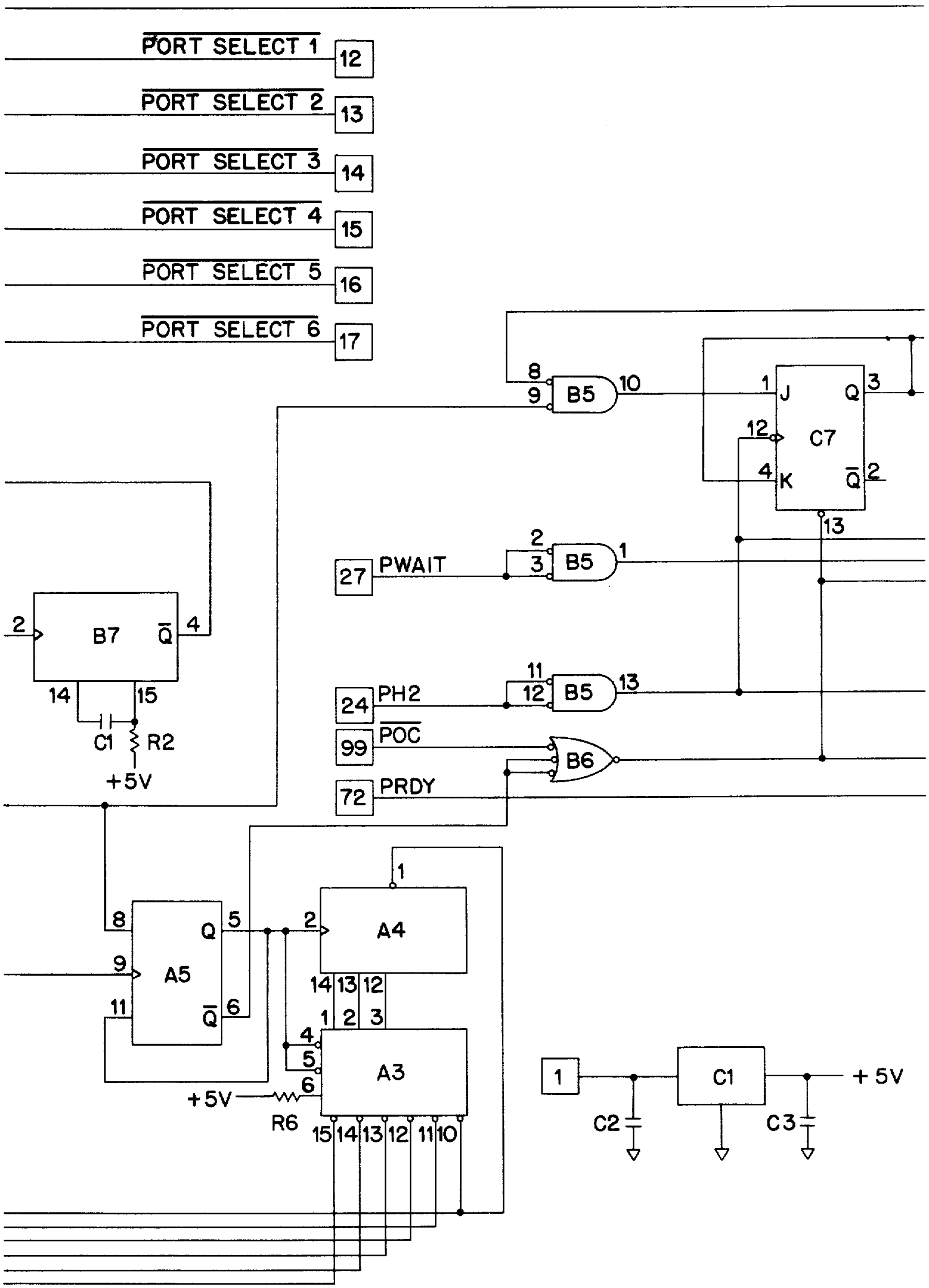
FIG.—12B.

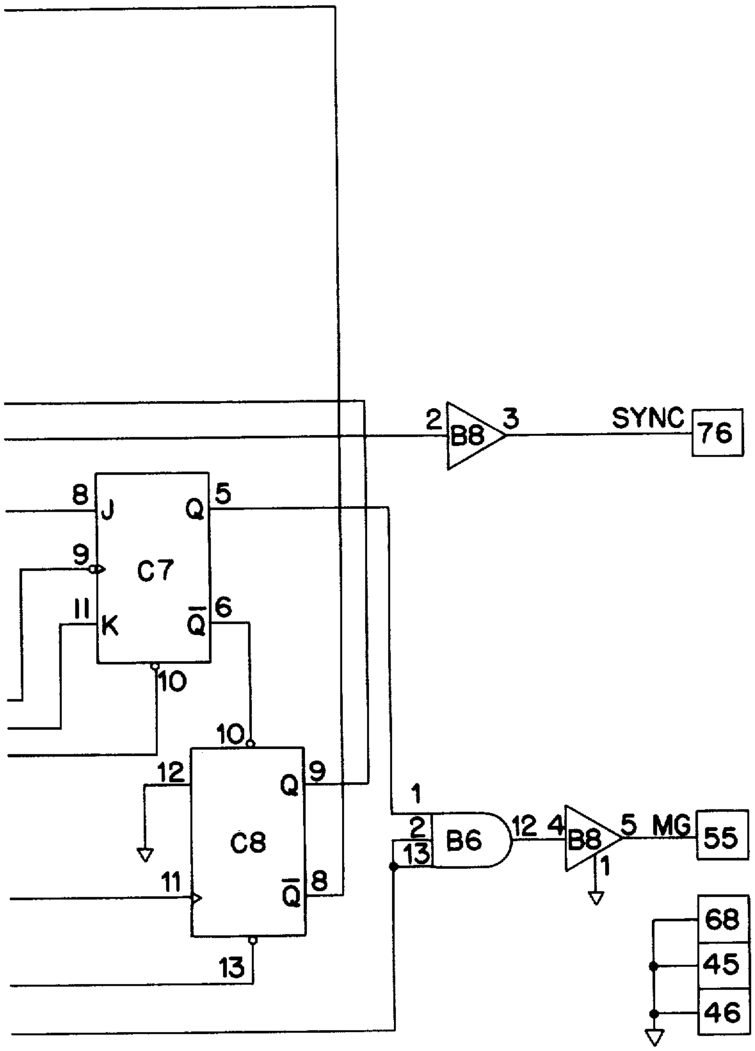
| | |
|---|---|
| A3 | 8205 |
| A4 | 74163 |
| A5 | 74LS107 |
| A6 | 74123 |
| B2 | 74LS08 |
| B3 | 74LS02 |
| B4 | 74LS27 |
| B5 | 74LS02 |
| B6 | 74LS11 |
| B7 | 74123 |
| C1 | 7805 |
| C2 | 74LS08 |
| C3 | 74LS02 |
| C4 | 8T98 |
| C5 | JUMPER SOCKET |
| C6 | 74LS30 |
| C7 | 74LS107 |
| C8 | 74LS74 |
| R1 | 1K |
| R2 | 10K |
| R3, R4 | 4.7K |
| R5, R6 | 1K |
| C1 | 470 pf |
| C2, C3 | 33uf |
FIG._12C.
| FIG._12A. | FIG._12B. | FIG._12C. |
|---|---|---|
FIG._12D.

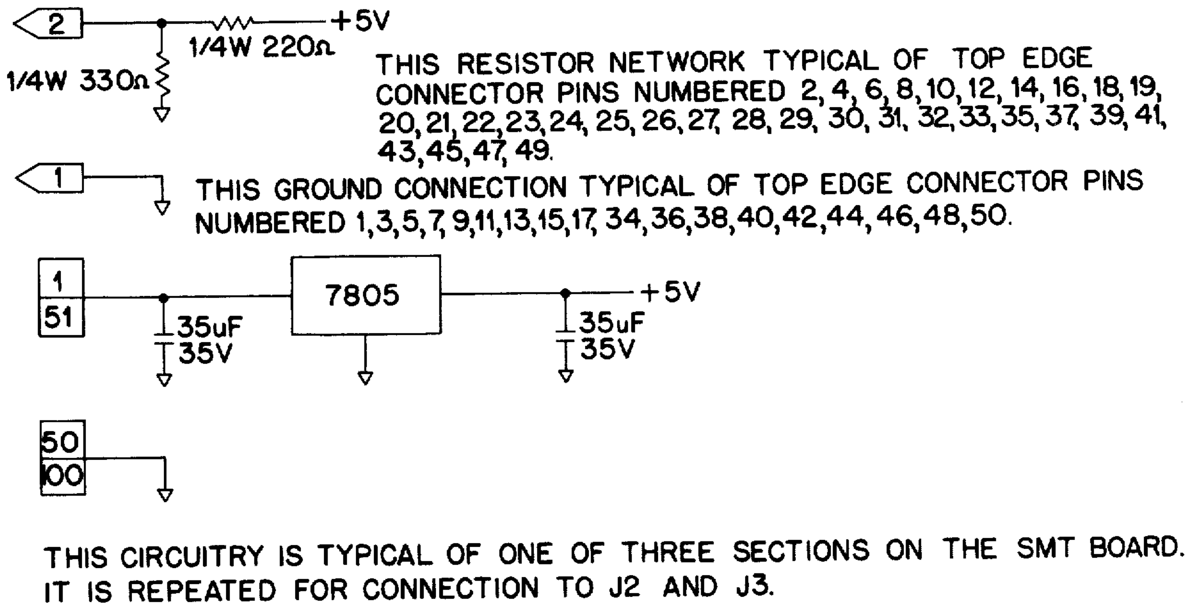
FIG._13.
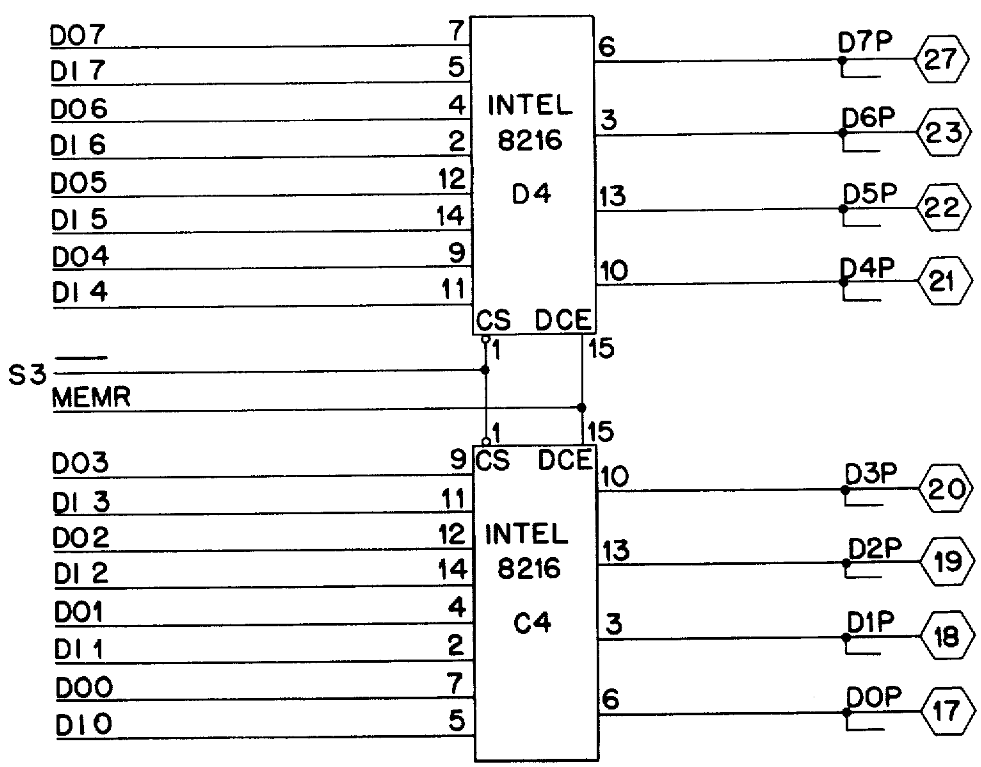
FIG._17.

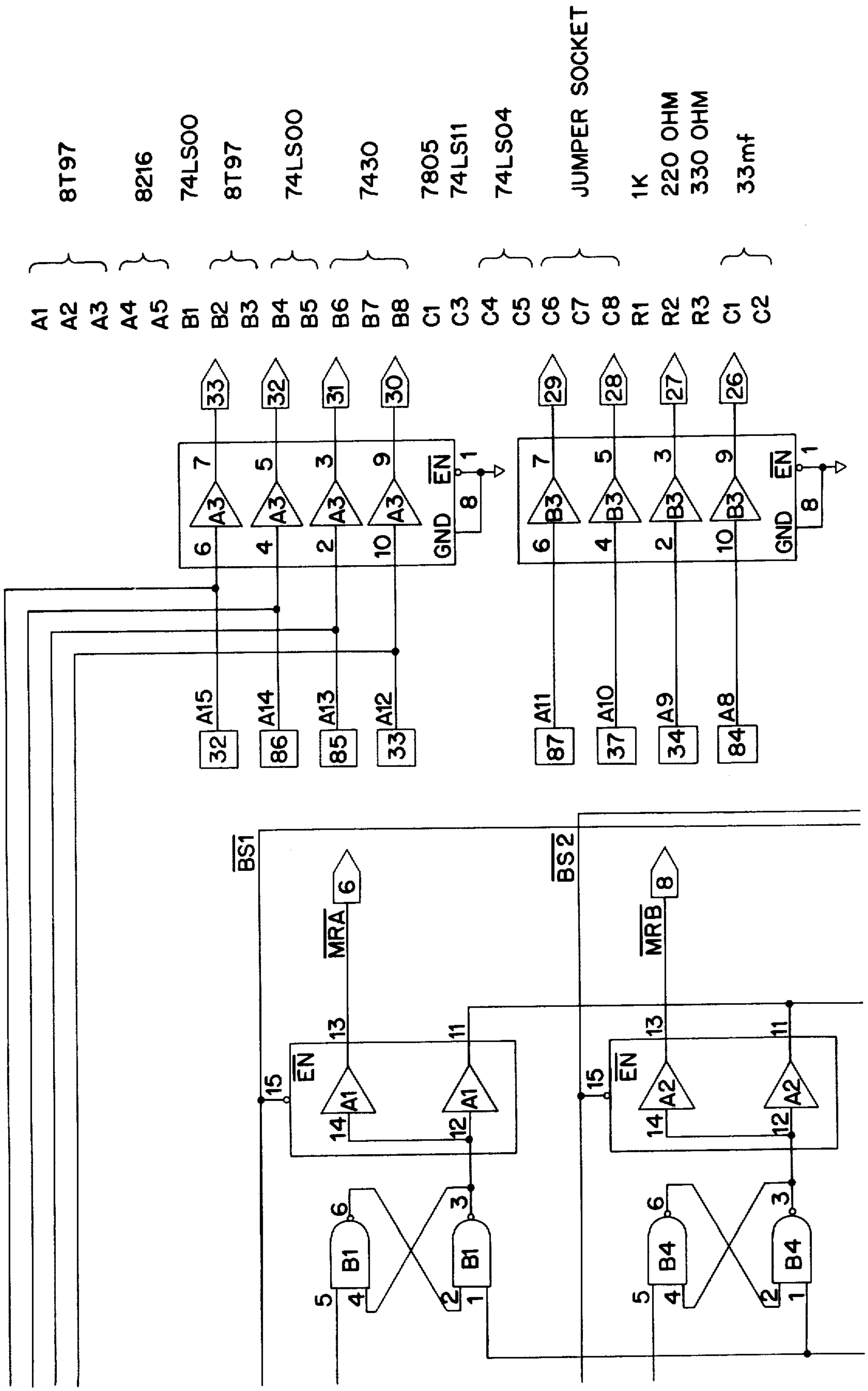
FIG._14B.

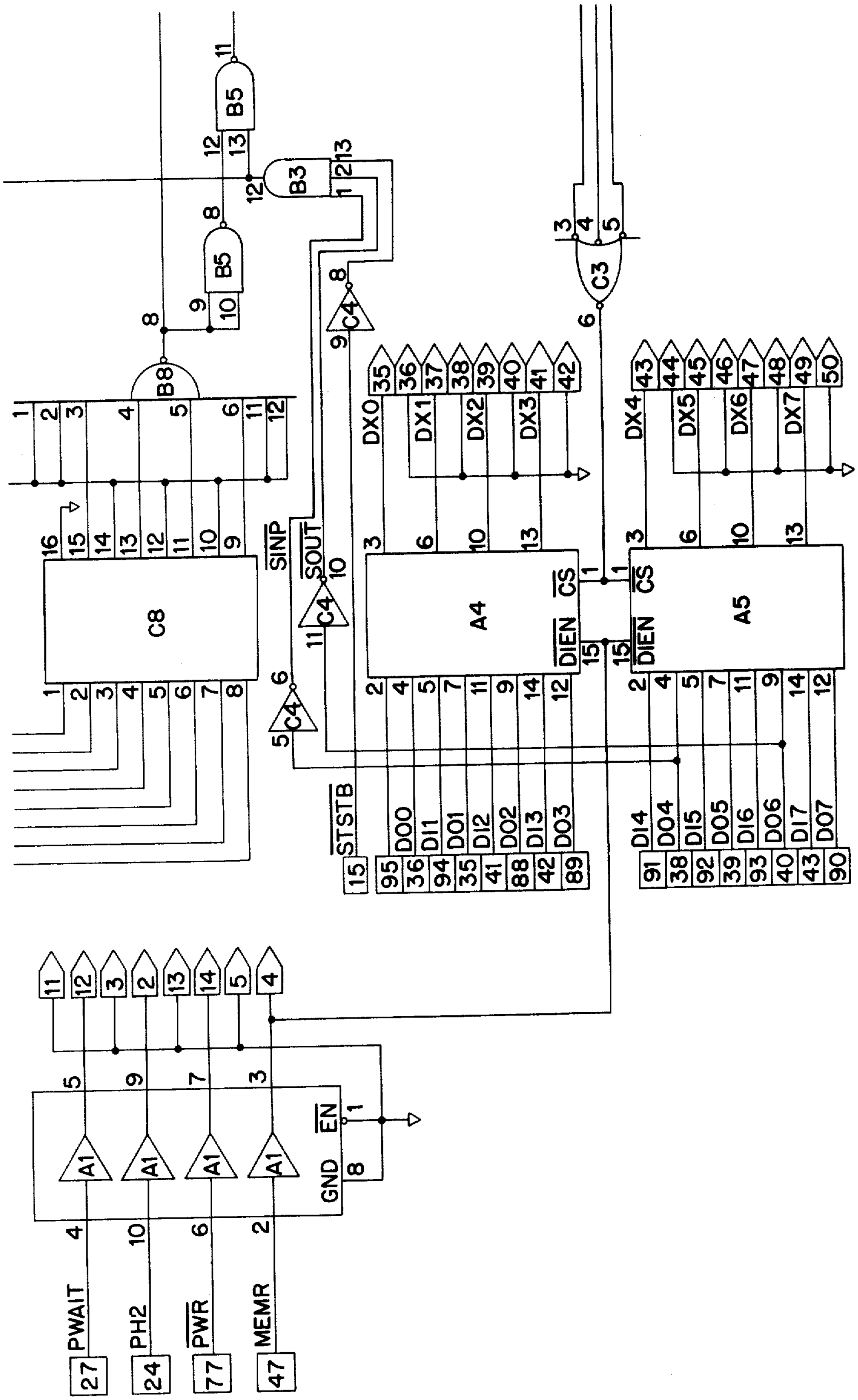
FIG.—14C.

| | |
|---|---|
| FIG._14A. | FIG._14B. |
| FIG._14C. | FIG._14D. |
FIG._14E.
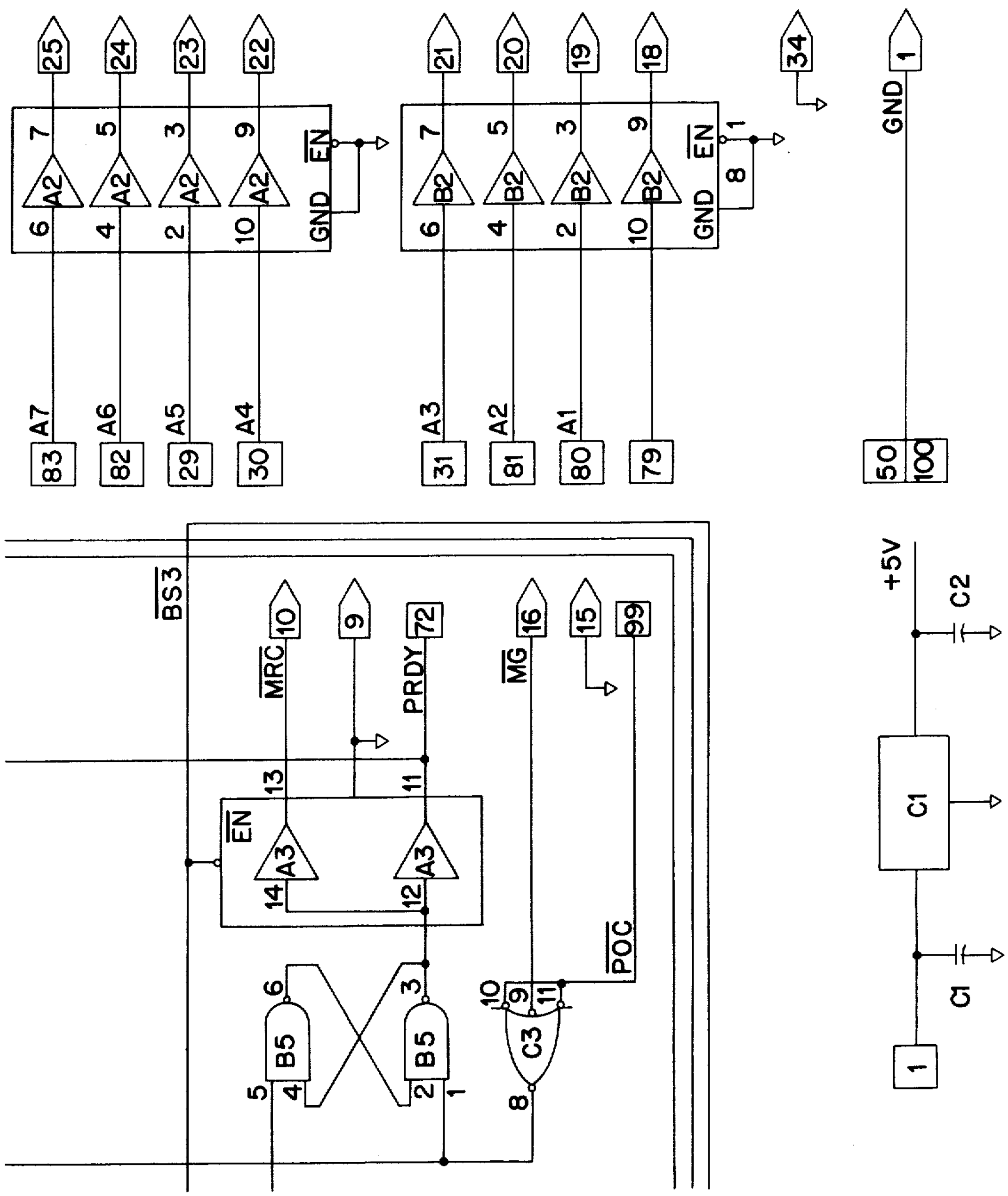
FIG._14D.

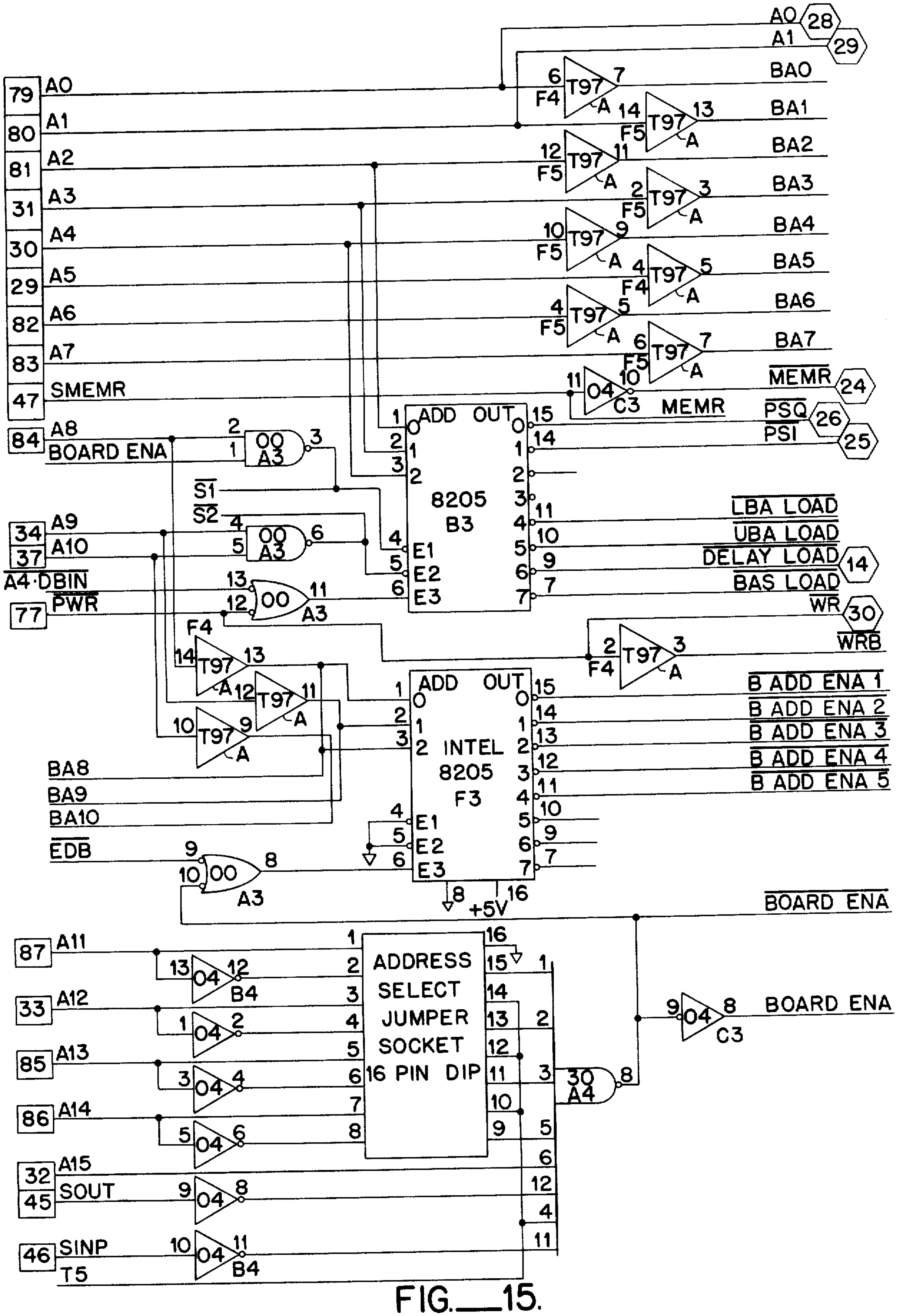
FIG.—15.

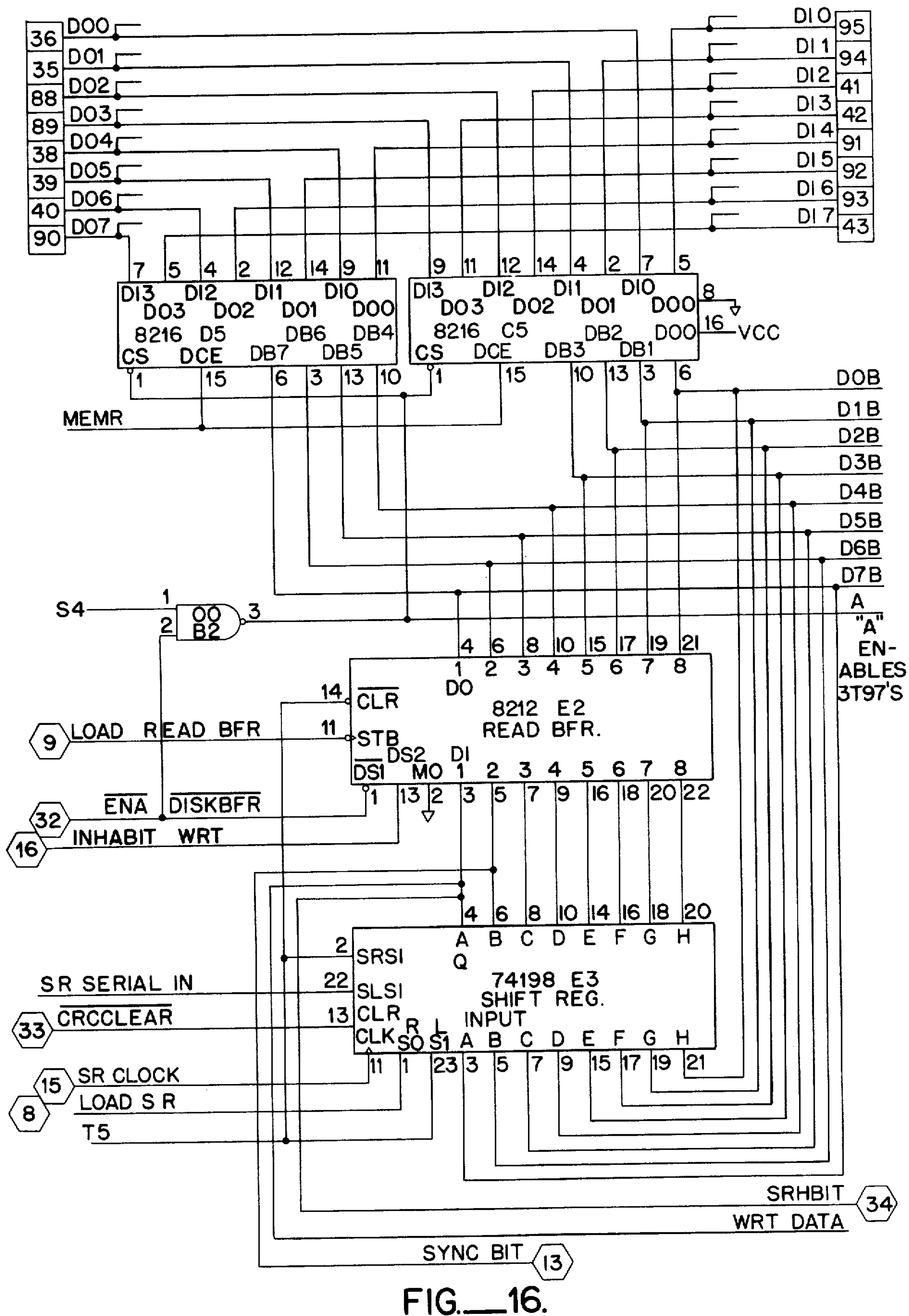
FIG.—16.

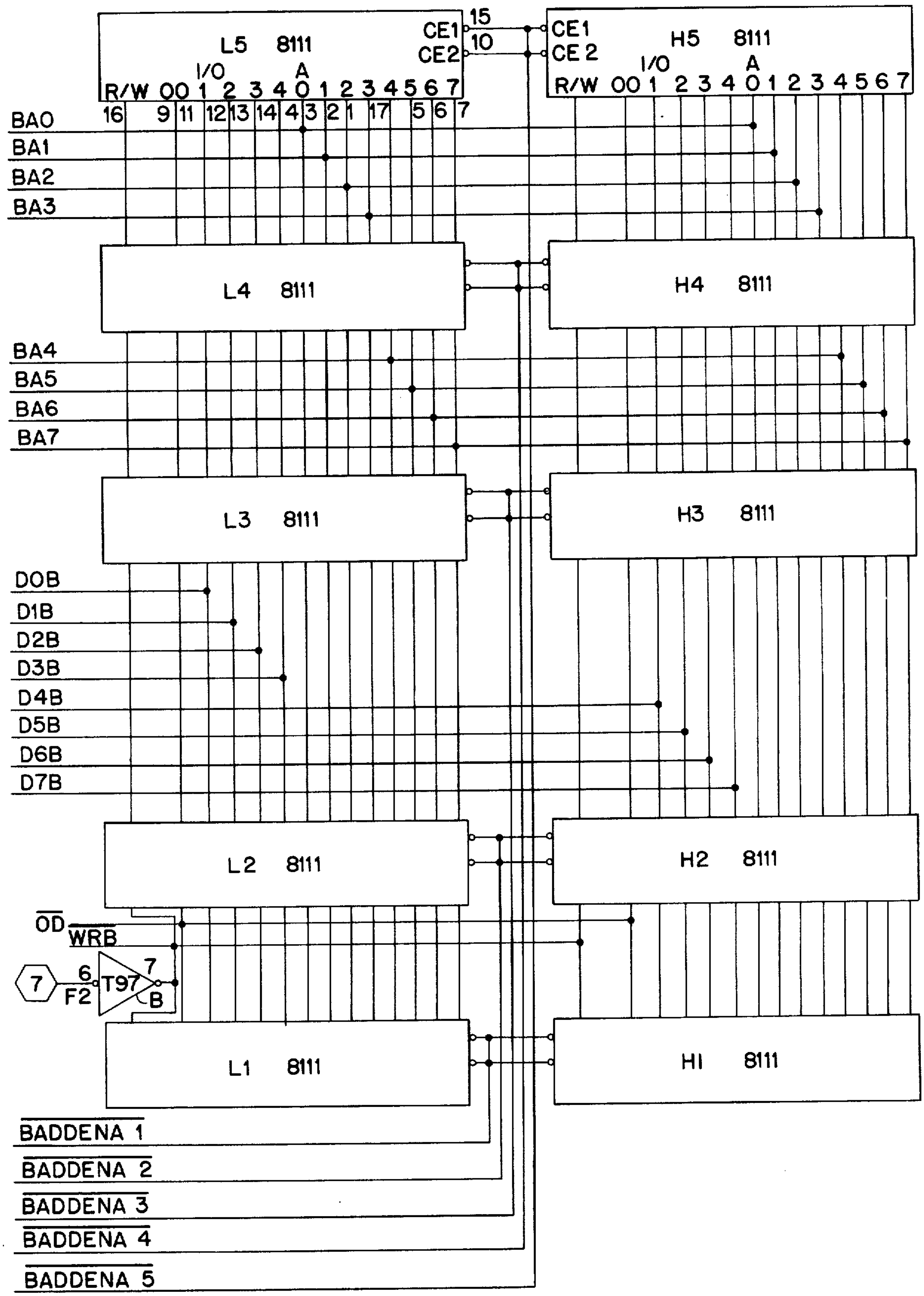
FIG.—18.

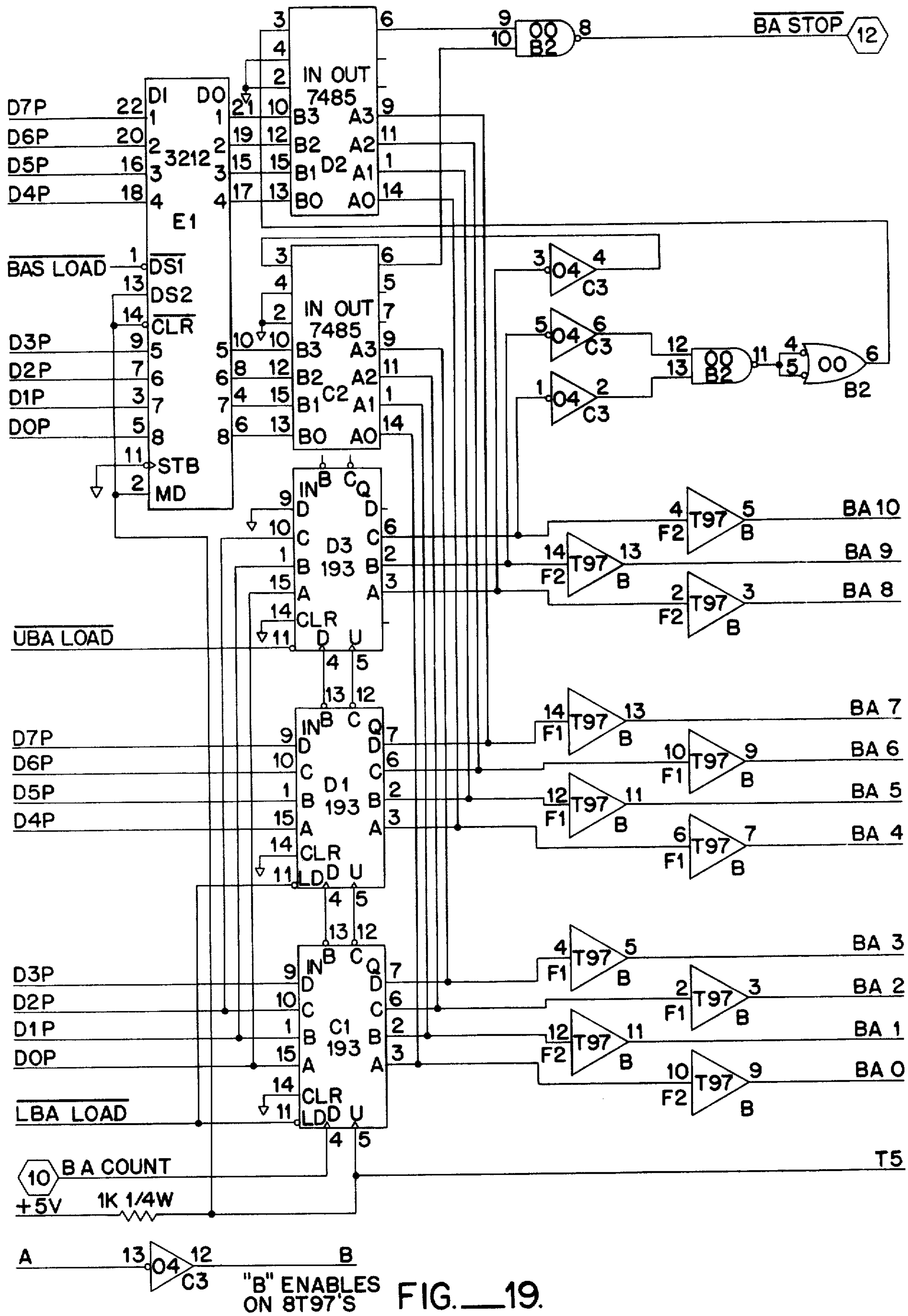
FIG._19.

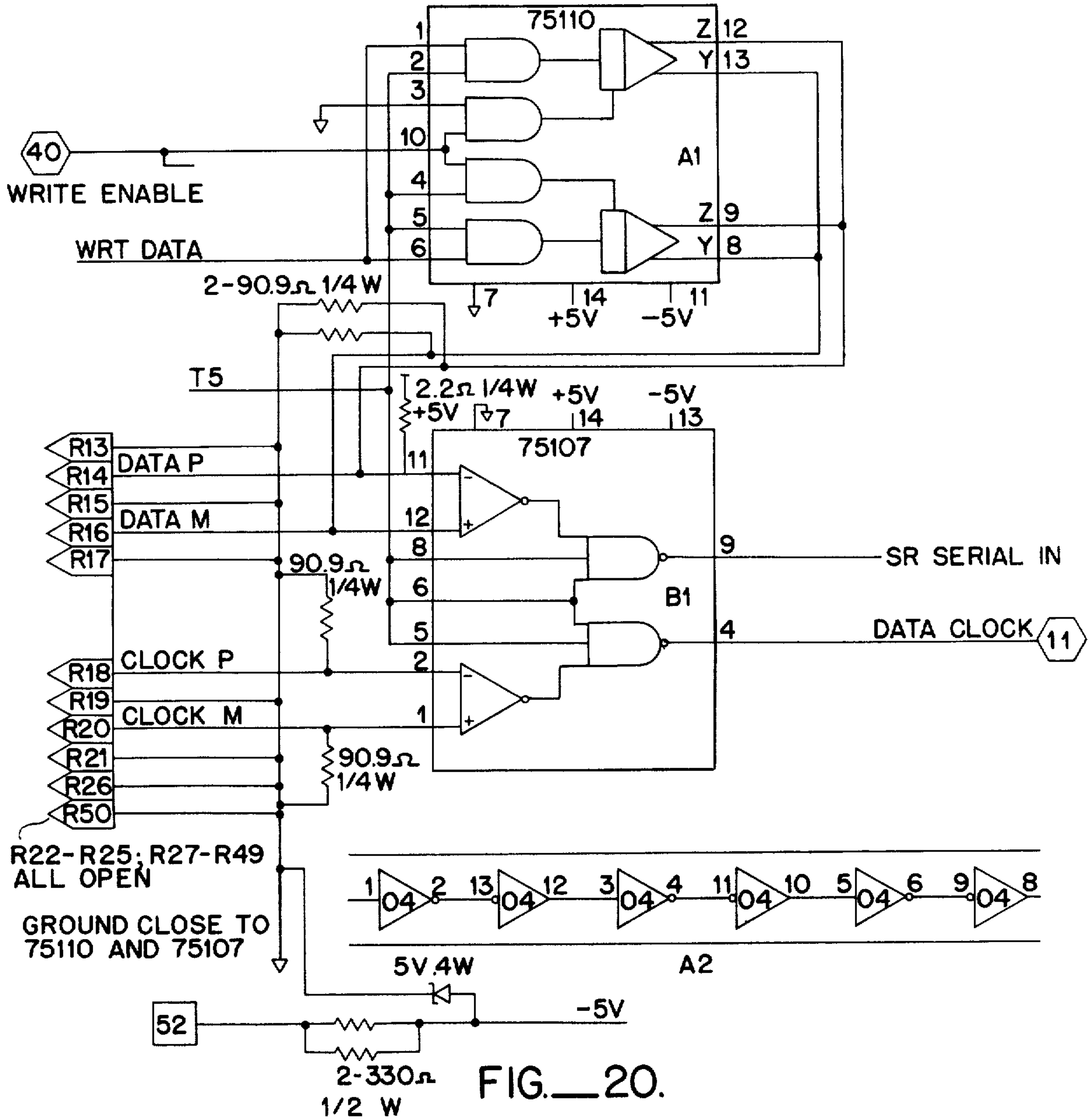
FIG.__20.
NOTE: 1 SECTION OF 8T97 // DO NOT USE ANY OF THE REMAINING 5 SECTIONS. LEAVE VACANT.
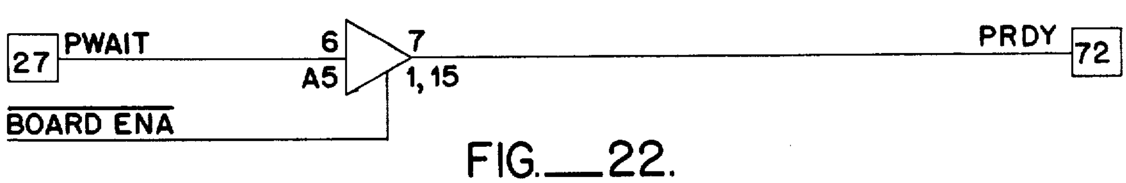
FIG.__22.

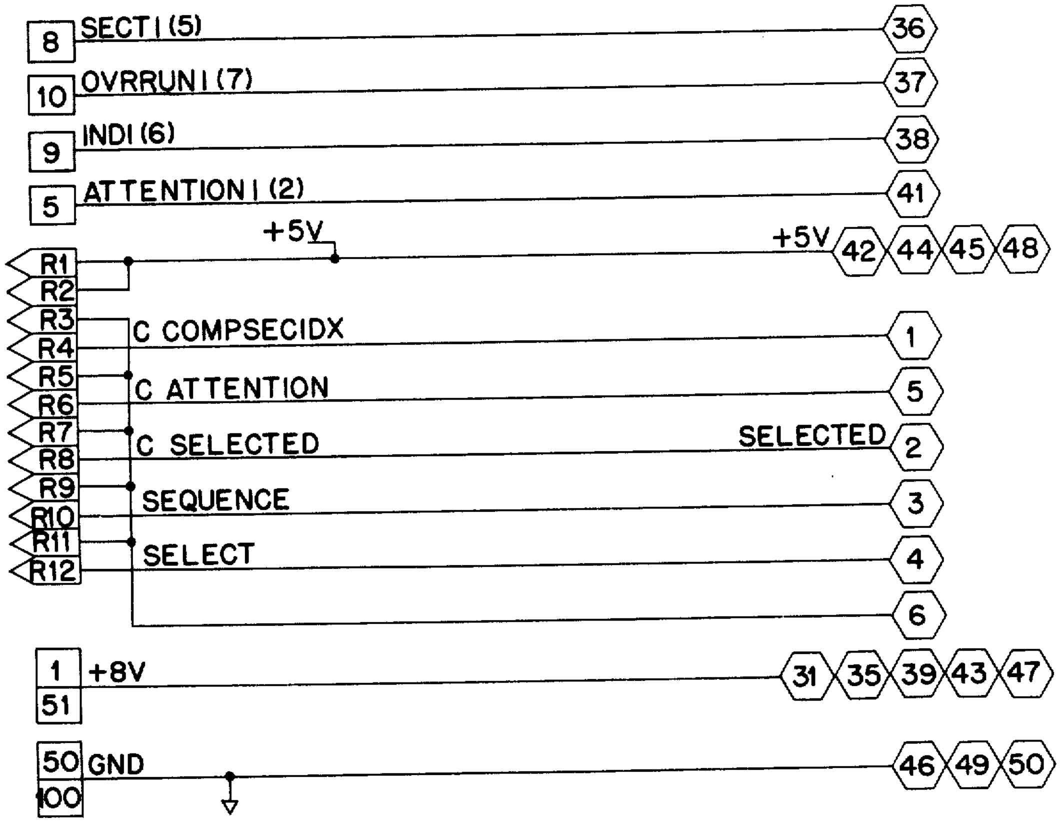
FIG.—21.
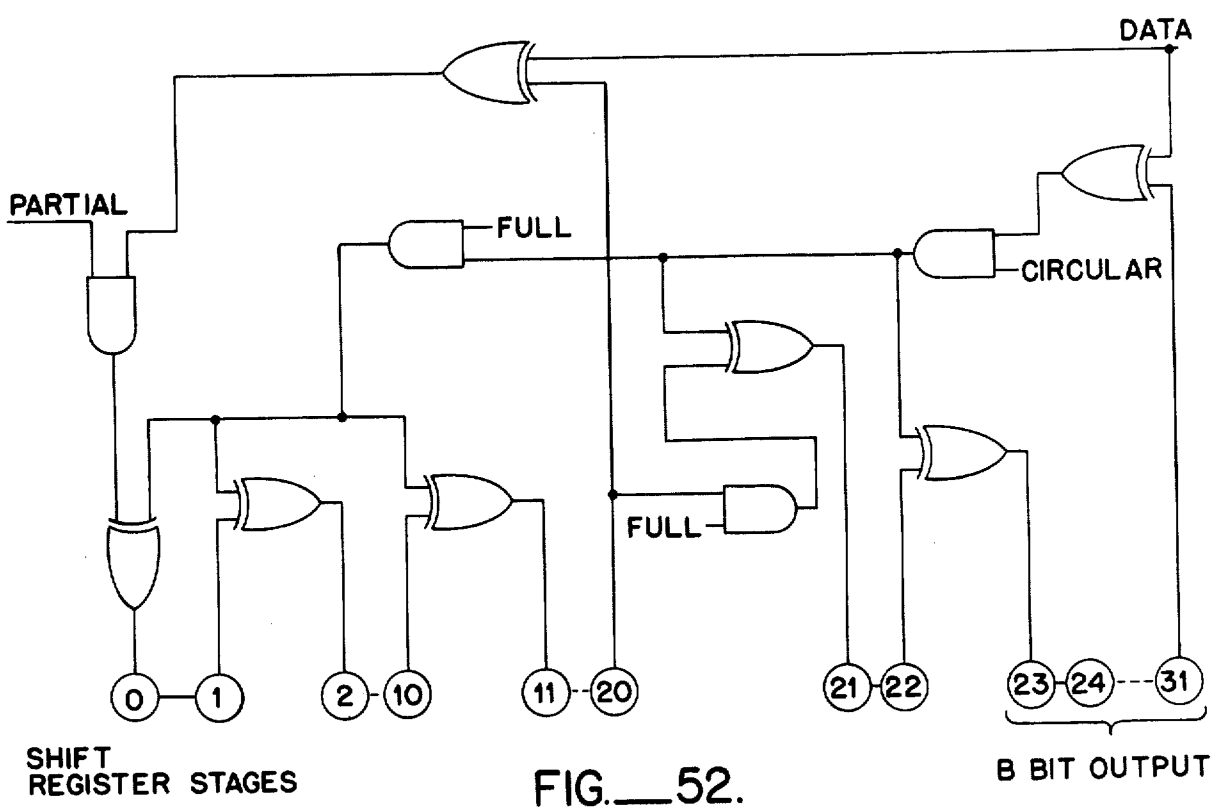
FIG.—52.

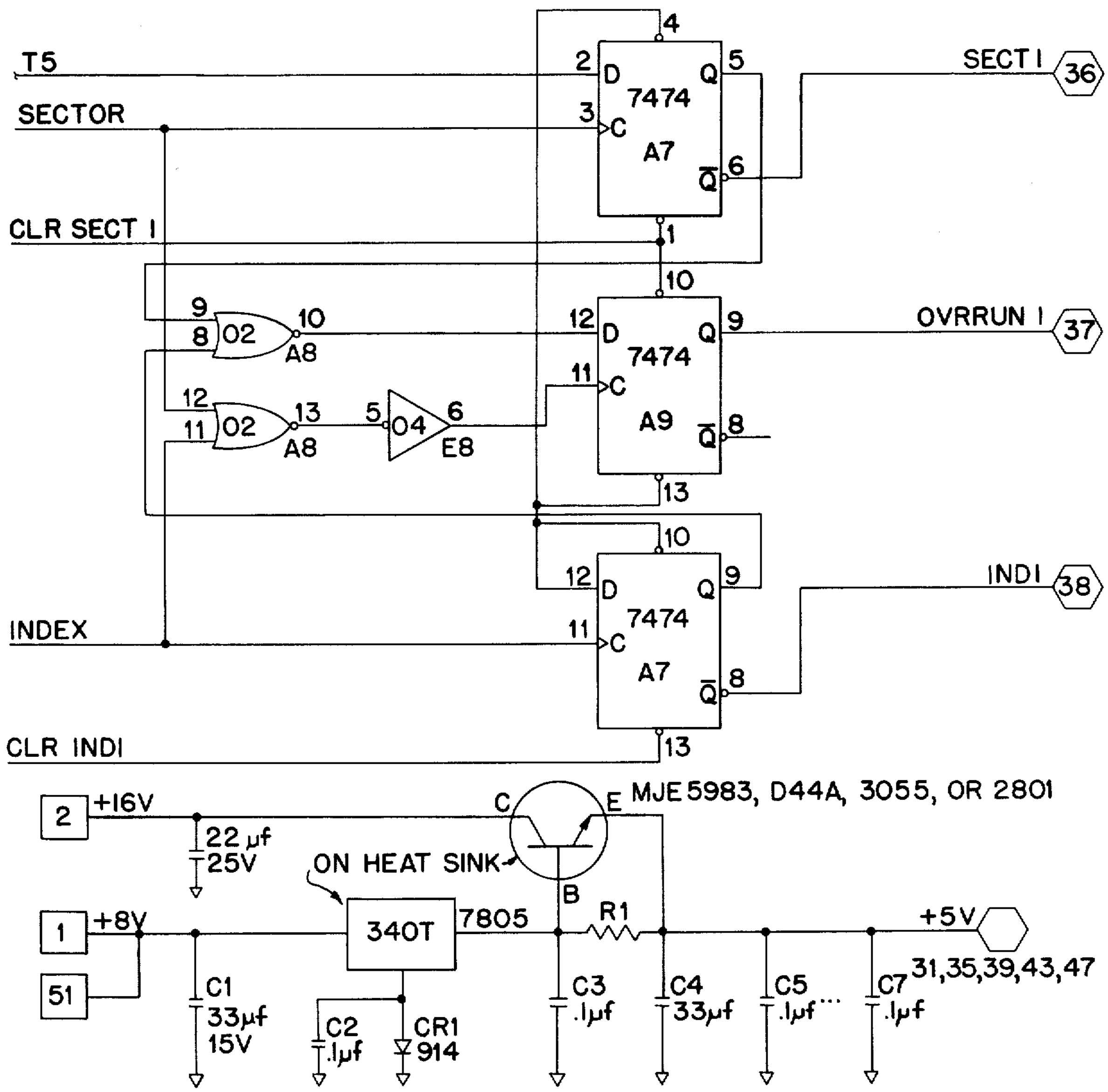
FIG._23.
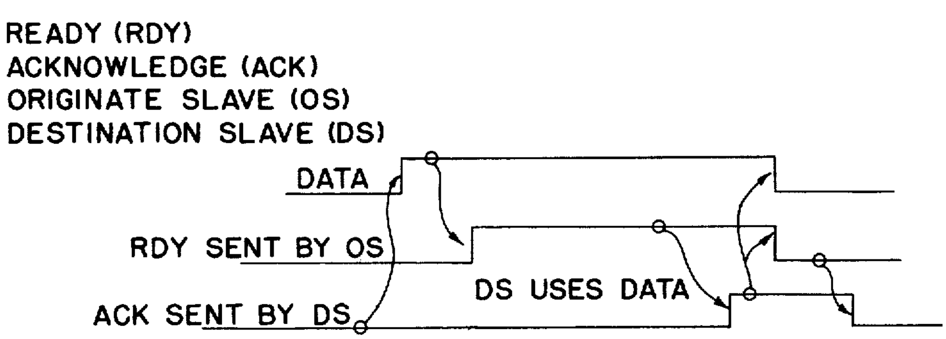
FIG._57.

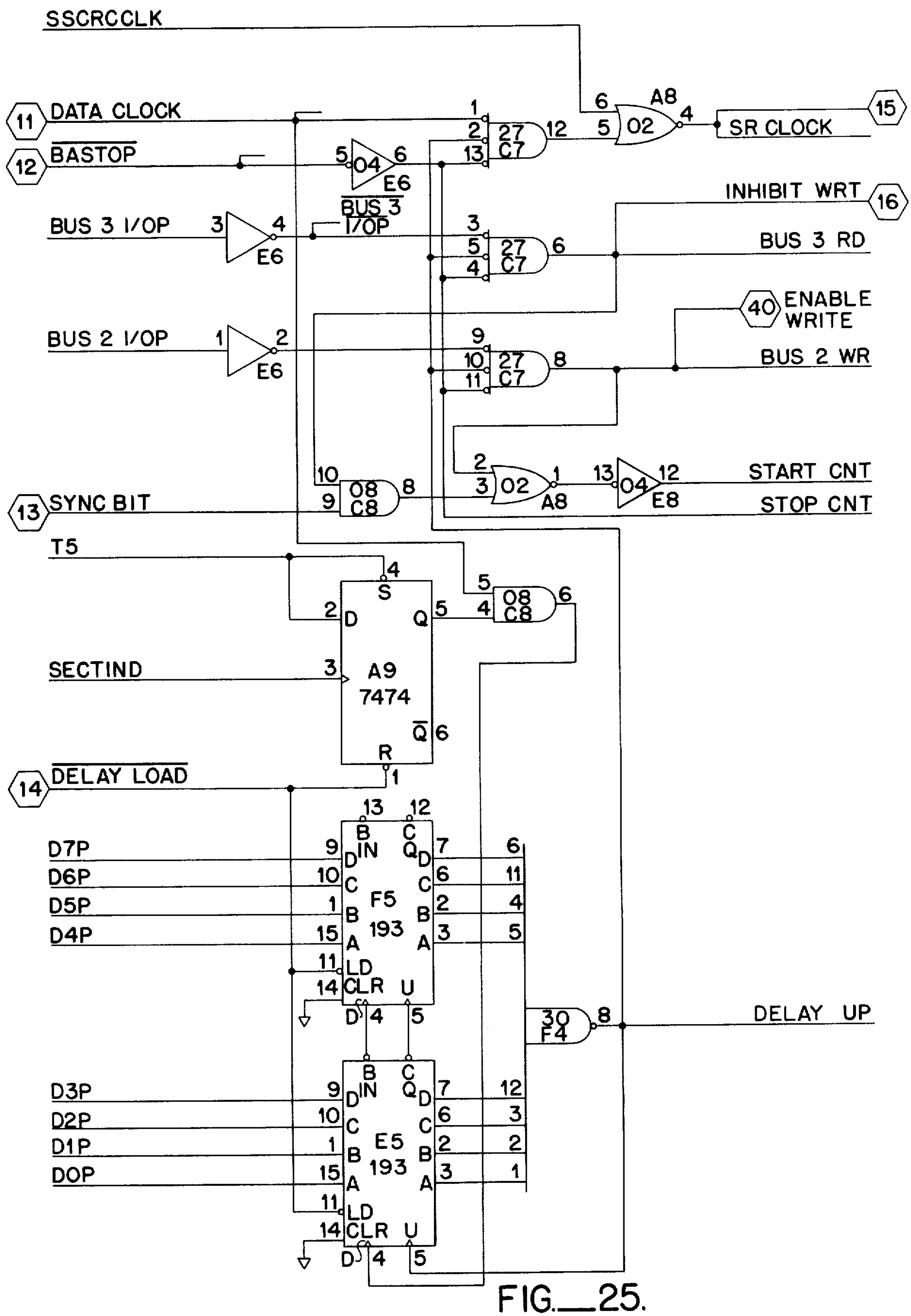
FIG._25.

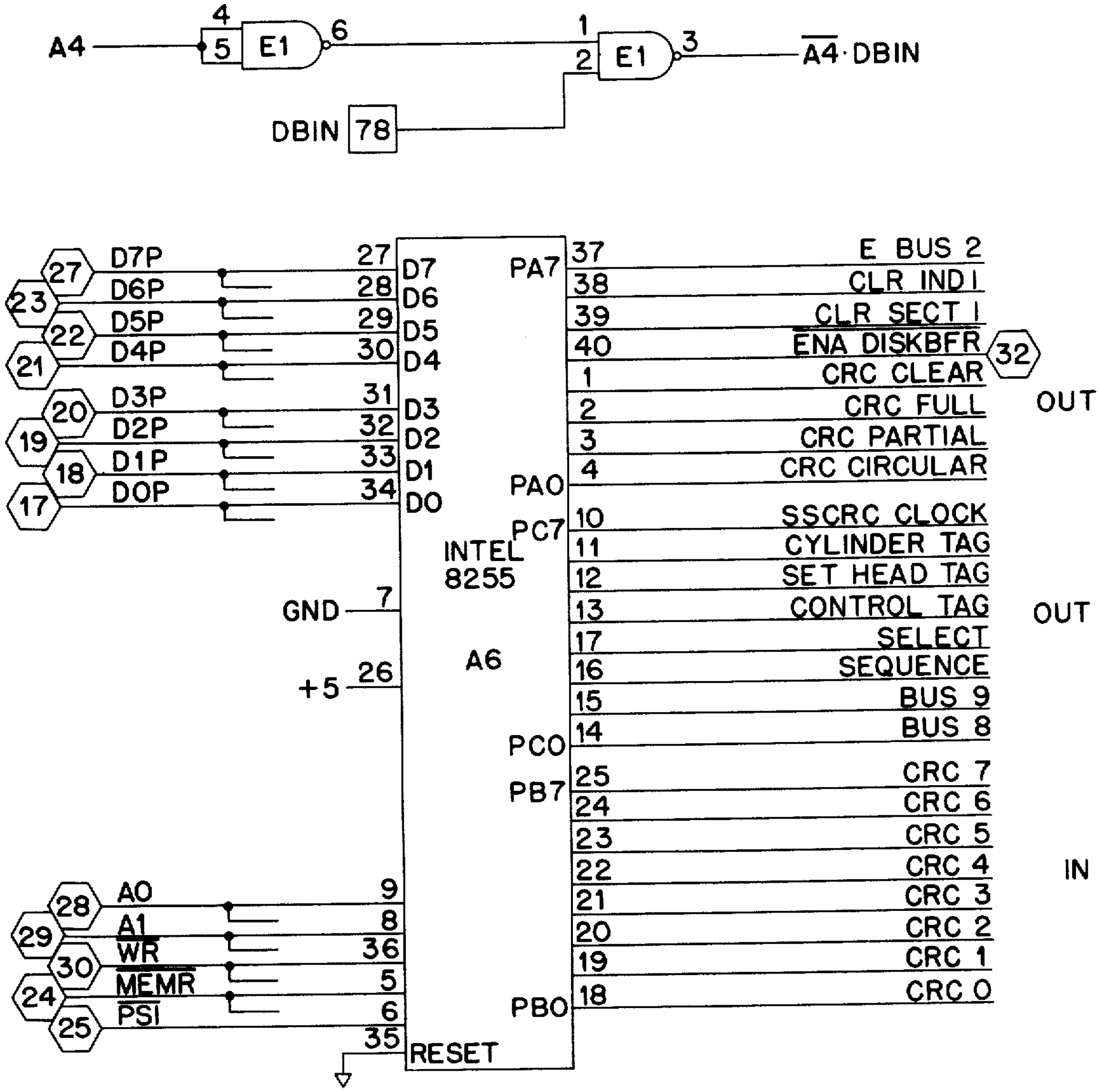
FIG.__26.
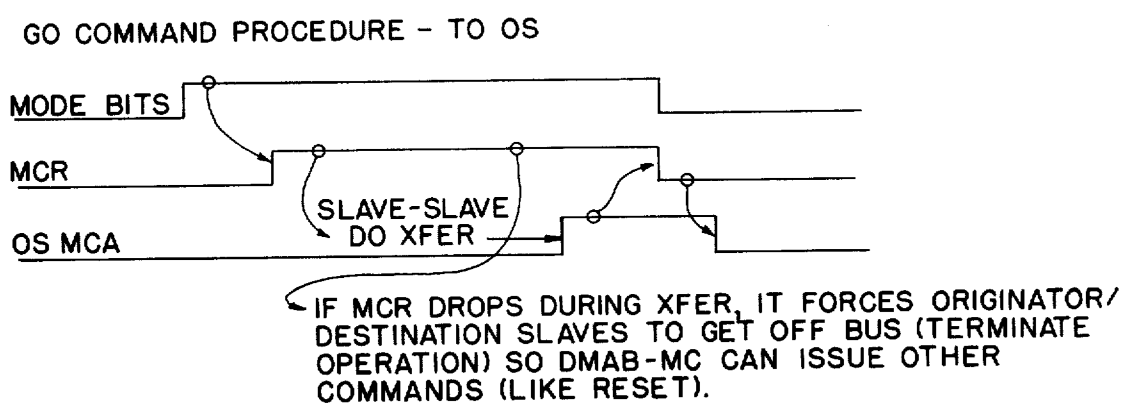
FIG.__58.

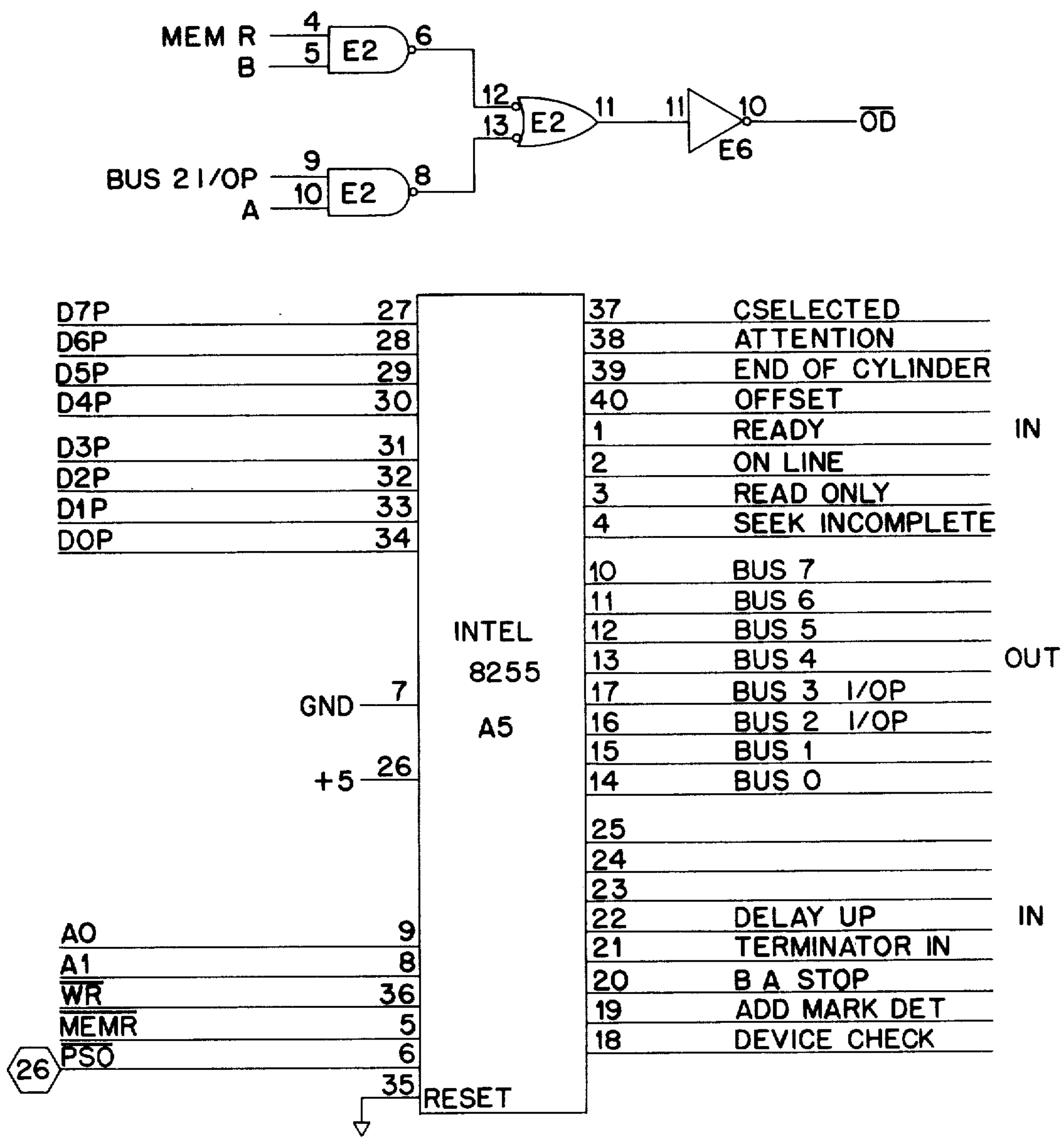
FIG.__27.
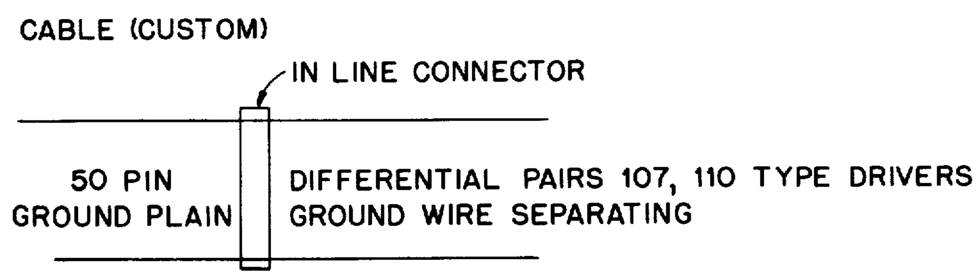
FIG.__60.

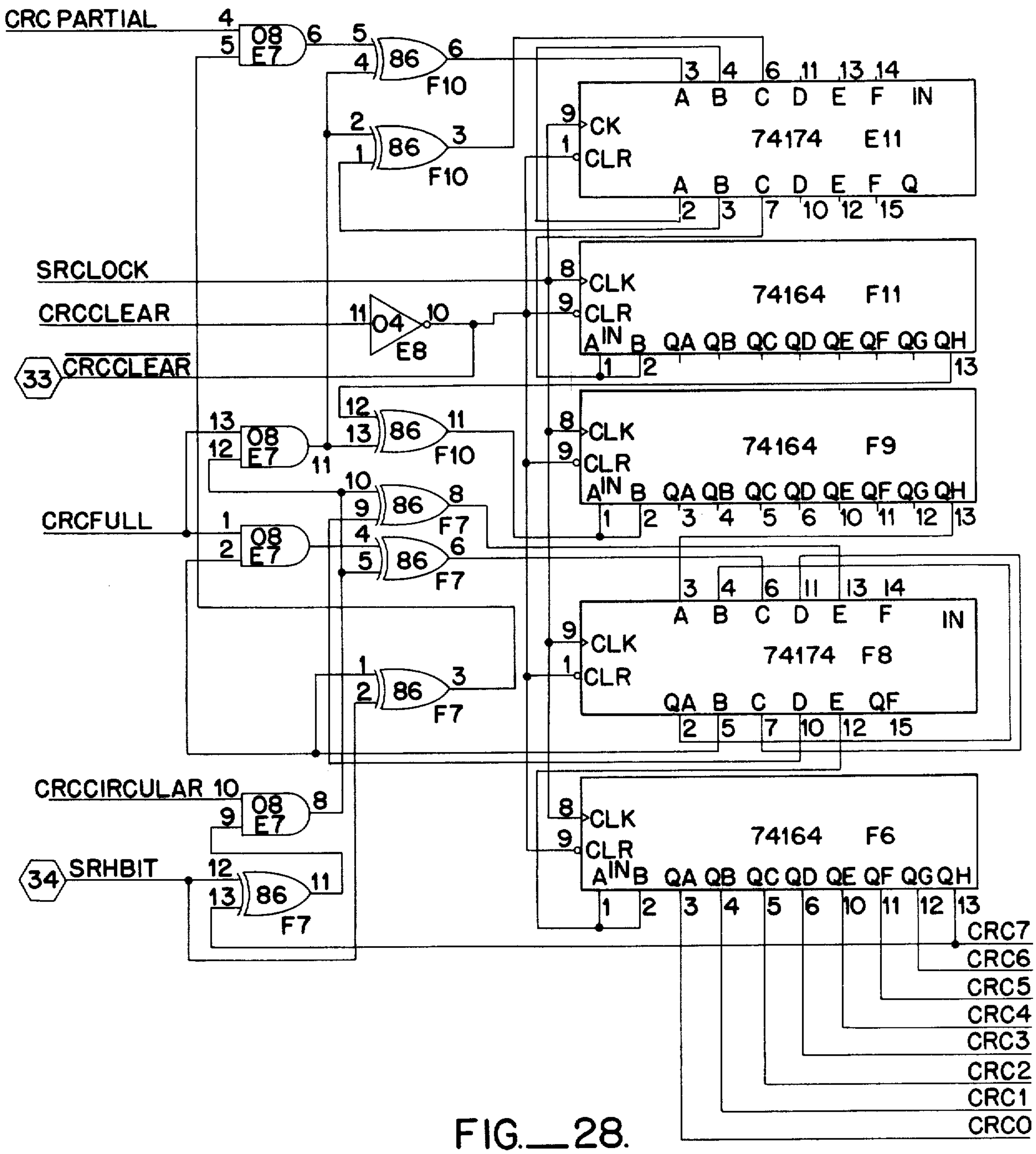
FIG.__28.

CABLE INPUTS
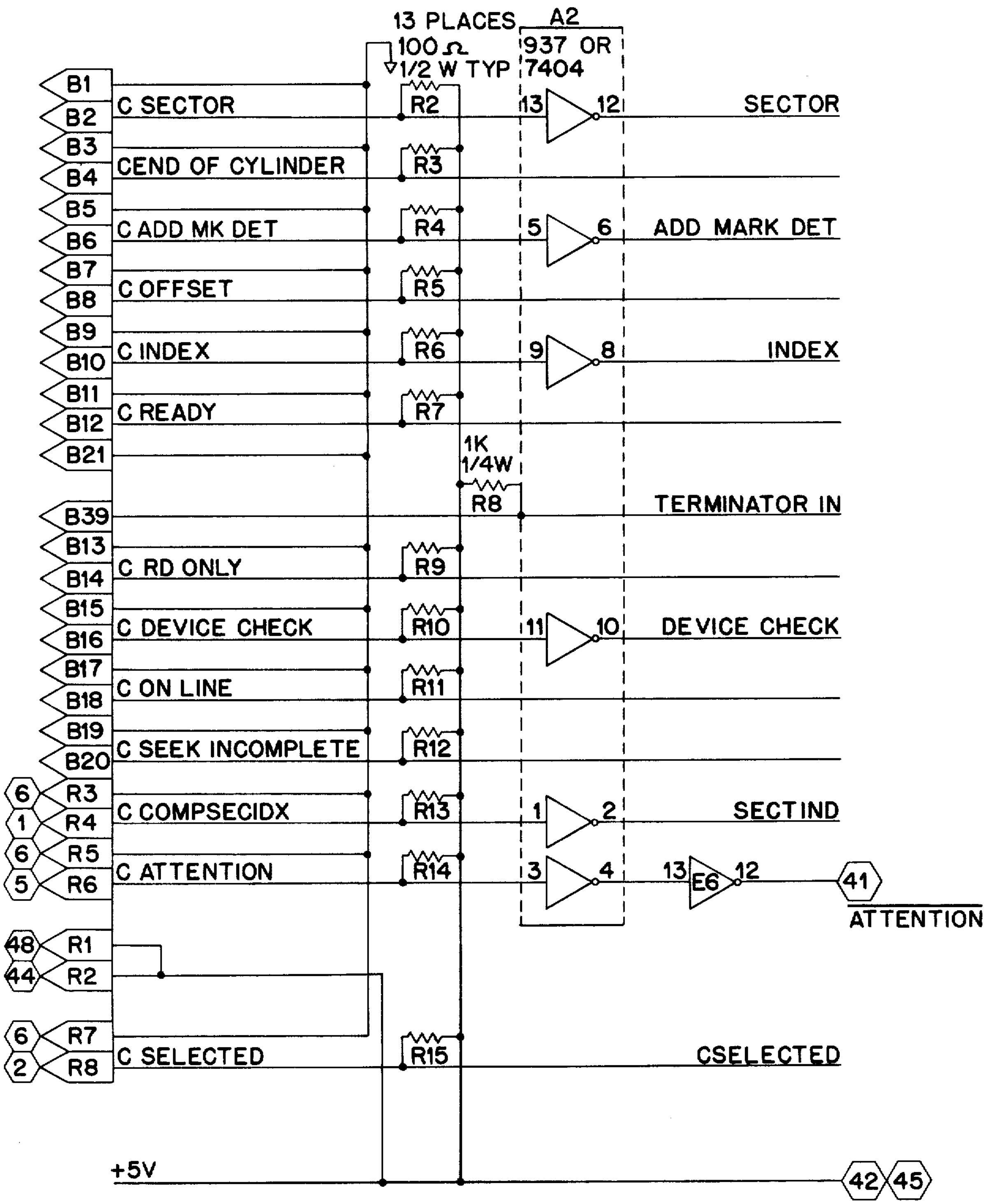
FIG._29.

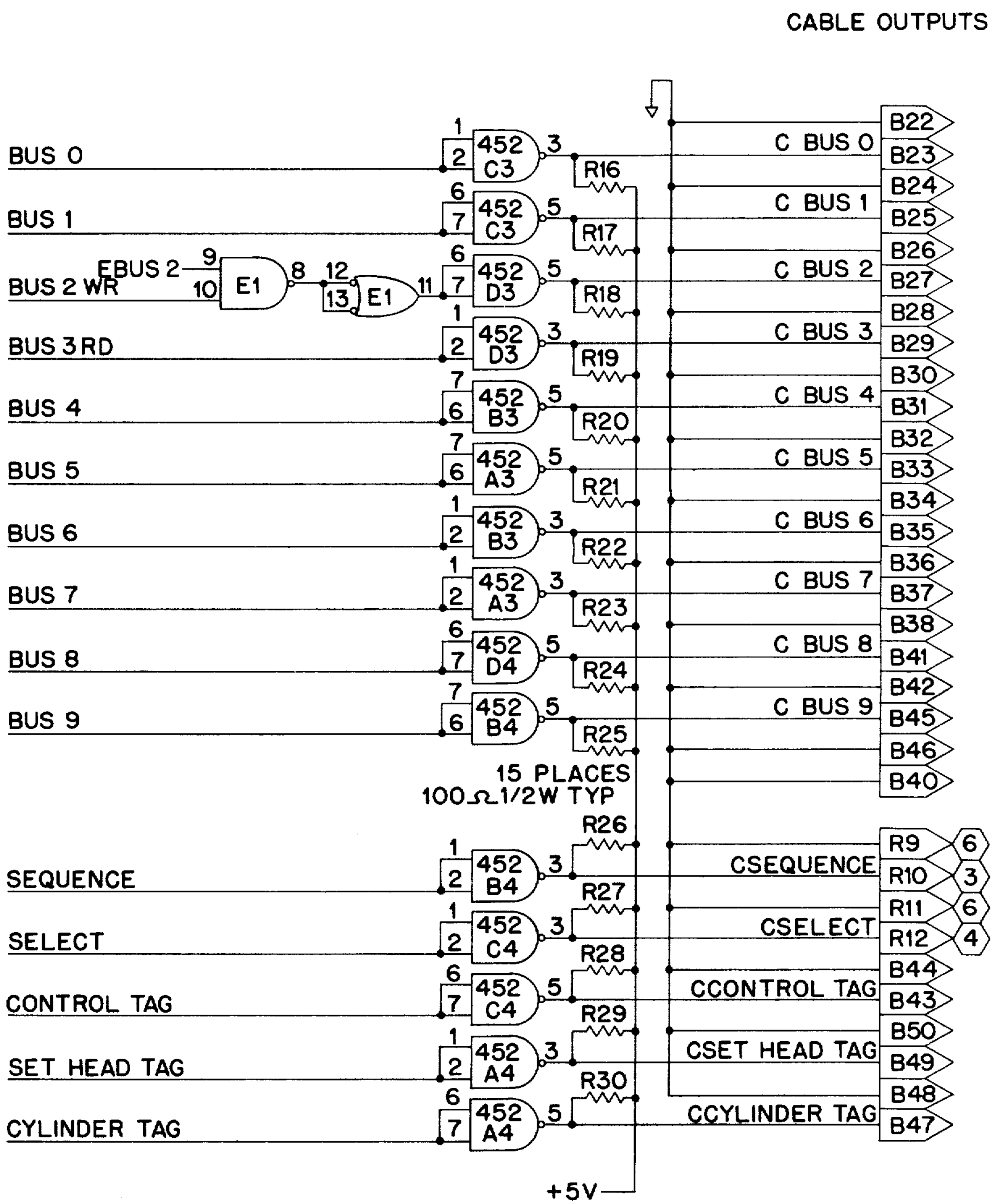
FIG._30.

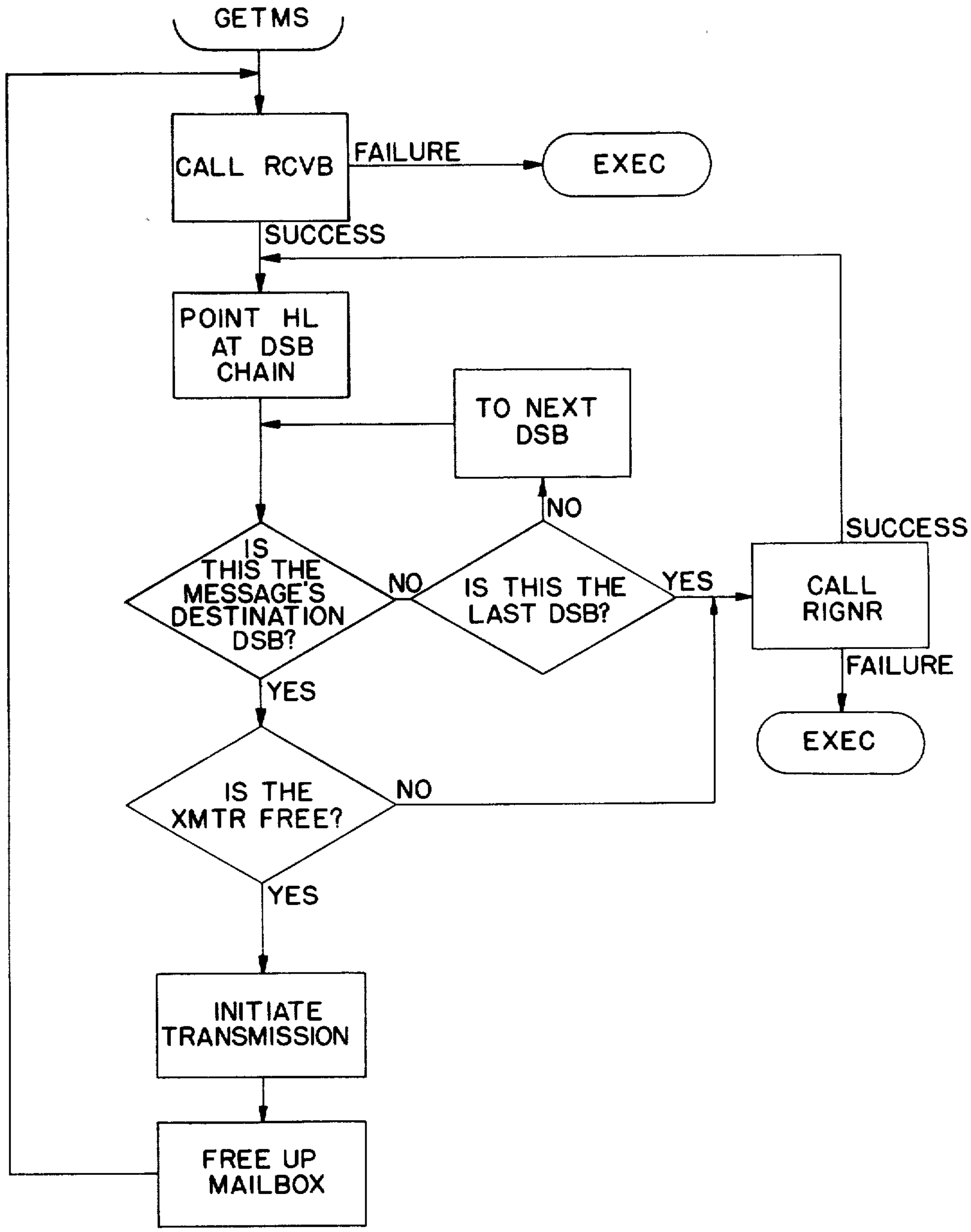
COMMUNICATIONS LEVEL FLOW CHART
FIG.—31.

COMMUNICATIONS LEVEL FLOW CHART

COMMUNICATIONS LEVEL FLOW CHART

FIG.—33.

COMMUNICATIONS LEVEL INTERRUPT FLOW CHART

COMMUNICATIONS LEVEL INTERRUPT FLOW CHART

FIG.__35.

COMMUNICATIONS LEVEL INTERRUPT FLOW CHART

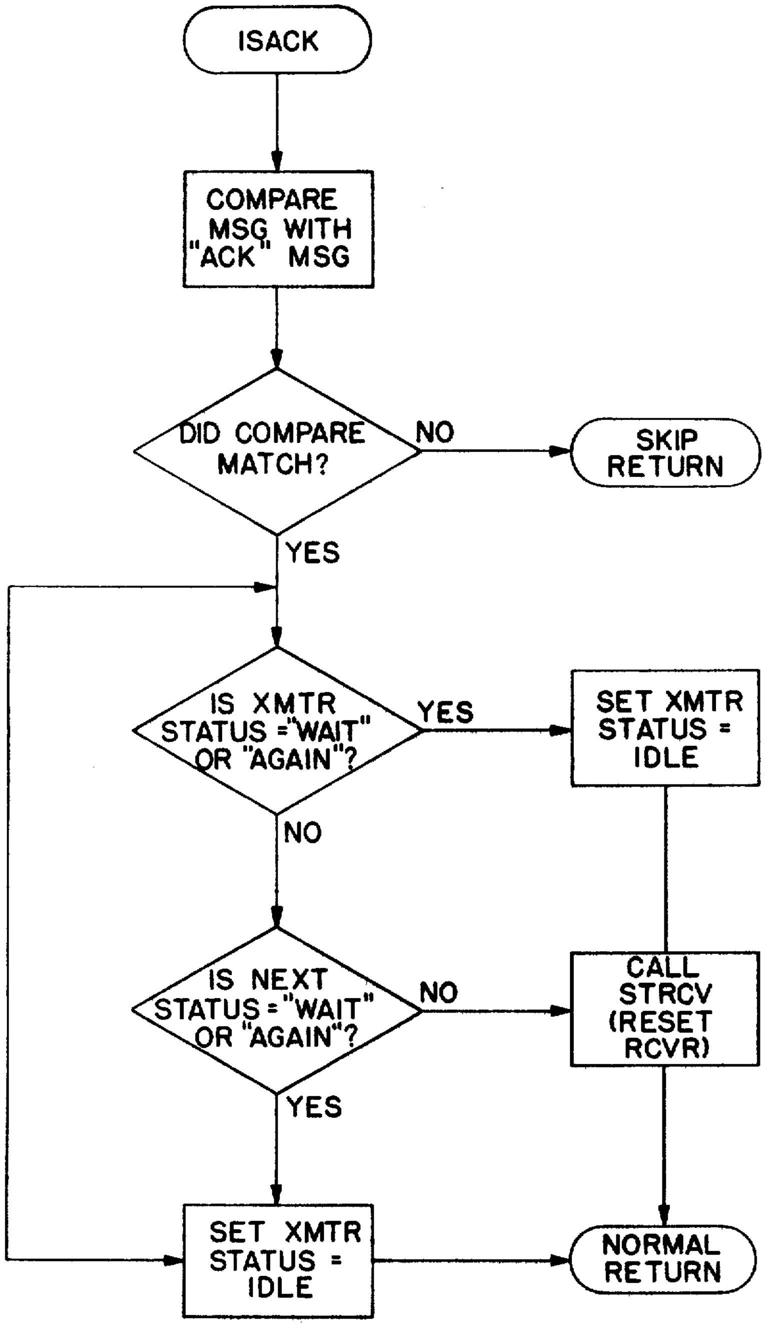
COMMUNICATIONS LEVEL FLOW CHART
FIG.__37.

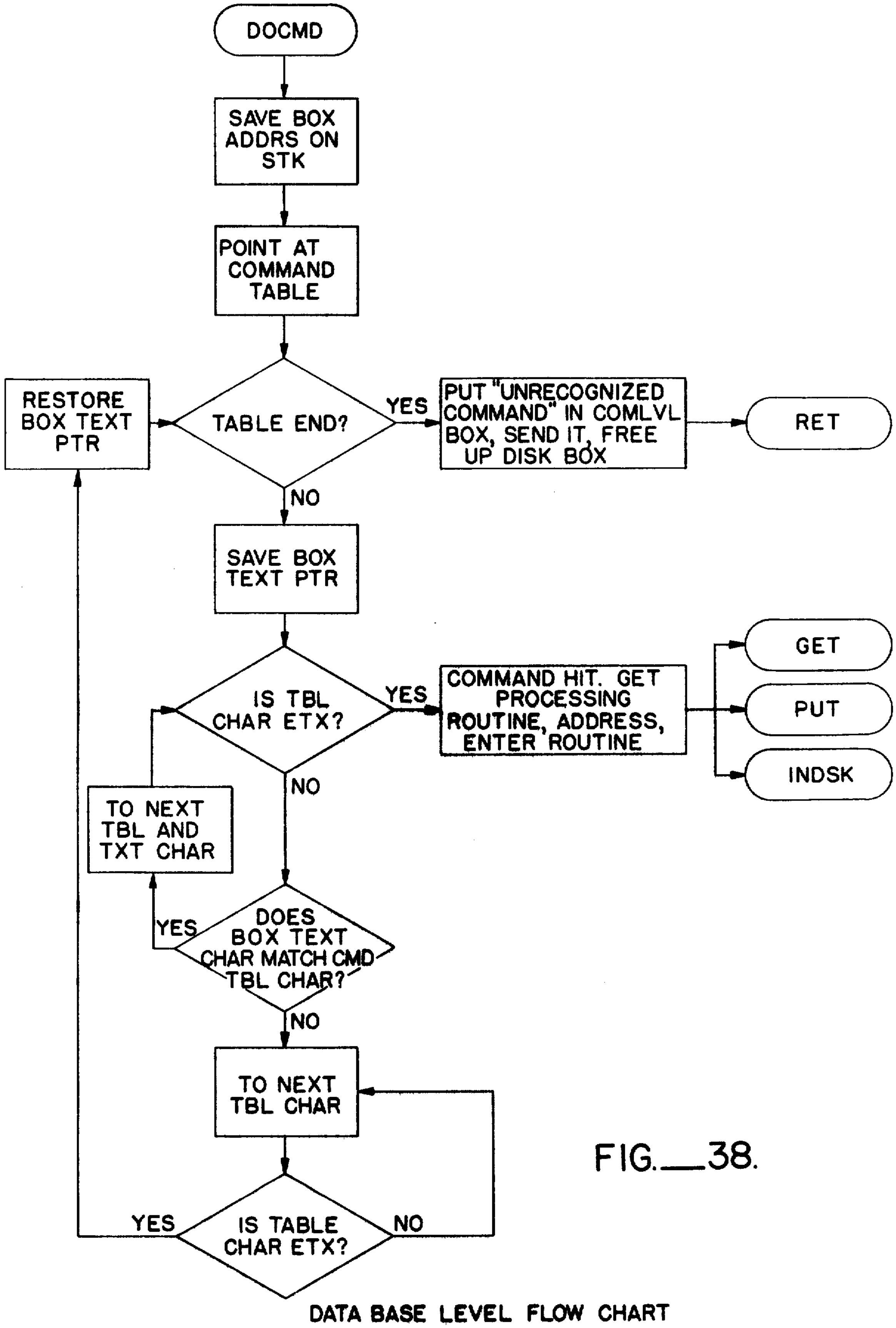
FIG._38.
DATA BASE LEVEL FLOW CHART

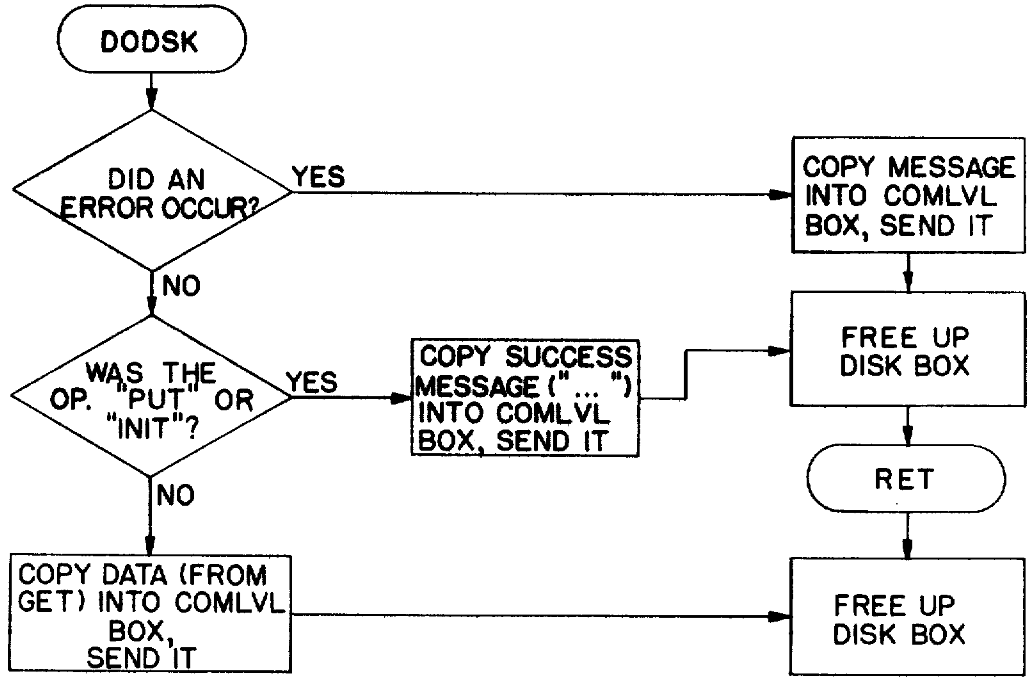
FIG.—39.
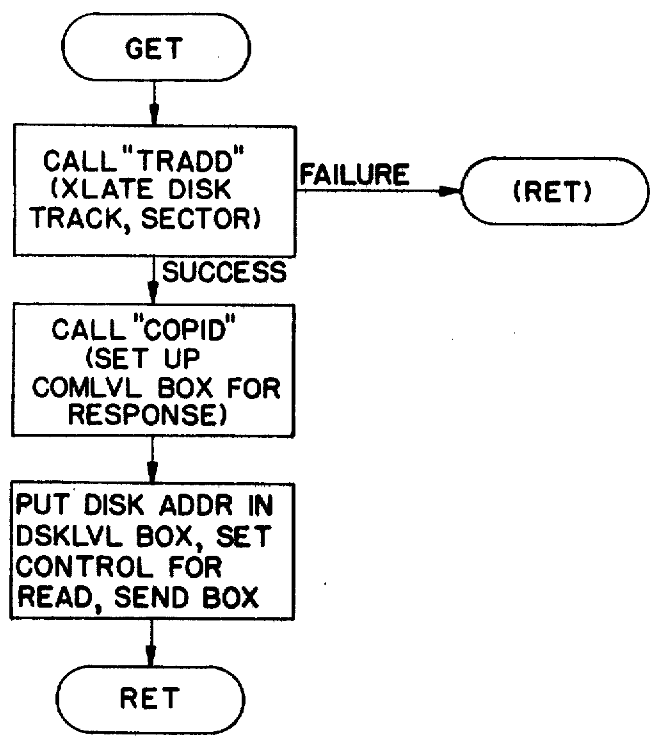
DATA BASE LEVEL FLOW CHART
FIG.—40.

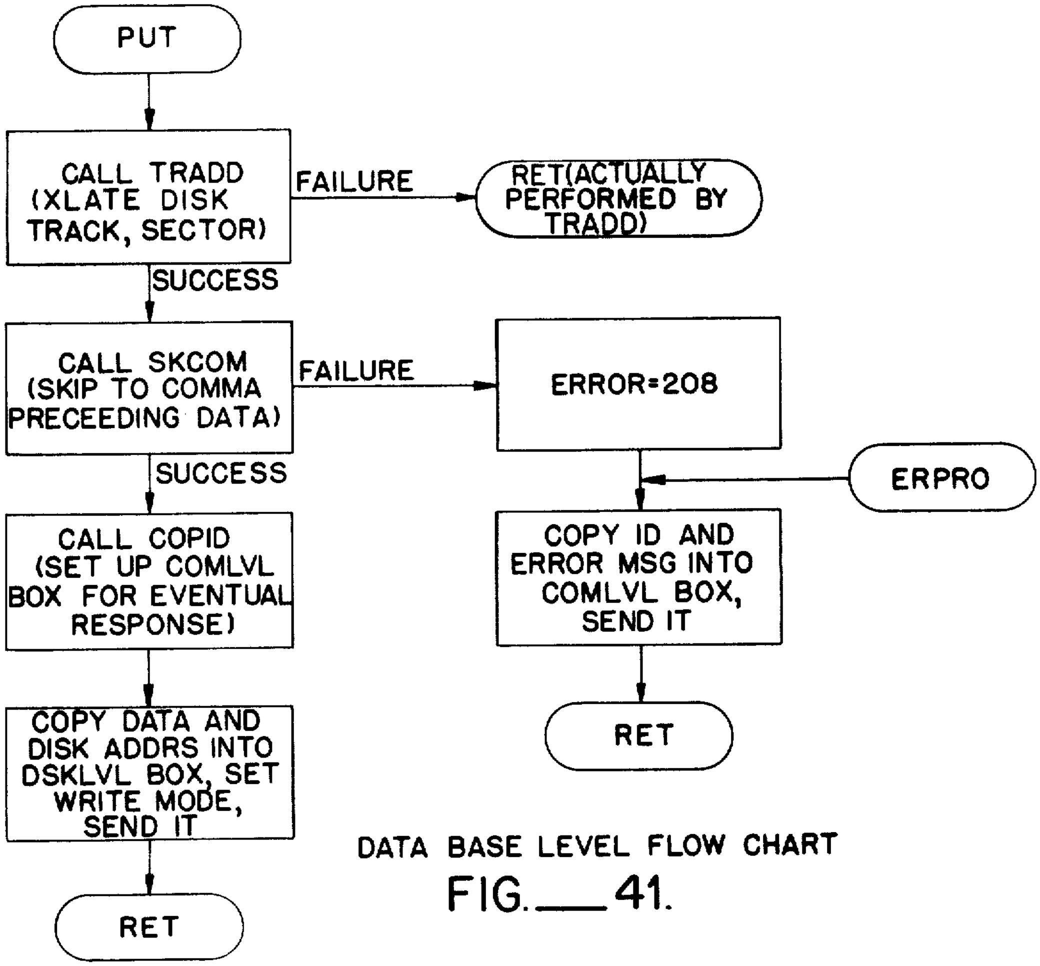
DATA BASE LEVEL FLOW CHART
FIG.__41.
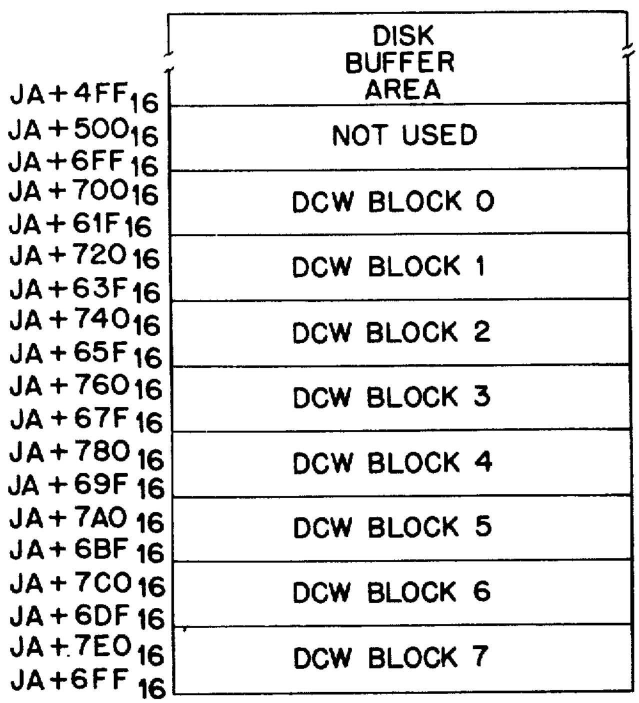
FIG.__54.

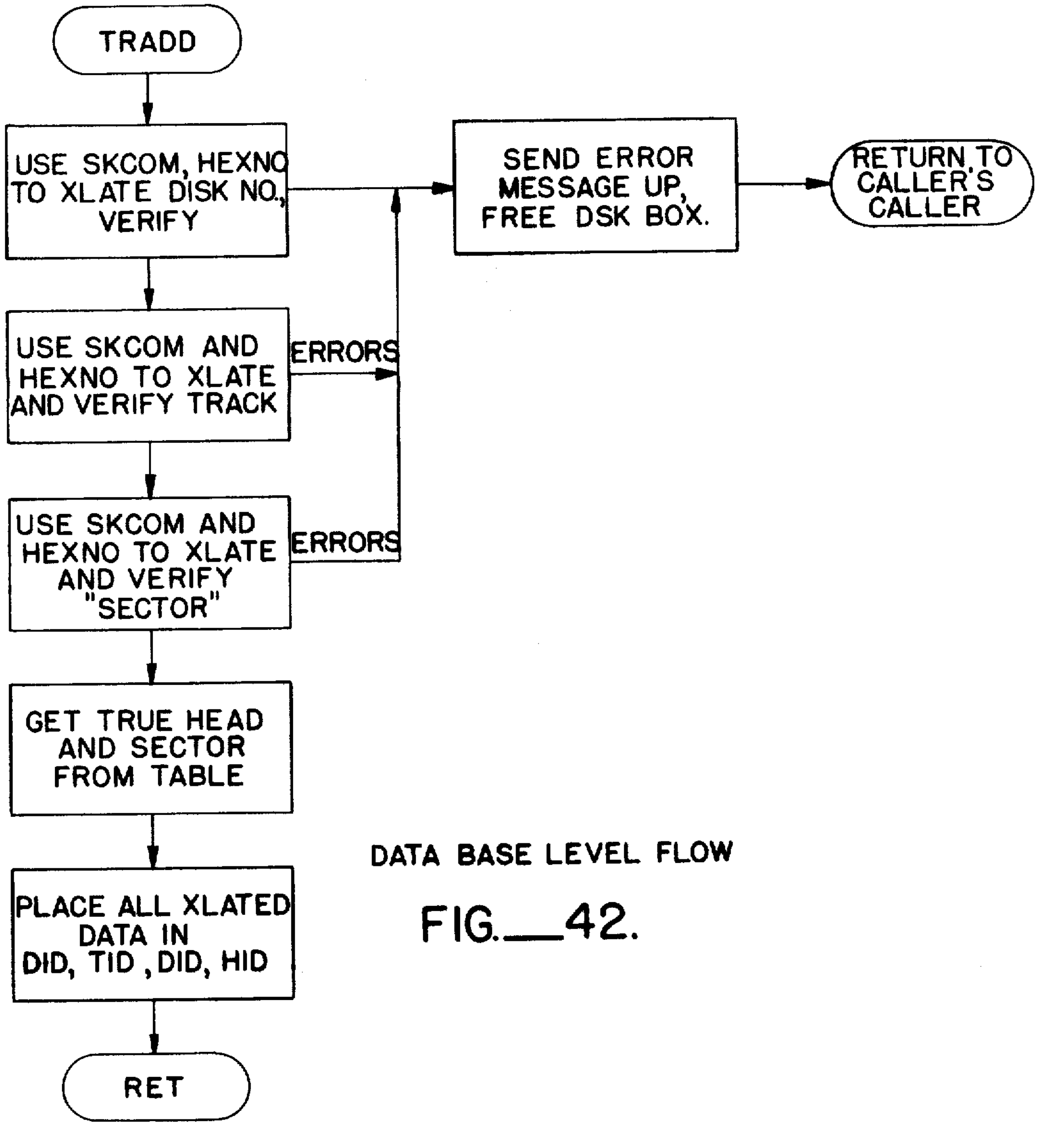
DATA BASE LEVEL FLOW
FIG.—42.
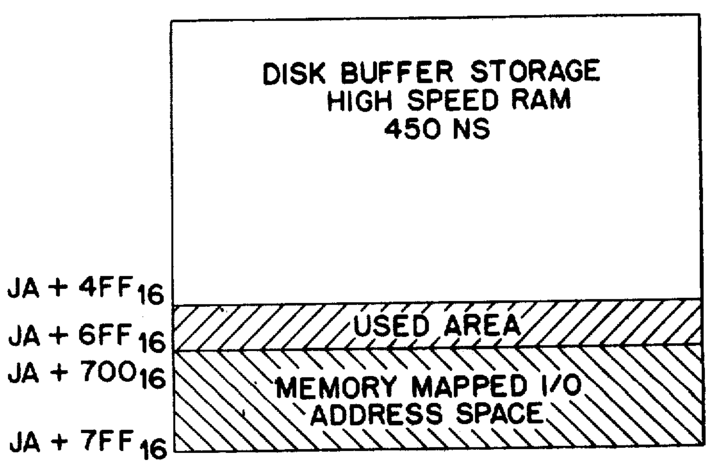
JA = JUMPER SELECTABLE ADDRESS IN THE RANGE $8000_{16}$ TO $F800_{16}$ ON 2K BOUNDARIES.
FIG.—53.

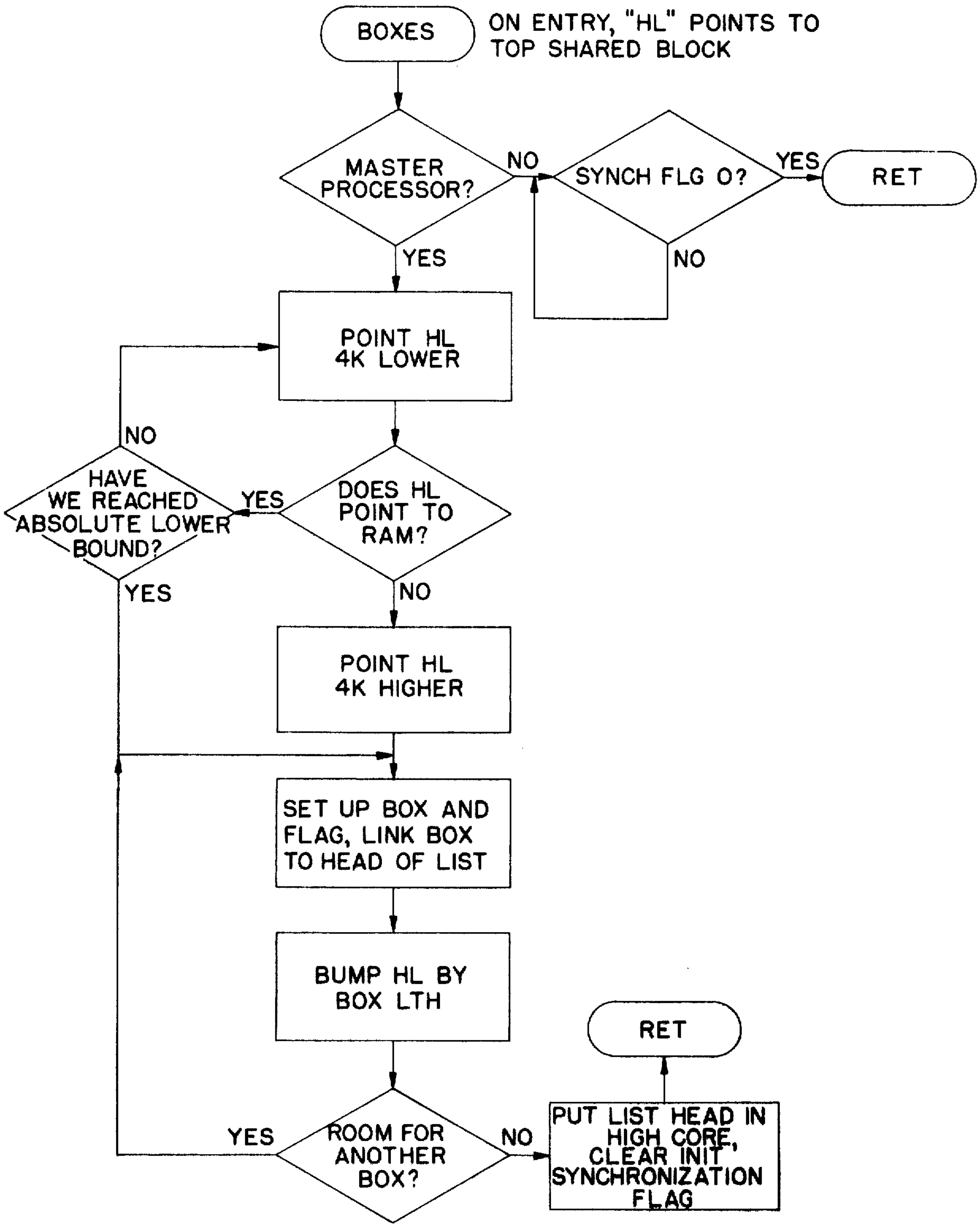
DATA BASE LEVEL FLOW CHART
FIG.__43.

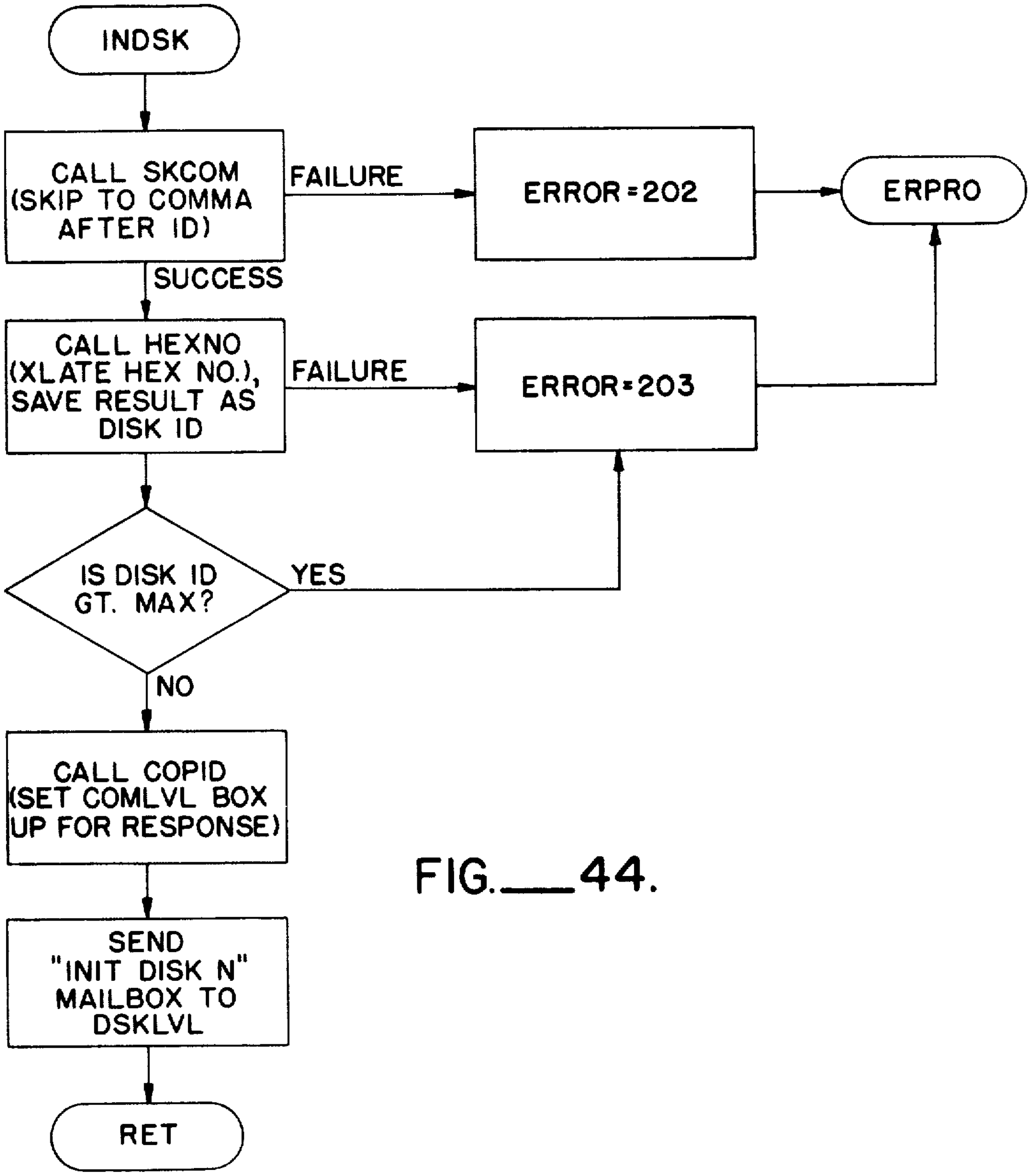
FIG._44.
DATA BASE LEVEL FLOW CHART
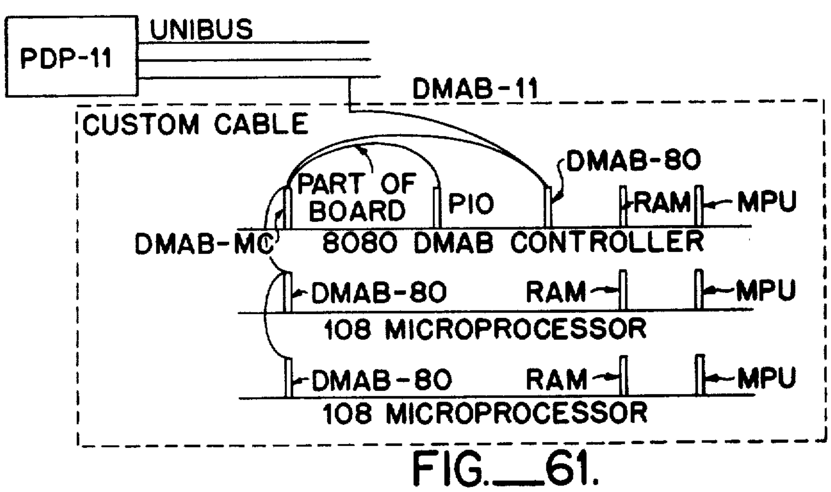
FIG._61.

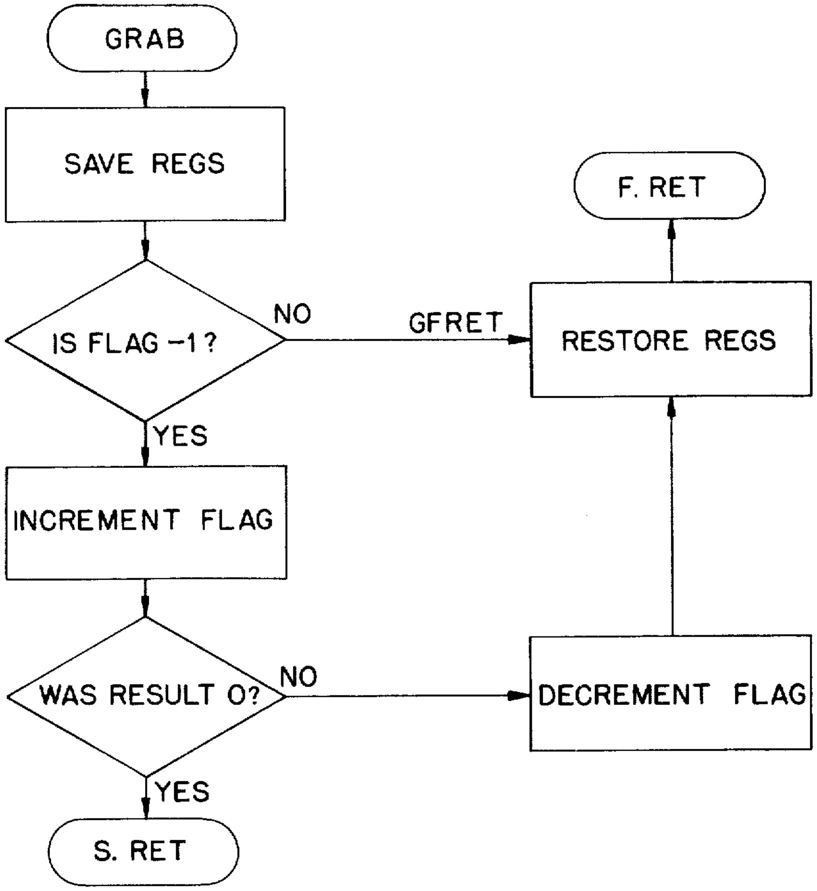
MAILBOX FLOW CHART
FIG.__47.
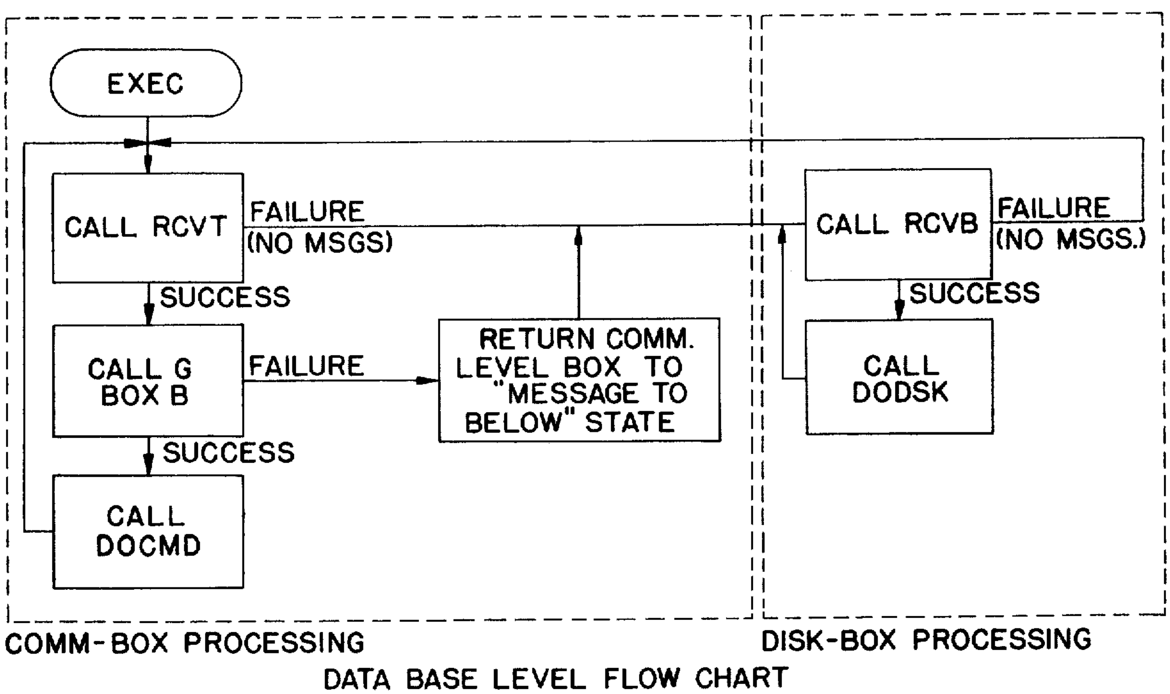
COMM-BOX PROCESSING DISK-BOX PROCESSING
DATA BASE LEVEL FLOW CHART
FIG.__45.

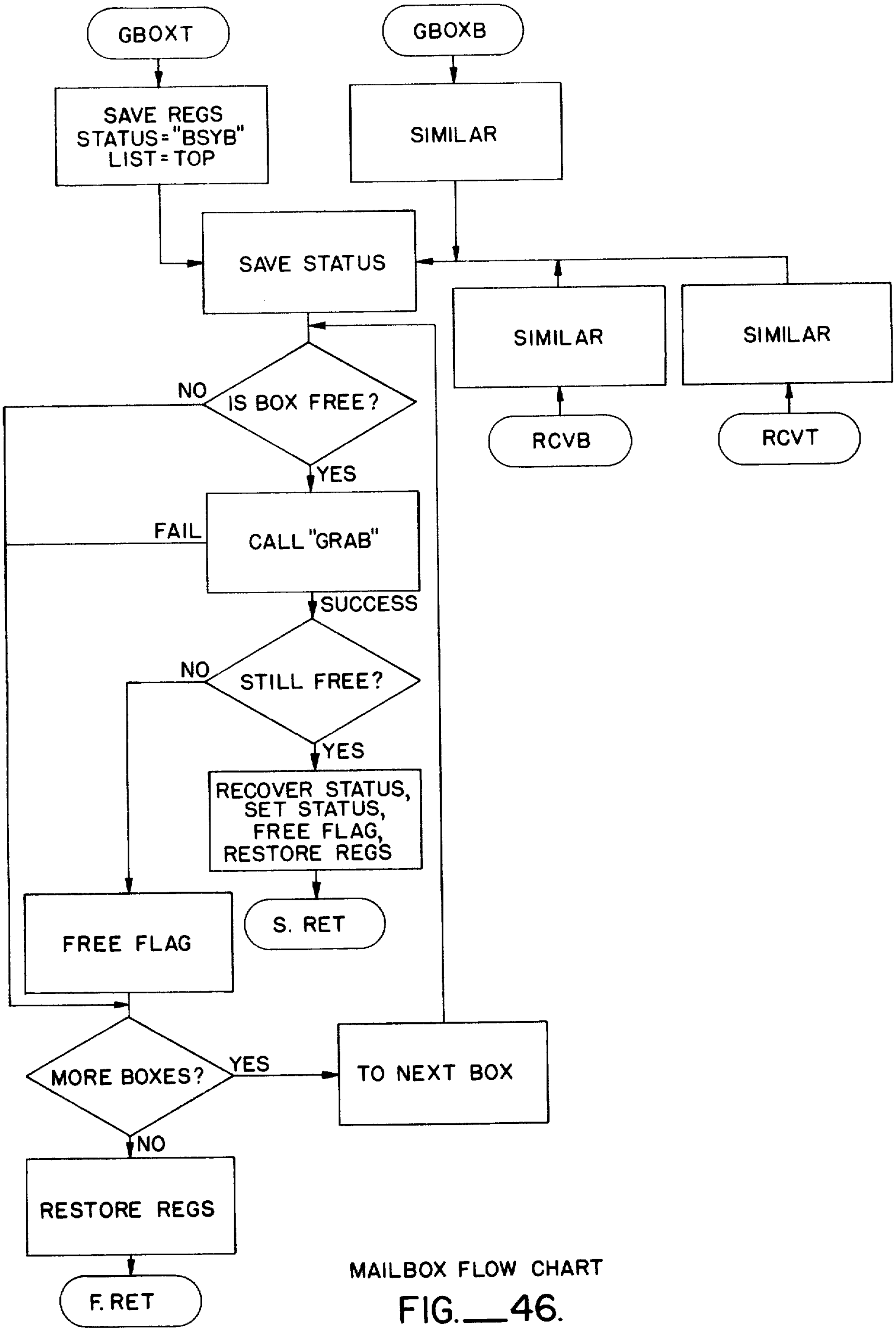
MAILBOX FLOW CHART
FIG.—46.

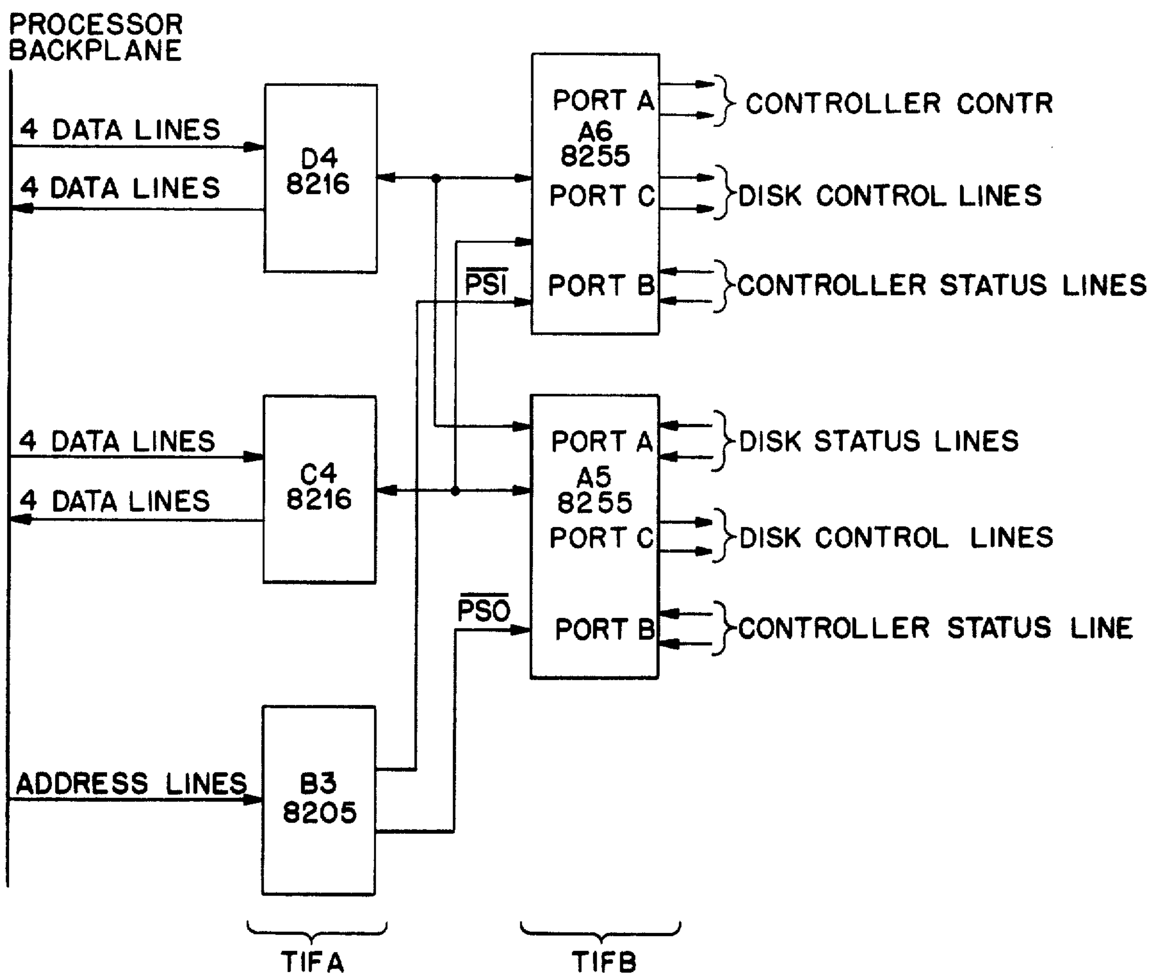
FIG.—49.
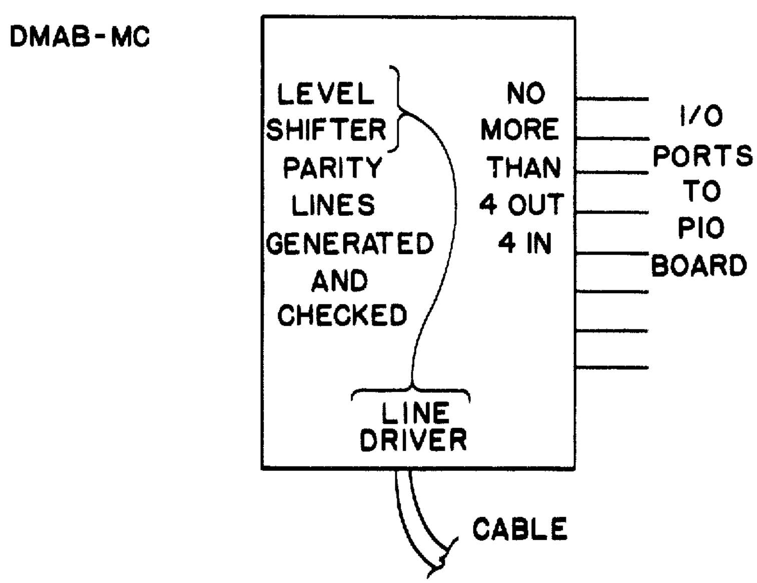
FIG.—56.

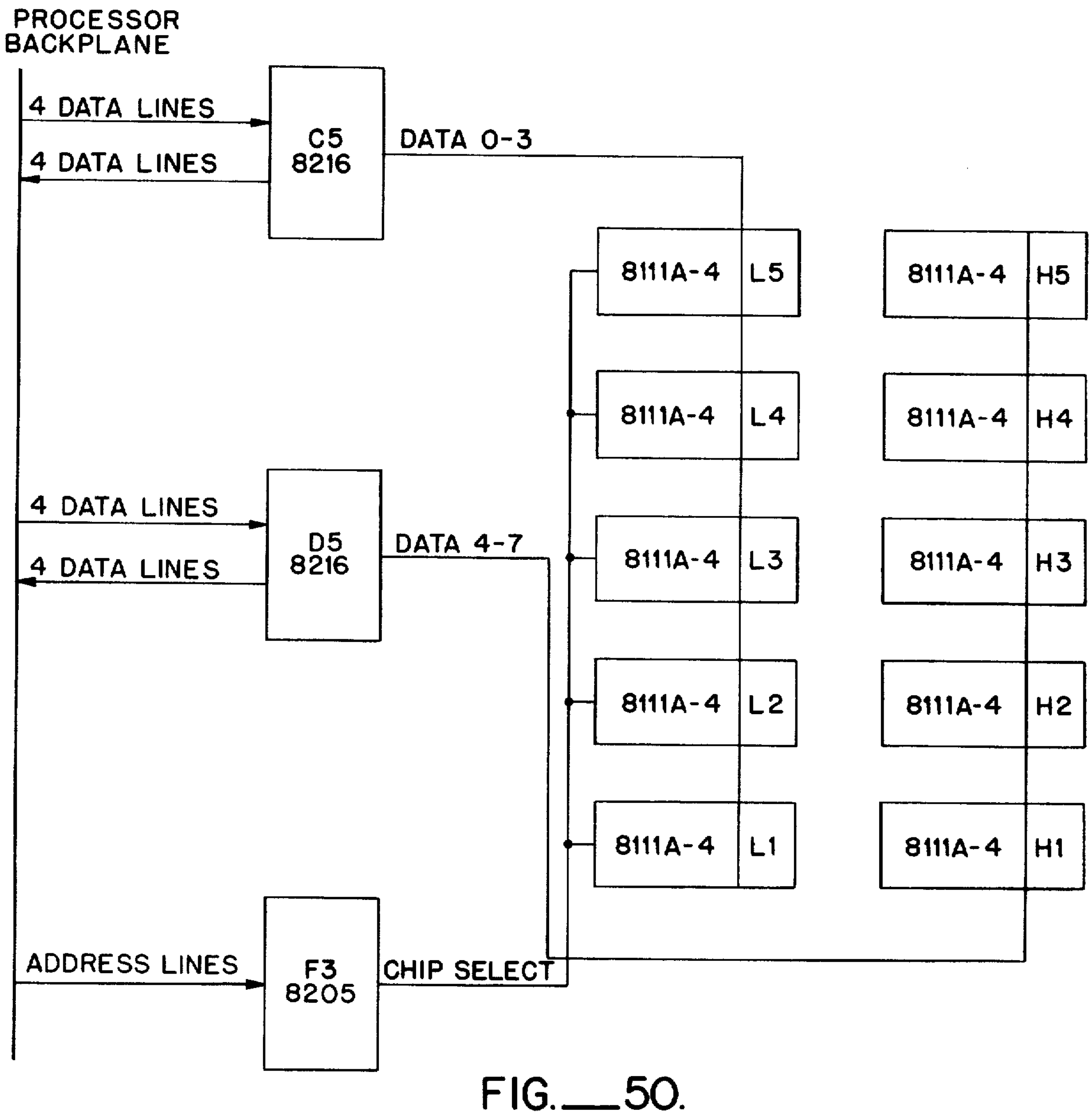
FIG.—50.

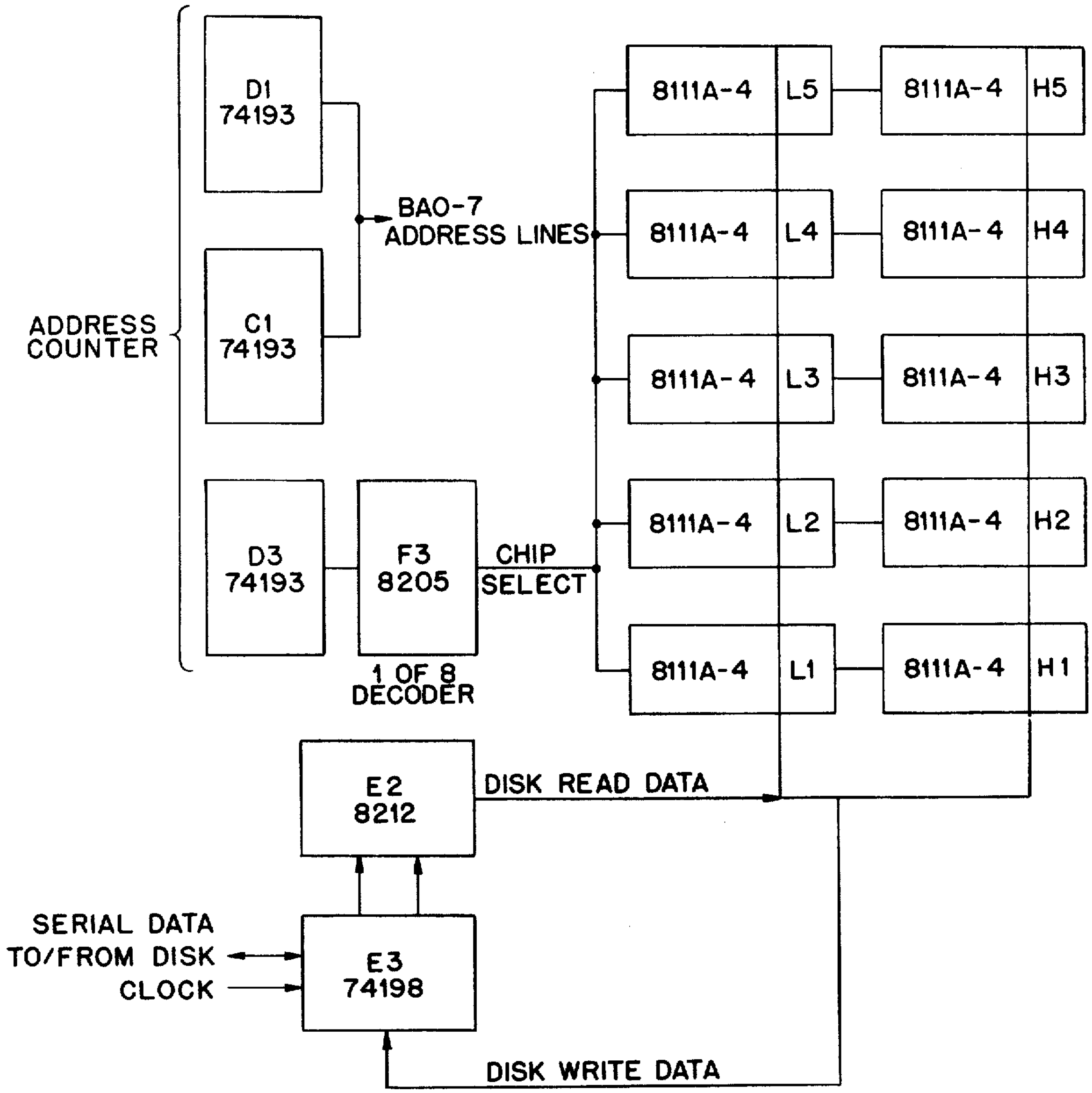
FIG.__51.

MASTER CONTROLLER BLOCK DIAGRAM
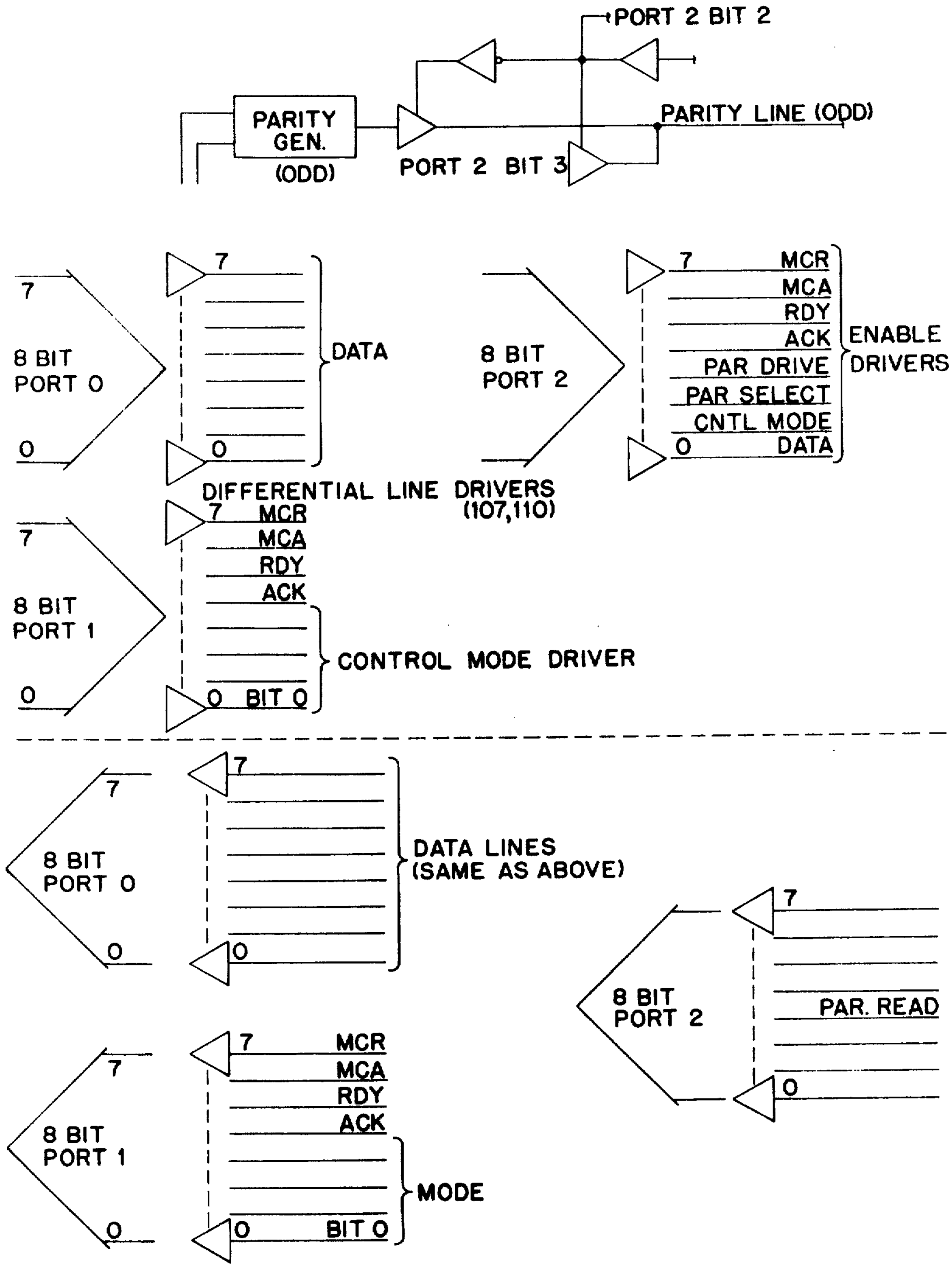
FIG.—55.

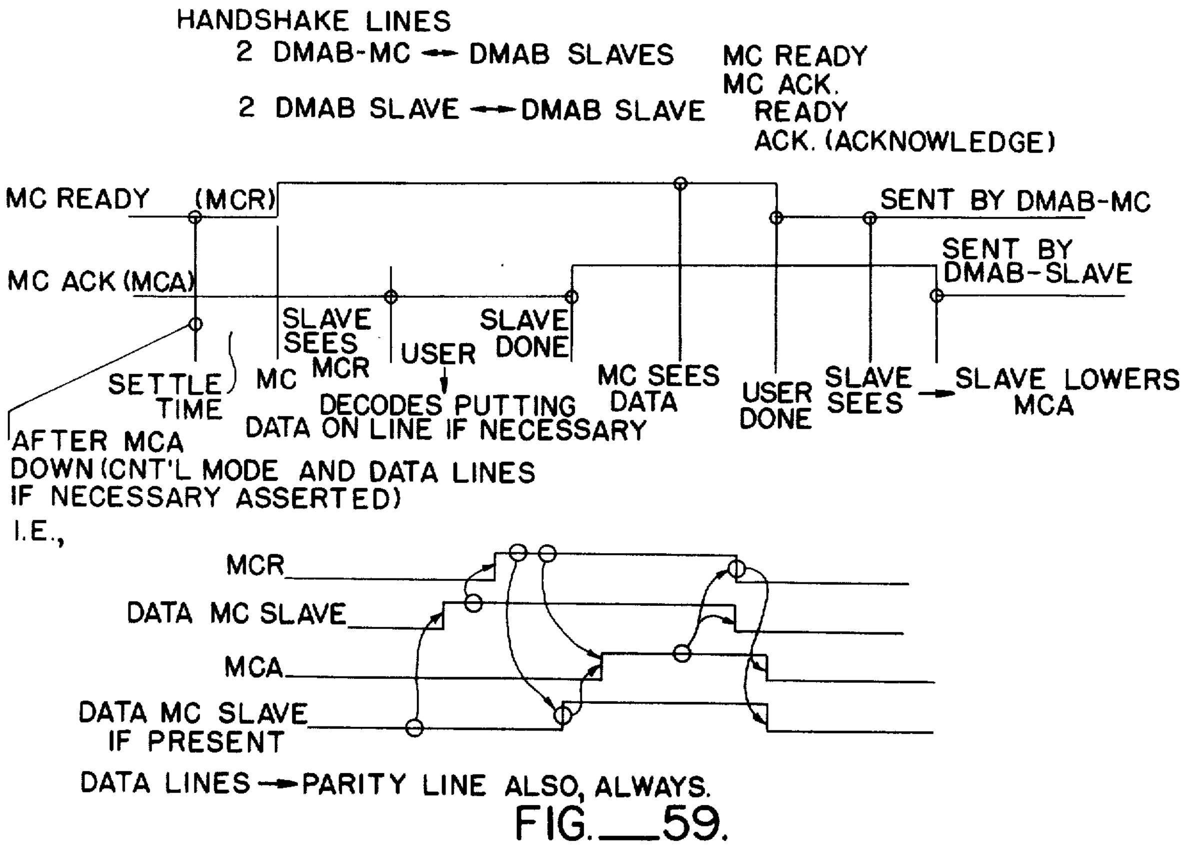
FIG._59.
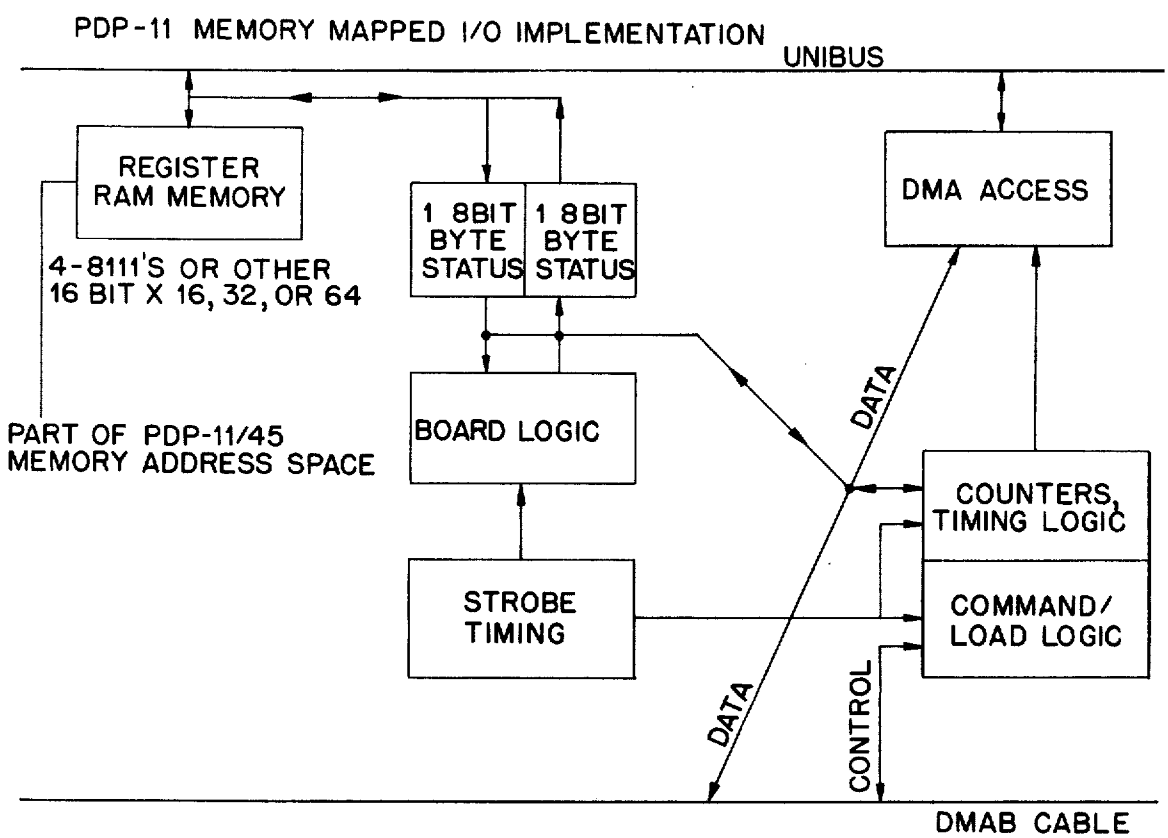
FIG._62.

DEFINITION OF CABLE/BOARD REGISTER BLOCK
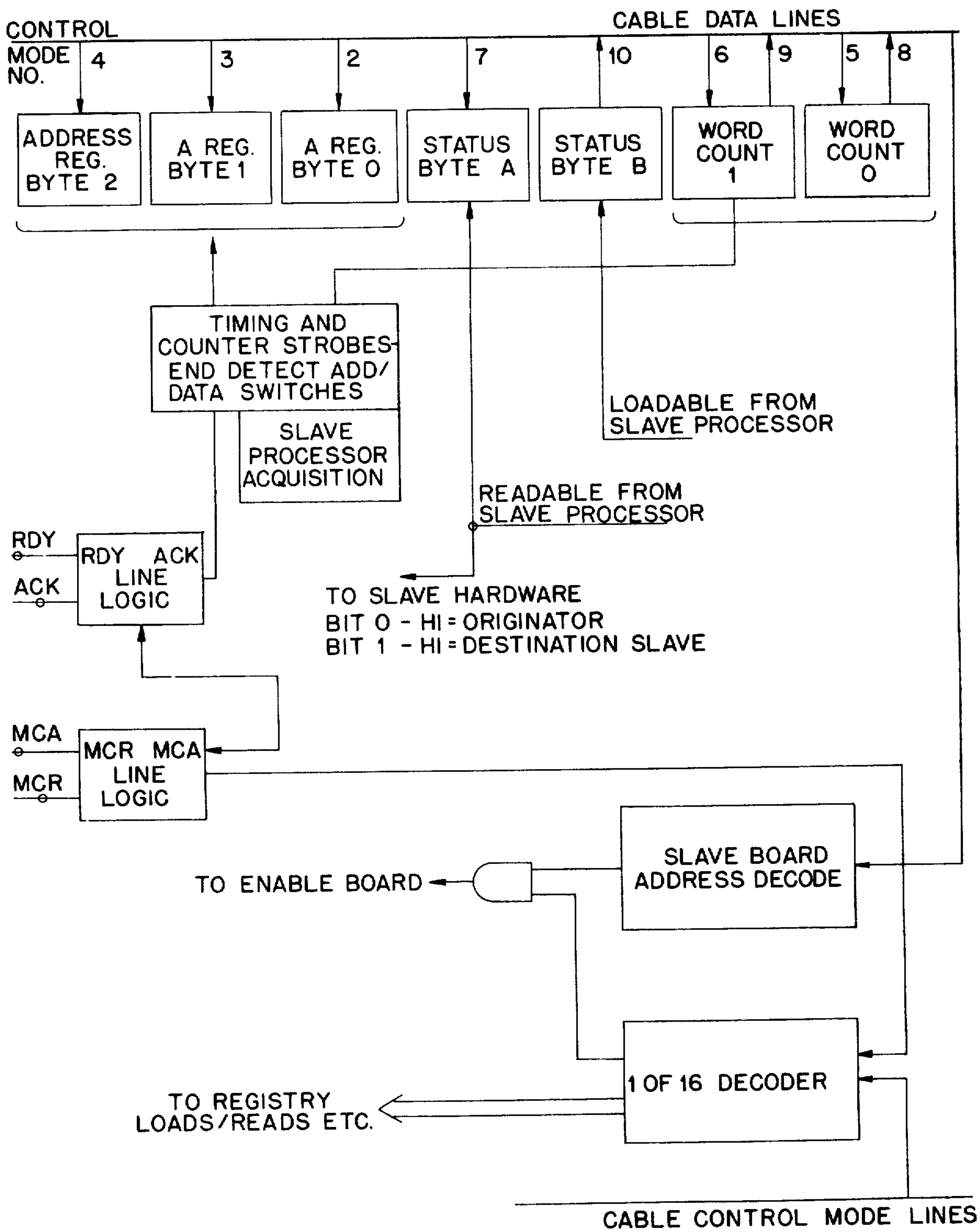
FIG.—63.

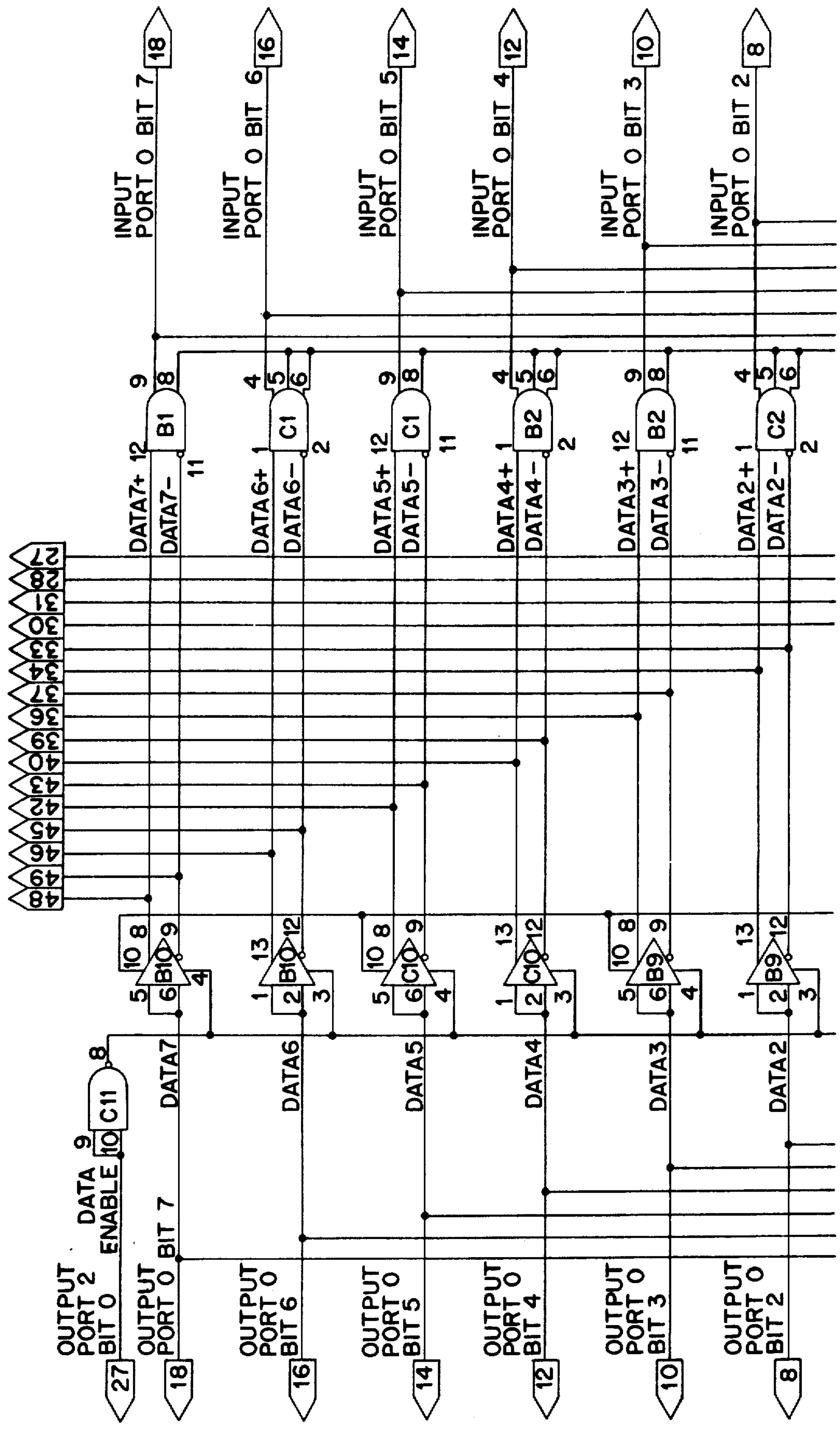
FIG._64A.

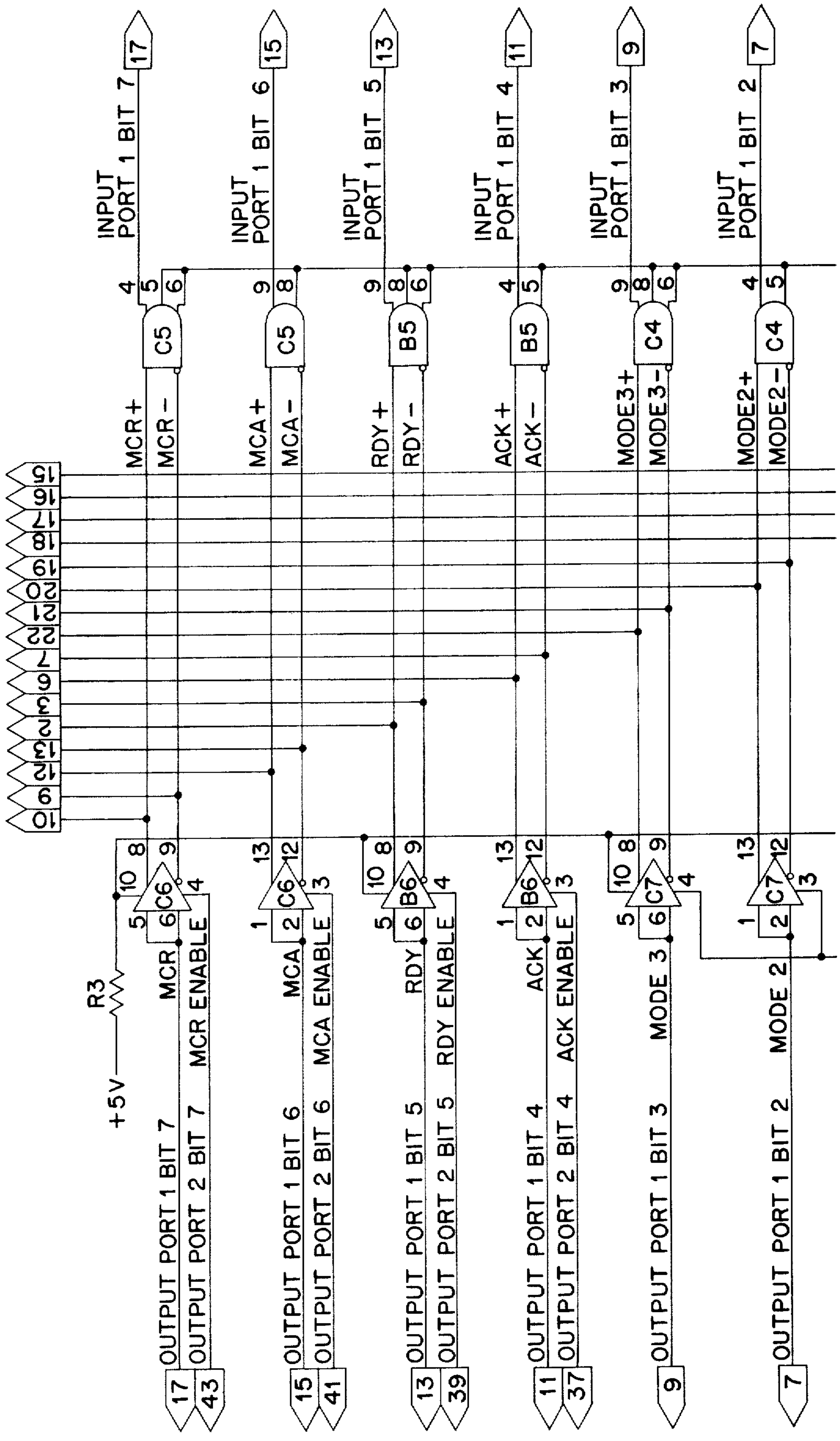
FIG._64B.

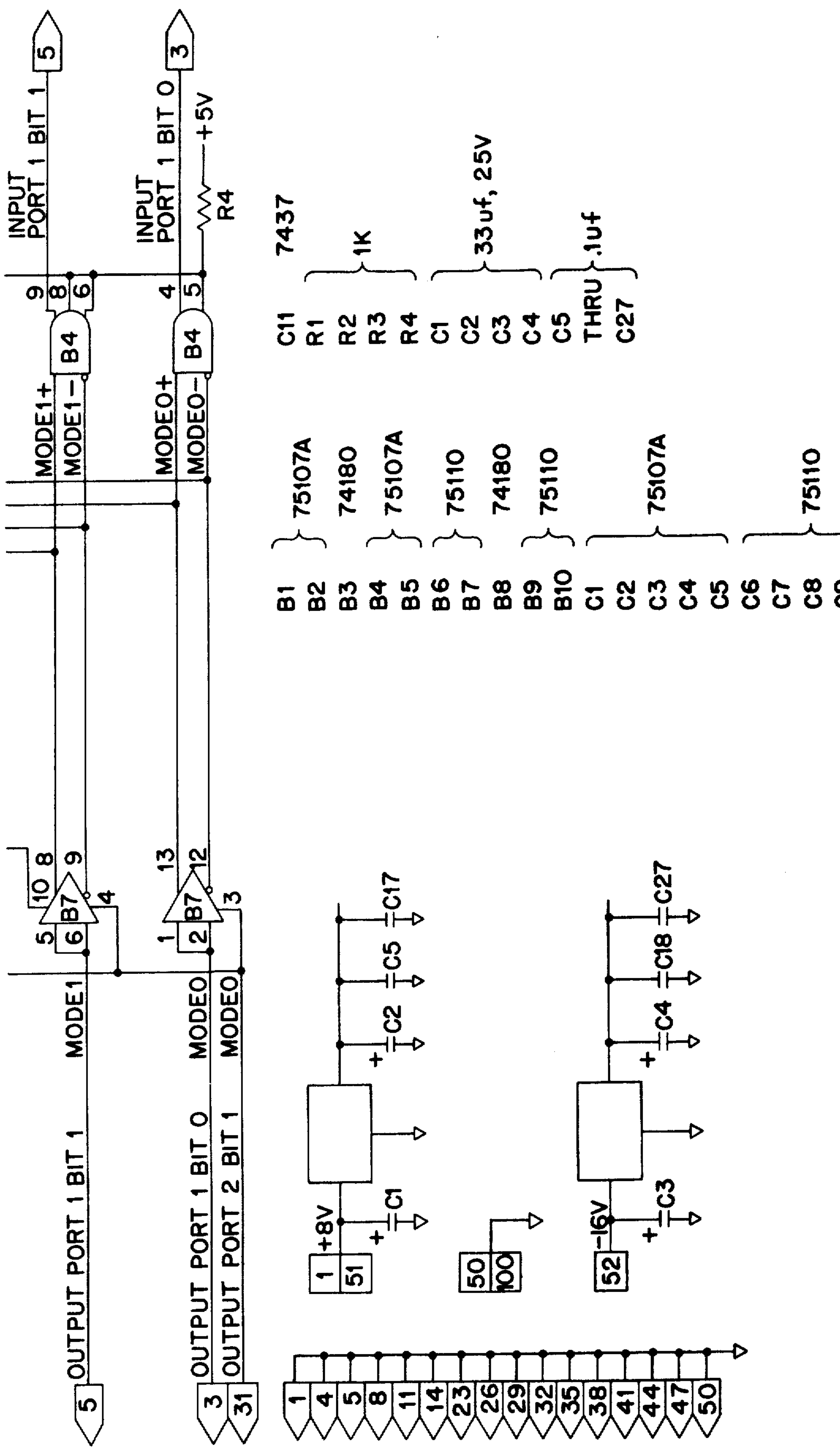
FIG._64D.
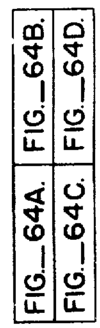
FIG._64E.

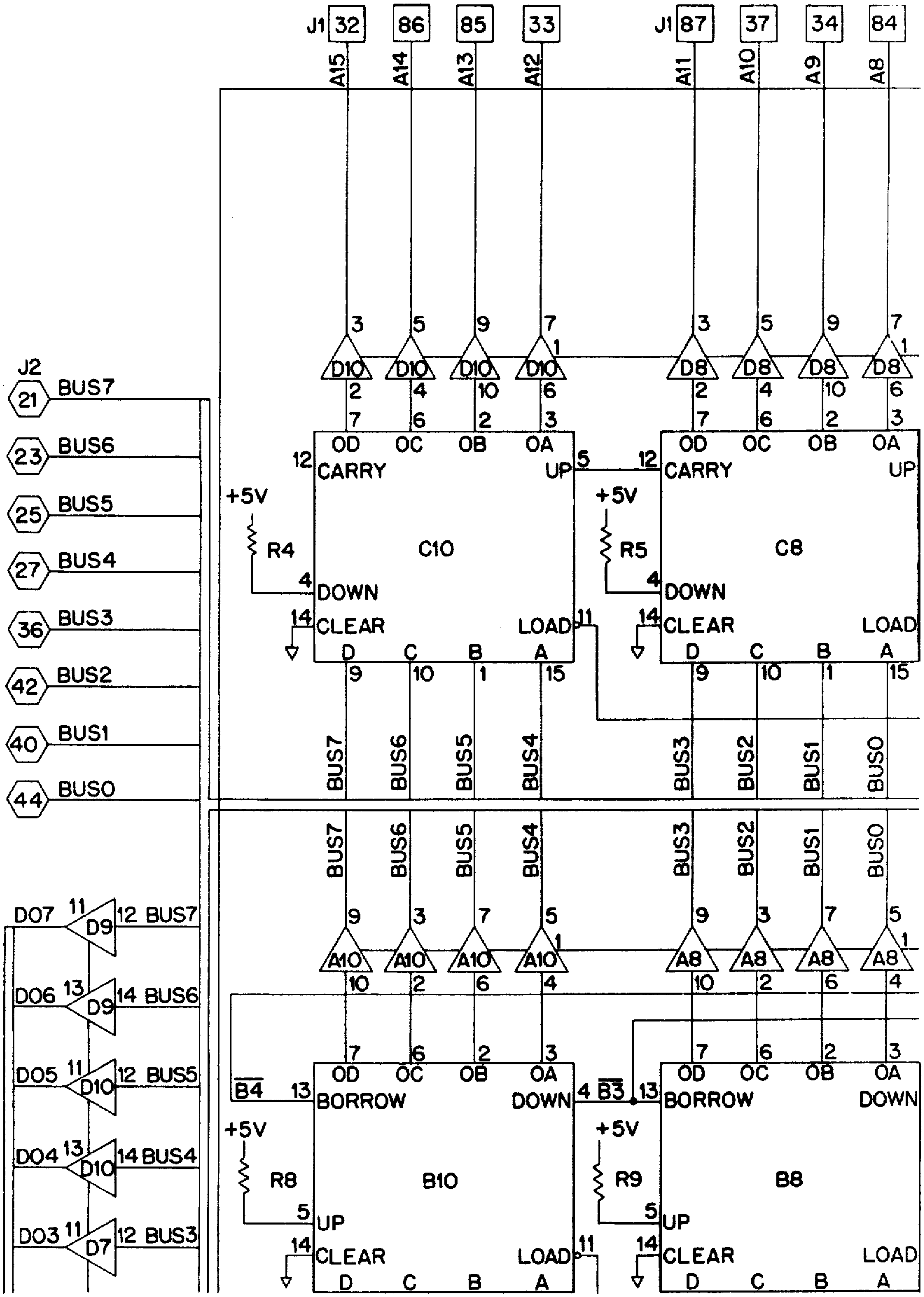
FIG._65A.

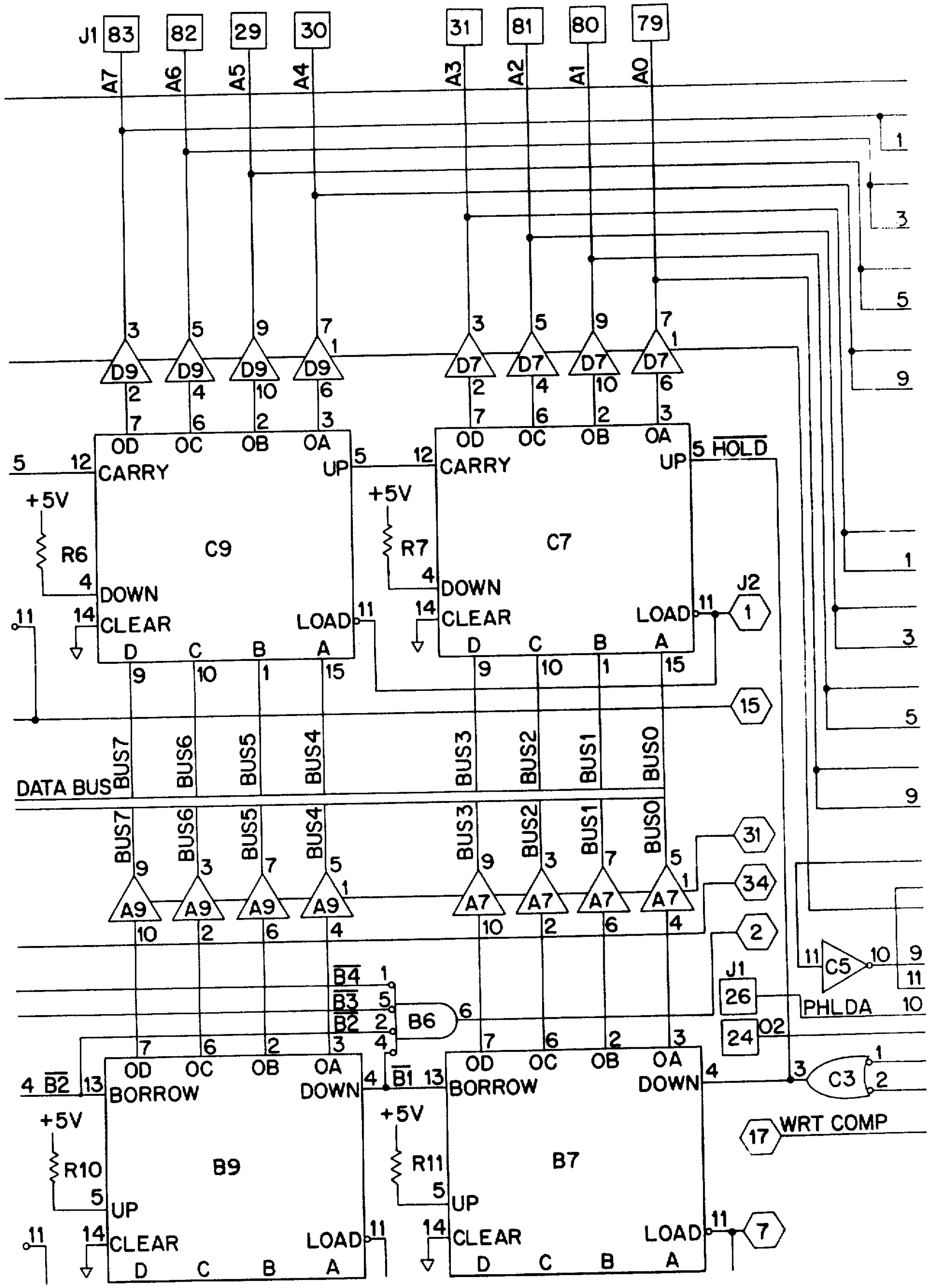
FIG._65B.

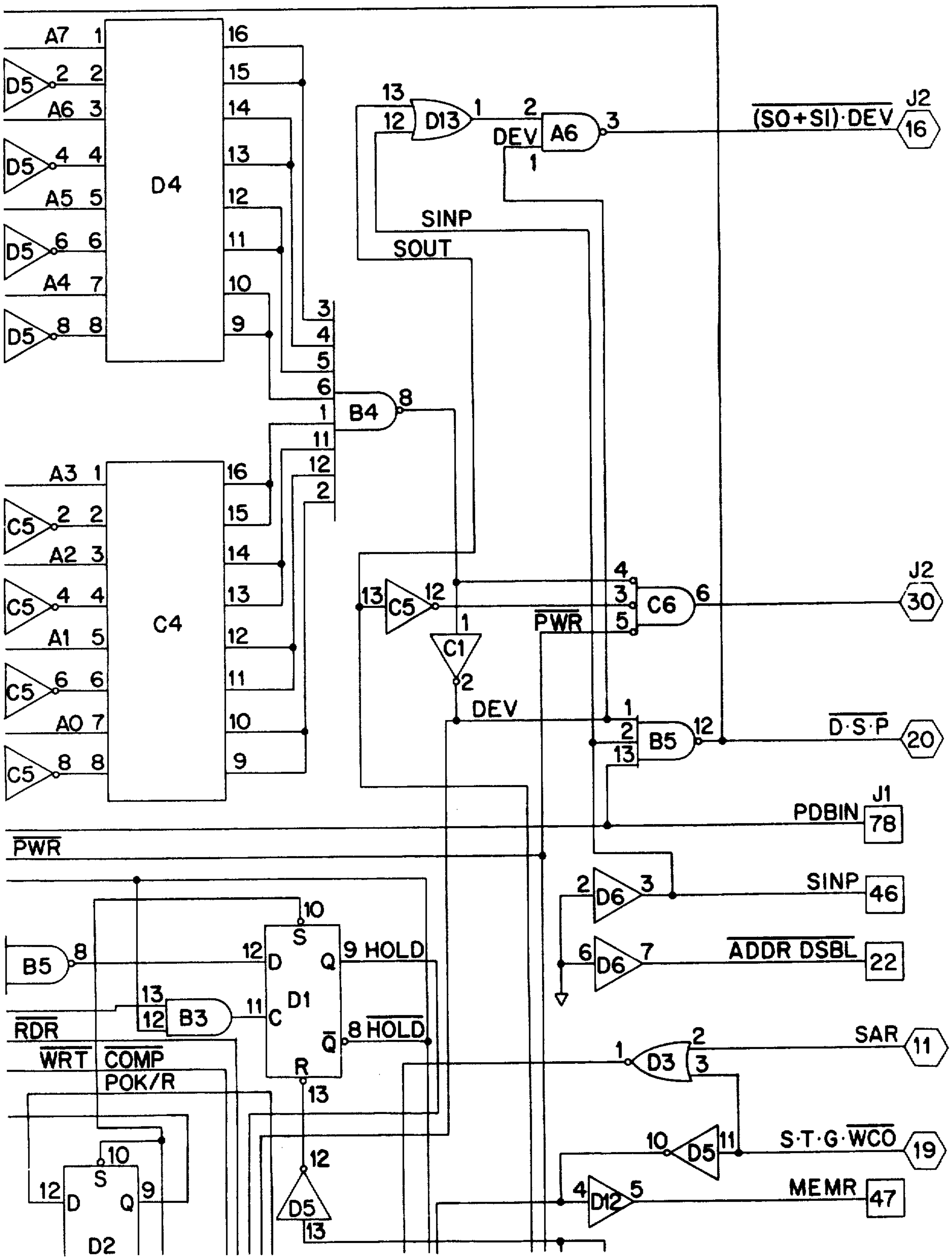
FIG._65C.

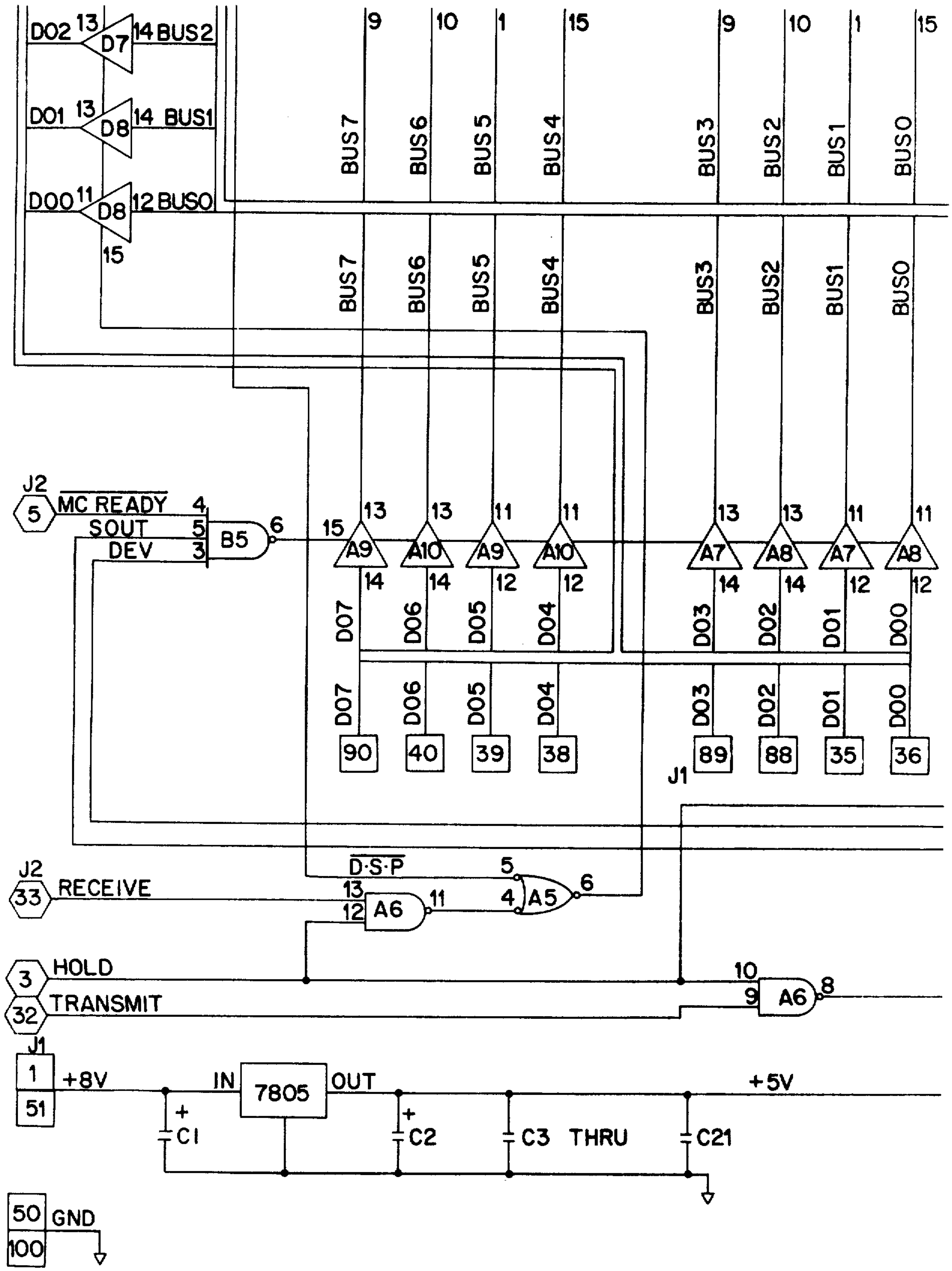
FIG.__65E.

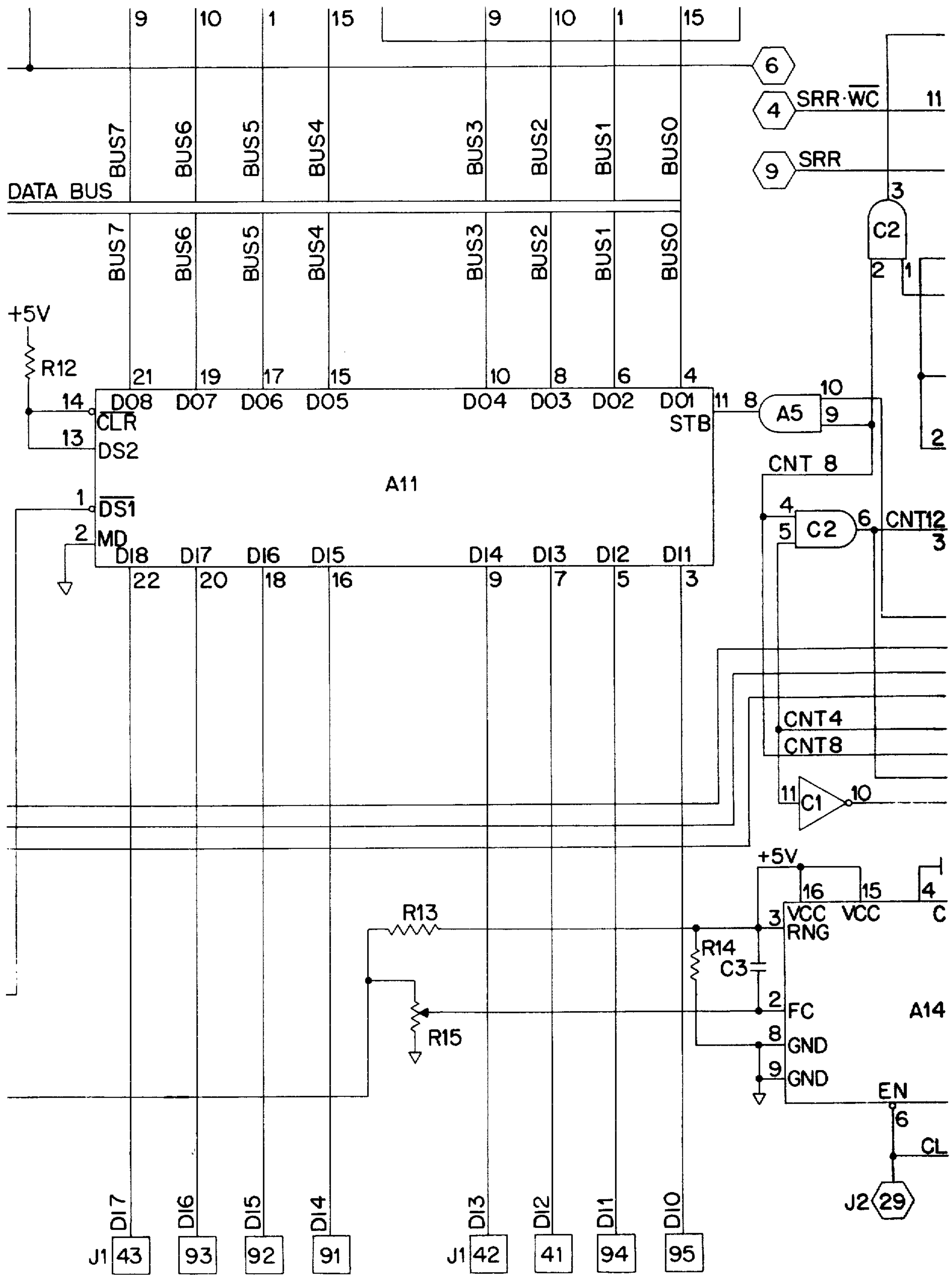
FIG._65F.

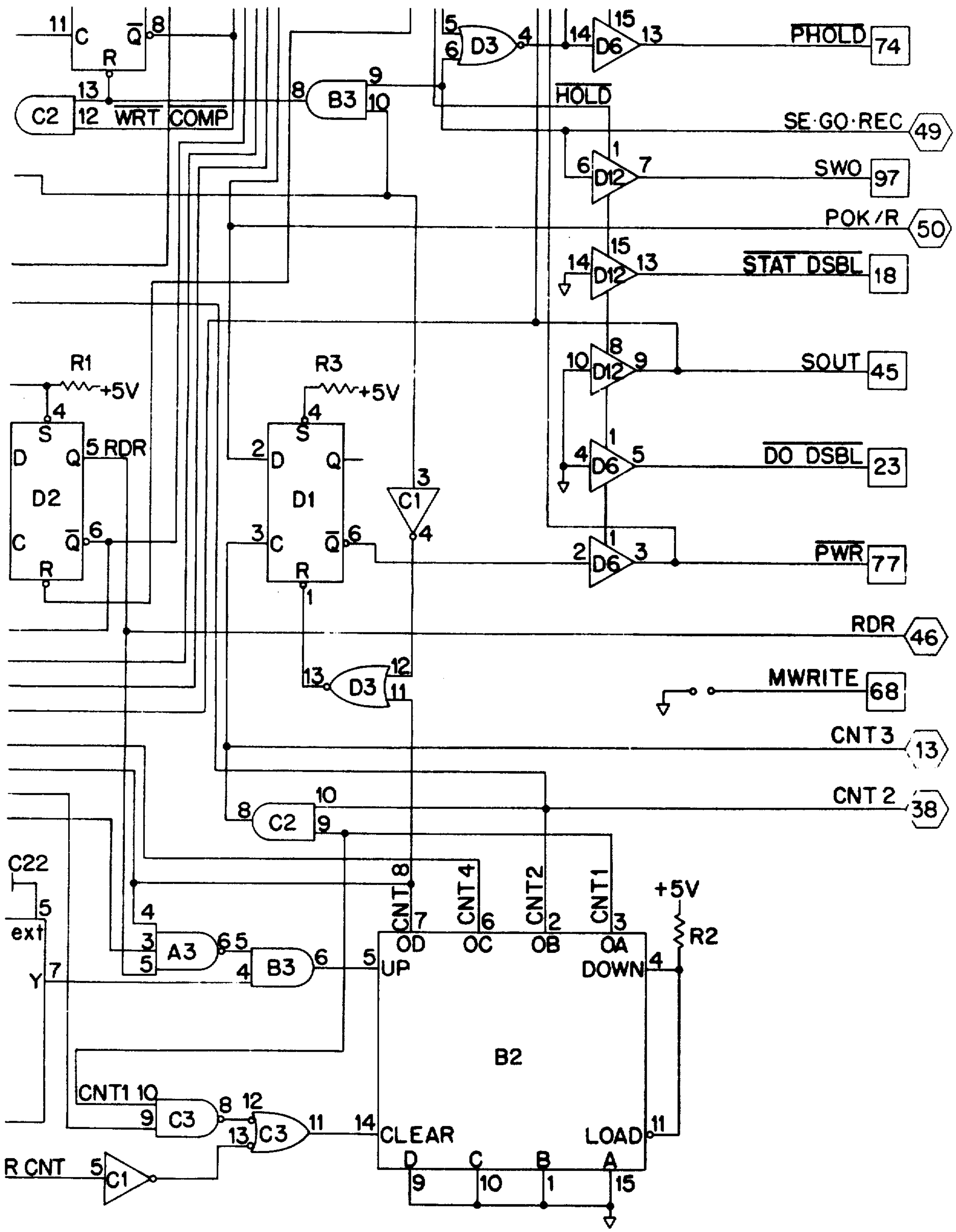
FIG.__65G.

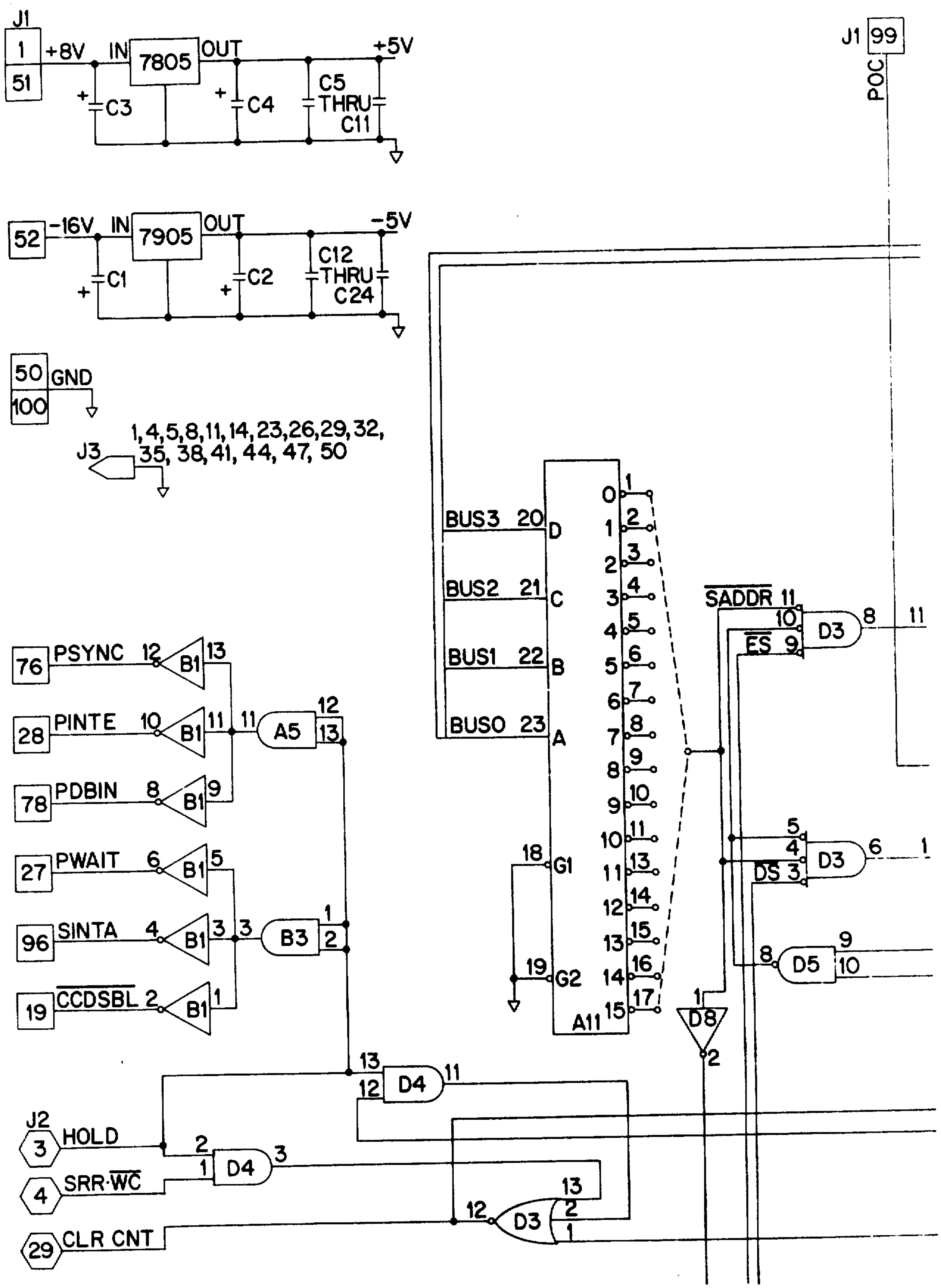
FIG._66A.

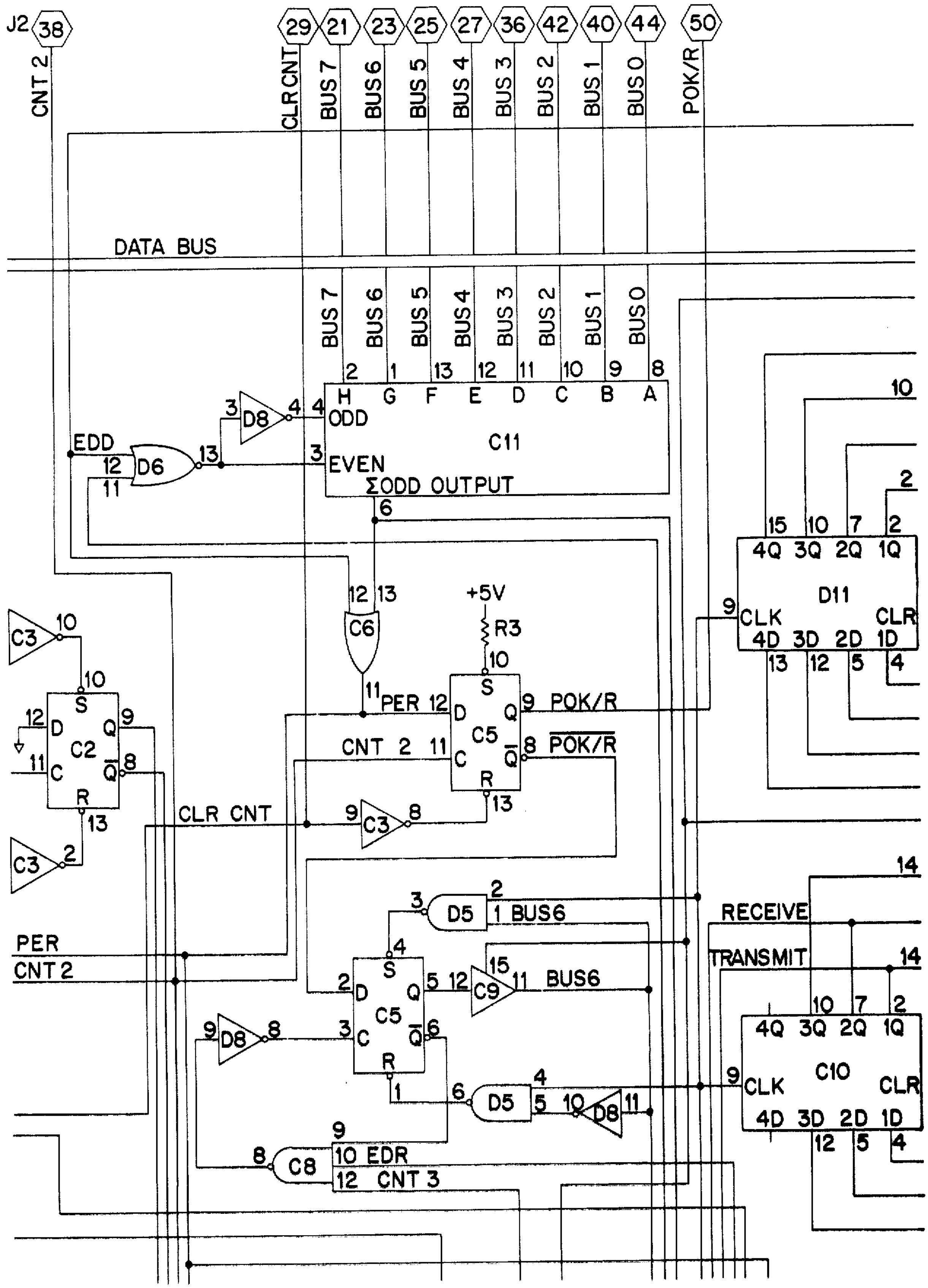
FIG._66B.

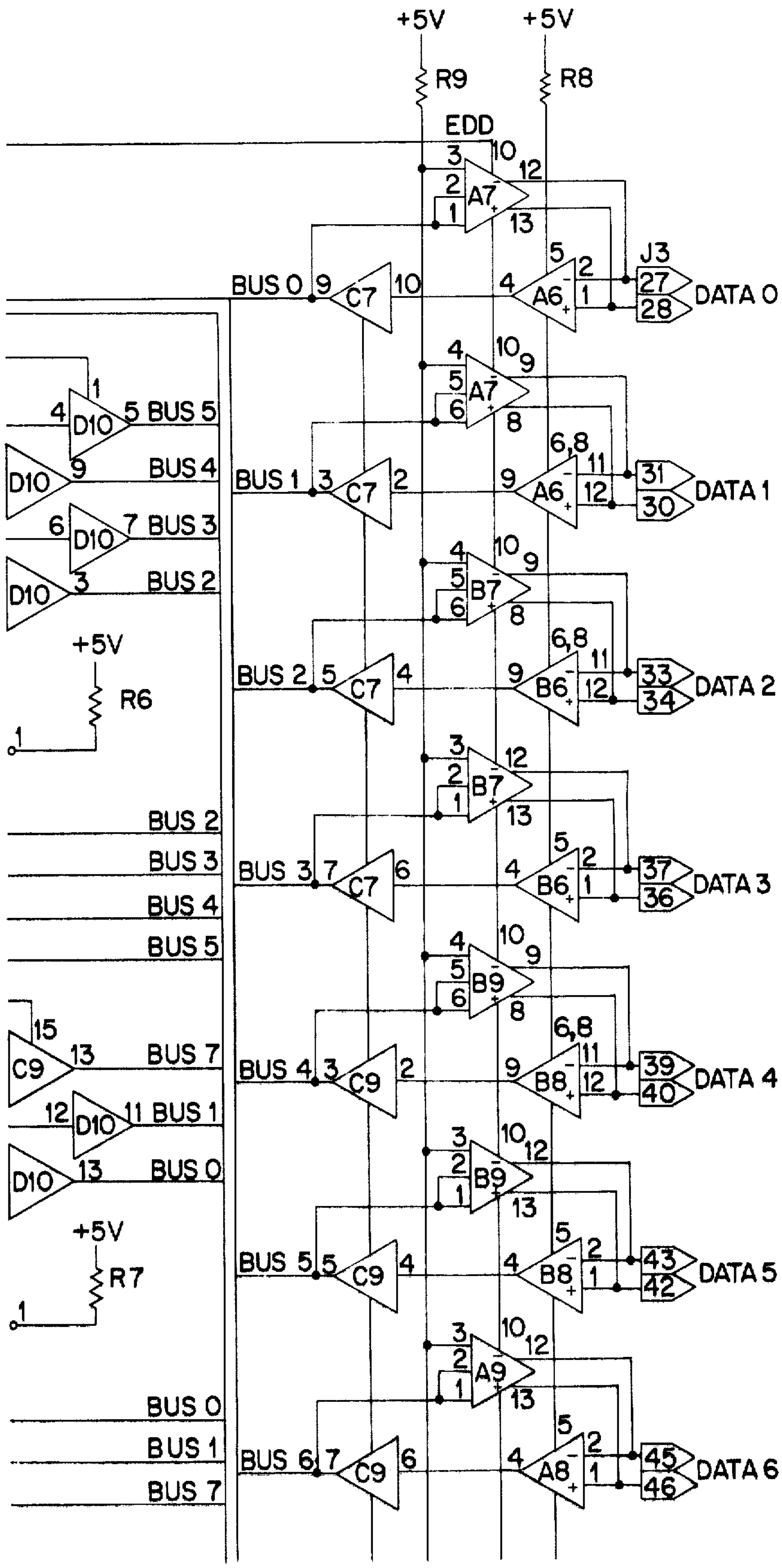
| | |
|---|---|
| A1 | 74154 |
| A2 | 7437 |
| A3, A4, A5, A6, A8 | 75107A |
| A7, A9 | 75110 |
| A11 | 74154 |
| B1 | 74LS30 |
| B2 | 74LS32 |
| B3, B6, B8 | 75107A |
| B4, B5, B7, B9 | 75110 |
| C1 | 74LS00 |
| C2 | 74LS74 |
| C3 | 74LS04 |
| C4 | 74LS20 |
| C5 | 74LS74 |
| C6 | 74LS32 |
| C7 | 8T97 |
| C8 | 74LS20 |
| C9 | 8T97 |
| C10 | 74LS175 |
| C11 | 74180 |
| D1 | 74LS10 |
| D2 | 74LS08 |
| D3 | 74LS27 |
| D4 | 74LS08 |
| D5 | 74LS00 |
| D6 | 74LS02 |
| D7 | 74LS32 |
| D8 | 74LS04 |
| D9 | 74LS27 |
| D10 | 8T97 |
| D11 | 74LS175 |
FIG.__66C.

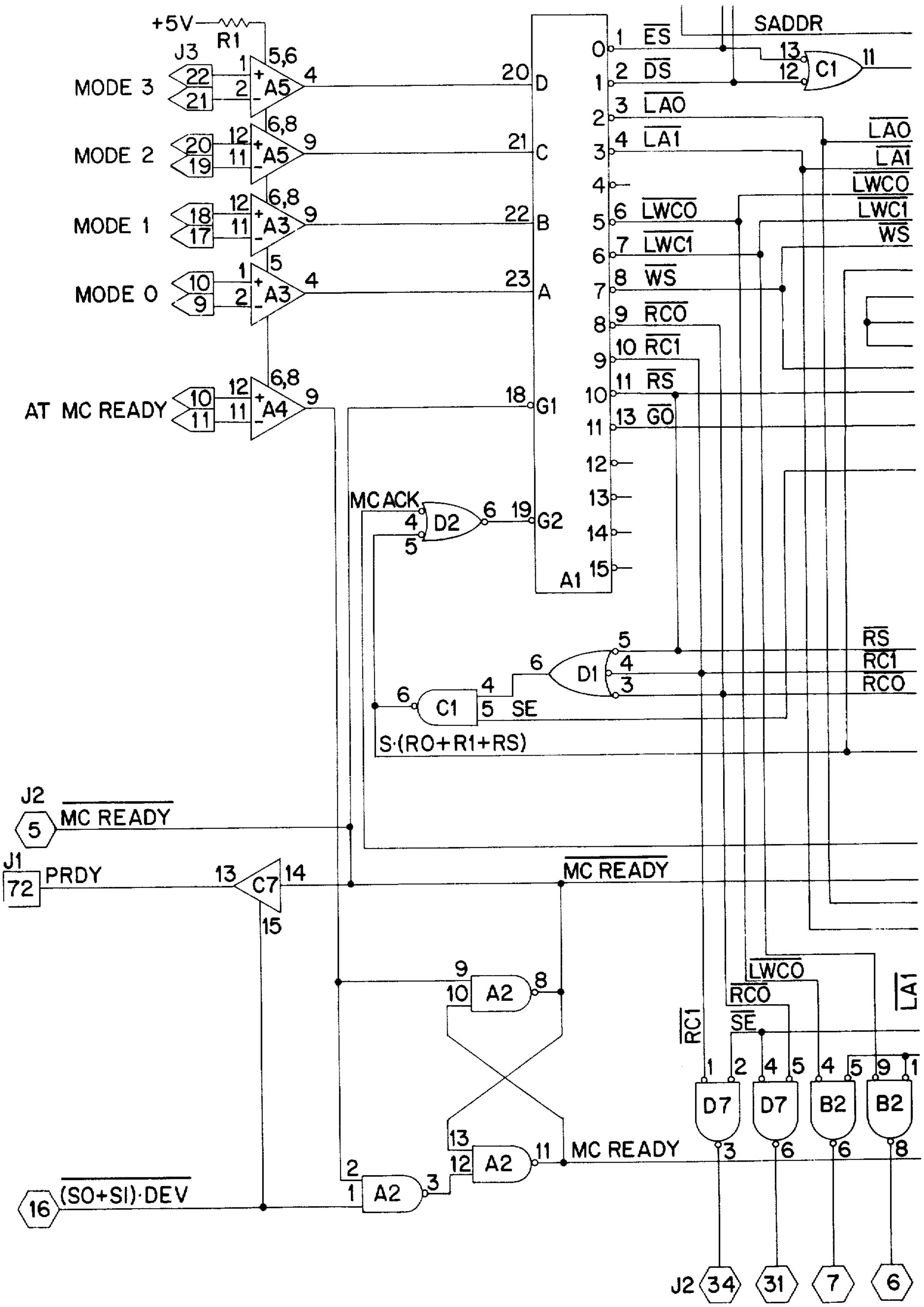
FIG._66D.

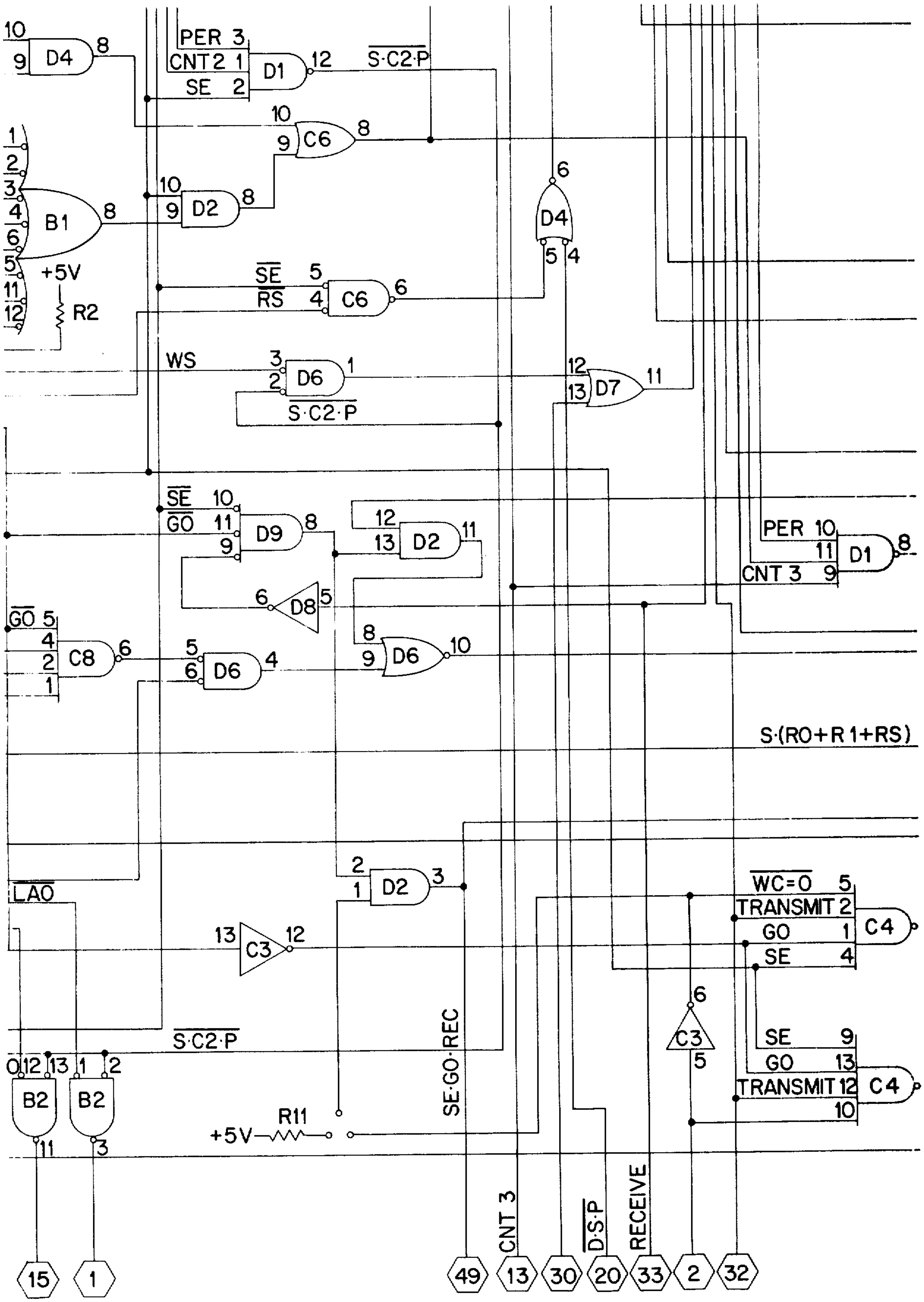
FIG._66E.

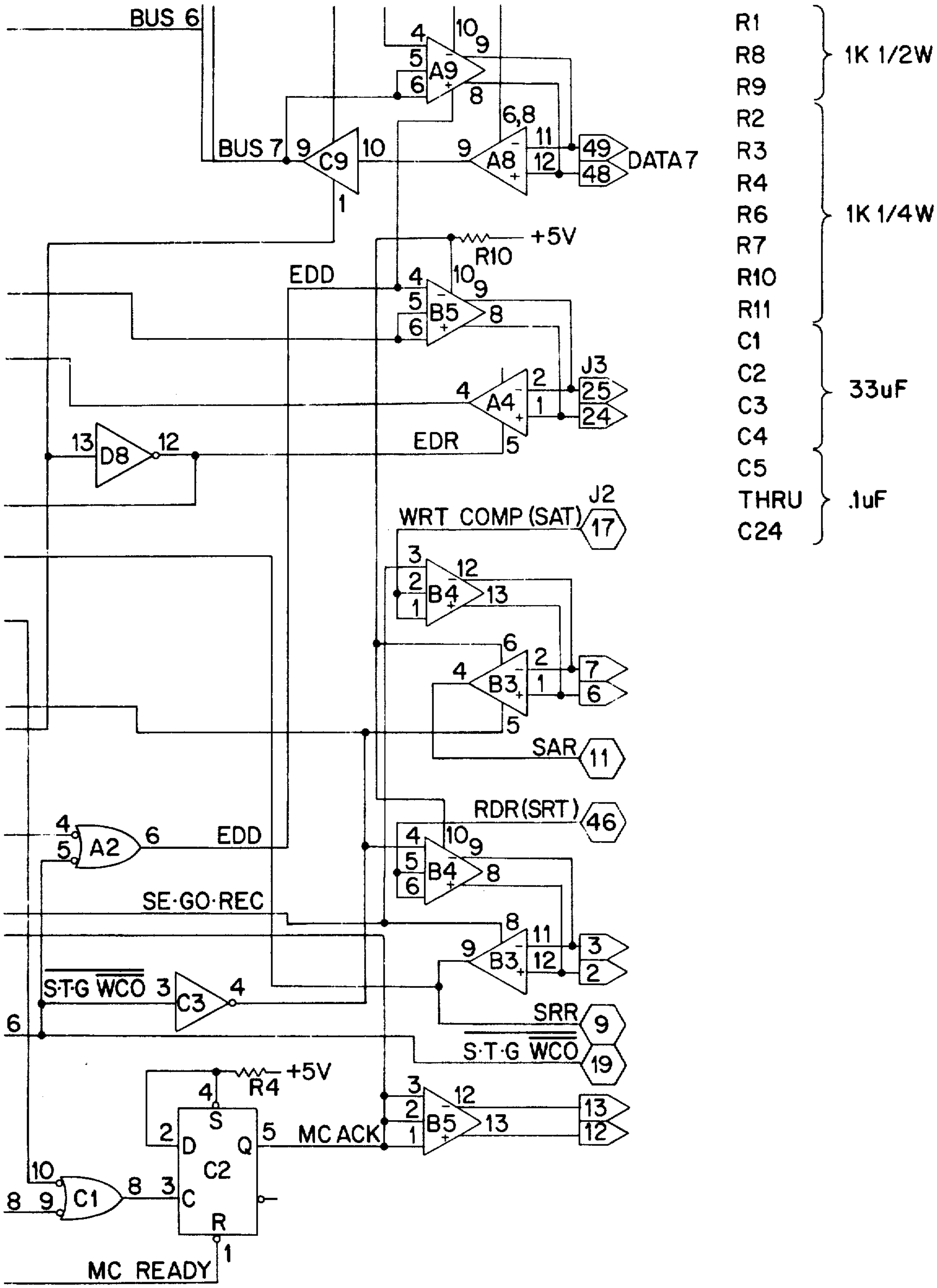
| | | |
|---|---|---|
| FIG._66A. | FIG._66B. | FIG._66C. |
| FIG._66D. | FIG._66E. | FIG._66F. |
FIG._66G.
FIG._66F.

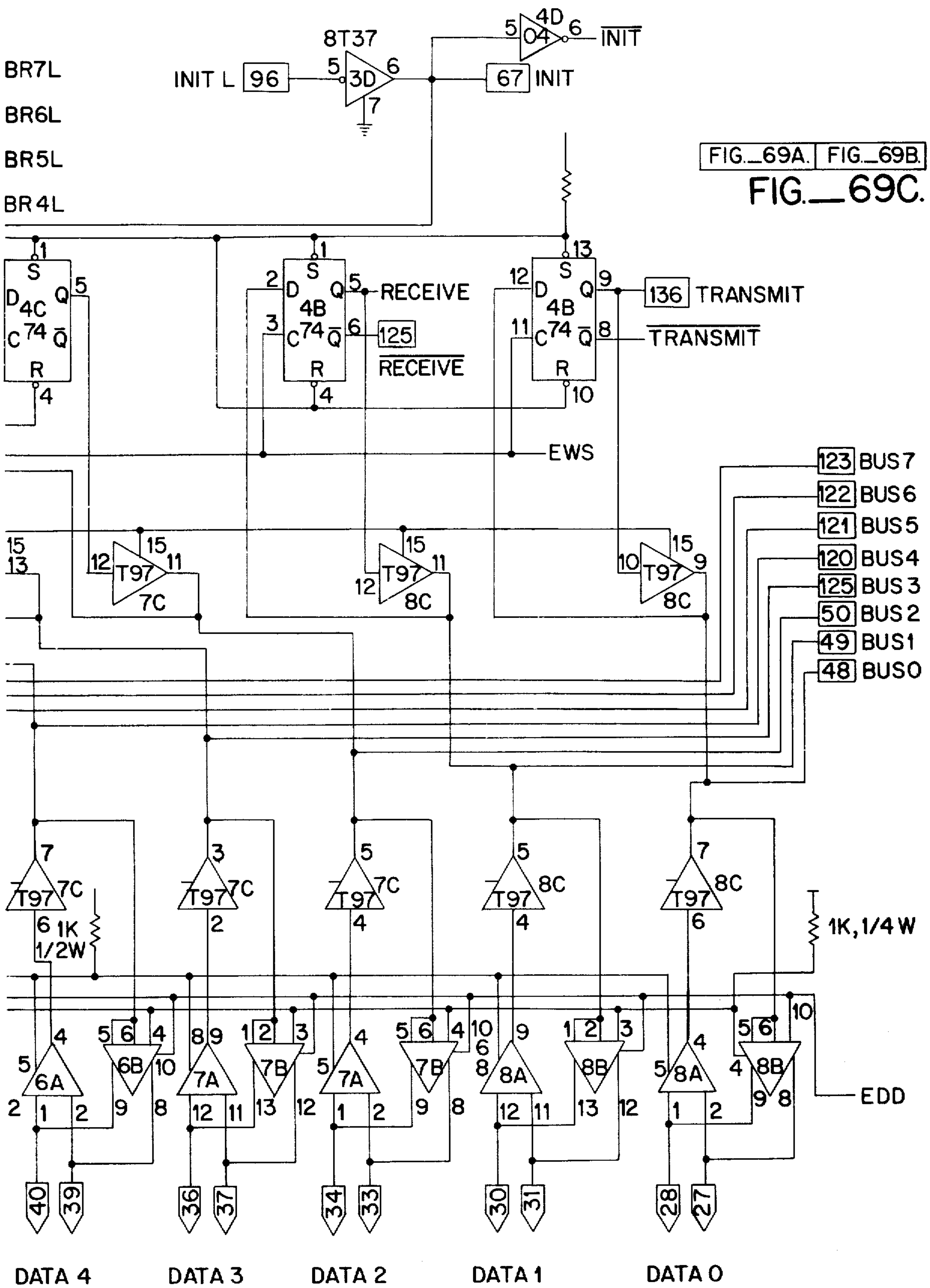
FIG._69B.

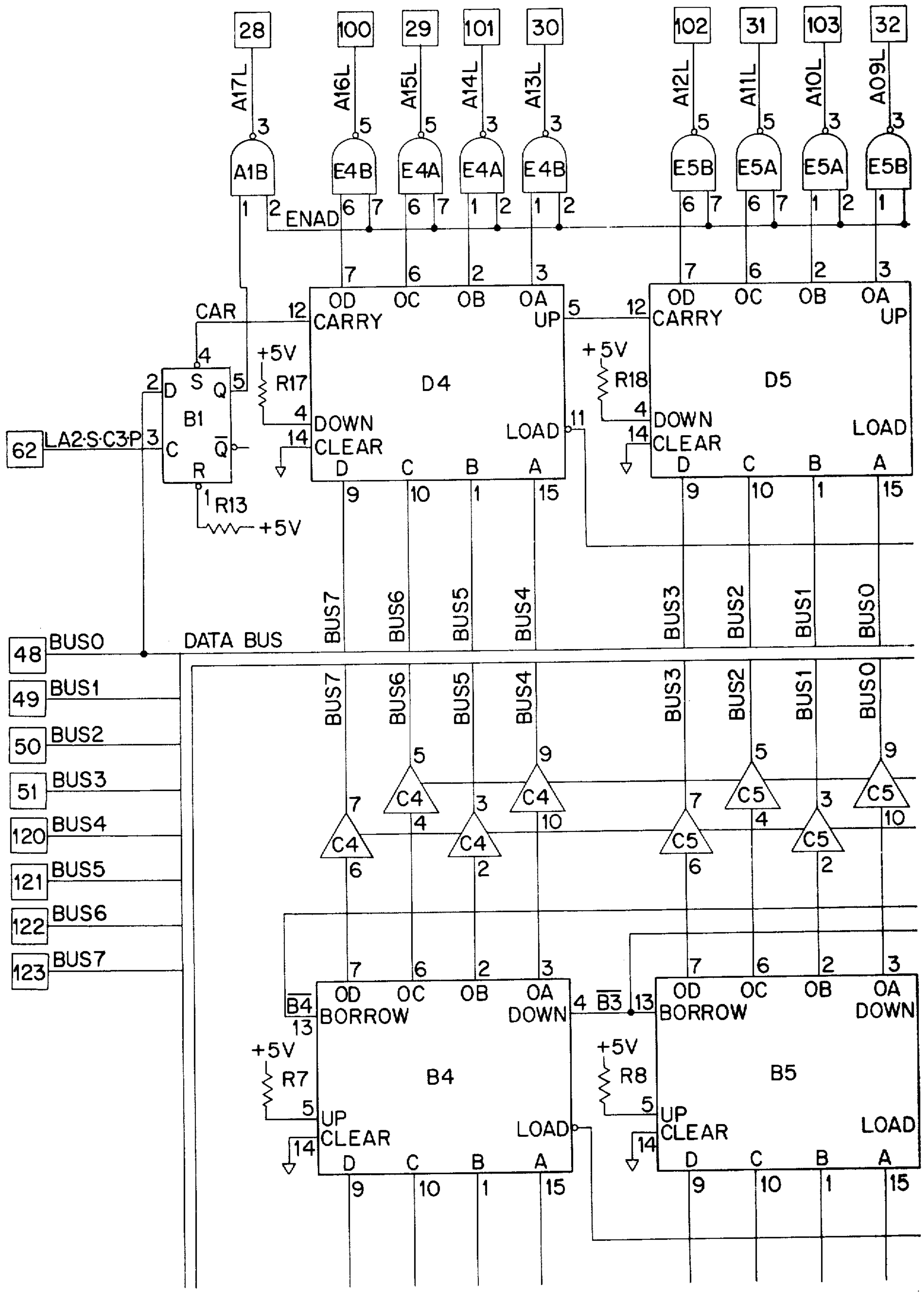
FIG._71A.

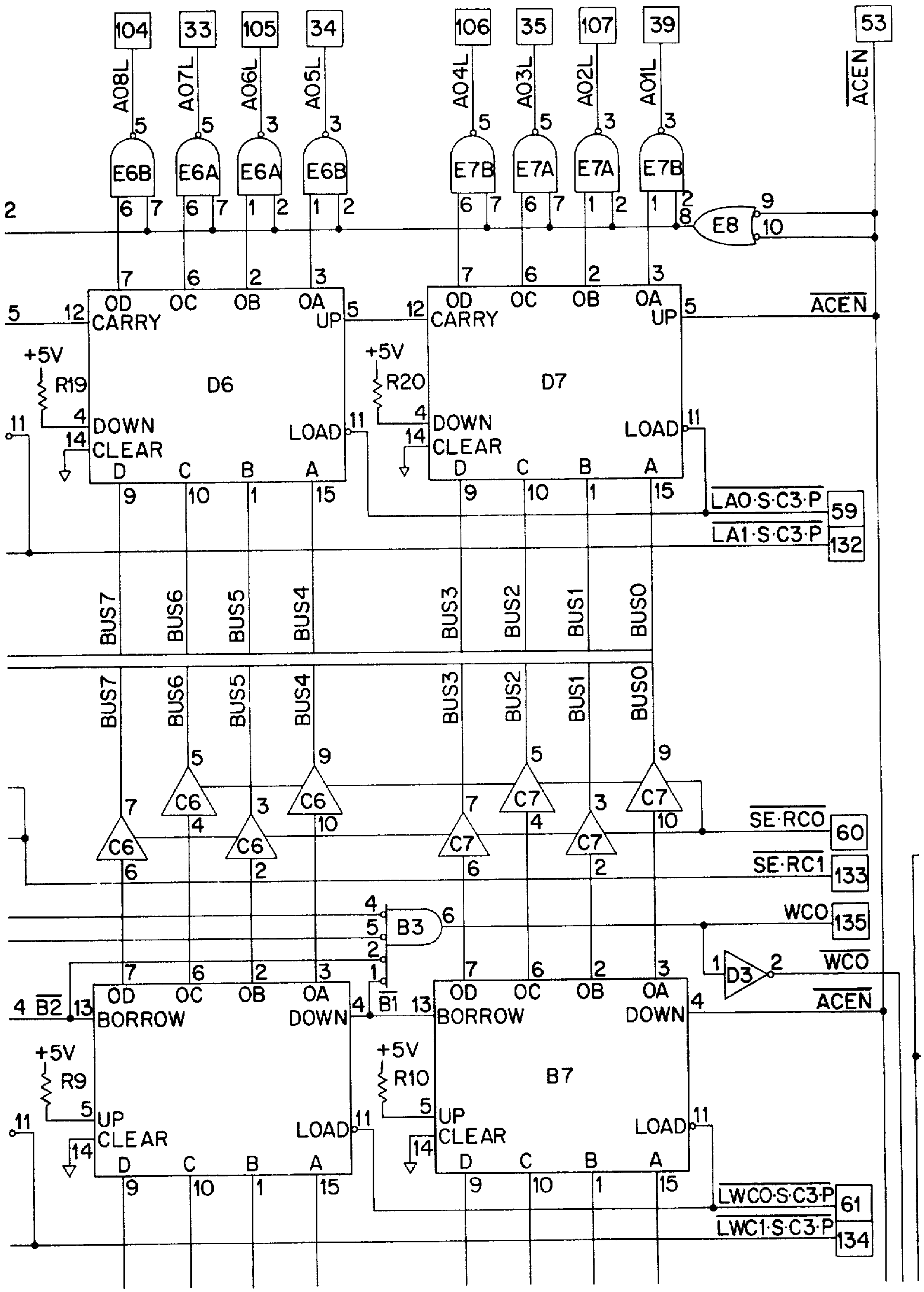
FIG._71B.

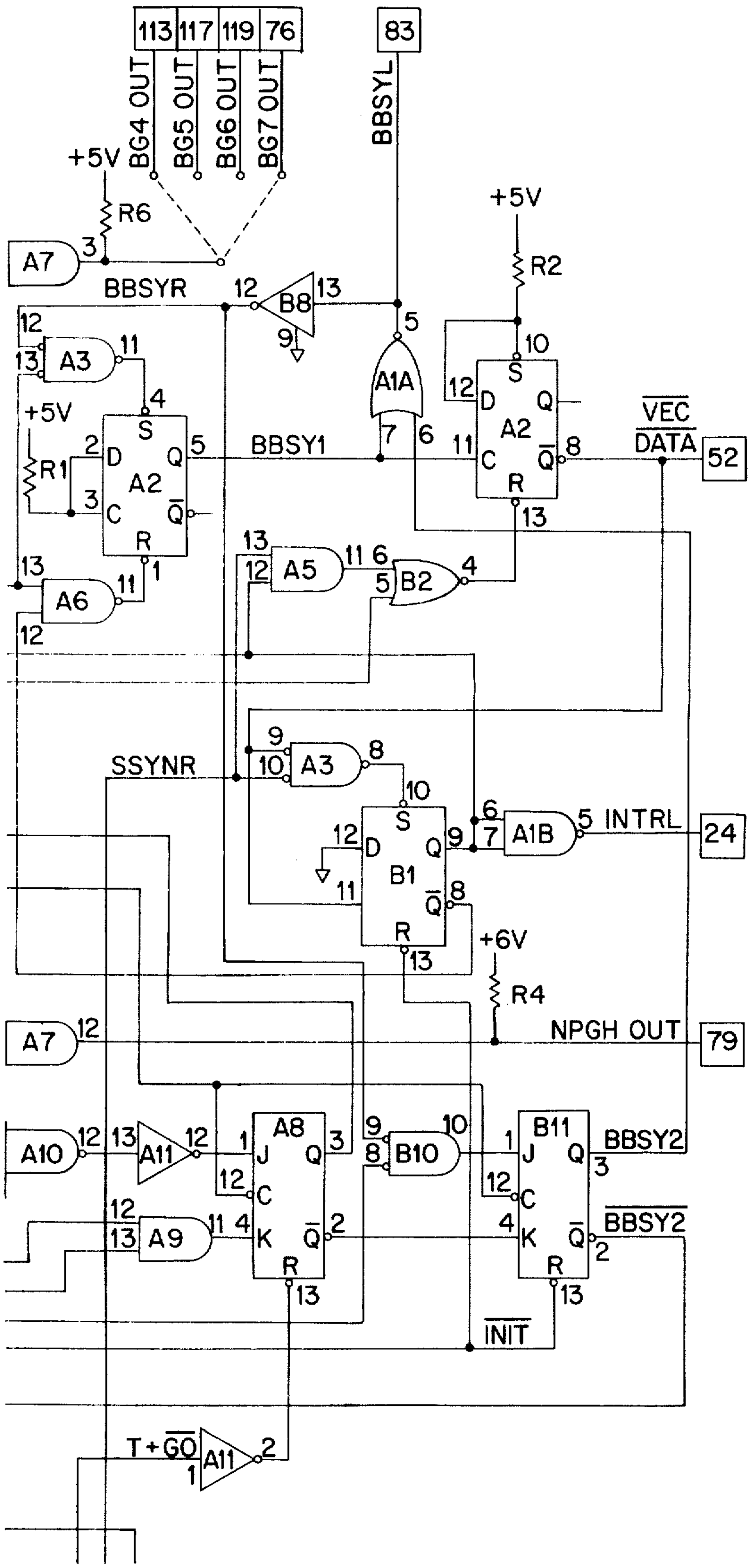
| | |
|---|---|
| A1A | 75454B |
| A1B | 75452B |
| A2 | 74LS124 |
| A3 | 74LS32 |
| A4 | 74LS74 |
| A5 | 74LS08 |
| A6 | 74LS00 |
| A7 | 75450B |
| A8 | 74LS107 |
| A9 | 74LS08 |
| A10 | 74LS10 |
| A11 | 74LS04 |
| B1 | 74LS74 |
| B2 | 74LS02 |
| B3 | 74LS25 |
| B4 THRU B7 | 74LS193 |
| B8 | 8T37 |
| B9 | 74LS74 |
| B10 | 74LS02 |
| B11 | 74LS107 |
| C1 | 74LS124 |
| C2 | 74LS193 |
| C3 | 74LS138 |
| C4 THRU C7 | 8T97 |
| C8 | 74LS27 |
| C9 | 74LS74 |
| C10 | 74LS08 |
| C11 | 74123 |
| D2 | 74LS27 |
| D3 | 74LS04 |
| D4 THRU D7 | 74LS193 |
| D8 | 75452B |
| D9 | 74LS02 |
| D10 D11 | 74LS74 |
FIG.—71D.

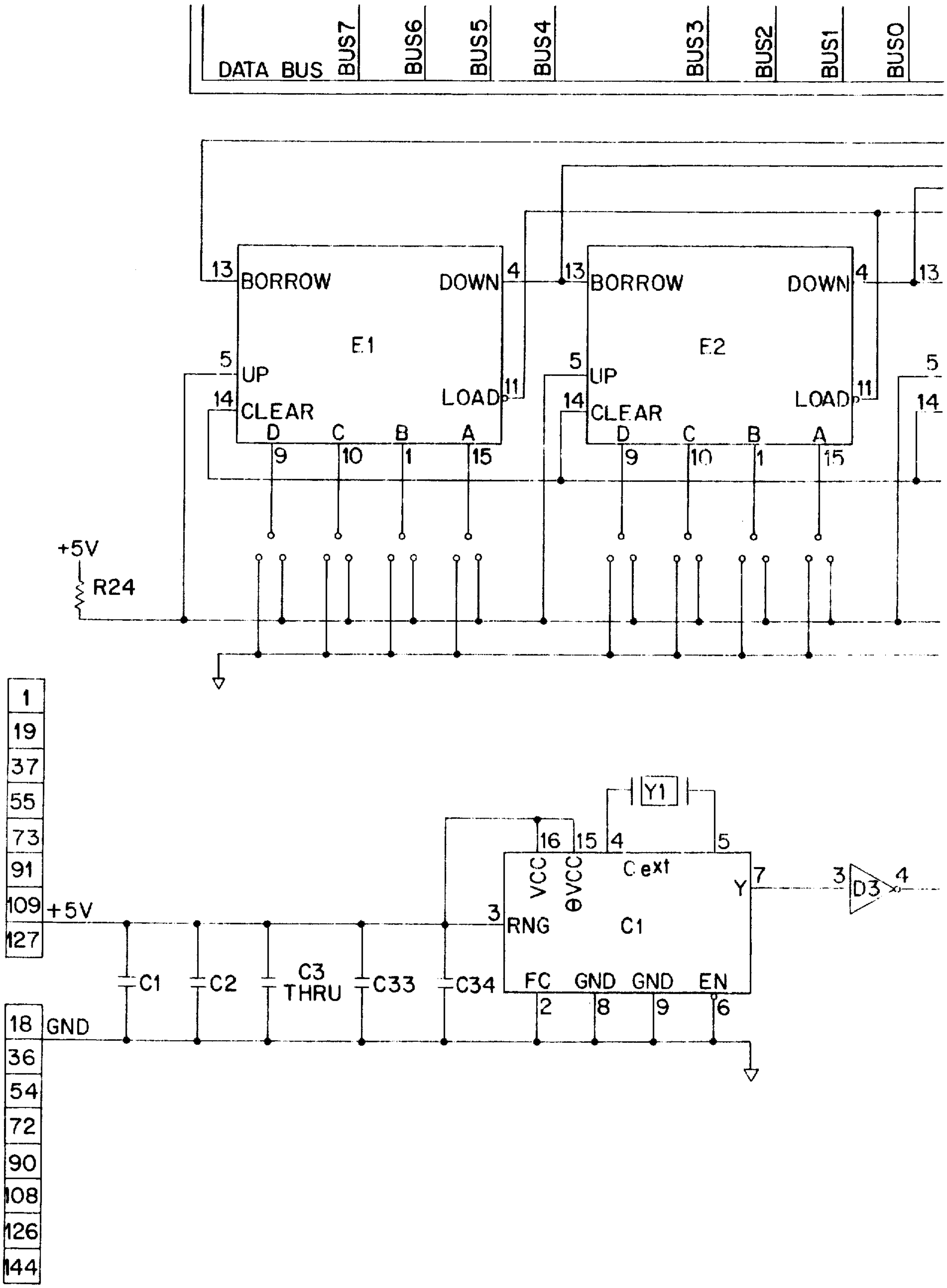
FIG._71E.

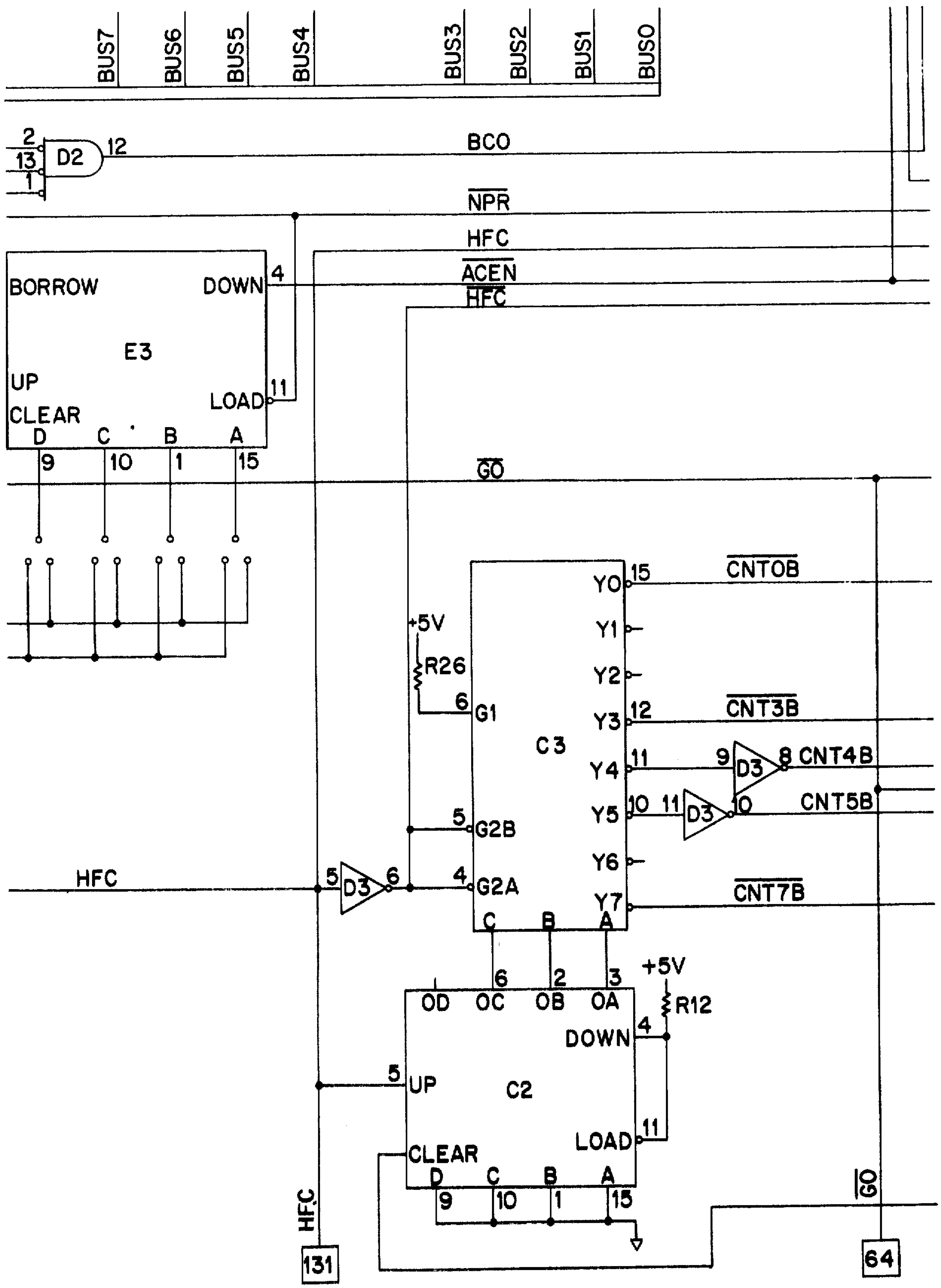
FIG._71F.

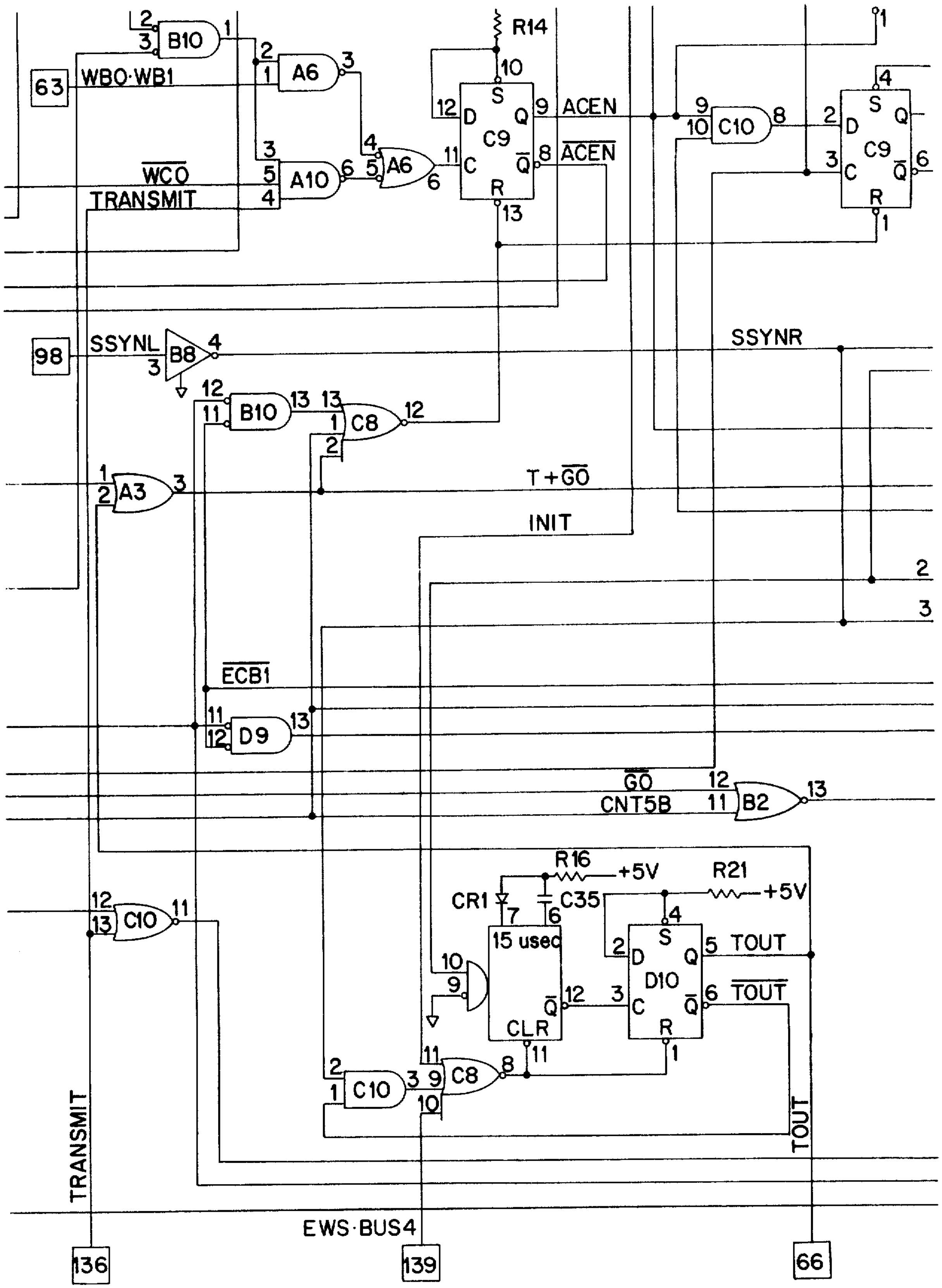
FIG.__71G.

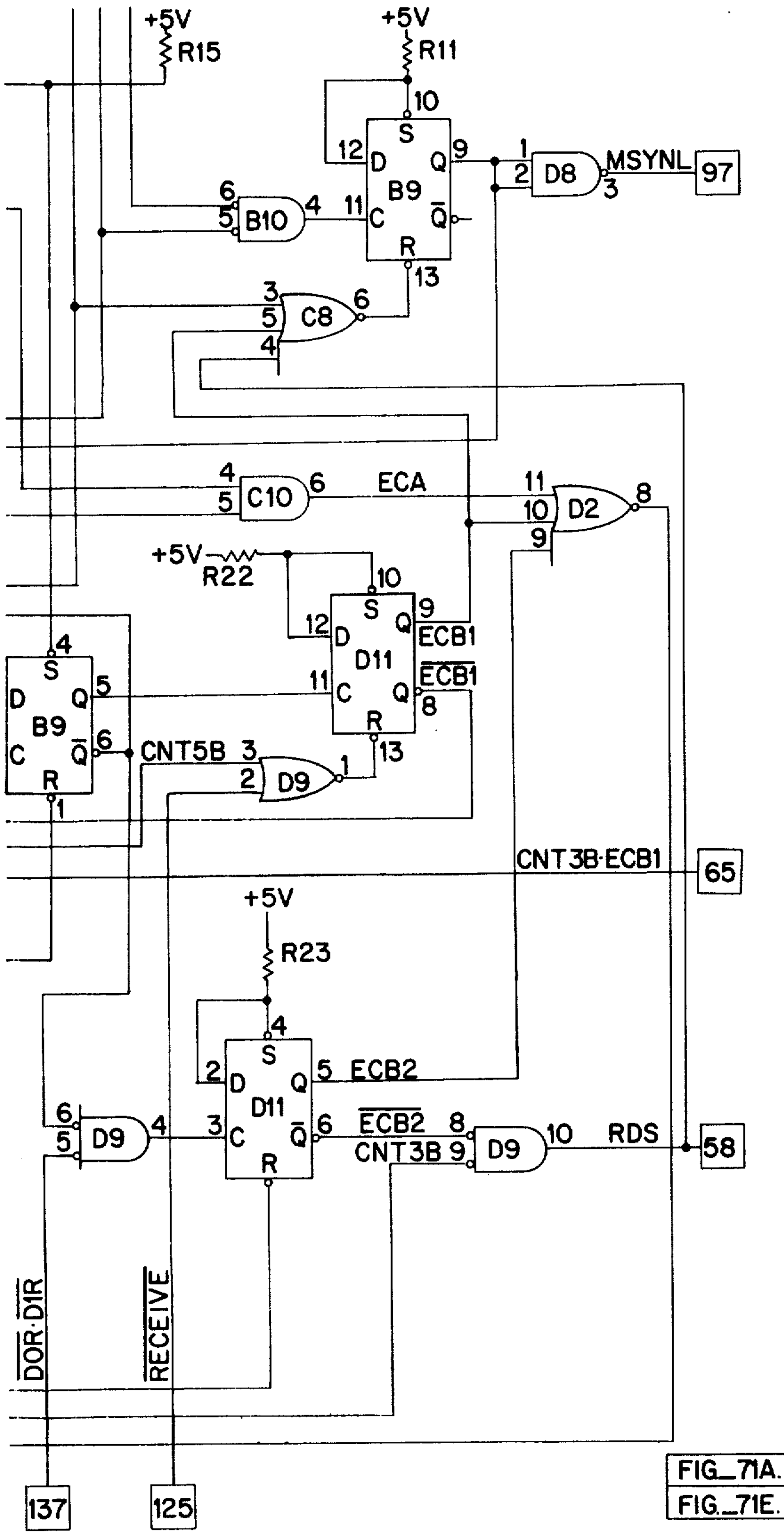
| | |
|---|---|
| E4A THRU E7A, E4B THRU E7B | 75452B |
| E1, E2, E3 | 74LS193 |
| E8 | 7437 |
| E9 | 75452B |
| C1, C2 | 33uf |
| C3 THRU C34 | .1uf |
| C35 | .005uf |
| CR1 | 1N914 |
| Y1 | 18 MHz CRYSTAL |
| R1, R2, R3, R5, R7 THRU R15, R17 THRU R24, R26 | 1K, 1/4 W |
| R4, R6, R16 | 178, 1/4 W |
| R25, R27 | 383, 1/4 W |
| | | | |
|---|---|---|---|
| FIG_71A. | FIG_71B. | FIG_71C. | FIG_71D. |
| FIG_71E. | FIG_71F. | FIG_71G. | FIG_71H. |
FIG._71I.
FIG._71H.

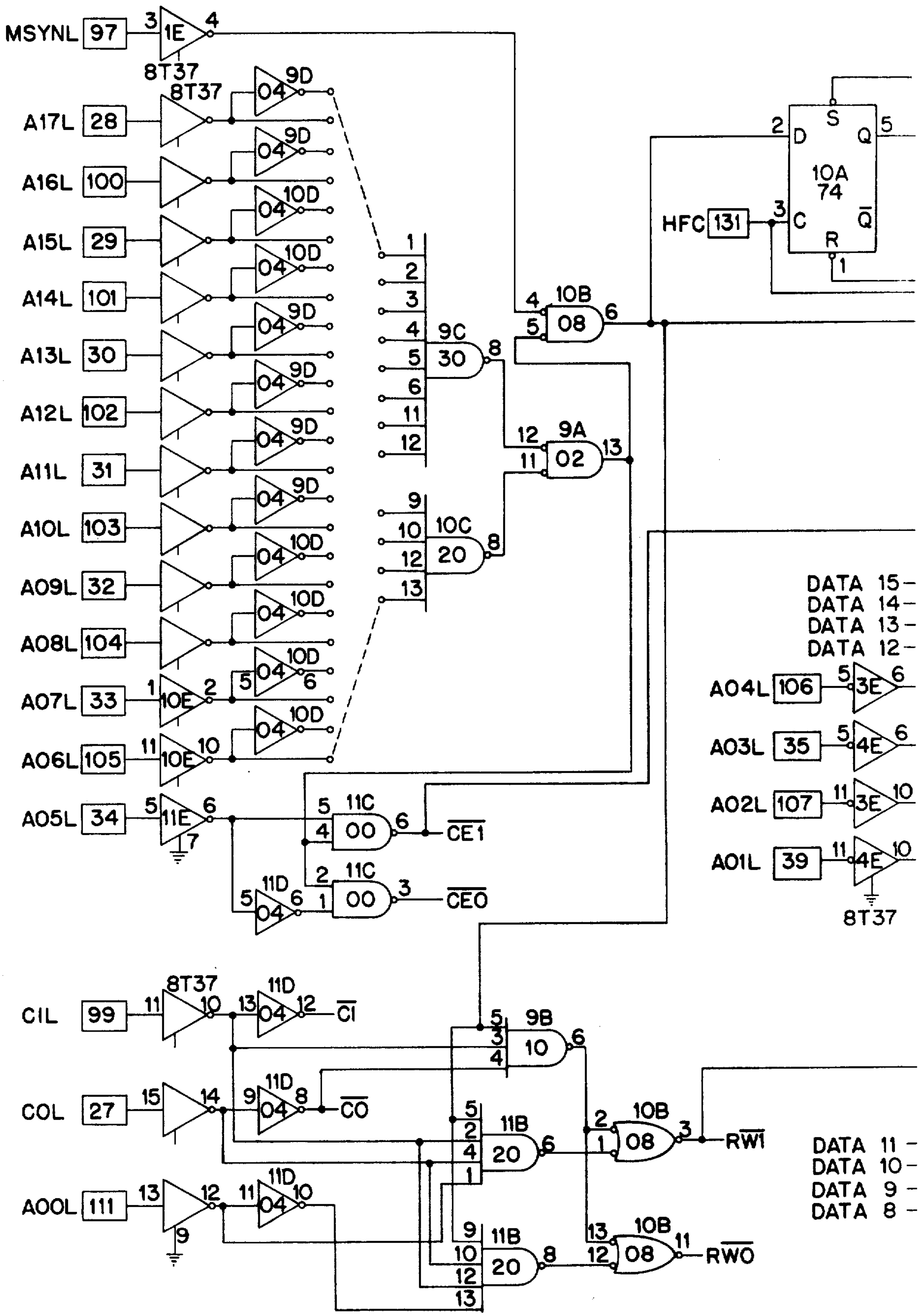
FIG.__72A.

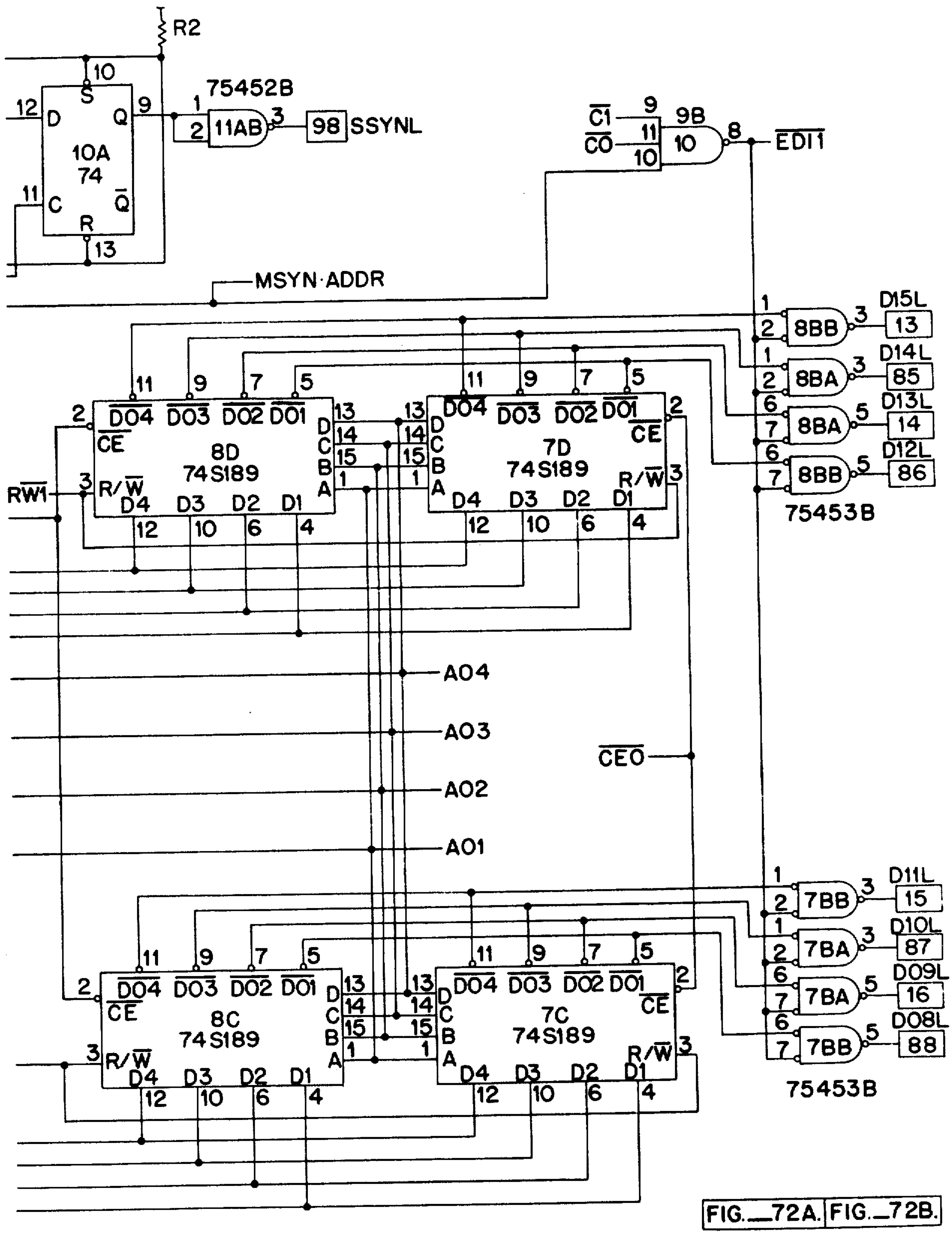
FIG.—72C.
FIG.—72B.

FIG._74.

DMAB CIRCUIT AND LAYOUT

INFORMATION STORAGE FACILITY WITH MULTIPLE LEVEL PROCESSORS

TABLE OF CONTENTS

Abstract of Disclosure
Background of the Invention
Summary of the Invention
Brief Descripton of the Drawings
Description of the Preferred Embodiments
General System Operation
Syntax
Commands and Responses
System Hardware
  Processors
    MPU
    RAM4
    PROM4
    P10
    S10
    PIC-8
DMAB
Detailed System Operation
  Communications Level
  DBMS Level
  Storage Level
System Software
  Introduction
  System Symbols/MACROS
  Communications Level
  DBMS Level
  Subroutines (all levels)
  Storage Level

BACKGROUND OF THE INVENTION

This invention relates to digital information storage systems of the type accessible by a central processing unit.

Digital information storage facilities are known which are designed to store large quantities of information in digital form and which are normally accessible by a general purpose digital computer. In such systems, the digital information is typically stored on magnetic record media, such as disk packs or magnetic tapes and forms a data base of user information, such as inventories, payroll and accounting records, weather data, seismic data and the like. The storage facility is normally associated to a general purpose digital computer capable of extracting information from the record media, processing the extracted information and returning processed information to the record media.

In the past, all significant data processing functions have been performed in the host digital computer, and the information storage facility has functioned merely as a slave to the host computer or at best as a simple fixed location single key search, and has been provided with a functional capability of merely transferring information thereto. In a typical installation, the host computer is provided with a resident program for specifying the manner in which information is to be processed and, once operational, one or more application programs are performed step by step in the host computer until a step in a given program is reached which requires information from the storage facility. Thereafter, further activity in the specific program is terminated and the host computer transmits a request to the information storage facility to retrieve a first index block. That block of information is located and transferred to buffer storage in the host computer after which the computer searches for a reference, commonly termed a pointer. Once the pointer has been located, another index block is requested by the host computer and transferred from the storage facility to the host computer buffer storage, after which the second index block is searched for an additional pointer. This process continues for several iterations until the particular record block has been located in the storage facility and transferred to the host computer, whereupon the application program may be resumed. The application program then must extract the individual data item of interest. Each transfer of information between the host computer and the storage facility requires a high speed data path in order for the process to operate with some degree of efficiency, which in turn requires that the host computer be in close physical proximity to the information storage facility. This requirement of close physical proximity is inconvenient in some applications and totally undesirable in others.

An even greater disadvantage to known systems of this type is the fact that a large percentage of the functional capability of the host compouter is diverted from the execution of the application program, and thus wasted, due to the relatively large amount of computer time spent in obtaining a file, record or item from the information storage facility. As the size or use of the data base expands, the amount of host computer time spent on index retrieval and searching expands accordingly, which renders known systems of this type even more inefficient. While some information storage facilities have been designed for use with more than one host computer, such systems have not remedied the disadvantages noted above.

SUMMARY OF THE INVENTION

The invention comprises an information storage facility provided with plural levels of processing capability, which permits symbolic access by the host computer to information stored therein and frees the host computer to perform processing functions while information is being stored in and retrieved from the storage facility. In addition, the invention is entirely expandable and can be tailored to meet the exact requirements of any data base.

In its most general aspect, the system comprises three processing levels, viz. a communications level, a data base management system (DBMS) level, and a storage level, with the central DBMS level separated from the other two levels by a pair of shared memory units. Communications between processors and/or levels is accomplished via shared memories and/or Direct Memory Access (DMA) bus, which bus may optionally be controlled by a separate processor. In all implementations, the use of the DMA bus may be incorporated to supplant or supplement the use of shared memory. The communications level processor is configured to communicate with a host computer. an intelligent terminal or other processor devices on either a serial, parallel or DMA basis and performs all communication functions with such external devices, such as handshake, protocol and the like. The communications level processor exchanges information with the DBMS level processor by means of a first shared memory unit, and is dedicated to predetermined external processors. The storage level processor is configured to operate the associated storage devices, such as tape memory transport or, in the preferred embodiment, one or more disk storage devices and performs data storage and retrieval, error recovery and storage device management. The storage level processor communicates with the DBMS level processor via a second shared memory unit. The DBMS level processors are configured to perform syntax scanning functions and hashing and coding/decoding routines, as well as all data access functions including indexing, searching, buffering, blocking, deblocking, storage management, and error recovery functions.

The one or more processors at each of the three levels is also configured to perform mailbox routines whereby requests or responses are cached in the appropriate adjacent shared memory facility for use by one of the processors at the appropriate adjacent level. For example, a request from the communication processor to the DBMS processor is transferred via a mailbox in the shared memory unit coupled therebetween, while the request from the DBMS processor to the storage level processor is transmitted via a mailbox in the shared memory unit therebetween. In all cases describing messages, commands and/or data as moving via shared memory mailboxes, this implementation can be augmented or supplanted by use of a DMA bus facility, to move any of the above classes of information.

The system architecture is modular so that each processor level and each shared memory unit may be expanded or contracted as dictated by the requirements of any given application. Thus, the system can grow along with an expanding data base or an expanding number of external processor devices by simply inserting additional processor and/or shared memory modules.

In operation, each processor at each level is continuously searching for a task to perform. When an incoming message is received, it is acknowledged by the communications level processor associated to the particular external processor at which the message originated, processed into a DBMS level request and placed in a mailbox in the shared memory unit juxtaposed between the communications level and the DBMS level. The cached request is fetched from that mailbox by a DBMS processor which translate the request into DBMS routines necessary to perform the tasks inherent in the originally received message. The tasks required at the storage level are placed in a mailbox in the shared memory unit juxtaposed between the DBMS level and the storage level. The storage level processor fetches these tasks and directs the required operation of the data storage devices associated thereto. Informaton flow from the storage level to the communications level proceeds in reverse fashion.

Each processor at each level is provided with a resident program preferably stored in a programmable read only memory (PROM) for supervising and directing operations thereof. The communications level processors are additionally provided with both serial and parallel input/output devices to permit communication with external processors, which may be remote or proximate; while the storage level processors are each associated to a storage controller, such as a disk controller to permit data storage and retrieval, as well as error recovery and disk management.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a general system block diagram illustrating the invention;

FIGS. 3A–E and 4A–F are circuit schematics of the microprocessor unit and RAM memory units, respectively;

FIG. 4G is a diagram of a jumper socket for the RAM of FIG. 4;

FIGS. 5A–E are circuit schematics of the PROM unit;

FIGS. 5F and G are jumper diagrams for the FIG. 5 PROM unit;

FIGS. 6A–E are circuit schematics of the PIC 8 unit;

FIGS. 6F–H are jumper diagrams for the FIG. 6 unit;

FIGS. 7A–G are schematic diagrams of the SIO unit;

Figure 7A:
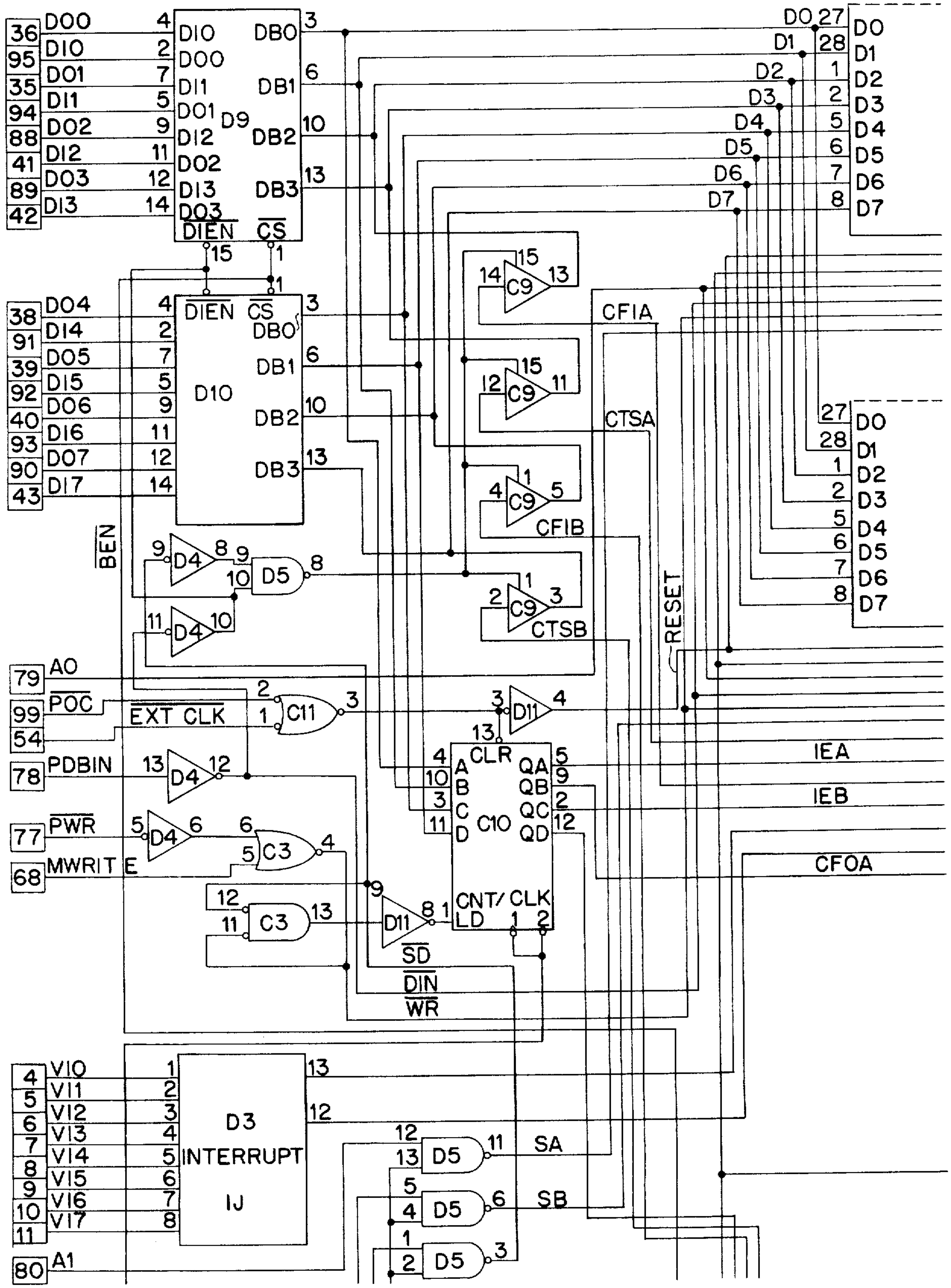
Figure 7E:
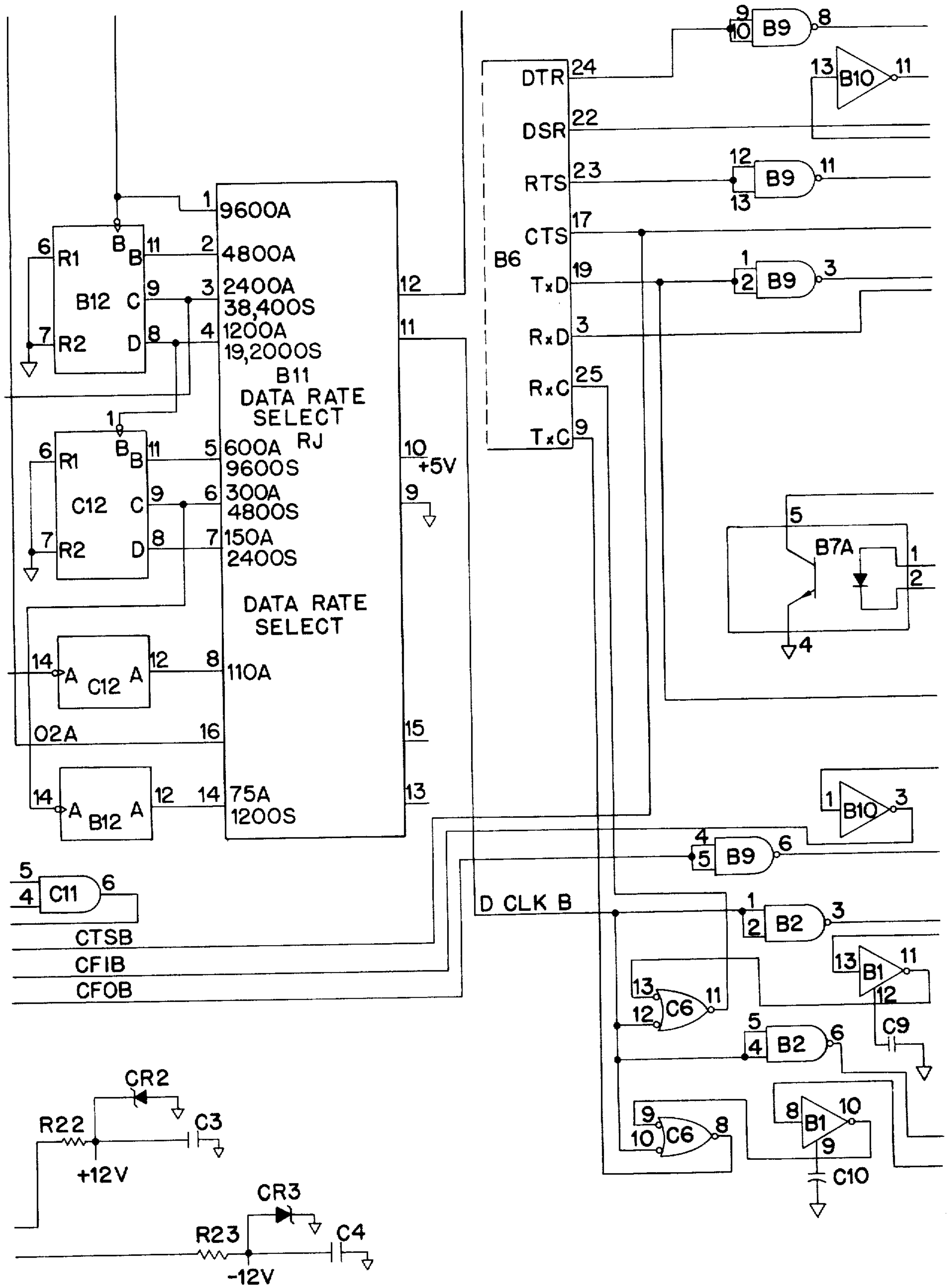
Figure 8A:
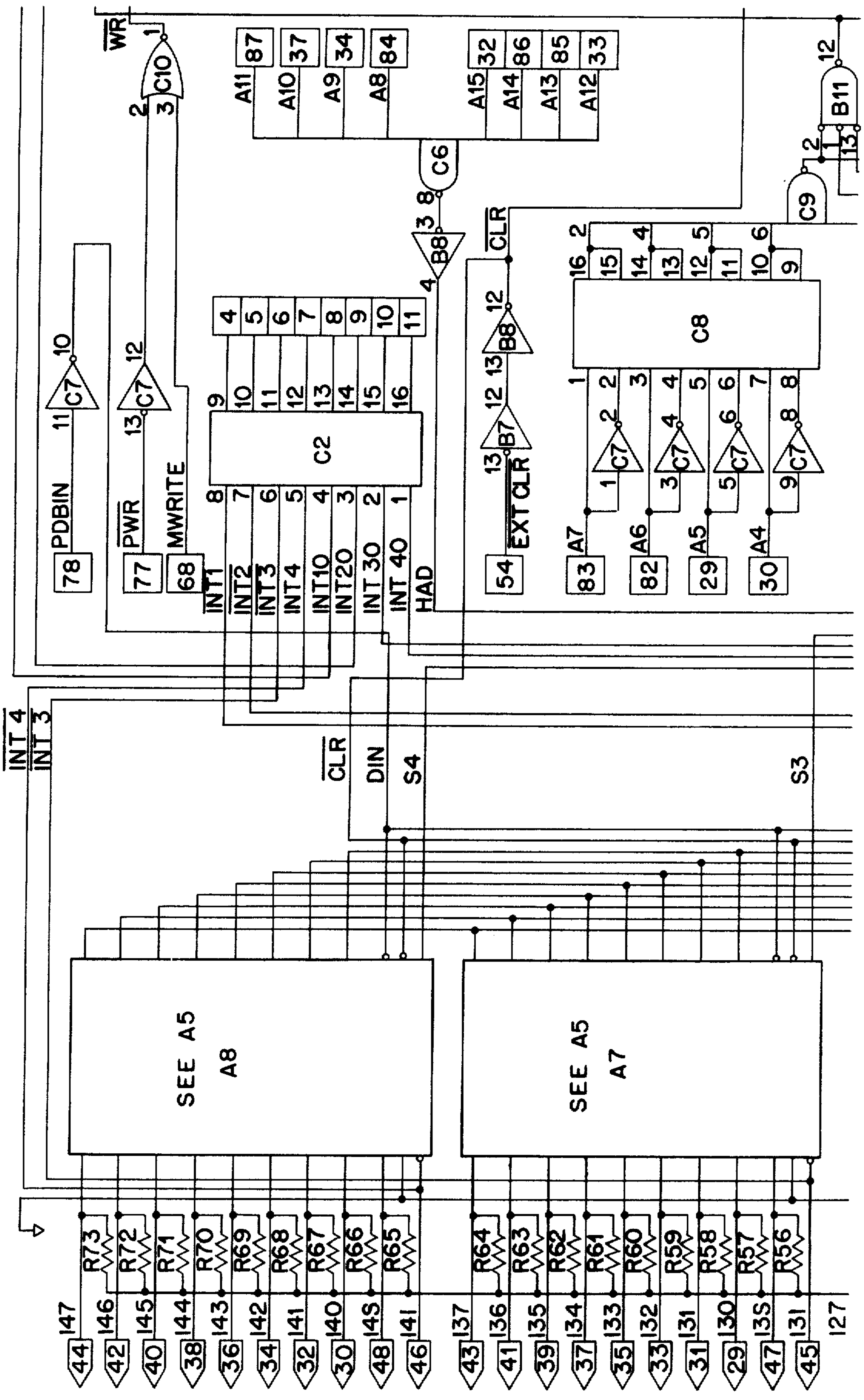
Figure 12A:
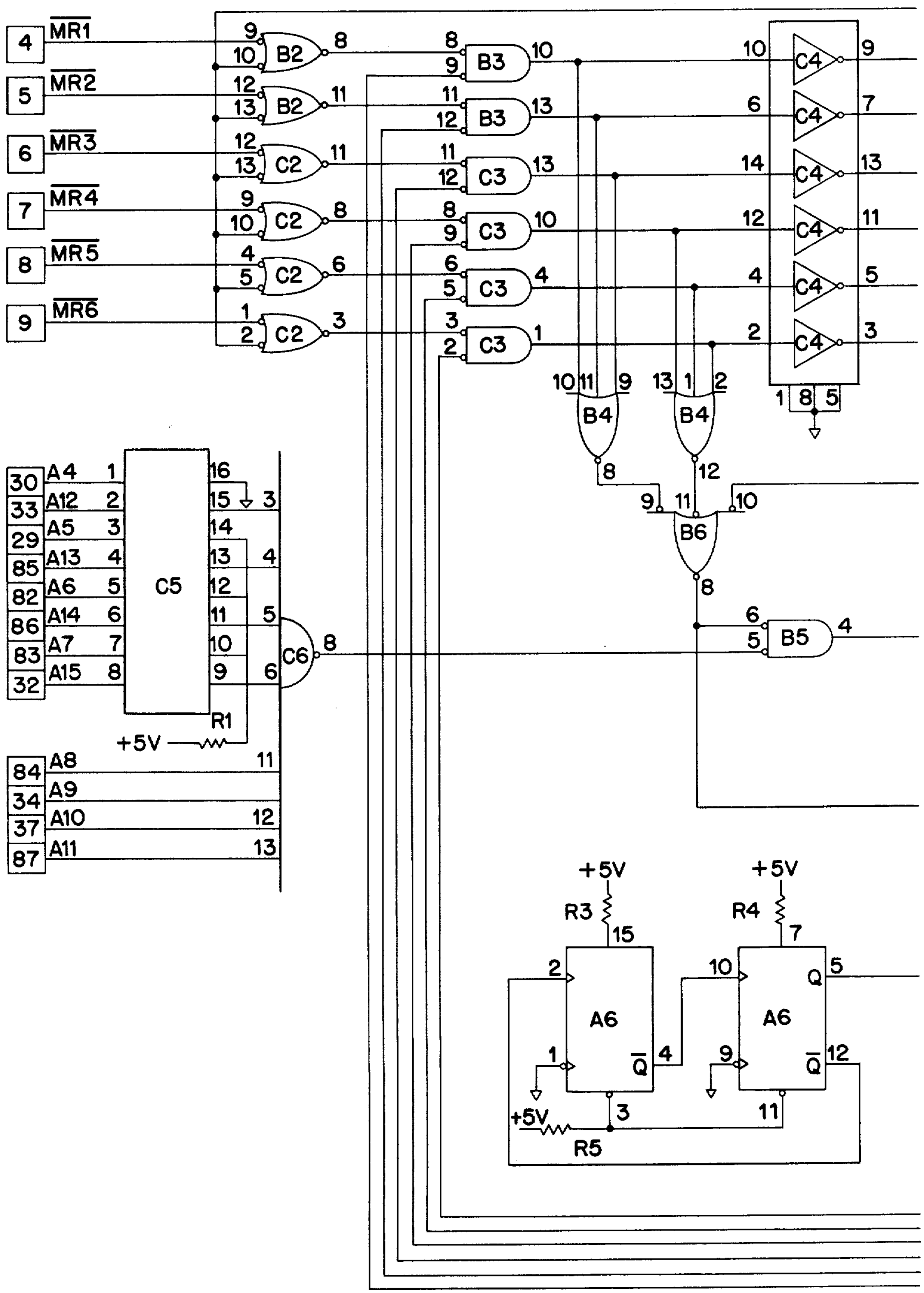
Figure 14A:
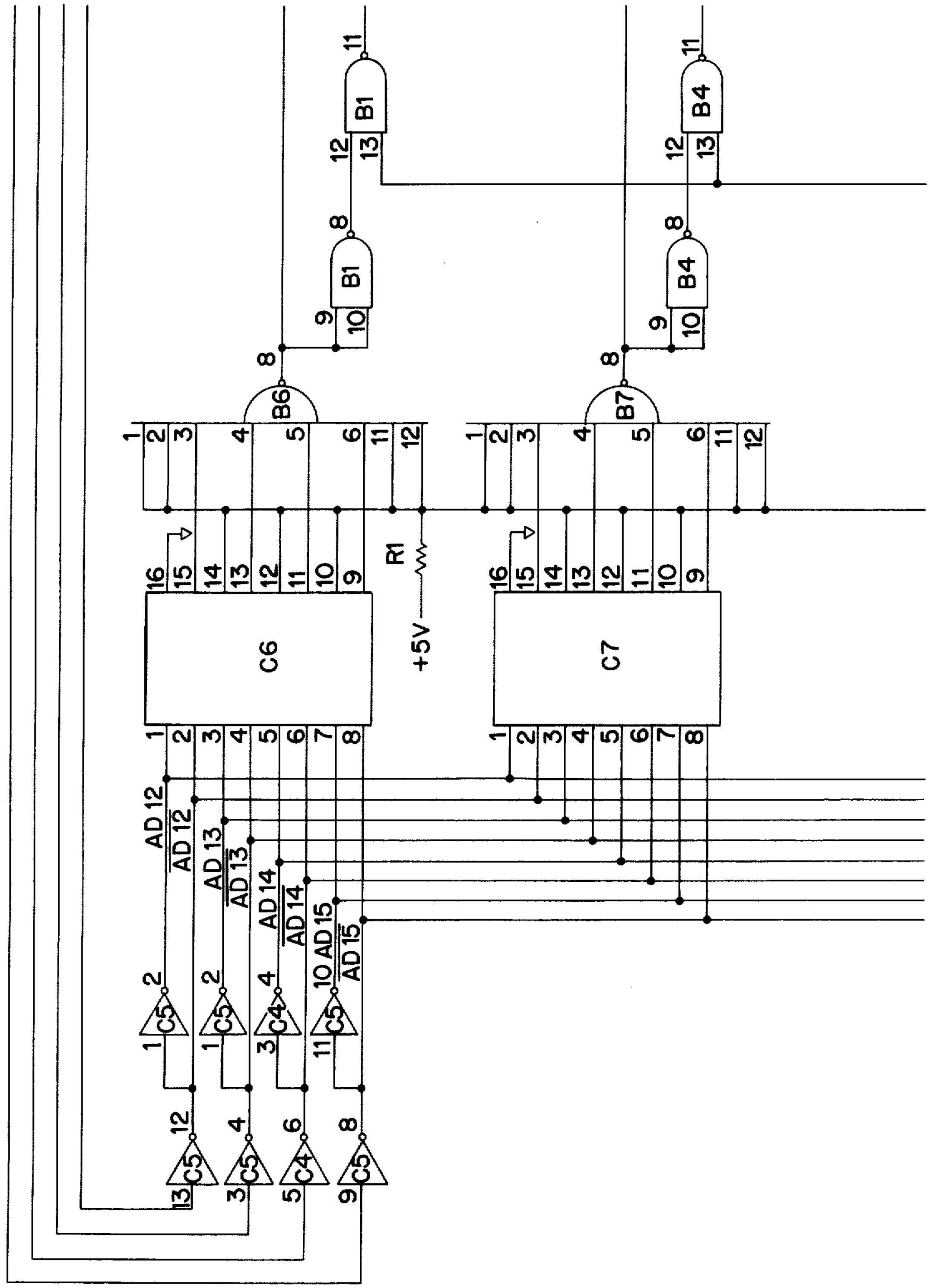
Figure 24:
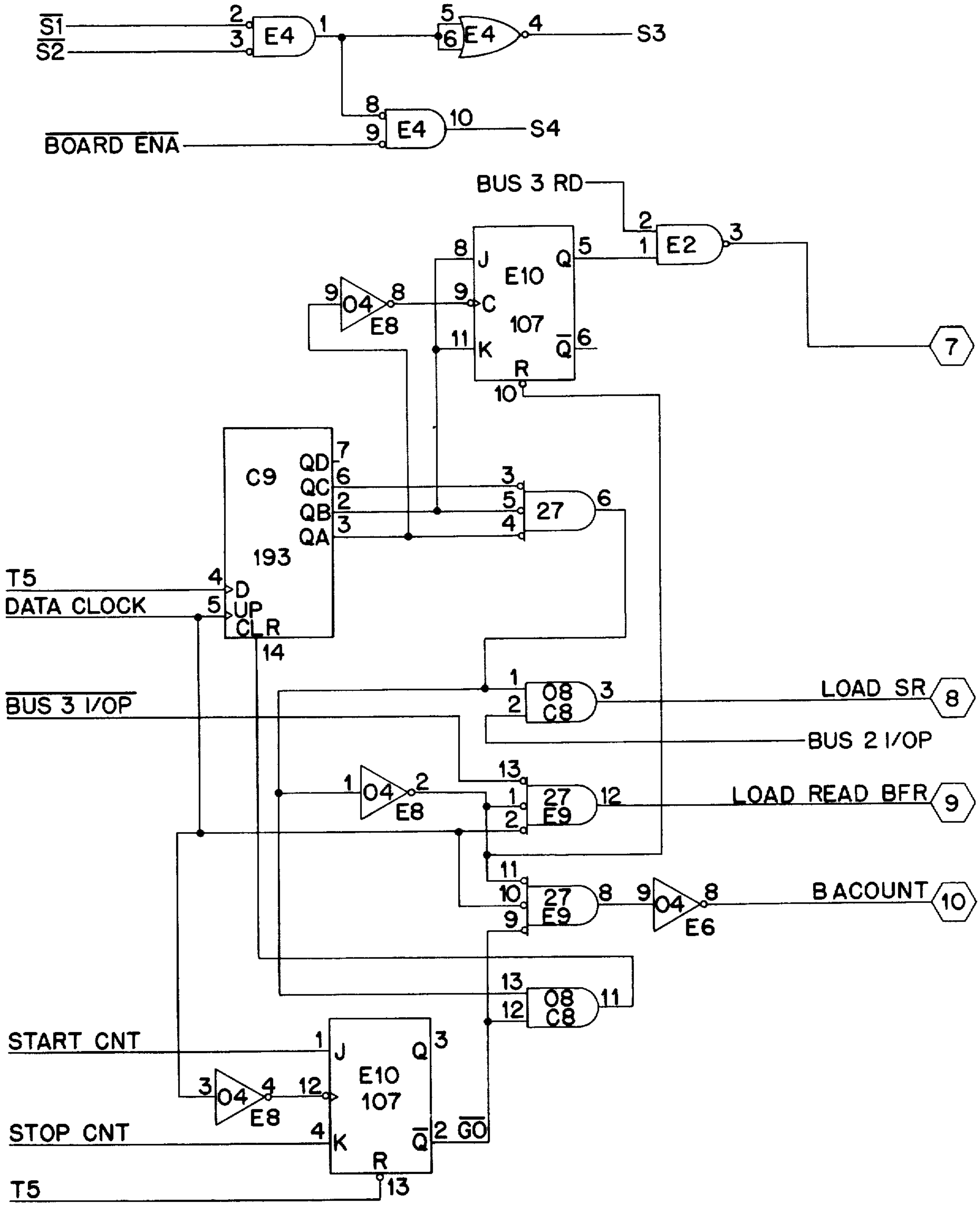
Figure 32:
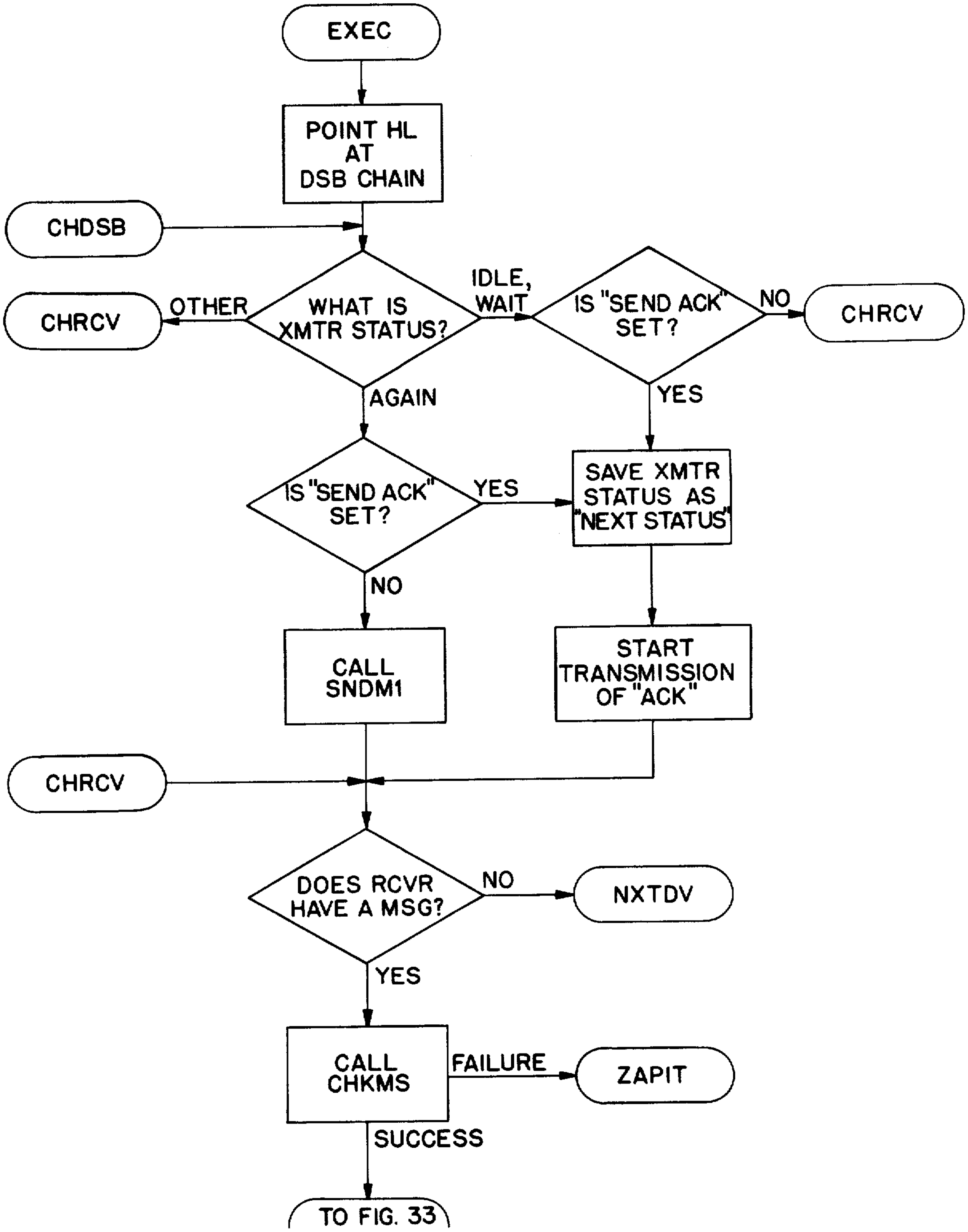
Figure 33:
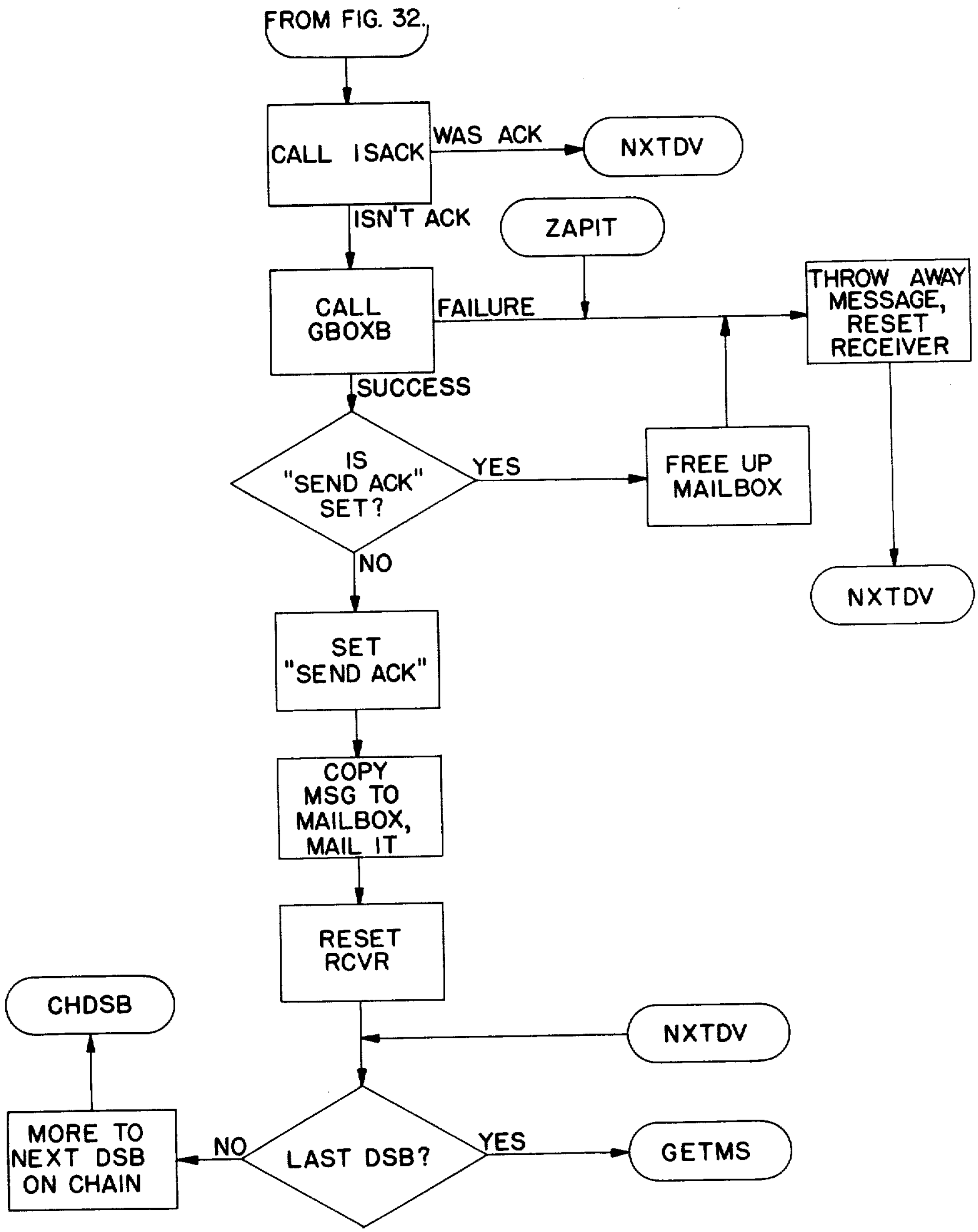
Figure 34:
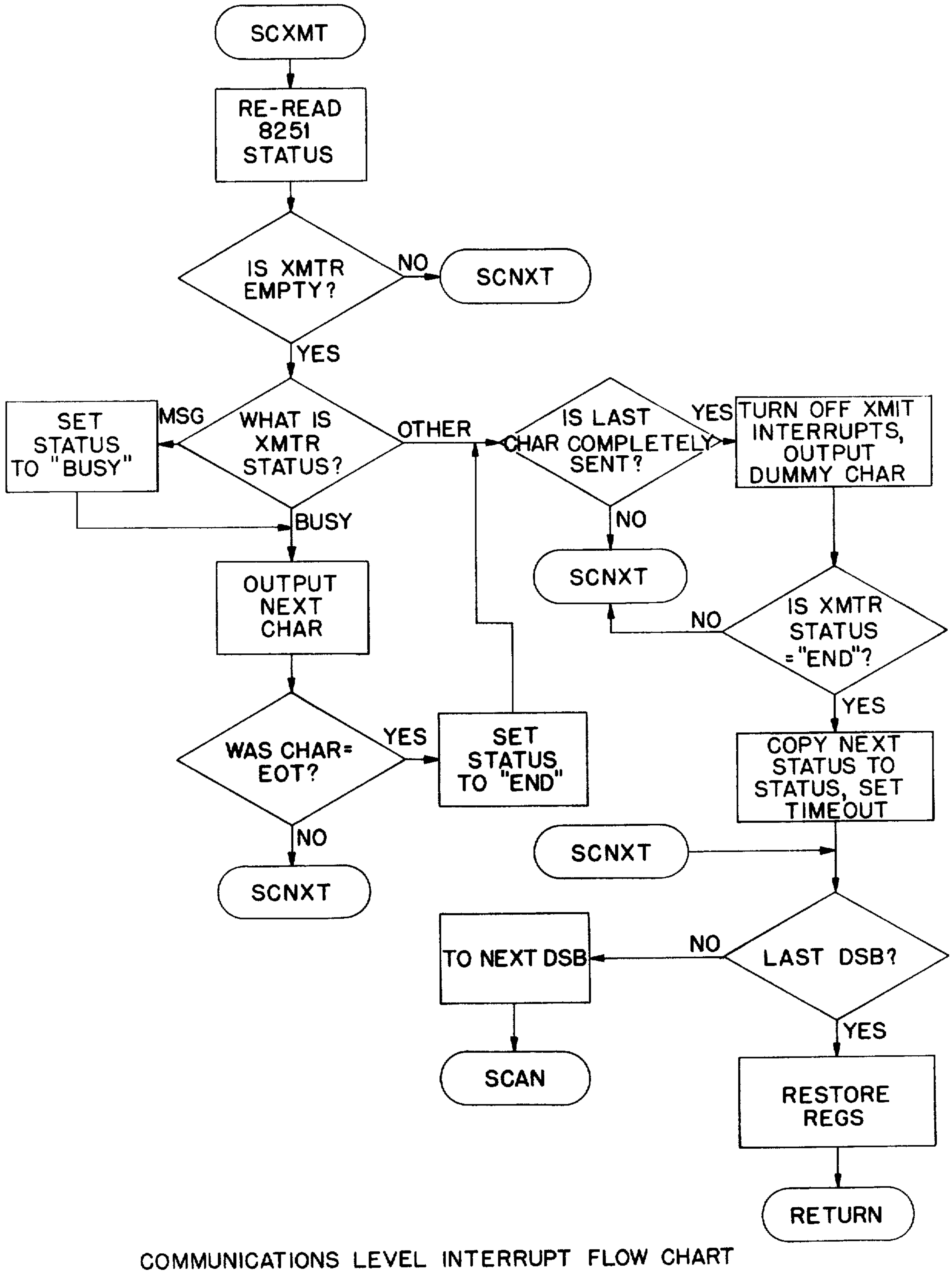
Figure 35:
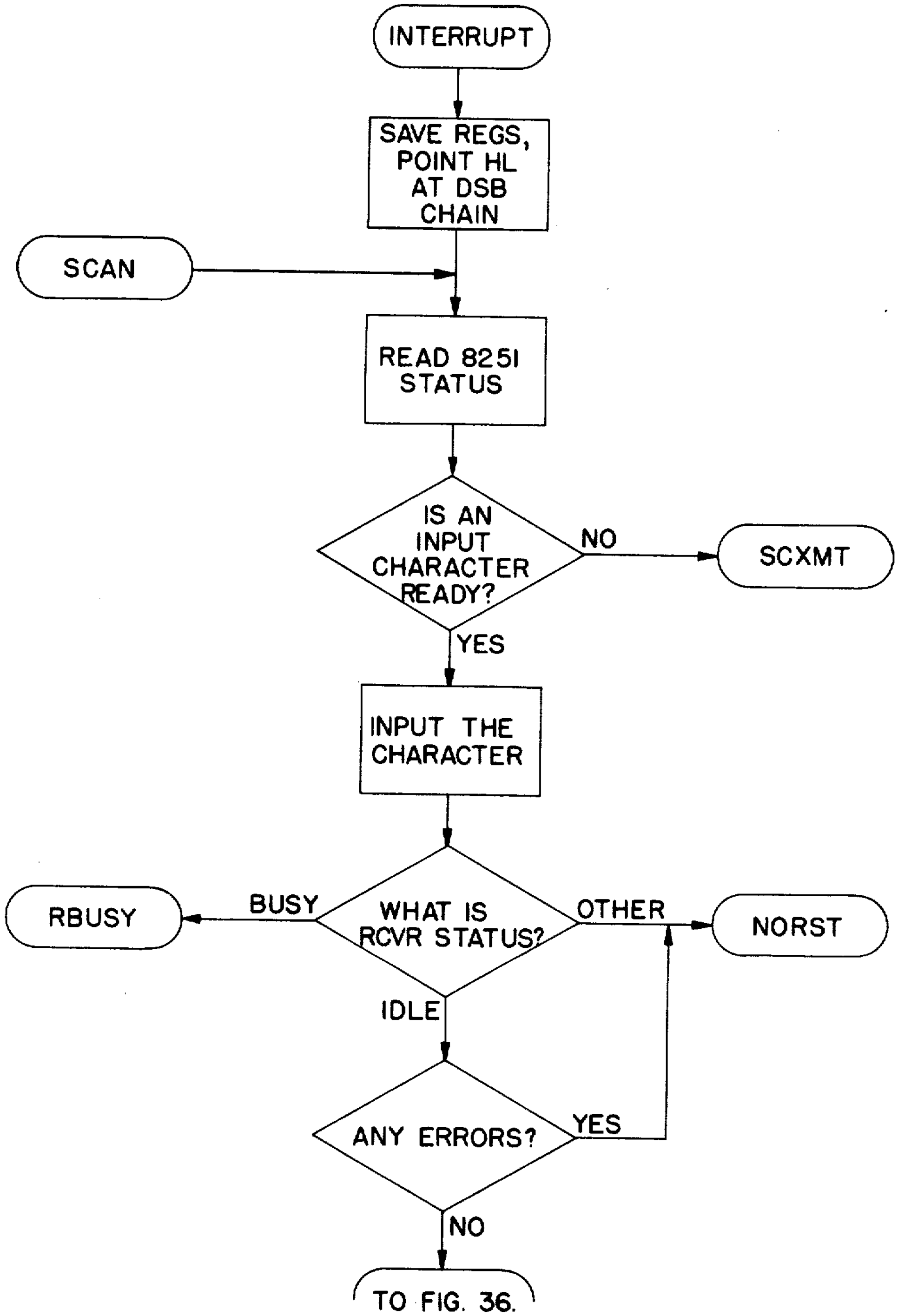
Figure 36:
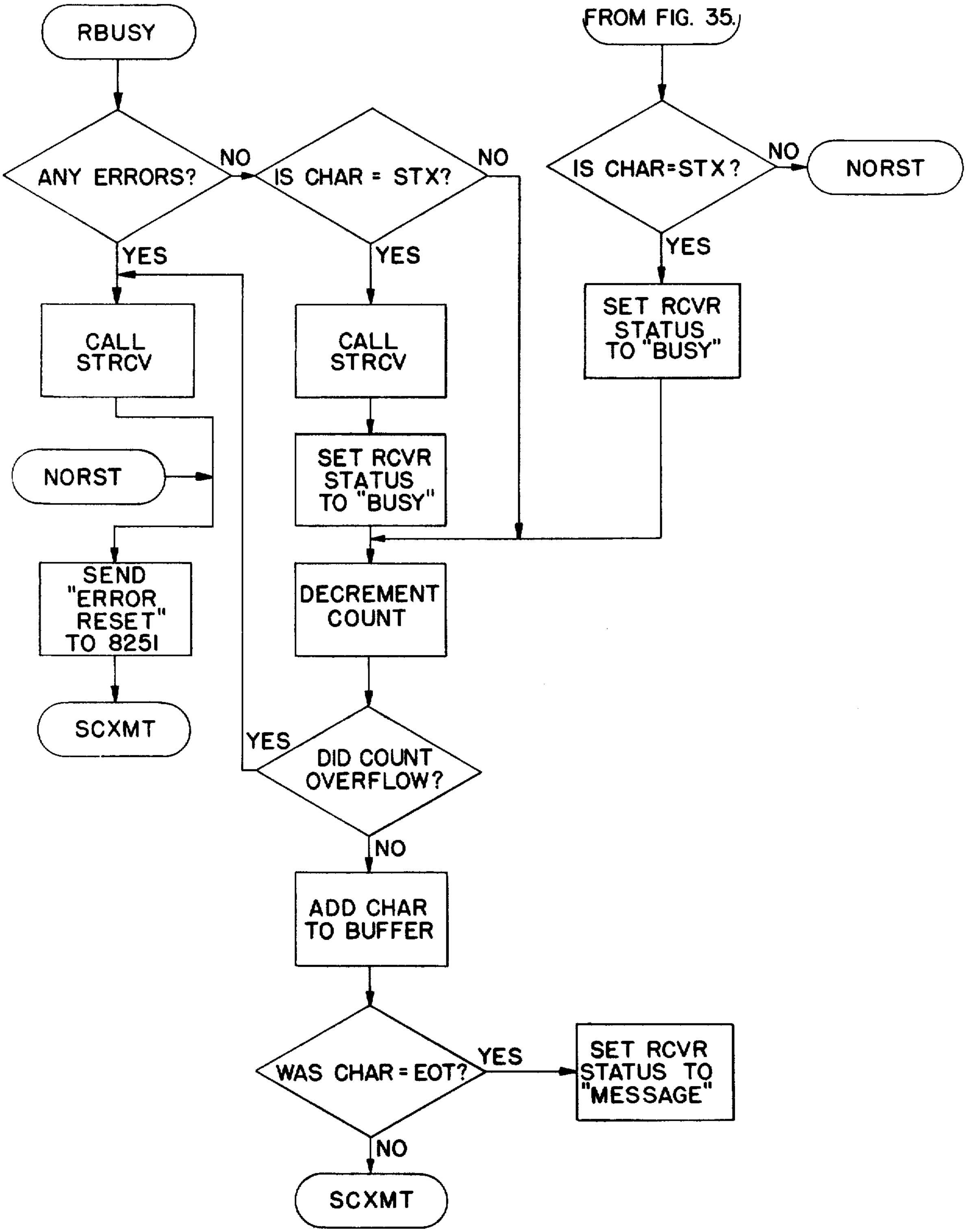

FIGS. H–Q are jumper diagrams and illustrative examples illustrating connections for the FIG. 7 SIO unit;

FIGS. 8A–E are schematic diagrams of the PIO unit;

FIGS. 8E and G are jumper diagrams for the FIG. 8 unit;

FIGS. 9A–E are schematic diagrams of the optional controller panel assembly;

FIG. 10 is a block diagram and FIGS. 11A–E, 12A–D, 13 and 14A–E are circuit schematics illustrating a shared memory unit;

FIGS. 15–22 are circuit schematics showing the disk controller TIFA unit;

FIGS. 23–30 are schematic diagrams illustrating the disk controller TIFB unit;

FIGS. 31–47 are flow charts for all three processor levels of the system;

FIGS. 48 and 49–51 are a block diagram and detailed diagrams, respectively, of a disk controller unit;

FIG. 52 is a circuit schematic of the CRC circuitry;

FIGS. 53 and 54 are illustrative memory maps; and

FIGS. 55–75 are detailed and schematic diagrams illustrating the DMAB unit.

DESCRIPTION OF THE PREFERRED EMBODIMENTS

GENERAL SYSTEM OPERATION

Initially it is noted that the terms STORAGE LEVEL, MEMORY LEVEL, and DISK LEVEL have equivalent meaning in the ensuing description. Further, in all implementatons, the movement of messages, data, or commands may be accomplished via a DMA bus facility in lieu of or in addition to a shared memory. Such DMA buses may be used to connect processors, levels, shared memories (if any) and one or more external computers, terminals, modems, or communications line interface devices.

Turning now to the drawings, FIG. 1 is a generalized system diagram illustrating the preferred embodiment of the invention. As seen in this FIG. the system includes a communications processor level comprising a plurality of microprocessors, 10, 11 each dedicated to a different group of external processor units, such as a host computer 12 and an intelligent terminal 13, as well as a modem 14 for permitting remote communication. Each communications microprocessor is configured in such a manner as to be capable of both serial and parallel information transfer with units 12 and 13. Also included in the system is a direct memory access bus (DMAB) 15 controlled by a separate processor 16 for enabling high speed data transfer of large blocks of information between host computers 12, 12' and the data storage devices described below.

Each communications microprocessor 10, 11 is coupled to a shared memory unit 20 termed an expandable cache memory. Memory unit 20 is shared with a plurality of DBMS level microprocessors 21–24, each of which is also coupled to a second shared memory unit 25. Memory unit 25 is shared with a plurality of microprocessors 26, 27 at the storage level, each of which is coupled to an associated data storage device 28, 29, respectively and data storage device controller 30, 31, respectively. In the preferred embodiment, the data storage devices 28, 29 are disk storage devices of conventional design; however, other types of data storage devices may be employed as desired, such as magnetic tape devices or the like.

General system operation proceeds as follows. With the system in operation, processors 10, 11 continuously look for incoming messages, processors 21–24 look for tasks from shared memory unit 20 and results from shared memory unit 25, while processors 26, 27 look for tasks from shared memory unit 25. When an incoming message is received by processors 10, 11, it is error checked, acknowledged and passed on to a mailbox in shared memory unit 20. The first processor of the processor group 21–24 which tests the filled mailbox assumes responsibility for performance of that task. If processor 22, for example, assumes responsibility of the particular task, it communcates to the appropriate disk control processor 26 or 27 via one or more mailboxes in shared memory unit 25 until the task is completed. Once the task is completed, an appropriate message is transferred back to the mailbox in shared memory unit 20 by the responsible processor 22, after which the message is fetched by the communications processor 10 or 11 and transmitted to the external processor.

To summarize, the communications level microprocessors perform line handling functions, error routine and mailbox routines; the DBMS level processors handle the syntax scanning funtions and hashing and coding/decoding routines, all data access functions including indexing, searching, buffering, blocking, deblocking, storage management, and error recovery functions. In addition, the DBMS processors handle read/update, add/delete, lock/unlock, save/restore, index, and mailbox routines. The disk control processors 26, 27 handle disk management read/write, error recovery, and mailbox routines.

At the communications level, messages are handled by communications service routines which buffer a message and handle all the protocol with regard to the message. The message is then passed via a mailbox routine and shared memory unit 20 to the DBMS level. The DBMS level examines the message, checks syntax, converts symbolic names to 3-byte internal codes, determines the appropriate command routine and executes that routine using various utility subroutines. The command routine causes information to be read or written from the data storage disks 28, 29 by sending messages through the mailbox routine and shared memory unit 25 to the disk control level processors 26, 27. Upon receiving the required information or completing the required task, the DBMS level processor then sends a message or messages to the communications level which then sends these messages back to the external device which initiated the command.

Both serial and parallel interfaces are provided between the communications level processors 10, 11 and the external devices. Message protocol for either serial or parallel mode comprise an ACK-NAK handshaking sequence. Each character or a received message is checked for parity errors and the entire message is checked against the check sum contained in the message as transmitted. If there is a parity error of if the calculated check sum does not match the check sum received with the message, a NAK message is returned to the sender who may then repeat the message. The reception of a NAK is an indication that the receiver denies all responsibility for the message and stores no information about the message. If there are no parity errors and the check sum matches, an ACK is returned signifying that the receiver has taken responsibility for the message.

It should be noted that the handshaking sequence may be modified by providing automatic time-out routines which assume reception of a NAK message upon expiration of a predetermined time period. Further, other standard message protocols may be employed, as desired.

SYNTAX

Command syntax is as follows:

COMMAND, COMMAND ID, ARG 1, ARG 2, ARG 3, ARG 4 where the command is a string of characters, e.g. UPDATE or LOCK. COMMAND ID is a user selector identifier used to identify the command and is returned with the response. COMMAND ID may be the null string, i.e. may be missing. However, the delimiter following COMMAND ID must be present. The arguments to a command are character strings separated by commas (or any non-alphanumeric character). In any argument position where a symbolic file, record or item name can be used, a number can be used to refer to a file, record or item by its sequential position rather than its name.

Response syntax is as follows:

COMMAND ID, TRANSACTION #, ERROR CODE, DATA where TRANSACTION # is the unique string of digits used to identify a transaction for use in reprocessing transactions during recovery from a problem. A TRANSACTION # is returned only for operations which involve modification of the data storage disk, i.e. disk 28 or 29. COMMAND ID is the command identification in the command which invoked this response. An ERROR CODE which identifies the error type and location is returned if an error occurs at any level. If no error occurs, the delimiters are still present but the error code is not. Data can take one of several forms depending on the command executed. For example, if the command caused the return of an item, the data will simply be that item value. If the command caused the return of a record, the data will have the format:

ITEMNAME L ITEMVALUE where ITEMNAME is the internal three-byte code for the item name, L is the length 0 to 127 of the item value and the ITEMVALUE is simply the itemvalue as referred to above. If the command causes return of a file, the data will have the format:

RECORDNAME L RECORD RECORDNAME L RECORD where RECORDNAME is the internal three-byte code for the record name, L is the length of the record and RECORD is the record in the same format as immediately above. If the command causes the return of a sector off data storage disk 28 or 29, the data will be in exactly same form as it existed on the disk.

Response messages are returned 128 bytes of data at a time. If a response requires more than one message, then more than one message is returned.

The COMMAND ID is included in every message. The last message of a series of messages in response to a command contains and end-of-response indicator: a transaction number of 1.

Commands and Responses

UPDATE: The UPDATE command has the form:
UPDATE COMMANDID, FILENAME,-RECORDNAME,ITEMNAME,DATA and results in the specific item having a value of DATA. If the file, record or item mentioned in the command does not exist, it is added to the data
The response to this command is:

COMMANDID,TRANSACTION#,ERRORCODE

If updating a record or file is required, then only FILENAME, RECORDNAME or FILENAME are given. The data must be in the proper format as noted above. Errors that may occur other than standard internal errors are:
ITEM IS LOCKED
RECORD IS LOCKED
FILE IS LOCKED
READ: The READ command has the form:
READ COMMANDID,FILEMANE,RECORD-NAME,ITEMNAME
and results in the return of the item's value as previously set by an UPDATE command.
The response format is:
COMMANDID,ERRORCODE,DATA
If reading of a record or file is required, then only FILENAME, RECORDNAME or FILENAME is specified. The data will have the form noted above.
Errors that may occur other than standard internal errors are:
FILE IS LOCKED
RECORD IS LOCKED
ITEM IS LOCKED
FILE IS NON-EXISTENT
RECORD IS NON-EXISTENT
ITEM IS NON-EXISTENT
GET: The GET command has the form:
GET COMMANDID,DISKID,TRACKID,SECTORID
The result is the return of the data on the track and sector on the disk mentioned. It is in the form:
COMMANDID,ERRORCODE,DATA
The data is the exact data that resides on the disk in that sector. Errors that may occur other than standard internal errors are:
DISK DOES NOT EXIST
TRACK DOES NOT EXIST
SECTOR DOES NOT EXIST
PUT: The PUT command has the form:
PUT COMMANDID,DISKID,TRACKID,SECTORID,DATA
The result of this command is the writing on the disk of the data in the specified place.
The response has the form:
COMMANDID,TRANSACTION#,ERRORCODE
Other than standard internal errors the only errors possible are:
DISK DOES NOT EXIST
TRACK DOES NOT EXIST
SECTOR DOES NOT EXIST
SECTOR NOT ALLOCATED BY A REQUEST COMMAND
REQUEST: The REQUEST command has the form:
REQUEST COMMANDID,DISKID,TRACKID,-SECTORID
The result of a REQUEST command is the return of a TRACKID and SECTORID near the specified track or sector on a specified disk and the marking of that track and sector as allocated for user use.
The response format is:
COMMANDID,TRANSACTION#,ERRORCODE,-DISKID,TRACKID,SECTORID
The only errors other than standard internal errors are:
NO MORE SECTORS ON DISK
DISK DOES NOT EXIST
TRACK DOES NOT EXIST
SECTOR DOES NOT EXIST
RETURN: The RETURN command has the form:
RETURN COMMANDID,DISKID,TRACKID,-SECTORID
The result of the RETURN command is the deallocation for user use of the specified sector.
The response format is:
COMMANDID,TRANSACTION#,ERRORCODE
The only errors other than standard internal errors are:
NOT AN ALLOCATED SECTOR
DISK DOES NOT EXIST
TRACK DOES NOT EXIST
SECTOR DOES NOT EXIST
LOCK: The LOCK command has the format:
LOCK COMMANDID,FILENAME,RECORD-NAME,ITEMNAME
The result of the LOCK command is that an item (record or file, if only record or file is specified) is locked and unavailable for reading or updating by any other terminal. The item remains locked until an UNLOCK command is given for that item, record or file.

The response format is:
COMMANDID,TRANSACTION#,ERRORCODE
Other than standard errors, the only errors are:
FILE LOCKED BY ANOTHER TERMINAL
RECORD LOCKED BY ANOTHER TERMINAL
ITEM LOCKED BY ANOTHER TERMINAL
FILE NON-EXISTENT
RECORD NON-EXISTENT
ITEM NON-EXISTENT
UNLOCK: The UNLOCK command has the form:
UNLOCK COMMANDID, FILENAME, RECORD-NAME, ITEMNAME
The result of the UNLOCK command is that the file, record or item is unlocked only if the file, record or item was previously locked by the same terminal now originating the UNLOCK command. The response format is:
COMMANDID,TRANSACTION#,ERRORCODE
Other than standard internal errors, the only possible errors are:
FILE LOCKED BY ANOTHER TERMINAL
RECORD LOCKED BY ANOTHER TERMINAL
ITEM LOCKED BY ANOTHER TERMINAL
FILE NON-EXISTENT
ITEM NON-EXISTENT
FILE IS NOT LOCKED
RECORD IS NOT LOCKED
ITEM IS NOT LOCKED
NAME: The NAME command has the form:

NAME COMMANDID,FILENAME,RECORDNAME,ITEMNAME

This command returns the symbolic name of the item specified or of the file or record specified if the FILENAME,RECORDNAME or FILENAME is given. Normally, the NAME command is only used when a sequence number is in place of ITEMNAME or when sequence numbers are used in place of ITEMNAME and RECORDNAME or when the sequence numbers are used in place of FILENAME,RECORDNAME or ITEMNAME.

The response is:

COMMANDID,,ERRORCODE,DATA where DATA is the symbolic name being returned.

The only errors other than standard internal errors are:

FILENAME DOES NOT EXIST

RECORDNAME DOES NOT EXIST

ITEMNAME DOES NOT EXIST

ADD: The ADD command has the form:

ADD COMMANDID,FILENAME,RECORDNAME,ITEMNAME

The result of the ADD command is the addition of the item to the data base. If only the file and record names are specified, the result is the addition of only the record to the data base. If only FILENAME is specified, only the file is added to the data base.

The response is:

COMMANDID,TRANSACTION#,ERRORCODE

In the case where file, record and item are specified, the only errors are:

FILE DOES NOT EXIST

RECORD DOES NOT EXIST

In the case where only file and record are specified, the only error is:

FILE DOES NOT EXIST

In the case where only file is specified, only standard internal errors are possible.

DELETE: The DELETE command has the form:

DELETE COMMANDID,FILENAME,RECORDNAME,ITEMNAME

The result is to delete the item from the data base. In the case where only FILENAME and RECORDNAME are specified only the record is deleted. If FILENAME is only specified, then the file is deleted. When none are specified, the entire data base is deleted. The response is:

COMMANDID,TRANSACTION#,ERRORCODE

The only possible errors, other than standard internal errors are:

RECORD DOES NOT EXIST

FILE DOES NOT EXIST

ITEM DOES NOT EXIST

COPY: The COPY command has the form:

COPY COMMANDID,DISKID1,DISKID2

The result of this command is the copying of the entire contents of disk 1 onto disk 2, destroying any data formerly residing on disk 2. This is a straight copy and involves no reorganization of the data. The response is:

COPY COMMANDID,DISK

COMMANDID,TRANSACTION#,ERRORCODE

The only error other than standard internal errors is:

DISK DOES NOT EXIST

The following are several elementary examples illustrating the use of various of the commands available in the system of FIG. 1.

Each command, as given in this section, will assume, unless otherwise stated, that all previous commands in this section have been executed and all previous explicit assumptions about what exists in the disk data base apply.

Assuming that there are 3 files in the disk data base (PAYROLL, ACCOUNTS RECEIVABLE, and INVENTORY) and there are two terminals connected to the data base (Terminal 1 and Terminal 2), and assuming that the PAYROLL file has a record in it by the name of GEROGE-ALLEN and that the record now has no items in it, a message from Terminal 1 such as:

UPDATE D1,PAYROLL, GEORGE-ALLEN,-PAYRATE,7.39 would invoke a response from the system of:

CMD1,473652,, where CMD1 is the COMMANDID from the command, the 473652 is the TRANSACTION# and the two commas at the end indicate there was no error. The result of the command is that the PAYRATE item was added to the GEORGE-ALLEN record of PAYROLL and received an item value of 7.39. If, later, a message is sent such as:

UPDATE PAYROLL,GEORGE-ALLEN,-PAYRATE,1.21 the response would be:

,4736700,,

Note that there is no COMMANDID in the response although the delimiter comma is there and that the TRANSACTION# is larger than the previous TRANSACTION#. This command results in the changing of the item value from the previous value of 7.39 to 1.21.

Now, if the message

NAMEX531,PAYROLL,GEORGE-ALLEN,1 was sent, the response would be

X531,,,PAYRATE(5A274B)

The X531 is the COMMANDID, there is no TRANSACTION# or ERRORCODE and the data returned is PAYRATE, the symbolic name of item 1 is the GEORGE-ALLEN record. The 5A274B in parentheses is the hexadecimal representation of the 3-byte internal code. Now, a command

READ PAYROLL,GEORGE-ALLEN,PAYRATE would invoke the response

,,,1.21 as the COMMANDID is null, there is no TRANSACTION# and no errors. Note that the delimiter after the null command in the READ command is a space. If the LOCK command is now performed:

LOCK XX, PAYROLL the response

XX,47398,, is received and the PAYROLL is locked and no terminal may access it except the terminal that gave the LOCK command. The PAYROLL updating program might use this command to prevent access to the PAYROLL file by any other terminal. Now a command

DELETE FOO,PAYROLL would result in a response

FOO,7FILE IS LOCKED where the 7FILE IS LOCKED indicates that the file is locked, and therefore cannot be deleted. To delete the PAYROLL file, it would be necessary for TERMINAL 1 (which issued the LOCK command) to issue the command

UNLOCK PAYROLL which will receive the response

,475411,,

The PAYROLL file would then be unlocked and available for deletion. Even if only a single record was locked within the PAYROLL file, the file could not be deleted because deletion of a locked record is not permitted. Of course, deletion of a locked item or file is not permitted either.

A series of commands might be issued at this point to back up the entire data base. Assuming a two-spindle configuration with two disk packs to be backed-up, the operator would place the first pack to be save on DRIVE1 and a fresh pack on DRIVE2. The command

COPY DRIVE1, DRIVE2 would be issued to copy the contents of the pack on DRIVE1 to the new pack on DRIVE2. The DRIVE1 (old) and DRIVE2 (new) packs would then be set aside. Then, the second pack to be backed-up would be placed on DRIVE2 with a fresh pack placed on DRIVE1. The command

COPY DRIVE2,DRIVE1 would then be issued to copy the contents of old pack DRIVE2 onto new pack DRIVE1. The new pack DRIVE1 would then be set aside and the first pack to be copied would then be replaced on DRIVE1. The result is that the copies of the two packs would be shelved (labeled as, for instance, COPY1 and COPY2) and the two original packs would then be in position on their respective spindles ready for further commands. Another command which may be issued by a systems program run on one of the terminals is:

GET DRIVE1, TRACK17,SECTOR25 and the response would be

,,,(string of data)

The string of data would be the contents of a particular sector. This command could be issued for any sector on the disk.

A corresponding PUT command attempting to write on a given sector on the disk would not be permitted as no REQUEST command had been executed to gain The following shows how several commands can work together to produce the desired result. The example chosen is an algorithm for listing the entire contents of a data base in a very structured manner.

The format that the data base lister will use is:

```
(1) FILENAME1(1C)
  (1) RECORDNAME1(1C)
    (1) ITEMNAME1(1C) ITEMVALUE
    (2) ITEMNAME2(1C) ITEM VALUE
    (3)
     .
     .
     .
    (N) ITEMNAMEN(1C) ITEMVALUE
  (2) RECORDNAME2(1C)
    (1) ITEMNAME1(1C) ITEMVALUE
    (2) ITEMNAME2(1C) ITEMVALUE
    (3)
     .
     .
     .
    (N)
  (3)
   .
   .
   .
  (N)
(2) FILENAME2(1C)
  (1) . . .
    (1)
     .
     .
     .
    (N)
  (N) . . .
(3)
 .
 .
 .
(N)
```

The data base lister will be presented as an algorithm rather than a program. The particular operations in the algorithm such as OUTPUT, INPUT and PRINT will not be strictly defined. In particular, OUTPUT will mean output from the external device to the system, a string or a command; INPUT will mean the data received from one of these commands; and PRINT will mean to print on a lineprinter associated to the external device lineprinter the string following that. Other operations, such as DO will assume their normal meanings. The Data Base Lister is as follows:

```
Print "DATA BASE LISTING"
Do FILECOUNT=1 to ∞                                      ;loop through all files
Output "NAME" FILECOUNT                                  ;get name of file and
Input FILENAME                                           ; the 3-byte code
If Error="NO SUCH FILE" then exit Do Loop                ;if no more files, quit
Print (Col 10) FILECOUNT ")" FILENAME                    ;list filename
Do RECORDCOUNT=1 to ∞                                    ;loop through files
Output "NAME" FILECOUNT","RECORDCOUNT                    ;get name of record
Input RECORDNAME                                         ;
If Error="NO SUCH RECORD" then exit Do Loop              ;if no more records do next file
Print (Col 20) RECORDCOUNT,")",RECORDNAME                ;list recordname
Do ITEMCOUNT=1 to ∞                                      ;
Output "NAME" FILECOUNT","RECORDCOUNT","ITEMCOUNT        ;get name of item
Input ITEMNAME                                           ;
Output "READ" FILECOUNT","RECORDCOUNT","ITEMCOUNT        ;get value of item
If Error="NO SUCH ITEM" then exit Do Loop                ;if no more items, do next record
Input ITEMVALUE                                          ;
Print (Col 30) ITEMCOUNT,")",ITEMNAME,ITEMVALUE          ;list item name and value
End ITEMCOUNT Do
End RECORDCOUNT Do
End FILECOUNT Do
Print "END OF DATA BASE LISTING"
End DATA BASE LISTER
```

excess to a particular sector and make it available for PUT usage.

To summarize, the required commands are as follows:

UPDATE [COMMANDID],FILENAME[,RECORDNAME[,ITEMNAME]],DATA
Updates a file, record or item READ [COMMANDID],FILENAME[,RECORDNAME[,ITEMNAME]]
Reads a file, record or item GET [COMMANDID],DISKID,TRACKID,SECTORID
Reads a sector off the disk PUT [COMMANDID],DISKID,TRACKID,SECTORID,DATA
Writes a sector on the disk REQUEST [COMMANDID],DISKID,TRACKID,SECTORID
Requests a sector for use with GET and PUT RETURN [COMMANDID],DISKID,TRACKID,SECTORID
Returns a sector gotten by a REQUEST -continued

| |
|---|
| LOCK [COMMANDID],FILENAME[,RECORDNAME[,ITEMNAME]] |
| Locks a file, record or item |
| UNLOCK[COMMANDID],FILENAME[RECORDNAME[,ITEMNAME]] |
| Unlocks a previously locked file, record or item |
| NAME [COMMANDID],FILENAME[,RECORDNAME[,ITEMNAME]] |
| Gets the name of a file, record or item |
| ADD [COMMANDID],FILENAME[,RECORDNAME[,ITEMNAME]] |
| Adds a file, record or item to the data base |
| DELETE [COMMANDID],FILENAME[,RECORDNAME[,ITEMNAME]] |
| Deletes a file, record or item from the data base |
| COPY [COMMANDID],DISKID,DISKID |
| Copies from one disk onto another |

SYSTEM HARDWARE

The system hardware is fabricated primarily from commercially available units, subunits and components and FIGS. 3-30, and 55-75 are schematic diagrams illustrating the preferred embodiment of the invention.

Processors 10, 11 21-24, 26 and 27 are preferably designed around the Intel Model 8080A microprocessor chip, and the basic processor is shown in FIGS. 2-6. FIGS. 7 and 8 show the serial and parallel interface subunits employed with processors 10, 11.

Shared memory units 20, 25 are each arranged in the manner shown in FIG. 10 and comprise random access memory 41, at least one transfer switch unit 42 and a controller 43. Access to the RAM memory 41 is via switch unit 42 under control of the controller unit 43 and information is transferred to and from RAM memory 41 via bidirectional data buses 44, 45 coupled to upper and lower level processors respectively. For example, for the RAM memory 41 located in shared memory unit 20, buses 44 and 45 are coupled respectively to communications level processors 10, 11 and DBMS level processors 21-24, respectively. Transfer switch unit 42 is shown in FIG. 11, while controller 43 is shown in FIG. 12. FIG. 13 illustrates representative termination networks.

Not illustrated in FIG. 10, but located at the microprocessor end of data buses 44, 45 is a buffer unit shown in detail in FIG. 14.

Disk controllers 30, 31 each comprise two separate boards termed T1FA, T1FB which are illustrated in detail in FIGS. 15-22 and FIGS. 23-30, respectively. Disk controllers 30, 31 are specifically designed to interface with a TRIDENT disk drive manufactured by CalComp Inc. PROCESSORS-MPU The MPU-A board (FIGS. 3A-E) is the processor board for all MPUS in the System.

The 8224 clock driver chip and an 18 Megahertz crystal are used to generate the 2-phase, 2 Megahertz non-overlapping clock for the 8080A. An 8212 is used as a latch for the status signals and two 8216 tri-state bi-directional bus drivers are used to interface the 8080A with the input and output data buses. All other address, status, and control lines are driven by tri-state bus drivers.

Unregulated +16, −16, +8 volts, and ground must be supplied to the bus. On-board regulation is used to arrive at the power supply levels needed to run the chips. Integrated circuit power regulators with overload protection are used. The board is supplied with ample bypass filtering using both disc ceramic and tantalum capacitors.

Power-on reset is included on this board along with pull up resistors for all inputs required so that the power-on reset will start the program at position 0 out of a ROM. The MPU-A board provides interfacing between the 8080A chip and the data and address busses, clock and synchronization signals, and the voltage regulation necessary for the 8080A and other chips. The internal functioning of the 8080A is well known.

The address lines from the 8080A drive the address bus on the back plane through 8T97 tri-state buffer drivers. These drivers may be disabled through the ADDRESS DISABLE line on pin 22 of the back plane. Intel 8216 bi-directional bus drivers connect the 8080's bi-directional data bus to the back plane's dual unidirectional DATA IN and DATA OUT busses. The direction of data transmission is determined by the DIRECTION ENABLE line. The DIRECTION ENABLE line is in turn controlled by the front panel and the processor status signals DATA BUS IN and HALT ACKNOWLEDGE. The 8216 can be disabled by the DATA OUT DISABLE line on pin 23 of the back plane.

The 8080A's bi-directional data bus is also connected to the data bus socket and the 8212 status byte latch. The data bus socket is used to connect the front panel to the bi-directional bus, while the 8212 latch transfers the status byte to the back plane via 8T97 drivers. These drivers are disabled by the STATUS DISABLE line on pin 18 of the back plane. The 8212 is latched up by the STATUS STROBE signal of the 8224 clock chip to store the status information for each instruction cycle.

One K pullup resistors to +5 volts are connected to all the bi-directional bus lines to ensure that during the time the bus is not drive, the 8080A reads all 1's.

The 8224 clock chip and crystal oscillator, provide the two-phases non-overlapping 2 MHZ system clock for the 8080A. These clocks are also driven onto the back plane through 8T97 tri-state buffered drivers. The CLOCK line on the back plane is driven from the TTL Phase II clock line through a delay. Six sections of a 7404 are used for this delay to provide greater simplicity and higher reliability than a one-shot. The 8224 chip also provides the power-on reset function through use of a 4.7K resistor and 33 ufd capacitor connected to the reset input of the 8224. The power-on reset is applied to the 8080A and is applied to the POWER ON CLEAR line, pin 99 on the back plane.

The two BACK PLANE READY signals are ANDed and connected to the 8224 for synchronization with the Phase II clock before being connected to the 8080A chip. The INTERRUPT line is connected directly to the 8080A, while the HOLD REQUEST line is synchronized with the Phase II clock and then connected to the 8080A.

The six processor status signals (sync write, STROBE DATA BIT IN, READ STROBE, INTERRUPT ENABLED, HOLD ACKNOWLEDGED, and WAIT ACKNOWLEDGE) are all driven onto the back plane through 8T97 tri-state buffered drivers.

These drivers may be disabled by the CONTROL DISABLE line, pin 19 on the back plane.

The +5 volts is regulated from the +8 volts by a 7805 integrated circuit regulator, while the −5 volts is regulated by a 5 volt zener and a 470 ohm resistor from the 16 volt bus. The +12 volts is regulated by a 12 volt Zener and connected to the +16 volt line by two 82 ohm ½ watt resistors in parallel. All voltages are filtered with 0.33 microfarad tantalum and disc ceramic capacitors.

RAM 4

The RAM-4 board (FIG. 4) provides up to 4K bytes of static random access memory. Designed to utilize the Intel 2111 or 8111 chips, the RAM-4 board can be flexibly configured to contain up to 4K bytes in 256 byte increments. The board address can be switch-or jumper-selected to any 4K block of the computer's 64K memory space. Either of the Intel 8111 or 2111 devices can be used on the RAM-4 board. The board has provisions for the use of standard as well as selected (high speed-450 n.s.) 8111 memories. Special circuitry allows extra delay time (1 extra cycle) for use by the slower memory. The memory units provided with the RAM-4 board are 450 n.s. 8111's requiring 0 wait cycles.

The RAM-4 also features write-protect, a capability useful in the development and debugging of programs. Four separate write-protect switches are provided on the RAm-4 board, each controlling a separate 1K of memory.

The MPU-A board requires no jumpers or user options for its use. The board is ready to function after connection to the back plane and the bi-directional bus. The bi-directional bus lines are provided by a 16-conductor cable from the CPA board, connected via a 16-pin DIP plug in location A-10.

The clock crystal frequency is 18 megahertz, and the 8224 device derives from this 18 MHz signal the necessary 2 MHz two-phase non-overlapping system clock. These 2 MHz clocks are brought out onto the back plane for use by other system boards.

The RAM-4 board has space for 4K bytes of memory which consist of 32 chips of Intel 8111 or 2111 type random access memory organized 256 words × 4 bits wide in each chip.

These RAM devices are arranged on the board in a $2 \times N$ ($1 \leqq N \leqq 16$) array, with the top row A containing bits 0, 1, 2, 3, of all the data and Row B contaning bits 4, 5, 6, and 7 of all the data. Read/write and address control is provided by a support network of Gates (C8, C9, C13) and a Decoder (C10). Bi-directional tri-state bus drivers (C15, C16) are used to receive and transmit data to and from the System bus.

To beging the Read or Write Cycles, the board must be enabled. As shown in the schematic, the board enable is produced by an 8-input NAND (741s30 in position C13). Four of the NAND inputs are the jumper selected board address bits (A12, A13, A14, A15 or complements), and the remaining two are the inverted status bits SINP and SOUT. When the board is properly addressed, the NAND output is driven low. The 8205 1-of-8 decoder is then enabled, addressing a particular memory chip pair uniquely determined by the states of A8, A9, A10 and A11.

The 8T97 bus driver (C14) is also driven by the NAND (C13). When the input to the 8T97 is the signal, PWAIT, a cycle delay for the slower memory is produced by this buffered driver. When sufficiently fast memory chips are used, the input to this gate should be connected to the tie 5 line so that the processor gets a ready signal immediately upon the board enable and does not wait one cycle. The tie 5 line appears on C10 Pin 6 and is simply a high logic level provided through the 1K resistor to +5 volts. Also enabled at this time are the 8216, (C15, C16) tri-state bi-directional bus drivers.

The direction of data flow is determined by the 7402 in position C8 which when low selects a data path going from the 8080 data bus to the RAM-4 board's data bus. This is made low by either the memory write line from the control panel or the complement of the memory read status signal from the processor. Thus for normal operation, witht the machine running, the status signal memory read determines whether these data bus drivers are driving to the 8080 data-in bus or are receiving inputs from the 8080 data-out bus. In addition to selecting the direction of data flow thru the bi-directional data bus drivers, the direction control signal is also inverted and applied to the output disable pin on the 8111's so that during writing the 8111 is receiving data on its bi-directional data pins and not attempting to drive. The write strobe is applied to the 8111's thru a 4 section data out DIP switch which enables the programmer to turn off the write pulse for each K for debugging purposes. When the machine is running normally, the write strobe comes from the processor write strobe line (pin 77 on the back plane) and when the front panel is being used, the write strobe line comes from the front panel on the memory write line (pin 68 on the back plane.) Two other sections of the 7402 are used to take either one of these write strobes and buffer them to drive the memory chips.

The RAM-4 board uses Intel 8111 or 2111 memory chips which are organized 256 × 4 bits so that the minimum increment possible in the memory space is 256 × 8 × 8 bits or an increment of 256 bytes which consists of 2 memory chips.

The board is organized so that the appropriate low and high order bits are always in the same column. The positions are arranged in ascending order according to address, starting from column 1 thru column 16. Thus, while a 4K board has column 1 thru 16 all full, a 2K board which uses the lower 2K of the 4K memory space, would have columns 1 through 8 filled and a 1K board that uses the lower 1K of the memory space in the 4K board would have column 1 thru 4 filled.

It should be remembered that each position (A1–16, B1–16) represents a unique address, and that Row A contains bits 0–3 of all data, while Row B contains bits 4–7 of all data. Thus, the user has several options as to the possible structure of his memory space. For example, if a user desired a 512 byte memory, and, additonally, wanted those 512 bytes in the lower half of the 3rd K, he would place his memory chips in positions A9, A10, B9 and B10.

If in some column only one chip of the A-B pair is present, the appropriate position of the byte (A-0, 1, 2, 3, or B-14, 5, 6, 7) does exit in memory. The upper and lower byte portions are all independent, and the absence or presence of a chip in any position does not effect the operation of any other chip.

The section write/protect switch is located between the power regulator heat sink and the left edge of the board. Each section of this switch affects 1K out of the 4K memory space on the board, and corresponds with the order of the memory chips on the board. That is, switch pole 1 controls wrting in the lower 1K of the board, (columns 1 thru 4) and switch pole 2 controls writing in the second 1K block on the board, (columns 5 thru 8).

In order to write, these switches must be on. After a trial program has been written into memory, the appropriate switch may be placed off (without interrupting the power) and the program or panel will be unable to write into that block of memory. The data remains in memory, and reading from memory is not affected. This feature is very useful for debugging programs or when it is desired to run a program but eliminate any possiblity that mis-programming will cause any of the program to be over-written.

Figure 2:
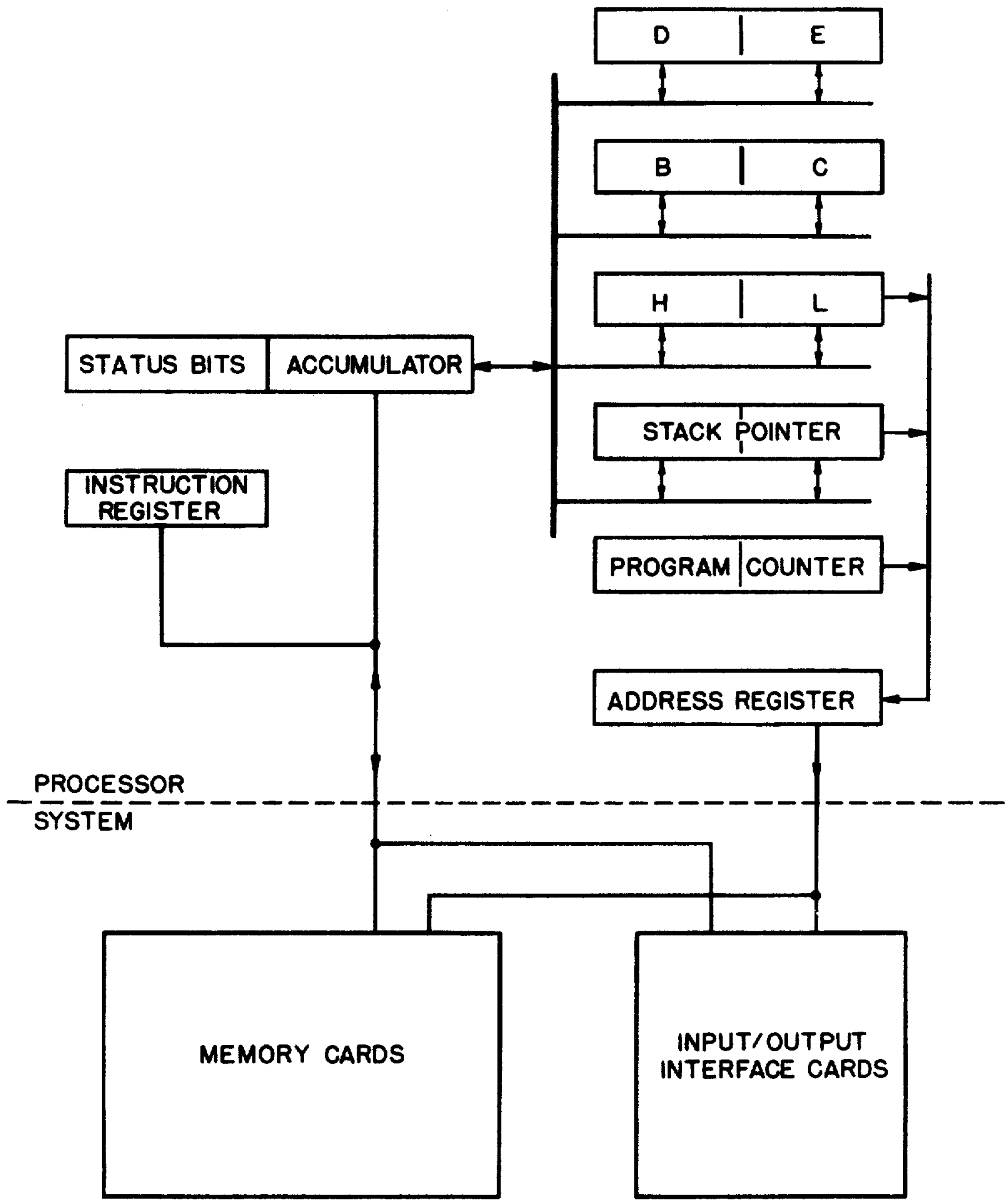
FIG. 2 is a block diagram of a microprocessor unit.
Figure 4A:
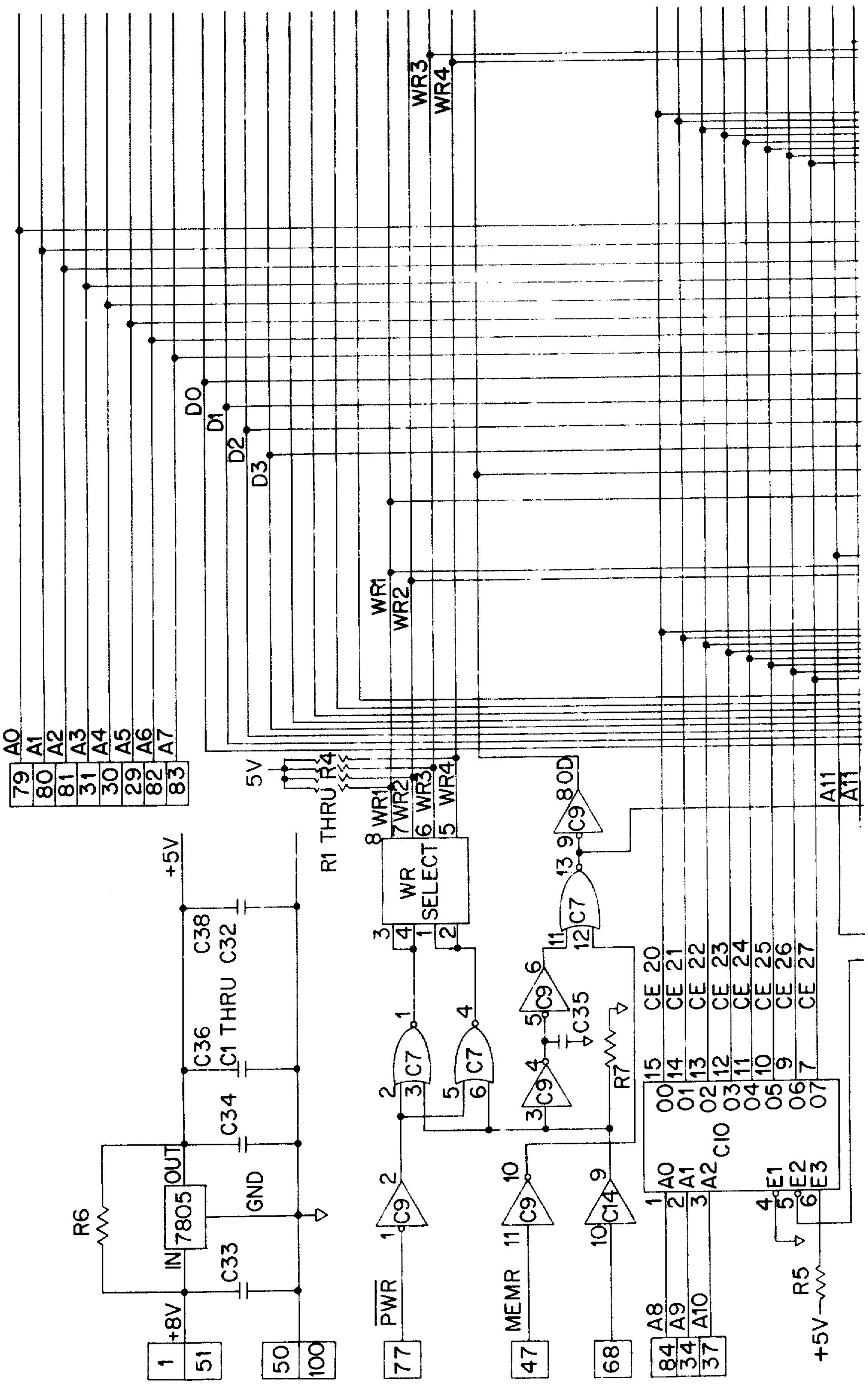
Figure 4D:
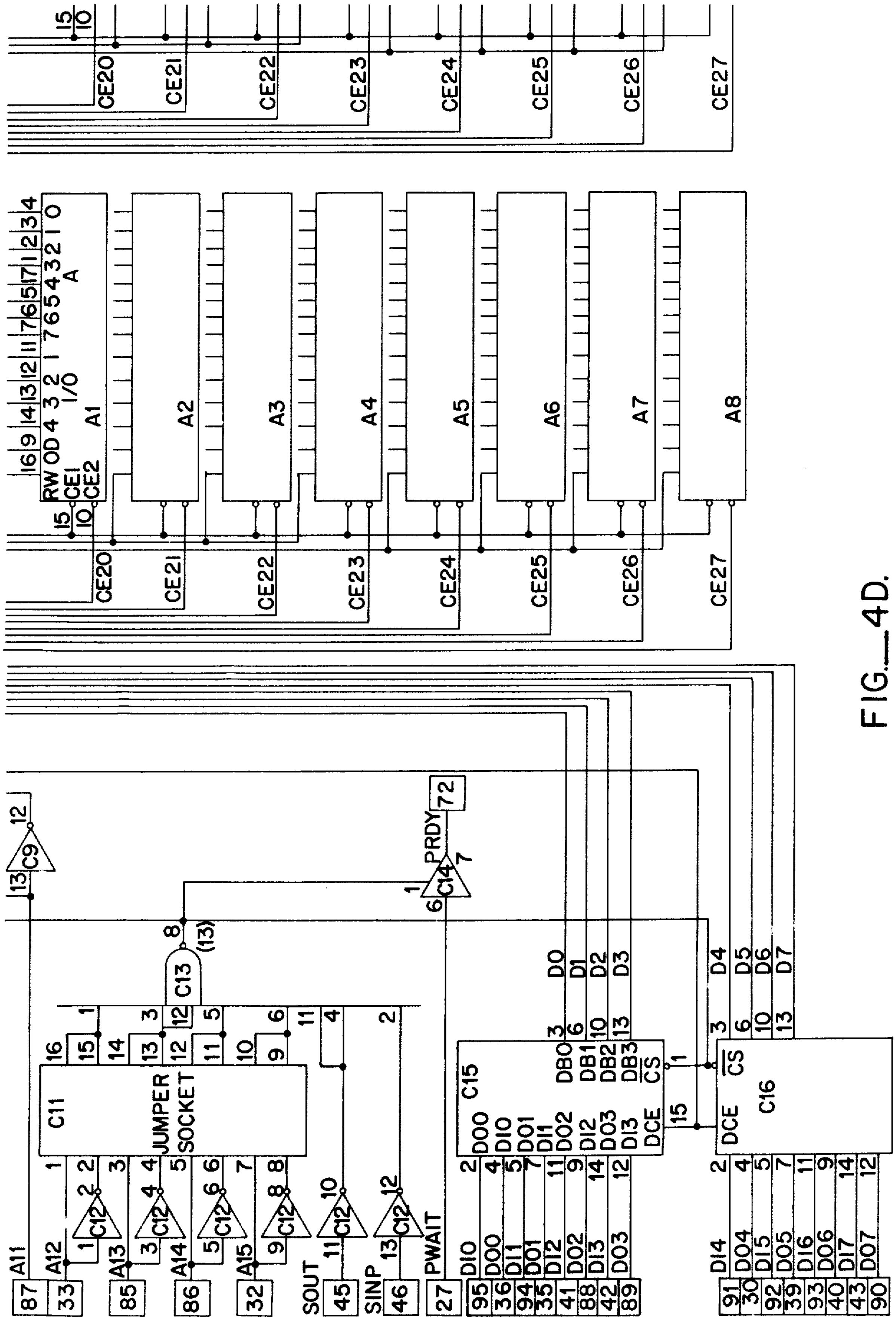
Figure 5B:
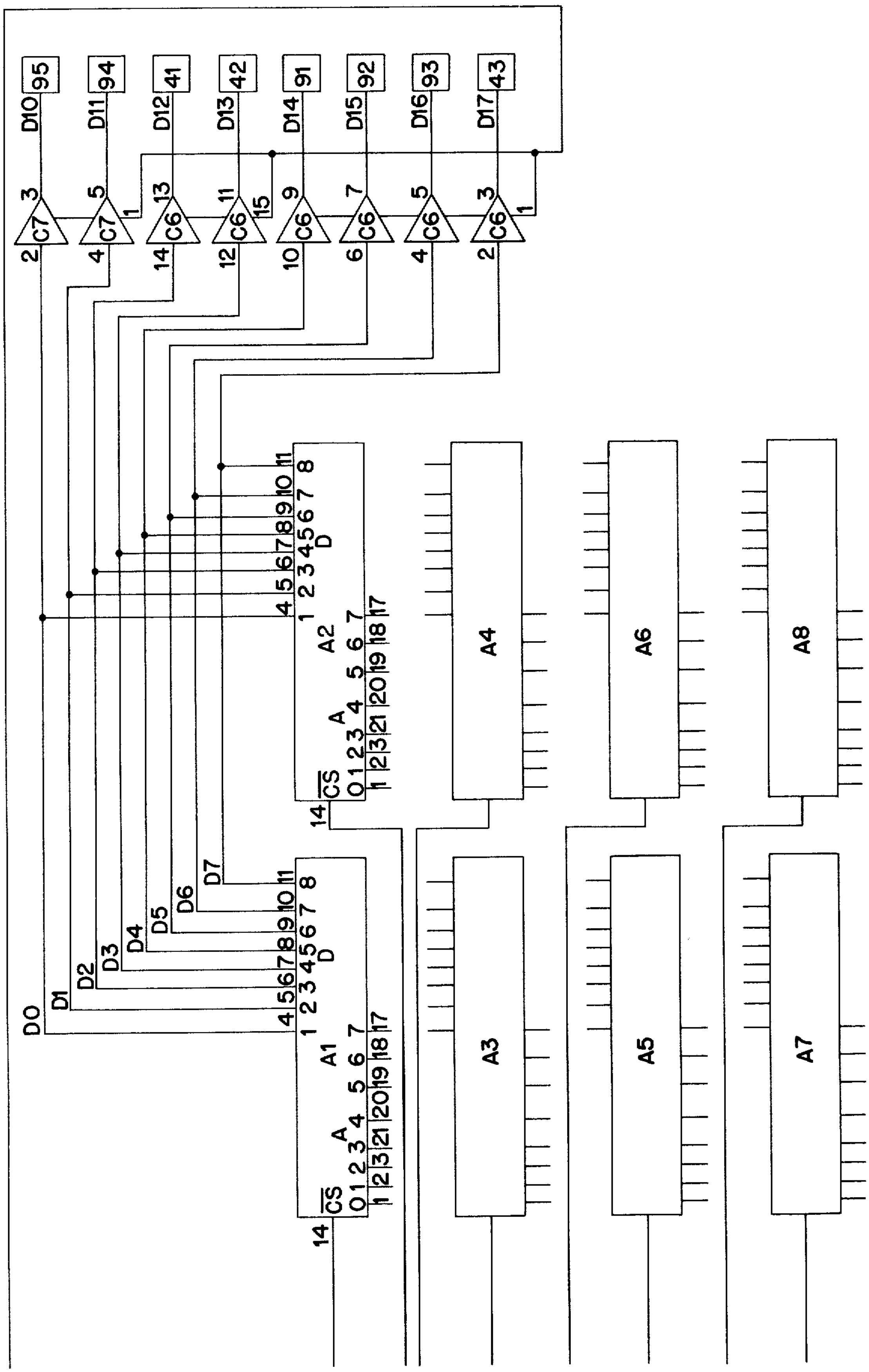
Figures 5D, 5E:
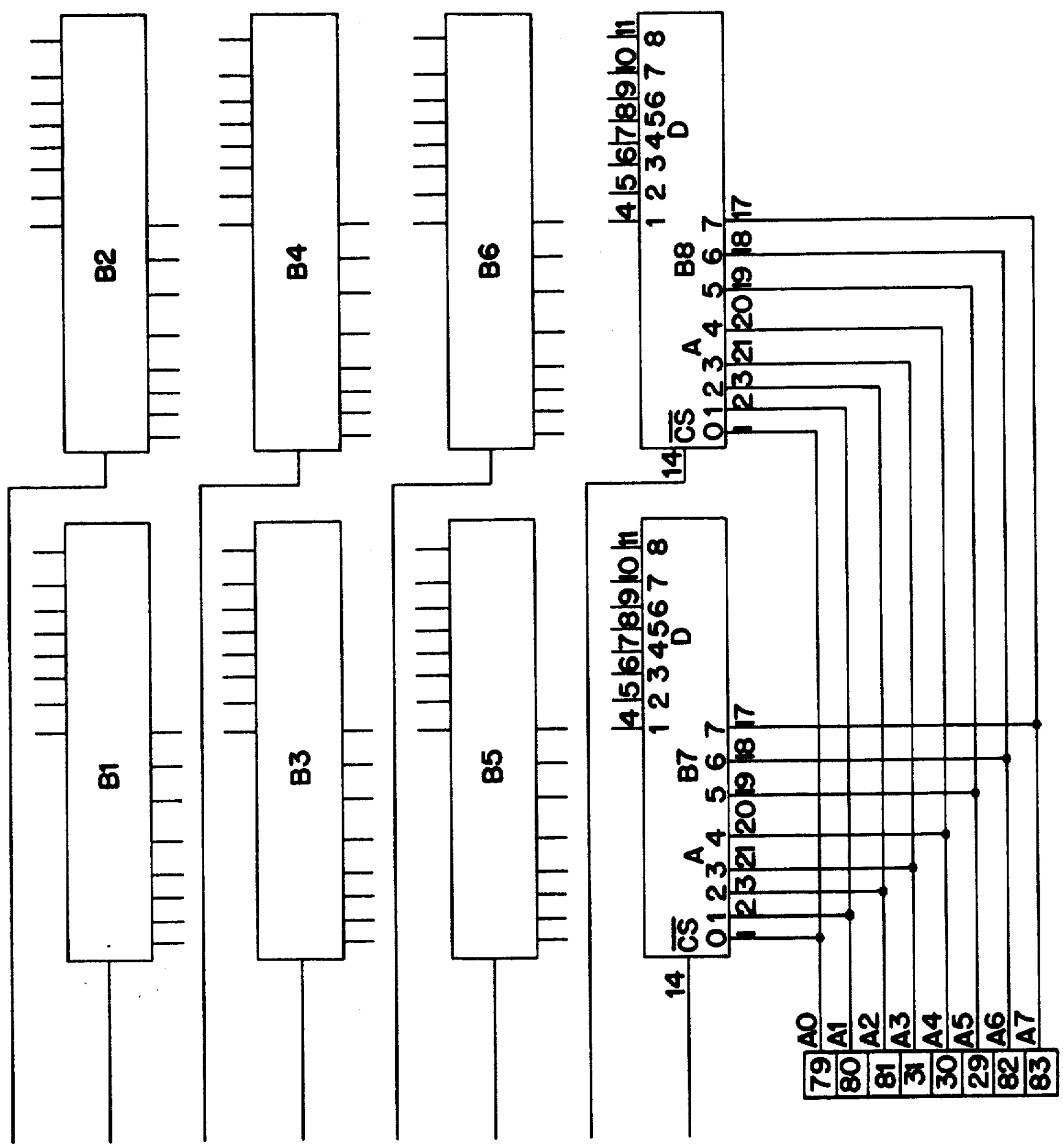

It is suggested that pins 9, 11, 13 and 15 be used to input as desired either a 0 or a 1 from the address bits so that for any address bits desired to be O, the jumper will extent directly across the header and for any address bits desired to be 1, the jumper will extend diagonally across the header. For instance, if A15 were to be 1, the jumper would extend from pin 7 to pin 9. This makes it easy to visually tell what address the board is jumpered for. An example jumper for the address block beginning with the address C hex is shown in FIG. 4G.

The board address select jumper location is C11. It permits any one of the 16 possible 4K blocks of memory space to be jumpered to form the board enable.

The jumper location accepts a standard 16 pin IC socket and the jumpers can be soldered on to a header which can be plugged into the socket and changed easily without any resoldering from the board.

Address bits 12, 13, 14 and 15 are available on pins 1, 3, 5, and 7 and their respective complements on pins 2, 4, 6 and 8. These signals should be jumpered to the input of the board select circuitry which appears on pins 9 thru 16. An 8 position DIP switch similar to that used for write enable may be inserted into this location should very frequent changes of address be desired. For a board whose address is expected to remain the same, jumpers may be inserted directly on the board. PROM-4

The PROM-4 board (FIGS. 5A-E) provides up to 4K bytes of non-volatile read-only assembly. Designed to utilize the Intel 1702 or 8702 read-only memory devices, the PROM-4 board may be flexibly configured to contain up to 4K bytes in 256 increments. The board address can be switch or jumper-selected to any 4K block of the computer's 64K memory space.

The PROM-4 board provides sockets for 16 1702 or 8702 PROMS. The socket locations are marked for easy selection of PROM addresses. A user-selectable memory read delay feature allows efficient use of fast or slow PROM devices. Two on-card regulators provide the +5 and −9 volts required by the 8702–1702 chips.

The PROM-4 board provides up to 4K of addressable Read-Only-Memory, utilizing the Intel 8702–1702 PROM devices. The board contains 256 bytes of memory for each 8702–1702 chip installed.

Address lines A0 through A7 are run directly to all PROM positions to select one o the 256 internal byte positions, while address lines A8 through A11 are used to select and enable one particular PROM Position through 8205 decoders. Address lines A12 through A15 are jumper-selected to determine the board's enabling address.

The board is enabled when the 74LS30 NAND (Cl) inputs are all high, namely when the selected address appears on the address bus, and the Status line SMEMR is high. The Processor Ready line is controlled by a 74195 shift register via an 8T97. The 74195 provides a user-selected memory read delay, selectable with jumpers in the delay select socket. The 74195 shift register is reset on the rising edge of the inverted Board Enable (BDENA) signal.

When addressed and enabled, an 8702–1702 PROM puts out its data on the D0 through D7 lines. The data output lines of all PROMS are tied to these lines, and these lines are buffered via 8T97 sections to th DI0 through D17 back plane bus lines.

Power for the card logic is provided by a +5 volt regulator and a −5 volt regulator-4 volt zener combination to yield +5 and 31 9 volts. Tantalum and disc ceramic by-pass capacitors eliminate noise from the power distribution busses.

In the PROM-4 board the minimum increment possible in memory space is 256 bytes or 1 8702–1702 chip. The board is designed to contain up to 16 8702–1702 devices, which is the full 4K of PROM. Each of the 16 PROM sockets has its own unique address, and each PROM operates independently of any other PROM. Thus, the user may structure his memory space in any way desired merely by placing his PROM(s) in the desired location(s).

The PROM-4 board is structured so that the memory address corresponds to a physical location on the board. The PROM sockets are arranged in a 2 × 8 rectangular array, and a particular PROM socket is addressed by address bits A8, A9, A10 and A11. A particular byte in the selected PROM is addressed by address bits A0 through A7. The sockets are labeled LOW 1 through 8 and HIGH 1 througgh 8, and the following shows the relationship between address and selected socket.

| Address | | | | Socket |
|---|---|---|---|---|
| A11 | A10 | A9 | A8 | Addressing |
| 0 | 0 | 0 | 0 | L1 |
| 0 | 0 | 0 | 1 | L2 |
| 0 | 0 | 1 | 0 | L3 |
| 0 | 0 | 1 | 1 | L4 |
| 0 | 1 | 0 | 0 | L5 |
| 0 | 1 | 0 | 1 | L6 |
| 0 | 1 | 1 | 0 | L7 |
| 0 | 1 | 1 | 1 | L8 |
| 1 | 0 | 0 | 0 | H1 |
| 1 | 0 | 0 | 1 | H2 |
| 1 | 0 | 1 | 0 | H3 |
| 1 | 0 | 1 | 1 | H4 |
| 1 | 1 | 0 | 0 | H5 |
| 1 | 1 | 0 | 1 | H6 |
| 1 | 1 | 1 | 0 | H7 |
| 1 | 1 | 1 | 1 | H8 |

The delay jumper socket (C9) of the PROM-4 board allows selection of the one of four possible memory read cycle delays. The available delay times are 0, 1, 2 or 3 machine cycles, which translates to 500, 1000, 1500 and 2000 nanoseconds. This read cycle delay is necessary to insure the data from PROM is correct before transmission to the data bus. Most 1702–8702 chips available are either 1000 or 1500 nanosecond access time chips. The chips provided by IMSAI with the PROM-4 board are 1000 ns access time devices. After determining the access time of the slowest PROM on the board, the user should jumper the delay socket to produce that necessary delay.

The following is a list jumper pin numbers for the possible delays. In all cases, jumper the selected pin to pin 16.

| Delay (ns) | Pin # |
|---|---|
| 500 | 1 |
| 1000 | 2 |
| 1500 | 3 |
| 2000 | 4 |

The example shown in FIG. 5F is jumpered to a 1000 ns delay.

The board address select jumper location is C2. It permits any one of the 16 possible 4K blocks of memory space to be jumpered to form the board enable.

The jumper location accepts a standard 16 pin IC socket and the jumpers can be soldered onto a header which can be plugged into the socket and changed easily without any resoldering from the board.

After selecting a board address, the user must properly jumper the socket. Very simply, to enable the board, all address inputs to the NAND gate must be high. Therefore, any address bit not a 1 at the selected address should be inverted before connection to the NAND input.

Address bits 12, 13, 14 and 15 are available on pins 1, 3, 5 and 7 and their respective complements on pins 2, 4, 6 and 8. These signals should be jumpered to the input of the board select circuitry which appears on pins 9 through 16. An 8 position DIP switch similar to that used for write enable may be inserted into this location should very frequent changes of address be desired. For a board whose addrss is expected to remain the same, jumpers may be inserted directly on the board.

It is suggested that pins 9, 11 13 and 15 be used to input as desired either a 0 of a 1 from the address bits so that for any address bits desired to be 0, the jumper will extend directly across the header and for any address bits desired to be 1, the jumper will extend diagonally across the header. For instance, if A15 were to be 1, the jumper would extend from pin 7 to pin 9. This makes it easy to visually tell what address the board is jumpered for.

An example jumper for the Address Block beginning with the Address C hex is shown in FIG. 5G.

PIO

The PIO board (FIGS. 8A–E) provides for up to four input and four output ports of eight bits each parallel input and parallel output. Each input and each output port has it own latch and both input and output latches are provided with hand-shaking logic for conventional eight bit parallel transfers.

The handshake logic on any input or output logic port will generate an interrupt. The priority level of the interrupt is selectable. The address of the four ports is four sequential addresses, and this block of four addresses may be jumper-selected to be any block of four sequential addresses in the 256 I/O address space. The board may also be addressed with memory-mapped I/O, in which case normal memory read or write instructions are used to read or write data to the Input/Output ports. When using memory-mapped I/O, board addressing is done by selectable jumpers for the lower byte of address and the upper byte of address is hex FF or octal 377.

Provision is made for each of the four output ports to drive eight LED's for a total of 32 on-board LED's.

This feature can be used to provide program-controlled output for dedicated processor applications in which case this PIO board would be plugged in where the front panel would normally be mounted and a special photographic mask made to put in front of it with the appropriate labels for the specific purpose the controller is to be used. The front panel can still be used during development by plugging it into an extender card in another slot.

The board enable is the output of the 74LS30 in position C9. Input to this 8 input NAND gate is the true or complement address bits 2 through 7, according to how they are jumpered. The input and output status bits are logically ORed and the output or its complement is also jumpered to the NAND gate in position C9. These two are used for I/O reference instructions or these two inputs to the NAND gate are taken from the complement of the status input or output instruction and the high address line which comes from the 74LS30 in position C6. This NAND gate in position C6 is active when all the high order of address bits 8 through 15 are true—that is, high. Address 0 and 1 and their complements are fed into a one-of-4 decoder consisting of the 7427 in position and part of the 7402 in position C11 along with one inverter.

Also as a condition in this one-of-four decoder is the board enable. The outputs of this one-of-four decoder are fed directly to the enable pins on the respective 8212 input or output ports. The DATAIN bus on the 8080 system is driven directly from the output of the four input latches. This is a tri-state output and is enabled only when the chip is selected by the one-of-four decoder.

The DATA OUTPUT bus in the 8080 goes directly to the four 8212 output ports. The second enable line on each of the input ports is connected to the PROCESSOR DATA BUS-IN signal such that the data is placed on the 8080 bus during the time that the processor wishes to read it. The other device select line in output port 8212's is driven by the ORed condition of the PROCESSOR WRITE STROBE or FRONT PANEL WRITE STROBE, these coming from pins 77 and 68 on the 8080 back plane respectively. The PROCESSOR DATA BUS IN signal appears on pin 78 of the 8080 back plane.

Handling the interrupt levels from the four input and four output ports requires only the interrupt select jumper socket in position 2 so that the appropriate interrupt levels which are already originated by the 8212 chips can be connected as desired to the proper priority interrupt line on the 8080 back plane. The remainder of the interrupt function is affected by the PIC-8 board, the Priority Interrupt/Clock board.

The PIO Board has four input ports and four output ports. Each port has an eight bit latch associated with it. These ports may be addressed in one of two different ways: First, addressed as an input/output port with input or output instructions; second, they may be addressed with memory reference instructions. The type of addressing is selectable by jumpers and the board cannot have both types of addressing at the same time. The four input ports form a block of addresses that are four sequential addresses and the four output ports form a block of four sequential addresses which are the same four addresses as the input port. In other words, the same address used with an input instruction to linput on port number 0 is the same address used to output on port number 0.

When the board is being used with memory-mapped I/O, any 8080 instruction which either reads or writes a byte from lmemory can be used to either read or write respectively a byte from an input or output port on the I/O board. That is, a load accumulator, from the address that this board is jumper-selected to respond to, will load the accumulator with the data from the input port addressed. Each of the four input and each of the four output latches are equipped with data strobe lines. Each port has both an interrupt line and a strobe line which can be used as hand-shake signals for conventional parallel data transfers. In the case of the output ports, a low pulse on the strobe line will set the interrupt line low. The interrupt line changes on the falling edge of the strobe line and the strobe line would normally be kept high.

The interrupt line is made high again upon the trailing edge of the WRITE strobe of the processor which is writing la new eight bits of data into the output port. Thus, the strobe line would be the input hand-shaking line and the interrupt line would be the output hand-shaking line. The interrupt line may also be jumpered to one of the 8080 priority interrupt lines on the back plane to effect an interrupt to the processor when it goes low, that is, when the strobe line has been pulsed low to indicate it has been taken by the peripheral device.

If it is not desired to use hand-shaking lines, it is not necessary to jumper them or take any other action. Successive bits may be put out to the output ports with no further action by any other device. In this case, the strobe line would remain high from the on-board pull-up resistor and the interrupt line would remain high for lack of any strobe signal to affect it.

The input ports also have one strobe line and one interrupt line each. Each of the strobe lines for the input ports also has an on-board pull-up resistor. If the strobe line is not connected or if it is driven high, the data in the latch will follow the input lines. The program can read input from the input lines and it will read the data that is present at the instant that the input instruction is executed. When the strobe line is made low the data that is present on the input lines at the falling edge of the strobe lines is latched into the input latch and remains there as long as the strobe line is held low. As soon as the strobe line is raised, the data in the latch will again follow the input lines. On the falling edge of the strobe lines the interrupt line will change from high to low.

This can be jumpered to the priority interrupt lines to create an interrupt to the processor, and/or it may be used as an indication that the processor has not yet read the latched data. If, while the strobe line is being held low, the processor reads data from the input port, then the interrupt line will return high at the trailing edge of the read strobe, thus indicating to the peripheral device that the processor has read that data and the latch is available for latching the next data byte into it. Each input and each output port has its own strobe and interrupt line. They may be driven together or separately.

All four of the output port strobe, interrupt and data lines appear on the 50 pin connector on the upper left edge of the board, and all four of the input port strobe, interrupt and data lines appear on the 50 pin connector on the upper right-hand edge of the board.

Also appearing on these connectors is ground and +5 volts

Each of the data input lines on the input ports is tied to +5 volts through a 1K resistor so that unused lines will be read as a high data level or true data level.

Position C2 on the PIO Board is the interrupt select jumper socket. Appearing at the pins of this socket are all eight of the priority interrupt lines for the 8080, the four input interrupt lines and the four output interrupt lines of the PI0 board. Thus, any interrupt line desired to be used may be jumpered from the appropriate pin.

If an interrupt is desired to be used, the jumper may be put between the interrupt line from the desired input or output port to the desired priority interrupt on the 8080 back plane. The PIC-8 board may be used to monitor these interrupt lines and originate the interrupt to the processor according to which line is requesting an interrupt. If more than one line is requesting an interrupt at the same time, the higher priority line rules. FIG. 8F shows an example for connecting the interrupt line from input port 2 to level 5 priority and the interrupt line from output port 2 to level 2 priority interrupt.

The board address is selected by jumpers or a DIP switch in locations C8 and B9. There are two cases for which this board may be jumpered: 1) to respond to input/output instructions and 2) to respond to memory access instructions. The case of input/output instructions will be treated first.

In selection location B9, pins 8 and 9 must be jumpered together and pins 5 and 12 must be jumpered together. Address bits 0 and 1 determine which of the four input or output ports will be addressed. Port address bits 2 and 3 are also selected on location B9 with jumpers. If, for instance, address bit 2 is desired to be a 0 when the board responds, then pins 4 and 13 would be jumpered together. If address bit A2 was desired to be a 1, then either pins 3 and 13 may be jumpered together, since 13 and 14 are tied to the common address selection input.

It is suggested, however, that when jumpers are being used, pins 3 and 13 be connected together to provide an easy visual indication of whether the address bit is a 1 or a 0 since that will correspond to whether the jumpers are slanted or straight across the jumper socket. Pins 13 and 14 were tied together so than an 8 position DIP switch can be inserted in this location and used to select the address.

Address bits, 3, 4, 5, 6 and 7 are jumpered in a similar manner. Address bit 3 is also on location B9, address 4, 5, 6 and 7 are jumpered on position C8. See FIG. 8G for pin numbers for each address bit.

If it is desired to use the board in a memory-mapped I/0 capacity, then in position B9 the jumpers between pins 8 and 9 and 5 and 12 must be removed and two jumpers inserted between pins 7 and 10 and between 6 and 11. The remaining jumpers for bits 2 through 7 function exactly the same and affect the lower eight bits of the memory address. The upper eight bits of the address will always be all ones, that is hex FF or octal 377.

When used as a memory-mapped I/O board, all instructions that normally affect the memory will operate on the I/O ports. For example, an increment memory instruction would read the data from the addressed input port, increment that data by one and output it on the same address output port. SIO The SIO Board (FIGS. 7A–G) provides a serial input/output capability for the System. It contains two serial I/O ports, providing two complete RS232 full duplex data lines with all control signals. Data lines for both channels are provided in RS 232, TTL level and current loop formats. Asynchronous or synchronous lines utilizing full or half duplex can be run with this board at any rate up to 9600 baud in the Asynchronous mode and 56,000 baud in the Synchrounous mode.

The SIO Board may be jumper-selected to respond either lto input and output instructions from the System or to memory reference instructions for memory-mapped I/O.

Operation of the board requires 16 I/O port or address locations, which are selected by address bits 0 through 3. When the board is used with input and output instructions, address bits 4 through 7 form the remainder of the board address and are jumper selectable. When the board is used as memory-mapped I/O, the lower byte of address is jumper selected exactly the same as an I/O port address and the upper byte of address is hex FE or octal 376.

The SIO Board is structured around a pair of Intel 8251 USART (Universal Synchronous-Asychronous Receiver-Transmitter) devices.

The 8251 chips provide for extensive program control of the input/output functions including the RS232 Control Line and sync character selection in the Synchronous mode and error condition sense and recovery. The board provides interrupt generation for received characters, empty transmitters buffers, and sync characters detected with provision for jumper selecting the priority of the interrupt. The interrupt works in conjunction with the Priority Interrupt/Clock board (PIC-8).

All functions may also be program controlled so that the full capability of the board is available to the machine without the use of interrupts. All RS232 level drivers and receivers necessary for two complete RS232 lines are included on the board.

Control lines included are DSR, DTR, RTS, CTS, and Carrier Detect. RS232 level drivers and receivers are also provided for receive and transmit clocks for use in Synchronous Mode. Jumper options permit the SIO board to be used either as the receiving (terminal) end of an RS232 line, or as the originating (computer) end.

Jumper options are available so that the two serial I/O ports may be used together so that the control lines are connected together on the two ports and the data lines are received and originated by the 8251 USARTS.

This configuration permits breaking an existing RS232 line and inserting the System between the ends so that the control signals pass straight through and the System intercepts, processes, and retransmits the data. This configuration is extremely useful where format adaptation or other changes must be made to data travelling on RS232 Systems.

Jumper-selectable baud rates are provided on the board for standard asynchronous and synchronous rates up to 9600 baud asynchronous and up to 38,400 baud synchronous. Other rates may be obtained through the use of the SIOC board which contains a jumper-programmable divider which mounts directly onto the SIO Board.

TTL and current loop serial input and output are connected to unused pins on the input/output connector. TTL levels are available on the connector for DTR, DATAIN, and DATAOUT, to provide maximum flexibility and utility. A current source is available on the connector for use with current loops. Current loop driving is done through opto-isolators for complete isolation of current loop lines.

To enable the SIO board, it must be properly addressed. In the I/O port addressed mode, address bits A4 through A7 are jumpered to the 74LS30 (8 input NAND) in C8. The status bits SINP and SOUT are NORed, this intermediate value inverted, and applied (via jumper on D6) to another of the NAND inputs. Remaining NAND inputs in this mode are jumpered (via D6) to a +5 volt level. Thus, when the selected address appears on A4–A7, and the MPU sends a SINP or SOUT pulse, the NAND output goes low and the board is enabled.

In the memory-mapped I/O mode, the jumpering in socket C7 still selects an address. The high-order address is interpretted in another 8 input NAND (D8), and hard-wired to respond to the hex value FE. The jumper in socket D6 should be wired to put the inverted output of D8 into an input of C8, and the NORed output of the status bits SINP and SOUT directly connected to the (C8) NAND's input.

The +5 volt tie line jumper in D6 should not be connected for memory-mapped I/O. In this mode, when the corrected high and low order bits are on A4 through A15, and the MPU does not send a SINP or SOUT pulse, the board is enabled.

The SIO board has a bi-directional data bus on the board which connects to the 8251 chips and to the input and output portion of the SIO board control port. The bi-directional bus is connected to the DATA IN and DATA OUT busses on the back plane through 8216 bi-directional bus driver chips. The board enable signal selects these bi-directional bus driving chips and the processor's data bus in signal (DBIN) is used to determine the direction of driving of the bi-directional chips.

8T97's are used to gate the control port data on the bi-directional data bus on the board. They are enabled by the DBIN strobe from the processor and address bit 3.

The 4 output bits of the control port on the SIO board are latched into the 74177 which is clocked by a combination of board enable and address bit 3 and the write strobe either from the processor or from the front panel.

The 8251 chips are selected by address bits 1 and 2, respectively, with address bit 0 determining whether the chip is in control or data mode. The read and write strobes are supplied to complete the control, enabling the chip to read data or write data onto the bi-directional data bus on the board.

The four control lines desired for interrupt generation are ORed through 7425 and the resultant value supplied to an interrupt select jumper socket (D3). The 7425 OR gate may be disabled by two of the output port bits (IEA or IEB) when interrupts are not desired.

The two megacycle system clock phase II is divided to provide the standard baud rates for jumper selection to channel A and B. It is first divided by 13 through the use of a 7493 with external gating. This produces a rate extremely close to 16 times 9600 baud.

Further division of two are made by 7493's to provide most of the other standard baud rates. 110 baud for a standard teletype is achieved by a divide by 11 from the 2400 baud line which is then divided by 2 to create a symmetrical output and supplied to the jumper socket for 110 baud.

The phase II clock, +5 volts and ground are also supplied to the data rate select socket for use by the SIOC board which connects to the SIO board through the data rate select socket (B11) to provide a jumper-selectable baud rate generator for special rates.

The data and control outputs of the 8251 chips are driven or received through 1488 or 1489 TTL to RS232 level converters as appropriate to the functions. The TTL levels for data and control are driven through open-collector peripheral drivers and a 220 ohm pull-up to +5 volts. The current loop input and output are driven through opto-isolators and are designed to work adequately with either 20 or 60 milliampere current loops.

The IMSAI SIO Board provides 2 independent channels of serial data input and output. Utilizing the Intel 8251 USART devices, the SIO Board provides 2 channels of RS232, TTL, and current loop data lines with complete control signals.

The SIO Board also includes all logic necessary to control the 8251 devices from the Back Plane.

Both the memory-mapped and jumper-wired I/O configurations use the lower 4 bits of the address bytes (A1 through A3) to select and control the board's functions. Bits 4 through 7 of the board address (A4 - A7) are jumper-selected. If the board is jumper-selected to run as an input and output port type board, then A0 - A7 form a complete address. If the board is jumper-selected to respond to memory-mapped I/O, then A0 - A7 form the lower byte of address and the upper byte of address is hex FF or octal 376.

Address bits 1 and 2 select serial I/O channel A or channel B respectively. That is, when address bit 1 (A1) is high, serial I/O channel B is enabled. When address bit 2 (A2) is on, serial I/O channel B is enabled.

Address bit 0 determines whether the I/O channel selected will respond to the current byte as a control byte or a data byte. If address bit 0 is a 1, the control functions are selected, and if address bit 0 is a 0, the byte is assumed to be data. Thus, to write a control byte into serial I/O channel A, the lower 4 bits of address would normally contain hex 3 or octal 03, while the normal address for channel B control bytes would be hex 5 or octal 05. Address bit 3 (A3) selects the board control I/O port. When address bit 3 (A3) is high, the control port will be enabled. Thus, when use is being made of the control port, the lower 4 bits of address would normally be hex 8 or octal 10.

The control I/O byte selected by address bit 3 is divided into the upper 4 bits and the lower 4 bits. The lower 4 bits, 0 through 3, serve the channel A serial I/O circuit. The upper four bits, 4 through 7, serve the second I/O channel B functions. Bits 0 and 4, for channel A and B respectively, control the interrupt enable separately for each channel. When this bit is a 1, the interrupts are enabled and the processor will receive and interrupt whenever any one of the following 4 lines are active: the transmitter ready line, the transmitter empty line, the receiver ready line, and the sync detect line.

If bits 0 or 4 (as appropriate to channel A or B) are made 0, then no interrupts will be generated from the affected channel. Bits 1 and 5 serve channel A and B, respectively, to output the carrier detect signal. This is operative only when the jumper in jumper socket BJ has selected the board to act as the originator of the carrier detect line. Bits 2, 3, and 6, 7 are not functional in the output mode for the SIO control byte. When an input is read from the SIO control byte, bits 0, 1, 4 and 5 are not functional. These 4 bits will always be read as a 1.

Bits 2 and 6 read the condition of the carrier detect receiver for channels A and B, respectively. The signal is operative only when jumper socket BJ is jumpered to read the condition of the carrier detect line.

Bits 3 and 7 serve channel A and B, respectively, to read the condition of the clear-to-send (CTS) control signal. This is provided because it is not possible to read the condition of CTS through programmed input from the 8251.

SIO BOARD ADDRESSING

| Address Bit | Function | | |
|---|---|---|---|
| 0 | C/D on 8251's | 1 = CONTROL | 0 = DATA |
| 1 | SELECT CHANNEL A | 1 = SELECT | |
| 2 | SELECT CHANNEL B | 1 = SELECT | |
| 3 | SELECT CONTROL I/O | 1 = SELECT | |
| 4 | CARD ADDRESS Jumperable to any one of 16 addresses | | |
| 5 | | | |
| 6 | | | |
| 7 | | | |

↑ This byte is I/O port address to run SIO card from INP & OUT instructions.
Lf SIO card is to be run from memory reference instructins (memory mapped I/O), the above byte is the low order address byte; the high order address byte is $FE_{hex}$ ($376_{octal}$) ($1111\ 1110_{binary}$)

SIO CONTROL I/O BIT DEFINITIONS

| Bit | Input Byte | Output Byte |
|---|---|---|
| 0 | always 1 | Interrupt Enable chan. A |
| 1 | always 1 | Carrier Detect chan. A |
| 2 | Carrier Detect chan. A | non - functional |
| 3 | Clear To Send chan. A | non - functional |
| 4 | always 1 | Interrupt Enable chan. B |
| 5 | always 1 | Carrier Detect chan. B |
| 6 | Carrier Detect chan. B | non - functional |
| 7 | Clear To Send chan. B | non - functional |

Carrier detects need option jumper to select originate/receive
Interrupts occur on TxRDY, TxEMTY, RxRDY, and SYNDET
TxRDY AND RxRDY interrupts are removed if the respective functions (transmit and receive) are disabled by software command byte. TxEMTY interrupt is removed only by filling transmit buffer with a byte. This may be done while the transmit function is disabled if desie

SIO BOARD I/O PIN DEFINITIONS

| EIA 25 pin connector | 26 pin edge connector | RS232 LEVELS | TTL LEVELS | CURRENT LOOP |
|---|---|---|---|---|
| 1 | 1 | AA chassis ground | | |
| 2 | 3 | BA Trans Data | | |
| 3 | 5 | BB Rec. Data | | |
| 4 | 7 | CA Req. to Send | | |
| 5 | 9 | CB Clr. to Send | | |
| 6 | 11 | CC Data Set Rdy. | | |
| 7 | 13 | AB signal ground | | |
| 8 | 15 | CF Carrier Det. | | |
| 9 | 17 | +V | | +V +Current Source |

-continued

SIO BOARD I/O PIN DEFINITIONS

| EIA 25 pin connector | 26 pin edge connector | RS232 LEVELS | TTL LEVELS | CURRENT LOOP |
|---|---|---|---|---|
| 10 | 19 | | | |
| 11 | 21 | | | In Loop + |
| 12 | 23 | | | Out Loop + |
| 13 | 25 | | | Out Loop |
| 14 | 2 | | $\overline{\text{Data Term. Rdy.}}$ | |
| 15 | 4 | DB Trans. Clk. | | |
| 16 | 6 | | $\overline{\text{Data Set Rdy.}}$ | |
| 17 | 8 | DD Rec. Clk. | | |
| 18 | 10 | | $\overline{\text{Data Out}}$ | |
| 19 | 12 | | Data In | |
| 20 | 14 | CD Data Term. Rdy | | |
| 21 | 16 | | | Current sink 1 |
| 22 | 18 | | | |
| 23 | 20 | | | Current sink 2 |
| 24 | 22 | | | |
| 25 | 24 | | | In Loop |

The TTL output levels are driven by a 75452 dual peripheral driver, with open collector outputs, and a 220 ohm pull-up to +5 volts. The TTL data inputs drive 1TTL input load and a 1K pull-up to +5 volts.

When the TTL inputs are not being used, they should be left open or held high so as not to affect data input from other sources.

The TTL Data Input line must be left open and not held high when the current loop inputs are used. The current loop input drives opto-isolators and will respond to either 20 or 30 milliamperes. In applications where a significant reverse voltage may be experienced, such as when inductive circuits (i.e., relays) are coupled to the data line, a protective diode should be put across the line such that any reverse voltage spikes will cause the diode to conduct and thus protect the LED in the opto-isolator from too large a reverse voltage.

The current loop output is switched by an isolated transistor through an opto-isolator and is provided with a transient-shunting diode across the output transistor so that it may be used to drive relays without risk of damage to the output circuit. Typical wiring connections are shown in FIGS. 7J and K, both with and without the current source being used.

Setting the baud rate for serial I/O channels A and B is done on the jumper select socket RJ in position B11. The baud rates designated in FIG. 7L for rate select are correct when the 8251 is programmed for a 16X asuynchronous clock rate and a 1X synchronous clock rate.

The jumper selection socket in A3 serial I/O channel A and the jumper selection socket in B8 serves serial I/O circuit B. Their functions are the same for their respective channels. The function of this jumper socket is to permit the serial I/O port RS232 to be wired so as to either serve as the terminal end of a 232 line or the computer end of a 232 line with no special cable wiring required off the Serial I/O board.

With pins 1, 2, 4, 5, 7 and 8 wired directly across the jumper socket as shown in FIG. 7H for the terminal end, the function of the lines correspond one to one with the names of the RS232 control lines referred to in the 8251 specifications.

The inputs and outputs are arranged as appropriate for the SIO board to serve as the terminal end of an RS232 line. Should it be desired for the SIO board to serve as the computer end of a standard RS232 line, use jumpers connected as shown in FIG. 7H. The 3 pairs of lines are reversed so that TRANSMIT DATA is now driving what is received data for the terminal and RECEIVE DATA is receiving what is transmit data from the terminal, and similarly REQUEST TO SEND and CLEAR TO SEND are reversed and DATA SET READY and DATA TERMINAL READY are reversed.

Ground and +5 volts are available on the socket for providing permanent mark or space levels to any of the control lines if CLEAR TO SEND is not driven by an external source. It should be wired to pin 6 to provide a constant enable for the transmitter section of the USART.

Jumper socket BJ serves both to determine whether CARRIER DETECT is being originated or received by the SIO board. It is also used to jumper the control lines between channel A and channel B for applications where the control lines are desired to be passed through and data intercepted and handled. The four primary control lines for both channel A and channel B appear in this jumper socket, and can be jumper-wired straight across as desired.

It should be remembered that only one source should be driving an RS232 line at a time. If the control lines are jumpered straight across so that the modem and data terminal are driving the lines, then appropriate jumpers in the jumper socket locations A3 or B8 should be removed so that the SIO board will not be attempting to drive these lines at the same time. If it is desired to detect the DATA TERMINAL READY line, then a jumper needs to be placed as shown in FIG. 7M between pins 5 and 6 for channel A, or between pins 11 and 12 for channel B.

If it is desired to originate the CARRIER DETECT line, a jumper should be placed instead between pins 5 and 7 for channel A, for 10 and 12 for channel B.

Ground and +5 volts are available in this jumper socket for providing a permanent mark or space level to any of these control lines.

The interrupt line for channel A and channel B both appear on the interrupt select socket in position D3 (FIG. 7N). All 8 of the system priority interrupt lines on the back plane, also appear on the interrupt select socket. A jumper may be placed between the appropriate channel's interrupt line and any one of the priority interrupt system lines to provide an interrupt of the desired priority.

The jumper select socket in A1 provides facilities for originating and receiving clock signals for receive or transmit for use in the synchronous mode of communication. One-half of the socket controls lines for Channel A and the other half is dedicated to Channel B. Pins 1, 2, 3, 4, and 13, 14, 15 and 16 serve the channel A jumper functions. The remainder of the pins have the identical function for Channel B.

When it is desired to originate the clock signal the pins for that channel should be jumpered straight across, as shown in FIG. 7O, so that the clock signal from the SIO board is driven through converters to RS232 levels onto the DD and DB lines.

The inputs to the data clock receive circuits are tied to −12 volts to provide an inactive output to the OR-gate supplying the receive clock to the USART chip.

When it is desired instead to receive the clock from the RS232 cable, then these jumpers are removed and the RS232 lines DD and DB are jumpered to the input of the clock-receive circuits.

When this is done, the data rate select socket for the appropriate channel must be jumpered so that the clock line from this jumper select socket is held at ground or low in order to avoid interference between the onboard clock circuit and the incoming clock from the RS232 line.

The jumper socket in position B11 provides for selecting different baud rates for both Channel A and Channel B from the set of standard rates provided by the SIO board. The pin numbers and baud rates are indicated in FIG. 7L.

The clock lines for Channel A and Channel B are completely independent and may be jumpered to the same rate or different rates.

When the chip is being used in the synchronous mode, the chip is running at a 1X clock rate rather than 16 X rate as in asynchronous mode. Thus, the baud rates are 16 times as great for the same jumper location when used in the synchronous mode. The board address is selected by jumpers or a DIP switch in locations C7 and D6. There are two cases for which this board may be jumpered: 1) to respond to input/output instructions and 2) to respond to memory access instructions. The case of input/output instructions will be treated first. (See FIG. 7P)

In selection location D6 pins 8 and 9 must be jumpered together and pins 5 and 12 must be jumpered together. The user must jumper socket C7 so when the desired I/O Port Address appears on the Address lines, the inputs to the NAND gate from bits A4 through A7 are high. If, for instance, address bit 6 is desired to be a 0 when the board responds, then pins 4 and 13 would be jumpered together. If address bit A6 was desired to be a 1 then either pins 3 and 14 may be jumpered together or 3 and 13 may be jumpered together, since 13 and 14 are tied to the common address selection input.

It is suggested, however, that when jumpers are being used, pins 3 and 13 be connected together to provide an easy visual indication of whether the address bit is a 1 or a 0 since that will correspond to whether the jumpers are slanted or straight across the jumper socket. Pins 13 and 14 were tied together so that an 8 position DIP switch can be inserted in this location and used to select the address. Address bits 4, 5, and 7 are jumpered in a similar manner on position C7.

If it is desired to use the board in a memory-mapped I/O capacity, then in position D6 the jumpers between pins 8 and 9 and 5 and 12 must be removed and two jumpers inserted between pins 7 and 10 and between 6 and 11. The remaining jumpers for bits 4 through 7 function exactly the same and affect the lower eight bits of the memory address. The upper eight bits of the address will always be all ones, that is hex FE or octal 376.

When used as a memory-mapped I/O board, al instructions that normally affect the memory will operate on the I/O ports. For example, an increment memory instruction would read the data from the addressed input port, increment that data by one and output it on the same address output port.

To use the SIO Board in its simplest form, non-interrupted input/output instruction controlled, create jumpers as shown in FIG. 7Q.

The following comprises a sample sequence to set up SIO for teletype and echo from keyboard to printer:

Format used is 2 stop bits, no parity, and 7 data bits. Reset 8080 before running. Address and constants are in hexadecimal.

```
LIST
0010          MVI A, OCAH  MODE BYTE
0020          OUT 03
0030          MVI A, 27    COMMAND BTYE
0040          OUT 03
0050    LOOP  IN 03        READ CHAN A STATUS
0060          ANI 02       MASK OUT ALL BUT RECEIVER READY
0070          JZ LOOP      IF NOT READY LOOP
0080          IN 02        READ CHAR
0090          OUT 02       WRITE CHAR
0100          JMP LOOP

ASSM 3700
3700 3E CA     0010          MVI A, OCAH  MODE BYTE
3702 D3 03     0020          OUT 03
3704 3E 1B     00.30         MVI A, 27    COMMAND BYTE
3706 D3 03     0040          OUT 03
3708 DB 03     0050   LOOP   IN 03        READ CHAN A STATUS
370A E6 02     0060          ANI 02       MASK OUT ALL BUT RECEIVER READY
370C CA 08 37  0070          JZ LOOP      IF NOT READY LOOP
370F DB 02     0030          IN 02        READ CHAR
3711 D3 02     0090          OUT 02       WRITE CHAR
3713 C3 08 37  0100          JMP LOOP
```

The PIC-8 Priority Interrupt-Programmable Clock Board (FIGS. 6A–E) provides the IMSAI 8080 Microcomputer System with an eight level Priority Interrupt capability and a software-controlled interval clock.

The Priority Interrupt system utilizes the Intel 8214 Priority interrupt control unit and monitors the 8 Priority Interrupt lines on the system back plane. The PIC-8 has the capability to serve either single or multiple interrupt requests. When enabled and receiving an interrupt request, the Pic-8 determines if the request priority is higher than the software-controlled current priority, and if necessary issues a restart instruction that directs the system to one of eight priority controlled restart locations. For multiple interrupt requests, the 8214 determines the highest priority request, and processes it normally. It should be noted that the system does not store inactive requests, and that a peripheral device must hold an interrupt request until it is serviced by the microprocessor.

The current priority status register may be software set to any value desired to prevent low priority interrupts from being generated until the priority status register is reset to a lower value. The status register may be set to 0 if it is desired for all levels of interrupt to always occur.

The PIC-8 board also includes a clock circuit which provides programmed control at intervals ranging from 0.1 millisecond to 1 second. The program can select from among 3 jumper selected interval rates, or it can turn all three off. The 3 rates are jumper-selectable to any of the following values: 0.1 ms, 0.2 ms, 1 ms, 2 ms, 10 ms, 100 ms. 200 ms, or 1000 ms. Additionally, one bit of the DATA OUTPUT port is connected to a transistor and jumper pads for a special-purpose programmer-controlled output. Room is provided on the circuit board for a small speaker or other user-supplied circuitry. Also provided are 5 16-pin IC hole patterns with power and ground decoupling for special purpose user circuits. These hole patterns are drilled to accept wire wrap sockets.

Program control of the PIC-8 board is done entirely through one output port location. The address of this output port is jumper-selected in socket positions E4 and E5, and forms the input to the 8 input NAND gate (741s30). The output of this address select is ANDed with the Processor Write Strobe and Phase II clock and provides an output strobe which is used to latch the lower 4 bits of output data into the 8214 priority interrupt chip, and the upper 4 bits into the 7475 bit latch.

When the 8214 is ENABLED and one of the priority request lines is low the 8214 sets the output of a 2 GATE Flip-Flop low to request an ineterrupt from the processor. When the processor acknowledges the interrupt the Flip-Flop reset and 3 buffer drivers of the 8T98 are enabled to put interrupt request address on bits 3, 4 and 5 of the DATA IN bus. The remaining bits of the DATA are not driven, and remain high via pullup resistors on the MPU Board. The byte thus formed on the DATA IN bus is a restart instruction with bits 3, 4, and 5 directing the processor to one of eight restart locators.

The PIC-8 board also includes a software controlled interval clock. The clock circuit takes the Phase II clock running at two megahertz and divides it by 200 using a divide-by-two (7474) followed by two divide-by-10 sections (7490) to provide the 0.1 millisecond intervals.

Four consecutive divide-by-10 7490's are then used to produce the other interval rates up to the longest rate of one second. Jumper selection is made from among these rates and ANDed with the output port bits 4, 5 and 6 and the output from the AND gate is used to drive the clock on the other half of the 7474 D type flip-flop. Ths section of the flip-flop is connected so that on successive clocks it will shift states and thus alternately request and remove the request for an interrupt.

When the processor system is running, and replying to the interrupts, shortly after the request is issued, the interrupt acknowledge line will become active in the low state and set this flip-flop to remove the interrupt request so that the next time the clock line rises, the flip flop is again reset to request another interrupt. The interrupt request from this circuit is jumper-connected to any one of the priority interrupt lines and is handled by the 8214 circuitry exactly the same as any other peripheral board requesting an interrupt through the back plane would be.

Output bit 7 is used to drive the base of the transistor through a 1K resistor for current limiting, and the user supplied circuit to be driven is connected between the positive voltage and the collector current limiting resistor. Should just a voltage level be desired, as an output from this circuit, a resistor from 220 ohms to 1K ohm can be inserted in the collector circuit in the holes provided and a jumper placed between pads A and C to connect the top of the resistor to +5 volts. The output may be taken from point B which will be low when the bit is written as a 1 and will be high when the bit is written as a 0.

For a high impedance load, voltage swing will be nearly a full 5 volts for the high level and 0.3 volts for the low level. If a direct TTL level output is desired, it can be obtained from solder pad E if the 1K resistor in the base lead is removed and a jumper placed in its location and the transistor removed so as not to provide undesired load for a high level output.

Request for an interrupt appears at the PIC-8 board in the form of one of the eight priority interrupt request lines being pulled to a logic 0 level. The 8214 chip will recognize that one or more interrupts are being requested and it will determine which multiple request has the highest priority.

The eight priority levels are numbered 0 through 7, with 7 being the highest priority. The priority level of the highest current interrupt request is then compared against the value stored in the current priority status register in bits 0, 1 and 2. If the currently-requested priority level is equal to or lower than the value stored in the current priority status register, no interrupt will be generated.

If the priority interrupt being requested is 0 and the current priority status register contains a 0, no interrupt will be generated. Thus, if a 5 were stored in the current priority status register, then only interrupt levels 6 and 7 would generate an interrupt. Interrupt levels 5 and lower would not be acted upon at this time.

If the priority interrupt being requested is 0, and the current priority status register contains a 0, no interrupt would be generated as the priority level is not greater than that stored in the current priority status register. If the current priority status register data bit 3 is written as a 1, the compare to the current priority status register is overridden, and the request for an interrupt priority 0 is acted upon and an interrupt to restart position 0 is generated.

If other priority level interrupts are requested during the time that data bit 3 has been written as a 1 in the current priority status level, then the highest priority interrupt requested will be acted upon.

At any time, if there is more than one priority level of interrupt being requested, only the highest priority level is acted upon, and any interrupt requests not serviced must be held present until the system can return to them.

After each interrupt has been generated, and the processor has responded to it, it is necessary that the current priority status register be restored to either the same or a different value; otherwise, no further interrupts will be generated.

When interrupts are initially enabled in a system, the current priority status register should also be intialized to insure that the interrupt generating system will respond to an interrupt.

It should be noted that the current priority status register inputs data bits 0, 1, and 2, are input in the complement form.

The program controlled clock's functions are selected by both user jumpers and software. Ater jumpers have been installed in the interval selection and priority select sockets, writing to the PIC-8's output port address can enable the clock circuitry. Data bits 4, 5, and 6 control the user-selected intervals.

In normal use, only one interval will be selected at a time; thus, only one of the three bits, 4, 5, and 6 in the output port will be 1 at a given time. If two or more of these bits are written 1 at the same time, then the different rates will interact and interrupts will not occur continuously at the highest rate, but will occur at the highest rate for only portions of the time and not at all during other portions of the time as determined by the specific rates selected. For example, if both the rates 1 millisecond and 1 second are selected at the same time, one millisecond interrupts will be received for ½ of one second and then no interrupts will be received for the second half of that second and this pattern will repeat every second.

Should an interval interrupt not be acted upon in the time remaining between it's occurrence and the occurrence of the following interval interrupt request, the interrupt request will be taken away at the following pulse, and the request will again be asserted on the second interval following the first. This pattern of requesting an interrupt every other interval will continue until the system is able to respond to the interrupts within the time period required.

Whenever a byte is output to select or change the selection of the interrupt interval, it must be remembered that the lower 4 bits of the same output byte affect the interrupt generating circuitry, and will set it so that it is ready to respond to the next interrupt. The desired value for the current priority status register, must be present in the output bytes lower 4 bits every time a bit is output for any purpose, whether it is to select or change the selection of the interrupt interval desired, or whether it is to change the current priority status register, or to output a bit 7 to the special purpose circuitry supplied by the user. Similarly, any time the output byte is used to set or change the current priority status level, bits 4, 5, and 6 must be also output according to the desired interrupt interval selected. Any bit which is written without changing does not cause any momentary glitches or other effects.

positions E4 and E5 contain the user-jumpered 16-pin address selection sockets. These jumpers allow the PIC-8 board to respond to any 1 of the 256 possible I/O port addresses.

As shown in FIG. 6F to enable the CRI board it is necessary to have all eight inputs to the 74LS30 (C5) high. The user should select the desired address, and then jumper the address selection sockets so that when that address appears on address lines A0 through A7, all the NAND inputs are high, and the board is then enabled.

Each socket contains values of 4 lines and their complements. Socket E5 controls lines A0 through A3. Socket E4 controls lines A4 through A7. If the user-selected address presents a 1 on an address line, that line sould be directly connected to the NAND input via a short wire jumper on the socket header. Conversely, if the user selected address presents a 0 on an address line, the inverted address line value should be connected to the NAND.

It is suggested that for lines jumpered to enable on a 1 value that the jumpers be placed diagonally across the socket (i.e., Pin 1 to Pin 15) and for lines jumpered for a 0 value, the jumper be placed straight across the header (i.e., Pin 2 to Pin 15). This convention allows easy visual determination of the selected address, for 1's appear as diagonals and 0' as horizontals. An example of a correctly jumpered socket pair for the address C4 hex or 304 octal is shown in FIG. 6F.

If desired, very frequent address chages may be easily implemented through the exchange of an 8 pole DIP switch for each socket.

All 8 of the NAND inputs should be jumpered to respond to either a 1 or a 0. While any input left unconnected will appear to act as a 1, open inputs are very suseсptible to noise pulses.

In position D2, the jumper socket permits the selection of the priority level at which the interrupts generated by the interval clock circuit will occur. The interrupt request level from the interval clock circuit appears on pin 4 of the jumper socket, and the eight available priority levels inputs appear on pins 9 through 16 of the jumper socket. A jumper should be placed between in 4 and the pin corresponding to the priority level desired for the interval clock's interrupts (see FIG. 6G).

While 3 interrupt intervals may be program selected on the PIC-8 board, jumper selection from among the nine available interrupt intervals must be made in the jumper socket in position C4 to choose with three interrupt intervals the program is capable of selecting among. As indicated in FIG. 6H, Pins 12, 13 and 14 on the jumper socket are the three inputs to the interrupt generating circuitry from along which port bits 4, 5, and 6 are used to select one or more of the levels to be active. A high level on data bit 4 will select the input jumpered to pin 12. A 1 on bit 5 will select the rate jumpered to pin 13, and a 1 on data bit 6 will select the input interval jumpered to pin 14.

The nine available intervals appear on pins 1 through 9 of the jumper socket as indicated in FIG. 6H and the three desired intervals from among the set should be jumpered to pins 12, 13, and 14.

FIG. 6H shows an example of jumper wiring which will permit data bit 6 to select 0.2 millisecond intervals, data bit 5 to select 20 millisecond intervals, and data bit 4 to select one second intervals.

Bit 7 on the output port is available for special purpose uses as desired by the user. Again it must be remembered that every time bit 7 is out the remaining bits 0 through 6 must also be output according to the desired functions.

DMAB

As noted above, the DMAB provides a high speed data transfer path among the various processors of the system and to external host computers. With reference to FIG. 1, processor 16 is used to detect the requirement for DMA as initiated from the other occupants on the DMAB, i.e. the communications, DBMS and storage level processors, and the external computers 12, 12'. This is accomplished in a polling system in which the processor 16 sequentially reads a bit in the status register possessed by every occupant on the DMAB. The processor 16 then transfers from the memory of the initating member the pertinent information (starting addresses, block length, source and destination) to itself.

Processor 16 next loads the starting address and block length into the respective registers of the source occupant and the destination occupant of th DMAB, after which a go signal is sent to both occupant involved in the transfer. The two participants then proceed to exchange data independently of processor 16. When the transfer is complete, processor 16 is notified by the receiver of the data and resumes polling. FIGS. 55–75 illustrate the system units, components and timing of the DMAB.

Processor 16 (FIGS. 55, 61, and 64) is driven by a PIO board. Processor 16 in turn drives the DMAB Bus 15 which in turn controls all other boards on the system. All port numbers assume that the PIO board is set up to respond to I/O ports 0, 1, 2 and 3.

Processor 16 is used to set up DMAB-S boards and the DMAB-11 boards, both of which are termed slave boards and are shown in FIGS. 65–74. The commands available are:

| Command | Mode Bit Setting in Hex | What should appear on data lines | Notes |
|---|---|---|---|
| Enable Slave | 0 | Slave Address | The slave will now respond to other cmds. |
| Disable Slave | 1 | Slave Address | |
| Load AO | 2 | Low Order Bits of Address | |
| Load Al | 3 | Middle Order Bits of Address | Loads Start Address of a Transfer into a Slave's Register |
| Load A2 | 4 | High Order Bits of Address | |
| Load W cnt 0 | 5 | Low Order Bits of Word Count | Loads Word Count of a transfer into a Slave's Register |
| Load W cnt 1 | 6 | High Order Bits of Word Count | |
| Write Status | 7 | Status | Loads Status into a Slave's Status Register |
| Read cnt0 | 8 | Low Order Bits of Word Count | Reads the Word Counter in a Slave |
| Read cnt1 | 9 | High Order Bits of Word Count | |
| Read Status | A | Status | Reads the Status Register of a Slave |
| GO | B | None | Initiates a Transfer |
| Un-assigned | C,D,E,F | | |

TABLE OF LINES

| Line Name | Pin #'s for Differential Signals on DMAB Cable | Port#,Bit# That Line is Driven By | Port#,Bit# That Line is Enabled By | Port#,Bit# That Line is Read |
|---|---|---|---|---|
| RDY | 2,3 | 1,5 | 2,5 | 1,5 |
| ACK | 6,7 | 1,4 | 2,4 | 1,4 |
| MCR | 9,10 | 1,7 | 2,7 | 1,7 |
| MCA | 12,13 | 1,6 | 2,6 | 1,6 |
| Mode0 | 15,16 | 1,0 | 2,1 | 1,0 |
| Mode1 | 17,18 | 1,1 | 2,1 | 1,1 |
| Mode2 | 19,20 | 1,2 | 2,1 | 1,2 |
| Mode3 | 21,22 | 1,4 | 2,1 | 1,3 |
| Parity | 24,25 | * | 2,0 | 2,6 |
| Data0 | 27,28 | 0,0 | 2,0 | 0,0 |
| Data1 | 30,31 | 0,1 | 2,0 | 0,1 |
| Data2 | 33,34 | 0,2 | 2,0 | 0,2 |
| Data3 | 36,37 | 0,3 | 2,0 | 0,3 |
| Data4 | 39,40 | 0,4 | 2,0 | 0,4 |
| Data5 | 42,43 | 0,5 | 2,0 | 0,5 |
| Data6 | 45,46 | 0,6 | 2,0 | 0,6 |
| Data7 | 48,49 | 0,7 | 2,0 | 0,7 |

*This line is driven by the Logic as the odd parity of the D or by port2, or by port2, bit3 (which is selected by port2, NOTE: Port2, Bit 6 indicates if parity on data lines is bad.

There is a handshaking sequence (controlled by software) for each command. The sequence for transfer to the slave is:

(1) Set up data lines and set up mode lines
(2) Raise MCR
(3) Wait for MCA to come up
(4) Lower MCR (Note: MCA will then fall)

The sequence for transfers to the Master Controller (Processor 16) is:

(1) Set up Mode Line
(2) Raise MCR
(3) Wait for MCA to come up
(4) Read data from Data Lines
(5) Lower MCR (Note: MCA will then fall)

The sequence for a GO command is:

(1) Set up Mode Lines
(2) Raise MCR
(3) Wait for MCA to come up
(4) Lower MCR (Note: MCA will then fall)

To abort a GO command:

(1) Lower MCR (Note: MCA will then fall)

SLAVE STATUS REGISTER

| 7 | 6 | 5 | 4 | 3 | 2 | 1 | 0 |
|---|---|---|---|---|---|---|---|

| | | |
|---|---|---|
| Bit 0 | TRANSMIT | These seven bits can be read and set/reset |
| Bit 1 | RECEIVE | by Master Controller 16 and local Processor |
| Bit 2-5,7 | Undefined | Output of Bits 0 and 1 are used by logic. |
| Bit 6 | Parity Error over DMAB set by logic can be read and set/reset by Master Controller 16 and local processor. | |

DMAB-S

The DMAB-S is a slave board that is under the control of the DMAB-MC Board. The slave board can either receive or transmit data on the DMAB Bus. The slave is set up by the Master Controller with a starting address and a word count. The only other thing of interest to the Programmer is the Status Register (which is readable by the Master Controller via a Read Status command or settable via a Write Status command) which is read or written via an input or output instruction issued by the microprocessor into which the slave board i is plugged. The specific I/O address of the Status Register is set by jumpers on the Slave Board.

DMAB-11

The DMAB-11 is an example of a mainframe interface (PDP 11 computer) and is similar to other slave boards.

(1) It provides 32 16-bit registers in the I/O address space of the PDP-11 (Jumperable to any location)
(2) These registers are read and written as normal I/O registers by the PDP-11

(3) These registers are read and written by the DMAB system by setting up a normal transfer from the PDP-11 memory to the controller's memory.

(4) The status register is different:

(a) The PDP-11 cannot read the status register if it is desir to read the status register content by the PDP-11. The contents must be transferred to one of the 32 16-bit registers via a normal transfer.

(b) There are more bits of status.

Status bit 0 is the same, transmits bits as a normal slave.

Status bit 1 is the same, receives bits as a normal slave.

Status bit 2 is set by the PDP-11 unibus line INITL.

Status bit 3 is set by the Master Controller and causes an interrupt on the PDP-11 (the interrupt vector is set by board jumpers).

Status bit 4 is a timeout bit that is set by the logic on the DMAB-board after the PDP-11 has not responded to the MSYN for approximately 20 microseconds.

Status bit 5 is a bit set by the PB unibus signal.

Status bit 6 is a bit that is set by the logic if a parity error is discovered during a DMAB transfer.

PROGRAMMING INSTRUCTIONS FOR DMAB BUS

Sequence necessary for causing a transfer from one slave unit to another:

1. Load address register on transmitting slave
2. Load word count on transmitting slave
3. Load address register on receiving slave
4. Loan word count on receiving slave
5. Load status register on transmitting slave
6. Load status register on receiving slave
7. Issue GO command How to do individual steps:

Steps 1 and 3:

a. Issue enable slave command after placing slave code on data lines
b. Issue load A0, A1 and A2 commands after placing address data on data lines
c. Issues disable slave command after placing slave address on data lines.

Steps 2 and 4:

a. Issue enable slave command after placing slave code on data lines.
b. Issue WCNT 0 and WCNT 1 commands after placing word count data on data lines.
c. Issues disable slave command after placing slave address on data lines.

Steps 5 and 6:

a. Issue enable slave command after placing slave code on data lines.
b. Issue write status command after placing status data on data lines.
c. Issue disable slave command after placing slave address on data lines.

How slave notifies master of need to transfer data:

1. Processor places information necessary for transfer in specific area of memory (user option) and raises (via an I/O instruction) a status bit (on the slave board plugged in to that processor) (which one is a user option) indicating service is needed.

How the master knows when a slave needs to move data:

1. Polls slave units with a read status command looking for status bit indicating service request.
2. Master then (via an ordinary DMAB transfer) transfers the block of information into it's own memory (via it's own slave board), examines it and proceeds to set up the transfer.

Explanation of Individual Commands:

Enable slave: This command enables a slave board to receive additional command.

Disable slave: This command disables a slave so it will not respond to commands.

Load A0: Load low order 8 bits of the 24 bit address of the first byte of a transfer.

Load A1: Loads 2nd 8 bits of the address of the transfer.

Load A2: Loads 3rd 8 bits of the address of the transfer.

WCNT0: Loads the low order 8 bits of a 16 bit word count.

WCNT1: Loads the high order 8 bits of a 16 word count.

Write Status: Load status register of a slave board including a bit to say if the slave is sending or receiving on the next transfer.

RCNT0: Reads low order 8 bits of word count.

RCNT1: Reads high order 8 bits of word count.

Read status: Read status of status register (contents set by slave processor).

GO: Causes any slave set up as a transmitter to start extracting words from memory and sending them out on the bus. Also causes any slave set up to receive to take data off the bus and store it in memory. Proceeds until the word count at receiver goes to zero.

System Operation

Communications Level

The communications level processors 10, 11 of the system are responsible for all tasks associated with handling the communications protocol required by the external devices. This includes checksumming messages, calculating and verifying message lengths, driving serial I/O lines, and handling error correction by retransmitting incorrectly-received messages. Each communications level processor is connected to a number of full-duplex serial I/O lines which in turn are connected to the computers which are making use of the system. For example, if two mainframes were using the system as a shared disk, each of the two communications level processors would drive two serial I/O lines, one to each mainframe. This would simulaneously insure both good throughput, high parallelism, and graceful degradation should one communications level processor go down.

The code of the communications level processor is driven by tables describing the serial I/O lines. These tables are called device status blocks, or DSB's. Each DSB is associated with a single serial I/O line, and drives both the transmitter and receiver of that line. The interrupt service routines in the communications level pack incoming characters into the receiver buffer, transmit characters from the transmitter buffer, and notify the non-interrupt code via status bytes when these operations are completed. The non-interrupt code examines the DSB's, looking for completed transmissions and receptions, and then taking action to pass messages onto the data base level or initiate a new transmission.

The DSB contains the following fields: A line identification, the mode the SIO board is operating in, the last command sent to the SIO board, the I/O ports needed to communicate with the SIO board, a link to the next DSB on the chain, a pointer into the receiver buffer, a count of characters received in the current message, a receiver status, a pointer into the transmit buffer, a transmitter status, a status to be placed in the transmitter status when transmission is complete, a time out used for waiting for achknowledgements, and receive and transmit buffers. The statuses of the DSB's receiver and transmitter status fields take on the following states: idle (waiting for a message), busy (in the process of transmitting or receiving a message), message present (message completely received or about to be transmitted), wait (transmitter waiting for an acknowledgement), again (transitter retransmitting due to no acknowledgement), and end (transmitter in the process of transmitting the last character).

The message format used by the communications level is specifically designed for computer-to-computer communications across asynchronous serial lines. It contains a number of delimiting control characters, a byte count, a checksum, and of course the text. The checksum and length fields are coded in a special format suitable for computer-to-computer communication: the binary number to be transmitted is separated into four-bit fields, and each four-bit field is arithmetically added to the ASCII character A, thus producing one of the characters A through P, corresponding to the hexadecimal digits O through F. A number of these four-bit encoded characters are combined to produce an 8-bit checksum or a 16-bit length field. This encoding scheme is basically hexadecimal numbers using a different mapping for the digits. The exact format of the message, including ASCII control characters, is as follows:

| Location | Contents | Purpose |
|---|---|---|
| 0 | STX | Delimit start of message |
| 1 | LLLL | Encoded length including text, ETX, EM |
| 5 | Text | Message text, length = n |
| n + 5 | ETX | Text delimiter |
| n + 6 | EM | Text delimiter |
| n + 7 | CC | 8-bit Checksum; includes text, ETX, EM |
| n + 9 | EOT | Transmission delimiter |

The checksum is simple a 2's complement sum of the characters with carries ignored.

The protocol for transmission and reception of messages is a simplification of the scheme used by the ARPA net. In this scheme, any message which does not contain the required ASCII control character, had a bad checksum, or has a bad byte count will be ignored by the receiving computer. The transmitting computer will associate a timer with each message, which will cause retransmission of the message if no acknowledgement is received within a given time. When the receiving processor successfully receives a correct message, it acknowledges this reception by transmitting a message back consisting of the normal message format with the text being the single character ACK. Note that in this protocol, if the acknowledgement is garbled a spurious second transmission will follow. This means that the receiving processor must be prepared to accept duplicate messages. In the intelligent disk system, the communications level processors do not make any checks for any duplicate messages, since duplicate GETSs and PUTs will only slightly increase the load on the disk, and will produce a duplicate reply that is indistinguishable from the duplicate reply generated by a garbled acknowledgement of the response to the user's request. However, the user processor must be prepared to accept duplicate replies to its disk requests and take appropriate action.

Although the communications level processor is provided with a PIC-8 board, (FIGS. 6A-E) this board is used only for collecting interrupt requests and passing them on to the MPU. The priority feature of the PIC-8 board is not used. Only one clock on the PIC-8 board is used; this is the 100 millisecond clock, and is used for timing out transmissions. On the SIO board, (FIGS. 7A-G) the individual 8251 interrupt control bits are also not used. This is because receiver interrupts must never be turned off, since it is never predictable when a user is going to transmit a message. However, due to the structure of the SIO board, it is occasionally necessary to turn off transmission interrupts when there is no message that may be transmitted. This is because when the transmitter is empty, the 8251 chip will continually interrupt the microprocessor, trying to get a character to transmit. To turn off the 8251 transmitter, it is necessary first to load a command byte which has the transmitter-enable bit turned off, and then load a dummy character into the transmit register. Furthermore, each time that a command byte is loaded while the transmitter is off, another dummy character must be loaded into the transmit register, so that the interrupts will stay off. To implement this, the interrupt code unconditionally loads a dummy character into the transmitter register anytime it gets a spurious interrupt, which is defined as any interrupt received while the transmitter is not in the busy state.

It will be noted that both interrupt and the non-interrupt code make changes to the transmitter and receiver status. This will never cause interference, however, because each transition from status X to status Y may be made only by the interrupt code or only by the non-interrupt code. Thus, if a receiver is idle, only the interrupt code may place it in the busy state. And if a receiver is in the message state, only the non-interrupt code may place it back into the idle state.

The main loop of the non-interrupt code of the communications level alternates between scanning the DSB's for incoming messages from the user and scanning the DBMS level mailboxes for responses from the disk system. Whenever a message from a user is found in a DSB, a mailbox to the DBMS level is required, the message text is copied into that mailbox, the message is acknowledged, the receiver is freed. Whenever a message is found in the mailbox from the DBMS level, it is placed into the appropriate transmitter buffer and returned to the user. The non-interrupt code during this phase also handles retransmission of non-acknowledged messages and acceptance of acknowledgement messages.

The interrupt code, when entered, scans through all of the DSB's processing them as required by the status read from their control registers. It is important to note that the interrupt code does not stop processing when it finds the DSB that requested the interrupt, since time can be saved by continuing if there is another DSB which also needs service. The interrupt code is divided into a receiver section and a transmitter section; each of these is executed only if the associated section of that Serial I/O line needs service. This is to say, the receiver section is only executed when the character appears on the Serial I/O line, and the transmitter section is only executed when one of the transmitter registers is empty. The exact processing of an incoming or outgoing character depends upon the character and the current status of the transmitter or receiver. Take special note of the fact that if the transmitter needs a dummy character to be loaded, this character will not be loaded until both transmitter registers are empty. This is necessary to prevent garbling of the last character of the transmission. As a side effect of this, during the last character of any transmission on any SIO line, interrupts will be locked on; the interrupt routine will be immediately reentered after returning to the main line code, and the non-interrupt code will come to a complete halt. While this might seem serious, a simple analysis of message lengths will show that this affects the non-interrupt code for only one character out of each message; if each message is merely 100 characters long, this means that the non-interrupt code will be held up only 1% of the time.

The clock interrupt service is entered every tenth of a second when the clock on the PIC-8 board picks. The length list of the DSB's is scanned looking for one or more which are in the wait state. If a DSB in the wait state is found which has a nonzero time-out, this time-out is decremented by one. If the time-out ever reaches 0, the DSB is placed in the transmit again state, so that the non-interrupt code will retransmit the outgoing non-acknowledged message.

One final note about two special cases: the first, when a mailbox can not be found to receive an incoming message, and the second, when the transmitter necessary to transmit an outgoing message from a mailbox is busy. In the first, or no mailboxes case, the incoming message is simply thrown away. While this is admittably undesirable, it is necessary so that the receiver buffer may be free in case an incoming acknowledgment is needed. In the second case, the mailbox is simply ignored, since it will be picked up at a latter time again and will eventually be transmitted when the transmitter is no longer busy.

DBMS LEVEL

The purpose of the DBMS level is to interface English-like text to commands to the storage level processors, 26, 27 and to take responses from the storage level processors and convert them back to a format suitable for communication with the outside world.

The DBMS level operates in two phases. The first phase accepts command strings from communications level, translates these command strings into storage requests and passes these storage requests to the storage level. The second phase (which is entered when there are no more commands to be processed in the first phase) accepts responses from the storage level, changes them into response strings, and passes them up to the communication level for transmission to the user.

The interface between the communications level and the DBMS level is very simple. The communications level passes the DBMS level a mailbox containing the text of the command with all serial control characters removed. The mailbox ID field, MID, contains the identification number of the SIO line which originated the request. This number must be returned to the communications level with the response in order that the response may be directed to the appropriate user.

The interface between the DBMS level and the storage level is slightly more complex. The mailbox ID is not used, but the mailbox text is divided into several fields. The first byte of the mailbox text is a control byte. The low order 7 bits of this byte specify various disk operations. Currently only two are defined: a read/write bit, bit 0, and an initialize bit, bit 1. The top bit of this control byte is set upon return by the storage level if an error occurred. The next two bytes contain a pointer to the communications level mailbox associated with this request.

The following five bytes contain a binary disk address: one byte for disk number, two bytes for track number, one byte for head number, and one byte for sector number. If the operation is some sort of a write, the data to be written immediately follows the sector number and is terminated by an ASCII ETX character. The response from the storage level contains the control and mailbox-pointer fields as passed to it, followed immediately by the data read from the disk, if any.

When the DBMS level processs a syntactically correct request from the communications level, it does not immediately release the mailbox in which the message arrived. Instead, it saves this mailbox for use in returning the eventual response to the communications level. This insures that there will always be an available mailbox for a response, preventing deadlock due to no mailboxes for a response because all mailboxes have requests in them. A pointer to this communications level mailbox is stored in the storage level mailbox. This allows the appropriate mailbox to be associated with the response from the storage level. Whichever DBMS level processor 21–24 processes the response from the storage level (which may not be the same processor that originated the request) will pick up this communications-level mailbox pointer and use that box to return a response. There is no possibility of two DBMS processors simultaneously attempting to use the same communications level mailbox to return a response because exclusive access is guaranteed by the exclusive access to the storage level mailbox containing the pointer.

There are two major subroutines in the data base level, DOCMD (FIG. 38) and DODSK (FIG. 39). DOCMD processes commands passed from the communications level; DODSK processes responses from the storage level. DODSK will be described first even though it follows second in the logical processing sequence. DODSK is entered with a pointer to a mailbox from the storage level containing a response to a previous request. The control word is examined first for the error bit. If the error bit is set, a message follows the mailbox pointer in the storage level mailbox. This error message is copied into the communication level mailbox with the ID field from the original command. The storage level box is then free and the communications level box is passed upwards to the communications processors 10 or 11.

If there were no errors, a successful request message is appended to the command ID, and any data read from the disk is copied into the communications level mailbox. Then the storage level box is freed and the communication level box is sent to the user.

Subroutine DOCMD passes the commands from the user and calls an appropriate processing routine to execute the command. These processing routines are entered with a jump via a table in subroutine DOCMD, the command table. This is a sequential table of variable-length entries, one for each command. Each entry consists of an ASCII prototype keyword string, an ASCII ETX character as a delimiter, and two bytes containing a pointer to the routine entered if the users keyword matches the prototype keyword. Most of the code of subroutine DOCMD itself is concerned with searching the command table for a match and entering the appropriate routine.

When the processing routine for a particular command is entered, registers D and E point to the blank following the command keyword, and the top three entries on the stack point to the beginning of the command string, the storage level mailbox acquired for processing the command, and the communications level mailbox containing the command. The processing routine is entered with a jump, and should exit with a return, which will return to the caller of DOCMD.

Since no data is provided by the user for GET (FIG. 40) or INITIALIZE the processing routines for these commands are relatively simple. All they do is translate the disk address into binary and pass the request on to the storage level. The PUT routine (FIG. 41), in addition, must copy the data provided by the user into the storage-level mailbox before passing the request on. Of course, all three of these processing routines must do extensive syntactical checking. If any errors are detected, the storage-level box is freed without being used and an error message is returned in the communications level mailbox.

Subroutine TRADD (FIG. 42) translates the hexadecimal disk address in the users request into binary addresses suitable for communicating with the storage level. This subroutine is also responsible for a large amount of the syntactical error checking, and if it detects any such errors it does not return to its caller (which should be a DOCMD processing routine); instead it returns to its caller's caller, i.e., the caller of DOCMD. This has the advantage of freeing the processing routine from most error handling. The actual processing of TRADD consists of successive calls to subroutines which find and convert hexadecimal numbers into binary, checking for errors at the same time. Note that the sector as given by the user actually represents both the head and a sector to the storage level. The translation between the two forms is done by looking up the user's value in a table, SECTB.

Subroutine COPID is responsible for finding the identification field of the user's command in the communications-level mailbox, copying it down to the beginning of that mailbox, and placing a comma after the ID. This prepares the communications-level mailbox to receive a response from the storage level. This response can be copied into the communication level mailbox immediately following the prepared ID.

The DBMS level does not have any local data to be initialized upon system power-up. However, the DBMS level's unique position with access to both shared memories causes it to be given the responsibility of initializing all shared data.

Configuration Chips

In the system, any processor which executes code that is dependent upon the particular configuration of the disk 28 or 28 acquires information about the configuration from a fixed area in ROM. Because the area in ROM is assigned to a separate ROM chip, the area is referred to as the configuration area or the configuration chip. When the configuration of the Intelligent Disk is changed, it is necessary only to replace the configuration chips; all other changes are taken care of automatically.

There are a number of configuration changes that may be made to the system. These include adding or removing lines to the communications level processors, adding or removing disk spindles, and adding or removing shared memory. The first two of these configuration changes require changes in the configuration chips; adding shared memory is automatically detected by the system and requires only the addition or removal of additional 4K shared memory boards at appropriate addresses.

If shared memory is to be added or deleted, it is best to make the same changes in both shared memories at the same time, since throughput is best when the shared memories are equal in size. The shared memories must always contain boards with addresses B000 for the communications to DBMS level shared memory, and F000 for the DBMS to storage level shared memory. The second board for each shared memory is placed just below the first board in the address sequence; i.e., A000 and E000. Successive 4K boards are installed at successively lower addresses. There is an absolute limit of four boards in each shared memory; this is software limit.

The communications level configuration chip controls two options: the debug option, and the list of I/O lines to be driven. The debug option is controlled by the first location of the configuration chip, at 300 hex. If this location is non zero, the message length and checksum characters on incoming messages must be present but are not verified. This allows a terminal keyboard to be substituted for the user computer for use in debugging the system using the control characters on the keyboard in appropriate sequences to generate the proper message format without calculating the length and checksum.

The rest of the communications level configuration chip, from location 301 hex onward, is devoted to the DSB initialization table. This table consists of a series of 5-byte entries terminated by a single zero byte. Each entry defines a single I/O line. The first byte of the entry is the terminal ID for this line. The next byte is the mode word to be used in initializing the Intel 8251 chip; described in the Intel 8080 manual.

The next byte is the command byte to be loaded into the 8251 chip after the mode byte is loaded. This byte is also described in the Intel manual. This byte should have the receiver interrupt control bit set on and the transmitter control bit set off. The next byte is the I/O port number to use to access the command register of the 8251 chip. The final byte of the entry is the port number to be used for accessing data to and from the 8251 chip.

The terminal ID in a DSB is used to insure that a message that originated on a particular line returns to that same line. If it is desired that a message only be able to return to the line that originated it, each DSB in the system must be given a unique ID, even if the DSBs are in different communications level processors. For instance, if there are two communications level processors, each driving two I/O lines, DSB IDs must be assigned 1, 2, 3, 4 to the four I/O lines in order to ensure that messages return to the originator. In some cases, it may not be desirable that messages return to the originating line. For instance, in the aforementioned system, assume that the first line from each communications level processor were connected to host A, while the second were connected to host B. In this case, if the load on one line to host A is heavy, it would be desirable for some of the load to be shifted to the other line to host A. This is achieved by assigned DSB IDs of 1 and 2 to the lines in each machine. A message coming from host A would receive a DSB of 1 and the reply to that message would return to host A over either of the lines connected to that host, depending on which was free. Note that acknowledgements still travel across the same line that the message being acknowledged travelled across.

SYSTEM INITIALIZATION

When the system is powered up, it is necessary for the communications tables in shared memory units 20 and 25 to be initialized. Since each shared memory is being accessed by several processors, the initialization must take special care to insure that two processors do not simultaneously attempt to initialize the same shared memory. To prevent this occurrence, all initialization of shared memory is done by a single DBMS level processor, designated the master processor. All other processors in the system will wait for the master processor to complete initiliazation before accessing shared memory. This is done by examining a preassigned and fixed location in shared memory which the master processor initially sets nonzero and clears upon the completion of initialization. This location is the last location in shared memory, and is referred to as the synchronization location. The immediately preceding two locations in shared memory, i.e., the second from last and next to last, contain a pointer to the linked list of mailboxes. These locations are copied by each processor into local RAM when the synchronization location is cleared.

Physically, there are two separate blocks of shared memory. The first, at locations 8000 to BFFF, is shared between the communications level and the DBMS level. The second block, located from C000 to FFFF, is shared between the DBMS level and the storage level. Each block of shared memory is composed of one to four 4K RAM boards. If fewer than four boards are used in a particular block, they are to be assigned the highest possible addresses in that block, i.e., if one board is being used in the communications-to-data base level shared memory block, it is to be assigned address B000. The initialization code in the master processor is written in such a manner that it dynamically determines how many 4K RAM boards are assigned to each shared memory block and initializes appropriately.

Subroutine BOXES (FIG. 43) is responsible for initializing a block of shared memory. On entry, register HL points to the highest RAM board in a block of shared memory, which is the only board guaranteed to be there. BOXES first scans downward from the location in HL until it has either scanned 16K of RAM or has found a 4K block which is not RAM. After determining the size of the shared RAM, as many mailboxes are created as will fit into the shared RAM, the address of the first mailbox in the list is stored in the top of shared RAM, and the synchronization location is cleared. Subroutine BOXES is called twice, one to initialize communications-to-DBMS level shared, memory, and once to initialize DMBS to storage level shared memory.

In the DBMS level processor, the configuration chip at 300 hx uses only two locations. The first is the master flag. For initialization purposes, exactly one of the data base level processors in any given system should have the master flag non zero and all other data base level processors should have the master flag, 0. Furthermore, the processor which has the master flag non zero should also be the highest priority processor accessing each shared memory. This processor will initialize the shared memories, insuring that the initialization is done before the other processors in the system being to access shared memory. The second location in the DBMS level configuration chip, location 301 hex, is the disk ID number of the largest numbered disk in the system. In other words, this location contains one less than the number of spindles in the system. For example, in a 4 spindle system, this location would contain the value 3. This location must be the same for all DBMS level processors. It is used in error checking to prevent the user from attempting to access a nonexistent spindle.

STORAGE LEVEL

Each disk controller 30, 31 consists of two circuit boards, TIFA and TIFB and provides a control and data interface between the 8080 microcomputer and the disk drive.

TIFA provides the controlled backplane interface connection which consists of 16 address lines, 8 input data lines, 8 output data lines, 6 timing and control lines, and 4 interrupt lines. The controller backplane interface is listed in Table 1.

The controller is interfaced to the disk through two fifty conductor flat cables. The port connection on TIFA provides the RADIAL cable connection to the disk, and the port connection on TIFB provides the BUSSED cable connection to the disk. The two flat cables are connected at the disk end to a printed circuit board which provides mating connectors for the disk drive connectors. The cable specifications are given in Tables 2 and 3.

The controller +5VDC is provided by a regulator located in TIFB and the controller −5VDC is provided by a dropping resistor and zener diode located on TIFA.

Figure 48:
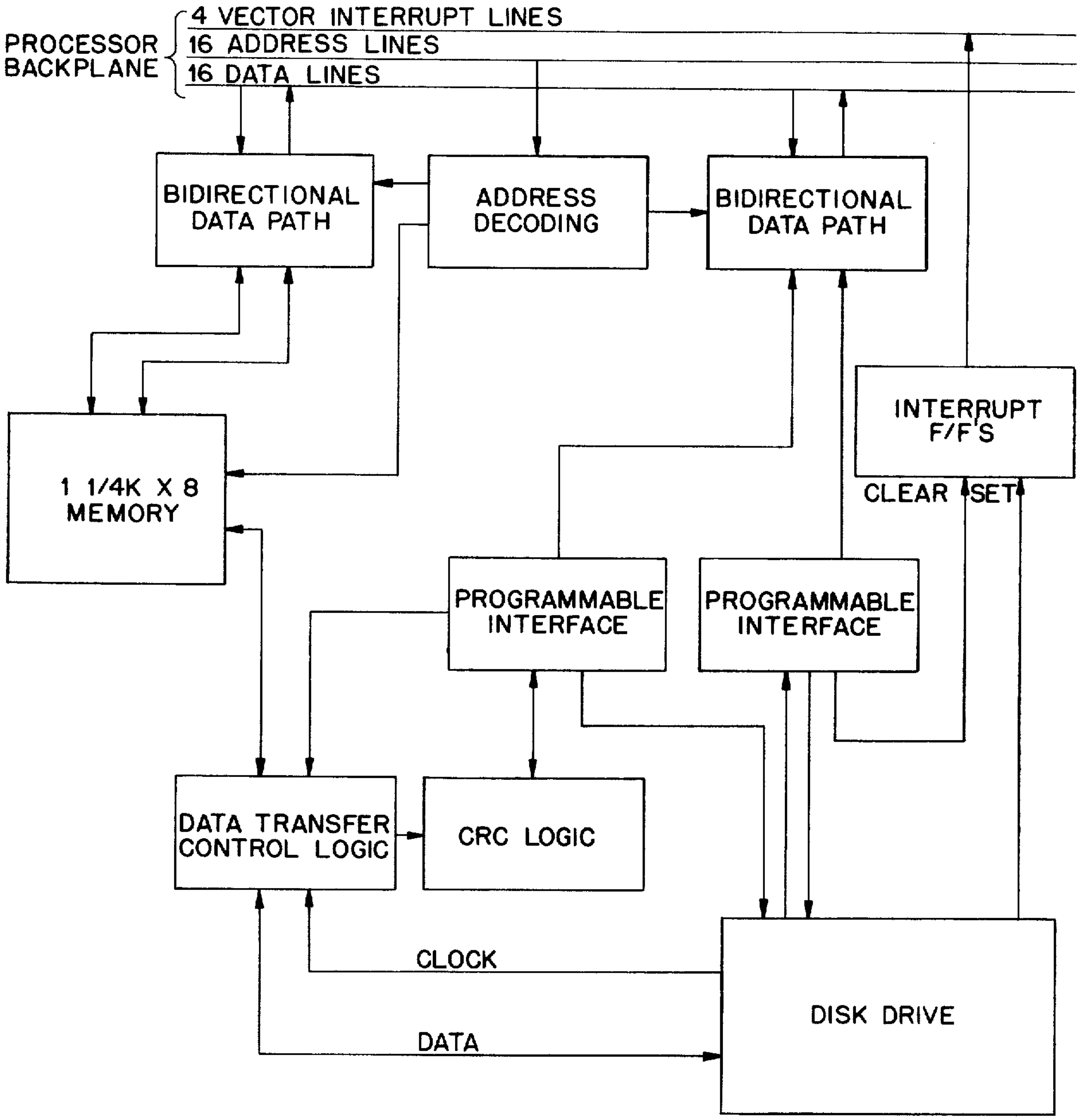
Figure 64C:
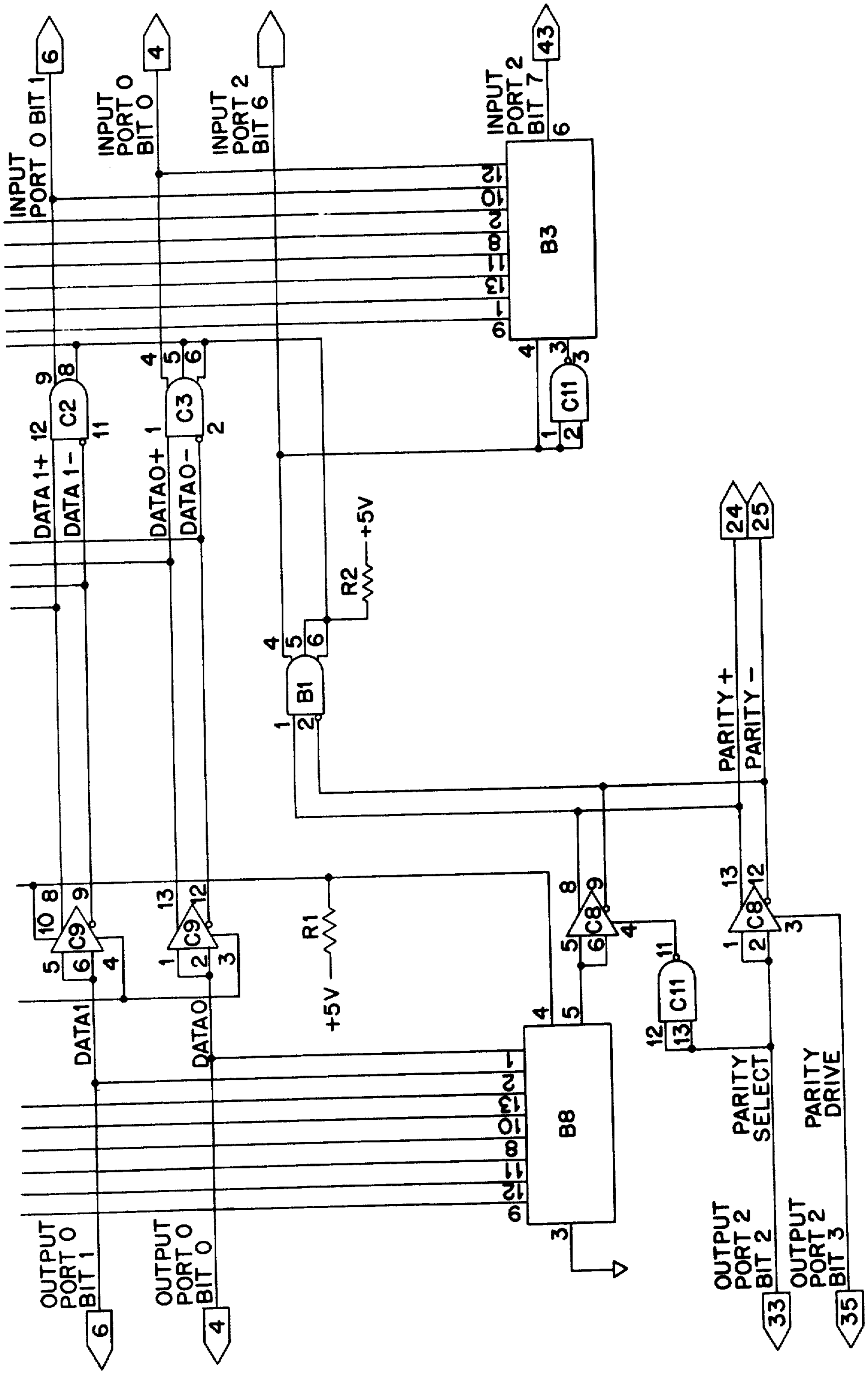
Figure 67:
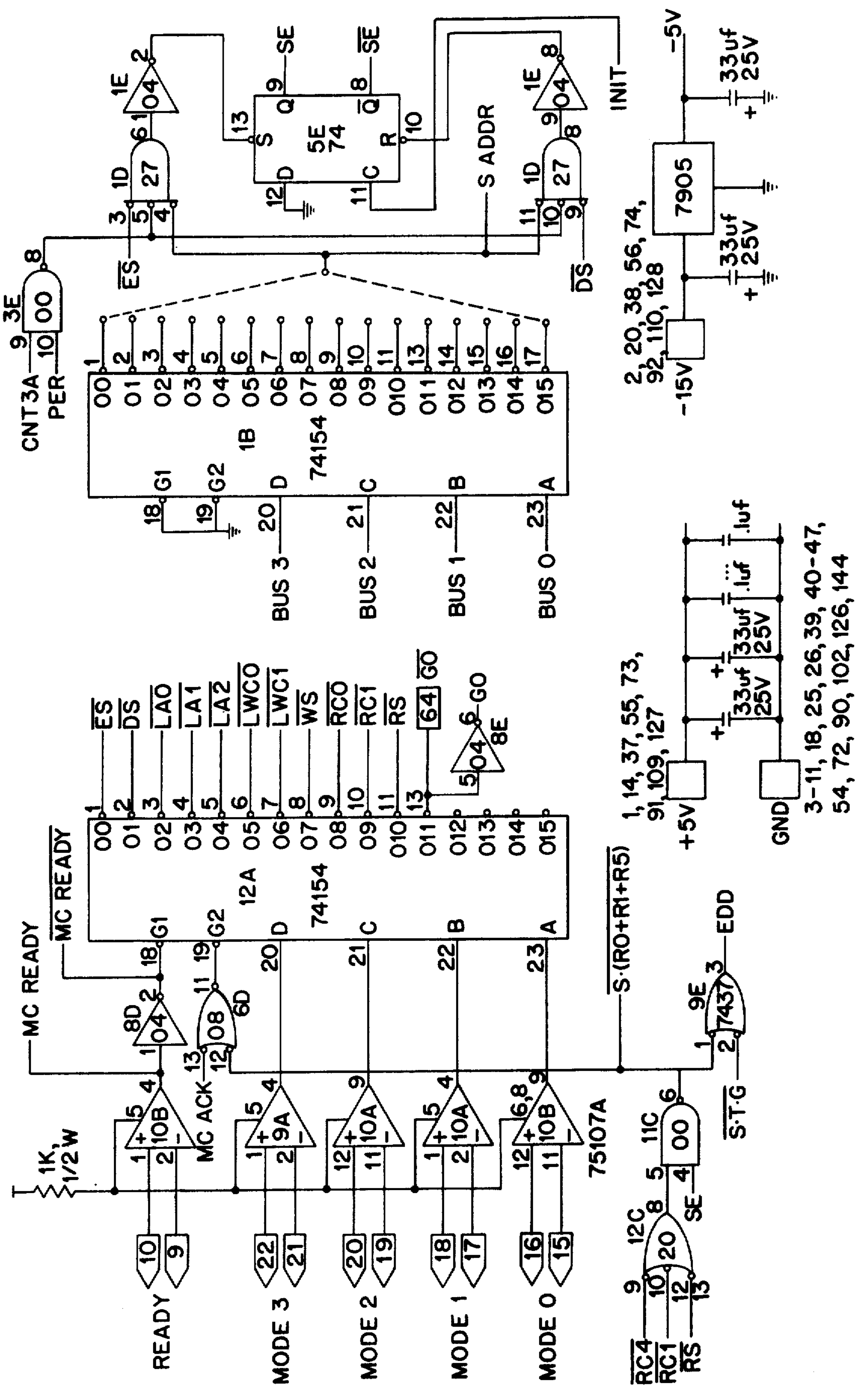
Figure 68:
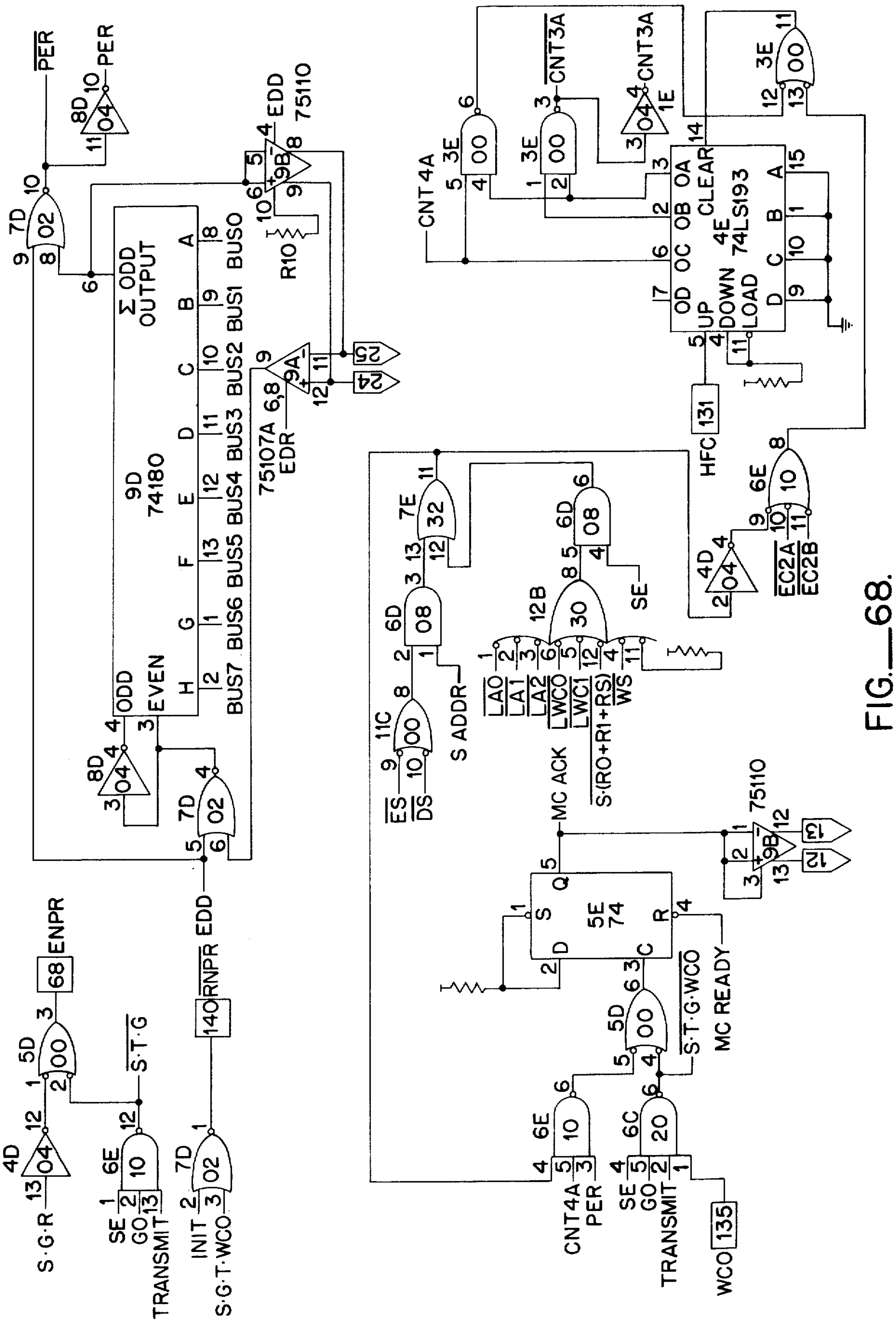
Figure 69A:
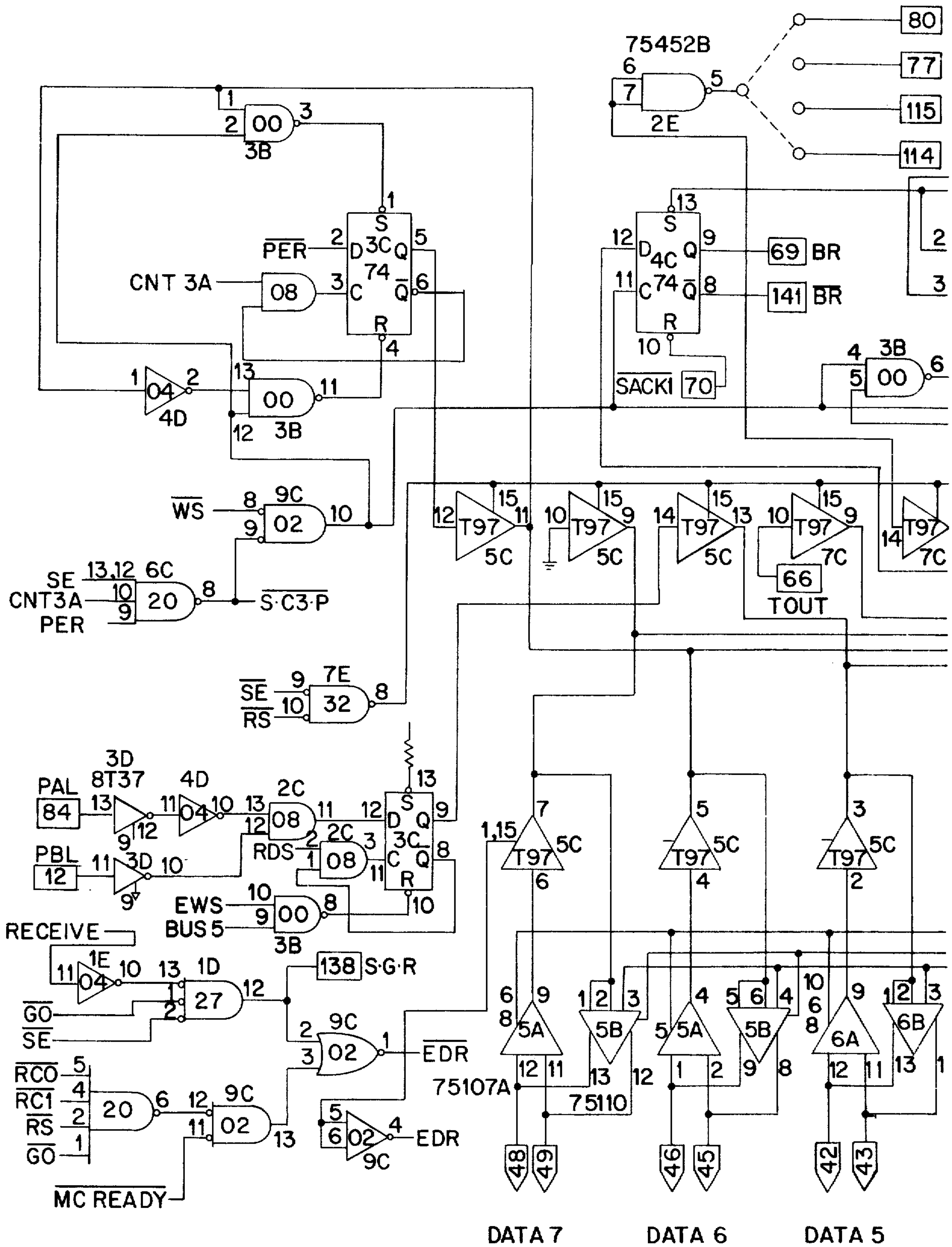
Figure 70:
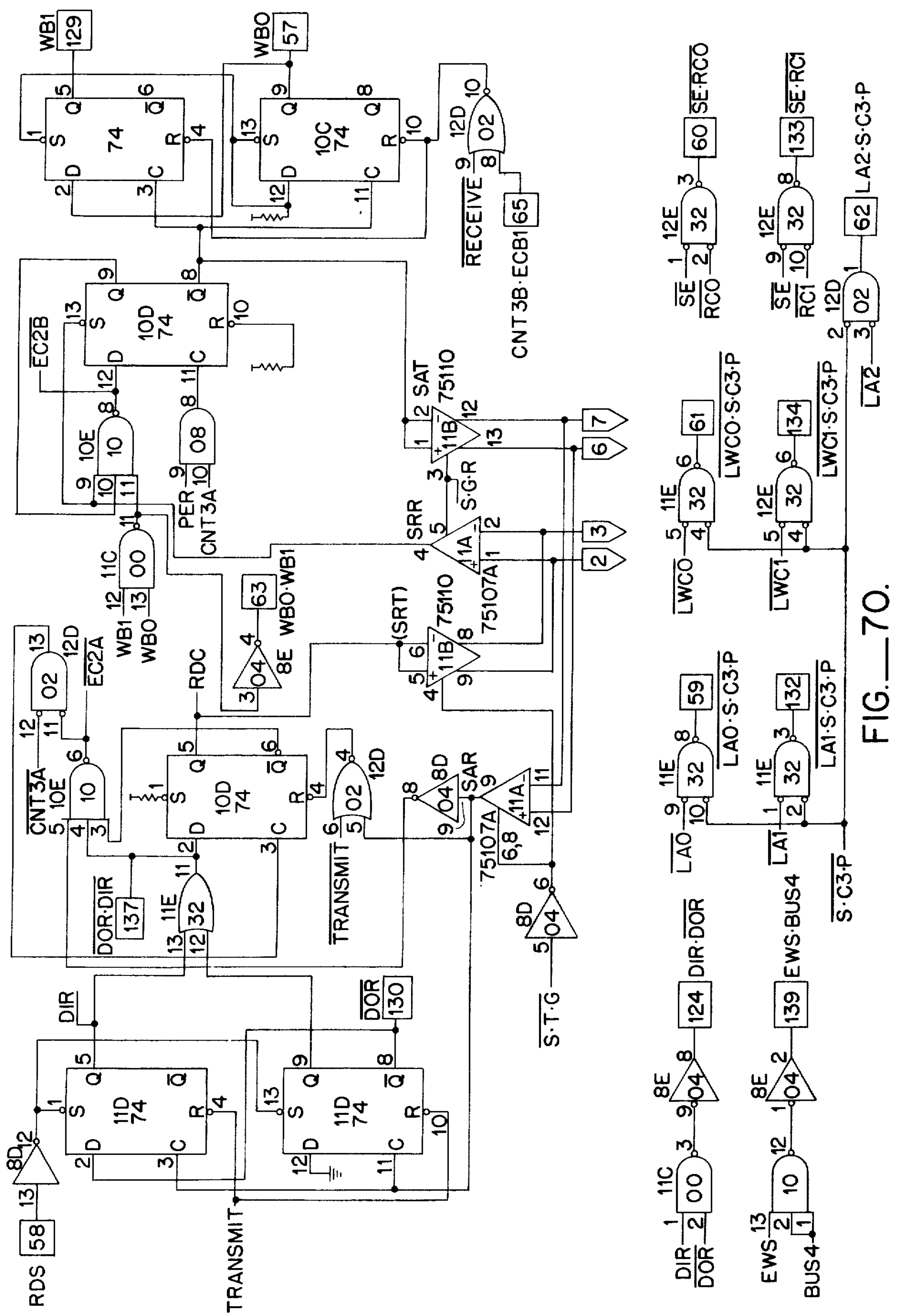
Figure 71C:
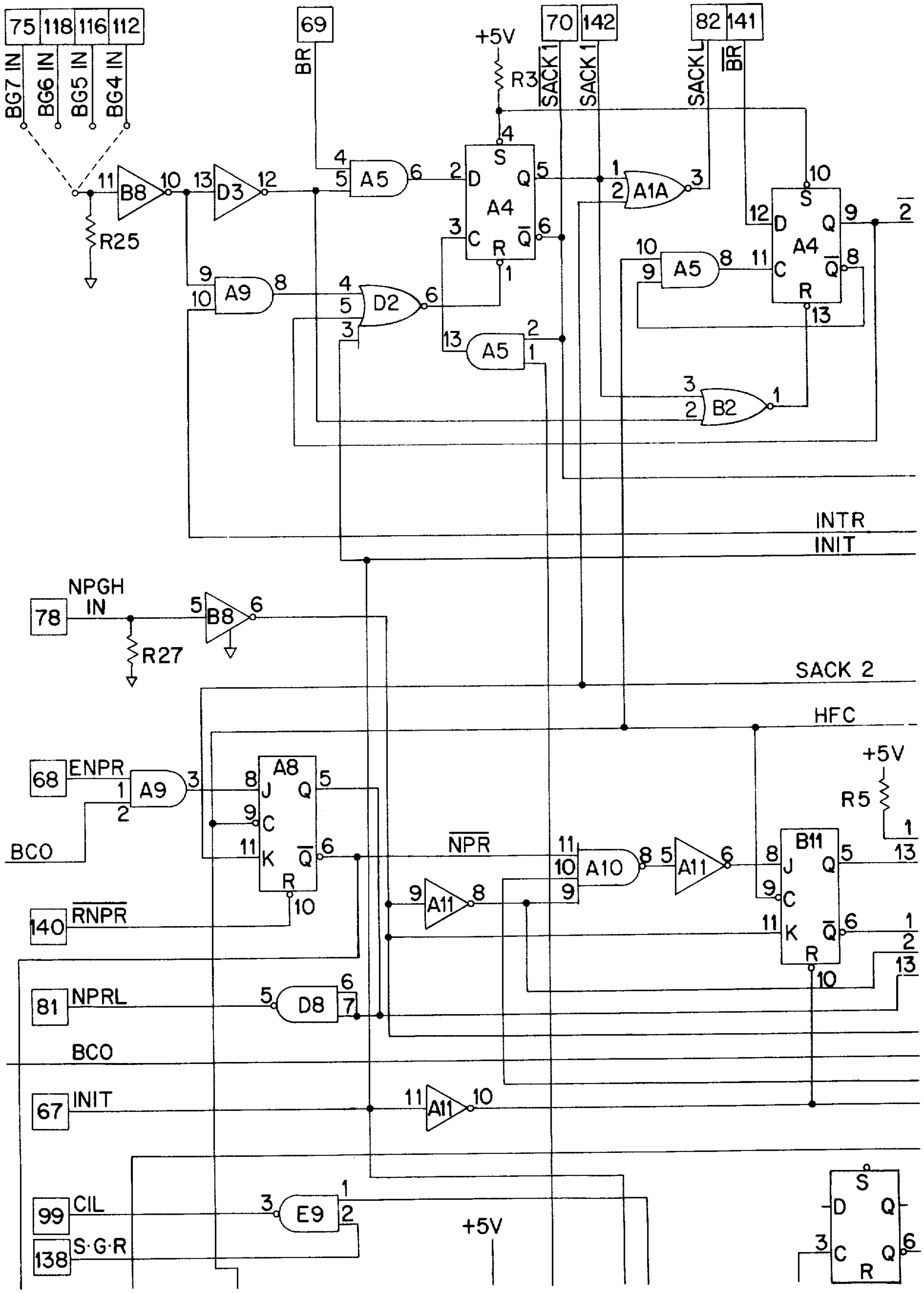
Figure 73:
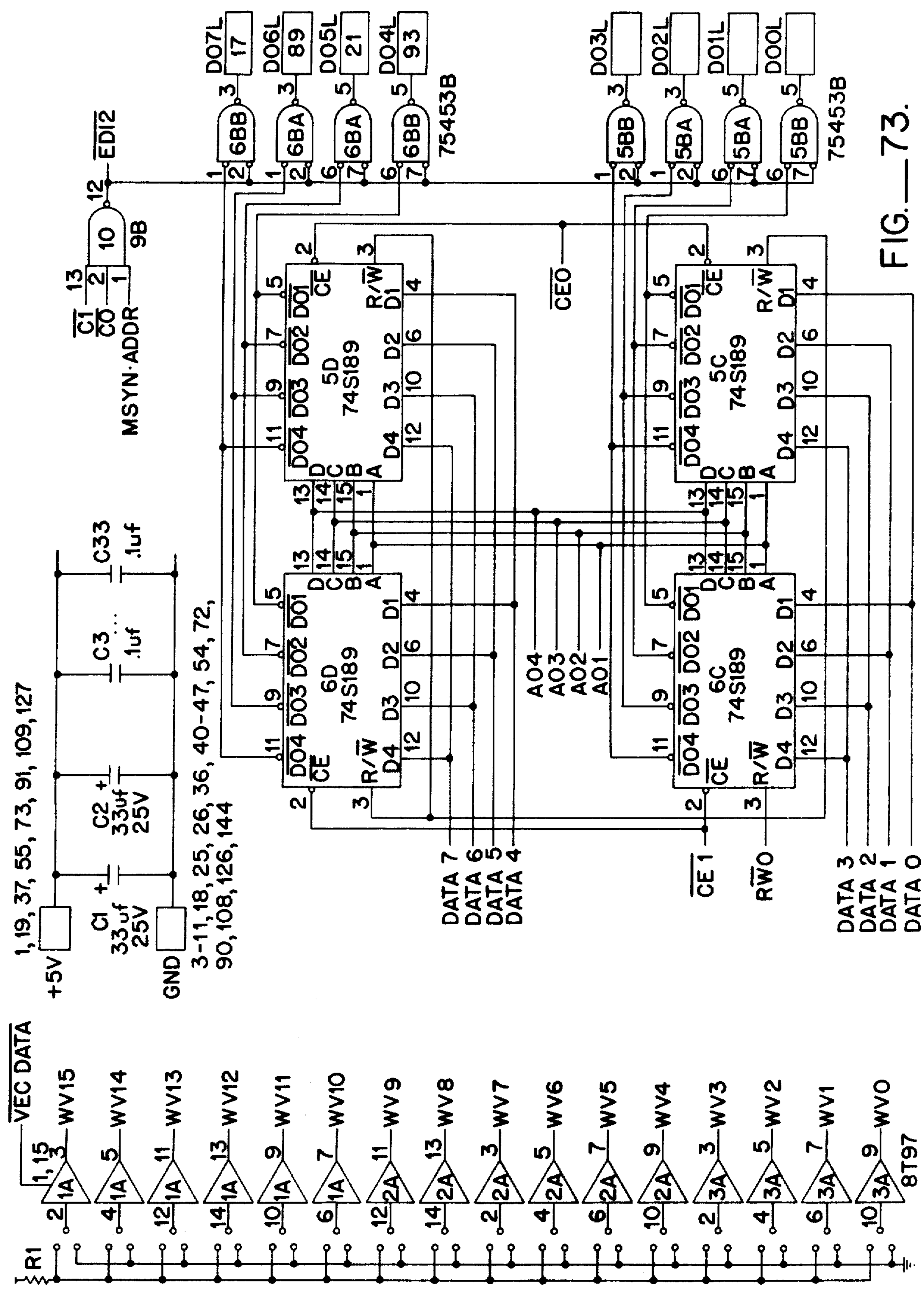
Figure 74:
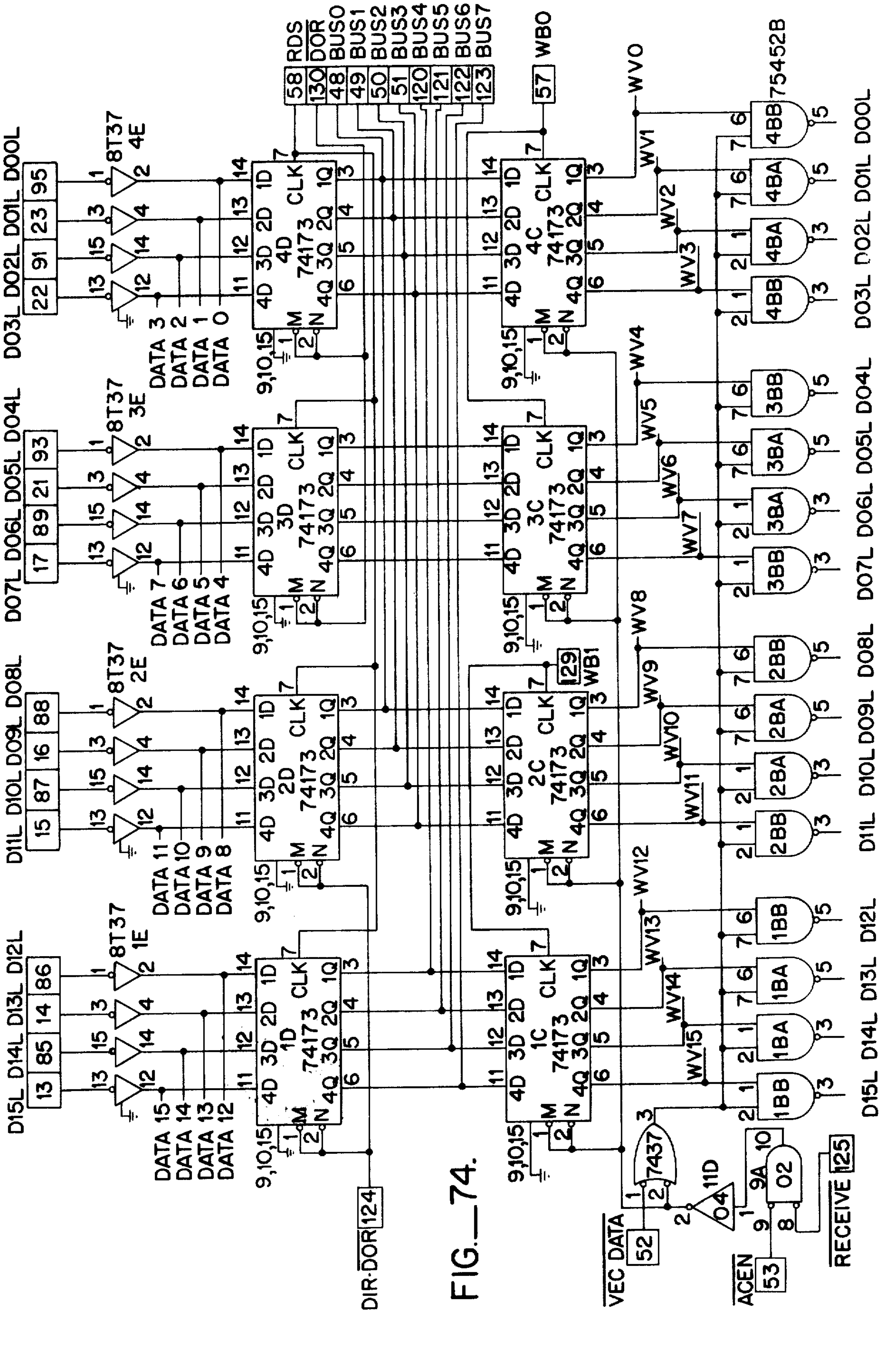
Figure 75:
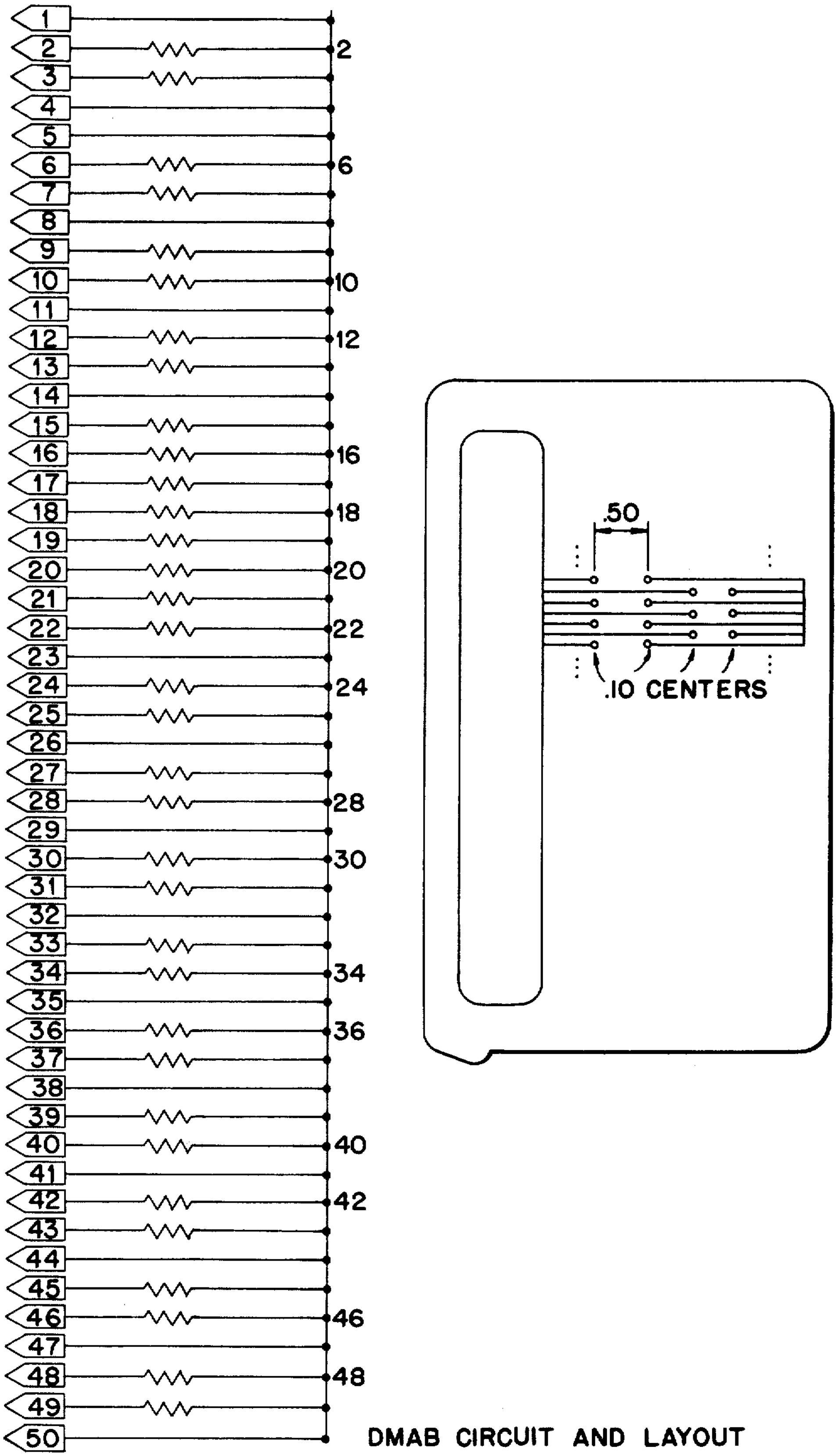

As shown in FIG. 48, the disk controller consists of the following general logic units:

1. Two eight bit bidirectional data paths.
2. Address decoding logic.
3. Two programmable interfaces.
4. Interrupt logic.
5. 1-¼K by 8 random access memory.
6. Cyclic redundancy code (CRC) logic.
7. Data transfer control logic.

The two eight bit bidirectional data paths are located on TIFA and provide processor access to the two programmable interface modules.

The address decoding logic is located on TIFA and consist of two 1 of 8 binary decoders, a 16-pin address pallet, and an eight input NAND gae. The outputs of the decoding logic are used to select, each of the five memory address ranges, each of the two programmable interface units, and four controller functions used during disk data transfers.

The two programmable interface units are located on TIFB and provide three eight bit output latches and three eight bit input data paths. The output latches are used to drive the disk BUS/TAG lines, and latch control information used by the disk controller. The three input date paths provide disk and controller status information.

The interrupt logic is located on TIFB and consists of three flip-flops and associated gating. The flop-flops are set directly by index and sector pulses from the disk drive and are reset by the processor under program control. The three flip-flop interrupt lines are routed to the backplane through TIFA. The fourth interrupt line (ATTENTION) is received and inverted to TIFB and routed to the backplane through TIFA.

The 1-¼K by weight random access memory is located on TIFA and consists of ten 256 by 4 static MOS RAM chips with 450 nanosecond access time. The memory is used to buffer the disk data during read and write operations and therefore, can be accessed by both the processor and the controller data transfer logic.

The CRC logic is located on TIFB and consists of three eight bit shift registers, three hex latches, and associated control and exclusive OR gating. The logic is used to generate and compare a 32 bit cyclic redundancy check code during disk write and read operations.

The data transfer control logic is located on both TIFA and TIFB and consists of the following logic units:

1. bit counter
2. delay counter
3. memory address counter
4. stop address latch and comparator
5. data shift register and latch
6. control flop-flops and gating The bit counter is used to generate a load and count pulse for every eight data clock pulses. The load pulses are used to latch each eight bit byte of serial data during read operations, and load the shift register with eight bits of data during write operations. The count pulses are used to decrement the memory address counter.

The delay counter is used to time synchronize disk read and write operations to sector pulses. The read delay value is intended to guarantee the start of read transfers within a zero data field.

The memory address counter is loadable by the processor and controls the start point and accessing of the disk controller 1-¼K resident memory during during disk data transfers.

The stop address latch is loadable by the processor and determines the stop point of the disk data transfer within the bottom 256 bytes. The output of the stop latch is compared to the lower eight bits of the memory address counter and generates a stop signal, which terminates the data transfer.

The data shift register and latch are used to buffer eight bits of data during disk read operations, and provide a parallel to serial data path during disk write operations.

The control flip-flops and gating are used to enable gating the read and write bus lines after the delay count, and enable starting the decrement of the memory address counter after the sync byte of data.

Disk Drive Control and Status

Disk drive control and status information is passed to or from the processor backplane through two 8216 (four bit bi-directional bus drivers), IC's C4 and D4 located on TIFA. Disk control bits are latched into the port C outputs of the two 8255 (programmable peripheral interface), IC's A5 and A6 located on TIFB, and disk status information is read in through Port A of 8255 A5. (FIG. 49)

To latch disk control information, a memory write instruction must be executed with the memory address being that of the selected 8255 port C. Backplane address lines are decoded by the 8205 (one of 8 decoder) IC B3 located on TIFA and either chip select $\overline{\text{PSO}}$ or $\overline{\text{PSI}}$ is generated. The processor output information is latched into the output of the selected 8255 on the falling edge of the processor write signal $\overline{\text{PWR}}$. The disk cable signal (SEQUENCE, SELECT, BUS, TAG) are driven by open collector drivers IC's A3, B3, C3, D3, A4, B4 and C4, located on TIFB. With the exception of BUS 2 and BUS 3, which have special gating for read/write operations, the inputs to the cable drivers are taken directly from the port C outputs of IC A5 and A6.

Disk Controller Control and Status

Control bits used by the disk controller logic are set through the same procedure as setting the disk drive control bits, that is, by performing a memory write operation to the appropriate memory address with the correct bit pattern to enable the desired function. The control bits used by the controller are latched into port A output and port C output (bit 7) of IC A6 on TIFB. These controller control bits are used high true, low true, as levels and as pulses.

An example of a low true pulse output bit is signal CLR INDI, which is used to clear the index flip-flop. Normally the bit is in the high state in the output latch. After an index interrupter occurs a memory write to port A of IC A6 should be executed with CLRINDI bit off. This latches the bit low and clears flip-flop INDI. A second memory write operation should be executed with this bit on. This latches the bit high and removes the clear from flip-flop INDI.

Controller status information, like disk status information is gated to the backplane through the two 8216's C4 and D4. The controller status lines are gated to the 8216's from either port B of IC A6 or port B of IC A5 during a memory read operation from either of the two controller status addresses.

Disk Controller Interrupts

The disk controller can generate four interrupts; sector interrupt (SECTI), index interrupt (INDI), overrun interrupt (OVERRUNI), and attention interrupt (ATTENTIONI). These are low true signals driven to the processor backplane and are received from the backplane by the PIC-8 board.

SECTI is generated from one $\overline{\text{Q}}$ output of flip-flop A7. This flip-flop is clocked to the set state on the front edge of the disk index pulse and cleared under program control by the generation of signal CLRINDI.

OVRUNI is generated from the Q output of flip-flop A9 on TIFB. The flip-flop is clocked to the reset state on the front edge of either a disk sector pulse or index pulse occurring with either flip-flop SECTI or INDI in the set state. This indicates the passing of a sector without servicing a sector of index interrupt.

ATTENTIONI is a signal received directly from the disk drive, and indicates a seek operation has been completed. The signal will become true at the completion of a first seek rezero, seek, seek incomplete, or when an emergency retract occurs. The signal will be reset by issuing a disk read command.

Processor Memory Access

The processor access path to the disk controller memory is shown in FIG. 50. Backplane address lines A8, A9 an A10 are decoded by the one of eight decoder IC F3 located at TIFA and five chip select signals $\overline{\text{BADDENA1}}$ through $\overline{\text{BADDENA5}}$ are generated. These are low true signals. $\overline{\text{BADDENA1}}$ selects the bottom 256 bytes of memory and $\overline{\text{BADDENA5}}$ selects the top 256 bytes.

Address lines A8, A9 and A10 are gated through tri-state hex buffers IC F4 and this gating creates an AND/OR function which enables the use of the one of eight decoder for both processor and controller memory access. The enable term for processor access is signal A. This is a low true signal and is generated from the AND of ENA $\overline{\text{DISKBFR}}$ and BOARD ENA. ENA DISKBFR (enable disk buffer) is a controller control bit and must be set (high) for the processor to access the controller memory. BOARD ENA (board enable) is generated from the output of the address pallet and is the AND of backplane signals A15, pallet A14 through ALL, SOUT and SINP.

BOARD ENA true indicates that the top five bits of the backplane address decode as the controller address range, the processor is not doing a device input or output.

Signal A is also used to enable the gating of the processor address lines (A0 through A7) and the processor write signal PWR to the controller memory chips. The gating for these lines are tri-state hex buffers IC's F4, F5 and C3 located on TIFA. These gates create an AND OR function with the controller address counter, which addresses the memory during disk data transfers.

The processor data path to the memory chips is through IC's C5 and D5. The chip select signal for these gates is signal A, and the part enable signal is the processor backplane memory read signal MEMR. During a processor read, the eight memory data lines are gated from the memory chips to the backplane, and during a processor write, the eight processor data output lines (D00 through D07) are gated from the backplane to the memory chips.

The memory chips have common input/output data pins, and during read the outputs are enabled and during write the outputs are disabled. During processor reads, the outputs are enabled by a low true signal $\overline{\text{OD}}$ (output disabled) generated at gate E6 on TIFB. The signal is the AND of MEMR (memory read) and signal B high. B is the complement of A, which is low true, and therefore OD low is the AND of processor memory read and signal A true.

Controller Memory Access

During disk data transfers, memory access control is as shown in FIG. 51. The top three bits of the address counter, IC D3 on TIFA, are gated into the one or eight decoder F3 by Signal B, and generate the memory chip selects. The lower eight memory address lines BA0 BA7 are generated by the lower eight bits of the address counter IC's C1 and D1, and these lines are enabled to the memory chips by signal B.

Memory read/write enable signal $\overline{\text{BWRD}}$ is generated at IC E2 pin 3 on TIFB and is high during disk writes, which are memory reads. During disk reads, $\overline{\text{BWRD}}$ is generated from the output of the bit counter IC C9 on TIFB, and provides low true memory write pulses.

During disk writes, memory chip outputs are enabled by signal $\overline{\text{OD}}$ (low true). This signal is generated from the AND of BUS2WR (write line to disk drive) and signal A high. A is the complement of B, which is low true and therefore $\overline{\text{OD}}$ low, during disk writes, is the AND of the disk write line and signal true.

During disk reads, the memory chip outputs are disabled and signal $\overline{\text{OD}}$ is high. The serial read data is clocked into shift register E3 and TIFA, and every eight bit clock times is parallel loaded into latch E2 with signal LOAD READ BFR. The outputs of latch E2 are three state and are enabled to the memory chips by the AND of ENA $\overline{\text{DISKBFR}}$ (low) and INHIBIT WRT (high). $\overline{\text{ENA DISKBFR}}$ is a controller control bit and must be reset (low) for disk read and write operations. INHIBIT WRT is generated at IC C7 on TIFB and is the BUS 3RD read line to the disk drive.

During disk writes, the outputs of the memory chips are enabled, OD (low) and the write data, memory read data, is parallel loaded into shift register E3 by signal LOAD SR, and serially clocked out with clock pulses from the disk.

LOAD SR is generated from the AND of BUS 2 I/OP and the decoding of the lower three bits of the bit counter. This pulse is used during a disk write operation to latch the eight memory data bits into shift register E3. The shift register serial output (write data) is clocked, high order data bit first, with DATA CLOCK pulses received from the disk. The WRITE DATA is driven to the disk drive by differential driver AL located on TIFA.

BA COUNT is generated from the AND of the start count flip-flop E10, the decoded three low order bits of the bit counter, and the DATA CLOCK. BA COUNT is used to decrement the address counter IC's C1, D1, and D3. When the lower eight bits of the address counter are equal to the eight bit value loaded into the STOP ADDRESS latch, signal $\overline{\text{BASTOP}}$ (low true) is generated. This signal disables the BUS 2 WR signal to the disk, disables START CNT (start count), and generates signal STOP CNT (stop count.)

STOP CNT is the K term of flip-flop E10, and the flop-flop is clocked to the reset state on the next falling edge of signal DATA CLOCK. The flip-flop (E10) reset, enables the clear term to the bit counter and stops the generation of signals LOAD SR and BA COUNT.

Signal BA STOP is a controller input status bit and should be read to determine the completion of the write operation. Upon detection of this bit, the controller latch bits BUS 7 (head select), BUS 2 (write), E BUS 2 (enable bus 2) and CONTROL TAG should be reset.

DATA DISK TRANSFER

Write Sequence

Prior to a disk write, a programming sequence must have been executed to place the hardware in the correct state. That is, the following operations must have been completed. First, the disk controller resident memory must be loaded with the data to be written on the disk. The data must be in the correct format; zero preamble field, data field, CRC bytes and zero postamble field.

Second, a seek operation to the correct cylinder muwt have been completed. Third, the disk head address register must be set to the correct value. This could be accomplished by either a set heat command or multiple head advance commands. Fourth, the controller address counter must be loaded with the start value (high address) for memory access. Fifth, the stop address value must be loaded into the controller. This determines the write stop point within the lower 256 bytes of the controller memory area. Sixth, index and sector interrupts must be serviced and a count kept to determine the approaching sector number.

When the listed sequence has been completed, and the sector counter has been incremented to a value of one less than the sector number to be written, a disk write sequence may be initiated. This is done by loading a value into the controller delay counter, and then setting the head select bit (Bus 7) in the controller output latch (8255 IC A5). After the completion of these initial operations, the control tag, Bus 2 (write), and E Bus 2 (Enable bus 2) bits may be set in output latch A6.

Flip-flop SECT I is set on the front edge of the next sector pulse (pulse proceeding sector to be written). The Q output of this flip-flop clocks the flip-flop A9 of TIFB to the set state. The output of A9 ANDed with DATA clock decrements the delay counter. The counter counts down through zero to FF. This generates signal DELAY UP (low true). The AND of DELAY UP, BUS 2 I/OP, and STOP CNT (false) generates signal BUS 2 WR, which drives the write line to the disk starting a write data transfer.

BUS 2 WR also generates signal START CNT (Start count,) which is the J term of flip-flop E10 on TIFB, and enables the setting of the flip-flop on the falling edge of the next DATA CLOCK. The Q output of this flip-flop is used to disable the clear line to the bit counter IC C9, and therefore enables the generation of signals LOAD SR 8IC E9) and BA COUNT (IC E6).

Read Sequence

Prior to a disk read, as prior to a disk write, a programming sequence must be completed to place the hardware in the correct operational state. With the exception of the need to preload the controller memory buffer, the sequence to be completed prior to a read is the same as that for a write.

After the hardware setup sequence has been completed and the sector counter has been decremented to a value of one less than the sector to be written, a disk read operation may be initiated. This is done by loading a value into that controller delay counter, and then setting the head select bit (BUS 7) in the controller output latch (8255 ICA5). Note that the delay value loaded for a disk read should be greater than the value used for a disk write to insure that startin of the read operation within a zero data field.

Like the write operation, a disk read sequence is initiated by the detection of the sector pulse preceding the sector to be read. This enables the delay counter to be clocked by the disk data clock down through zero to FF, and generate signal DELAY UP (low true). The AND of DELAY UP, BUS 3 I/OP, and STOP CNT (false) generates signal BUS 2 RD, which drives the read line to the disk drive starting a read data transfer. Serial data a clock pulses are received with differential line receiver IC B1 located on TIFA. The data is clocked into shift register E3 on TIFA on the positive edges of data clock. The data is received high order bit first, and is shifted right to left, through the shift register. Upon the detection of a data bit in the next to high order bit position of the shift register, signal SYNC BIT is generated. The AND of SYNC BIT and BUS 3RD generates sigal START CNT, which is the J term of flip-flop E10 on TIFB. Flip-flop E10 is set on the falling edge of the next DATA CLOCK pulse, and the Q output of the flip-flop disables the clear to the bit counter and enables the generator of signal BA COUNT.

As in a disk write operation signal BA count is used to decrement the address counter, and signal BA STOP (low true) is generated when the lower eight bits of the address counter match the value loaded into the StOP ADDRESS latch. BA STOP disables the BUS 3RD signal to the disk and generates signal STOP CNT (stop count).

Signal STOP CNT is the K input to flip-flop E10, and the flip-flop is clocked to the reset state on the falling edge of the next DATA CLOCK. E10 reset disables the generation of more BA COUNT pulses.

Signal LOAD READ BFR (load read buffer) is generated from the ANd of BUS 3 I/OP, the decoding of the lower three bits of the bit counter and signal DATA CLOCK. This signal (LOAD READ BFT) is used during read data transfer, to parallel load eight bits of data into latch E2 on TIFA. The output lines of latch E2 are enabled to the controller memory chips by signal ENADISKBFR.

Memory write strobes are generated during disk reads from the AND of signal BUs #RD and the pin 5 output of flip-flop E10 on TIFB. The J, K and clock inputs to the flip-flop are taken from the two low order bits of the bit counter, and this circuitry generates a pulse equal to four data clock periods. The pulse begins on a bit count value of three and includes a bit counts of four, five and six.

Upon the detection of the input status signal BA STOP, a read operation should be terminated, by resetting the output latch bits BUS 7 (head select), BUS 3 (read), and CONTROL TAG.

CYCLIC REDUNDANCY CHECK CODE (CRC)

The CRC logic (FIG. 52) generates a 32 bit check code which is attached to the write data, during write operations, and is used during read operations to detect and recover errors.

The circuitry implements the division of the disk serial data by the fixed polynominal $X^{32} + X^{23} + X^{21} + X^{11} + X^2 + X^0$ and the generation of a 32 bit remainder. The remainder can be used to detect a wide class of errors and can be used to recover up to an elevent bit error burst.

Prior to a disk write, the 32 bit check code must be generated and appended to the write data located in the controller memory buffer. This is accomplished by performing a disk write with the write line to the disk off and then reading the 32 bit check code from the logic and then storing the four bytes of check code the CRC logic should be placed in FULL, CIRCULAR mode. This is accomplished by setting these bits in the controller output latch A6 located on TIFB. With these control bits set, a disk write operation should be completed with the E BUS 2 (enable bus 2) bit left off, preventing the write bus line from being driven to the disk. The serial disk write data is exclusive ORed with the high order bit (Bit 31) of shift register F6 and the output of this gate is exclusive ORed with bits 22, 20, 10 and 1. This gating implements the division of the data stream by the desired fixed polynominal. The logic is clocked by signal SRCLOCK which is generated from the disk DATA CLOCK.

When the write operation is completed, without the write line enabled, the 32 bit remainder is left in the logic with the high order byte in shift register E3 on TIFA. This byte is read into the processor with a memory read from port B of ICA6 on TIFB. The byte should then be appended to the write data by storing it in the controller memory buffer in the first location following the data block. The second remainder byte is read from the logic by resetting the CRC circular bit, shifting the register eight times, and performing a read operation from port B of IC A6. The second byte should be appended to the data block in the second memory location following the data. Shifting of the register is accomplished by setting and resetting control bit SSCRC in latch A6 eight consecutive times.

The third and fourth remainder bytes should be read from the logic and stored into the buffer area by repeating the procedure described for the second byte.

After the memory has been set up with the CRC bytes, a disk write operation may be performed with the E BUS 2 bit set, enabling the disk write line.

Prior to a read operation, the CRC shift register must be cleared. This is accomplished by setting and then resetting CLEAR CRC bit in latch A6. During a read operation the CRC logic should be enabled in CIRCULAR and FULL mode. This is accomplished by setting these bits in output latch A6 prior to the read.

As with the write data, the serial data read from the disk is clocked by the disk DATA CLOCK and exclusive ORed with the high order bit of the CRC shift register (Bit 31). The output of this gate is exclusive ORed with CRC bits 22, 20, 10 and 1. This gating implements the division of the serial read data by the desired polynomial and generates a 32 bit remainder. The last four bytes of the read data are the CRC bytes stored on the disk during a write and the division of these bytes by th fixed polynominal should result in a zero remainder. Therefore, the CRC logic should be check after a read for 32 bits of 0. This is accomplished by following the procedure described on the generation of the CRC for a write operation.

If after a disk read, the CRC registers do not contain zero a retry procedure should be implemented.

TABLE 1

| DISK CONTROLLER BACK PLANE SIGNALS | | |
|---|---|---|
| PIN NO. | Signal | Function |
| 1 | +8 volts | Unregulated input to 5V regulator |
| 2 | +16 volts | Positive unregulated voltage |
| 5 | ATTENTION I | Attention Interrupt, Vectored Interrupt Line # |
| 8 | SECT I | Sector Interrupt, Vectored Interrupt Line #4 |
| 9 | IND I | Index Interrupt, Vectored Interrupt Line #5 |
| 10 | OVER RUN I | Overrun Interrupt, Vectored Interrupt Line #6 |
| 27 | PWAIT | Acknowledge line, processor in WAIT state |
| 29 | A5 | Address Line #5 |
| 30 | A4 | Address Line #4 |
| 31 | A3 | Address Line #3 |
| 32 | A15 | Address Line #15 |
| 33 | A12 | Address Line #12 |
| 34 | A9 | Address Line #9 |
| 35 | DO1 | Data Out Line #1 |
| 36 | DO0 | Data Out Line #0 |
| 37 | A10 | Data Out Line #10 |
| 38 | DO4 | Data Out Line #4 |
| 39 | DO5 | Data Out Line #5 |
| 40 | DO6 | Data Out Line #6 |
| 41 | DI2 | Data In Line #2 |
| 43 | DI7 | Data In Line #7 |
| 45 | SOUT | Address bus contains address of output device |
| 46 | SINP | Address bus contains address of input device |
| 47 | SMBMR | Data bus used for memory read data |
| 50 | GND | GROUND |
| 51 | +8volts | Unregulated input to +5v regulator |
| 52 | −16 volts | Negative unregulated voltage |
| 72 | PRDY | Processor input signal, controls run state |
| 77 | $\overline{PWR}$ | Processor memory write signal |
| 78 | PDBIN | Processor data bus input signal |
| 79 | A0 | Address line #0 |
| 80 | A1 | Address line #1 |
| 81 | A2 | Address line #2 |
| 82 | A6 | Address line #6 |
| 83 | A7 | Address line #7 |
| 84 | A8 | Address line #8 |
| 85 | A13 | Address line #13 |
| 86 | A14 | Address line #14 |
| 87 | A11 | Address line #11 |
| 88 | DO2 | Data out line #2 |

TABLE 1-continued

| DISK CONTROLLER BACK PLANE SIGNALS | | |
|---|---|---|
| PIN NO. | Signal | Function |
| 89 | DO3 | Data out line #3 |
| 90 | DO7 | Data out line #7 |
| 91 | DI4 | Data In line #4 |
| 92 | DI5 | Data In line #5 |
| 93 | DI6 | Data In line #6 |
| 94 | DI1 | Data In line #1 |
| 95 | DI0 | Data In line #0 |
| 100 | GND | GROUND |

TABLE 2

| CABLE SPECIFICATION | | |
|---|---|---|
| TIFA Pin | TRIDENT Connector J04 | SIGNAL |
| 1 | 1 | TERMINATOR +5v |
| 2 | 2 | TERMINATOR +5v |
| 3 | 3 | GROUND |
| 4 | 4 | COMPSECIDX |
| 5 | 5 | GROUND |
| 6 | 6 | ATTENTION |
| 7 | 7 | GROUND |
| 8 | 8 | SELECTED |
| 9 | 9 | GROUND |
| 10 | 10 | SEQUENCE |
| 11 | 11 | GROUND |
| 12 | 12 | SELECT |
| 13 | 13 | GROUND |
| 14 | 14 | R/W DATA P |
| 15 | 15 | GROUND |
| 16 | 16 | R/W DATA M |
| 17 | 17 | GROUND |
| 18 | 18 | R/W CLOCK P |
| 19 | 19 | GROUND |
| 20 | 20 | R/W CLOCK M |
| 21 | | GROUND |
| 26 | | GROUND |
| 50 | | GROUND |

TABLE 3

| CABLE SPECIFICATION | | |
|---|---|---|
| TIFB Pin | TRIDENT Connector JOB | SIGNAL |
| 1 | | GROUND |
| 2 | 1 | SECTOR |
| 3 | | GROUND |
| 4 | 2 | END OF CYLINDER |
| 5 | | GROUND |
| 6 | 3 | ADDMKDET |
| 7 | | GROUND |
| 8 | 4 | OFFSET |
| | 5 | TERMINATOR +5v |
| 9 | | GROUND |
| 10 | 6 | INDEX |
| | 7 | TERMINATOR +5v |
| 12 | 8 | READY |
| 11 | 9 | GROUND |
| 14 | 10 | RD ONLY |
| 13 | 11 | GROUND |
| 16 | 12 | DEVICE CHECK |
| 15 | 13 | GROUND |
| 18 | 14 | ON LINE |
| 17 | 15 | GROUND |
| 20 | 16 | SEEK INCOMPLETE |
| 19 | 17 | GROUND |
| 21 | 18 | SPARE |
| 22 | 19 | GROUND |
| 23 | 20 | BUS 0 |
| 24 | 21 | GROUND |
| 25 | 22 | BUS 1 |
| 26 | 23 | GROUND |
| 27 | 24 | BUS 2 |
| 28 | 25 | GROUND |
| 29 | 26 | BUS 3 |
| 30 | 27 | GROUND |
| 31 | 28 | BUS 4 |
| 32 | 29 | GROUND |
| 33 | 30 | BUS 5 |
| 34 | 31 | GROUND |
| 35 | 32 | BUS 6 |
| 36 | 33 | GROUND |
| 37 | 34 | BUS 7 |
| 38 | | GROUND |
| 39 | 35 | TERMINAL IN |
| 40 | | GROUND |
| 41 | 36 | BUS 8 |

TABLE 3-continued

| TIFB Pin | CABLE SPECIFICATION TRIDENT Connector JOB | SIGNAL |
|---|---|---|
| 42 | | GROUND |
| 43 | 37 | CONTROL TAG |
| 44 | | GROUND |
| 45 | 38 | BUS 9 |
| 46 | | GROUND |
| 47 | 39 | SETCYL TAG |
| 48 | | GROUND |
| 49 | 40 | SETHD TAG |
| 50 | | GROUND |

DISK MEMORY ORGANIZATION

The external processor views the disk controller as a 2K block of memory and a series of 4 interrupts. The 2K block of memory is jumper-selectable for any 2K boundary in the range 8000 ($32_{10}$K) to $FFFF_{16}$($65_{10}$K).

The memory is partitioned into two segments. The first 1.25K bytes are allocated as the disk buffer area and corresponds directly with onboard memory. The remaining 0.75K of memory can be viewed as pseudo-memory. The first 256 bytes are not used and the remaining 512 bytes are used as the address space for the memory-mapped I/0. When information is read or written to these locations, it is not passed through memory but goes directly through to the controller logic. The only other path of communication between the controller and the outside are the 4 priority interrupt lines which the disk controller can raise.

INTERRUPTS

The disk controller has four interrupts it can raise: ATTENTION, SECTOR MARK, INDEX MARK, and OVERRUN. These lines are levels and stay present until they are reset by the programmer.

ATTENTION

This line is raised everytime the disk drive raises its attention flag. The disk will set its attention at the completion of any of the following operations:

1. First Seek: This is the initial seek at power-up.
2. Rezero: This is a command that performs the following operations:
   a. Reposition the heads to cylinder 0
   b. Reset seek-incomplete
   c. Reset illegal-cylinder-address
   d. Reset offset-heads
   e. Set the head address register=0
3. Seek or Seek Incomplete: Therefore, any attempt to see whether or not successful with raise ATTENTION.
4. Emergency Retract: This can occur on loss of line voltage or accidential opening of the disk enclosure at speed.

To reset ATTENTION, a read command must be sent to the drive. This is done by turning the Read Command bit on the bus on and then toggling the control Tag Line.

Usually a wait of some magnitude is associated with ATTENTION. Such events as first seek may take many seconds while a seek takes on the order of ms. In a multiprocessing environment, a wait on a seek is a good time for a task switch. The ATTENTION interrupt can then be used to "wake-up" the dormant disk handling process. With a dedicated processor like an 8080, a Halt or Jump self-wait may be appropriate. When the interrupt handler returns control will pass to the next statement following the wait. Suggested handling of an ATTENTION interrupt is as follows:

```
Save current system status
Re-enable all higher priority interrupts
Place Read Command on Bus
Toggle Control Tag Line
Clear Read Command off Bus
Perform any additional processing you may desire
        .                  .                .
        .                  .                .
        .                  .                .
Return to interrupted task
```

SECTOR MARK

This interrupt line is used if the disk drive unit has fixed length sectoring enabled. The disk drive is enabled by jumpering its Logic III board sockets § A & 6B.

The disk drive electronics are also jumpered for the number of sector pulses per revolution. Each sector pulse generates an interrupt. These interrupts are used to keep track of the sector positions when the drive is in the fixed length sector mode.

Sector marks occur asynchronously with other processing activity. Unlike the ATTENTION interrupt, which the main line code expects, the SECTOR MARK interrupt is handled out of line. The interrupt is handled by updating the current sector to reflect the disk's current state.

The SECTOR MARK interrupt is cleared by toggling the CLR SEC INT control line from 0 to 1 and back to 0 again.

Structured Flowchart of Sector Interrupt Handler

```
Save Current System Status
Re-enable all Higher Priority Interrupts
Toggle CLR_SECT_INT
Bump Sector-Count
+--------------------------------------------------------------+
|              sector-count max-sector count                   |
| No                                 Yes Resnyc to next index  |
+-----+--------------------------------------------------------+
|     | FOR i WHILE sector count = 0 DO                        |
|     |                 +--------------------------------------+
|     |                 | Wait here for next index pulse so    |
|     |                 | sector-count is properly reinitialized.|
|     | OD              +--------------------------------------+
+-----+--------------------------------------------------------+
Return to Interrupted Task
```

INDEX MARK

This interrupt occurs at the start of each revolution. It enables the program to know at once during the revolution the absolute position of the disk. This allows the relative sector count to be reset if it loses track of where it is. Since the INDEX MARK interrupt occurs only 4±1ms before the first sector, there will always be a sector interrupt pending at the completion of INDEX MARK handling. It is important to ensure that the INDEX MARK interrupt is of a higher priority than the SECTOR MARK interrupt.

A possible method of handling INDEX MARK interrupts is as follows:

```
Save System Status
Re-enable higher priority interrupts
Toggle CLR_INDX_INT to clear interrupt request
Set sector-count= FFH for upcoming SECTOR interrupt
Return to interrupted task
```

OVERRUN

This interrupt occurs when a sector or interrupt mark is missed. It is raised when the following condition is true:

$$(\overline{SECTOR_C} + \overline{INDEX_x}) \cdot (SECTOR_D + INDEX_D)$$

where

- $SECTOR_c$ = the interrupt level raised by the controller processor on sector interrupts
- $INDEX_c$ = the interrupt level raised by the controller for the processor on index interrupts
- $SECTOR_D$ = The pulse sent from the disk drive to the controller to indicate a sector interrupt
- $INDEX_D$ = the pulse sent from the disk drive to the controller to indicate an index interrupt Note that OVERRUN interrupts will occur if the INDEX MARK or SECTOR MARK lines are not cleared. OVERRUN can be cleared by CLR SEC INT.

OVERRUN can be handled in a number of ways. The most general and safest is to assume the sector count is lost and resynchronize to the next index pulse. If the amount of time spent between interrupt services is known, a priori, the sector count can then be modified to bring it into proper accord. The latter algorithm is extremely hard to implement properly due to the fact that the controller must run with the processors interrupts enabled and should be avoided unless the time loss of 1 revolution (16.7ms) is highly critical. The general flowchart as follows:

```
Save System Status
Toggle CLR_SECT_INT to reset int
Re-enable all interrupts
FOR i WHILE sector-count = 0 DO
        Wait for index pulse
OD
Return to interrupted tasks
```

CONTROL SIGNALS

This section contains lists and explanations of all signals that travel between the processor and the controller. As stated before, all these signals are transmitted and received via memory-mapped I/O. However, due to the fact that not all of the address bits are decoded, there is not a one to one correspondence between the memory location being mapped and the disk control functions, i.e., the same control function can be obtained by addressing different RAM locations. The memory space associated with the control functions resides totally within the disk controllers's address space. The disk controller's I/O mapping addresses all are of the form:

IJJJ JIII XXXF $FFF_xF_y$ where

- *I* - indicates bit always expected to be set
- *j* - bits set via address jumpers
- X - bits that are not decoded
- F - bits that uniquely specify the control word that is requested.

Note: in DCW 10, DCW 11, DCW 12, DCW 13 bits $F_x$ and $F_y$ are NOT decoded

Each word so defined will be called a disk control word (DCW). It should be noted that the DCW's will form 8 blocks of $31_{10}$ words ($lF_{16}$) each referred to as DCWB (DCW Block; see Figure 54). Each DCWB is equivalent to any other DCWB and can be used interchangeably.

Each DCW is broken down and described in detail below.

DCW0-DISK STATUS

| Selected Low True | Attention Low True | End-of-Cylinder Low True | Offset Low True | Ready Low True | Online Low True | Read Only Low True | Seek Incomplete Low True |
|---|---|---|---|---|---|---|---|
| 7 | 6 | 5 | 4 | 3 | 2 | 1 | 0 |

| | |
|---|---|
| SELECTED | This signal indicates whether or not the drive is selected |
| ATTENTION | This indicates that the drive is requesting an ATTENTION INTERRUPT |
| END-OF-CYLINDER | This signal indicates an attempt to reference beyond the physical end of the current cylinder, i.e., the head address greater than 4 |
| OFFSET | This signal indicates that the heads are currently offset. |
| READY | This signal indicates the drive is in the ready state. In ready state the heads are loaded and the seek is complete |
| ONLINE | This signal indicates the online state, which occurs when the heads are loaded. |
| READ ONLY | This signal indicates whether or not the read only switch on the drive's front panel is set. Once a drive is selected, the setting of the read only switch will have no effect until the drive goes unselected. |
| SEEK INCOMPLETE | This signal indicates that the last motion command (seek, rezero or first seek) has not been completed within .7 ± .2 seconds. |

DCW1-Disk Status

| Not Used | Not Used | Not Used | Delay up | Terminator In Low True | BA Stop Low True | Address Mark Detect ↓ Pulse | Device Check High True |
|---|---|---|---|---|---|---|---|

| | |
|---|---|
| DELAY_UP | When true, this signal indicates the delay counter has counted down thru 0. The delay counter is used in read |

-continued

DCW1-Disk Status

| Not Used | Not Used | Not Used | Delay up | Terminator In Low True | BA Stop Low True | Address Mark Detect ↓ Pulse | Device Check High True |
|---|---|---|---|---|---|---|---|

| | |
|---|---|
| | and write operations to ensure proper timing. The delay counter is part of the controller. |
| TERMINATOR_IN | This signal comes from the disk and when true it indicates that the terminator card is plugged in and the cables are present |
| BA STOP | This signal when true indicates the completion of a read or write operation. The controller gives this signal when it finishes its last I/O operation to its onboard memory. |
| ADDRESS MARK DETECTED | This signal is a 17 us low going pulse that indicates that an address mark has been detected. The signal must be detected in real time by the software since it is not latched in the controller. |
| DEVICE CHECK | This signal is true when the disk discovers one of the following error conditions: 1. Illegal cylinder address 2. Offset heads set and a Set-Cyl-Tag line is true 3. An attempt to raise Set-Cyl-Tag when the drive is not read 4. An attempt to raise Set-Head-Tag when the drive is not read 5. An attempt to write when the drive is not ready 6. An attempt to write with the heads offset 7. An attempt to write when the disk drive is in the ready only mode 8. An attempt to write is made but the drive does not sense a write current 9. An attempt to write when the servo-mechanism senses the heads are off-track 10. The drive senses a write current but no write operation is currently being performed 11. An attempt to read or write with illegally selected heads (i.e., multiple heads selected or no head currently selected) |

All but the first 2 conditions can be reset by a Device Check Reset command. The first 2 conditions are only reset by a Re-zero command.

DCW2 - Bus 0-7

| Bus 7 High True | Bus 6 High True | Bus 5 High True | Bus 4 High True | Bus 3 High True | Bus 2 High True | Bus 1 High True | Bus 0 High True |
|---|---|---|---|---|---|---|---|
| 7 | 6 | 5 | 4 | 3 | 2 | 1 | 0 |

DCW2 and Bits 0 and 1 of DCW6 make up the 10 bit bus. The meaning of each bit depends on the tag line that is raised in conjunction with it. There are 3 tag lines: Set-Cyl-Tag, Set-Head-Tag and Set-Control-Tag, which are controlled by bits 5-3 of DCW6 respectively. The bus is used in the following manner:

1. First the bus is loaded with data. The bus cannot be loaded until the drive has been selected for at least 200 ns.
2. Raise the appropriate tag line a minimum of 200 ns after the bus has been loaded.
3. Lower the tag line a minimum of 800 ns after it has been raised
4. Clear the bus Bus Definitions

| Bus | Set-Cyl-Tag | Set-Head-Tag | Set-Control-Tag |
|---|---|---|---|
| 0 | MSB (Cylinder Address) | | Strobe-late |
| 1 | ↓ | | Strobe-early |
| 2 | ↓ | | Write |
| 3 | ↓ | Offset | Read |
| 4 | ↓ Cylinder | Offset-Forward | Address-mark |
| 5 | ↓ | | HAR-reset |
| 6 | ↓ Address | | Device-check-reset |
| 7 | ↓ | MSB (Head Address) | Head-select |
| 8 | ↓ | Head Address | Rezero |
| 9 | LSB | LSB | Head-advance |

| | |
|---|---|
| SET-CYL-TAG | When this tag is set, the bus lines are interpreted as a 10 bit Cylinder Address as shown |
| SET-HEAD-TAG | |
| Bus 7 - Bus 9 | 3 bit Head Address |
| Bus 2 | When this bit is a 1 the drive will offset the heads in (toward the spindle) or out (away from the spindle) depending on the state of Bus 3. This is useful in recovering marginal date in read operations. If 0, the offset is reset. |
| Bus 3 | This determines the direction of the offset |

-continued

| Bus Definitions |
|---|
| operation<br>1 - offset in<br>2 - offset out |

Note: Offset heads can be reset by either an offset command of 0 or a Rezero command DCW3 - Mode Control Word for 8255 #1 & 2
DCW7

| 1 | 0 | 0 | DCW3-1<br>DCW7-0 | 0 | 0 | 1 | 0 |
|---|---|---|---|---|---|---|---|
| 7 | 6 | 5 | 4 | 3 | 2 | 1 | 0 |

This determines the port assignment and functions for the 8255 Programmable Peripheral Interface. The setting specified above is necessary for proper operation of the controller. Both mode control words must be set before any other attempt to access the controller. For more specific information on the 8255 consult the Intel documentation provided. Note that bit 4 is a '1' in DCW3 and '0' in DCW7, i.e., DCW3=$92_{16}$ and DCW7=$82_{16}$.

DCW4 - Interrupt & CRC Control Signals

| Not Used | Clr-Indx-Int Pulse ↑ | Clr-Sect-Int Pulse ↑ | Eng-Dsk-Bfr | CRC-Clr Pulse ↑ | CRC-Full High True | CRC-Partial High True | CRC-Circular High True |
|---|---|---|---|---|---|---|---|
| 7 | 6 | 5 | 4 | 3 | 2 | 1 | 0 |

| | |
|---|---|
| Clr_Indx_Int - | This bit when toggled from 1 to 0 and back to 1 will clear any currently pending index interrupts. This should be done for every INDEX interrupt processed. |
| Clr_Sect_Int - | This bit should be toggled from 1 to 0 and back to 1 to clear any currently pending SECTOR or OVERRUN interrupts. |
| Ena_Dsk_Bfr - | This bit controls the access to the controllers on board memory. When this bit is a "1" the external processor is given access tothe memory and the controller is blocked from access. When the bit is a "0" the controller has access and the processor is excluded from access. |
| CRC_Clr - | This bit when pulsed from 0 to 1 and back to 9 will clear the CRC logic. |
| CRC_Full - | This puts the CRC logic in full mode. The CRC logic is used in this mode to create and error check the data |
| CRC_Partial - | When true this bit will put the CRC logic in partial mode which is used in error recovery. |
| CRC_Circular - | This bit when true, will enable reading the CRC as a circular shift register. |

DCW5 - CRC reg

| $CRC_7$ (MSB) High True | $CRC_6$ High True | $CRC_5$ High True | $CRC_4$ High True | $CRC_3$ High True | $CRC_2$ High True | $CRC_1$ High True | $CRC_0$ (LSB) High True |
|---|---|---|---|---|---|---|---|

This 8 bit word acts as a CRC register. It is loaded by toggling the Sngl Stp CRC Clk bit of DCW6 while the CRC logic is in the circular mode.

DCW6 - Tag Line, Bus & CRC Signals

| Sngl-Stp-CRC-Clk Pulse ↑ | Cylinder Tag High True | Head-Tag High True | Control-Tag High True | Select Low True | Sequence Low True | Bus 9 | Bus 8 |
|---|---|---|---|---|---|---|---|
| 7 | 6 | 5 | 4 | 3 | 2 | 1 | 0 |

| | |
|---|---|
| Sngl_Stp_CRC-Clk - | (Single Step CRC Clock) This bit when pulsed from 0 to 1 to 0 will shift in contents of the CRC 32 bit into DCW 5 (CRC Reg.). Shifting is performed leftward with the MSB being the first to enter. |
| Cylinder_Tag - | When this tag line is raised, the contents of the bus is interpreted as a cylinder address. |
| Head-Tag - | When this tag line is raised, the bus is interpreted as an offset command or head address. |
| Control_Tag - | When this tag is raised, the bus in interpreted as a control command. For a complete list of commands see Table 3. |
| Selected - | When this bit is true, it causes the drive to be selected if the terminator is present and the drive is not degated. |
| Sequence - | Causing this bit to go true will initiate a sequence cycle. This bit should remain true until 1 sec before power down. |
| Bus 8-Bus 9 - | The 2 least significant bits on the bus. |

DCW12 - Delay Counter

| MSB | ← | | | | | → | LSB |
|---|---|---|---|---|---|---|---|
| High True | High True | High True | High True | High True | High True | High True | High True |

This counter initiates a delay before a read or write operation. This counter is turned on with the sector pulse that initiates the read or write operation. The I/O operation is held up until the delay counter counts down through 0, and then I/O operation is allowed to proceed. Typical values are 0 for writes and 24 for reads.

On those cases in which the CRC returned during a read is not zero, error recovery comes into play. To recover marginal data two techniques are available. First, the read strobe can be advanced or retarded, and secondly the heads can be slightly offset in or out. By adjusting these two parameters nine different starting sector positions can be accessed.

DCW13 - Stop Counter

| MSB | ← | | | | | → | LSB |
|---|---|---|---|---|---|---|---|
| High True | High True | High True | High True | High True | High True | High True | High True |
| 7 | 6 | 5 | 4 | 3 | 2 | 1 | 0 |

The stop counter allows the controller to complete its scan through the buffer on an I/O operation up to 255 bytes from the end of the buffer. This is necessary on read operations to prevent resyncing. Resyncing can arise when the read procedes past the trailing zero pad area of the sector into some undefined region of the on board buffer. Any "1" bit found in this area can cause the read logic to think the sync byte of the next sector has arrived. Subsequent reads will thereby be incorrectly synced and data recovery will be impossible.

PROGRAMMING

There are four major programming operations involved in controlling the disk, they are:

1. Power-up
2. Seek
3. Read
4. Write

Before delving into the aforementioned operations, it is useful to explain the error detection and recovery features of the controller.

The controller performs error detection via the CRC generator. The CRC is a 32 bit quantity which is accessed 8 bits at a time (MSB first) through DCW 5. Before actually writing a sector to the disk, the sectors CRC must be generated. This is done by performing all the steps of a disk write, but without the heads selected.

This drives the sector through the CRC generator. When this "face write" is completed, the code must single step the CRC logic 8 times to obtain the next significant byte of the CRC. This byte is then written into the sector by the program. The three remaining bytes of the CRC are to be extracted stored in the same manner. Once the CRC is safely stored away within the sector to be written, a normal write can be performed. The CRC generation flow chart is shown below.

The checking of the CRC on input is a much simpler task. A normal read is performed during which the CRC logic generates a CRC for the incoming data. This is then compared to the CRC currently written on the sector. If the two CRC's match then the 32 bit CRC value generated as an end result, will be zero.

```
Issue a select
FOR i UNTIL drive-selected DO
    Wait for drive to be selected
OD
Clear CRC
Set   CRC logic to full mode
Give  controller control of buffer Enble-dsk-bfr = 0
Load  Delay Counter with Write Delay (usually 0)
Put   Write command on bus
Raise Control Tag to perform fake write
FOR i  UNTIL DA stop DO
    Wait for write to complete
OD
Lower control Tag then clear the bus and set Enbledskbfr = 1
FOR i : = 0 TO 3 DO
    FOR j : = 1 TO 8 DO
        Single step CRC into CRC reg (DCW 5)
    OD
    Move DCW 4 to disk buffer. CRC + i
OD
Return
```

POWER UP

The power up sequence is a relatively straight forward task. First the controller must initialize through the proper setting of its 8255's. Then the disk drive itself is powered up and brought online. The flow chart is as follows:

```
Set  DCW3 = 92 to initialize PPI #1
Set  DCW7 = 82 to initialize PPI #2
Raise select (DCWG bit 3)
Issue sequence (DCWG bit 2)
FOR i UNTIL online AND selected DO
    ;Wait for disk to come up
OD
FOR i WHILE attention AND seek_incomplete DO
    ;Wait for first seek success or bomb
OD
                 IF seek_incomplete
No                                          Yes
For i UNTIL 32 ms              | Signal error condition
elapsed DO                     |
    ;Wait 2 revolutions        |
    ;times to allow            |
    ;sector count to initialize|
Return
```

SEEKS

A seek is the act of positioning the heads at a specified cylinder. The disk drive contains a difference register which it uses to compute the relative address of the next cylinder requested. This relieves the programmer from having to keep track of current head positions. Basically the seek sequence consists of:

a. Selecting the drive.

b. Making sure the drive is in a seekable state, i.e., not busy or offset.

c. Loading the heads.

d. Issuing a cylinder address and seeking.

e. Checking to see if the seek came off as planned.

The details are given in a structure flow chart below.

However, the bus layout requires additional consideration.

The bus as defined above (DCW2, DCW6, Bus Definition) gives the appearance of a 10 bit field with bus 9 being the leftmost bit, and bus 0 being the right most bit. However, the drive's electronics expects Bus 9 to hold the least significant bit of any head or cylinder address. This imposes the restrictions of having to invert the addresses from their normal arithmetic form and to insure that these inverted addresses are left justified on the bus.

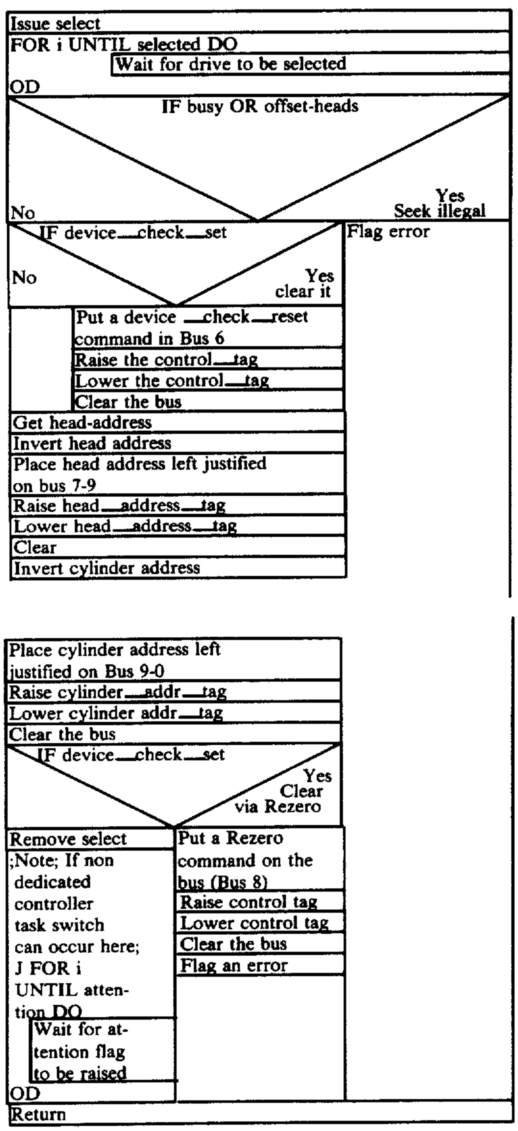

SECTORING

Before describing the I/O operations read and write, a few words should be said on sectorings and sector format.

Two types of sectoring are available: address mark sectoring and electronic sectoring. In address mark sectoring each sector is preceded by an address mark. A given sector is found by first positioning the heads to the specified track, then a read command is issued. This command activates the address mark detection circuitry. These circuits scan the disk for the next address mark. When the address is found it generates a 17 ns low going pulse which must be detected by the software. The software then drops the address mark bit and lets the read proceed. The software must then read the sector header and decide whether or not the sector found is the desired sector. If the sector gotten is the one desired, then the read continues. Otherwise, the address mark command is raised again and the scan of the track continues.

When writing a sector the sector must be proceded by an address mark. Address marks are written by raising address mark bit Bus 4 while a write command is active. Address marks have the advantage of being able to handle variable length sectors and of possibly being slightly more efficient in the use of disk space, (i.e., they have no internal fragmentation but external fragmentation still is present). However, these advantages are offset by the added complexity in finding specified sectors and by latency problems when the average sector length is short.

In electronic sectoring a fixed number of sector pulses are issued per revolution (jumper selectable by the user) and an index pulse occurs once per revolution. By simply counting the sector pulses and resetting the sector count each index pulse, the rotational position of the disk is always known. When a read or write command is issued, it is not acted upon until the next sector pulse. The idea being that the software find the sector pulse before the one required, thereby causing the required sector pulse to initiate the I/O operation.

READ

Reading can be broken into two major components, the physical disk read and the error check. The Physical disk read consists of the bit manipulation necessary to load the proper DCWs and the atual read opration. After the sector is read it is error checked in two ways. First, the CRC is checked. If the CRC is valid then the second ID field is checked. If both are valid, then the read completes normally. Otherwise, the software should attempt to recover the data by advancing and retarding the read strobe and also by offsetting the heads forward and backward before flagging a fatal error. The flow chart is as follows:

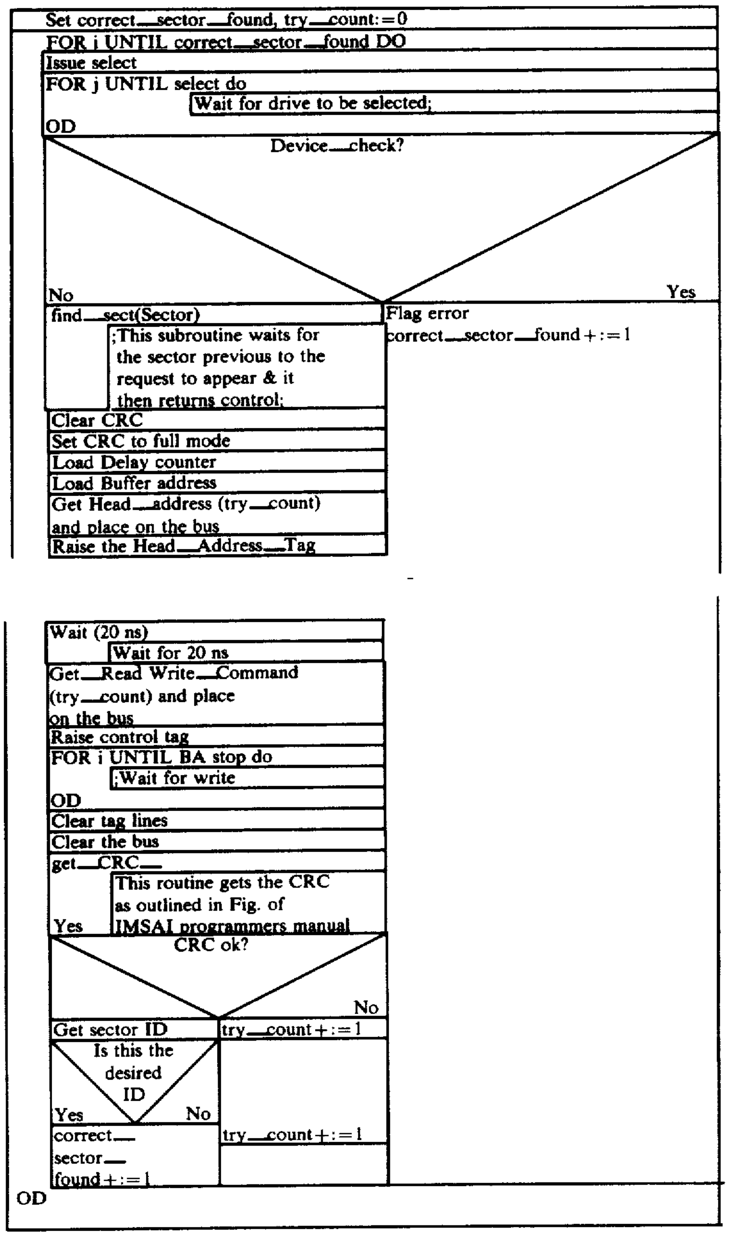

Writing

The write operation can be divided into two functional parts. Firstly, there is the generation of a CRC code for the sector to be written. This process was outlined in detail above. Secondly, is the setting up and performance of actual physical disk write. Additionally a read back write check to ensure data integrity is strongly recommended. Unless time constraints are extremely critical, a read back write should not be bypassed. The structured flow chart is as follows:

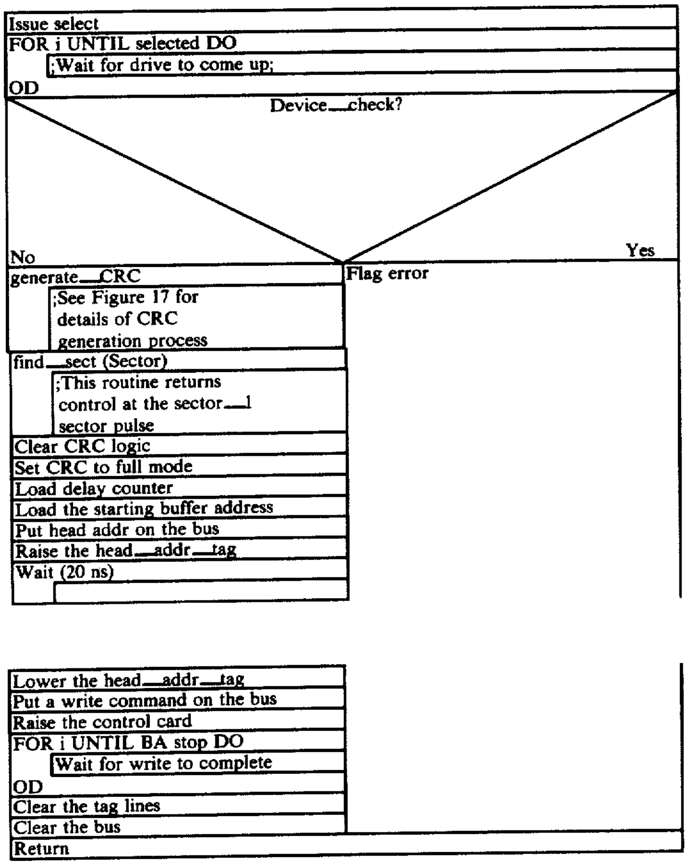
STRUCTURE FLOW CHART SYMBOLS
Program or Program Module
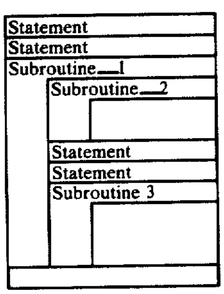
Loop Construct
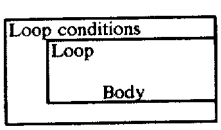

Decision Constructs

Binary choice (If then else)

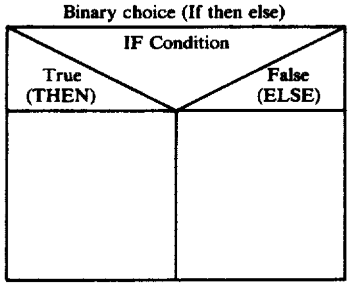

Multipath choice (CASE)

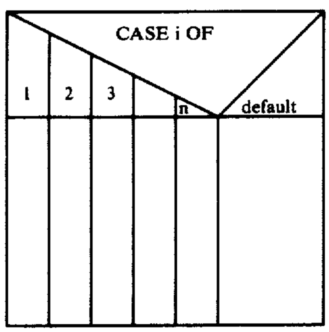

The Disk Driver Firmware can be partitioned into four functional blocks.

1. Interrupt Handlers
2. Disk Driver Resident Monitor DDLRM
3. High Level Routines
   a. Read (HLRD)
   b. Write (HLWRT)
   c. Initiative (INHT)
4. Low-Level Routines
   a. Communication Routines i.e. mailbox manipulation
   b. I/O support routines
   c. General unitity routines like more data and memory.

The following discussion will only involve the first three groups. The Low Level routines are either discussed in detail elsewhere or are of a trivial nature and not of general interest

Interrupt Handlers

In addition to the four interrupts generated by the Disk Controller, there is an additional interrupt called POWER-UP. This interrupt handler does the following tasks:

1. Waits for the master processor to initiate shared memory.
2. Performs a disk power up sequence.
3. Sizes the controllers local memory.
4. Sets up the Disk Driver's stack.
5. Transfers control to DDLRM (Disk Driver Level resident monitor)

Disk Driver Level Resident Monitor

DDLRM is the traffic controller of the Disk Driver level. It scans the mailbox queues for any messages. If a message is found, then it verifies that it is a message to him. If it is he processes it by invoking the proper high level routine to service the request. Otherwise he returns the mailbox to the queues and exits. The interrupt handlers and their associated 8080 vectored interrupt lines are:

1. PUIH - Power Up Interrupt Handler invoke via a RST 0 console restart not tied to vector or interrupt lines.
2. OIH - Overrun Interrupt Handler VI6.
3. IMIH - Index Mark Interrupt Handler, V15
4. SMIH - Sector Mark Interrupt Handler, V14
5. ATNIH - Attention Interrupt Handler VI1

High Level Read HLVRD

This routine performs the high level read functions. It first extracts and verifies the cylinder and head address information from the mailbox. It then passes this information to the low level seek routine.

If the seek has successfully completed, then HLVRD will extract the sector address from the mailbox and perform the actual read.

At successful completion control is passed to DDLRM; otherwise an error message is formatted and sent to the DBMS level followed by a return to DDLRM.

High Level Write Routine HLVWT

This routine provides the high level write function. First it extracts and error checks the cylinder and head address passed to it in the mailbox. If these are not valid, further processing is aborted.

Otherwise a seek is attempted. Upon successful completion of the week, the sector address is extracted and error checked. If valid, then a write is attempted. After each write, a read back write check is performed to insure data integrity.

Systems Software

The systems software resident at the communications, DBMS and storage levels is set forth in detail below. FIGS. 31–37; and FIGS. 38–45 are flow charts for various routines at the commuications and DBMS level, respectively. FIG. 46 is a flow chart of the mailbox routine which is common to all three processor levels.

The communications level routines and subroutines are as follows:

LINE HANDLER
- LEVEL EXEC
- STRCV
- CHKMS
- CHKSM
- ENCOD
- ISACK
- SNDMS
- SNDMI
- XMTON
- USART INTERRUPT SERVICE
- CLOCK INTERRUPT SERVICE
- INITIALIZATION
- INPUT AND OUTPUT ROUTINES

The DBMS level routines and subroutines are as follows:

- GET/PUT
- DODSK
- DOCMD
- PUT
- GET
- HEAD/SECTOR XLATION TABLE
- COPID
- CMDTB

INDSK
DEBUG
MOVE
COPY
TRADD
ERROR PROCESSING
  INITIALIZATION
  ROUTINES
  BOXES
  ERROR MESSAGES
SYNTAX SCANNER
  SKCOM
  NYTCH
  HEXNO

The storage level routines and subroutines are as follows:

ERROR RECOVERY
  ERROR MESSAGES
  ERROR RECOVERY ROUTINES
  ABORT ERROR HANDLERS
READ/WRITE
  OVERRUN INTERRUPT HANDLER
  INDEX MARK INTERRUPT HANDLER
  SECTOR MARK INTERRUPT HANDLER
  ATTN INTERRUPT HANDLER
  HLVRD INTERRUPT HANDLER
  HLVRD
  HLVWT
  GCHFM
  GSAFM
  LOADB
  SEEK
  WRITE
  READ
  SBBSR
  ISRS
  RET
  DCR
  GIBS
  IOGO
  RDWRT
  LCRCR
  SCRCC
  SIZEM
  SHFTL
  CLRIN
  LHADR
  SAMSG
GENERAL PURPOSE
  PWR UP/INTERRUPT HANDLER
  MOVE
  FILL

The mailbox routines commn to all three levels are as follows:

SRET
GRAB
GBOXT
GBOXB
RCVT
RCVB
RIGNR

The detailed software steps are as follows:

```
;       S Y S T E M   S Y M B O L S / M A C R O S
;
;
;
;


;       BASIC SYSTEM MACROS

;       XL - INDEXED LOAD
;       USE AS FOLLOWS:
;       XL      REGISTER,DISPLACEMENT
;       LOADS "REGISTER" FROM LOCATION (H,L)+DISPLACEMEN
;       DESTROYS B,C BEFORE LOADING.
XL      MACRO   REG,DIS
        PUSH    H
        LXI     B,DIS
        DAD     B
        MOV     REG,M
        POP     H
        ENDM

;       XS - INDEXED STORE
;       USE LIKE XL
;       DESTROYS B,C BEFORE STORING.
XS      MACRO   REG,DIS
        PUSH    H
        LXI     B,DIS
        DAD     B
        MOV     M,REG
        POP     H
        ENDM

;       XL2 - INDEXED 16-BIT LOAD
;
;       USE AS FOLLOWS:
;       XL2     RH,RL,DISP
;       LOADS "RL" FROM LOCATION (H,L)+"DISP"
;       AND "RH" FROM (H,L)+"DISP"+1
;       DESTROYS B,C BEFORE LOADING.
```

```
XL2     MACRO   RH,RL,DISP
        PUSH    H
        LXI     B,DISP
        DAD     B
        MOV     RL,M
        INX     H
        MOV     RH,M
        POP     H
        ENDM

;       XS2 - INDEXED 16-BIT STORE
;       USE LIKE XL2
;       DESTROYS B,C BEFORE STORING.
XS2     MACRO   RH,RL,DISP
        PUSH    H
        LXI     B,DISP
        DAD     B
        MOV     M,RL
        INX     H
        MOV     M,RH
        POP     H
        ENDM

;       SAVE - SAVE REGISTERS
;       SAVES ALL REGISTERS ON STACK.
SAVE    MACRO
        PUSH    PSW
        PUSH    B
        PUSH    D
        PUSH    H
        ENDM

;       RESTR - RESTORE REGISTERS
;       RESTORES ALL REGISTERS FROM STACK
RESTR   MACRO
        POP     H
        POP     D
        POP     B
        POP     PSW
        ENDM

;       XI - INDEXED INSTRUCTION
;       USE AS FOLLOWS:
;       XI      DISPL,'OP PARAMETERS'
;       ADDS "DISPL" TO H,L AND THEN EXPANDS "OP" WITH
;       PARAMETERS "PARAMETERS". FOR EXAMPLE, TO INCREM
;       LOCATION 1005H IF HL=1000H, DO
;       XI      5,'INR M'
;       DESTROYS B,C DURING CALCULATION.
XI      MACRO   DIS,OP
        PUSH    H
        LXI     B,DIS
        DAD     B
        OP
        POP     H
        ENDM


;       SYSTEM SYMBOLS
;       (DELETE WHAT YOU DON'T NEED IF SYMBOL TBL OVERFL

;       LOW-CORE SUBROUTINE VECTORS
0100    SRET    EQU     0100H   ;JMP SRET TO DO SKIP-RETURN
0103    GBOXT   EQU     0103H   ;GET BOX TO LEVEL ABOVE
0106    GBOXB   EQU     0106H   ;GET BOX TO LEVEL BELOW
0109    RCVT    EQU     0109H   ;RCV FROM ABOVE
010C    RCVB    EQU     010CH   ;RCV FROM BELOW
010F    RIGNR   EQU     010FH   ;IGNORE THIS BOX & FIND ANOTHER
0112    SUBND   EQU     RIGNR+3 ;END OF SUBR VECTORS
0300    CONFG   EQU     0300H   ;ADDR OF CONFIGURATION PARAMS


;       RAM BLOCK ADDRESSES
4200    RAM     EQU     04200H  ;BEG. ADDR OF LOCAL RAM
4200    STACK   EQU     04200H  ;TOP+1 OF LOCAL STACK
```

```
                ;       LOCATIONS IN LOCAL RAM USED BY ALL ROUTINES
0000                    ORG     RAM
4200            BBOXA:  DS      2         ;POINTER TO BOXES GOING DOWN
4202            TBOXA:  DS      2         ;POINTER TO BOXES GOING UP
4204            EGLOB   EQU     $         ;END OF GLOBAL RAM


                ;       MAILBOX FORMAT
041A            TXTL    EQU     1050      ;LENGTH OF MAILBOX TEXT
0000            MSTS    EQU     0         ;STATUS BYTE: SEE BELOW
0001            MNXT    EQU     MSTS+1    ;PTR TO NEXT MAILBOX
0003            MFLGA   EQU     MNXT+2    ;PTR TO CONTENTION FLG
0005            MID     EQU     MFLGA+2   ;MAILBOX ID
0006            MTEXT   EQU     MID+1     ;MAILBOX TEXT
0420            MLTH    EQU     MTEXT+TXTL ;TOTAL LTH OF MAILBOX
0003            ECHAR   EQU     03H       ;CHAR THAT FLAGS TEXT END
                ;       STATUS BYTE DEFINITIONS
0000            SFREE   EQU     0         ;MAILBOX FREE
0001            SBSYT   EQU     1         ;BUSY, IN USE FROM ABOVE
0002            SBSYB   EQU     2         ;BUSY, IN USE FROM BELOW
0003            SMSGT   EQU     3         ;MSG, BOTTOM TO TOP
0004            SMSGB   EQU     4         ;MSG, TOP TO BOTTOM



                ;       C O M M U N I C A T I O N S   L E V E L
                ;
                ;
                ;


                ;       LOCAL EQUATES

                ;       SERIAL I/O MESSAGE FORMAT - HEADER
0000            SHSTX   EQU     0         ;STARTS WITH <STX>
0001            SHLTH   EQU     SHSTX+1   ;THEN 4 BYTES OF COUNT
0005            SHTXT   EQU     SHLTH+4   ;THEN THE MSG TEXT
                ;       TRAILER
0000            STETX   EQU     0         ;STARTS WITH <ETX>
0001            STEM    EQU     STETX+1   ;THEN <EM>
0002            STCHK   EQU     STEM+1    ;THEN 2 BYTES OF CHKSUM
0004            STEND   EQU     STCHK+2   ;THEN <EOT>
0005            STLEN   EQU     STEND+1   ;LTH OF TLR
0423            MSGL    EQU     TXTL-1+SHTXT+STLEN ;TOTAL MSG LTH
                ;       SERIAL I/O DEVICE STATUS BLOCK (DSB)
0000            DTID    EQU     0         ;TERMINAL ID, MUST BE HERE
0001            DMODE   EQU     DTID+1    ;MODE CONTROL WORD
0002            DCMD    EQU     DMODE+1   ;BASIC CMD BYTE TO PUT ON DPORTC
0003            DPRTC   EQU     DCMD+1    ;I/O PORT NO. FOR COMMANDS
0004            DPRTI   EQU     DPRTC+1   ;I/O PORT NO. FOR I/O
0005            DNEXT   EQU     DPRTI+1   ;PTR TO NEXT DSB
0007            DRPTR   EQU     DNEXT+2   ;PTR TO INCOMING MSG
0009            DRCNT   EQU     DRPTR+2   ;CHARS LEFT IN RCV BUFFER
000B            DRSTS   EQU     DRCNT+2   ;RCVR STATUS: SEE DSXXX BELOW
000C            DXPTR   EQU     DRSTS+1   ;PTR INTO XMIT BUFFER
000E            DXSTS   EQU     DXPTR+2   ;XMTR STATUS: SEE DSXXX BELOW
000F            DSNXT   EQU     DXSTS+1   ;NEXT STATUS (AFTER XMIT IS DONE
0010            DASND   EQU     DSNXT+1   ;"SEND ACK" FLAG
0011            DXTIM   EQU     DASND+1   ;MESSAGE TIMEOUT
0012            DRBUF   EQU     DXTIM+1   ;RCVR BUFFER
0435            DXBUF   EQU     DRBUF+MSGL ;XMTR BUFFER
0858            DLTH    EQU     DXBUF+MSGL ;LENGTH OF A DSB
                ;       STATUS DEFINITIONS WITHIN THE DSB
0001            DSIDL   EQU     1         ;IDLE, WAITING FOR MSG
0002            DSBSY   EQU     2         ;BUSY, MSG IN TRANSIT
0003            DSMSG   EQU     3         ;COMPLETE MSG WAITING FOR PROCES
0004            DSWAT   EQU     4         ;WAITING FOR ACK/NAK
0005            DSAGN   EQU     5         ;TIMEOUT EXPIRED, RE-SEND
0006            DSEND   EQU     6         ;XMSN ENDING
0019            TIMO    EQU     25        ;TIMEOUT IN TENTHS


                ;       EQUATES FOR WORKING WITH THE INTEL 8251 CHIP
```

```
                ;       (WHICH IS USED FOR SERIAL I/O)

                ;       MODE WORD BITS (ASYNCHRONOUS MODE ONLY)
0040            MASTI   EQU     040H    ;MODE ASYNCH: STOP BITS=1
0080            MASTH   EQU     080H    ;MODE ASYNCH: STOP BITS=1.5
00C0            MAST2   EQU     0C0H    ;MODE ASYNCH: STOP BITS=2
0020            MAPE    EQU     020H    ;MODE ASYNCH: PARITY EVEN
0010            MAPEN   EQU     010H    ;MODE ASYNCH: PARITY ENABLE
0000            MA5B    EQU     000H    ;MODE ASYNCH: 5 BITS PER CHAR
0004            MA6B    EQU     004H    ;MODE ASYNCH: 6 BITS PER CHAR
0008            MA7B    EQU     008H    ;MODE ASYNCH: 7 BITS PER CHAR
000C            MA8B    EQU     00CH    ;MODE ASYNCH: 8 BITS PER CHAR
0001            MA1X    EQU     001H    ;MODE ASYNCH: DIVIDE CLOCK BY 1
0002            MA16X   EQU     002H    ;MODE ASYNCH: DIVIDE CLOCK BY 16
0003            MA64X   EQU     003H    ;MODE ASYNCH: DIVIDE CLOCK BY 64
                ;       TO BUILD A MODE WORD, LOGICAL-OR TOGETHER
                ;       THE FOLLOWING:
                ;       ONE OF MASTI,MASTH,MAST2
                ;       ONE OF MA5B,MA6B,MA7B,MA8B
                ;       ONE OF MA1X,MA16X,MA64X
                ;       OPTIONALLY, MAPE
                ;       OPTIONALLY, MAPEN

                ;       COMMAND WORD
0080            CHUNT   EQU     080H    ;ENTER HUNT MODE (SYNCH MODE ONL
0040            CRSET   EQU     040H    ;INTERNAL RESET: PREPARE FOR MOD
0020            CRTS    EQU     020H    ;REQUEST-TO-SEND CONTROL
0010            CERST   EQU     010H    ;ERROR RESET
0008            CBRK    EQU     008H    ;TRANSMIT BREAK
0004            CRIE    EQU     004H    ;ENABLE RCVR INTRPTS
0002            CDTR    EQU     002H    ;DATA-TERMINAL-READY CONTROL
0001            CTIE    EQU     001H    ;ENABLE XMTR INTRPTS

                ;       STATUS WORD
0080            SDSR    EQU     080H    ;DATA SET READY
0040            SSYND   EQU     040H    ;SYNC CHAR DETECT
0020            SFRAM   EQU     020H    ;FRAMING ERROR
0010            SOVRN   EQU     010H    ;OVERRUN
0008            SPARE   EQU     008H    ;PARITY ERROR
0004            STEMP   EQU     004H    ;XMTR EMPTY
0002            SRRDY   EQU     002H    ;RCVR HAS CHAR READY
0001            STRDY   EQU     001H    ;XMTR IS READY FOR CHAR

                ;       PROGRAMMABLE INTERRUPT CONTROL
00FE            PIC8    EQU     0FEH    ;CONTROL PORT
0018            OFPRI   EQU     18H     ;BITS THAT TURN OFF PRIORITY
                                        ; AND ON THE CLOCK

                ;       ASCII CHARACTER DEFINITIONS
0002            STX     EQU     02H     ;START OF TEXT
0019            EM      EQU     19H     ;END OF MEDIUM (?)
0004            EOT     EQU     04H     ;END OF XMSN
0006            ACK     EQU     06H     ;ACKNOWLEDGEMENT CHAR
0016            SYN     EQU     16H     ;SYNCH CHARACTER

                ;       LOCAL RAM VARIABLES
4204                    ORG     EGLOB
4204            FDSBA:  DS      2       ;ADDR OF 1ST DSB
4206 320A42     INPUT:  STA     INS1+1  ;VARIABLE-PORT INPUT ROUTINE
4209 DB00       INS1:   IN      0
420B C9                 RET
420C 79         OUTPUT: MOV     A,C     ;VARIABLE-PORT OUTPUT ROUTINE
420D 321242             STA     INS2+1
4210 78                 MOV     A,B
4211 D300       INS2:   OUT     0
4213 C9                 RET
```

```
                ;       (WHICH IS USED FOR SERIAL I/O)

                ;       MODE WORD BITS (ASYNCHRONOUS MODE ONLY)
0040            MASTI   EQU     040H    ;MODE ASYNCH: STOP BITS=1
0080            MASTH   EQU     080H    ;MODE ASYNCH: STOP BITS=1.5
00C0            MAST2   EQU     0C0H    ;MODE ASYNCH: STOP BITS=2
0020            MAPE    EQU     020H    ;MODE ASYNCH: PARITY EVEN
0010            MAPEN   EQU     010H    ;MODE ASYNCH: PARITY ENABLE
```

```
0000          MA5B    EQU     000H      ;MODE ASYNCH: 5 BITS PER CHAR
0004          MA6B    EQU     004H      ;MODE ASYNCH: 6 BITS PER CHAR
0008          MA7B    EQU     008H      ;MODE ASYNCH: 7 BITS PER CHAR
000C          MA8B    EQU     00CH      ;MODE ASYNCH: 8 BITS PER CHAR
0001          MA1X    EQU     001H      ;MODE ASYNCH: DIVIDE CLOCK BY 1
0002          MA16X   EQU     002H      ;MODE ASYNCH: DIVIDE CLOCK BY 16
0003          MA64X   EQU     003H      ;MODE ASYNCH: DIVIDE CLOCK BY 64
              ;       TO BUILD A MODE WORD, LOGICAL-OR TOGETHER
              ;       THE FOLLOWING:
              ;       ONE OF MAST1,MASTH,MAST2
              ;       ONE OF MA5B,MA6B,MA7B,MA8B
              ;       ONE OF MA1X,MA16X,MA64X
              ;       OPTIONALLY, MAPE
              ;       OPTIONALLY, MAPEN

              ;       COMMAND WORD
0080          CHUNT   EQU     080H      ;ENTER HUNT MODE (SYNCH MODE ONL
0040          CRSET   EQU     040H      ;INTERNAL RESET: PREPARE FOR MOD
0020          CRTS    EQU     020H      ;REQUEST-TO-SEND CONTROL
0010          CERST   EQU     010H      ;ERROR RESET
0008          CBRK    EQU     008H      ;TRANSMIT BREAK
0004          CRIE    EQU     004H      ;ENABLE RCVR INTRPTS
0002          CDTR    EQU     002H      ;DATA-TERMINAL-READY CONTROL
0001          CTIE    EQU     001H      ;ENABLE XMTR INTRPTS

              ;       STATUS WORD
0080          SDSR    EQU     080H      ;DATA SET READY
0040          SSYND   EQU     040H      ;SYNC CHAR DETECT
0020          SFRAM   EQU     020H      ;FRAMING ERROR
0010          SOVRN   EQU     010H      ;OVERRUN
0008          SPARE   EQU     008H      ;PARITY ERROR
0004          STEMP   EQU     004H      ;XMTR EMPTY
0002          SRRDY   EQU     002H      ;RCVR HAS CHAR READY
0001          STRDY   EQU     001H      ;XMTR IS READY FOR CHAR

              ;       PROGRAMMABLE INTERRUPT CONTROL
00FE          PIC8    EQU     0FEH      ;CONTROL PORT
0018          OFPRI   EQU     18H       ;BITS THAT TURN OFF PRIORITY
                                        ; AND ON THE CLOCK

              ;       ASCII CHARACTER DEFINITIONS
0002          STX     EQU     02H       ;START OF TEXT
0019          EM      EQU     19H       ;END OF MEDIUM (?)
0004          EOT     EQU     04H       ;END OF XMSN
0006          ACK     EQU     06H       ;ACKNOWLEDGEMENT CHAR
0016          SYN     EQU     16H       ;SYNCH CHARACTER

              ;       LOCAL RAM VARIABLES
4204                  ORG     EGLOB
4204          FDSBA:  DS      2         ;ADDR OF 1ST DSB
4206 320A42   INPUT:  STA     INS1+1    ;VARIABLE-PORT INPUT ROUTINE
4209 DB00     INS1:   IN      0
420B C9               RET
420C 79       OUTPUT: MOV     A,C       ;VARIABLE-PORT OUTPUT ROUTINE
420D 321242           STA     INS2+1
4210 78               MOV     A,B
4211 D300     INS2:   OUT     0
4213 C9               RET
4214          BRDS:   DS      16        ;TBL FOR INITING SIO BRDS
4224          DSB0:   DS      0         ;1ST DSB GOES HERE

              ;       POWER-UP SYNCHRONIZATION LOCATION
BFFF          SYNL    EQU     0BFFFH


              ;       CONFIGURATION CHIP
4224                  ORG     CONFG
0300 00       NOCHK:  DB      0         ;IF NONZERO, DON'T VERIFY CHKSUM
              ;       DSB INITIALIZATION TABLE
              ;
              ;       EACH ENTRY IS 5 BYTES LONG, AND IS SIMPLY
              ;       THE FIRST 5 BYTES OF THE DSB.  THE TABLE
              ;       IS TERMINATED BY A SINGLE ZERO BYTE.
              ;
              ;       STANDARD MODE AND CMD WRDS (STDM, STDC)
00DA          STDM    EQU     MAST2 OR MA7B OR MA16X OR MAPEN
```

```
0026              STDC     EQU      CRTS OR CRIE OR CDTR
                  ;        ENTRY ORDER:  TERMID,MODE,COMMAND,CMD PORT,I/O P
0301 01DA2613 DSBS:        DB       1,STDM,STDC,13H,12H
0305 12
0306 02DA2615              DB       2,STDM,STDC,15H,14H
030A 14
030B 00                    DB       0         ;TABLE TERMINATOR



                  ;        COMMUNICATIONS-LEVEL EXECUTIVE
                  ;
                  ;        THIS ROUTINE SCANS THE RECEIVER DSB'S AND THE
                  ;        MAILBOXES FOR MESSAGES.  WHEN A MESSAGE IS FOUND
                  ;        IN ONE, IT IS PASSED ON TO THE OTHER.
                  ;
030C                       ORG      0         ;SET UP INITIALIZATION VECTOR
0000 C33308                JMP      INIT      ;          .
0003                       ORG      400H      ;          .

0400              EXEC     EQU      $
0400 2A0442                LHLD     FDSBA     ;POINT HL AT 1ST DSB

0403              CHDSB    EQU      $         ;CHECK A DSB
                           XL       A,DXSTS   ;GET XMTR STATUS
0403 E5                    PUSH     H
0404 010E00                LXI      B,DXSTS
0407 09                    DAD      B
0408 7E                    MOV      A,M
0409 E1                    POP      H

                           XL       B,DASND   ;GET "SEND ACK" FLG
040A E5                    PUSH     H
040B 011000                LXI      B,DASND
040E 09                    DAD      B
040F 46                    MOV      B,M
0410 E1                    POP      H

0411 FE01                  CPI      DSIDL     ;IS XMTR IDLE?
0413 CA2C04                JZ       CHKA      ;         .
0416 FE04                  CPI      DSWAT     ;IS IT WAITING FOR ACK?
0418 CA2C04                JZ       CHKA      ;         .
041B FE05                  CPI      DSAGN     ;DOES IT NEED TO RE-XMIT?
041D C25804                JNZ      CHRCV     ;IF NOT, CHECK RCVR
0420 57                    MOV      D,A       ;RE-XMIT, SAVE STS
0421 78                    MOV      A,B       ;GET "SEND ACK" FLG
0422 B7                    ORA      A         ;TEST IT
047D 09                    DAD      B
047E 77                    MOV      M,A
047F E1                    POP      H

0480 EB                    XCHG               ;DE->BOX, HL->DSB
0481 E5                    PUSH     H         ;POINT AT "SEND ACK" FLG
0482 011000                LXI      B,DASND   ;          .
0485 09                    DAD      B         ;          .
0486 7E                    MOV      A,M       ;GET IT
0487 B7                    ORA      A         ;IS IT ALREADY SET?
0488 C2A604                JNZ      DBL       ;IF SO, JUNK MSG
048B 36FF                  MVI      M,0FFH    ;SET "SEND ACK"
048D E1                    POP      H         ;RESTORE DSB PTR
048E E5                    PUSH     H         ;STACK DSB PTR
048F D5                    PUSH     D         ;STACK BOX PTR
0490 011700                LXI      B,DRBUF+SHTXT ;CALCULATE MSG ADDR
0493 09                    DAD      B         ;          .
0494 EB                    XCHG               ;DE->BUFFER, HL->BOX
0495 010600                LXI      B,MTEXT   ;POINT HL AT TEXT SPOT
0498 09                    DAD      B         ;          .
0499 CD2909                CALL     COPY      ;COPY UNTIL CR
049C E1                    POP      H         ;GET PTR TO BOX
049D 3604                  MVI      M,SMSGB   ;SEND BOX TO DBAS LEVEL
049F E1           NPOP:    POP      H         ;GET DSB PTR
04A0 CD0605       ZAPIT:   CALL     STRCV     ;RESET RECEIVER
04A3 C3AF04                JMP      NXTDV
04A6 3600         DBL:     MVI      M,0       ;CLEAR "SEND ACK"
04A8 EB                    XCHG               ;POINT AT MAILBOX
```

```
04A9 3600               MVI     M,SFREE ;FREE IT UP
04AB E1                 POP     H       ;POINT AT DSB AGAIN
04AC CD0605             CALL    STRCV   ;RESET RCVR
04AF           NXTDV    EQU     $       ;HERE TO MOVE TO NEXT DSB
04AF 010500             LXI     B,DNEXT ;GET NEXT-DSB PTR
04B2 09                 DAD     B       ;         .
04B3 7E                 MOV     A,M     ;         .
04B4 23                 INX     H       ;         .
04B5 66                 MOV     H,M     ;         .
04B6 6F                 MOV     L,A     ;         .
04B7 B4                 ORA     H       ;CHECK PTR FOR ZERO
04B8 C20304             JNZ     CHDSB   ;IF MORE DSB'S, GO DO THEM


               ;        NOW CHECK ALL INCOMING MAILBOXES AND SEND ANY
               ;        WE CAN.
04BB CD0C01    GETMS:   CALL    RCVB    ;RECEIVE MAILBOX FROM DBAS LEVEL
04BE C30004             JMP     EXEC    ;IF NONE, CHECK DSB'S AGAIN
04C1 E5        FOUND:   PUSH    H       ;SAVE BOX POINTER
04C2 010500             LXI     B,MID   ;GET TERMINAL ID INTO B
04C5 09                 DAD     B       ;         .
04C6 46                 MOV     B,M     ;         .
04C7 2A0442             LHLD    FDSBA   ;POINT H AT 1ST DSB

04CA 7E        LOOK:    MOV     A,M     ;GET DSB'S TERMINAL ID
04CB B8                 CMP     B       ;IS THIS THE RIGHT DSB?
04CC CADE04             JZ      HIT     ;         .
04CF 110500             LXI     D,DNEXT ;NO, TRY NEXT DSB
04D2 19                 DAD     D       ;         .
04D3 7E                 MOV     A,M     ;         .
04D4 23                 INX     H       ;         .
04D5 66                 MOV     H,M     ;         .
04D6 6F                 MOV     L,A     ;         .
04D7 B4                 ORA     H       ;CHECK FOR LAST DSB
04D8 C2CA04             JNZ     LOOK    ;IF MORE, TRY THEM
04DB C3EA04             JMP     DROP    ;NOT FOUND, TRY ANOTHER BOX

               HIT:     XL      A,DXSTS ;IS XMTR FREE?
0423 C23204             JNZ     SNDA    ;IF SET, GO SEND ACK
0426 CD2006             CALL    SNDM1   ;ELSE, RE-XMIT MSG
0429 C35804             JMP     CHRCV   ;AND GO DO RCVR

042C           CHKA     EQU     $       ;HERE TO CHECK "SEND ACK" FLG
042C 57                 MOV     D,A     ;SAVE XMTR STATUS
042D 78                 MOV     A,B     ;TEST "SEND ACK"
042E B7                 ORA     A       ;         .
042F CA5804             JZ      CHRCV   ;GO DO RCVR IF NOT SET

0432           SNDA     EQU     $       ;HERE TO SEND AN "ACK"
                        XS      D,DSNXT ;SAVE CURRENT XMTR STATUS
0432 E5                 PUSH    H
0433 010F00             LXI     B,DSNXT
0436 09                 DAD     B
0437 72                 MOV     M,D
0438 E1                 POP     H

0439 114A09             LXI     D,ACKMS ;SET UP XMIT PTR
                        XS2     D,E,DXPTR ;       .
043C E5                 PUSH    H
043D 010C00             LXI     B,DXPTR
0440 09                 DAD     B
0441 73                 MOV     M,E
0442 23                 INX     H
0443 72                 MOV     M,D
0444 E1                 POP     H

                        XI      DXSTS,'MVI M,DSMSG'
0445 E5                 PUSH    H
0446 010E00             LXI     B,DXSTS
0449 09                 DAD     B
044A 3603               MVI M,DSMSG
044C E1                 POP     H

044D CD7D06             CALL    XMTON   ;GO START UP XMTR
                        XI      DASND,'MVI M,0' ;CLR FLG
0450 E5                 PUSH    H
```

```
0451 011000            LXI     B,DASND
0454 09                DAD     B
0455 3600              MVI M,0
0457 E1                POP     H

0458           CHRCV   EQU     $       ;HERE TO CHECK RECEIVER
                       XL      A,DRSTS ;GET RCVR STATUS
0458 E5                PUSH    H
0459 010B00            LXI     B,DRSTS
045C 09                DAD     B
045D 7E                MOV     A,M
045E E1                POP     H

045F FE03              CPI     DSMSG   ;IS MSG THERE?
0461 C2AF04            JNZ     NXTDV   ;JUMP IF NOT
0464 CD2A05            CALL    CHKMS   ;CHECK FOR ALL OK
0467 C3A004            JMP     ZAPIT   ;JUMP IF NOT
046A CDCB05            CALL    ISACK   ;IS IT AN ACK/NAK?
046D C3AF04            JMP     NXTDV   ;IF SO, ISACK HANDLED IT
0470 E5                PUSH    H       ;SAVE DSB PTR
0471 CD^601            CALL    GBOXB   ;TRY TO MAIL THE MSG
0474 C39F04            JMP     NPOP    ;FAILURE: IGNORE MSG FOR NOW
0477 D1                POP     D       ;GET DSB POINTER
0478 1A                LDAX    D       ;GET TERMINAL ID
                       XS      A,MID   ;PUT IT IN BOX
0479 E5                PUSH    H
047A 010500            LXI     B,MID
04DE E5                PUSH    H
04DF 010E00            LXI     B,DXSTS
04E2 09                DAD     B
04E3 7E                MOV     A,M
04E4 E1                POP     H

04E5 FE01              CPI     DSIDL   ;       .
04E7 CAF404            JZ      SEND    ;IF SO, GO SEND MSG
04EA E1        DROP:   POP     H       ;POINT AT BOX AGAIN
04EB CD0F01            CALL    RIGNR   ;IGNORE BOX, TRY NEXT ONE
04EE C30004            JMP     EXEC    ;FAILURE: SCAN DSB'S
04F1 C3C104            JMP     FOUND   ;ANOTHER BOX: PROCESS IT

04F4 E3        SEND:   XTHL            ;PUT DSB ADDR ON STK, GET BOX AD
04F5 54                MOV     D,H     ;COPY BOX ADDR
04F6 5D                MOV     E,L     ;       .
04F7 010600            LXI     B,MTEXT ;CALCULATE TEXT ADDR
04FA 09                DAD     B       ;       .
04FB EB                XCHG            ;TXT PTR TO DE, BOX PTR TO HL
04FC E3                XTHL            ;DSB PTR TO HL, BOX PTR TO STK
04FD CD2906            CALL    SNDMS   ;SEND THE MESSAGE
0500 E1                POP     H       ;POINT AT BOX AGAIN
0501 3600              MVI     M,SFREE ;FREE IT UP
0503 C3BB04            JMP     GETMS   ;AND GO TRY ANOTHER BOX


               ;       SUBROUTINE STRCV
               ;
               ;       THIS SUBROUTINE RESETS THE RECEIVER BUFFER;
               ;       THE TEXT COUNT TO TXTL-1, AND SETS THE STATUS
               ;       TO DSIDL.
               ;
               ;       ON ENTRY, HL POINTS TO THE DSB.  ON EXIT,
               ;       ALL REGISTERS EXCEPT HL ARE DESTROYED.
               ;
0506           STRCV   EQU     $
0506 111200            LXI     D,DRBUF ;POINT D,E AT RCVR BUFFER
0509 EB                XCHG            ;       .
050A 19                DAD     D       ;       .
050B EB                XCHG            ;       .
                       XS2     D,E,DRPTR ;SET UP BUFFER PTR
050C E5                PUSH    H
050D 010700            LXI     B,DRPTR
0510 09                DAD     B
0511 73                MOV     M,E
0512 23                INX     H
0513 72                MOV     M,D
0514 E1                POP     H
```

```
0515 111904              LXI     D,TXTL-1 ;LOAD TXT LTH
                         XS2     D,E,DRCNT ;SET UP COUNTER
0518 E5                  PUSH    H
0519 010900              LXI     B,DRCNT
051C 09                  DAD     B
051D 73                  MOV     M,E
051E 23                  INX     H
051F 72                  MOV     M,D
0520 E1                  POP     H

                         XI      DRSTS,'MVI M,DSIDL' ;RESET TO IDLE STATE
0521 E5                  PUSH    H
0522 010B00              LXI     B,DRSTS
0525 09                  DAD     B
0526 3601                MVI M,DSIDL
0528 E1                  POP     H
0529 C9                  RET


                ;        SUBROUTINE CHKMS
                ;
                ;        THIS SUBROUTINE CHECKS THE MESSAGE IN THE
                ;        DSB RECEIVER BUFFER (DRBUF) FOR CONFORMANCE
                ;        TO THE RULES OF MESSAGE FORMATION AND FOR A
                ;        CORRECT CHECKSUM.  IF ALL IS OK, A SKIP RETURN
                ;        SI TAKEN; IF THERE IS ANY ERROR, A NORMAL
                ;        RETURN IS TAKEN.
                ;
                ;        ON ENTRY AND EXIT, HL POINTS TO THE DSB.  ALL
                ;        OTHER REGISTERS ARE DESTROYED ON EXIT.
                ;
052A            CHKMS    EQU     $
052A E5                  PUSH    H         ;SAVE DSB POINTER
052B 011200              LXI     B,DRBUF ;POINT AT BUFFER
052E 09                  DAD     B         ;   .
052F E5                  PUSH    H         ;SAVE BUFFER POINTER
0530 CD9D05              CALL    CKSUM     ;CHECKSUM MSG
0533 CDBA05              CALL    ENCOD     ;ENCODE CHKSUM
0536 7E                  MOV     A,M       ;GET WHAT SHOULD BE EM CHAR
0537 FE19                CPI     EM        ;ENSURE IT IS
0539 C29A05              JNZ     BADCK     ;   .
053C 3A0003              LDA     NOCHK     ;SHOULD WE VERIFY CKSM?
053F B7                  ORA     A         ;   .
0540 C25205              JNZ     CHEOT     ;JUMP IF NOT
0543 23                  INX     H         ;POINT AT 1ST CKS CHAR
0544 7E                  MOV     A,M       ;LOAD IT
0545 BA                  CMP     D         ;CHECK IT FOR VALIDITY
0546 C29A05              JNZ     BADCK     ;   .
0549 23                  INX     H         ;POINT AT 2ND CKS CHAR
054A 7E                  MOV     A,M       ;GET IT
054B BB                  CMP     E         ;CHECK IT FOR VALIDITY
054C C29A05              JNZ     BADCK     ;   .
054F C35405              JMP     EOTCH
0552 23         CHEOT:   INX     H         ;POINT OVER DUMMY CKSM
0553 23                  INX     H         ;   .
0554 23         EOTCH:   INX     H         ;POINT AT EOT CHAR
0555 7E                  MOV     A,M       ;GET IT
0556 FE04                CPI     EOT       ;ENSURE IT IS THE EOT
0558 C29A05              JNZ     BADCK     ;QUIT IF NOT
055B 11FCFF              LXI     D,STETX-STEND ;POINT AT ETX
055E 19                  DAD     D         ;   .
055F 7E                  MOV     A,M       ;GET WHAT SHOULD BE ETX
0560 FE03                CPI     ECHAR     ;ENSURE IT IS
0562 C29A05              JNZ     BADCK     ;QUIT IF NOT
0565 E1                  POP     H         ;POINT AT BUFFER AGAIN
0566 7E                  MOV     A,M       ;GET STX CHAR
0567 FE02                CPI     STX       ;ENSURE IT IS
0569 C29B05              JNZ     BADL      ;   .
056C 3A0003              LDA     NOCHK     ;SHOULD WE VERIFY LTH?
056F B7                  ORA     A         ;   .
0570 C29605              JNZ     PRET      ;QUIT IF NOT
0573 110100              LXI     D,SHLTH ;POINT AT LTH
0576 19                  DAD     D         ;   .
0577 78                  MOV     A,B       ;GET LTH FROM CKSUM
0578 CDBA05              CALL    ENCOD     ;ENCODE IT
```

```
057B 7E                 MOV    A,M      ;VERIFY IT
057C BA                 CMP    D        ;        .
057D C29B05             JNZ    BADL     ;        .
0580 23                 INX    H        ;        .
0581 7E                 MOV    A,M      ;        .
0582 BB                 CMP    E        ;        .
0583 C29B05             JNZ    BADL     ;        .
0586 79                 MOV    A,C      ;        .
0587 CDBA05             CALL   ENCOD    ;        .
058A 23                 INX    H        ;        .
058B 7E                 MOV    A,M      ;        .
058C BA                 CMP    D        ;        .
058D C29B05             JNZ    BADL     ;        .
0590 23                 INX    H        ;        .
0591 7E                 MOV    A,M      ;        .
0592 BB                 CMP    E        ;        .
0593 C29B05             JNZ    BADL     ;        .
0596 E1         PRET:   POP    H        ;RESTORE DSB PTR
0597 C30001             JMP    SRET

059A            BADCK   EQU    $        ;HERE IF MSG IS NO GOOD
059A E1                 POP    H        ;RESTORE BUFFER POINTER
059B E1         BADL:   POP    H        ;RESTORE DSB PTR
059C C9                 RET


                ;       SUBROUTINE CKSUM
                ;
                ;       THIS SUBROUTINE CHECKSUMS A MESSAGE AND ALSO
                ;       CALCULATES THE LENGTH.  ON ENTRY, HL POINTS
                ;       TO THE BUFFER.  ON EXIT, HL POINTS TO THE
                ;       <EM> CHARACTER (WHICH MUST BE PRESENT), BC
                ;       CONTAINS THE MESSAGE LENGTH (STARTING AT SHTXT
                ;       AND INCLUDING THE <ETX> AND <EM>), AND
                ;       A CONTAINS THE CHECKSUM (WHICH COVERS THE
                ;       SAME CHARACTERS AS THE COUNT)
                ;
059D            CKSUM   EQU    $
059D 010500             LXI    B,SHTXT  ;POINT HL AT TEXT
05A0 09                 DAD    B        ;        .
05A1 010100             LXI    B,1      ;BC WILL BE COUNT
05A4 1600               MVI    D,0      ;WILL BE CHECKSUM

05A6            CKSM    EQU    $        ;CHECKSUMMING LOOP
05A6 7E                 MOV    A,M      ;GET A CHAR
05A7 FE19               CPI    EM       ;IS IT END OF MSG?
05A9 CAB805             JZ     CHEND    ;JUMP IF SO
05AC FE04               CPI    EOT      ;ENSURE WE DON'T PASS EOT
05AE CAB805             JZ     CHEND    ;        .
05B1 23                 INX    H        ;BUMP POINTER
05B2 03                 INX    B        ;BUMP COUNT
05B3 82                 ADD    D        ;UPDATE CHECKSUM
05B4 57                 MOV    D,A      ;        .
05B5 C3A605             JMP    CKSM

05B8            CHEND   EQU    $        ;HERE WHEN CKSMNG ENDS
05B8 82                 ADD    D        ;ADD EM TO GET FINAL CKSM
05B9 C9                 RET


                ;       SUBROUTINE ENCOD
                ;
                ;       THIS SUBROUTINE ACCEPTS AN 8-BIT BYTE
                ;       IN A AND ENCODES IT INTO TWO ASCII
                ;       CHARACTERS REPRESENTING 0-F WITH 'A'-'P',
                ;       AND LEAVES THE TWO CHARACTERS IN D AND
                ;       E (HIGH-ORDER BITS IN D).
                ;
05BA            ENCOD   EQU    $
05BA 57                 MOV    D,A      ;SAVE A
05BB E60F               ANI    0FH      ;GET 4 BITS
05BD C641               ADI    'A'      ;MAKE ASCII
05BF 5F                 MOV    E,A      ;SAVE IN E
05C0 7A                 MOV    A,D      ;GET HIGH 4 BITS
```

```
05C1 0F               RRC               ;       .
05C2 0F               RRC               ;       .
05C3 0F               RRC               ;       .
05C4 0F               RRC               ;       .
05C5 E60F             ANI     0FH       ;       .
05C7 C641             ADI     'A'       ;MAKE ASCII
05C9 57               MOV     D,A       ;SAVE IN D
05CA C9               RET


                ;     SUBROUTINE ISACK
                ;
                ;     THIS SUBROUTINE CHECKS THE MESSAGE IN THE
                ;     DSB RECEIVER BUFFER TO SEE IF IT IS AN
                ;     "ACK" OR "NAK" MESSAGE.  IF SO, AND THE
                ;     TRANSMITTER WAS WAITING FOR AN ACKNOWLEDGEMENT,
                ;     APPROPRIATE ACTION IS TAKEN AND A NORMAL RETURN
                ;     IS TAKEN.  IF THE TRANSMITTER WAS NT WAITING
                ;     FOR AN "ACK", THE "ACK" OR "NAK" IS TURNED INTO
                ;     AN ERROR.  IF THE MESSAGE WAS NOT "ACK" OR "NAK"
                ;     AND THE XMITTER NEEDED ONE, IT IS ALSO THROWN AW
                ;     IN BOTH OF THESE CASES, A NORMAL RETURN IS
                ;     TAKEN.  FINALLY, IF THIS IS A NORMAL MESSAGE AND
                ;     THE XMITTER DOESN'T NEED AN ACK, WE TAKE A SKIP
                ;     RETURN.  WHEW!
                ;
                ;     AS USUAL, HL POINTS TO THE DSB AND ALL BUT HL AR
                ;     DESTROYED.
                ;
05CB            ISACK EQU     $
05CB E5               PUSH    H         ;SAVE DSB POINTER
05CC 011700           LXI     B,DRBUF+SHTXT ;POINT HL AT MSG BUF
05CF 09               DAD     B         ;       .
05D0 114F09           LXI     D,ACKMS+SHTXT ;POINT DE AT "ACK" MSG
05D3 1A         ACKC: LDAX    D         ;GET A CHAR FROM "ACK" MSG
05D4 BE               CMP     M         ;DOES IT MATCH MSG?
05D5 C2E205           JNZ     NOTAK     ;JUMP IF NOT
05D8 FE03             CPI     ECHAR     ;IS MSG DONE?
05DA CAEA05           JZ      ITSAK     ;JUMP IF SO
05DD 13               INX     D         ;TRY NEXT CHAR
05DE 23               INX     H         ;       .
05DF C3D305           JMP     ACKC      ;       .

05E2            NOTAK EQU     $         ;HERE IF NOT ACK
05E2 E1               POP     H         ;POINT AT DSB AGAIN
05E3 C30001           JMP     SRET

05E6            REJIT EQU     $         ;HERE TO REJECT A BAD MSG
05E6 CD0605           CALL    STRCV     ;RESET RCVR (IGNORE MSG)
05E9 C9               RET               ;AND DO FAILURE RETURN

05EA            ITSAK EQU     $         ;HERE IF IT IS "ACK"
05EA E1               POP     H         ;RESTOPE DSB PTR
                      XL      A,DXSTS   ;GET XMITTER STATUS
05EB E5               PUSH    H
05EC 010E00           LXI     B,DXSTS
05EF 09               DAD     B
05F0 7E               MOV     A,M
05F1 E1               POP     H
05F2 FE04             CPI     DSWAT     ;DOES XMTR WANT "ACK"?
05F4 CA1506           JZ      IDLIT     ;IF SO, IDLE XMTR
05F7 FE05             CPI     DSAGN     ;       .
05F9 CA1506           JZ      IDLIT     ;       .
05FC E5               PUSH    H         ;SAVE DSB PTR
05FD 010F00           LXI     B,DSNXT   ;POINT AT NEXT STS
0600 09               DAD     B         ;       .
0601 7E               MOV     A,M       ;GET NEXT STS
0602 FE04             CPI     DSWAT     ;WILL IT WANT ACK?
0604 CA0C06           JZ      IDLNXT    ;       .
0607 FE05             CPI     DSAGN     ;       .
0609 C21106           JNZ     REJ       ;       .
060C 3601       IDLNXT: MVI   M,DSIDL   ;SET NEXT STS TO IDLE
060E C3EA05           JMP     ITSAK     ;GO RE-CHECK MAIN STATUS
0611 E1         REJ:  POP     H         ;RESTORE DSB PTR
0612 C3E605           JMP     REJIT     ;GO JUNK MSG
```

```
                IDLIT:  XI      DXSTS,'MVI M,DSIDL' ;IDLE XMITTER
0615 E5                 PUSH    H
0616 010E00             LXI     B,DXSTS
0619 09                 DAD     B
061A 3601               MVI M,DSIDL
061C E1                 POP     H

061D C3E605             JMP     REJIT   ;GO RESET RCVR


                ;       SUBROUTINES SNDMS AND SNDM1
                ;
                ;       ON ENTRY TO SNDMS, DE POINTS TO THE TEXT OF
                ;       THE MESSAGE, HL POINTS TO THE DSB, THE XMTR
                ;       IS IN THE IDLE STATE
                ;
                ;       ON ENTRY TO SNDM1, HL POINTS TO THE DSB, THE
                ;       MESSAGE IS IN THE XMTR BUFFER.
                ;
                ;       ON EXIT FROM BOTH, TRANSMISSION (OR RETRANSMISSI
                ;       OF THE MESSAGE HAS BEGUN.  ALL REGISTERS EXCEPT
                ;       HL ARE DESTROYED.
                ;
0620 E5         SNDM1:  PUSH    H       ;SAVE DSB POINTER
0621 013504             LXI     B,DXBUF ;POINT DE AT BUFFER
0624 09                 DAD     B       ;       .
0625 EB                 XCHG            ;       .
0626 C35F06             JMP     SNDMA   ;AND ENTER COMMON CODE

0629            SNDMS   EQU     $       ;HERE TO SEND A MESSAGE
0629 E5                 PUSH    H       ;SAVE DSB POINTER
062A 013504             LXI     B,DXBUF ;CALCULATE BUFFER ADDR
062D 09                 DAD     B       ;       .
062E E5                 PUSH    H       ;SAVE BUFFER PTR
062F 3602               MVI     M,STX   ;INSERT <STX>
0631 010500             LXI     B,SHTXT ;POINT AT TXT AREA
0634 09                 DAD     B       ;       .
0635 CD2909             CALL    COPY    ;INSERT TEXT
0638 3619               MVI     M,EM    ;INSERT <EM> AFTER TEXT
063A E1                 POP     H       ;POINT AT BUFFER
063B E5                 PUSH    H       ;SAVE BUFFER POINTER
063C CD9D05             CALL    CKSUM   ;CALCULATE CHECKSUM
063F CDBA05             CALL    ENCOD   ;ENCODE CHECKSUM
0642 23                 INX     H       ;POINT AT CKSUM AREA
0643 72                 MOV     M,D     ;STORE CHECKSUM
0644 23                 INX     H       ;       .
0645 73                 MOV     M,E     ;       .
0646 23                 INX     H       ;POINT AT <EOT> PLACE
0647 3604               MVI     M,EOT   ;INSERT <EOT> AFTER CKSUM
0649 E1                 POP     H       ;POINT HL AT BUFFER
064A E5                 PUSH    H       ;SAVE BFR PTR
064B 110100             LXI     D,SHLTH ;POINT HL AT LTH AREA
064E 19                 DAD     D       ;       .
064F 78                 MOV     A,B     ;ENCODE AND STORE LTH
0650 CDBA05             CALL    ENCOD   ;       .
0653 72                 MOV     M,D     ;       .
0654 23                 INX     H       ;       .
0655 73                 MOV     M,E     ;       .
0656 23                 INX     H       ;       .
0657 79                 MOV     A,C     ;       .
0658 CDBA05             CALL    ENCOD   ;       .
065B 72                 MOV     M,D     ;       .
065C 23                 INX     H       ;       .
065D 73                 MOV     M,E     ;       .
065E D1                 POP     D       ;PUT BUFFER ADDR IN DE

065F            SNDMA   EQU     $       ;ENTER HERE IF MSG IS IN BUFFER
065F E1                 POP     H       ;PUT DSB PTR IN H,L
                        XS2     D,E,DXPTR ;SET MSG PTR
0660 E5                 PUSH    H
0661 010C00             LXI     B,DXPTR
0664 09                 DAD     B
0665 73                 MOV     M,E
0666 23                 INX     H
0667 72                 MOV     M,D
0668 E1                 POP     H
```

```
                          XI       DXSTS,'MVI M,DSMSG' ;SET PROPER STATUS
0669 E5                   PUSH     H
066A 010E00               LXI      B,DXSTS
066D 09                   DAD      B
066E 3603                 MVI M,DSMSG
0670 E1                   POP      H

                          XI       DSNXT,'MVI M,DSWAT' ;SET NEXT STATUS
0671 E5                   PUSH     H
0672 010F00               LXI      B,DSNXT
0675 09                   DAD      B
0676 3604                 MVI M,DSWAT
0678 E1                   POP      H

0679 CD7D06               CALL     XMTON    ;TURN ON XMTR
067C C9                   RET



                 ;        SUBROUTINE XMTON
                 ;
                 ;        ON ENTRY, HL POINTS TO A DSB.  THE XMTR
                 ;        FOR THAT DSB IS TURNED ON (I.E., THE
                 ;        XMIT ENABLE BIT OF THE 8251 IS SET).
                 ;
067D             XMTON    EQU      $
067D E5                   PUSH     H        ;GET STANDARD CMD BYTE
067E 010200               LXI      B,DCMD   ;        .
0681 09                   DAD      B        ;        .
0682 F3                   DI                ;        .
0683 7E                   MOV      A,M      ;        .
0684 F601                 ORI      CTIE     ;TURN ON XMIT INTERRUPTS
0686 77                   MOV      M,A      ;SAVE CMD
0687 E1                   POP      H        ;RESTORE DSB PTR
                          XL       C,DPRTC  ;GET CMD PORT NO.
0688 E5                   PUSH     H
0689 010300               LXI      B,DPRTC
068C 09                   DAD      B
068D 4E                   MOV      C,M
068E E1                   POP      H

068F 47                   MOV      B,A      ;SET UP FOR CALL
0690 CD0C42               CALL     OUTPUT   ;ENABLE XMTR INTERRUPTS
0693 FB                   EI                ;INTRPTS BACK ON
0694 C9                   RET



                 ;        8251 USART INTERRUPT SERVICE
                 ;
                 ;        THIS ROUTINE IS ENTERED WHENEVER AN INTERRUPT
                 ;        IS RECEIVED FROM ONE OF THE 8251 CHIPS CONNECTED
                 ;        TO THE MPU.  IT USES THE DSB'S TO POLL ALL THE 8
                 ;        SERVICING ANY THAT NEED IT.
                 ;
0695             IPT      EQU      $
0695                      ORG      10H      ;SET UP INTERRUPT VECTOR
0010 C39506               JMP      IPT      ;        .
0013                      ORG      18H      ;        .
0018 C39506               JMP      IPT      ;        .
001B                      ORG      IPT      ;        .
                          SAVE              ;SAVE REGISTERS
0695 F5                   PUSH     PSW
0696 C5                   PUSH     B
0697 D5                   PUSH     D
0698 E5                   PUSH     H

0699 2A0442               LHLD     FDSBA    ;POINT H AT 1ST DSB

                 SCAN:    XL       A,DPRTC  ;GET CMD PORT NUMBER
069C E5                   PUSH     H
069D 010300               LXI      B,DPRTC
06A0 09                   DAD      B
06A1 7E                   MOV      A,M
06A2 E1                   POP      H
```

```
06A3 CD0642           CALL   INPUT   ;READ STATUS BYTE
06A6 57               MOV    D,A     ;SAVE IT
06A7 E602             ANI    SRRDY   ;IS A CHARACTER COMING IN?
06A9 CA4F07           JZ     SCXMT   ;IF NOT, TRY XMSN
                      XL     A,DPRTI ;GET I/O PORT NUMBER
06AC E5               PUSH   H
06AD 010400           LXI    B,DPRTI
06B0 09               DAD    B
06B1 7E               MOV    A,M
06B2 E1               POP    H

06B3 CD0642           CALL   INPUT   ;READ THE CHARACTER
06B6 E67F             ANI    07FH    ;ENSURE PARITY IS REMOVED
06B8 5F               MOV    E,A     ;SAVE IT FOR A WHILE
06B9 FE16             CPI    SYN     ;ALWAYS IGNORE SYN'S
06BB CA4F07           JZ     SCXMT   ;         .
                      XL     A,DRSTS ;GET BUFFER STATUS
06BE E5               PUSH   H
06BF 010B00           LXI    B,DRSTS
06C2 09               DAD    B
06C3 7E               MOV    A,M
06C4 E1               POP    H

06C5 FE01             CPI    DSIDL   ;IDLE?
06C7 CAEE06           JZ     RIDLE   ;         .
06CA FE02             CPI    DSBSY   ;BUSY?
06CC CA0507           JZ     RBUSY   ;         .
06CF C3D706           JMP    NORST

06D2           IGNR   EQU    $       ;HERE TO IGNORE CHAR
06D2 D5               PUSH   D       ;SAVE 8251 STATUS
06D3 CD0605           CALL   STRCV   ;GO RESET RCVR
06D6 D1               POP    D       ;RESTORE 8251 STATUS
               NORST: XL     A,DCMD  ;GET LAST COMMAND
06D7 E5               PUSH   H
06D8 010200           LXI    B,DCMD
06DB 09               DAD    B
06DC 7E               MOV    A,M
06DD E1               POP    H

06DE F610             ORI    CERST   ;SET ERROR-RESET BIT
                      XL     C,DPRTC ;GET PORT NO.
06E0 E5               PUSH   H
06E1 010300           LXI    B,DPRTC
06E4 09               DAD    B
06E5 4E               MOV    C,M
06E6 E1               POP    H

06E7 47               MOV    B,A     ;SAVE CMD TO ISSUE
06E8 CD0C42           CALL   OUTPUT  ;RESET ERROR BITS
06EB C34F07           JMP    SCXMT   ;AND GO CHECK XMTR

06EE 7A        RIDLE: MOV    A,D     ;GET RCVR STATUS
06EF E638             ANI    SFRAM OR SOVRN OR SPARE ;CHECK ERRORS
06F1 C2D706           JNZ    NORST   ;AND IGNORE BAD CHAR
06F4 7B               MOV    A,E     ;GET CHAR WE READ
06F5 FE02             CPI    STX     ;IS IT A STX?
06F7 C2D706           JNZ    NORST   ;IF NOT, MSG IS GARBAGE
                      XI     DRSTS,'MVI M,DSBSY' ;SET BUSY
06FA E5               PUSH   H
06FB 010B00           LXI    B,DRSTS
06FE 09               DAD    B
06FF 3602             MVI M,DSBSY
0701 E1               POP    H

0702 C31E07           JMP    ROK     ;GO STORE CHAR

0705 7A        RBUSY: MOV    A,D     ;GET RCVR STATUS
0706 E638             ANI    SFRAM OR SOVRN OR SPARE ;CHECK ERRORS
0708 C2D206           JNZ    IGNR    ;IGNORE BAD CHAR
070B 7B               MOV    A,E     ;CHECK FOR STX
070C FE02             CPI    STX     ;         .
070E C21E07           JNZ    ROK     ;         .
0711 D5               PUSH   D       ;ON STX, START OVER
0712 CD0605           CALL   STRCV   ;         .
0715 D1               POP    D       ;         .
```

```
                          XI      DRSTS,'MVI M,DSBSY' ;SET BUSY
0716 E5                   PUSH    H
0717 010B00               LXI     B,DRSTS
071A 09                   DAD     B
071B 3602                 MVI M,DSBSY
071D E1                   POP     H

071E E5          ROK:     PUSH    H       ;SAVE DSB PTR
071F 010900               LXI     B,DRCNT ;POINT HL AT LOW BYTE OF COUNT
0722 09                   DAD     B       ;       .
0723 7E                   MOV     A,M     ;DECREMENT COUNT
0724 DE01                 SBI     1       ; (AND SET FLAGS INCL. CARRY)
0726 77                   MOV     M,A     ;       .
0727 D22F07               JNC     NODCR   ;JUMP IF NO CARRY NEEDED
072A 23                   INX     H       ;POINT HL AT HI BYTE
072B 7E                   MOV     A,M     ;DECREMENT HI BYTE
072C DE01                 SBI     1       ; (AGAIN, THE HARD WAY)
072E 77                   MOV     M,A     ;       .
072F E1          NODCR:   POP     H       ;RESTORE DSB PTR
0730 DAD206               JC      IGNR    ;JUMP IF TOO MANY CHARS
0733 E5                   PUSH    H       ;GET MSG PTR IN B,C
0734 010700               LXI     B,DRPTR ;       .
0737 09                   DAD     B       ;       .
0738 4E                   MOV     C,M     ;       .
0739 23                   INX     H       ;       .
073A 46                   MOV     B,M     ;       .
073B 7B                   MOV     A,E     ;GET CHAR IN A
073C 02                   STAX    B       ;SAVE CHAR
073D 03                   INX     B       ;BUMP PTR
073E 70                   MOV     M,B     ;AND SAVE IT
073F 2B                   DCX     H       ;       .
0740 71                   MOV     M,C     ;       .
0741 E1                   POP     H       ;       .
0742 FE04                 CPI     EOT     ;WAS IT END OF MSG CHAR?
0744 C24F07               JNZ     SCXMT   ;IF NOT, CHECK XMTR
                          XI      DRSTS,'MVI M,DSMSG' ;SET STATUS TO MSG P
0747 E5                   PUSH    H
0748 010B00               LXI     B,DRSTS
074B 09                   DAD     B
074C 3603                 MVI M,DSMSG
074E E1                   POP     H


                 ;        NOW TEST THE TRANSMITTER
074F             SCXMT    EQU     $
                          XL      A,DPRTC ;GET 8251 STATUS AGAIN
074F E5                   PUSH    H
0750 010300               LXI     B,DPRTC
0753 09                   DAD     B
0754 7E                   MOV     A,M
0755 E1                   POP     H

0756 CD0642               CALL    INPUT   ;       .
0759 57                   MOV     D,A     ;       .
075A E601                 ANI     STRDY   ;IS IT READY FOR A CHAR?
075C CAE207               JZ      SCNXT   ;JUMP IF NOT
                          XL      A,DXSTS ;CHECK STATUS
075F E5                   PUSH    H
0760 010E00               LXI     B,DXSTS
0763 09                   DAD     B
0764 7E                   MOV     A,M
0765 E1                   POP     H

0766 FE03                 CPI     DSMSG   ;IS MSG JUST STARTING?
0768 CA7307               JZ      XMSG    ;       .
076B FE02                 CPI     DSBSY   ;IS MSG IN PROGRESS?
076D CA7B07               JZ      XBUSY   ;       .
0770 C3A107               JMP     XEND    ;ELSE JUST OFF INTRPTS
                 XMSG:    XI      DXSTS,'MVI M,DSBSY' ;SET "BUSY" STATUS
0773 E5                   PUSH    H
0774 010E00               LXI     B,DXSTS
0777 09                   DAD     B
0778 3602                 MVI M,DSBSY
077A E1                   POP     H

077B E5          XBUSY:   PUSH    H       ;GET MSG PTR IN B,C
```

```
077C 010C00          LXI     B,DXPTR ;         .
077F 09              DAD     B       ;         .
0780 4E              MOV     C,M     ;         .
0781 23              INX     H       ;         .
0782 46              MOV     B,M     ;         .
0783 0A              LDAX    B       ;LOAD CHAR INTO A
0784 03              INX     B       ;BUMP PTR
0785 70              MOV     M,B     ;PUT PTR BACK IN DSB
0786 2B              DCX     H       ;         .
0787 71              MOV     M,C     ;         .
0788 E1              POP     H       ;         .
                     XL      C,DPRTI ;GET I/O PORT NO.
0789 E5              PUSH    H
078A 010400          LXI     B,DPRTI
078D 09              DAD     B
078E 4E              MOV     C,M
078F E1              POP     H

0790 47              MOV     B,A     ;SET UP FOR CALL
0791 CD0C42          CALL    OUTPUT  ;OUTPUT THE BYTE
0794 FE04            CPI     EOT     ;WAS IT AN EOT?
0796 C2E207          JNZ     SCNXT   ;JUMP IF NOT
                     XI      DXSTS,'MVI M,DSEND' ;IDLE XMTR
0799 E5              PUSH    H
079A 010E00          LXI     B,DXSTS
079D 09              DAD     B
079E 3606            MVI M,DSEND
07A0 E1              POP     H


07A1 7A       XEND:  MOV     A,D     ;GET XMTR STS AGAIN
07A2 E604            ANI     STEMP   ;IS LAST CHAR GONE?
07A4 CAE207          JZ      SCNXT   ;IF NOT SCAN OTHERS
07A7 E5              PUSH    H       ;SAVE DSB PTR
07A8 010200          LXI     B,DCMD  ;GET STANDARD COMMAND
07AB 09              DAD     B       ;         .
07AC 7E              MOV     A,M     ;         .
07AD E6FE            ANI     NOT CTIE ;TURN OFF XMIT INTERRUPTS
07AF 77              MOV     M,A     ;PUT CMD BACK
07B0 E1              POP     H       ;RESTORE DSB PTR
                     XL      C,DPRTC ;GET CMD PRT NO.
07B1 E5              PUSH    H
07B2 010300          LXI     B,DPRTC
07B5 09              DAD     B
07B6 4E              MOV     C,M
07B7 E1              POP     H

07B8 47              MOV     B,A     ;SET UP FOR CALL
07B9 CD0C42          CALL    OUTPUT  ;TURN OFF INTRPTS
                     XL      E,DSNXT ;GET NEXT STATUS
07BC E5              PUSH    H
07BD 010F00          LXI     B,DSNXT
07C0 09              DAD     B
07C1 5E              MOV     E,M
07C2 E1              POP     H

07C3 E5              PUSH    H       ;POINT AT CURRENT STS
07C4 010E00          LXI     B,DXSTS ;         .
07C7 09              DAD     B       ;         .
07C8 7E              MOV     A,M     ;GET IT
07C9 FE06            CPI     DSEND   ;IS IT TIME TO UPDATE?
07CB C2D507          JNZ     NOSET   ;         .
07CE 73              MOV     M,E     ;SET NEW NEXT STATUS
07CF 010300          LXI     B,DXTIM-DXSTS ;POINT AT TIMEOUT
07D2 09              DAD     B       ;         .
07D3 3619            MVI     M,TIMO  ;SET TIMEOUT
07D5 E1       NOSET: POP     H       ;RESTORE DSB PTR
                     XL      C,DPRTI ;FILL USART BFR WITH DUMMY
07D6 E5              PUSH    H
07D7 010400          LXI     B,DPRTI
07DA 09              DAD     B
07DB 4E              MOV     C,M
07DC E1              POP     H

07DD 0616            MVI     B,SYN   ;         .
07DF CD0C42          CALL    OUTPUT  ;         .
```

```
07E2 010500    SCNXT:  LXI     B,DNEXT ;GET PTR TO NEXT DSB
07E5 09                DAD     B       ;         .
07E6 7E                MOV     A,M     ;         .
07E7 23                INX     H       ;         .
07E8 66                MOV     H,M     ;         .
07E9 6F                MOV     L,A     ;         .
07EA B4                ORA     H       ;CHECK FOR PTR .EQ. ZERO
07EB C29C06            JNZ     SCAN    ;IF MORE DSB'S, GO SCAN THEM
07EE 3E18              MVI     A,OFPRI ;RESET PIC-8 TO ACCEPT
07F0 D3FE              OUT     PIC8    ; ALL INTERRUPTS
                       RESTR           ;OTHERWISE QUIT
07F2 E1                POP     H
07F3 D1                POP     D
07F4 C1                POP     B
07F5 F1                POP     PSW

07F6 FB                EI              ;         .
07F7 C9                RET             ;         .



               ;       CLOCK INTERRUPT SERVICE
               ;
               ;       THE DSB'S ARE SCANNED, AND ANY THAT
               ;       ARE IN STATE 'DSWAT' HAVE THEIR TIMEOUTS
               ;       DECREMENTED.
               ;
07F8           CLKI    EQU     $
07F8                   ORG     8H      ;SET UP VECTOR
0008 C3F807            JMP     CLKI    ;
000B                   ORG     CLKI
                       SAVE            ;SAVE REGISTERS
07F8 F5                PUSH    PSW
07F9 C5                PUSH    B
07FA D5                PUSH    D
07FB E5                PUSH    H

07FC 2A0442            LHLD    FDSBA   ;START WITH FIRST DSB

07FF           CLKL    EQU     $       ;CLOCK-SCAN LOOP
                       XL      A,DXSTS ;GET AN XMTR STATUS
07FF E5                PUSH    H
0800 010E00            LXI     B,DXSTS
0803 09                DAD     B
0804 7E                MOV     A,M
0805 E1                POP     H

0806 FE04              CPI     DSWAT   ;IS IT IN WAIT STATE?
0808 C21D08            JNZ     NCLK    ;         .
                       XI      DXTIM,'DCR M' ;IF SO, DECREMENT COUNT
080B E5                PUSH    H
080C 011100            LXI     B,DXTIM
080F 09                DAD     B
0810 35                DCR M
0811 E1                POP     H

0812 C21D08            JNZ     NCLK    ;JUMP IF NOT EXPIRED
                       XI      DXSTS,'MVI M,DSAGN' ;SET TO XMIT AGAIN
0815 E5                PUSH    H
0816 010E00            LXI     B,DXSTS
0819 09                DAD     B
081A 3605              MVI M,DSAGN
081C E1                POP     H

081D 010500    NCLK:   LXI     B,DNEXT ;TO NEXT DSB
0820 09                DAD     B       ;         .
0821 7E                MOV     A,M     ;         .
0822 23                INX     H       ;         .
0823 66                MOV     H,M     ;         .
0824 6F                MOV     L,A     ;         .
0825 B4                ORA     H       ;         .
0826 C2FF07            JNZ     CLKL    ;         .
0829 3E18              MVI     A,OFPRI ;RESET PIC8
082B D3FE              OUT     PIC8    ;         .
                       RESTR
082D E1                POP     H
```

```
082E D1                     POP     D
082F C1                     POP     B
0830 F1                     POP     PSW

0831 FB                     EI
0832 C9                     RET



                  ;         INITIALIZATION
                  ;
0833 F3           INIT:     DI                    ;NO INTRPTS TILL WE'RE READY
0834 310042                 LXI     SP,STACK ;SET UP STACK POINTER
0837 113C09                 LXI     D,INP    ;SET UP TO CREATE INPUT
083A 210642                 LXI     H,INPUT  ; AND OUTPUT ROUTINES
083D 060E                   MVI     B,OUTE-INP ;        .
083F CD2009                 CALL    MOVE     ;CREATE I/O ROUTINES

                  ;         INITIALIZE DSB'S
0842 21[illegible]42                 LXI     H,BRDS   ;CLEAR SIO-BOARDS TABLE
0845 0610                   MVI     B,16     ;        .
0847 3600         CLBRD:    MVI     M,0      ;        .
0849 23                     INX     H        ;        .
084A 05                     DCR     B        ;        .
084B C24708                 JNZ     CLBRD    ;        .
084E 212442                 LXI     H,DSB0   ;POINT AT 1ST DSB
0851 220442                 SHLD    FDSBA    ;SET UP LIST POINTER
0854 110103                 LXI     D,DSBS   ;POINT D,E AT DSB TABLE
0857 E5           INDSB:    PUSH    H        ;SAVE DSB POINTER
0858 0605                   MVI     B,DNEXT  ;PUT BYTE COUNT IN B
085A CD2009                 CALL    MOVE     ;COPY THE CONSTANT SECTION
085D E1                     POP     H        ;RESTORE DSB PTR (COPY HAS UPDAT
                                             ; THE DSB TABLE POINTER THE WAY
                                             ; WANT IT TO)
                            XI      DXSTS,'MVI M,DSIDL' ;SET UP XMTR
085E E5                     PUSH    H
085F 010E00                 LXI     B,DXSTS
0862 09                     DAD     B
0863 3601                   MVI M,DSIDL
0865 E1                     POP     H

                            XI      DSNXT,'MVI M,DSIDL' ;
0866 E5                     PUSH    H
0867 010F00                 LXI     B,DSNXT
086A 09                     DAD     B
086B 3601                   MVI M,DSIDL
086D E1                     POP     H

                            XI      DASND,'MVI M,0'
086E E5                     PUSH    H
086F 011000                 LXI     B,DASND
0872 09                     DAD     B
0873 3600                   MVI M,0
0875 E1                     POP     H

0876 D5                     PUSH    D        ;SAVE TABLE POINTER
0877 CD0605                 CALL    STRCV    ;SET UP RECEIVER
087A D1                     POP     D        ;RESTORE TABLE POINTER
087B 1A                     LDAX    D        ;GET TERMID OF NEXT DSB
087C B7                     ORA     A        ;IF ZERO, NO MORE DSB'S
087D CA9308                 JZ      LAST     ;        .
0880 D5                     PUSH    D        ;SAVE TABLE POINTER
0881 EB                     XCHG             ;CALC ADDR OF NEXT DSB
0882 215808                 LXI     H,DLTH   ;        .
0885 19                     DAD     D        ;        .
0886 EB                     XCHG             ;NXT ADDR TO DE, CURRENT TO HL
0887 010500                 LXI     B,DNEXT  ;SET UP NEXT-DSB PTR
088A 09                     DAD     B        ;        .
088B 73                     MOV     M,E      ;        .
088C 23                     INX     H        ;        .
088D 72                     MOV     M,D      ;        .
088E EB                     XCHG             ;POINT HL AT NEW DSB
088F D1                     POP     D        ;RESTORE TABLE POINTER
0890 C35708                 JMP     INDSB    ;GO INIT NEXT DSB

0893 010500       LAST:     LXI     B,DNEXT  ;CLEAR NEXT-DSB POINTER
```

```
0896 09                      DAD     B         ;      .
0897 3600                    MVI     M,0       ;      .
0899 23                      INX     H         ;      .
089A 3600                    MVI     M.0       ;      .

                     ;       FOR EACH DSB (DEVICE), DO THE OLD
                     ;       INITIALIZATION SEQUENCE
                     ;
089C 2A0442                  LHLD    FDSBA     ;POINT HL AT DSB
                     INDEV:  XL      C,DPRTC   ;GET PORT NO.
089F E5                      PUSH    H
08A0 010300                  LXI     B,DPRTC
08A3 09                      DAD     B
08A4 4E                      MOV     C,M
08A5 E1                      POP     H

08A6 06AA                    MVI     B,0AAH    ;GET DUMMY MODE WORD
08A8 CD0C42                  CALL    OUTPUT    ;      .
08AB 0640                    MVI     B,CRSET   ;GET "RESET" CMD WRD
08AD CD0C42                  CALL    OUTPUT    ;PUT IT OUT
08B0 51                      MOV     D,C       ;SAVE PORT NO.
                             XL      B,DMODE   ;GET TRUE MODE WORD
08B1 E5                      PUSH    H
08B2 010100                  LXI     B,DMODE
08B5 09                      DAD     B
08B6 46                      MOV     B,M
08B7 E1                      POP     H

08B8 4A                      MOV     C,D       ;RESTORE PORT NO.
08B9 CD0C42                  CALL    OUTPUT    ;PUT OUT TRUE MODE WORD
                             XL      B,DCMD    ;GET INTRPT-CNTRL CMD
08BC E5                      PUSH    H
08BD 010200                  LXI     B,DCMD
08C0 09                      DAD     B
08C1 46                      MOV     B,M
08C2 E1                      POP     H

08C3 4A                      MOV     C,D       ;RESTORE PORT NO.
08C4 CD0C42                  CALL    OUTPUT    ;TURN ON RCVR INTRPTS
08C7 7A                      MOV     A,D       ;GET PORT NO IN A
08C8 0F                      RRC               ;GET BOARD NO.
08C9 0F                      RRC               ;      .
08CA 0F                      RRC               ;      .
08CB 0F                      RRC               ;      .
08CC E60F                    ANI     0FH       ;      .
08CE 4F                      MOV     C,A       ;CALCULATE TABLE ENTRY
08CF 0600                    MVI     B,0       ;      .
08D1 E5                      PUSH    H         ;      .
08D2 211442                  LXI     H,BRDS    ;      .
08D5 09                      DAD     B         ;      .
08D6 7A                      MOV     A,D       ;GET PORT NO. AGAIN
08D7 E602                    ANI     2         ;IS THIS A-CHANNEL?
08D9 C2E108                  JNZ     ACH       ;JUMP IF SO
08DC 3E10                    MVI     A,10H     ;SET B-CHANNEL BIT
08DE C3E308                  JMP     BCH
08E1 3E01            ACH:    MVI     A,1       ;SET A-CHANNEL BIT
08E3 B6              BCH:    ORA     M         ;SET APPROPRIATE CHAN
08E4 77                      MOV     M,A       ;*INTERRUPT ENABLE
08E5 E1                      POP     H
08E6 010500                  LXI     B,DNEXT   ;GET NEXT-DSB PTR
08E9 09                      DAD     B         ;      .
08EA 7E                      MOV     A,M       ;      .
08EB 23                      INX     H         ;      .
08EC 66                      MOV     H,M       ;      .
08ED 6F                      MOV     L,A       ;      .
08EE B4                      ORA     H         ;CHECK PTR FOR ZERO
08EF C29F08                  JNZ     INDEV     ;IF MORE DSB'S, DO THEM

08F2                 WAIT    EQU     $         ;WAIT FOR BOXES TO BE SET UP
08F2 3AFFBF                  LDA     SYNL      ;GET SYNCH LOC.
08F5 B7                      ORA     A         ;TEST IT
08F6 C2F208                  JNZ     WAIT      ;WAIT TILL IT GOES ZERO
08F9 2AFDBF                  LHLD    SYNL-2    ;GET FIRST BOX ADDR
08FC 220042                  SHLD    BBOXA     ;SAVE IT
08FF 211442                  LXI     H,BRDS    ;NOW, ENABLE INTRPTS FOR
0902 0E08                    MVI     C,08H     ;*ALL SIO BRDS
```

```
0904 1610                MVI    D,16      ;         .
0906 7E         INBRD:   MOV    A,M       ;GET TBL ENTRY
0907 B7                  ORA    A         ;0=NO ENTRY HERE
0908 CA0F09              JZ     NBRD      ;*(I.E., NO SIO BRD)
090B 47                  MOV    B,A       ;SAVE ENABLE BITS
090C CD0C42              CALL   OUTPUT    ;SEND THEM TO BOARD
090F 23         NBRD:    INX    H         ;TO NEXT TBL ENTRY
0910 3E10                MVI    A,10H     ;TO NEXT SIO BRD
0912 81                  ADD    C         ;         .
0913 4F                  MOV    C,A       ;         .
0914 15                  DCR    D         ;COUNT BRDS AND LOOP
0915 C20609              JNZ    INBRD     ;         .
0918 3E18                MVI    A,OFPRI   ;ENABLE PIC-8 INTRPTS
091A D3FE                OUT    PIC8      ;         .
091C FB                  EI               ;NOW WE CAN ALLOW INTERRUPTS
091D C30004              JMP    EXEC      ;GO ENTER MAIN CODE


                ;        CORE MOVE ROUTINE
                ;
                ;        ON ENTRY, DE POINTS TO SOURCE AND HL POINTS
                ;        TO DEST.  B HAS BYTE COUNT.  ON EXIT, HL AND DE
                ;        POINT PAST THE COPY AREAS, AND B=0.
                ;
0920 1A         MOVE:    LDAX   D         ;GET A BYTE
0921 77                  MOV    M,A       ;STORE IT
0922 13                  INX    D         ;BUMP PTRS
0923 23                  INX    H         ;         .
0924 05                  DCR    B         ;COUNT THE BYTE
0925 C22009              JNZ    MOVE      ;LOOP IF MORE
0928 C9                  RET


                ;        STRING COPY ROUTINE
                ;
                ;        ON ENTRY, DE POINTS TO SOURCE AND HL POINTS TO
                ;        DEST.  SOURCE IS TERMINATED BY "ECHAR".  B
                ;        IS DESTROYED.
                ;
0929 011A04     COPY:    LXI    B,TXTL    ;PUT MAXIMUM LENGTH ON COPIES
092C 1A         COP:     LDAX   D         ;GET A CHAR
092D 77                  MOV    M,A       ;STORE IT
092E 23                  INX    H         ;BUMP PTRS
092F 13                  INX    D         ;         .
0930 0B                  DCX    B         ;COUNT CHAR
0931 FE03                CPI    ECHAR     ;TEST FOR END
0933 C8                  RZ               ;QUIT IF END
0934 78                  MOV    A,B       ;TEST MAXIMUM
0935 B1                  ORA    C         ;         .
0936 C22C09              JNZ    COP       ;JUMP IF MORE
0939 3603                MVI    M,ECHAR   ;INSERT FALSE ETX
093B C9                  RET


                ;        INPUT AND OUTPUT ROUTINES
                ;
093C 320A42     INP:     STA    INS1+1    ;STORE PORT NO. INTO INSTR
093F DB00                IN     0         ;READ THE DATA
0941 C9                  RET
0942 79         OUTP:    MOV    A,C       ;GET PORT NO. INTO A
0943 321242              STA    INS2+1    ;STORE IT INTO INSTR
0946 78                  MOV    A,B       ;GET BYTE INTO A
0947 D300                OUT    0         ;OUTPUT THE BYTE
0949 C9                  RET
094A            OUTE     EQU    $


                         DATA
094A 02414141   ACKMS:   DB     STX,'AAAC',ACK,ECHAR,EM,'CC',EOT
094E 44060319
0952 434304
0004            ACKL     EQU    4
0000                     END
```

```
;       S Y S T E M   S Y M B O L S / M A C R O S
;
;
;
;


;       BASIC SYSTEM MACROS

;       XL - INDEXED LOAD
;       USE AS FOLLOWS:
;       XL      REGISTER DISPLACEMENT
;       LOADS "REGISTER" FROM LOCATION (H,L)+DISPLACEMEN
;       DESTROYS B,C BEFORE LOADING
XL      MACRO   REG,DIS
        PUSH    H
        LXI     B.DIS
        DAD     B
        MOV     REG,M
        POP     H
        ENDM

;       XS - INDEXED STORE
;       USE LIKE XL
;       DESTROYS B,C BEFORE STORING
XS      MACRO   REG,DIS
        PUSH    H
        LXI     B,DIS
        DAD     B
        MOV     M,REG
        POP     H
        ENDM

;       XL2 - INDEXED 16-BIT LOAD
;
;       USE AS FOLLOWS:
;       XL2     RH,RL,DISP
;       LOADS "RL" FROM LOCATION (H.L)+"DISP"
;       AND "RH" FROM (H,L)+"DISP"+1
;       DESTROYS B,C BEFORE LOADING.
XL2     MACRO   RH,RL,DISP
        PUSH    H
        LXI     B,DISP
        DAD     B
        MOV     RL,M
        INX     H
        MOV     RH,M
        POP     H
        ENDM

;       XS2 - INDEXED 16-BIT STORE
;       USE LIKE XL2
;       DESTROYS B,C BEFORE STORING.
XS2     MACRO   RH,RL,DISP
        PUSH    H
        LXI     B,DISP
        DAD     B
        MOV     M,RL
        INX     H
        MOV     M.RH
        POP     H
        ENDM

;       SAVE - SAVE REGISTERS
;       SAVES ALL REGISTERS ON STACK.
SAVE    MACRO
        PUSH    PSW
        PUSH    B
        PUSH    D
        PUSH    H
        ENDM

;       RESTR - RESTORE REGISTERS
;       RESTORES ALL REGISTERS FROM STACK
RESTR   MACRO
        POP     H
```

```
                POP     D
                POP     B
                POP     PSW
                ENDM
        ;       XI - INDEXED INSTRUCTION
        ;       USE AS FOLLOWS:
        ;       XI      DISPL,'OP PARAMETERS'
        ;       ADDS "DISPL" TO H,L AND THEN EXPANDS "OP" WITH
        ;       PARAMETERS "PARAMETERS". FOR EXAMPLE, TO INCREM
        ;       LOCATION 1005H IF HL=1000H, DO
        ;       XI      5,'INR M'
        ;       DESTROYS B,C DURING CALCULATION.
        XI      MACRO   DIS,OP
                PUSH    H
                LXI     B,DIS
                DAD     B
                OP
                POP     H
                ENDM

        ;       SYSTEM SYMBOLS
        ;       (DELETE WHAT YOU DON'T NEED IF SYMBOL TBL OVERFL

        ;       LOW-CORE SUBROUTINE VECTORS
0100    SRET    EQU     0100H   ;JMP SRET TO DO SKIP-RETURN
0103    GBOXT   EQU     0103H   ;GET BOX TO LEVEL ABOVE
0106    GBOXB   EQU     0106H   ;GET BOX TO LEVEL BELOW
0109    RCVT    EQU     0109H   ;RCV FROM ABOVE
010C    RCVB    EQU     010CH   ;RCV FROM BELOW
010F    RIGNR   EQU     010FH   ;IGNORE THIS BOX & FIND ANOTHER
0112    SUBND   EQU     RIGNR+3 ;END OF SUBR VECTORS
0300    CONFG   EQU     0300H   ;ADDR OF CONFIGURATION PARAMS

        ;       RAM BLOCK ADDRESSES
4200    RAM     EQU     04200H  ;BEG. ADDR OF LOCAL RAM
4200    STACK   EQU     04200H  ;TOP+1 OF LOCAL STACK

        ;       LOCATIONS IN LOCAL RAM USED BY ALL ROUTINES
0000            ORG     RAM
4200    BBOXA:  DS      2       ;POINTER TO BOXES GOING DOWN
4202    TBOXA:  DS      2       ;POINTER TO BOXES GOING UP
4204    EGLOB   EQU     $       ;END OF GLOBAL RAM

        ;       MAILBOX FORMAT
041A    TXTL    EQU     1050    ;LENGTH OF MAILBOX TEXT
0000    MSTS    EQU     0       ;STATUS BYTE: SEE BELOW
0001    MNXT    EQU     MSTS+1  ;PTR TO NEXT MAILBOX
0003    MFLGA   EQU     MNXT+2  ;PTR TO CONTENTION FLG
0005    MID     EQU     MFLGA+2 ;MAILBOX ID
0006    MTEXT   EQU     MID+1   ;MAILBOX TEXT
0420    MLTH    EQU     MTEXT+TXTL ;TOTAL LTH OF MAILBOX
0003    ECHAR   EQU     03H     ;CHAR THAT FLAGS TEXT END
        ;       STATUS BYTE DEFINITIONS
0000    SFREE   EQU     0       ;MAILBOX FREE
0001    SBSYT   EQU     1       ;BUSY, IN USE FROM ABOVE
0002    SBSYB   EQU     2       ;BUSY, IN USE FROM BELOW
0003    SMSGT   EQU     3       ;MSG, BOTTOM TO TOP
0004    SMSGB   EQU     4       ;MSG, TOP TO BOTTOM

        ;       D A T A   B A S E   L E V E L
        ;
        ;
        ;

        ;       LOCAL EQUATES

        ;       DISK HARDWARE CHARACTERISTICS
032F    NTRK    EQU     815     ;NUMBER OF TRACKS
000C    NSEC    EQU     12      ;NO. OF SECTORS
0005    NHD     EQU     5       ;NO. OF HEADS
0400    SECSZ   EQU     1024    ;BYTES PER SECTOR
```

```
                 ;      MAILBOX COMMUNICATION LOCATIONS
0006             MDCTL  EQU     MTEXT   ;DISK CONTROL WORD
0007             MDMBX  EQU     MDCTL+1 ;MAILBOX POINTER
0009             MDDID  EQU     MDMBX+2 ;DISK ID NUMBER
000A             MDTID  EQU     MDDID+1 ;TRACK NUMBER
000C             MDHID  EQU     MDTID+2 ;HEAD NO.
000D             MDSID  EQU     MDHID+1 ;SECTOR NO.
000E             MDDAT  EQU     MDSID+1 ;OUTGOING DATA
0009             MDMSG  EQU     MDDID   ;LOC. OF MSG FROM DRIVER

                 ;      BITS IN MDCTL
0001             MDCWR  EQU     1       ;SET IF OPERATION IS A WRITE
0002             MDCIN  EQU     2       ;SET TO INITIALIZE A PACK
0080             MDCER  EQU     80H     ;SET IF ERROR OCCURRED IN DRVR

                 ;      ASCII CHARACTER EQUATES
0003             ETX    EQU     03H

                 ;      LOCAL RAM LOCATIONI (ORDER MUST MATCH
                 ;      MDDID, ETC.
4204                    ORG     EGLOB
4204             DID:   DS      1       ;DISK ID
4205             TID:   DS      2       ;TRACK
4207             HID:   DS      1       ;HEAD
4208             SID:   DS      1       ;SECTOR

                 ;      CONFIGURATION PARAMETERS
0300             MFLAG  EQU     CONFG   ;NONZERO IF MASTER PROCESSOR
0301             MXDSK  EQU     MFLAG+1 ;LARGEST DISK NO. IN SYSTEM



                 ;      DATA BASE LEVEL EXECUTIVE
                 ;
                 ;      THIS IS THE MAIN CONTROL ROUTINE FOR THE
                 ;      DBAS LEVEL.  IT IS ACTUALLY VERY SIMPLE:
                 ;      IT SCANS INCOMING MAILBOXES FROM THE COMM
                 ;      LEVEL FOR COMMANDS AND CALLS DOCMD TO DO
                 ;      THE COMMANDS, AND THEN SCANS INCOMING
                 ;      MAILBOXES FROM THE DRIVER LEVEL FOR
                 ;      COMPLETED DISK REQUESTS, CALLING DODSK TO
                 ;      PROCESS ANY THAT ARE FOUND.  THEN IT LOOPS
                 ;      BACK TO SCAN THE COMM LEVEL.
                 ;
4209                    ORG     400H
0400             EXEC   EQU     $       ;ENTER HERE AFTER INIT IS DONE
0400 CD0901             CALL    RCVT    ;GET A BOX FROM COMLVL
0403 C31704             JMP     NOASK   ;JUMP IF NO REQUESTS
0406 EB                 XCHG            ;PUT BOX ADDR IN DE
0407 CD0601             CALL    GBOXB   ;GET A BOX TO DSK LVL
040A C31404             JMP     NODSK   ;JUMP IF NONE THERE
040D EB                 XCHG            ;SET UP FOR DOCMD
040E CDB104             CALL    DOCMD   ;GO EXECUTE THE REQUEST
0411 C30004             JMP     EXEC    ;GO DO ANOTHER

0414             NODSK  EQU     $       ;HERE IF NO BOXES TO DSK
0414 EB                 XCHG            ;POINT HL AT UP BOX
0415 3604               MVI     M,SMSGB ;PUT BOX BACK IN QUEUE
                 ;                       (AND TRY TO FREE UP DSK BOXES)

0417             NOASK  EQU     $       ;HERE TO SCAN DSK LVL
0417 CD0C01             CALL    RCVB    ;GET A BOX
041A C30004             JMP     EXEC    ;IF NONE, TRY ABOVE
041D CD2304             CALL    DODSK   ;PROCESS DRIVER RSPNSE
0420 C31704             JMP     NOASK   ;GO DO NEXT DISK BOX


                 ;      SUBROUTINE DODSK
                 ;
                 ;      THIS SUBROUTINE IS PASSED A SINGLE PARAMETER
                 ;      IN HL, WHICH IS A POINTER TO A MAILBOX FROM
                 ;      THE DISK LEVEL.  IF THE BOX CONTAINS AN ERROR
                 ;      MESSAGE, THE MESSAGE IS PASSED TO THE USER
```

```
                ;       VIA A COMM LEVEL BOX.  OTHERWISE, A
                ;       SUCCESS RESPONSE IS RETURNED  ALONG
                ;       WITH THE DATA READ IF THE COMMAND WAS "GET".
                ;
                ;       ALL REGISTERS ARE DESTROYED.  ON EXIT, THE
                ;       DISK-LEVEL BOX HAS BEEN FREED AND THE ASSOCIATED
                ;       COMM-LEVEL BOX HAS BEEN MAILED.
                ;
0423            DODSK   EQU     $         ;HL->BOX
                        XL      A,MDCTL   ;GET CONTROL WORD
0423 E5                 PUSH    H
0424 010600             LXI     B,MDCTL
0427 09                 DAD     B
0428 7E                 MOV     A,M
0429 E1                 POP     H

042A 47                 MOV     B,A       ;COPY IT FOR A SEC
042B E680               ANI     MDCER     ;CHECK ERROR BIT
042D C28704             JNZ     DSKER     ;JUMP IF ERROR OCCURRED
0430 78                 MOV     A,B       ;GET CTL WD AGAIN
0431 E601               ANI     MDCWR     ;WAS THIS A PUT?
0433 C26304             JNZ     PUTOK     ;IF SO, RETURN OK RSPNSE
                        XL2     D,E,MDMBX ;GET COMLVL BOX ADDR
0436 E5                 PUSH    H
0437 010700             LXI     B,MDMBX
043A 09                 DAD     B
043B 5E                 MOV     E,M
043C 23                 INX     H
043D 56                 MOV     D,M
043E E1                 POP     H
043F E5                 PUSH    H         ;SAVE DSK BOX POINTER
0440 010900             LXI     B,MDMSG   ;POINT HL AT "GET" DATA
0443 09                 DAD     B         ;         .
0444 D5                 PUSH    D         ;SAVE COMLVL BOX PNTR
0445 EB                 XCHG              ;POINT HL AT COMLVL BOX
0446 010600             LXI     B,MTEXT   ;POINT HL AT COMM TEXT
0449 09                 DAD     B         ;         .
044A CD4207             CALL    SKCOM     ;SKIP TO COMMA AFTER ID
044D C34D04             JMP     $         ;         .
0450 23                 INX     H         ;POINT PAST IT
0451 362C               MVI     M,','     ;ADD TWO MORE COMMAS
0453 23                 INX     H         ;         .
0454 362C               MVI     M,','     ;         .
0456 23                 INX     H         ;POINT PAST 2ND COMMA
0457 0603               MVI     B ECHAR   ;END-OF-DATA FLAG
0459 CD1906             CALL    COPY      ;COPY SECTOR TO COMM. BOX
045C E1                 POP     H         ;POINT  HL AT COMLVL BOX
045D 3603               MVI     M,SMSGT   ;MAIL IT TO THE USER
045F E1                 POP     H         ;POINT HL AT DSKLVL BOX
0460 3600               MVI     M,SFREE   ;FREE IT FOR OTHER USES
0462 C9                 RET

0463            PUTOK   EQU     $         ;HERE IF A PUT WAS OK
                        XL2     D,E,MDMBX ;GET COMLVL BOX ADDR
0463 E5                 PUSH    H
0464 010700             LXI     B,MDMBX
0467 09                 DAD     B
0468 5E                 MOV     E,M
0469 23                 INX     H
046A 56                 MOV     D,M
046B E1                 POP     H

046C 3600               MVI     M,SFREE   ;FREE UP DSK BOX
046E EB                 XCHG              ;POINT HL AT COMM BOX
046F E5                 PUSH    H         ;SAVE BOX PTR
0470 010600             LXI     B,MTEXT   ;POINT HL AT TEXT AREA
0473 09                 DAD     B         ;         .
0474 CD4207             CALL    SKCOM     ;SKIP PAST ID
0477 C37704             JMP     $         ;         .
047A 23                 INX     H         ;POINT PAST COMMA
047B 11F908             LXI     D,OKMSG   ;COPY "OK" MSG AFTER TXT
047E 0603               MVI     B,ECHAR   ;         .
0480 CD1906             CALL    COPY      ;         .
0483 E1                 POP     H         ;POINT AT BOX STATUS
0484 3603               MVI     M,SMSGT   ;SEND BOX
0486 C9                 RET               ;AND QUIT
```

```
0487            DSKER   EQU     $         ;HERE ON ALL DISK ERRORS
                        XL2     D,E,MDMBX ;GET COMLVL BOX ADDR
0487 E5                 PUSH    H
0488 010700             LXI     B,MDMBX
048B 09                 DAD     B
048C 5E                 MOV     E,M
048D 23                 INX     H
048E 56                 MOV     D,M
048F E1                 POP     H

0490 E5                 PUSH    H         ;SAVE DSKLVL BOX POINTER
0491 010900             LXI     B MDMSG   ;POINT HL AT ERROR MSG
0494 09                 DAD     B         ;      .
0495 EB                 XCHG              ;DE->MSG, HL->COMM BOX
0496 E5                 PUSH    H         ;SAVE COMLVL BOX PTR
0497 010600             LXI     B,MTEXT   ;POINT HL AT TEXT
049A 09                 DAD     B         ;      .
049B CD4207             CALL    SKCOM     ;SKIP OVER ID
049E C39E04             JMP     $         ;      .
04A1 23                 INX     H         ;ADD A COMMA
04A2 362C               MVI     M,','     ;      .
04A4 23                 INX     H         ;POINT PAST COMMA
04A5 0603               MVI     B,ECHAR   ;COPY ERROR MESSAGE
04A7 CD1906             CALL    COPY      ;      .
04AA E1                 POP     H         ;POINT AT COMLVL BOX
04AB 3603               MVI     M,SMSGT   ;MAIL IT
04AD E1                 POP     H         ;POINT AT DSKLVL BOX
04AE 3600               MVI     M,SFREE   ;FREE IT UP
04B0 C9                 RET

                ;       SUBROUTINE DOCMD
                ;
                ;       THIS ROUTINE IS CALLED WITH HL POINTING TO
                ;       A COMLVL BOX WITH A COMMAND IN IT, AND DE
                ;       POINTING TO A DSKLVL BOX TO BE USED FOR THE
                ;       COMMAND'S EXECUTION.  THE COMMAND STPING IN
                ;       "MTEXT" OF THE COMLVL BOX IS COMPARED WITH
                ;       THE COMMAND STRINGS IN "CMDTB".  IF A MATCH
                ;       IS FOUND, THE APPROPRIATE COMMAND-PROCESSING
                ;       ROUTINE IS ENTERED AND THE COMMAND IS EXECUTED.
                ;       IF NO COMMAND MATCHES, OR IF THE
                ;       COMMAND PROCESSOR DETECTS ERRORS, THE DISK-LEVEL
                ;       BOX IS RE-FREED AND AN ERROR MESSAGE IS RETURNED
                ;       TO THE COMLVL FOR PASSING ON TO THE USER.
                ;
                ;       ON EXIT, ALL REGISTERS ARE DESTROYED, THE DISK-L
                ;       BOX HAS EITHER BEEN FREED OR PASSED ON
                ;       TO THE DISK, AND THE COMM-LEVEL BOX HAS EITHER
                ;       BEEN RETURNED WITH A N ERROR MESSAGE OR
                ;       SET UP WITH THE COMMAND ID FOR LATER USE BY
                ;       "DODSK".
                ;
                ;       SEE THE COMMENTS AT THE HEAD OF "CMDTB" FOR A
                ;       DESCRIPTION OF HOW THE COMMAND-SCANNING SECTION
                ;       OF "DOCMD" WORKS.
                ;
                ;       SEE THE INDIVIDUAL PROCESSING ROUTINES FOR
                ;       DESCRIPTIONS OF HOW INDIVIDUAL COMMANDS ARE
                ;       EXECUTED.
                ;
                ;       WARNING:  SUBROUTINE "TRADD" DOES NOT RETURN IF
                ;                 IT DETECTS ANY ERRORS.  THIS MEANS THAT
                ;                 IT CAN ONLY BE CALLED FROM A "DOCMD" PRO
                ;
04B1            DOCMD   EQU     $         ;SUBROUTINE TO DO A COMMAND
04B1 E5                 PUSH    H         ;SAVE COMLVL BOX ADDR
04B2 D5                 PUSH    D         ;SAVE DSKLVL BOX ADDR
04B3 010600             LXI     B,MTEXT   ;POINT HL AT CMD TEXT
04B6 09                 DAD     B         ;      .
04B7 110205             LXI     D,CMDTB   ;DE WILL POINT AT TST CMD

04BA            SRCHM   EQU     $         ;SEARCH FOR A MATCH
04BA 1A                 LDAX    D         ;TEST FOR TABLE TERMINATOR
04BB B7                 ORA     A         ;      .
04BC CAF304             JZ      NOCMD     ;IF TBL END, NO CMD MATCHES
04BF E5                 PUSH    H         ;SAVE CMD PTR IN CASE OF MISMATC
```

```
04C0           CMDT    EQU    $         ;TEST TBL ENTRY FOR MATCH
04C0 1A                LDAX   D         ;GET A CHAR FROM TBL
04C1 FE03              CPI    ETX       ;IS IT "ETX"?
04C3 CADF04            JZ     CMDH      ;IF SO, WE HAVE A HIT
04C6 BE                CMP    M         ;DOES IT MATCH CHAR IN STR?
04C7 C2CF04            JNZ    NOM       ;IF NOT, TRY NXT TBL ENTRY
04CA 13                INX    D         ;MATCH, TRY NXT CHAR
04CB 23                INX    H         ;         .
04CC C3C004            JMP    CMDT      ;         .

04CF           NOM     EQU    $         ;HERE IF CMD MISMATCH
04CF E1                POP    H         ;RESTORE CMD PTR
04D0 3E03              MVI    A,ETX     ;PUT TST CHR IN A
04D2 EB                XCHG             ;POINT HL INTO TBL

04D3           NCMD    EQU    $         ;FIND NEXT CMDTB ENTRY
04D3 23                INX    H         ;TO NXT CHAR IN TBL
04D4 BE                CMP    M         ;IS IT ETX? (END FLAG)
04D5 C2D304            JNZ    NCMD      ;LOOP IF NOT
04D8 23                INX    H         ;SKIP OVER ETX
04D9 23                INX    H         ;AND OVER CMD ROUTINE PTR
04DA 23                INX    H         ;         .
04DB EB                XCHG             ;RESTORE DE, HL
04DC C3BA04            JMP    SRCHM     ;TRY ANOTHER CMD

04DF           CMDH    EQU    $         ;HERE IF CMD HIT
04DF 7E                MOV    A,M       ;IT SHOULD BE BLANK
04E0 FE20              CPI    ' '       ;         .
04E2 C2EC04            JNZ    NOBLK     ;IF NOT, TRY ANOTHER TBL ENTRY
04E5 EB                XCHG             ;PUT TBL POINTER IN HL
04E6 23                INX    H         ;POINT AT ROUTINE ADDR
04E7 7E                MOV    A,M       ;GET LOW-ORDER BYTE
04E8 23                INX    H         ;POINT AT HIGH BYTE
04E9 66                MOV    H,M       ;GET IT INTO H
04EA 6F                MOV    L,A       ;PUT LOW BYTE INTO L
04EB E9                PCHL             ;ENTER CMD RTN (JMP, NOT CALL)

04EC           NOBLK   EQU    $         ;HERE IF EXPECTED BLK MISSING
04EC E1                POP    H         ;POINT AT CMD TXT AGAIN
04ED 13                INX    D         ;SKIP OVER "ETX" IN TBL
04EE 13                INX    D         ;SKIP OVER ROUTINE PTR
04EF 13                INX    D         ;
04F0 C3BA04            JMP    SRCHM     ;TRY ANOTHER COMMAND

04F3           NOCMD   EQU    $         ;HERE IF NO CMD MATCHES
04F3 114C08            LXI    D,ERR01   ;POINT AT ERROR MSG

               ;       CMDER
               ;
               ;       JUMP TO THIS LABEL IF A COMMAND ERROR IS DETECTE
               ;       ON ENTRY, DE->ERROR MSG, HL->PLACE IN BOX TO PUT
               ;       THE MSG, STACK TOP->DSKLVL BOX, AND NEXT-TO-TOP-
               ;       COMLVL MAILBOX.
               ;
               ;       THE MESSAGE IS PASSED TO THE COMLVL, THE DSKLVL
               ;       BOX IS FREED, AND "DOCMD" IS EXITED.
               ;
04F6           CMDER   EQU    $         ;HERE IF CMD IS IN ERROR
04F6 0603              MVI    B,ECHAR   ;COPY ERR MSG INTO BOX
04F8 CD1906            CALL   COPY      ;         .
04FB E1                POP    H         ;POINT AT DSK BOX
04FC 3600              MVI    M,SFREE   ;FREE IT UP
04FE E1                POP    H         ;POINT AT COMLVL BOX
04FF 3603              MVI    M,SMSGT   ;SEND MESSAGE TO THE USER
0501 C9                RET

               ;       CMDTB - COMMAND TABLE
               ;
               ;       THIS TABLE IS USED TO CONTROL PROCESSING IN "DOC
               ;       THE COMMAND-SEARCH SECTION OF "DOCMD" CHECKS ITS
               ;       INPUT STRING AGAINST EACH COMMAND IN "CMDTB".  I
               ;       A MATCH IS FOUND, THE ADDRESS OF THE ASSOCIATED
               ;       PROCESSING ROUTINE IS PICKED UP OUT OF THE TABLE
               ;       AND THE ROUTINE IS ENTERED.
               ;
```

```
                ;       ON ENTRY TO THE PROCESSING ROUTINE, DE POINTS
                ;       TO THE BLANK FOLLOWING THE COMMAND KEYWORD, THE
                ;       TOP ENTRY ON THE STACK POINTS TO THE START
                ;       OF THE COMMAND STRING, THE NEXT-TO-TOP STACK
                ;       ENTRY POINTS TO THE DSKLVL BOX, AND THE NEXT
                ;       STACK ENTRY POINTS TO THE COMLVL BOX.  THE
                ;       PROCESSING ROUTINE SHOULD EXIT WITH A "RET",
                ;       WHICH WILL RETURN TO "DOCMD"'S CALLER.
                ;
                ;       TABLE ENTRIES ARE OF THE FORM:
                ;       STRING,<ETX>,RTNL,RTNH
                ;       STRING  IS THE PROTOTYPE COMMAND STRING
                ;       <ETX>   IS AN ASCII "ETX" CHARACTER
                ;       RTNL,   ARE THE ADDRESS OF THE PROCESSING ROUTIN
                ;       RTNH
                ;
                ;       GENERATE TABLE ENTRIES WITH THE "CMD"
                ;       MACRO, AS FOLLOWS:
                ;       CMD     '''KEYWORD''',RTN
                ;       WHERE "KEYWORD" IS THE KEYWORD AND "RTN" IS THE
                ;       PROCESSING ROUTINE.
                ;
                CMD     MACRO   KW,RTN
                        DB      KW,ETX
                        DW      RTN
                        ENDM

0502            CMDTB   EQU     $         ;COMMAND TABLE
                        CMD     '''GET''',GET
0502 47455403           DB      'GET',ETX
0506 6905               DW      GET

                        CMD     '''PUT''',PUT
0508 50555403           DB      'PUT',ETX
050C 2405               DW      PUT

                        CMD     '''INITIALIZE''',INDSK
050E 494E4954           DB      'INITIALIZE',ETX
0512 49414C49
0516 5A4503
0519 9505               DW      INDSK

                        CMD     '''DEBUG''',DEBUG
051B 44454255           DB      'DEBUG',ETX
051F 4703
0521 E405               DW      DEBUG

0523 00                 DB      0         ;TABLE TERMINATOR


                ;       PROCESSING ROUTINE FOR THE "PUT" COMMAND
                ;
                ;       THIS ROUTINE CALLS "TRADD' TO CRACK THE
                ;       DISK-ADDRESS PARAMETERS, AND THEN SETS
                ;       UP A DISK BOX WITH THE DISK ADDRESS AND
                ;       WRITE REQUEST, COPIES THE DATA TO BE
                ;       WRITTEN INTO THE DISK BOX, MAILS THE BOX,
                ;       AND SETS UP THE COMM LEVEL BOX WITH THE
                ;       COMMAND ID IN PREPARATION FOR "DODSK".
                ;
0524            PUT     EQU     $
0524 EB                 XCHG              ;POINT HL AT PARAMETERS
0525 CD2206             CALL    TRADD     ;TRANSLATE DISK ADDR
                                          ; (DOESN'T RETURN ON ERRORS)
0528 CD4207             CALL    SKCOM     ;ENSURE A COMMA FOLLOWS ADDRS
052B C36305             JMP     BAD08     ;JUMP IF NOT
052E 23                 INX     H         ;POINT PAST COMMA TO DATA
052F E3                 XTHL              ;SAVE DATA PTR, POINT AT CMD
0530 CD2A07             CALL    COPID     ;COPY ID FIELD OF CMD
0533 D1                 POP     D         ;POINT DE AT "PUT" DATA
0534 E1                 POP     H         ;POINT HL AT DSK BOX
0535 E5                 PUSH    H         ;SAVE DSK BOX PTR
0536 010E00             LXI     B,MDDAT   ;POINT HL AT DATA AREA
0539 09                 DAD     B         ;
053A 0603               MVI     B,ECHAR   ;COPY DATA AREA
```

```
053C CD1906           CALL    COPY     ;
053F E1               POP     H        ;RESTO . DISK BOX PTR
0540 E5               PUSH    H        ;SAVE IT
0541 010900           LXI     B,MDDID  ;POINT HL AT DID AREA
0544 09               DAD     B        ;
0545 110442           LXI     D,DID    ;POIN.  . AT ID AREA
0548 0605             MVI     B,5      ;BYTE COUNT
054A CD1006           CALL    MOVE     ;MOVE THE DATA
054D E1               POP     H        ;POINT HL AT BOX
054E D1               POP     D        ;POINT DE AT COMLVL BOX
                      XS2     D,E,MDMBX ;PUT COMM BOX PTR IN DSK BOX
054F E5               PUSH    H
0550 010700           LXI     B,MDMBX
0553 09               DAD     B
0554 73               MOV     M,E
0555 23               INX     H
0556 72               MOV     M,D
0557 E1               POP     H

                      X1      MDCTL,'MVI M,MDCWR' ;SET CTL FOR WRITE
0558 E5               PUSH    H
0559 010600           LXI     B,MDCTL
055C 09               DAD     B
055D 3601             MVI M,MDCWR
055F E1               POP     H

0560 3604             MVI     M,SMSGB ;SEND BOX TO DRIVER
0562 C9               RET

0563          BAD08   EQU     $        ;HERE IF NO DATA TO BE PUT
0563 01E208           LXI     B,ERR08 ;MSG ADDR
0566 C38B06           JMP     ERPRO    ;GO HANDLE ERROR

              ;       PROCESSING ROUTINE FOR THE "GET" COMMAND
              ;
              ;       THIS ROUTINE CALLS "TRADD" TO CRACK THE
              ;       DISK-ADDRESS PARAMETERS, AND THEN SETS UP
              ;       A DISK BOX WITH THE DISK ADDRESS AND
              ;       A READ REQUEST, MAILS THE BOX, AND SETS
              ;       UP THE COMM LEVEL BOX WITH THE COMMAND ID
              ;       IN PREPARATION FOR "DODSK"
              ;
0569          GET     EQU     $

0569 EB               XCHG             ;POINT HL AT PARAMETERS
056A CD2206           CALL    TRADD    ;XLATE DSK ADDR
                                       ; (DOESN'T RETURN IF ERRORS)
056D E1               POP     H        ;POINT HL AT CMD
056E CD2A07           CALL    COPID    ;COPY ID FIELD OF CMD DOWN
0571 E1               POP     H        ;POINT HL AT DSK BOX
0572 E5               PUSH    H        ;SAVE DSK BOX PTR
0573 010900           LXI     B,MDDID  ;POINT HL AT DID AREA
0576 09               DAD     B        ;
0577 110442           LXI     D,DID    ;POINT DE AT CRACKED DATA
057A 0605             MVI     B,5      ;MOVE CRACKED DATA
057C CD1006           CALL    MOVE     ;
057F E1               POP     H        ;PO. . .L AT DSK BOX
0580 D1               POP     D        ;POINT DE AT COM BOX
                      XS2     D,E,MDMBX ;SAVE PTR TO CMD BOX
0581 E5               PUSH    H
0582 010700           LXI     B,MDMBX
0585 09               DAD     B
0586 73               MOV     M,E
0587 23               INX     H
0588 72               MOV     M,D
0589 E1               POP     H

                      X1      MDCTL,'MVI M,0' ;SET CTL FOR READ
058A E5               PUSH    H
058B 010600           LXI     B,MDCTL
058E 09               DAD     B
058F 3600             MVI M,0
0591 E1               POP     H

0592 3604             MVI     M,SMSGB ;SEND BOX TO DSK DRIVER
0594 C9               RET
```

```
                 ;       PROCESSING ROUTINE FOR THE "INITIALIZE"
                 ;       COMMAND
                 ;
                 ;       THIS ROUTINE CRACKS THE DISK NUMBER AND
                 ;       THEN MAILS A DISK BOX WITH THE INITIALIZE
                 ;       REQUEST IN IT.
                 ;
0595             INDSK   EQU     $
0595 EB                  XCHG            ;POINT HL AT PARAMETERS
0596 CD4207              CALL    SKCOM   ;SKIP TO COMMA AFTER ID
0599 C3D705              JMP     BD02    ;ERROR 202 IF NONE
059C 23                  INX     H       ;POINT OVER IT
059D CD5C07              CALL    HEXNO   ;XLATE DISK NO.
05A0 C3DE05              JMP     BD03    ;ERROR 203 IF NO GOOD
05A3 78                  MOV     A,B     ;VERIFY DISK NO.
05A4 B7                  ORA     A       ;       .
05A5 C2DE05              JNZ     BD03    ;       .
05A8 3A0103              LDA     MXDSK   ;       .
05AB B9                  CMP     C       ;       .
05AC DADE05              JC      BD03    ;       .
05AF 79                  MOV     A,C     ;SAVE DISK NO.
05B0 320442              STA     DID     ;       .
05B3 E1                  POP     H       ;POINT HL AT CMD
05B4 CD2A07              CALL    COPID   ;PREPARE FOR RESPONSE
05B7 E1                  POP     H       ;POINT HL AT DSK BOX
05B8 3A0442              LDA     DID     ;GET DISK NO.
                         XS      A,MDDID ;SET DISK ID
05BB E5                  PUSH    H
05BC 010900              LXI     B,MDDID
05BF 09                  DAD     B
05C0 77                  MOV     M,A
05C1 E1                  POP     H

05C2 D1                  POP     D       ;GET COMM BOX PNTR
                         XS2     D,E,MDMBX ;PUT IN DISK BOX
05C3 E5                  PUSH    H
05C4 010700              LXI     B,MDMBX
05C7 09                  DAD     B
05C8 73                  MOV     M,E
05C9 23                  INX     H
05CA 72                  MOV     M,D
05CB E1                  POP     H

                         XI      MDCTL,'MVI M,MDCWR OR MDCIN'
05CC E5                  PUSH    H
05CD 010600              LXI     B,MDCTL
05D0 09                  DAD     B
05D1 3603                MVI M,MDCWR OR MDCIN
05D3 E1                  POP     H

05D4 3604                MVI     M,SMSGB ;MAIL DISK BOX
05D6 C9                  RET
05D7 E1          BD02:   POP     H       ;ERROR 202
05D8 115B08              LXI     D,ERR02 ;
05DB C3F604              JMP     CMDER
05DE 017108      BD03:   LXI     B,ERR03 ;ERROR 203
05E1 C38B06              JMP     ERPRO


                 ;       PROCESSING ROUTINE FOR THE "DEBUG" COMMAND
                 ;
                 ;       FIRST THIS ROUTINE VERIFIES THAT
                 ;       THE COMMAND-ID FIELD MATCHES THE STRING
                 ;       IN "PW" (THE PASSWORD).  IF IT DOES NOT, AN
                 ;       "UNKNOWN COMMAND" ERROR IS GENERATED.
                 ;
05E4             DEBUG   EQU     $
05E4 EB                  XCHG            ;POINT HL AT ID FIELD
05E5 23                  INX     H       ;POINT PAST BLANK
05E6 110506              LXI     D,PW    ;POINT DE AT PASSWORD

05E9             DBGC    EQU     $       ;COMPARE TWO CHARS
05E9 1A                  LDAX    D       ;GET CHR FROM PSWD
05EA FE03                CPI     ETX     ;IS IT <ETX>?
05EC CAFC05              JZ      DBGH    ;IF SO, PSWD IS OK
```

```
05EF BE                CMP    M         ;DOES IT MATCH ID FLD?
05F0 C2F805            JNZ    DBGN      ;JUMP IF NOT
05F3 23                INX    H         ;TRY NEXT CHAR
05F4 13                INX    D         ;        .
05F5 C3E905            JMP    DBGC      ;        .

05F8          DBGN     EQU    $         ;HERE IF PSWD MISMATCHES
05F8 E1                POP    H         ;POINT HL AT TEXT AREA
05F9 C3F304            JMP    NOCMD     ;PRETEND NO CMD FOUND

05FC          DBGH     EQU    $         ;PSWD MATCHES, DO CMD
05FC E1                POP    H         ;POINT HL AT TEXT AREA
05FD E1                POP    H         ;POINT HL AT DSK BOX
05FE 3600              MVI    M,SFREE   ;FREE IT UP
0600 E1                POP    H         ;POINT HL AT COMLVL BOX
0601 3600              MVI    M,SFREE   ;FREE IT UP
0603 FF                RST    7         ;START UP DEBUGGER
0604          DBRET    EQU    $
0604                   ORG    38        ;IN CASE DEBUGGER ISN'T THERE
0026 C9                RET
0027                   ORG    DBRET
0604 C9                RET

0605 4D594352 PW:      DB     'MYCROFTXXX',ETX
0609 4F465458
060D 585803



              ;        SUBROUTINE MOVE
              ;
              ;        THIS SUBROUTINE MOVES UP TO 256 BYTES
              ;        OF RAM.  IF THE AREAS OVERLAP, THE SOURCE
              ;        AREA SHOULD BE HIGHER (UNLESS A "FILL"
              ;        EFFECT IS DESIRED)
              ;
              ;        ON ENTRY, DE->SOURCE, HL->DEST, B=BYTE COUNT.
              ;
              ;        ON EXIT, DE=DE(ENTRY)+B(ENTRY), HL=
              ;        HL(ENTRY)+B(ENTRY), B=0, A=LAST DATA,
              ;        AND FLAGS ARE DESTROYED.
              ;
0610          MOVE     EQU    $         ;MOVE MEMORY
0610 1A                LDAX   D         ;GET A BYTE
0611 77                MOV    M,A       ;STORE IT
0612 13                INX    D         ;MOVE TO NEXT BYTE
0613 23                INX    H         ;
0614 05                DCR    B         ;COUNT CHAR
0615 C21006            JNZ    MOVE      ;BACK FOR MORE
0618 C9                RET



              ;        SUBROUTINE COPY
              ;
              ;        THIS SUBROUTINE COPIES RAM UNTIL A SPECIFIC
              ;        CHARACTER IS FOUND.  IF THE AREAS OVERLAP,
              ;        THE SOURCE AREA MUST BE HIGHER OR ALL MEMORY
              ;        MAY BE CLOBBERED.
              ;
              ;        ON ENTRY, DE->SOURCE, HL->DEST, B=FLAG CHAR.
              ;
              ;        ON EXIT, A=FLAG CHAR. DE AND HL POINT JUST PAST
              ;        THE FLAG CHARACTER IN THE SOURCE AND DEST AREAS,
              ;        AND ALL FLAGS ARE DESTROYED.  NOTE THAT THE
              ;        FLAG CHARACTER IS COPIED.
              ;
0619          COPY     EQU    $         ;COPY MEMORY
0619 1A                LDAX   D         ;GET A BYTE
061A 77                MOV    M,A       ;STORE IT
061B 13                INX    D         ;MOVE TO NEXT BYTE
061C 23                INX    H         ;        .
061D B8                CMP    B         ;CHECK FOR END FLAG
061E C21906            JNZ    COPY      ;IF NOT END, LOOP
0621 C9                RET
```

```
                ;       SUBROUTINE TRADD
                ;
                ;       THIS SUBROUTINE TRANSLATES THE DISK-ADDRESS
                ;       PARAMETERS IN THE COMLVL MAILBOX.  IF ANY
                ;       ERRORS ARE DETECTED, TRADD DOES NOT RETURN
                ;       TO THE CALLER.  INSTEAD, IT POPS ITS OWN
                ;       RETURN ADDRESS OFF THE STACK AND THEN JUMPS
                ;       TO THE "CMDER" ROUTINE TO PASS THE ERROR
                ;       MESSAGE BACK TO THE USER.
                ;
                ;       ON ENTRY, HL->THE BLANK JUST AFTER THE CMD
                ;       KEYWORD.
                ;
                ;       ON EXIT, THE DISK-ADDRESS PARAMETERS ARE IN
                ;       DID, ETC., AND HL->THE COMMA FOLLOWING THE LAST
                ;       PARAMETER.  ALL OTHER REGISTERS ARE DESTROYED.
                ;
                ;       THE SECTOR NUMBER (0-3CH) IS TRANSLATED
                ;       INTO A HEAD NUMBER (0-5) AND A TRUE SECTOR
                ;       NUMBER (0-0BH) BY LOOKING IT UP IN "SECTB".
                ;
0622            TRADD   EQU     $
0622 CD4207             CALL    SKCOM   ;SKIP TO COMMA FOLLOWING ID
0625 C38206             JMP     BAD02   ;ERROR 02 IF NONE
0628 23                 INX     H       ;POINT OVER COMMA
0629 CD5C07             CALL    HEXNO   ;XLATE DISK NO.
062C C39406             JMP     BAD03   ;ERROR 03 IF IT IS BAD
062F 78                 MOV     A,B     ;PUT HIGH BYTE IN ACC
0630 B7                 ORA     A       ;TEST IT
0631 C29406             JNZ     BAD03   ;ERROR 03 IF IT'S NOT ZERO
0634 3A0103             LDA     MXDSK   ;ENSURE LOW BYTE IS IN RANGE
0637 B9                 CMP     C       ;       .
0638 DA9406             JC      BAD03   ;       .
063B 79                 MOV     A,C     ;PUT LOW BYTE IN "DID"
063C 320442             STA     DID     ;       .

063F CD4207             CALL    SKCOM   ;MOVE TO NEXT COMMA
0642 C39A06             JMP     BAD04   ;ERROR 04 IF NONE
0645 23                 INX     H       ;SKIP IT
0646 CD5C07             CALL    HEXNO   ;XLATE TRACK NO.
0649 C3A006             JMP     BAD05   ;ERROR 05 IF BAD
064C 78                 MOV     A,B     ;LOOK AT HI BYTE OF TRACK NO.
064D FE04               CPI     (NTRK SHR 8)+1 ;MAKE LOOSE TEST ON IT
064F D2A006             JNC     BAD05   ;ERROR 05 IF WAY TOO BIG
0652 320642             STA     TID+1   ;SAVE TRACK ID
0655 79                 MOV     A,C     ;       .
0656 320542             STA     TID     ;       .

0659 CD4207             CALL    SKCOM   ;MOVE TO NEXT COMMA
065C C3A606             JMP     BAD06   ;ERROR 06 IF NONE
065F 23                 INX     H       ;SKIP OVER IT
0660 CD5C07             CALL    HEXNO   ;GET HEAD/SECTOR NO.
0663 C3AC06             JMP     BAD07   ;ERROR 07 IF NO GOOD
0666 78                 MOV     A,B     ;HIGH BYTE MUST BE 0
0667 B7                 ORA     A       ;       .
0668 C2AC06             JNZ     BAD07   ;       .
066B 79                 MOV     A,C     ;ENSURE LOW BYTE .LE. 59
066C FE3C               CPI     NSEC*NHD ;      .
066E D2AC06             JNC     BAD07   ;       .
0671 E5                 PUSH    H       ;SAVE HL
0672 21B206             LXI     H,SECTB ;POINT HL AT SECTOR TBL
0675 09                 DAD     B       ;ADD IN 2*HD\SEC NO.
0676 09                 DAD     B       ;       .
0677 7E                 MOV     A,M     ;GET HEAD NO. FROM TBL
0678 320742             STA     HID     ;SAVE IT
067B 23                 INX     H       ;POINT AT SECTOR NO.
067C 7E                 MOV     A,M     ;LOAD IT
067D 320842             STA     SID     ;SAVE IT
0680 E1                 POP     H       ;RESTORE HL
0681 C9                 RET


                ;       ERROR PROCESSING
                ;
                ;       MOST COMMAND ERRORS ENTER AT "ERPRO" WITH
```

```
                    ;        THE ERROR MESSAGE ADDRESS IN B.  THE
                    ;        ID IS COPIED DOWN AND THE THE MESSAGE
                    ;        IS PLACED IN THE MAILBOX AFTER THE ID.
                    ;
0682                BAD02    EQU      $         ;HERE IF NO DISKID
0682 115B08                  LXI      D,ERR02   ;POINT D AT ERROR MSG
0685 E1                      POP      H         ;POP RTN ADDR OFF STACK
0686 E1                      POP      H         ;POINT HL AT TEXT AREA
0687 C3F604                  JMP      CMDER     ;GO PUT MSG IN BOX

068A                TRERR    EQU      $         ;HERE ON "TRADD" ERRORS
068A E1                      POP      H         ;POP RTN ADDR OFF STACK

068B                ERPRO    EQU      $         ;HERE ON OTHER ERRORS AFTER
                                                ; ID HAS BEEN FOUND
068B E1                      POP      H         ;POINT HL AT CMD TEXT
068C C5                      PUSH     B         ;SAVE ERROR MSG ADDR
068D CD2A07                  CALL     COPID     ;COPY ID FIELD INTO RESPONSE
0690 D1                      POP      D         ;POINT DE AT ERROR TEXT
0691 C3F604                  JMP      CMDER     ;AND GO FINISH ERROR OFF

0694                BAD03    EQU      $         ;HERE IF BAD DISK ID
0694 017108                  LXI      B,ERR03
0697 C38A06                  JMP      TRERR

069A                BAD04    EQU      $         ;HERE IF TRACK ID MISSING
069A 018608                  LXI      B,ERR04
069D C38A06                  JMP      TRERR

06A0                BAD05    EQU      $         ;HERE IF TRACK ID BAD
06A0 019C08                  LXI      B,ERR05
06A3 C38A06                  JMP      TRERR

06A6                BAD06    EQU      $         ;HERE IF SECTOR ID MISSING
06A6 01B208                  LXI      B,ERR06
06A9 C38A06                  JMP      TRERR

06AC                BAD07    EQU      $         ;HERE IF SECTOR ID BAD
06AC 01CA08                  LXI      B,ERR07
06AF C38A06                  JMP      TRERR


                    ;        HEAD/SECTOR TRANSLATION TABLE
                    ;
                    ;        THERE ARE 60 ENTRIES OF TWO BYTES EACH,
                    ;        ADDRESSED BY INDEXING WITH THE SECTOR
                    ;        NUMBER, 0-60.  THE FIRST BYTE OF THE ENTRY
                    ;        IS THE HEAD NO., THE SECOND IS THE TRUE
                    ;        SECTOR NUMBER.
                    ;
06B2                SECTB    EQU      $
06B2 0000                    DB       0,0       ;0
06B4 0001                    DB       0,1       ;1
06B6 0002                    DB       0,2       ;2
06B8 0003                    DB       0,3       ;3
06BA 0004                    DB       0,4       ;4
06BC 0005                    DB       0,5       ;5
06BE 0006                    DB       0,6       ;6
06C0 0007                    DB       0,7       ;7
06C2 0008                    DB       0,8       ;8
06C4 0009                    DB       0,9       ;9
06C6 000A                    DB       0,10      ;10
06C8 000B                    DB       0,11      ;11
06CA 0100                    DB       1,0       ;12
06CC 0101                    DB       1,1       ;13
06CE 0102                    DB       1,2       ;14
06D0 0103                    DB       1,3       ;15
06D2 0104                    DB       1,4       ;16
06D4 0105                    DB       1,5       ;17
06D6 0106                    DB       1,6       ;18
06D8 0107                    DB       1,7       ;19
06DA 0108                    DB       1,8       ;20
06DC 0109                    DB       1,9       ;21
06DE 010A                    DB       1,10      ;22
06E0 010B                    DB       1,11      ;23
```

```
06E2 0200           DB      2,0     ;24
06E4 0201           DB      2,1     ;25
06E6 0202           DB      2,2     ;26
06E8 0203           DB      2,3     ;27
06EA 0204           DB      2,4     ;28
06EC 0205           DB      2,5     ;29
06EE 0206           DB      2,6     ;30
06F0 0207           DB      2,7     ;31
06F2 0208           DB      2,8     ;32
06F4 0209           DB      2,9     ;33
06F6 020A           DB      2,10    ;34
06F8 020B           DB      2,11    ;35
06FA 0300           DB      3,0     ;36
06FC 0301           DB      3,1     ;37
06FE 0302           DB      3,2     ;38
0700 0303           DB      3,3     ;39
0702 0304           DB      3,4     ;40
0704 0305           DB      3,5     ;41
0706 0306           DB      3,6     ;42
0708 0307           DB      3,7     ;43
070A 0308           DB      3,8     ;44
070C 0309           DB      3,9     ;45
070E 030A           DB      3,10    ;46
0710 030B           DB      3,11    ;47
0712 0400           DB      4,0     ;48
0714 0401           DB      4,1     ;49
0716 0402           DB      4,2     ;50
0718 0403           DB      4,3     ;51
071A 0404           DB      4,4     ;52
071C 0405           DB      4,5     ;53
071E 0406           DB      4,6     ;54
0720 0407           DB      4,7     ;55
0722 0408           DB      4,8     ;56
0724 0409           DB      4,9     ;57
0726 040A           DB      4,10    ;58
0728 040B           DB      4,11    ;59!

                ;       SUBROUTINE COPID
                ;
                ;       THIS SUBROUTINE COPIES THE ID FIELD OF A
                ;       COMMAND IN A COMLVL BOX DOWN TO THE BEGINNING
                ;       OF THE TEXT AREA OF THAT BOX.  THIS PREPARES
                ;       THE BOX TO RECEIVE AN ANSWER TO THE
                ;       COMMAND.
                ;
                ;       ON ENTRY, HL->MTEXT AREA OF THE BOX.
                ;
                ;       ON EXIT, ALL REGISTERS DESTROYED.
                ;
072A            COPID   EQU     $
072A 54                 MOV     D,H     ;COPY POINTER TO TEXT AREA
072B 5D                 MOV     E,L     ;
072C            SCBLK   EQU     $       ;SCAN FOR A BLANK
072C 7E                 MOV     A,M     ;GET A CHAR
072D 23                 INX     H       ;POINT PAST IT
072E FE20               CPI     ' '     ;IS IT A BLANK?
0730 C22C07             JNZ     SCBLK   ;IF NOT, TRY NEXT

0733            SCPST   EQU     $       ;SCAN PAST BLANKS
0733 BE                 CMP     M       ;IS CURRENT CHAR BLANK?
0734 C23B07             JNZ     COPI    ;IF NOT, COPY ID
0737 23                 INX     H       ;TRY NEXT CHAR
0738 C33307             JMP     SCPST   ;

073B            COPI    EQU     $       ;COPY ID FIELD
073B EB                 XCHG            ;DE->ID FLG, HL->MTEXT
073C 062C               MVI     B,','   ;TERMINATE COPY ON COMMA
073E CD1906             CALL    COPY    ;GO COPY THE ID FLD
0741 C9                 RET


                ;       SUBROUTINE SKCOM
                ;
                ;       THIS SUBROUTINE SKIPS TO THE NEXT COMMA
```

```
                ;         IN THE COMMAND.
                ;
                ;         ON ENTRY, HL->SOMEWHERE IN THE COMMAND
                ;         TEXT (POSSIBLY A COMMA).
                ;
                ;         ON NORMAL (FAIL) RETURN, HL->ETX
                ;         CHAR AT END OF COMMAND (NO COMMA FOUND).
                ;
                ;         ON SKIP (SUCCESS) RETURN, HL->THE NEXT
                ;         COMMA FOUND.
                ;
                ;         DESTROYS A AND FLAGS
                ;
0742            SKCOM     EQU     $
0742 7E                   MOV     A,M      ;GET A CHAR
0743 FE2C                 CPI     ','      ;IS IT A COMMA?
0745 CA0001               JZ      SRET     ;IF SO, SUCCESS
0748 FE03                 CPI     ECHAR    ;IS IT END OF DATA?
074A C8                   RZ               ;FAIL IF SO
074B 23                   INX     H        ;TRY NEXT CHAR
074C C34207               JMP     SKCOM    ;



                ;         SUBROUTINE NXTCH
                ;
                ;         THIS SUBROUTINE RETURNS THE NEXT NON-BLANK
                ;         CHARACTER IN THE COMMAND STRING.  IF
                ;         THE END FLAG (ETX) IS HIT, A FAILURE
                ;         RETURN IS TAKEN.
                ;
                ;         ON ENTRY, HL->SOMEWHERE IN THE TEXT
                ;
                ;         ON NORMAL (FAIL) RETURN, HL->ETX CHAR.
                ;
                ;         ON SKIP (SUCCESS) RETURN, HL->NEXT NONBLANK
                ;         CHAR, AND A=THAT CHAR.
                ;
074F            NXTCH     EQU     $
074F 7E                   MOV     A,M      ;GET CURRENT CHAR
0750 FE03                 CPI     ECHAR    ;IS IT END?
0752 C8                   RZ               ;FAIL IF SO
0753 FE20                 CPI     ' '      ;IS IT BLANK?
0755 C20001               JNZ     SRET     ;IF NOT, SUCCESS
0758 23                   INX     H        ;TRY NEXT CHAR
0759 C34F07               JMP     NXTCH    ;



                ;         SUBROUTINE HEXNO
                ;
                ;         THIS SUBROUTINE TRANSLATES A HEXADECIMAL
                ;         NUMBER POINTED TO BY HL, LEAVING THE
                ;         16-BIT RESULT IN BC.  IF ANY ERRORS OCCUR,
                ;         A NORMAL (FAIL) RETURN IS TAKEN.  ON A SKIP
                ;         (SUCCESS) RETURN, HL POINTS TO THE CHARACTER
                ;         (COMMA OR ETX) THAT TERMINATED THE NUMBER.
                ;
075C            HEXNO     EQU     $
075C 010000               LXI     B,0      ;CLEAR THE NUMBER


075F            HEX       EQU     $        ;HERE TO ADD ANOTHER DIGIT
075F CD4F07               CALL    NXTCH    ;GET A CHAR
0762 C30001               JMP     SRET     ;IF NO MORE, ALL IS OK, QUIT
0765 FE2C                 CPI     ','      ;CHECK FOR TERMINATOR CHAR
0767 CA0001               JZ      SRET     ;QUIT IF END OF NO.
076A D630                 SUI     '0'      ;CNVRT/CHECK RANGE
076C F8                   RM               ;ERROR IF .LT. '0'
076D FE0A                 CPI     0AH      ;CHECK UPPER LIMIT
076F FA7A07               JM      DIGIT    ;JUMP IF 0-9
0772 D607                 SUI     'A'-'0'-0AH ;CONVERT 'A'-'F' TO A-F
0774 FE0A                 CPI     0AH      ;ENSURE NOT .LT. 'A'
0776 F8                   RM               ;ERROR IF TOO SMALL
0777 FE10                 CPI     10H      ;ENSURE UPPER LIMIT OK
0779 F0                   RP               ;
```

```
077A          DIGIT   EQU    $          ;HERE WITH XLATED DIGIT
077A 23               INX    H          ;POINT PAST THAT CHAR
077B F5               PUSH   PSW        ;SAVE THE DIGIT
077C 78               MOV    A,B        ;GET HI BYTE OF NO.
077D FE10             CPI    10H        ;IS TOP DIGIT 0?
077F D0               RNC               ;IF NOT, ERROR
0780 07               RLC               ;SHIFT B LEFT 4
0781 07               RLC               ;       .
0782 07               RLC               ;       .
0783 07               RLC               ;       .
0784 47               MOV    B,A        ;PUT IT BACK IN B
0785 79               MOV    A,C        ;GET C (LOW BYTE)
0786 07               RLC               ;SHIFT C LEFT 4
0787 07               RLC               ;       .
0788 07               RLC               ;       .
0789 07               RLC               ;       .
078A 4F               MOV    C,A        ;SAVE IT
078B E60F             ANI    0FH        ;EXTRACT FORMER HI DIGIT
078D B0               ORA    B          ;PUT IT BACK IN LO BYTE OF B
078E 47               MOV    B,A        ;PUT B BACK
078F 79               MOV    A,C        ;GET C AGAIN
0790 E6F0             ANI    0F0H       ;EXTRACT NEW HI DIGIT
0792 4F               MOV    C,A        ;PUT IT BACK
0793 F1               POP    PSW        ;RETRIEVE NEWEST DIGIT
0794 B1               ORA    C          ;PUT IT IN LOW BYTE OF C
0795 4F               MOV    C,A        ;       .
0796 C35F07           JMP    HEX        ;GO DO ANOTHER DIGIT


              ;       INITIALIZATION ROUTINES
              ;
              ;       THE DBAS-LEVEL INITIALIZATION COMES IN TWO FLAVO
              ;       THE FLAVOR IS DETERMINED BY THE SETTING OF
              ;       "MFLAG".  IN ANY GIVEN 108 SYSTEM, EXACTLY ONE O
              ;       DBAS PROCESSORS SHOULD HAVE MFLAG=1, AND ALL OTH
              ;       SHOULD HAVE MFLAG=0.  THE MASTER PROCESSOR IS
              ;       THEN RESPONSIBLE FOR INITIALIZING ALL SHARED MEM
              ;
B000          SHART   EQU    0B000H     ;TOP BLOK OF COMLVL SHARED RAM
F000          SHARB   EQU    0F000H     ;TOP BLOK OF DSKLVL SHARED RAM
0FFF          SYNOF   EQU    00FFFH     ;OFFSET OF SYNCH LOCATION

0799          START   EQU    $          ;COME HERE ON POWER-UP
0799                  ORG    0          ;SET UP VECTOR
0000 C39907           JMP    START      ;       .
0003                  ORG    START      ;       .
0799 F3               DI                ;DBAS LEVEL IS NEVER INTERRUPTED
079A 3A0003           LDA    MFLAG      ;ARE WE MASTER?
079D B7               ORA    A          ;       .
079E CAA907           JZ     SLAVE      ;       .
07A1 3EFF             MVI    A,0FFH     ;INITIALIZE SYNCH FLAGS
07A3 32FFBF           STA    SHART+SYNOF ;      .
07A6 32FFFF           STA    SHARB+SYNOF ;      .
07A9 310042   SLAVE:  LXI    SP,STACK   ;SET UP STACK
07AC 2100B0           LXI    H,SHART    ;INIT COMLVL SHARED MEMORY
07AF CDC707           CALL   BOXES      ;       .
07B2 2AFDBF           LHLD   SHART+SYNOF-2 ;    .
07B5 220242           SHLD   TBOXA      ;       .
07B8 2100F0           LXI    H,SHARB    ;INIT DSKLVL SHARED MEMORY
07BB CDC707           CALL   BOXES      ;       .
07BE 2AFDFF           LHLD   SHARB+SYNOF-2 ;    .
07C1 220042           SHLD   BBOXA      ;       .
07C4 C30004           JMP    EXEC       ;GO ENTER MAIN CODE


              ;       SUBROUTINE BOXES
              ;
              ;       SPECIFICATIONS IF MFLAG=1:
              ;       ON ENTRY, HL POINTS TO THE HIGHEST 4K
              ;       BLOCK OF A SHARED MEMORY.  THE MEMORY MAY
              ;       BE FROM 4K TO 16K IN SIZE; IF IT IS LESS
              ;       THAN 16K, THE 4K BLOCK IMMEDIATELY BELOW THE
              ;       LOWEST BLOCK OF SHARED MEMORY MAY NOT BE RAM.
              ;
```

```
                ;       ON EXIT, THE MEMORY HAS BEEN INITIALIZED TO
                ;       HOLD AS MANY MAILBOXES AS POSSIBLE, THE
                ;       SYNCHRONIZATION FLAG HAS BEEN CLEARED, AND
                ;       THE FIRST BOX ADDRESS HAS BEEN STORED AT THE
                ;       TOP OF THE HIGHEST SHARED BLOCK.  ALL REGISTERS
                ;       ARE DESTROYED.
                ;
                ;
                ;       SPECIFICATIONS IF MFLAG=0:
                ;       ON ENTRY, HL POINTS TO THE HIGHEST BLOCK
                ;       OF A SHARED MEMORY.  WAITS UNTIL THE MASTER
                ;       PROCESSOR HAS INITIALIZED THE MEMORY (I.E.,
                ;       UNTIL THE SYNCH FLAG IS ZERO) AND THEN RETURNS.
                ;
07C7            BOXES   EQU     $
07C7 3A0003             LDA     MFLAG   ;ARE WE MASTER?
07CA B7                 ORA     A       ;       .
07CB C2D807             JNZ     MAST    ;       .
07CE 01FF0F             LXI     B,SYNOF ;POINT HL AT SYNCH WORD
07D1 09                 DAD     B       ;       .

07D2            BWAIT   EQU     $       ;WAIT FOR MASTER TO FINISH
07D2 7E                 MOV     A,M     ;GET SYNCH FLAG
07D3 B7                 ORA     A       ;TEST IT
07D4 C2D207             JNZ     BWAIT   ;LOOP UNTIL IT IS ZERO
07D7 C9                 RET



07D8            MAST    EQU     $       ;MASTER PROCESSOR CODE
07D8 54                 MOV     D,H     ;COPY TOP BLOCK ADDR
07D9 5D                 MOV     E,L     ;       .
07DA 01FD0F             LXI     B,SYNOF-2 ;POINT HL AT 1ST BOX PTR
07DD 09                 DAD     B       ;       .
07DE E5                 PUSH    H       ;SAVE PTR TO 1ST BOX ADDR
07DF EB                 XCHG            ;POINT HL AT 4K BLOCK
07E0 1603               MVI     D,3     ;MAX NO. OF 4K BLOCKS - 1

07E2            SIZER   EQU     $       ;FIND SIZE OF SHARED STORE
07E2 0100F0             LXI     B,-1000H ;POINT HL AT NEXT LOWER 4K
07E5 09                 DAD     B       ;       .
07E6 7E                 MOV     A,M     ;SEE IF IT IS RAM
07E7 2F                 CMA             ;       .
07E8 77                 MOV     M,A     ;       .
07E9 BE                 CMP     M       ;       .
07EA C2F407             JNZ     SIZED   ;JMP IF IT IS NOT RAM
07ED 15                 DCR     D       ;HAVE WE HIT MAX NO. OF BLOCKS?
07EE C2E207             JNZ     SIZER   ;IF NOT, TRY ANOTHER ONE
07F1 C3F807             JMP     SIZE1

07F4            SIZED   EQU     $       ;HERE WHEN WE FIND NON-RAM
07F4 010010             LXI     B,1000H ;POINT HL AT 1ST RAM
07F7 09                 DAD     B       ;       .

07F8            SIZE1   EQU     $       ;HERE WITH HL->SHARED STORE
07F8 D1                 POP     D       ;POINT DE ONE PAST FLAG AREA
07F9 D5                 PUSH    D       ;       .
07FA 010000             LXI     B,0     ;PREVIOUS BOX=NONE
07FD C5                 PUSH    B       ;       .

07FE            IBOX    EQU     $       ;INITIALIZE A BOX
07FE 3600               MVI     M,SFREE ;SET STATUS=FREE
0800 1B                 DCX     D       ;SET FLAG ADDR
                        XS2     D,E,MFLGA ;     .
0801 E5                 PUSH    H
0802 010300             LXI     B,MFLGA
0805 09                 DAD     B
0806 73                 MOV     M,E
0807 23                 INX     H
0808 72                 MOV     M,D
0809 E1                 POP     H

080A 3EFF               MVI     A,0FFH  ;SET UP FLAG
080C 12                 STAX    D       ;       .
080D EB                 XCHG            ;POINT DE AT PREVIOUS BOX
080E E3                 XTHL            ;       .
```

```
080F EB                 XCHG        ;      .
                        XS2    D,E,MNXT ;SET NEXT-BOX PTR
0810 E5                 PUSH   H
0811 010100             LXI    B,MNXT
0814 09                 DAD    B
0815 73                 MOV    M,E
0816 23                 INX    H
0817 72                 MOV    M,D
0818 E1                 POP    H
0819 54                 MOV    D,H      ;SAVE CURRENT BOX PTR ON STK
081A 5D                 MOV    E,L      ;      .
081B E3                 XTHL            ;      .
081C EB                 XCHG            ;DE->FLAG, HL->CUR BOX
081D 012004             LXI    B,MLTH   ;FIND ADDR OF NEXT BOX
0820 09                 DAD    B        ;      .
0821 E5                 PUSH   H        ;SAVE IT ON STK
0822 012004             LXI    B,MLTH   ;FIND WHERE IT WILL END
0825 09                 DAD    B        ;      .
0826 DA3308             JC     NOBOX    ;JUMP IF CLEARLY NO ROOM
0829 D5                 PUSH   D        ;SAVE FLAG ADDR
082A 7B                 MOV    A,E      ;NO ROOM FOR BOX IF
082B 2F                 CMA             ; HL .GE. DE, I.E., IF
082C 5F                 MOV    E,A      ; HL-DE .GE  0, I.E.,
082D 7A                 MOV    A,D      ; HL-DE HAS NO CARRY.
082E 2F                 CMA             ; SO WE FIND -DE SO
082F 57                 MOV    D,A      ; WE CAN SUBTRACT.
0830 13                 INX    D        ;      .
0831 19                 DAD    D        ;FIND HL+(-DE)
0832 D1                 POP    D        ;RESTORE FLAG ADDR
0833 E1         NOBOX:  POP    H        ;RESTORE NEW BOX PTR
0834 D2FE07             JNC    LBOX     ;IF ROOM, INIT THIS BOX
0837 D1                 POP    D        ;POINT DE AT LAST BOX DONE
0838 E1                 POP    H        ;POINT HL AT BOX LIST HEAD
0839 73                 MOV    M,E      ;SET UP BOX-LIST PTR
083A 23                 INX    H        ;      .
083B 72                 MOV    M,D      ;      .
083C 23                 INX    H        ;POINT HL AT SYNCH FLAG
083D 3600               MVI    M,0      ;RELEASE OTHER PROCESSORS
083F C9                 RET


                ;       ERROR MESSAGES
0840 2C2C3230   ERR01:  DB       ',,201 UNRECOGNIZED KEYWORD',ECHAR
0844 3120554E
0848 5245434F
084C 474E495A
0850 4544204B
0854 4559574F
0858 524403
085B 2C2C3230   ERR02:  DB       ',,202 MISSING DISK ID',ECHAR
085F 32204D49
0863 5353494E
0867 47204449
086B 534B2049
086F 4403
0871 2C323033   ERR03:  DB       ',203 INVALID DISK ID',ECHAR
0875 20494E56
0879 414C4944
087D 20444953
0881 4B204944
0885 03
0886 2C323034   ERR04:  DB       ',204 MISSING TRACK ID',ECHAR
088A 204D4953
088E 53494E47
0892 20545241
0896 434B2049
089A 4403
089C 2C323035   ERR05:  DB       ',205 INVALID TRACK ID',ECHAR
08A0 20494E56
08A4 414C4944
08A8 20545241
08AC 434B2049
```

```
08B0 4403
08B2 2C323036 ERR06:  DB      ',206 MISSING SECTION ID',ECHAR
08B6 204D4953
08BA 53494E47
08BE 20534543
08C2 54494F4E
08C6 20494403
08CA 2C323037 ERR07:  DB      ',207 INVALID SECTION ID',ECHAR
08CE 20494E56
08D2 414C4944
08D6 20534543
08DA 54494F4E
08DE 20494403
08E2 2C323038 ERR08:  DB      ',208 NO DATA FOR "PUT"',ECHAR
08E6 204E4F20
08EA 44415441
08EE 20464F52
08F2 20225055
08F6 542203

08F9 2C2C03   OKMSG:  DB      ',,',ECHAR
0000                  END
```

| NAME | ATTR | TRAK | SCTR | SIZE |
|---|---|---|---|---|
| EDIT | 01 | 04 | 01 | 0031 |
| ASMB | 01 | 05 | 18 | 007B |
| TEST | 01 | 0A | 11 | 0001 |
| DIAGO | 01 | 0A | 12 | 001B |
| DIAGS | 01 | 0B | 13 | 003E |
| EXEC | 01 | 0E | 03 | 0039 |
| EQUS1 | 00 | 10 | 08 | 0016 |
| MAIL1 | 00 | 11 | 04 | 0041 |
| EQUSS | 00 | 13 | 11 | 0016 |
| MAIL2 | 00 | 14 | 0D | 003E |
| TOC | 00 | 16 | 17 | 0002 |
| 2MAIL | 00 | 16 | 19 | 0006 |
| MAILS | 00 | 17 | 05 | 003C |
| MAILO | 00 | 19 | 0D | 0006 |

```
;       S Y S T E M   S Y M B O L S / M A C R O S
;
;
;
;


;       BASIC SYSTEM MACROS

;       XL - INDEXED LOAD
;       USE AS FOLLOWS:
;       XL      REGISTER,DISPLACEMENT
;       LOADS "REGISTER" FROM LOCATION (H,L)+DISPLACEMEN
;       DESTROYS B,C BEFORE LOADING.
XL      MACRO   REG,DIS
        PUSH    H
        LXI     B,DIS
        DAD     B
        MOV     REG,M
        POP     H
        ENDM

;       XS - INDEXED STORE
;       USE LIKE XL
;       DESTROYS B,C BEFORE STORING.
XS      MACRO   REG,DIS
        PUSH    H
        LXI     B,DIS
        DAD     B
        MOV     M,REG
        POP     H
        ENDM
```

```
;         XL2 - INDEXED 16-BIT LOAD
;
;         USE AS FOLLOWS:
;         XL2      RH,RL,DISP
;         LOADS "RL" FROM LOCATION (H,L)+"DISP"
;         AND "RH" FROM (H,L)+"DISP"+1
;         DESTROYS B,C BEFORE LOADING.
XL2       MACRO    RH,RL,DISP
          PUSH     H
          LXI      B,DISP
          DAD      B
          MOV      RL,M
          INX      H
          MOV      RH,M
          POP      H
          ENDM

;         XS2 - INDEXED 16-BIT STORE
;         USE LIKE XL2
;         DESTROYS B,C BEFORE STORING.
XS2       MACRO    RH,RL,DISP
          PUSH     H
          LXI      B,DISP
          DAD      B
          MOV      M,RL
          INX      H
          MOV      M,RH
          POP      H
          ENDM

;         SAVE - SAVE REGISTERS
;         SAVES ALL REGISTERS ON STACK.
SAVE      MACRO
          PUSH     PSW
          PUSH     B
          PUSH     D
          PUSH     H
          ENDM

;         RESTR - RESTORE REGISTERS
;         RESTORES ALL REGISTERS FROM STACK
RESTR     MACRO
          POP      H
          POP      D
          POP      B
          POP      PSW
          ENDM

;         XI - INDEXED INSTRUCTION
;         USE AS FOLLOWS:
;         XI       DISPL,'OP PARAMETERS'
;         ADDS "DISPL" TO H,L AND THEN EXPANDS "OP" WITH
;         PARAMETERS "PARAMETERS". FOR EXAMPLE, TO INCREM
;         LOCATION 1005H IF HL=1000H, DO
;         XI       5,'INR M'
;         DESTROYS B,C DURING CALCULATION.
XI        MACRO    DIS,OP
          PUSH     H
          LXI      B,DIS
          DAD      B
          OP
          POP      H
          ENDM

;         SYSTEM SYMBOLS
;         (DELETE WHAT YOU DON'T NEED IF SYMBOL TBL OVERFL

;         LOW-CORE SUBROUTINE VECTORS
0100      SRET     EQU      0100H    ;JMP SRET TO DO SKIP-RETURN
0103      GBOXT    EQU      0103H    ;GET BOX TO LEVEL ABOVE
0106      GBOXB    EQU      0106H    ;GET BOX TO LEVEL BELOW
0109      RCVT     EQU      0109H    ;RCV FROM ABOVE
010C      RCVB     EQU      010CH    ;RCV FROM BELOW
010F      RIGNR    EQU      010FH    ;IGNORE THIS BOX & FIND ANOTHER
0112      SUBND    EQU      RIGNR+3  ;END OF SUBR VECTORS
0300      CONFG    EQU      0300H    ;ADDR OF CONFIGURATION PARAMS
```

```
                  ;        RAM BLOCK ADDRESSES
4200              RAM      EQU      04200H  ;BEG. ADDR OF LOCAL PAM
4200              STACK    EQU      04200H  ;TOP+1 OF LOCAL STACK


                  ;        LOCATIONS IN LOCAL RAM USED BY ALL ROUTINES
0000                       ORG      RAM
4200              BBOXA:   DS       2         ;POINTER TO BOXES GOING DOWN
4202              TBOXA:   DS       2         ;POINTER TO BOXES GOING UP
4204              EGLOB    EQU      $         ;END OF GLOBAL RAM


                  ;        MAILBOX FORMAT
041A              TXTL     EQU      1050      ;LENGTH OF MAILBOX TEXT
0000              MSTS     EQU      0         ;STATUS BYTE: SEE BELOW
0001              MNXT     EQU      MSTS+1    ;PTR TO NEXT MAILBOX
0003              MFLGA    EQU      MNXT+2    ;PTR TO CONTENTION FLG
0005              MID      EQU      MFLGA+2 ;MAILBOX ID
0006              MTEXT    EQU      MID+1     ;MAILBOX TEXT
0420              MLTH     EQU      MTEXT+TXTL ;TOTAL LTH OF MAILBOX
0003              ECHAR    EQU      03H       ;CHAR THAT FLAGS TEXT END
                  ;        STATUS BYTE DEFINITIONS
0000              SFREE    EQU      0         ;MAILBOX FREE
0001              SBSYT    EQU      1         ;BUSY, IN USE FROM ABOVE
0002              SBSYB    EQU      2         ;BUSY, IN USE FROM BELOW
0003              SMSGT    EQU      3         ;MSG, BOTTOM TO TOP
0004              SMSGB    EQU      4         ;MSG, TOP TO BOTTOM



                  ;        USEFUL SYSTEM SUBROUTINES
                  ;
                  ;        THESE SUBROUTINES RUN ON ALL THREE LEVELS
                  ;
                  ;
                  ;
                  ;


4204                       ORG      SUBND

                  ;        SRET - PERFORM SKIP RETURN
                  ;
                  ;        SRET IS CALLED WITH A JMP RATHER THAN A CALL.  I
                  ;        IS USED BY SUBROUTINES THAT DO SUCCESS/FAIL RETU
                  ;        SRET DOES THE SUCCESS (SKIP) RETURN BY INCREMENT
                  ;        THE RETURN ADDRESS BY 3 BEFORE RETURNING.  NO RE
                  ;        OR CONDITION CODES ARE AFFECTED.
                  ;
0112              SRET1:   DS       0
0112                       ORG      SRET
0100 C31201                JMP      SRET1
0103                       ORG      SRET1
0112 E3                    XTHL               ;GET RETURN ADDRESS
0113 23                    INX      H         ;BUMP IT THREE TIMES
0114 23                    INX      H         ;        .
0115 23                    INX      H         ;        .
0116 E3                    XTHL               ;PUT IT BACK ON STACK
0117 C9                    RET


                  ;        GRAB - GRAB ACCESS THRU CONTENTION FLAG
                  ;
                  ;        CALL GRAB WITH D,E POINTING TO THE FLAG.
                  ;        TAKES SUCCESS (SKIP) RETURN IF ACCESS IS GRANTED
                  ;        AND FAIL RETURN OTHERWISE.
                  ;
0118 F5           GRAB:    PUSH     PSW       ;SAVE ACC
0119 EB                    XCHG               ;H,L <- FLG ADDR
011A 7E                    MOV      A,M       ;GET FLAG
011B B7                    ORA      A         ;TEST FOR ZERO
```

```
011C F22401            JP     GFRET   ;FAIL IF FLAG .GE. 0
011F 34                INR    M       ;FLAG IS -1 SO GRAB IT
0120 CA2701            JZ     GSRET   ;SUCCESS IF RESULT IS ZERO
0123 35                DCR    M       ;ELSE SOMEBODY ELSE GOT IT
0124 EB       GFRET:   XCHG           ;RESTORE H,L
0125 F1                POP    PSW     ;RESTORE A
0126 C9                RET            ;AND DO FAIL RETURN
0127 EB       GSRET:   XCHG           ;RESTORE H,L
0128 F1                POP    PSW     ;RESTORE A
0129 C31201            JMP    SRET1   ;AND DO A SUCCESS RETURN


              ;        GBOXT - GET MAILBOX TO ABOVE LEVEL
              ;
              ;        TAKES FAIL RETURN IF NO FREE BOXES
              ;        ON SKIP RETURN, HL POINTS TO THE BOX AND
              ;        ITS STATUS IS SET TO SBSYB.
              ;
012C          TBOXG:   DS     0
012C                   ORG    GBOXT
0103 C32C01            JMP    TBOXG
0106                   ORG    TBOXG
012C F5                PUSH   PSW     ;SAVE REGS
012D C5                PUSH   B       ;     .
012E D5                PUSH   D       ;     .
012F 1600              MVI    D,SFREE ;PUT DESIRED STATUS IN D
0131 1E02              MVI    E,SBSYB ;PUT NEW STATUS IN E
0133 2A0242            LHLD   TBOXA   ;PUT 1ST BOX ADDR IN H
0136 C35D01            JMP    RLOOK


              ;        GBOXB - GET BOX TO LOWER LEVEL
              ;
              ;        PARAMETERS, ETC. AS IN GBOXT.
              ;
0139          BBOXG:   DS     0
0139                   ORG    GBOXB
0106 C33901            JMP    BBOXG
0109                   ORG    BBOXG
0139 F5                PUSH   PSW     ;SAVE REGISTERS
013A C5                PUSH   B       ;     .
013B D5                PUSH   D       ;     .
013C 1600              MVI    D,SFREE ;PUT DESIRED STATUS IN D
013E 1E01              MVI    E,SBSYT ;PUT NEW STATUS IN E
0140 2A0042            LHLD   BBOXA   ;H,L <- 1ST BOX ADDR
0143 C35D01            JMP    RLOOK

              ;        RCVT - RECEIVE A MESSAGE FROM ABOVE
              ;
              ;        IF NO MAILBOX FOUND, FAILURE RETURN TAKEN
              ;        ON SUCCESS (SKIP) RETURN,  MAILBOX STATUS
              ;        HAS BEEN CHANGED TO SBSYB, AND H,L POINT TO
              ;        THE MAILBOX.  THE CONTENTION FLAG IS LEFT IN
              ;        THE FREE STATE; THIS IS OK SINCE WHEN THE
              ;        STATUS IS BUSY NOBODY CAN CHANGE THE BOX
              ;        EXCEPT US.
              ;
0146          TRCV:    DS     0
0146                   ORG    RCVT
0109 C34601            JMP    TRCV
010C                   ORG    TRCV
0146 F5                PUSH   PSW     ;SAVE REGS
0147 C5                PUSH   B       ;     .
0148 D5                PUSH   D       ;     .
0149 1604              MVI    D,SMSGB ;LOAD STS WE ARE LOOKING FOR
014B 1E02              MVI    E,SBSYB ;LOAD STATUS TO BE SET
014D 2A0242            LHLD   TBOXA   ;POINT H,L AT 1ST BOX
0150 C35D01            JMP    RLOOK


              ;        RCVB - RECEIVE A MESSAGE FROM BELOW
```

```
                    ;
                    ;       PARAMETERS AND RETURN VALUES ARE AS IN RCVT,
                    ;       EXCEPT THAT IF A MAILBOX IS FOUND THE STATUS
                    ;       IS SET TO SBSYT.
                    ;
0153                BRCV:   DS      0
0153                        ORG     RCVB
010C C35301                 JMP     BRCV
010F                        ORG     BRCV
0153 F5                     PUSH    PSW     ;SAVE REGS
0154 C5                     PUSH    B       ;       .
0155 D5                     PUSH    D       ;       .
0156 1603                   MVI     D,SMSGT ;LOAD STS WE WANT
0158 1E01                   MVI     E,SBSYT ;LOAD STATUS TO BE SET
015A 2A0042                 LHLD    BBOXA   ;POINT H,L AT 1ST BOX

015D 7E             RLOOK:  MOV     A,M     ;GET A STATUS BYTE
015E BA                     CMP     D       ;IS IT WHAT WE WANT?
015F C29901                 JNZ     RNEXT   ;NO, TRY NEXT GUY
0162 D5                     PUSH    D       ;YES, SAVE D
                            XL2     D,E,MFLGA ;GET FLAG ADDR
0163 E5                     PUSH    H
0164 010300                 LXI     B,MFLGA
0167 09                     DAD     B
0168 5E                     MOV     E,M
0169 23                     INX     H
016A 56                     MOV     D,M
016B E1                     POP     H

016C CD1801                 CALL    GRAB    ;GET ACCESS TO BUFFER
016F C39801                 JMP     RPOP    ;FAILURE: TRY NEXT GUY
0172 D1                     POP     D       ;SUCCESS: RESTORE D
0173 7E                     MOV     A,M     ;AND RECHECK STATUS
0174 BA                     CMP     D       ;       .
0175 C28B01                 JNZ     RREL    ;(RELEASE IF NOT FOR US)
0178 73                     MOV     M,E     ;SET NEW STATUS
                            XL2     D,E,MFLGA ;POINT AT FLAG AGAIN
0179 E5                     PUSH    H
017A 010300                 LXI     B,MFLGA
017D 09                     DAD     B
017E 5E                     MOV     E,M
017F 23                     INX     H
0180 56                     MOV     D,M
0181 E1                     POP     H

0182 EB                     XCHG            ;       .
0183 35                     DCR     M       ;RELEASE FLAG
0184 EB                     XCHG            ;       .
0185 D1                     POP     D       ;RESTORE REGISTERS
0186 C1                     POP     B       ;       .
0187 F1                     POP     PSW     ;       .
0188 C31201                 JMP     SRET1   ;AND DO SUCCESS RETURN

018B D5             RREL:   PUSH    D       ;SAVE STATUS DESIRED
                            XL2     D,E,MFLGA ;POINT AT FLAG
018C E5                     PUSH    H
018D 010300                 LXI     B,MFLGA
0190 09                     DAD     B
0191 5E                     MOV     E,M
0192 23                     INX     H
0193 56                     MOV     D,M
0194 E1                     POP     H

0195 EB                     XCHG            ;       .
0196 35                     DCR     M       ;RELEASE FLAG
0197 EB                     XCHG
0198 D1             RPOP:   POP     D       ;RESTORE DESIRED STATUS
0199 010100         RNEXT:  LXI     B,MNXT  ;POINT AT "NEXT" PTR
019C 09                     DAD     B       ;       .
019D 7E                     MOV     A,M     ;LOAD "NEXT" PTR
019E 23                     INX     H       ;       .
019F 66                     MOV     H,M     ;(PUT IT IN H,L)
01A0 6F                     MOV     L,A     ;       .
01A1 B4                     ORA     H       ;TEST HL FOR ZERO
01A2 C25D01                 JNZ     RLOOK   ;LOOP IF MORE BOXES
01A5 D1                     POP     D       ;RESTORE REGISTERS
```

```
01A6 C1              POP     B         ;          .
01A7 F1              POP     PSW       ;          .
01A8 C9              RET


                ;    RIGNR - IGNORE THIS MAILBOX AND FIND ANOTHER
                ;                                                  .
                ;    ON ENTRY, H,L POINT TO A MAILBOX WITH A STATUS O
                ;    SBSYT OR SBSYB (AS RETURNED BY RCVB OR RCVT).  T
                ;    STATUS OF THIS MAILBOX IS CHANGED TO EITHER
                ;    SMSGB OR SMSGT, DEPENDING ON WHETHER THE ORIGINA
                ;    STATUS WAS SBSYT OR SBSYB, RESPECTIVELY.  THEN T
                ;    RCV ROUTINE IS ENTERED TO SEARCH FOR ANOTHER MAI
                ;    FOLLOWING THIS ONE.  RIGNR IS USED WHEN A ROUTIN
                ;    CANNOT PRESENTLY ACCEPT A PARTICULAR MAILBOX BUT
                ;    WOULD LIKE TO SEE IF THERE ARE OTHERS IN THE QUE
                ;    THAT MIGHT BE ABLE TO BE PROCESSED.
                ;
                ;    SINCE RIGNR IS AN ENTRY TO RCV, EXIT PARAMETERS
                ;    ARE AS IN RCVB AND RCVT.
                ;
01A9            IGNOR:  DS      0

01A9                 ORG     RIGNR
010F C3A901          JMP     IGNOR
0112                 ORG     IGNOR
01A9 F5              PUSH    PSW       ;SAVE REGS
01AA C5              PUSH    B         ;    .
01AB D5              PUSH    D         ;    .
01AC 7E              MOV     A,M       ;GET STATUS OF MAILBOX
01AD 5F              MOV     E,A       ;SAVE STATUS FOR NEW BOX
01AE FE01            CPI     SBSYT     ;IS IT FROM BELOW TO ABOVE?
01B0 C2B901          JNZ     RBOT      ;JUMP IF NOT
01B3 1603            MVI     D,SMSGT   ;SET UP PARAMS FOR RCV ROUTINE
01B5 72              MOV     M,D       ;FREE UP THIS MAILBOX
01B6 C39901          JMP     RNEXT     ;AND GO LOOK FOR ANOTHER
01B9 1604       RBOT:   MVI     D,SMSGB   ;SET UP RCV PARAMS
01BB 72              MOV     M,D       ;FREE UP THIS BOX
01BC C39901          JMP     RNEXT     ;AND GO FIND ANOTHER
0000                 END


                ;    BASIC SYSTEM MACROS
                
                ;    XL - INDEXED LOAD
                ;    USE AS FOLLOWS:
                ;    XL      REGISTER,DISPLACEMENT
                ;    LOADS "REGISTER" FROM LOCATION (H,L)+DISPLACEMEN
                ;    DESTROYS B,C BEFORE LOADING.
                XL   MACRO   REG,DIS
                     PUSH    H
                     LXI     B,DIS
                     DAD     B
                     MOV     REG,M
                     POP     H
                     ENDM

                ;    XS - INDEXED STORE
                ;    USE LIKE XL
                ;    DESTROYS B,C BEFORE STORING.
                XS   MACRO   REG,DIS
                     PUSH    H
                     LXI     B,DIS
                     DAD     B
                     MOV     M,REG
                     POP     H
                     ENDM

                ;    XL2 - INDEXED 16-BIT LOAD
                ;
                ;    USE AS FOLLOWS:
                ;    XL2     RH,RL,DISP
                ;    LOADS "RL" FROM LOCATION (H,L)+"DISP"
                ;    AND "RH" FROM (H,L)+"DISP"+1
```

```
;       DESTROYS B,C BEFORE LOADING.
XL2     MACRO   RH,RL,DISP
        PUSH    H
        LXI     B,DISP
        DAD     B
        MOV     RL,M
        INX     H
        MOV     RH,M
        POP     H
        ENDM

;       XS2 - INDEXED 16-BIT STORE
;       USE LIKE XL2
;       DESTROYS B,C BEFORE STORING.
XS2     MACRO   RH,RL,DISP
        PUSH    H
        LXI     B,DISP
        DAD     B
        MOV     M,RL
        INX     H
        MOV     M,RH
        POP     H
        ENDM



;       SAVE - SAVE REGISTERS
;       SAVES ALL REGISTERS ON STACK.
SAVE    MACRO
        PUSH    PSW
        PUSH    B
        PUSH    D
        PUSH    H
        ENDM

;       RESTR - RESTORE REGISTERS
;       RESTORES ALL REGISTERS FROM STACK
RESTR   MACRO
        POP     H
        POP     D
        POP     B
        POP     PSW
        ENDM

;       XI - INDEXED INSTRUCTION
;       USE AS FOLLOWS:
;       XI      DISPL,'OP PARAMETERS'
;       ADDS "DISPL" TO H,L AND THEN EXPANDS "OP" WITH
;       PARAMETERS "PARAMETERS". FOR EXAMPLE, TO INCREM
;       LOCATION 1005H IF HL=1000H, DO
;       XI      5,'INR M'
;       DESTROYS B,C DURING CALCULATION.
XI      MACRO   DIS,OP
        PUSH    H
        LXI     B,DIS
        DAD     B
        OP
        POP     H
        ENDM



;       SYSTEM SYMBOLS
;       (DELETE WHAT YOU DON'T NEED IF SYMBOL TBL OVERFL

;       LOW-CORE SUBROUTINE VECTORS
0100    SRET    EQU     0100H   ;JMP SRET TO DO SKIP-RETURN
0103    GBOXT   EQU     0103H   ;GET BOX TO LEVEL ABOVE
0106    GBOXB   EQU     0106H   ;GET BOX TO LEVEL BELOW
0109    RCVT    EQU     0109H   ;RCV FROM ABOVE
010C    RCVB    EQU     010CH   ;RCV FROM BELOW
010F    RIGNR   EQU     010FH   ;IGNORE THIS BOX & FIND ANOTHER
0112    SUBND   EQU     RIGNR+3 ;END OF SUBR VECTORS
0300    CONFG   EQU     0300H   ;ADDR OF CONFIGURATION PARAMS
```

```
                ;       RAM BLOCK ADDRESSES
4200            RAM     EQU     04200H  ;BEG. ADDR OF LOCAL RAM
4200            STACK   EQU     04200H  ;TOP+1 OF LOCAL STACK


                ;       LOCATIONS IN LOCAL RAM USED BY ALL ROUTINES
0000                    ORG     RAM
4200            BBOXA:  DS      2       ;POINTER TO BOXES GOING DOWN
4202            TBOXA:  DS      2       ;POINTER TO BOXES GOING UP
4204            EGLOB   EQU     $       ;END OF GLOBAL RAM


                ;       MAILBOX FORMAT
041A            TXTL    EQU     1050    ;LENGTH OF MAILBOX TEXT
0000            MSTS    EQU     0       ;STATUS BYTE: SEE BELOW
0001            MNXT    EQU     MSTS+1  ;PTR TO NEXT MAILBOX
0003            MFLGA   EQU     MNXT+2  ;PTR TO CONTENTION FLG
0005            MID     EQU     MFLGA+2 ;MAILBOX ID
0006            MTEXT   EQU     MID+1   ;MAILBOX TEXT
0420            MLTH    EQU     MTEXT+TXTL ;TOTAL LTH OF MAILBOX
0003            ECHAR   EQU     03H     ;CHAR THAT FLAGS TEXT END
                ;       STATUS BYTE DEFINITIONS
0000            SFREE   EQU     0       ;MAILBOX FREE
0001            SBSYT   EQU     1       ;BUSY, IN USE FROM ABOVE
0002            SBSYB   EQU     2       ;BUSY, IN USE FROM BELOW
0003            SMSGT   EQU     3       ;MSG, BOTTOM TO TOP
0004            SMSGB   EQU     4       ;MSG, TOP TO BOTTOM
                ;       DBAS MAILBOX DEFINTIONS
0006            MDCTL   EQU     MTEXT   ;DISK CONTROL BYTE
0007            MDMBX   EQU     MDCTL+1 ;MAILBOX POINTER
0009            MDDID   EQU     MDMBX+2 ;DISK SPINDLE #
000A            MDTID   EQU     MDDID+1 ;CYLINDER(TRACK) #
000C            MDHID   EQU     MDTID+2 ;HEAD #
000D            MDSID   EQU     MDHID+1 ;SECTOR #
000E            MDDAT   EQU     MDSID+1 ;START OF DATA
0009            MDMSG   EQU     MDDID   ;LOC. OF MSG FROM DRIVER
                ;       MDCTL BIT DEFINITIONS
0000            MDCRD   EQU     0       ;CLEAR IF OPERATION IS A READ
0001            MDCWR   EQU     1       ;SET IF OPERATION IS A WRITE
0002            MDCIN   EQU     2       ;SET TO INITIALIZE A PACK
0080            MDCER   EQU     80H     ;SET IF ERR OCCURRED IN DRIVER


                    DISK DRIVER LEVEL



                    C O N S T A N T S


                        RELOCATION CONSTANTS

0000            PROM    EQU     0       ;START OF PROM
0400            LCONS   EQU     PROM+CONFG+100H ;LOCAL CONSTANTS START
                                        ;  IN THE PROM SLOT IMMEDIATELY
                                        ;  FOLLOWING THE CONFIGURATION P
9000            DISKC   EQU     9000H   ;START OF DISK CONTROLLER
                                        ;  MEMORY SPACE
0000            DCWB    EQU     0       ;DISK CONTROL WORD BLOCK
9700            DCWBA   EQU     DISKC+700H+DCWB*20H     ;BASE ADDRESS OF
                                        ;  THE CURRENT DISK CONTROL
                                        ;  WORD BLOCK.
                ;
                ;
4204                    ORG     LCONS   ;RESERVE FIRST 400H LOCS FOR
                                        ;  COMMON SYSTEM CODE
0400            BSIT    EQU     $       ;BIT STRING INVERSION TABLE
0400 00                 DB      0H      ;0000 -> 0000.
```

```
0401 08            DB      8H        ;0001 -> 1000.
0402 04            DB      4H        ;0010 -> 0100.
0403 0C            DB      0CH       ;0011 -> 1100.
0404 02            DB      2H        ;0100 -> 0010.
0405 0A            DB      0AH       ;0101 -> 1010.
0406 06            DB      6H        ;0110 -> 0110.
0407 0E            DB      0EH       ;0111 -> 1110.
0408 01            DB      1H        ;1000 -> 0001.
0409 09            DB      9H        ;1001 -> 1001.
040A 05            DB      5H        ;1010 -> 0101.
040B 0D            DB      0DH       ;1011 -> 1101
040C 03            DB      03H       ;1100 -> 0011.
040D 0B            DB      0BH       ;1101 -> 1011.
040E 07            DB      07H       ;1110 -> 0111.
040F 0F            DB      0FH       ;1111 -> 1111.


              ;
              ;  E Q U A T E S
              ;
              ;VECTO INTERRUPT MASKS
              ;
0007          VI7      EQU     007H      ;EFFECTIVELY DISABLE ALL INTERRU
0006          VI6      EQU     06H       ;DISABLE LEVELS 0-6
0005          VI5      EQU     05H       ;DISABLE LEVELS 0-5
0004          VI4      EQU     04H       ;DISABLE LEVELS 0-4
0003          VI3      EQU     03H       ;DISABLE LEVELS 0-3
0002          VI2      EQU     02H       ;DISABLE LEVELS 0-2
0001          VI1      EQU     01H       ;DISABLE LEVELS 0-1
0008          VI0      EQU     08H       ;DISABLE PRIORITY STATUS REG
                                         ; COMPARISION IN THE PIC-8 TO
                                         ; ALLOW LEVEL 0 INTERRUPTS.
              ;
              ; TIMER MASKS
              ;
0010          SEC      EQU     10H       ;TURNS ON THE TIMER JUMPERED TO
                                         ;  PIN 12 IN SOCKET C4 OF THE
                                         ;  PIC-8 BOARD. ON STANDARD DDL
                                         ;  IMPLEMENTATIONS THIS WILL BE
                                         ;  CONNECTED  THE SECONDS TIMER
0020          MSEC     EQU     20H       ;TURN THE TIMER JUMPERED TO
                                         ;  PIN 13 IN SOCKET C4 OF THE
                                         ;  PIC-8. STANDARD 108 DEFAULT
                                         ;  IS THE 1 MILLISECOND TIMER
0040          CUSEC    EQU     40H       ;TURN THE TIMER JUMPERED TO
                                         ;  PIN 14 IN SOCKET C4 OF THE
                                         ;  PIC-8. STANDARD 108 DDL
                                         ;  DEFAULT IS THE 100 MICROSECON
                                         ;  TIMER
              ;
              ;BUS BIT MASKS
              ;
0002          BUS9     EQU     02H       ;BUS BIT 9 AT BIT 2 DO2
0001          BUS8     EQU     01H       ; "   "  8 "   "  1  "
0080          BUS7     EQU     80H       ; "   "  7 "   "  7 DO3
0040          BUS6     EQU     40H       ; "   "  6 "   "  6  "
0020          BUS5     EQU     20H       ; "   "  5 "   "  5  "
0010          BUS4     EQU     10H       ; "   "  4 "   "  4  "
0008          BUS3     EQU     08H       ; "   "  3 "   "  3  "
0004          BUS2     EQU     04H       ; "   "  2 "   "  2  "
0002          BUS1     EQU     02H       ; "   "  1 "   "  1  "
0001          BUS0     EQU     01H       ; "   "  1 "   "  0  "
0000          BUSCL    EQU     000H      ;CLEAR BUS
              ;
              ; ADDRESS CONSTANTS
              ;
FFFF          PUWF     EQU     0FFFFH    ;POWER UP WAIT FLAG


              ;
              ; D I S K  B U F F E R  A R E A
              ;
              ;
0410                   ORG     DISKC
9000          TRLR     EQU     $         ;SECTOR TRAILER FIELD
```

```
9000    PAD     EQU     $         ;SPARE SPACE (USED TO ROUNF OUT
9000            DS      23        ;  TO 1120 BYTES)
9017    MTOL2   EQU     $         ;MECHANICAL TOLERANCE
9017            DS      12
0023    TRLRL   EQU     $-TRLR    ;LENGTH OF SECTOR TRAILER
        ;
9023    DF      EQU     $         ;DATA FIELD
9023    CRC     EQU     $         ;CYCLIC REDUNANCY CHECK FIELD
9023            DS      4
9027    DATA    EQU     $         ;USER DATA
9027            DS      1024
0400    DATAL   EQU     $-DATA    ;USER DATA LENGTH
9427    ID      EQU     $         ;SECTOR ID (TRIPLY REDUNDANT)
9427            DS      12
000C    IDL     EQU     $-ID      ;ID LENGTH
9433    SYNC    EQU     $         ;SYNC BYTE, ALWAYS C9H
9433            DS      1
0411    DFL     EQU     $-DF      ;DATA FIELD LENGTH
9435    RSTRT   EQU     $+1       ;READ BUFFER STARTING ADDRESS
9434    HDR     EQU     $         ;SECTOR HEADER
9434    VFOL    EQU     $         ;VFO LOCK
9434            DS      5
9439    DELAY   EQU     $         ;READ DELAY
9439            DS      16
9449    MTOL1   EQU     $         ;MECHANICAL TOLERANCE
9449            DS      23
9460    WSTRT   EQU     $         ;WRITE BUFFER STARTING ADDRESS
002C    HDRL    EQU     $-HDR     ;SECTOR HEADER LENGTH
0460    SSIZE   EQU     $-TRLR    ;SECTOR SIZE


        ;
        ; DISK CONTROL WORDS
        ;
9704    DCW4    EQU     DCWBA+4   ;BIT 7 - ENA CRC GEN (LOW TRUE)
                                  ; "  6 - CLR INDEX INT -PULSE
                                  ; "  5 -  "   SECTOR INT -PULSE
                                  ; "  4 - ENA DISKBFR(LOGIC LOW)
                                  ; "  3 - CRC CLEAR +PULSE
                                  ; "  2 - CRC FULL
                                  ; "  1 - CRC PARTIAL
                                  ; "  0 - CRC CIRCULAR
9706    DCW6    EQU     DCWBA+6   ;BIT 7 - SINGLE STEP CRC CLOCK
                                  ; "  6 - CYLINDER TAG
                                  ; "  5 - HEAD TAG
                                  ; "  4 - CONTROL TAG
                                  ; "  3 - SELECT
                                  ; "  2 - SEQUENCE
                                  ; "  1 - BUS 9
                                  ; "  0 - BUS 8
9702    DCW2    EQU     DCWBA+2   ;BIT 7 - BUS 7
                                  ; "  6 - BUS 6
                                  ; "  5 - BUS 5
                                  ; "  4 - BUS 4
                                  ; "  3 - BUS 3
                                  ; "  2 - BUS 2
                                  ; "  1 - BUS 1
                                  ; "  0 - BUS 0
9705    DCW5    EQU     DCWBA+5   ;BIT 7 - CRC7
                                  ; "  6 - CRC 6
                                  ; "  5 - CRC 5
                                  ; "  4 - CRC 4
                                  ; "  3 - CRC 3
                                  ; "  2 - CRC 2
                                  ; "  1 - CRC 1
                                  ; "  0 - CRC 0
9700    DCW0    EQU     DCWBA     ;BIT 7 - SELECTED. (LOW TRUE)
                                  ; "  6 - ATTENTION (LOW TRUE)
                                  ; "  5 - END OF CYLINDER (LOW TR
                                  ; "  4 - OFFSET SET (LOW TRUE)
                                  ; "  3 - READY (LOW TRUE)
                                  ; "  2 - ONLINE (LOW TRUE)
                                  ; "  1 - READ ONLY (LOW TRUE)
                                  ; "  0 - SEEK INCOMPLETE (LOW TR
```

```
9701          DCW1    EQU     DCWBA+1 ;BIT 7 - NC
                                      ; "  6 - NC
                                      ; "  5 - NC
                                      ; "  4 - NC
                                      ; "  4 - DELAY UP
                                      ; "  3 - TERMINATOR IN
                                      ; "  2 - BA STOP(LOGIC LOW)
                                      ; "  1 - ADDRESS MARK DETECTED
                                      ; "  0 - DEVICE CHECK

9703          DCW3    EQU     DCWBA+3 ;MODE CONTROL FOR 8255 (A5)
9707          DCW7    EQU     DCWBA+7 ;MODE CONTROL FOR 8255 (A6)
9713          DCW10   EQU     DCWBA+13H       ;LOWER BYTE ADDR
9714          DCW11   EQU     DCWBA+14H       ;UPPER BYTE ADDR
9718          DCW12   EQU     DCWBA+18H       ;DELAY COUNTER.
971C          DCW13   EQU     DCWBA+1CH       ;STOP   COUNTER.
              ;
              ; DEVICE CODES
              ;
00FE          PIC8    EQU     0FEH    ;PRIORITY INTERRUPT CONTROLLER.
              ;
              ; DISK STATUS FLAGS
              ;
0004          SSEQ    EQU     4H      ;SET SEQUENCE
0008          SSEL    EQU     08H     ;SET SELECT
000C          SSQSL   EQU     SSEQ+SSEL       ;SET SEQUENCE AND
                                      ;  SELECTED
0080          SELTD   EQU     80H     ;SELECTED
0084          SLDOL   EQU     84H     ;SELECTED & ON-LINE
0001          SKINC   EQU     01H     ;SEEK INCOMPLETE
0008          READY   EQU     08H     ;DRIVE READY
0010          OFSET   EQU     10H     ;HEADS OFFSET
0018          RDYOF   EQU     READY+OFSET     ;READY & HEADS OFFSET
0001          DVCHK   EQU     01H     ;DEVICE CHECK SET
0040          RDCHK   EQU     40H     ;
001C          CTAG    EQU     1CH     ;CONTROL TAG LINE
002C          HDTAG   EQU     2CH     ;HEAD ADDR TAG LINE
004C          CYTAG   EQU     4CH     ;CYLINDER ADDR TAG LINE
0001          RZERO   EQU     BUS0    ;REZERO COMMAND
000C          CLTAG   EQU     0CH     ;CLEAR TAG LINES EXCEPT FOR SELE
                                      ;  AND SEQUENCE
0040          ATTN    EQU     40H     ;ATTENTION FLAG
0092          IPPI1   EQU     92H     ;INITIALIZE THE FIRST 8255 PROGR
                                      ;    PERIPHERAL INTERFACE.
0082          IPPI2   EQU     82H     ;INIALIZE THE SECOND 8255.
0002          CRCST   EQU     02H     ;CRC GENERATION STOP COUNT
0020          SECTI   EQU     20H     ;CLEAR SECTOR INTERRUPT MASK
0040          INDXI   EQU     40H     ;CLEAR INDEX INTERRUPT MASK
0060          OVRNI   EQU     SECTI+INDXI     ;CLEAR OVERRUN INTERRUPT
                                      ;  MASK
0004          BASTP   EQU     04H     ;BA STOP
0004          ONLNE   EQU     04      ;ONLINE - HEADS LOADED
0014          NTRY    EQU     20      ;NUMBER OF RETRY'S ON A BAD READ
0000          NHO     EQU     0       ;NO HEAD OFFSET REQUESTED
0000          RWRTF   EQU     0       ;REAL WRITE FLAG
0080          FWRT    EQU     80H     ;FAKE WRITE FLAG
0008          CLCRC   EQU     08H     ;CLEAR CRC
0004          FMCRC   EQU     04H     ;FULL MODE CRC
0001          CMCRC   EQU     01H     ;CIRCULAR MODE CRC
0080          SSCRC   EQU     80H     ; SINGLE STEP CRC
0003          RDLYC   EQU     03H     ;READ DELAY COUNTER
00C9          SYNCC   EQU     0C9H    ;SYNC CHARACTER
0010          EPA     EQU     10H     ;ENABLE PROCESSSOR ACCESS TO
                                      ;  DISK CONTROLLERS ONBOARD RAM
0000          EDC     EQU     00H     ;ENABLE DISK CONTROLLERS ACCESS
                                      ;  TO ITS ONBOARD RAM
0002          RDDLY   EQU     2       ;READ DELAY IN BYTES.
0000          DISKN   EQU     0       ;SPINDLE NUMBER
000C          NSECT   EQU     12      ;NUMBER OF SECTORS PER TRACK
0004          NSPPS   EQU     4       ;NUMBER OF SECTOR PULSES PER SEC
0030          NSPPT   EQU     NSECT*NSPPS     ;# OF SECTORPULSES/TRACK
0330          NCYL    EQU     816     ;# OF CYLINDERS 0-815
0005          NHEAD   EQU     5       ;# OF HEADS 0-4
```

```
0003            REDUN   EQU     3         ;REDUNANCY OF SECTOR ID INFO
                ;
                ; GENERAL MASKS AND FLAGS
                ;
C000            SSM     EQU     0C000H    ;STARTING ADDR OF SHARED MEMORY
                ; MEMORY ALIGNMENT CONSTANTS.
0006            N1K     EQU     6
0005            N2K     EQU     5
0004            N4K     EQU     4
0003            N8K     EQU     3
0002            N16K    EQU     2
0004            RBASC   EQU     N4K       ;RAM BOUNDARY ALIGNMENT SHIFT
                                          ;  COUNTER. USED TO DETERMINE
                                          ;  THE PHYSICAL RAM BOUNDARIES
                                          ;  FOR SIZING AND TESTTING
0001            NWAIT   EQU     1         ;# OF WAIT CYCLES / MEM ACCESS
000F            CLH04   EQU     0FH       ;CLEAR HIG ORDER 4 BITS
0007            CLHO5   EQU     07H       ;CLEAR HIGH ORDER 5 BITS
000F            CLHO4   EQU     0FH       ;CLEAR HIGH ORDER 4 BITS.
000C            CL2H4   EQU     0CH       ;CLEAR THE LOW 2 &  THE
                                          ;  TTHE HIGH 4  BITS.
0000            ZERO    EQU     00H
                ;
                ; DISK DRIVER LOCAL DEDICATED RAM
                ;
9460                    ORG     EGLOB
4204            TLRAM   EQU     $         ;TOP OF LOW LOCAL RAM.
4204 0000               DW      00H
4206            SECTC   EQU     $         ;SECTOR PULSE COUNT
4206 00                 DB      00H
4207            TCMB    EQU     $         ;TOP OF CURRENT MAILBOX
4207 0000               DW      00H
4209            DBASH   EQU     $         ;DBAS HEADER FIELD ON MAILBOXES
4209 0000               DW      00H
420B            MSGPD   EQU     $         ;MESSAGE PENDING COUNT
420B 00                 DB      00H
420C            SADDR   EQU     $         ;CURRENTLY ACTIVE SECTOR ADDRESS
420C 00                 DB      00H
420D            EDZIR   EQU     $         ;END OF ZEROE INITIALIZATION
                                          ;  REGION, IE ALL CONSTANTS
                                          ;  ABOVE THIS POINT ARE INITIAL-
                                          ;  TO ZERO.
420D            HADDR   EQU     $         ;LAST HEAD ADDR LOADED
420D 00                 DB      00H
420E            CADDR   EQU     $         ;LAST CYLINDER ADDR LOADED
420E 0000               DW      00H
4210            EDOIR   EQU     $         ;ALL VARIABLES IN THE ADDRESS
                                          ;  SPACE BETWEEN EDZIR AND HERE
                                          ;  WILL BE INITIALIZED TO OFFH
4210            FWRTF   EQU     $         ;FAKE WRITE(CRC GENERATION)
                                          ;  STATUS FLAG
4210 00                 DB      00H
4211            CIS     EQU     $         ;CURRENT INTERRUPT STATUS
4211 00                 DB      00H
4212            EDDDR   EQU     $         ;END OF DISK DRIVER DEDICATED RA
                ;
                ; DISK DRIVER LEVEL VECTOR TABLE
                ;
4212                    ORG     40H       ;MOVE PAST INTERRUPT VECTORS
0040            HLSVT   EQU     $         ;HIGH LEVEL SUBROUTINE VECTOR TA
0040            HLRD    EQU     $         ;HIGH LEVEL READ.
0040 0000               DW      00H
0042            HLWT    EQU     $         ;HIGH LEVEL WRITE
0042 0000               DW      00H
0044            INTLZ   EQU     $         ;REINITIALIZE
0044 0000               DW      00H
0046                    ORG     LCONS+10H        ;MOVE PAST BSIT
                ;
                ;  DELAY COUNT TABLE
                ;       THIS TABLE IS REFERENCED TO OBTAIN THE LENGTH
                ;       OF THE READ DELAY. THIS DELAY ENSURES THAT
                ;       A READ OPERATION WILL COMMENCE WITHIN THE
                ;       HEADER BLOCK OF THE SECTOR
                ;       FOR A T50 DRIVE EAC DELAY COUNT IS EQUAL TO
                ;       155 NANOSECONDS
```

```
                ;
0410            DCTBL   EQU     $         ;DELAY COUNT TABLE
0410 00                 DB      0         ;WRITE DELAY
0411 10                 DB      RDDLY*8   ;READ DELAY
                ;
                ;
                ; STROBE ADJUST TABLE
                ;       THIS TABLE IS INDEXED TO OBTAIN THE PROPER
                ;       READ OR WRITE COMMAND. ON READ IT ALSO
                ;       SPECIFIES THE SETTING OF THE
                ;       READ STROBE USED IN ERROR RECOVERY.
                ;
0412            SATBL   EQU     $         ;STROBE ADJUST TABLE
0412 04                 DB      BUS2      ;WRITE - NO STROBE
0413 08                 DB      BUS3      ;READ & NORMAL STROBE
0414 08                 DB      BUS3      ;  .  .    .      .
0415 08                 DB      BUS3      ;  .  .    .      .
0416 0A                 DB      BUS3+BUS1          ;READ & ADVANCE STROBE
0417 0A                 DB      BUS3+BUS1          ;  .  .    .      .
0418 09                 DB      BUS3+BUS0          ;READ & RETARD STROBE
0419 09                 DB      BUS3+BUS0          ;  .  .    .      .
041A 09                 DB      BUS3+BUS0          ;  .  .    .      .
041B 09                 DB      BUS3+BUS0          ;  .  .    .      .
041C 08                 DB      BUS3      ;READ & NORMAL STROBE
041D 08                 DB      BUS3      ;  .  .    .      .
041E 0A                 DB      BUS3+BUS1          ;READ & ADVANCE STROBE
041F 0A                 DB      BUS3+BUS1          ;  .  .    .      .
0420 0A                 DB      BUS3+BUS1          ;READ .    .      .
0421 0A                 DB      BUS3+BUS1          ;  .  .    .      .
0422 08                 DB      BUS3      ;READ & NORMAL STROBE
0423 08                 DB      BUS3      ;  .  .    .      .
0424 09                 DB      BUS3+BUS0          ;READ & RETARD STROBE
0425 09                 DB      BUS3+BUS0          ;  .  .    .      .

                ;
                ;
                ; HEAD OFFSET TABLE
                ;       THIS TABLE IS USED TO STORE THE HEAD OFFSET
                ;       SETTINGS FOR USE DURING IO OPERATIONS. THE
                ;       HEADS ARE ONLY OFFSET WHILE TRYING TO RECOVER
                ;       MARGINAL DATA.
                ;       THIS TABLE IS REFERENCED VIA THE READ ATTEMPT
                ;       COUNTER ( TRYCOUNT ). ALTHOUGTH TRYCOUNT CAN
                ;       HAVE VALUES UP TO 19 WHEN READING THE HEADS ARE
                ;       NOT OFFSET FOR THE FIRST 7 READ ATTEMPTS AND
                ;       FOR THOSE PASSES THIS TABLE IS NOT REFERRENCED
                ;
0426            HOTBL   EQU     $         ;HEAD OFFSET TABLE
0426 00                 DB      0         ;WRITE - NO OFFSET
0427 0C                 DB      BUS2+BUS3          ;OFFSET FORWARD
0428 0C                 DB      BUS2+BUS3          ;  .      .
0429 0C                 DB      BUS2+BUS3          ;  .      .
042A 0C                 DB      BUS2+BUS3          ;  .      .
042B 0C                 DB      BUS2+BUS3          ;  .      .
042C 0C                 DB      BUS2+BUS3          ;  .      .
042D 04                 DB      BUS2      ;OFFSET BACKWARD
042E 04                 DB      BUS2      ;  .      .
042F 04                 DB      BUS2      ;  .      .
0430 04                 DB      BUS2      ;  .      .
0431 04                 DB      BUS2      ;  .      .
0432 04                 DB      BUS2      ;  .      .
                ;
                ; ERROR MESSAGES
                ;
0433            EMSG1   EQU     $         ;INITIAL SEEK FAILURE
0433 24                 DB      EMSG2-EMSG1-1   ;LENGTH OF MSG.
0434 33303120           DB      '301 INITIAL SEEK FAILED ON POWER-UP.'
0438 494E4954
043C 49414C20
0440 5345454B
0444 20464149
0448 4C454420
044C 4F4E2050
0450 4F574552
0454 2D55502E
```

```
0458          EMSG2   EQU     $        ;DRIVE NOT  READY
0458 1F               DB      EMSG3-EMSG2-1   ;LENGTH OF MSG
0459 33303220         DB      '302 DRIVE CANNOT BE MADE READY.'
045D 44524956
0461 45204341
0465 4E4E4F54
0469 20424520
046D 4D414445
0471 20524541
0475 44592E
0478          EMSG3   EQU     $        ;DEVICE CHECK CONDITION CANNOT B
0478 23               DB      EMSG4-EMSG3-1   ;LENGTH OF MSG
0479 33303320         DB      '303 DEVICE CHECK CANNOT BE CLEARED.'
047D 44455649
0481 43452043
0485 4845434B
0489 2043414E
048D 4E4F5420
0491 42452043
0495 4C454152
0499 45442E
049C          EMSG4   EQU     $        ;INVALID TRACK ADDRESS PASSED
049C 24               DB      EMSG5-EMSG4-1   ;LENGTH OF MSG
049D 33303420         DB      '304 ILLEGAL TRACK ID - (0-815 ONLY).'
04A1 494C4C45
04A5 47414C20
04A9 54524143
04AD 4B204944
04B1 202D2028
04B5 302D3831
04B9 3520304E
04BD 4C59292E
04C1          EMSG5   EQU     $        ;INVALID HEAD ADDRESS REQUESTED.
04C1 20               DB      EMSG6-EMSG5-1   ;LENGTH OF MSG
04C2 33303520         DB      '305 ILLEGAL HEAD ID - (0-4 ONLY)'
04C6 494C4C45
04CA 47414C20
04CE 48454144
04D2 20494420
04D6 2D202830
04DA 2D34204F
04DE 4E4C5929
04E2          EMSG6   EQU     $        ;INVALID SECTOR ADDRESS
04E2 24               DB      EMSG7-EMSG6-1   ;LENGTH OF MSG
04E3 33303620         DB      '306 ILLEGAL SECTOR ID - (0-11 ONLY).'
04E7 494C4C45
04EB 47414C20
04EF 53454354
04F3 4F522049
04F7 44202D20
04FB 28302D31
04FF 31204F4E
0503 4C59292E
0507          EMSG7   EQU     $        ;RAM FAILURE
0507 2A               DB      EMSG8-EMSG7-1   ;LENGTH OF MSG
0508 33303720         DB      '307 RAM FAILURE IN DISK DRIVER LOCAL ME
050C 52414D20
0510 4641494C
0514 55524520
0518 494E2044
051C 49534B20
0520 44524956
0524 4552204C
0528 4F43414C
052C 204D454F
0530 5259
0532          EMSG8   EQU     $        ;BAD DATA ON DISK
0532 1E               DB      EMSG9-EMSG8-1   ;LENGTH OF MSG
0533 33303820         DB      '308 NON RECOVERABLE READ ERROR'
0537 4E4F4E20
053B 5245434F
053F 56455241
0543 424C4520
0547 52454144
054B 20455252
054F 4F52
```

```
0551             EMSG9   EQU     $          ;DEVICE CHECK DURING SEEK
0551 1C                  DB      EEMSG-EMSG9-1   ;LENGTH OF MSG
0552 33303920            DB      '309 DEVICE CHECK DURING SEEK'
0556 44455649
055A 43452043
055E 4845434B
0562 20445552
0566 494E4720
056A 5345454B
056E             EEMSG   EQU     $
                 ;
                 ;
                 ; DISK DRIVER LEVEL MACROS
                 ;
                 ;
                 ;  V I C  - VECTORED INTERRUPT CALL
                 ;               THIS MACRO HANDLES THE SETTING UP OF
                 ;               VECTORED INTERRUPT HANDLERS.
                 ;                IT TAKES TWO AGRUEMENTS,
                 ;                1. HRA - HANDLER ROUTINE ADDRESS.
                 ;                2. MASK - INTERUPT MASK, THE VALUE TO B
                 ;                   PRIORITY STATUS REGISTER OF THE PIC8
                 ;                            THE LEVEL AT WHICH INTERRUP
                 VIC     MACRO   HRA,MASK
                         ORG     (07 AND MASK)*8 ;CREATE LOW CORE PORTION
                         SAVE            ;PREEVERE CURRENT SYSTEM STATUS
                         JMP     HRA     ;INVOKE THE HANDLER
                         ORG     HRA     ;CONTINUE ASSEMBLY IN THE HANDLE
                         LDA     CIS     ;OBTAIN CURRENT INTRPT STATUS.
                         PUSH    PSW     ;SAVE IT.
                         ANI     0F0H    ;TURN OFF OLD PRIORITY INT &
                                         ;  AND PRESERVE CURRENT TIMER
                                         ;  SETTING
                         ORI     MASK    ;TURN THE NEW INT MASK BITS
                         STA     CIS     ;UPDATE CURRENT INTRPT STATUS
                         OUT     PIC8    ;MASK OUT LOWER PRIORITY INTERRU
                         EI              ;REENABLE
                         ENDM
                 ;
                 ;
                 ;  V I R  - VECTORED INTERRUPT RETURN
                 ;                 HANDLES RETURN FROM A VECTORED INTERRU
                 VIR     MACRO
                         DI              ;BLOCK INTERFERENCE
                         POP     PSW     ;RESTORE INT STATUS
                         STA     CIS     ;RESTORE INTRPT STATUS
                         OUT     PIC8
                         EI      ;ALLOW INTERRUPTS AFTER PRIORITY CHANGE
                         RESTR           ;RESTORE PRE-INTERRUPT STATUS
                         RET
                         ENDM
                 ;
                 ;
                 ;  D C T  - DEVICE CHECK TEST
                 ;           THIS MACRO HAS ONE PARAMETER ERADR WHICH IS
                 ;           OF THE ERROR RECOVERY ROUTINE THAT IS TO INV
                 ;           THE DEVICE CHECK CONDITION HAS BEEN RAISED.
                 ;           IT USES A & HL
                 DCT     MACRO   ERADR
                         LXI     H,DCW1  ;H -> DISK CONTROL WORD
                         MVI     A,DVCHK ;HAS THE DEVICEHECK CONDITION
                         ANA     M       ;  BEEN RAISED?
                         CNZ     ERADR   ;YES - CALL IN THE RECOVERY ROUT
                                         ;  OTHERWISE FALL THRU.
                         ENDM
                 ;
                 ;
                 ;  W A I T  - WAIT  MACRO
                 ;       THIS MACRO GENERATES A WAIT LOOP WHICH EXECUTE F
                 ;       MINIMUM TIME OF 'TIME' & AND A MAXIMUM TIME OF
                 ;       'TIME' + (15+4*NWAIT)/2 (APPROX. 7-10 US)
                 ;       IT TAKES ONE PARAMETER:
                 ;       1. TIME - THE TIME IN US OF THE REQUESTED WAIT
                 ;
                 WAIT    MACRO   TIME
```

```
MTIME    EQU     (NWAIT*2) + 7    ;TIME TAKEN BY MVI INSTR
LTIME    EQU     (NWAIT*4) + 15   ;TIME TAKEN BY EACH PASS
                                  ;  THE WAIT LOOP.
TLTME    EQU     (TIME*2)-MTIME   ;TOTAL TIME TO BE CONSUM
                                  ;  BY THE LOOP
WAITC    EQU     (TLTME/LTIME)+1 ;# OF WAIT LOOP PASSES
         MVI     A,WAITC ;LOAD WAIT COUNTER
WLOOP    EQU     $        ;WAIT LOOP
         DCR     A        ;IS OUR WAIT COMPLETE?
         JNZ     WLOOP    ;NO - KEEP LOOPPING
         ENDM
;
;
; T T L  - TOGGLE TAG LINES
;          THIS MACRO TURNS THE VARIOUS TAG LINES ON AND
;          IT TAKES 2 ARGUEMENTS:
;          1. MASK - SPECIFIES WHICH TAG LINE IS TO BE
;                    TOGGLED.
;          2.SETH -1 IF HL IS TO INITIALIZED OTHERWISE 0
;
TTL      MACRO   MASK,SETH
         IF      SETH
         LXI     H,SETH  ;H -> TAG LINES DCW
         ENDIF
         POP     PSW     ;GET CURRENT STATE OF BUS8-9
         ORI     MASK    ;TURN THE THE TAG LINES
         MOV     M,A     ;PLACE THEM ON THE BUS
         MVI     M,CLTAG ;RESET TAG  LINE AND BUS 8-9
         ENDM
;
;
; A B O R T  - ABORT MACRO
;        THIS MACRO HANDLES THE ABORTING OF A USER TASK.
;        IT TAKES TWO PARAMETERS:
;        ADDR - WHICH IS THE ADDRESS OF AN ERROR MSG BLOC
;        FLAG - 0 SIGNIFIES THAT THE ERROR AROSE IN
;                 RESPONSE TO A MSG FROM DBAS (IE A
;                 MAILBOX ALREADY EXSISTS FOR IT.)
;             = 1 THE ERROR AROSE INTERNALLY TO THE
;                 DISK DRIVER LEVEL. (IE NO MAILBOX
;                 EXSISTS TO TRANSMIT THE MSG.)
;
ABORT    MACRO   ADDR,FLAG
         IF      FLAG-1
         LXI     D,ADDR  ;D -> ERROR MSG
         JMP     SAMSG   ;SEND ABORT MSG TO DBAS
         ENDIF
         IF      FLAG
         LXI     H,ADDR  ;GET POINTER TO ERROR MSG
         PUSH    H       ;STORE MESSAGE PIONTER IN
                         ;  PLACE OF THE MAILBOX PTR
         LXI     H,MSGPD ;DE -> # OF PENDING MSGS
         INR     M       ;BUMP IT
         JMP     DDLRM   ;RETURN TO MONITOR AND
                         ; AWAIT THE ARRIVAL OF A MAILBOX
         ENDIF
         ENDM
;
;
0600            CODE     EQU     LCONS+(((EEMSG-BSIT)/100H)+1)*100H
                                 ;COMPUTES THE FIRST PROM BOUNDAR
                                 ;  (1/4 K) ABOVE THE CONSTANTS
056E                     ORG     CODE    ;MOVE ABOVE THE CONSTANTS.
;
;
; POWER UP INTERRUPT HANDLER
;
0600            PUIH     EQU     $
0600                     ORG     0
0000 F3                  DI              ;BLOCK INTERFERENCE
0001 C30006              JMP     PUIH    ;INVOKE THE HANDLER
0004                     ORG     PUIH
0600 21FFFF              LXI     H,PUWF  ;HL => POWER-UP WAIT FLAG
0603 97                  SUB     A       ;PLACE POWER UP OK FLAG IN A
0604            W4PUG    EQU     $       ;WAIT FOR POWER-UP GO AHEAD.
```

```
                 ;!!!!! TIME OUT HERE LATER.
0604 BE                 CMP     M          ;HAS THE MASTER MPU INITIALIZED
                                           ;  SHARED MEMORY & SYS GLOBALS?
0605 C20406             JNZ     W4PUG      ;IF SO THEN FALL THRU,
                                           ;  ELSE KEEP WAITTING.
                 ;POWER UP GOAHEAD GIVEN PREFORM OWN INITIALIZATION.
                 ;INITIALIZE LOCAL RAM
0608 310642             LXI     SP,TLRAM+2       ;SP -> LOC OF THE
                                           ;  ADDR OF THE HIGHEST BYTE OF
                                           ;  LOCAL RAM
060B 210042             LXI     H,RAM      ;HL -> FIRST BYTE OF RAM TO BE
                                           ;  SIZED.
060E CD2D0A             CALL    SIZEM      ;SIZE RAM, RETURNS HIGHEST BYTE
                                           ;  OF RAM IN HL
0611 E5                 PUSH    H          ;SAVE THE ADDR JUST COMPUTED
0612 F9                 SPHL               ;SET SP TO TOP OF LOCAL RAM
0613 210642             LXI     H,SECTC    ;HL -> FISRT BYTE OF LOCAL RAM
                                           ;  TO BE INITIALIZED.
0616 0607               MVI     B,EDZIR-SECTC    ;COMPUTE THE LENGTH
                                           ;  OF THE AREA TO BE ZEROED.
0618 0E00               MVI     C,ZERO     ;SPECIFY INITIAL VALUE
061A CDFB09             CALL    FILL       ;ZERO OUT SPECIFIED AREA
061D 0603               MVI     B,EDOIR-EDZIR    ;COPUTE LENGTH OF AREA
                                           ; TO BE ONED
061F 0EFF               MVI     C,0FFH     ;FILL WITH ALL ONES
0621 CDFB09             CALL    FILL       ;FIILL SPECIFIED AREA WITH ONES
0624 36F0               MVI     M,FWRT+SECTI+INDXI+EPA   ;INITIALIZE
                                           ;  THE FAKE WRITE FLAG(IE DCW4
                                           ;  STATUS) FOR REAL WRITES,
                                           ;  CLEAR INTERRUPT FLIPFLOPS
                                           ;  & ALLOW PROCESSOR ACCESS TO
                                           ;  THE DISK BUFFER
                 ;INITIALIZE THE PIC8 PRIORITY INTERUPT CONTROLLER.
0626 23                 INX     H          ;HL -> CIS(CURRENT INT STATUS)
0627 3E08               MVI     A,VI0      ;SET FLAG TO ENABLE ALL INTRPTS
0629 77                 MOV     M,A        ;UPDATE CIS
062A D3FE               OUT     PIC8       ;SET THE PIC8'S PRIORITY STATUS
                                           ;  REGISTER.
                 ;INITIALZE THE 8255 PROGRAMMABLE PERIPHERAL INTERFACE
062C 210397             LXI     H,DCW3     ;HL -> 8255 PPI#1 MODE CONTROL W
062F 3692               MVI     M,IPPI1    ;INITIALIZE IT
0631 210797             LXI     H,DCW7     ;HL -> 8255 PPI#2 MODE CONTROL W
0634 3682               MVI     M,IPPI2    ;INITIALIZE IT
                 ;CLEAR THE INTERRUPT LATCHES
0636 3E60               MVI     A,OVRNI    ;CLEAR THE SECTOR AND INDEX INTS
0638 CD580A             CALL    CLRIN      ;  .   .   .   .   .   .   .
063B 3E08               MVI     A,CLCRC    ;CLEAR THE CRC LOGIC
063D CD580A             CALL    CLRIN      ;  .   .   .   .
                 ;POWER UP THE DRIVE
0640 210697             LXI     H,DCW6     ;HL -> DISK STATUS
0643 3604               MVI     M,SSEQ     ;SET SEQUENCE
0645 CD0709             CALL    ISRS       ;GO ISSUE SELECT & WAIT FOR
                                           ;  SELECTED TO COME UP
0648 FB                 EI                 ;ALLOW INTERRUPTS
0649             W4ATN  EQU     $          ;WAIT FOR ATTENTION
0649 3E40               MVI     A,ATTN     ;HAS THE ATTENTION FLAG BEEN
064B A6                 ANA     M          ;  RAISED?
064C C25806             JNZ     DDLI       ;IF SO THEN GO INITIALIZE THE DI
                                           ;  DRIVER LEVEL (DDL).
064F 3E01               MVI     A,SKINC    ;HAS AN INCOMPLETE SEEK CONDITON
0651 A6                 ANA     M          ;  BEEN RAISED?
0652 C24906             JNZ     W4ATN      ;IF NOT THEN KEEP WAITTING,
0655 C3C80A             JMP     ERR1       ;  ELSE FLAG IT AN ERROR.
0658             DDLI   EQU     $          ;DISK DRIVER LEVEL INITIALIZATIO
                 ;INSURE PROPER ALIGNMENT OF THE SECTOR COUNT
0658 210C42             LXI     H,SADDR    ;HL -> SECTOR ADDR FIELD
065B 3601               MVI     M,1        ;WAIT FOR SECTOR 1
065D CD1609             CALL    FINDS      ;GET CONTROL BACK AT SECTOR 0
                        WAIT    340        ;MAKE SURE THAT WE REALLY HAD
0009             MTIME  EQU     (NWAIT*2) + 7    ;TIME TAKEN BY MVI INSTR
0013             LTIME  EQU     (NWAIT*4) + 15   ;TIME TAKEN BY EACH PASS
                                           ;  THE WAIT LOOP.
029F             TLTME  EQU     (00154H*2)-MTIME       ;TOTAL TIME TO B
                                           ;  BY THE LOOP
0024             WAITC  EQU     (TLTME/LTIME)+1  ;# OF WAIT LOOP PASSES
```

```
0660 3E24            MVI    A,WAITC ;LOAD WAIT COUNTER
0662         WLOOP   EQU    $       ;WAIT LOOP
0662 3D              DCR    A       ;IS OUR WAIT COMPLETE?
0663 C26206          JNZ    WLOOP   ;NO - KEEP LOOPPING

                                    ;  HAD SECTOR 0 BY WAITING 1 REV
0666 35              DCR    M       ;SET SECTOR ADDR = 0
0667 CD1609          CALL   FINDS   ;RESYNC TO SECTOR 0
066A C30707          JMP    DDLRM   ;INVOKE THE DISK DRIVER LEVEL  R

             ;
             ;
             ; OVERRUN INTERRUPT HANDLER.
             ;
066D         OIH     EQU    $       ;OVERRUN INTERRUPT HANDLER.
066D                 ORG    48      ;SET UP INTERRUPT VECTOR AREA
                     SAVE           ;SAVE CURRENT SYSTEM STATUS
0030 F5              PUSH   PSW
0031 C5              PUSH   B
0032 D5              PUSH   D
0033 E5              PUSH   H

0034 C36D06          JMP    OIH     ;INVOKE THE HANDLER
0037                 ORG    OIH
066D 3E60            MVI    A,OVRNI ;CLEAR ANY PENDING
                                    ;  SECTOR OR INDEX INTERRUPTS.
066F CD580A          CALL   CLRIN   ;    .     .     .     .
0672 3A1142          LDA    CIS     ;GET CURRENT INTERRUPT STAUS
0675 D3FE            OUT    PIC8    ;RESET THE INTERRUPT STATUS
                                    ;  TO ALLOW FURTHER  INTS
0677 FB              EI             ;ALLOW OTHER INTS THRU
0678 210642          LXI    H,SECTC ;HL -> CURRENT SECTOR COUNT
067B 3E00            MVI    A,ZERO  ;
067D         RS2I    EQU    $       ;RESYNC TO INDEX MARK
067D BE              CMP    M       ;HAS THE SECTOR COUNT BEEN RESET
067E C27D06          JNZ    RS2I    ;NO - WAIT FOR NEXT INDEX MARK
                     RESTR          ;YES - RETURN TO INTERRUPT TASK
0681 E1              POP    H
0682 D1              POP    D
0683 C1              POP    B
0684 F1              POP    PSW

0685 C9              RET
             ;
             ;
             ;INDEX MARK INTERRUPT HANDLER.
             ;
0686         IMIH    EQU    $       ;INDEX MARK INTERRUPT HANDLER.
                     VIC    IMIH,VI5
0686                 ORG    (07 AND VI5)*8  ;CREATE LOW CORE PORTION
                     SAVE           ;PREEVERE CURRENT SYSTEM STATUS
0028 F5              PUSH   PSW
0029 C5              PUSH   B
002A D5              PUSH   D
002B E5              PUSH   H

002C C38606          JMP    IMIH    ;INVOKE THE HANDLER
002F                 ORG    IMIH    ;CONTINUE ASSEMBLY IN THE HANDLE
0686 3A1142          LDA    CIS     ;OBTAIN CURRENT INTRPT STATUS.
0689 F5              PUSH   PSW     ;SAVE IT.
068A E6F0            ANI    0F0H    ;TURN OFF OLD PRIORITY INT &
                                    ;  AND PRESERVE CURRENT TIMER
                                    ;  SETTING
068C F605            ORI    VI5     ;TURN THE NEW INT MASK BITS
068E 321142          STA    CIS     ;UPDATE CURRENT INTRPT STATUS
0691 D3FE            OUT    PIC8    ;MASK OUT LOWER PRIORITY INTERRU
0693 FB              EI             ;REENABLE

0694 3E40            MVI    A,INDXI ;CLEAR INDEX INTERRUPT
0696 CD580A          CALL   CLRIN   ;    .     .     .
0699 210642          LXI    H,SECTC ;RESET SECTOR COUNT

069C 36FF            MVI    M,0FFH  ;RESET SECTOR COUNT FOR PENDING
                                    ;(NOTE THAT A SECTOR INT IS ALWA
                                    ;  AT THE COMPLETION OF AN INDEX
```

```
                                VIR
069E F3                         DI              ;BLOCK INTERFERENCE
069F F1                         POP     PSW     ;RESTORE INT STATUS
06A0 321142                     STA     CIS     ;RESTORE INTRPT STATUS
06A3 D3FE                       OUT     PIC8
06A5 FB                         EI      ;ALLOW INTERRUPTS AFTER PRIORITY CHANGE
                                RESTR           ;RESTORE PRE-INTERRUPT STATUS
06A6 E1                         POP     H
06A7 D1                         POP     D
06A8 C1                         POP     B
06A9 F1                         POP     PSW

06AA C9                         RET

                                                ;  ELSE KEEP WAITTING.

                        ;
                        ;
                        ;SECTOR MARK INTERRUPT HANDLER.
                        ;
06AB                    SMIH    EQU     $       ;SECTOR MARK INTERRUPT HANDLER.
                                VIC     SMIH,VI4
06AB                            ORG     (07 AND VI4)*8  ;CREATE LOW CORE PORTION
                                SAVE            ;PREEVERE CURRENT SYSTEM STATUS
0020 F5                         PUSH    PSW
0021 C5                         PUSH    B
0022 D5                         PUSH    D
0023 E5                         PUSH    H

0024 C3AB06                     JMP     SMIH    ;INVOKE THE HANDLER
0027                            ORG     SMIH    ;CONTINUE ASSEMBLY IN THE HANDLE
06AB 3A1142                     LDA     CIS     ;OBTAIN CURRENT INTRPT STATUS.
06AE F5                         PUSH    PSW     ;SAVE IT.
06AF E6F0                       ANI     0F0H    ;TURN OFF OLD PRIORITY INT &
                                                ;  AND PRESERVE CURRENT TIMER
                                                ;  SETTING
06B1 F604                       ORI     VI4     ;TURN THE NEW INT MASK BITS
06B3 321142                     STA     CIS     ;UPDATE CURRENT INTRPT STATUS
06B6 D3FE                       OUT     PIC8    ;MASK OUT LOWER PRIORITY INTERRU
06B8 FB                         EI              ;REENABLE

06B9 3E20                       MVI     A,SECTI ;CLEAR SECTOR INT
06BB CD580A                     CALL    CLRIN   ;  .    .    .
06BE 210642                     LXI     H,SECTC ;HL -> SECTOR PULSE COUNTER
06C1 34                         INR     M       ;BUMP IT
06C2 3E30                       MVI     A,NSPPT ;SET MAX # OF PULSES ALLOWED
06C4 BE                         CMP     M       ;HAS THE SECTOR PULSE COUNTER OV
06C5 F2CE06                     JP      SIRET   ;NO - PROCEED TO NORMAL EXIT
                        ;SECTOR HAS BEEN LOST RESYNC TO NEXT INDEX MARK
06C8 3E00                       MVI     A,ZERO  ;WAIT FOR SECTOR 0
06CA                    W4I2R   EQU     $       ;WAIT FOR INDEX PULSE TO RESYNC
06CA BE                         CMP     M       ;HAS THE INDEX PULSE ARRIVED
06CB C2CA06                     JNZ     W4I2R   ;NO SUCH LUCK - KEEP WAITTTING
06CE                    SIRET   EQU     $

                                VIR
06CE F3                         DI              ;BLOCK INTERFERENCE
06CF F1                         POP     PSW     ;RESTORE INT STATUS
06D0 321142                     STA     CIS     ;RESTORE INTRPT STATUS
06D3 D3FE                       OUT     PIC8
06D5 FB                         EI      ;ALLOW INTERRUPTS AFTER PRIORITY CHANGE
                                RESTR           ;RESTORE PRE-INTERRUPT STATUS
06D6 E1                         POP     H
06D7 D1                         POP     D
06D8 C1                         POP     B
06D9 F1                         POP     PSW

06DA C9                         RET

                        ;
                        ;
                        ; ATTENTION INTERRUPT HANDLER.
                        ;
06DB                    ATNIH   EQU     $
                                VIC     ATNIH,VI1
06DB                            ORG     (07 AND VI1)*8  ;CREATE LOW CORE PORTION
```

```
                       SAVE              ;PREEVERE CURRENT SYSTEM STATUS
0008 F5                PUSH    PSW
0009 C5                PUSH    B
000A D5                PUSH    D
000B E5                PUSH    H

000C C3DB06            JMP     ATNIH     ;INVOKE THE HANDLER
000F                   ORG     ATNIH     ;CONTINUE ASSEMBLY IN THE HANDLE
06DB 3A1142            LDA     CIS       ;OBTAIN CURRENT INTRPT STATUS.
06DE F5                PUSH    PSW       ;SAVE IT.
06DF E6F0              ANI     0F0H      ;TURN OFF OLD PRIORITY INT &
                                         ;  AND PRESERVE CURRENT TIMER
                                         ;  SETTING
06E1 F601              ORI     VI1       ;TURN THE NEW INT MASK BITS
06E3 321142            STA     CIS       ;UPDATE CURRENT INTRPT STATUS
06E6 D3FE              OUT     PIC8      ;MASK OUT LOWER PRIORITY INTERRU
06E8 FB                EI                ;REENABLE

            ;FAKE A READ TO RESET ATTENTION INTERRUPT
06E9 210297            LXI     H,DCW2    ;HL -> DCW2
06EC 3608              MVI     M,BUS3    ;PLACE A READ COMMAND ON THE BUS
06EE 210697            LXI     H,DCW6    ;HL -> DCW6 (TAG LINES&HIGH BUS)
06F1 361C              MVI     M,CTAG    ;RAISE THE CONTROL TAG
06F3 360C              MVI     M,CLTAG   ;LOWER THE CONTROL TAG
06F5 210297            LXI     H,DCW2    ;HL -> DCW2 (BUS)
06F8 3600              MVI     M,ZERO    ;CLEAR THE BUS
            ;ROUTINES HALT ON ATTN WAIT ALLOW THEN TO CONTINUE UPPON
                       VIR
06FA F3                DI                ;BLOCK INTERFERENCE
06FB F1                POP     PSW       ;RESTORE INT STATUS
06FC 321142            STA     CIS       ;RESTORE INTRPT STATUS
06FF D3FE              OUT     PIC8
0701 FB                EI      ;ALLOW INTERRUPTS AFTER PRIORITY CHANGE
                       RESTR             ;RESTORE PRE-INTERRUPT STATUS
0702 E1                POP     H
0703 D1                POP     D
0704 C1                POP     B
0705 F1                POP     PSW

0706 C9                RET
            ;
            ;
0707        DDLRM      EQU     $         ;DISK DRIVER LEVEL RESIDENT MONI
0707 CD0901            CALL    RCVT      ;ARE THERE ANY MESSAGES TO ME
070A C30707            JMP     DDLRM     ;NO - KEEP WAITING
070D        MSG4D      EQU     $         ;MESSAGE FOR DISK DRIVER LEVEL
070D 220742            SHLD    TCMB      ;SAVE START ADDR OF MAILBOX.
0710 010900            LXI     B,MDDID   ;GET OFFSET OF MAILBOX'S DISK ID
0713 09                DAD     B         ;COMPUTE ADDR.
0714 3E00              MVI     A,DISKN   ;GET YOUR SPINDLE NUMBER
0716 BE                CMP     M         ;IS THIS MSG FOR ME?
0717 CA2307            JZ      MSGFD     ;YES - MSG FOR ME FOUND
071A CD0F01            CALL    RIGNR     ;NO - IGNORE THIS MESSAGE SEE IF
                                         ;  ANOTHER  ONE.
071D C30707            JMP     DDLRM     ;NO MORE MSGS NOW
0720 C30D07            JMP     MSG4D     ;ANOTHER DISK DRIVER MSG, SEE IF
                                         ;  ITS FOR ME.
0723        MSGFD      EQU     $         ;MESSAGE TO MY SPINDLE FOUND
0723 210B42            LXI     H,MSGPD   ;HL -> # OF CURRENTLY PENDING
                                         ;  MESSAGES.
0726 7E                MOV     A,M       ;SET THE CONDITION CODES
0727 A7                ANA     A         ; .   .    .    .   .
0728 CA3107            JZ      NPMSG     ;NO MSGS ARE PENDDING SKIP DOWN
072B 3D                DCR     A         ;REDUCE # OF MSGS PENDDING
072C 77                MOV     M,A       ;UPDATE THE COUNTER
072D E1                POP     H         ;PICK UP ERROR MSG POINTER
072E C3A70A            JMP     SAMSG     ;SEND AN ABORT MSG
0731        NPMSG      EQU     $         ;NO PENDING MESSAGES
0731 2A0742            LHLD    TCMB      ;GET STARTING ADDR OF MAILBOX
0734 7E                MOV     A,M       ;GET CURRENT  REQUEST
0735 17                RAL               ;COMPUTE AN OFFSET
0736 4F                MOV     C,A       ;   .    .    .
0737 0600              MVI     B,ZERO    ;   .    .    .
0739 214000            LXI     H,HLSVT   ;H  -> BASE ADDR OF VECTO TABLE
073C 09                DAD     B         ;COMPUTE ADDR
```

```
073D 014207            LXI    B,RMRET ;STASH A RETURN ADDR ON  THE STA
0740 C5                PUSH   B       ;
0741 E9                PCHL           ;INVOKE THE HIGH LEVEL SUBROUTIN
                                      ;  THAT HANDLES THE CURRENT REQU
0742            RMRET  EQU    $       ;RESIDENT MONITOR RETURN.
0742 C30707            JMP    DDLRM   ;SEE IF ANY MORE MSGS EXSIST
                ;
                ;
                ; HLVRD - HIGH LEVEL READ ROUTINE
                ;       THIS ROUTINE HANDLES THE HIGH LEVEL READ PROTOCO
                ;       IT EXPECTS DE -> THE START OF THE MAILBOX
                ;
                ;
0745            HLVRD  EQU    $       ;HIGH LEVEL READ
0745                   ORG    HLRD    ;SET LOW CORE VECTOR
0040 4507              DW     HLVRD   ; .   . .  .     .
0042                   ORG    HLVRD   ; .   .    .     .
0745 CD6E07            CALL   GCHFM   ;GET CYL & HEAD ADDRS FROM MAILB
0748 CDF307            CALL   SEEK
074B CD9407            CALL   GSAFM   ;GET SECTOR ADDR FROM MAIL BOX
074E CDCA08            CALL   READ    ;READ THE SECTOR
                       RESTR
0751 E1                POP    H
0752 D1                POP    D
0753 C1                POP    B
0754 F1                POP    PSW

0755 C9                RET
                ;
                ;
                ;  HLVWT - HIG LEVEL WRITE  ROUTINE
                ;       THIS ROUTINE HANDLES THE HIIGH LEVEL  WRITE PRTO
                ;
                ;
0756            HLVWT  EQU    $       ;HIGH LEVEL WRITE ROUTINE
0756                   ORG    HLWT    ;BUILD LOW CORE VECTOR
0042 5607              DW     HLVWT   ;  .    .  .    .
0044                   ORG    HLVWT   ;  .    .   .     .
                       SAVE
0756 F5                PUSH   PSW
0757 C5                PUSH   B
0758 D5                PUSH   D
0759 E5                PUSH   H

075A CD6E07            CALL   GCHFM   ;GET CYL & HEAD ADDR FROM MAILBO
075D CDF307            CALL   SEEK    ;FIND THE CYLINDER & LOAD THE HE
0760 CD9407            CALL   GSAFM   ;GET SECTOR ADR FROM MAILBOX.
0763 CDAA07            CALL   LOADB   ;LOAD THE CONTROLLERS BUFFER.
0766 CD8608            CALL   WRITE
                       RESTR
0769 E1                POP    H
076A D1                POP    D
076B C1                POP    B
076C F1                POP    PSW

076D C9                RET
                ;
                ;
                ;GCHFM - GET  CYLINDER  AND HEAD FROM THE MAILBOX
                ;       THIS ROUTINE PARSES OUT THE SECTOR & HEAD INFO
                ;       FROM THE MAILBOX AND PUTS IT INTO THE FORMAT
                ;       EXPECTED BY THE SEEK ROUTINE.
                ;       INPUTS - POINTER TO A VALID MAILBOX IN TCMB
                ;       OUPUTS - BC PACKED WITH CYLINDER AND HEAD
                ;                 ADDRESSES.
                ;
                ;
076E            GCHFM  EQU    $
076E 2A0742            LHLD   TCMB    ;HL -> TOP OF CURRENT MAILBOX
0771 010A00            LXI    B,MDTID ;GET OFFSET OF CYLINDER ADDR
0774 09                DAD    B       ;COMPUTE ADDR
0775 46                MOV    B,M     ;PICK HIGH ORDER CYLINDER ADDR
0776 23                INX    H       ;H -> LOW ORDER BYTE OF CYL ADDR
0777 4E                MOV    C,M     ;PICK UP LOW ORDER BYTE OF CYL A
```

```
                ;CHECK FOR VALIDITY
0778 E5                 PUSH    H           ;SAVE MIALBOX POINTER
0779 21CEFC             LXI     H,0FFFFH-NCYL-1 ;TEST FOR CYL ADDR IN
077C 09                 DAD     B           ;  RANGE OF 0 TO 815
077D DADF0A             JC      ERR4
0780 E1                 POP     H           ;RESTORE HL -> MAILBOX
0781 23                 INX     H           ;H -> HEAAD  ADDR
0782 7E                 MOV     A,M         ;GET HEAD ADDR
0783 FE00               CPI     0           ;IS HEAD ADDR < 0?
0785 FAE50A             JM      ERR5        ;YES - ADDR INVALID ABORT
0788 FE0C               CPI     NSECT       ;IS HEAD ADDR >4?
078A F2E50A             JP      ERR5        ;YES - ADDR INVALID, ABORT
078D 17                 RAL                 ;MOV IT OUT OF THE WAY OF THE SE
078E 17                 RAL
078F E60C               ANI     CL2H4       ;CLEAR OFF THE EXTRANEOUOS GARBA
0791 B0                 ORA     B           ;GET HIGH ORDER  CCYL  ADDR BITS
0792 47                 MOV     B,A         ;PUT THE PACKED ADDR IN B
0793 C9                 RET
                ;
                ;
                ; GSAFM - GET SECTOR ADDRESS FROM MAILBOX
                ;
                ;
0794            GSAFM   EQU     $           ;PICK UP SECTOR ADDR FROM MAILBO
0794 2A0742             LHLD    TCMB        ;HL -> TOP OF CURRENT MAILBOX
0797 010100             LXI     B,MDSID-MDHID   ;COMPUTE OFFSET FROM HEA
079A 09                 DAD     B           ;COMPUTE ADDR.
079B 7E                 MOV     A,M         ;PICK UP SECTOR  NUMBER
                ;CHECK SECTOR ADDRESS FOR VALIDITY
079C FE00               CPI     0           ;IS SECTOR ADDR <0 ?
079E FAEB0A             JM      ERR6        ;YES - SECTOR ADDR INVALID,ABORT
07A1 FE0C               CPI     NSECT       ;IS SECTOR ADDR > 11 ?
07A3 F2EB0A             JP      ERR6        ;YES - SECTOR ADDR INVALID,ABORT
07A6 320C42             STA     SADDR       ;PLACE VALID ADDR IN CORE
07A9 C9                 RET
                ;
                ;
                ; LOADB - LOAD DISK CONTROLLERS BUFFEP
                ;       THIS ROUTINE PREFORMS THE FOLLOWING TASKS
                ;               1.BUILDS THE SECTOR HEADER OF 0'S
                ;               2.INSERTS THE SYNC BYTE
                ;               3.ADDS THE SECTOR ID FIELD
                ;               4. MOVES THE DATA FROM THE MAILBOX
                ;               5.BUILDS THE SECTOR TRAILER OF ZEROES
                ;
07AA            LOADB   EQU     $           ;LOAD DISK CONTROLLER BUFFER
                        SAVE
07AA F5                 PUSH    PSW
07AB C5                 PUSH    B
07AC D5                 PUSH    D
07AD E5                 PUSH    H

                ;BUILD THE SECTOR HEADER
07AE 213494             LXI     H,HDR       ;HL -> HEADER FEILD
07B1 062C               MVI     B,HDRL      ;SET LENGTH
07B3 0E00               MVI     C,ZERO      ;FILL CONSTANT = 0
07B5 CDFB09             CALL    FILL        ;PUT ZEROES IN HEADER

                ;INSERT SYNC
07B8 213394             LXI     H,SYNC      ;HL -> BYTE IN BUFFER
07BB 36C9               MVI     M,SYNCC     ;JAM IN THE SYNC CHAR

                ;GET THE SECTOR ID
07BD 210742             LXI     H,TCMB      ;HL -> CURRENT MAILBOX
07C0 010A00             LXI     B,MDTID     ;GET OFFSET TO ID INFO
07C3 09                 DAD     B           ;COMPUTE ADDR OF ID INFO START
07C4 3E04               MVI     A,IDL/REDUN     ;COMPUTE THE LENGTH OF
                                            ;  THE ID INFO NEEDED TO FIT
                                            ;  IN THE SECTORS ID FIELD
07C6 0603               MVI     B,REDUN     ;SET THE REDUNACY WITH WHICH THE
                                            ;  SECTOR ID WILL BE WRITTEN
07C8 112794             LXI     D,ID        ;DE -> ID FIELD IN THE DISK BFR
07CB            LID     EQU     $           ;LOAD ID FROM MAILBOX TO DISK
07CB CDE309             CALL    MOVE        ;MOVE A IDIVIDUAL COPY OF THE ID
07CE 13                 INX     D           ;BUMP DE TO THE ID SLOT IN THE
```

```
07CF 13                 INX    D        ; .  .  .  .  .  .    .  .  .
07D0 13                 INX    D        ; .  .  .  .  .  .    .  .  .
07D1 13                 INX    D        ; .  .  .  .  .  .    .  .  .
07D2 05                 DCR    B        ;HAS THE ID INFO BEEN WRITTEN
                                        ;  ENOUGH TIMES TO SATISFY THE
                                        ;  REQUIRED REDUNDANCY?
07D3 C2CB07             JNZ    LID      ;NO - KEEPING WRITTING

                ;MOVE THE DATA INTO THE BUFFER
07D6 010400             LXI    B,MDDAT-MDTID    ;COMPUTE OFFSET TO START
                                        ;  OF DATA AREA IN MAILBOX
07D9 09                 DAD    B        ;COMPUTE ADDR OF DATA
07DA 112790             LXI    D,DATA   ;DE -> DATA FIELD IN DISK BFR
07DD 97                 SUB    A        ;SET A TO INDICATE A LONG MOVE
07DE 010004             LXI    B,DATAL  ;SPECIFY LENGTH OF DATA TO MOVE
07E1 CDE309             CALL   MOVE     ;MOVE THE DATA IN THE DISK BFR

                ;BUILD THE SECTOR TRAILER
07E4 210090             LXI    H,TRLR   ;HL -> TRAILER FIELD IN DISK BFR
07E7 0623               MVI    B,TRLRL  ;SET LENGTH OF AREA TO BE FILLED
07E9 0E00               MVI    C,ZERO   ;SET FILL CONSTANT = 0
07EB CDFB09             CALL   FILL     ;FILL TRAILER WITH 0'S
                        RESTR
07EE E1                 POP    H
07EF D1                 POP    D
07F0 C1                 POP    B
07F1 F1                 POP    PSW

07F2 C9                 RET
                ;
                ;
                ; SEEK SUBROUTINE
                ;       BC - CONTAIN THE HEAD & CYLINDER ADDRESS.
                ;              BITS 0-1 OF B & ALL OF C CONTAIN THE
                ;                CYLINDER ADDR, WITH B BIT1 BEING THE M
                ;              BITS 2-4 OF B ARE THE HEAD ADDRESS,
                ;                WITH BIT 4 BEING THE MSB.
07F3            SEEK    EQU    $
                        SAVE
07F3 F5                 PUSH   PSW
07F4 C5                 PUSH   B
07F5 D5                 PUSH   D
07F6 E5                 PUSH   H

07F7 CD0709             CALL ISRS       ;ISSUE SELECT, RECIEVE SELECTED.
07FA 3E18               MVI    A,RDYOF  ;CHECK FOR BUSY OR OFFSET HEADS
07FC A6                 ANA    M        ;  BEING  SET.
07FD CAD30A             JZ     ERR2     ;IF THEY ARE SET SET THEN FLAG A
                                        ;  ELSE FALL THRU
                        DCT    DVCHR    ;DEVICE HECK CONDITOIN RAISED ?
0800 210197             LXI    H,DCW1   ;H -> DISK CONTROL WORD
0803 3E01               MVI    A,DVCHK  ;HAS THE DEVICEHECK CONDITION
0805 A6                 ANA    M        ;  BEEN RAISED?
0806 C42C09             CNZ    DVCHR    ;YES - CALL IN THE RECOVERY ROUT
                                        ;  OTHERWISE FALL THRU.

                ; PLACE HEAD ADDRES ON THE BUS
0809 78                 MOV    A,B      ;GET HEAD ADDRESS
080A 0F                 RRC             ;RIGHT JUSTIFY & CLEAR
080B 0F                 RRC             ; .     .     .     .
080C E607               ANI    BUS9+BUS8+BUS2 ;   .     .     .
080E CD6409             CALL   GIBS     ;INVERT HEAD ADDRESS
                ;CHECK TO SEE IF THE HEADS SHOULD BE RELOADED.
0811 210D42             LXI    H,HADDR  ;HL -> LAST HEAD ADDR
0814 BE                 CMP    M        ;HAS THE HEAD ADDR CHANGED?
0815 CA2108             JZ     CCYLA    ;NO - SO THE HEADS WILL NOT HAVE
                                        ;  TO BE RELOADED.
0818 77                 MOV    M,A      ;SAVE THE INVERTED ADDR FOR
                                        ;  POSSIBLE HEAD RELOADING
                                        ;  DURING READ RECOVERY.
0819 C5                 PUSH   B        ;SAVE THE HEAD & CYLINDER ADDR
081A 010000             LXI    B,NHO    ;SPECIFY THAT NO OFFSET IS
                                        ;  REQUIRED.
081D CD770A             CALL   LHADR    ;LOAD THE HEADS
0820 C1                 POP    B        ;RESTORE HEAD & CYLINDER ADDR
```

```
                ;CHECK TO SEE IF THE CYLINDER ADDR HAS TO BE RELOADED
0821            CCYLA   EQU     $         ;CHECK CYLINDER ADDRESS
0821 210E42             LXI     H,CADDR ;HL -> LOW ORDER 8 CYLINDER
                                          ;  ADDRESS BITS
0824 79                 MOV     A,C       ;GET THE CURRENTLY REQUESTED CYL
0825 BE                 CMP     M         ;DO THEY MATCH?
0826 C23108             JNZ     RCYLA     ;NO - RELOAD THE CYLINDER ADDRES
0829 23                 INX     H         ;HL -> HIGH ORDER 2 BITS OF THE
                                          ;  OLD CYLINDER ADDRESS
082A 78                 MOV     A,B       ;GET THE REQUESTED HIGH ORDER
                                          ;  CYLINDER ADDRESS BITS
082B BE                 CMP     M         ;ARE THE CYLINDER ADDRS EQUAL?
082C E603               ANI     BUS8+BUS9         ;LOOK ONLY AT BUS9-8
082E CA8108             JZ      SKRET     ;YES - NO NEED TO RESEEK
0831            RCYLA   EQU     $         ;RELOAD CYLINDER ADDRESS
0831 70                 MOV     M,B       ;UPDATE THE CYLINDER ADDRESS
0832 2B                 DCX     H         ;HL -> AT LOW CYL ADDR FIELD
0833 70                 MOV     M,B       ;UPDATE
                ;PUT CYLINDER ADDRESS ON THE BUS AND SEND IT
0834 79                 MOV     A,C       ;GET 8 LSB OF CYL ADDR
0835 E603               ANI     BUS9+BUS8         ;CLEAR ALL BUT THE 2 LSB
0837 CD6409             CALL    GIBS      ;GET  THE INVERTED BIT STRING
083A 0F                 RRC               ;SINCE ONLY A 2 BIT SLICE IS
083B 0F                 RRC               ;  NEEDED , SHIFT OFF 2 RIGHT-
                                          ;  MOST BITS
083C F60C               ORI     CLTAG     ;KEEP SELECT & SEQUENCE ON.
083E F5                 PUSH    PSW       ;SAVE CURRENT STATE OF DCW6
083F 320697             STA     DCW6      ;SEND 2 LSB OF CYL ADDR
                                          ;  TO DISK
0842 79                 MOV     A,C       ;GET 8 LSB OF CYL ADDR
0843 E63C               ANI     BUS5+BUS4+BUS3+BUS2       ;ONLY LOOK AT TH
0845 0F                 RRC               ;RIGHT JUSTIFY
0846 0F                 RRC               ;  .     .
0847 CD6409             CALL    GIBS      ;GET THE INVERTED BIT STRING
084A 07                 RLC               ;LEFT JUSTIFY FOR PLACE-
084B 07                 RLC               ;  MENT INTO BBUS
084C 07                 RLC               ;  .    .    .
084D 07                 RLC               ;  .    .    .
084E 57                 MOV     D,A       ;SAVE A
084F 79                 MOV     A,C       ;GET 8 LSB OF CYL ADDR
0850 E6C0               ANI     0C0H      ;KEEP ONLY THE 2 HIGH BITS
0852 B0                 ORA     B         ;GET THE 2 MSB
0853 07                 RLC               ;RIGHT JUSTIFY THE
0854 07                 RLC               ;  4 MSB.
0855 E60F               ANI     CLHO4     ;CLEAR AWAY EXTRANEOUS BITS.
0857 CD6409             CALL    GIBS      ;GET  INVERTED BIT STRING
085A B2                 ORA     D         ;TURN ON HIGH ORDER 4BITS OF BUS
085B 320297             STA     DCW2      ;LOAD BUS7-0 ITH INVERTED CYL AD
085E            CYTG    EQU     $         ;RAISE CYLINDER TAG
                        TTL     CYTAG,DCW6        ;TOGGLE THE CYL ADDR TAG
                        IF      DCW6
085E 210697             LXI     H,DCW6  ;H -> TAG LINES DCW
                        ENDIF
0861 F1                 POP     PSW       ;GET CURRENT STATE OF BUS8-9
0862 F64C               ORI     CYTAG     ;TURN THE THE TAG LINES
0864 77                 MOV     M,A       ;PLACE THEM ON THE BUS
0865 360C               MVI     M,CLTAG ;RESET TAG  LINE AND BUS 8-9

0867 210297             LXI     H,DCW2  ;H -> BUS BITS 7-0
086A 3600               MVI     M,BUSCL ;CLLEAR THEM
086C 210097             LXI     H,DCW0  ;HL -> STATUS LINES FROM DISK
086F 3E08               MVI     A,READY ;LOOK FOR READY
0871            W4RDY   EQU     $         ;WAIT FOR DISK READY
0871 A6                 ANA     M         ;HAS THE DRIVE BECOME READY?
0872 C27108             JNZ     W4RDY     ;NO - KEEP WAITTING
                        DCT     SDCER
0875 210197             LXI     H,DCW1  ;H -> DISK CONTROL WORD
0878 3E01               MVI     A,DVCHK ;HAS THE DEVICEHECK CONDITION
087A A6                 ANA     M         ;  BEEN RAISED?
087B C4C40A             CNZ     SDCER     ;YES - CALL IN THE RECOVERY ROUT
                                          ;  OTHERWISE FALL THRU.

087E C20400             JNZ     ERR9      ;INFORM USER OF BAD SEEK
0881            SKRET   EQU     $         ;SEEK COMMON RETURN POINT
                        RESTR
```

```
0881 E1              POP     H
0882 D1              POP     D
0883 C1              POP     B
0884 F1              POP     PSW

0885 C9              RET
            ;
            ;
            ; WRITE SUBROUTINE
            ;        LOW LEVEL WRITE TO DISK
            ;
0886        WRITE    EQU     $
                     SAVE
0886 F5              PUSH    PSW
0887 C5              PUSH    B
0888 D5              PUSH    D
0889 E5              PUSH    H

088A CD0709          CALL ISRS         ;ISSUE SELECT, RECIEVE SELECTED
                     DCT     WDCER     ;HAS DEVICE CHECK BEEN RAISED?
088D 210197          LXI     H,DCW1    ;H -> DISK CONTROL WORD
0890 3E01            MVI     A,DVCHK   ;HAS THE DEVICEHECK CONDITION
0892 A6              ANA     M         ;  BEEN RAISED?
0893 C4C40A          CNZ     WDCER     ;YES - CALL IN THE RECOVERY ROUT
                                       ;  OTHERWISE FALL THRU.

0896 216094          LXI     H,WSTRT   ;(HL) THE STATING ADDR OF THE
                                       ;  WRITE BUFFER
0899 221397          SHLD    DCW10     ;SET THE DISK BUFFER'S STARTING
                                       ;  ADDR.
            ;PREFORM FAKE WRITE TO GENERATE THE CRC
089C 0680            MVI     B,FWRT    ;FLIP THE CRC GENERATION ENABLE
089E CD1E0A          CALL    SCRCC     ;  BIT TO PREFORM A FAKE WRITE
08A1 010000          LXI     B,NHO     ;SET THE TRY COUNTER=0 TO INDI-
                                       ;  CATE A NON RETRY TYPE INVO-
                                       ;  CATION OF IOGO
08A4 CD6F09          CALL    IOGO      ;FAKE A WRITE
08A7 0680            MVI     B,FWRT    ;RESET FROM FAKE WRITE TO REAL
08A9 CD1E0A          CALL    SCRCC     ;  WRITE.(CRC GEN ENBL=1)
            ;READ UP THE CRC AND PLACE IN THE WRITE BUFFER.
08AC 0E04            MVI     C,DATA-CRC      ;GET LENGTH OF CRC
08AE 112390          LXI     D,CRC     ;DE -> CRC FIELD IN DISK BFR
08B1        LCRC     EQU     $         ;LOAD CRC LOOP
08B1 CD020A          CALL    LCRCR     ;LOAD THE CRC REG INTO A
08B4 12              STAX    D         ;STORE INT THE DISK BUFFER
08B5 13              INX     D         ;DE -> NEXT CRC SLOT IN DISK BFR
08B6 0D              DCR     C         ;HAS THE ENTIRE CRC BEEN MOVED
                                       ;  TO THE DISK BUFFER.
08B7 C2B108          JNZ     LCRC      ;NO - PROCESS THE NEXT CRC BYTE
            ;PREFORM THE REAL WRITE
08BA 010000          LXI     B,NHO     ;SET TRYCOUNT=0 TO INDICATE A
                                       ;  NON RETRYABLE I/O OPERATION.
08BD CD6F09          CALL    IOGO      ;PREFORM THE REAL WRITE
08C0 0604            MVI     B,FMCRC   ;RESET THE CRC LOGIC FROM THE
08C2 CD1E0A          CALL    SCRCC     ;  THE FULL MODE.(FULL MODE
                                       ;  CRC=0)
                     RESTR
08C5 E1              POP     H
08C6 D1              POP     D
08C7 C1              POP     B
08C8 F1              POP     PSW

08C9 C9              RET

            ;
            ;
            ;READ SUBROUTINE
            ;        LOWLEVEL READ FROM DISK
            ;
08CA        READ     EQU     $
                     SAVE
08CA F5              PUSH    PSW
08CB C5              PUSH    B
08CC D5              PUSH    D
08CD E5              PUSH    H
```

```
08CE CD0709              CALL    ISRS     ;ISSUE SELECT,RECIEVE SELECTED.
                         DCT     RDCER    ;DEVICE CHECK?
08D1 210197              LXI     H,DCW1   ;H -> DISK CONTROL WORD
08D4 3E01                MVI     A,DVCHK  ;HAS THE DEVICEHECK CONDITION
08D6 A6                  ANA     M        ;  BEEN RAISED?
08D7 C4C40A              CNZ     RDCER    ;YES - CALL IN THE RECOVERY ROUT
                                          ;  OTHERWISE FALL THRU.

08DA 011400              LXI     B,NTRY   ;LOAD THE TRYCOUNTER WITH THE #
                                          ;  OF TRIES + 1.
08DD             IREAD   EQU     $        ;ISSUE A READ
08DD 05                  DCR     B        ;HAVE ALL THE ALLOWED READ
                                          ;  TRIES BEEN ATTEMPT?
08DE CAFC0A              JZ      ERR8     ;YES - GO ABORT ON BAD READ.
08E1 213594              LXI     H,RSTRT  ;(HL) THE STARTING ADDR OF THE
                                          ;  READ BUFFER
08E4 221397              SHLD    DCW10    ;SET THE DISK CONTROLLERS START-
                                          ;  ING ADDRESS .
08E7 CD6F09              CALL    IOGO     ;PREFORM A READ
08EA 0E04                MVI     C,DATA-CRC       ;GET LENGTH OF CRC
08EC             CCRC    EQU     $        ;CHECK CRC LOOP
08EC CD020A              CALL    LCRCR    ;GET CONTENTS OF CRC REG (DCW5)
                                          ;  INTO A
08EF AF                  XRA     A        ;IS IT  = 0 ?
08F0 C2DD08              JNZ     IREAD    ;NO - CRC ERROR DETECTED, ATTEMP
                                          ;  TO RE-READ.
08F3 0D                  DCR     C        ;IS THE CRC SCAN COMPLETE?
08F4 C2EC08              JNZ     CCRC     ;NO - GET NEXT BYTE OF CRC
08F7 0604                MVI     B,FMCRC  ;GET THE FULL MODE CRC FLAG
08F9 CD1E0A              CALL    SCRCC    ;RESET CRC LOGIC FROM FULL
                                          ;  MODE
                         RESTR
08FC E1                  POP     H
08FD D1                  POP     D
08FE C1                  POP     B
08FF F1                  POP     PSW

0900 C9                  RET
                 ;
                 ;
                 ; SBBSR SET BUS BIT SUBROUTINE
                 ;       THIS ROUTINE TURNS SELECTED BITS ON
                 ;       INPUTS D-MASK OF SELECTED BIT
                 ;              H->DCW IN WHICH THE SELECTED BUS BITS RES
                 ;       OUTPUTS UPDATED DCW
                 ;       CLOBBERS D&E
                 ;
0901             SBBSR   EQU     $        ;SET BUS BIT SUBROUTINE
0901 5F                  MOV     E,A      ;SAVE A.
0902 7E                  MOV     A,M      ;PICK UP THE DCW
0903 B2                  ORA     D        ;SET THE BIT
0904 77                  MOV     M,A      ;SET THE BUS LINES
0905 7B                  MOV     A,E      ;RESTORE A
0906 C9                  RET
                 ;
                 ;
                 ;ISRS   ISSUE SELECT RECIEVE SELECTED
                 ;       THIS SUBROUTINE ISSUES A SELECT THEN WAITS
                 ;       FOR THE SELECTED FLAG.
                 ;       INPUTS NONE
                 ;       OUTPUTS UPDATED DCW6 DCW
                 ;       CLOBBERS H
                 ;
0907             ISRS    EQU     $        ;ISSUE SELECT - RECIEVE SELECTED
0907 210697              LXI     H,DCW6   ;H -> DCW6
090A 360C                MVI     M,SSQSL  ;ISSUE SELECT
090C 210097              LXI     H,DCW0   ;H -> DCW0
090F             W4SLD   EQU     $        ;WAIT FOR SELECTED FLAG TO RAISE
090F 3E84                MVI     A,SLDOL  ;HAS THE DRIVE BEEN SELECTED.
0911 A6                  ANA     M        ; .   .   .   .   .   .
                 ;!!!!!! TIME BELONGS IN THIS LOOP
0912 C20F09              JNZ     W4SLD    ;IF THE DRIVE HAS BEEN SELECTED
                                          ;  THEN FALL THRU
                                          ;  ELSE WAIT FOR SELECT
0915 C9                  RET
```

```
                  ;
                  ;
                  ;FINDS  FIND SECTOR SUBROUTINE
                  ;       THIS SUBROUTINE FINDS A SECTOR AND RETURNS
                  ;       CONTROL ON THE SECTOR PULSE PRECEDING THE START
                  ;       OF THE REQUESTED SECTOR.
                  ;       INPUTS SECTC-ADDR OF SECTOR COUNT
                  ;              B-SECTOR REQUESTED
                  ;       OUTPUTS: NONE
                  ;       CLOBBERS: HL & A
0916              FINDS   EQU     $          ;FIND A SECTOR.
0916 210642               LXI     H,SECTC    ;H -> SECTOR PULSE COUNT
0919 3A0C42               LDA     SADDR      ;GET THE REQUESTED SECTOR.
091C 0602                 MVI     B,2        ;SHIFT LEFT TWICE TO MULTIPLY
091E CD510A               CALL    SHFTL      ;  BY 4 TO COMPUTE SECTOR PULSE
                                             ;  COUNT FROM SECTOR ADDR.
0921 3D                   DCR     A          ;FIND PRECEDING SECTOR
                  ;TEST FOR WRAP AROUND FROM ZERO TO LAST SECTOR
0922 F22709               JP      W4PS       ;NO WRAP AROUND , BYPASS RESET
0925 3E2F                 MVI     A,NSPPT-1         ;RESET TO LAST SECTOR
0927              W4PS    EQU     $          ;WAIT FOR PRECEEDING SECTOR.
0927 BE                   CMP     M          ;HAS IT COME UP YET?
0928 C22709               JNZ     W4PS       ;IF IT HAS THEN FALL THRU
                                             ;  ELSE KEEP WAITTING.
092B C9                   RET
                  ;
                  ;
                  ;DCR  DEVICE CHECK RESET SUBROUTINE.
                  ;       THIS ROUTINE FORCES A CLEARING OF ALL POSSIBLE
                  ;       CONDITIONS THAT CAN CAUSE A DEVICE CHECK
                  ;       INPUTS: NONE
                  ;       OUTPUTS: CLEARED DEVICE CHECK FLAG
                  ;       CLOBBERS: NOTHING
092C              DVCHR   EQU     $          ;DEVICE CHECK RESET
                          SAVE
092C F5                   PUSH    PSW
092D C5                   PUSH    B
092E D5                   PUSH    D
092F E5                   PUSH    H

0930 210297               LXI     H,DCW2     ;H ->DCW2
0933 110697               LXI     D,DCW6     ;D ->DCW6
0936 3640                 MVI     M,RDCHK    ;PUT RESET DEVICE CHECK ON THE B
0938 EB                   XCHG               ;D ->DCW2, H ->DCW6
0939 360C                 MVI     M,CLTAG    ;LOAD BUS 8-9 WITH ZERO
093B 361C                 MVI     M,CTAG     ;RAISE THE CONTROL TAG
093D 360C                 MVI     M,CLTAG    ;LOWER THE TAG LINES.
093F 110197               LXI     D,DCW1     ;D -> DCW1
0942 EB                   XCHG               ;D -> DCW6, H -> DCW1
0943 3E01                 MVI     A,DVCHK    ;HAS THE RESET CLEARED  DEVICE C
0945 A6                   ANA     M          ; .    .    .    .    .
0946 C25F09               JNZ     DCRET      ;IF SO THEN RETURN ELSE REZERO
0949 97                   SUB     A          ;SET A=0
094A 320297               STA     DCW2       ;CLEAR BUS7-0
094D EB                   XCHG               ;D -> DCW1, H -> DCW6
094E 3E01                 MVI     A,RZERO    ;GET REZERO COMMMAND
0950 F5                   PUSH    PSW        ;SAVE THE CURRENT STATE OF DCW6
0951 77                   MOV     M,A        ;PLACE THE REZERO COMMAND ON
                                             ;  THE BUS.
                          TTL     CTAG,0     ;TOGGLE THE COMMAND LINE TAG
                          IF      00000H
                          LXI     H,00000H          ;H -> TAG LINES DCW
                          ENDIF
0952 F1                   POP     PSW        ;GET CURRENT STATE OF BUS8-9
0953 F61C                 ORI     CTAG       ;TURN THE THE TAG LINES
0955 77                   MOV     M,A        ;PLACE THEM ON THE BUS
0956 360C                 MVI     M,CLTAG    ;RESET TAG  LINE AND BUS 8-9
0958 EB                   XCHG               ;D -> DCW6, H -> DCW1
0959 3E01                 MVI     A,DVCHK    ;MAKE SURE DEVICE CHECK HAS BEEN
095B A6                   ANA     M          ;
095C C2D90A               JNZ     ERR3       ;  ELSE RAISE ERROR CONDITION.
095F              DCRET   EQU     $          ;DEVICE CHECK CLEAR COMMON RETUR
                          RESTR
095F E1                   POP     H
0960 D1                   POP     D
```

```
0961 C1              POP     B
0962 F1              POP     PSW

0963 C9              RET
              ;
              ;
              ;GIBS   GET  INVERTED BIT STRING
              ;       THIS ROUTINE INVERTS BIT STRINGS OF UP TO 4 BITS
              ;       A TABLE LOOKUP.
              ;       INPUTS:;          OUTPUTS: A - THE INVERTED BIT ST
              ;       CLOBBERS HL & DE
0964          GIBS    EQU     $        ;GET INVERTED BIT STRING
0964 D5               PUSH    D
0965 210004           LXI     H,BSIT   ;H -> BIT STRING INVERSION TABLE
0968 5F               MOV     E,A      ;SET UP DE FOR ADD
0969 1600             MVI     D,BUSCL  ; .   .   .   .   .
096B 19               DAD     D        ;COMPUTE ADDR OF BSIT ENTRY.
096C 7E               MOV     A,M      ;PICK INVERTED STRING
096D D1               POP     D
096E C9               RET
              ;
              ;
              ; IOGO  - COMMON I/O ROUTINE FOR READ & WRITE TO DISK.
              ;       THIS ROUTINE PREFORMS THE COMMON SET UP FOR BOTH
              ;       READ & WRITE OPERATIONS.
              ;       INPUTS:         BC-READ/WRITE TAG
              ;
096F          IOGO    EQU     $        ;COMMON I/O PROCESSING
096F C5               PUSH    B        ;SAVE THE READ/WRITE TAG
              ;SET UP CRC
0970 3E08             MVI     A,CLCRC  ;SET CLEAR CRC FLAG
0972 CD580A           CALL    CLRIN    ;CLEAR THE CRC LOGI
0975 0615             MVI     B,FMCRC+CMCRC+EPA        ;PUT THE CRC LOG
0977 CD1E0A           CALL    SCRCC    ;  IN THE FULL & CIRCULAR STATES
                                       ;  AND ENABLE DISK CONTROLLER
                                       ;  ACCESS TO THE ONBOARD BUFFER
097A C1               POP     B        ;RESTORE AND REPLACE
097B C5               PUSH    B        ;    .     .     .
              ;LOAD THE STOP COUNTER WITH DEFAULT VALUE
097C 3E02             MVI     A,CRCST  ;DEFAULT TO GENERATE CRC VALUE
097E 321C97           STA     DCW13    ;SET CONTROLLERS STOP COUNT
              ;LOAD THE DELAY COUNTER
0981 211004           LXI     H,DCTBL  ;HL -> THE DELAY COUNTER TABLE
0984 78               MOV     A,B      ;PICK UP IO OPERATION FLAG
0985 A7               ANA     A        ;IS IT A WRITE OPERATION?
0986 CA8A09           JZ      WRTOP    ;YES - SKIP INCREMENT
0989 23               INX     H        ;HL -> READ DELAY
098A          WRTOP   EQU     $        ;WRITE OPERATION
098A 7E               MOV     A,M      ;PICK UP DELAY COUNTER VALUE
098B 321897           STA     DCW12    ;LOAD THE DISK CONTROLLERS
                                       ;  DELAY COUNTER.
              ;IS THIS A FAKE WRITE (FOR CRC GENERATION)
098E 3E80             MVI     A,FWRT   ;GET FAKE WRITE FLAG
0990 211042           LXI     H,FWRTF  ;HL -> FAKE WRITE FLAG
0993 A6               ANA     M        ;IS THIS A FAKE WRITE
0994 CABA09           JZ      RDWRT    ;YES - BYPAS HEAD SELECTION LOGI
0997 97               SUB     A        ;SET A= TO NON CRC GENERATION
                                       ;  STOP COUNT
0998 321C97           STA     DCW13    ;SEND IT OUT TO THE DISK
              ;CHECK TO SEE IF THE HEADS SHOULD BE OFFSET.
099B 3E0C             MVI     A,12     ;IS THIS AN OFFSET HEADS READ
099D B9               CMP     C        ;  PASS?
099E FAA709           JM      HDSEL    ;NO - BYPASS HEAD RELOADING  LOG
09A1 3A0D42           LDA     HADDR    ;GET THE CURRENT HEAD ADDRESS
09A4 CD770A           CALL    LHADR    ;RELOAD THE HEADS.
              ;SELECT THE HEADS
09A7          HDSEL   EQU     $        ;HEAD SELECTION
09A7 CD1609           CALL    FINDS    ;SYNC ON THE THE SECTOR PULSE
                                       ;  PRECEEDING THE REQUIRED SECTO
09AA 210297           LXI     H,DCW2   ;H -> BUS 7-0
09AD 3680             MVI     M,BUS7   ;SET HEAD SELECT
09AF 210697           LXI     H,DCW6   ;H -> TAG LINES
09B2 361C             MVI     M,CTAG   ;RAISE THE CONTROL TAG
                      WAIT    20       ;WAIT 20USECS
0009          MTIME   EQU     (NWAIT*2) + 7   ;TIME TAKEN BY MVI INSTR
```

```
0013            LTIME    EQU      (NWAIT*4) + 15  ;TIME TAKEN BY EACH PASS
                                                  ;  THE WAIT LOOP.
001F            TLTME    EQU      (00014H*2)-MTIME ·        ;TOTAL TIME TO B
                                                  ;  BY THE LOOP
0002            WAITC    EQU      (TLTME/LTIME)+1 ;# OF WAIT LOOP PASSES
09B4 3E02                MVI      A,WAITC ;LOAD WAIT COUNTER
09B6            WLOOP    EQU      $        ;WAIT LOOP
09B6 3D                  DCR      A        ;IS OUR WAIT COMPLETE?
09B7 C2B609              JNZ      WLOOP    ;NO - KEEP LOOPPING
                ;PREFORM THE ACTUAL READ OR WRITE
09BA            RDWRT    EQU      $        ;GIVE READ/WRITE COMMAND
09BA 211204              LXI      H,SATBL ;HL -> BASE OF STROBE ADJUSTMENT
                                           ;  TABLE.
09BD 09                  DAD      B        ;COMPUTE OFFSET INTO TABLE
09BE 7E                  MOV      A,M      ;GET VALUE FROM THE TABLE
09BF 320297              STA      DCW2     ;PUT IT OUT ON BUS 7-0
09C2 210697              LXI      H,DCW6   ;HL -> TAG LINES & BUS9-8
09C5 360C                MVI      M,CLTAG ;CLEAR BUS 9-8
09C7 361C                MVI      M,CTAG   ;RAISE THE CONTROL TAG
09C9 210197              LXI      H,DCW1   ;HL -> DISK STATUS INFO
09CC            W4IOE    EQU      $        ;WAIT FOR I/O TO END.
09CC 3E04                MVI      A,BASTP ;HAS BASTOP BEEN RAISED?
09CE A6                  ANA      M        ; .     .     .     .
09CF C2CC09              JNZ      W4IOE    ;NO KEEP WAITING FOR I/O TO COMP
09D2 210697              LXI      H,DCW6   ;H -> TAG LINES
09D5 360C                MVI      M,CLTAG ;CLEAR THE TAG LINES
09D7 210297              LXI      H,DCW2   ;H -> BUS 7-0
09DA 3600                MVI      M,ZERO   ;CLEAR THE BUS
09DC 0611                MVI      B,CMCRC+EPA      ;RESET CIRCULAR MODE OF
09DE CD1E0A              CALL     SCRCC    ;  THE CRC LOGIC & RE-ENABLE THE
                                           ;  PROCESSORS ACCESS TO THE
                                           ;  DISK CONTROLLLERS ONBOARD
                                           ;  MEMEORY
09E1 C1                  POP      B        ;RESTORE
                                           ;  NORMAL.
09E2 C9                  RET

                ;
                ;
                ; MOVE - MOVE SUBROUTINE
                ;        THIS ROUTINE IS USED TO MOVE BLOCKS OF DATA.
                ;        INPUTS: HL-SOURCE ADDR
                ;                DE-DESTINATION ADDR
                ;               A -LENGTH OF DATA BLOCK WHEN DATA IS LESS
                ;                  THAN 256 BYTES ELSE A=0 AND BC HOLDS
                ;                  THE LENGTH

                ;
09E3            MOVE     EQU      $
                         SAVE
09E3 F5                  PUSH     PSW
09E4 C5                  PUSH     B
09E5 D5                  PUSH     D
09E6 E5                  PUSH     H

09E7 A7                  ANA      A        ;SET CONDITION CODES
09E8 CAEE09              JZ       MOVE1    ;IS THIS A LONG MOVE? IF SO THEN
                                           ;  BRANCH
09EB 0600                MVI      B,ZERO   ;SET UP FOR SHORT MOVE
09ED 4F                  MOV      C,A      ;GET LENGHT
09EE            MOVE1    EQU      $
09EE 7E                  MOV      A,M      ;GET SOURCE BYTE
09EF 12                  STAX     D        ;STORE AT DESTINATION
09F0 23                  INX      H        ;BUMP THE POINTERS
09F1 13                  INX      D        ; .     .     .
09F2 0B                  DCX      B        ;TRANSFER COMPLETE?
09F3 C2EE09              JNZ      MOVE1    ;NO - KEEP LOPPING
                         RESTR
09F6 E1                  POP      H
09F7 D1                  POP      D
09F8 C1                  POP      B
09F9 F1                  POP      PSW

09FA C9                  RET
                ;
```

```
              ;
              ; FILL - FILL SUBROUTINE
              ;       THIS ROUTINE FILLS MEMORY WITH THE SPECIFIED
              ;         CONSTANT
              ;       INPUTS- HL -> DEST AREA
              ;               B - LENGTH OF AREA TO BE FILLED.
              ;               C - CONSTANT TO BE FILLED IN.
              ;
09FB          FILL    EQU     $          ;FILL SUBROUTINE
09FB 71               MOV     M,C        ;PUT THE CONSTANT OUT TO MEMORY
09FC 23               INX     H          ;HL -> NEXT LOC TO BE FILLED
09FD 05               DCR     B          ;HAS THE AREA BEEN FILLED?
09FE C2FB09           JNZ     FILL       ;IF SO THEN FALL THRU ELSE MOVE
                                         ;  THE BYTE.
0A01 C9               RET
              ;
              ;
              ; LCRCR - LOAD CRC REGISTER SUBROUTINE
              ;       THIS SUBROUTINE LOADS THE CRC REGISTER (DCW5) BY
              ;         SINGLE STEPPING THE CRC DATA IN FROM THE
              ;        CRC LOGIC'S CIRCULAR SHIFT REGISTER. IT
              ;         SINGLE STEPS 8 TIMES TO PICK UP EACH BYTE.
              ;         THE CRC IS PICKED MSB FIRST. AFTER THE CRC
              ;         REGISTER IS LOADED IT IS PLACED IN A.
              ;         THE FIRST (IE MOST SIGNIFICANT) 8 BITS OF THE
              ;         ARE LOADED BY THE CRC LOGIC AND DO NOT HAVE TO
              ;         BE SINGLE STEPPED SHIFTED OUT.
              ;
              ;
0A02          LCRCR   EQU     $          ;LOAD CRC REGISTER
0A02 C5               PUSH    B
0A03 E5               PUSH    H
0A04 4F               MOV     C,A        ;PICK UP THE CURRENT PASS
0A05 FE04             CPI     DATA-CRC           ;IS IT THE FIRST?
0A07 CA170A           JZ      NSSN       ;NO - FALL THRU TO SINGLE STEP
0A0A 0608             MVI     B,8        ;LOAD THE STEP COUNT
0A0C 210697           LXI     H,DCW6     ;HL -> SINGLE STEP CRC CONTROL
0A0F          TSSC    EQU     $          ;TOGGLE SINGLE STEP CRC LOOP
0A0F 368C             MVI     M,SSCRC+SSQSL   ;TURN SINGLE STEP CRC ON
                                         ;  WITHOUT BRINGING DOWN
                                         ;  SEQUENCE & SELECT.
0A11 3673             MVI     M,NOT(SSCRC)+SSQSL       ;TURN OFF SINGLE
                                         ;  STEP CRC WITHOUT MODIFYING
                                         ;  SEQ OR SEL.
0A13 05               DCR     B          ;HAS AN ENTIRE BEEN SHIFTED IN?
0A14 C20F0A           JNZ     TSSC       ;NO - SHIFT IN THE NEXT BIT.
0A17          NSSN    EQU     $          ;NO SINGLE STEPPING NECESSARY
0A17 210597           LXI     H,DCW5     ;HL -> CRC REGISTER.
0A1A 7E               MOV     A,M        ;LOAD A WITH CURRENT CRC BYTE
0A1B E1               POP     H
0A1C C1               POP     B
0A1D C9               RET
              ;
              ;
              ;SCRCC - SET CRC CONTROL BITS
              ;       THIS ROUTINE SETS THE CRC CONTROL  BITS IN DCW4
              ;         WHILE MAINTAINING DCW4'S OTHER BITS IN THEIR
              ;         PREVIOUS STATE.
              ;         DCW4'S PREVIOUS STATE IS MAINTAINED IN FWRTF.
              ;       INPUTS: B - A MASK SPECIFYING THE BITS TO BE
              ;                    FLIPPED.
              ;
0A1E          SCRCC   EQU     $          ;SET CRC CONTROL BITS
0A1E E5               PUSH    H
0A1F D5               PUSH    D
0A20 210497           LXI     H,DCW4     ;HL -> CRC CONTROL INFO
0A23 111042           LXI     D,FWRTF    ;DE -> CURRENT STATE OF DCW4
0A26 1A               LDAX    D          ;GET CURRENT STATE
0A27 A8               XRA     B          ;SET OR RESET THE BITS IN QUESTI
0A28 12               STAX    D          ;UPDATE THE CURRENT STATE FLAG
0A29 77               MOV     M,A        ;SEND THE UPDATED CRC INFO TO
                                         ;  THE DISK CONTROLLER.
0A2A D1               POP     D
0A2B E1               POP     H
0A2C C9               RET
```

```
                    ;
                    ;
                    ; SIZEM - SIZE MEMORY SUBROUTINE
                    ;         THIS ROUTINE SIZES RAM
                    ;         INPUTS  HL-START OF SIZEING
                    ;                 OUTPUTS HL-HIGHEST ADDRESS
                    ;
0A2D                SIZEM   EQU     $         ;SIZE RAM MEMORY
0A2D 23                     INX     H         ;POINT TO NEXT MEMORY LOCATION
0A2E 7C                     MOV     A,H       ;TEST FOR WRAP AROUND
0A2F B5                     ORA     L         ;  .   .   .   .
0A30 CA420A                 JZ      RSRET     ;WRAPPED ARUOND,RESET & RETURN
0A33 7E                     MOV     A,M       ;EXAMINE IT
0A34 2F                     CMA               ;SEE IF IT CAN BE WRITTEN TO
0A35 77                     MOV     M,A       ;WRITE TO IT
0A36 BE                     CMP     M         ;WAS IT REALLY WRITTEN?
0A37 2F                     CMA               ;RESTORE MEMORY EITHER WAY
0A38 77                     MOV     M,A       ;   .   .   .   .
0A39 CA2D0A                 JZ      SIZEM     ;IF TEST SHOWED THIS MEMORY
                                              ;  LOCATION TO BE RAM THEN KEEP
                                              ;  LOOPPING.
                    ;CHECK FOR OVERFLOW INTO SHARED MEMORY
0A3C 7C                     MOV     A,H       ;GET HIGH ORDER ADDR BYTE
0A3D FEC0                   CPI     SSM SHR 8       ;IS IT IN SHARED MEMEORY
0A3F FA460A                 JM      C4BRM     ;NO - GO CHECK FOR BAD RAM
0A42                RSRET   EQU     $         ;RESET TOP OF RAM ADDR & RET
0A42 2100C0                 LXI     H,SSM     ;HL -> POINT JUST PAST END OF RA
0A45 C9                     RET               ;BYE BYE
0A46                C4BRM   EQU     $         ;CHECK FOR BAD RAM. IF RAM DOES
                                              ;  NOT END AT THE SPECIFIED
                                              ;  BOUNDARY IT IS ASSUMED THAT A
                                              ;  BAD RAM LOCATION HAS BEEN
                                              ;  DETECTED.
0A46 0604                   MVI     B,RBASC   ;LOAD THE SHIFT COUNT
0A48 7C                     MOV     A,H       ;GET THE HIGH ORDER ADDR BYTE
0A49 CD510A                 CALL    SHFTL     ;SHIFT LEFT
0A4C B5                     ORA     L         ;IS THE ADDR ON THE REQUIRED
                                              ;  BOUNDARY.
0A4D C2F10A                 JNZ     ERR7      ;ITS NOT SO ABORT
0A50 C9                     RET               ;ELSE RETURN
                    ;
                    ;
                    ; SHFTL - SHIFT LEFT SUBROUTINE
                    ;         A - THE DATA TO BE SHIFTED
                    ;         B - THE NUMBER OF PLACES TO SHIFT IT
0A51                SHFTL   EQU     $         ;SHIFT LOOP
0A51 A7                     ANA     A         ;CLEAR CARRY
0A52 17                     RAL               ;ROTATE LEFT
0A53 05                     DCR     B         ;IS THE SHIFT COMPLETE?
0A54 C2510A                 JNZ     SHFTL     ;NO - KEEP SHIFTING
0A57 C9                     RET
                    ;
                    ;
                    ;  CLRIN - CLEAR INTERRUPTS SUBROUTINE
                    ;         THIS SUBROUTINE CLEARS SECTOR, INDEX, AND
                    ;           CLEAR THE CRC LOGIC.
                    ;           OVERRUN INTERRUPTS. IT IS ALSO USED TO
                    ;         IT HAS ONE PARAMETER
                    ;         A - FLAG INDICATING THE INTERUPT(S) TO BE
                    ;             CLEARED.
                    ;
0A58                CLRIN   EQU     $         ;ROUTINE TO CLEAR INTERRUPTS AND
                                              ;  PRESERVE CRC GENERATION ENABL
                            SAVE
0A58 F5                     PUSH    PSW
0A59 C5                     PUSH    B
0A5A D5                     PUSH    D
0A5B E5                     PUSH    H

0A5C 47                     MOV     B,A       ;SAVE INTERUPT MASK PARAMETER
0A5D 211042                 LXI     H,FWRTF   ;HL -> CURRENT WRITE STATUS IE
                                              ;  FAKE(CRC GENERARTION) OR
                                              ;  REAL.
0A60 110497                 LXI     D,DCW4    ;DE ->  CLR INT BITS
0A63 B6                     ORA     M         ;TURN ON THE CURRENT DCW4 STATUS
```

```
                                        ;  & ALSO TURN ON THE REQUESTED
                ;TEST FOR POSITIVE OR NEGATIVE GOING PULSE
0A64 FE08               CPI     CLCRC   ;IS THIS A POSITIVE GOING PULSE?
0A66 C26A0A             JNZ     LBS21   ;NO - ALREADY ALIGNED TO THE
                                        ;  LEADING EDGE OF A NEGATIVE
                                        ;  GOING PULSE.
0A69 A8                 XRA     B       ;FLIP STATE OF MASKED BIT TO
                                        ;  ALIGN TO LEADING EDGE OF A
                                        ;  POSITIVE GOING PULSE.
0A6A            LBS21   EQU     $       ;LEAVE MASKED BIT SET TO 1
                                        ;  CLEAR  BIT. (INT OR CRC)
0A6A 77                 MOV     M,A     ;UPDATE THE CURRENT STATUS
                ;TOGGLE THE INTERRUPT LINE TO CLEAR IT
0A6B 12                 STAX    D       ;INSURE THAT THE BIT IS 0
0A6C A8                 XRA     B       ;TOGGLE HIGH
0A6D 77                 MOV     M,A     ;STASH THE UPDATED STATUS BYTE
0A6E 12                 STAX    D       ;SEND THE UPDATED STATUS TO THE
                                        ;  DISK CONTROLLER.
0A6F A8                 XRA     B       ;TOGGLE LOW
0A70 77                 MOV     M,A     ;SAVE CURRENT STATUS
0A71 12                 STAX    D       ;SEND IT OUT TO THE CONTROLLER
                        RESTR
0A72 E1                 POP     H
0A73 D1                 POP     D
0A74 C1                 POP     B
0A75 F1                 POP     PSW

0A76 C9                 RET
                ;
                ;
                ; LHADR - LOAD HEAD ADDRESS SUBROUTINE
                ;       THIS SUB ROUTINE  TAKES THE INVERTED HEAD
                ;         ADDRESS PLACES IT ON THE BUS AND TOGGLES  THE
                ;         SET HEAD ADDRESS TAG LINE.
                ;       INPUTS: A - THE INVERTED HEAD ADDRESS
                ;               B - THE READ/WRITE TRY COUNT WHICH IS
                ;                     USED TO OBTAIN THE OFFSET HEADS
                ;                     CONTROL BYTE.
                ;
0A77            LHADR   EQU     $       ;LOAD HEAD ADDRESS ROUTINE
0A77 D5                 PUSH    D
0A78 1F                 RAR             ;SAVE   MSB IN CARRY
0A79 57                 MOV     D,A     ;SAVE 2 LSB
                ;LOAD BUS7-0 WITH HEAD ADDRESS & OFFSET CONTROL
0A7A 3E00               MVI     A,0     ;CLEAR A EXCEPT FOR CARRY
0A7C 1F                 RAR             ;PUT MSB IN BUS7
0A7D 212604             LXI     H,HOTBL ;HL -> BASE OF HEAD OFFSET TABLE
0A80 09                 DAD     B       ;COMPUTE ADDR OF CONTROL BYTE
                                        ;  BASED ON CURRENT TRY COUNT.
0A81 B6                 ORA     M       ;OR THIS VALUE INTO THE MSB OF
                                        ;  THE HEAD ADDRESS.
0A82 320297             STA     DCW2    ;PUT IT OUT ON THE BUS
                ;LOAD BUS9-8
0A85 7A                 MOV     A,D     ;PICK UP THE 2 LSB
0A86 F60C               ORI     SSQSL   ;TURN ON SEQUENCE AND SELECT
0A88 320697             STA     DCW6    ;LOAD BUS9-8
                ;TOGGLE THE SET HEAD ADDRESS LINE
0A8B EE2C               XRI     HDTAG   ;TURN ON THE TAG
0A8D 77                 MOV     M,A     ;SEND IT OUT OTO THE CONTROLLER
0A8E 57                 MOV     D,A     ;SAVE IT
0A8F 210097             LXI     H,DCW0  ;HL -> DISK STATUS INFO
0A92 3E04               MVI     A,ONLNE ;LOAD THE ONLINE FLAG
0A94            W4H2O   EQU     $       ;WAIT FOR HEADS TO OFFSET
0A94 A6                 ANA     M       ;IS THE OFFSET COMPLETE & IS THE
                                        ;  BACK ON-LINE?
0A95 C2940A             JNZ     W4H2O   ;NO - KEEP WAITTING.
0ADF            ERR4    EQU     $
                        ABORT   EMSG4,0
                        IF      00000H-1
0ADF 119C04             LXI     D,EMSG4 ;D -> ERROR MSG
0AE2 C3A70A             JMP     SAMSG   ;SEND ABORT MSG TO DBAS
                        ENDIF
                        IF      00000H
                        LXI     H,EMSG4 ;GET POINTER TO ERROR MSG
```

```
                        PUSH    H       ;STORE MESSAGE PIONTER IN
                                        ;  PLACE OF THE MAILBOX PTR
                        LXI     H,MSGPD ;DE -> # OF PENDING MSGS
                        INR     M       ;BUMP IT
                        JMP     DDLRM   ;RETURN TO MONITOR AND
                                        ; AWAIT THE ARRIVAL OF A MAILBOX
                        ENDIF

0AE5            ERR5    EQU     $
                        ABORT   EMSG5,0
                        IF      00000H-1
0AE5 11C104             LXI     D,EMSG5 ;D -> ERROR MSG
0AE8 C3A70A             JMP     SAMSG   ;SEND ABORT MSG TO DBAS
                        ENDIF
                        IF      00000H
                        LXI     H,EMSG5 ;GET POINTER TO ERROR MSG
                        PUSH    H       ;STORE MESSAGE PIONTER IN
                                        ;  PLACE OF THE MAILBOX PTR
                        LXI     H,MSGPD ;DE -> # OF PENDING MSGS
                        INR     M       ;BUMP IT
                        JMP     DDLRM   ;RETURN TO MONITOR AND
                                        ; AWAIT THE ARRIVAL OF A MAILBOX
                        ENDIF

0AEB            ERR6    EQU     $
                        ABORT   EMSG6,0
                        IF      00000H-1
0AEB 11E204             LXI     D,EMSG6 ;D -> ERROR MSG
0AEE C3A70A             JMP     SAMSG   ;SEND ABORT MSG TO DBAS
                        ENDIF
                        IF      00000H
                        LXI     H,EMSG6 ;GET POINTER TO ERROR MSG
                        PUSH    H       ;STORE MESSAGE PIONTER IN
                                        ;  PLACE OF THE MAILBOX PTR
                        LXI     H,MSGPD ;DE -> # OF PENDING MSGS
                        INR     M       ;BUMP IT
                        JMP     DDLRM   ;RETURN TO MONITOR AND
                                        ; AWAIT THE ARRIVAL OF A MAILBOX
                        ENDIF
                ;
                ;       ABORT ERROR HANDLERS
                ;
0AC8            ERR1    EQU     $
                        ABORT   EMSG1,1
                        IF      00001H-1
                        LXI     D,EMSG1 ;D -> ERROR MSG
                        JMP     SAMSG   ;SEND ABORT MSG TO DBAS
                        ENDIF
                        IF      00001H
0AC8 213304             LXI     H,EMSG1 ;GET POINTER TO ERROR MSG
0ACB E5                 PUSH    H       ;STORE MESSAGE PIONTER IN
                                        ;  PLACE OF THE MAILBOX PTR
0ACC 210B42             LXI     H,MSGPD ;DE -> # OF PENDING MSGS
0ACF 34                 INR     M       ;BUMP IT
0AD0 C30707             JMP     DDLRM   ;RETURN TO MONITOR AND
                                        ; AWAIT THE ARRIVAL OF A MAILBOX
                        ENDIF

0AD3            ERR2    EQU     $
                        ABORT   EMSG2,0
                        IF      00000H-1
0AD3 115804             LXI     D,EMSG2 ;D -> ERROR MSG
0AD6 C3A70A             JMP     SAMSG   ;SEND ABORT MSG TO DBAS
                        ENDIF
                        IF      00000H
                        LXI     H,EMSG2 ;GET POINTER TO ERROR MSG
                        PUSH    H       ;STORE MESSAGE PIONTER IN
                                        ;  PLACE OF THE MAILBOX PTR
                        LXI     H,MSGPD ;DE -> # OF PENDING MSGS
                        INR     M       ;BUMP IT
                        JMP     DDLRM   ;RETURN TO MONITOR AND
                                        ; AWAIT THE ARRIVAL OF A MAILBOX
                        ENDIF

0AD9            ERR3    EQU     $
```

```
                        ABORT   EMSG3,0
                        IF      00000H-1
0AD9 117804             LXI     D,EMSG3 ;D -> ERROR MSG
0ADC C3A70A             JMP     SAMSG   ;SEND ABORT MSG TO DBAS
                        ENDIF
                        IF      00000H
                        LXI     H,EMSG3 ;GET POINTER TO ERROR MSG
                        PUSH    H       ;STORE MESSAGE PIONTER IN
                                        ;  PLACE OF THE MAILBOX PTR
                        LXI     H,MSGPD ;DE -> # OF PENDING MSGS
                        INR     M       ;BUMP IT
                        JMP     DDLRM   ;RETURN TO MONITOR AND
                                        ; AWAIT THE ARRIVAL OF A MAILBOX
                        ENDIF
0ADF            ERR4    EQU     $
                        ABORT   EMSG4,0
                        IF      00000H-1
0ADF 119C04             LXI     D,EMSG4 ;D -> ERROR MSG
0AE2 C3A70A             JMP     SAMSG   ;SEND ABORT MSG TO DBAS
                        ENDIF
                        IF      00000H
                        LXI     H,EMSG4 ;GET POINTER TO ERROR MSG
                        PUSH    H       ;STORE MESSAGE PIONTER IN
                                        ;  PLACE OF THE MAILBOX PTR
                        LXI     H,MSGPD ;DE -> # OF PENDING MSGS
                        INR     M       ;BUMP IT
                        JMP     DDLRM   ;RETURN TO MONITOR AND
                                        ; AWAIT THE ARRIVAL OF A MAILBOX
                        ENDIF

0AE5            ERR5    EQU     $
                        ABORT   EMSG5,0
                        IF      00000H-1
0AE5 11C104             LXI     D,EMSG5 ;D -> ERROR MSG
0AE8 C3A70A             JMP     SAMSG   ;SEND ABORT MSG TO DBAS
                        ENDIF
                        IF      00000H
                        LXI     H,EMSG5 ;GET POINTER TO ERROR MSG
                        PUSH    H       ;STORE MESSAGE PIONTER IN
                                        ;  PLACE OF THE MAILBOX PTR
                        LXI     H,MSGPD ;DE -> # OF PENDING MSGS
                        INR     M       ;BUMP IT
                        JMP     DDLRM   ;RETURN TO MONITOR AND
                                        ; AWAIT THE ARRIVAL OF A MAILBOX
                        ENDIF

0AEB            ERR6    EQU     $
                        ABORT   EMSG6,0
                        IF      00000H-1
0AEB 11E204             LXI     D,EMSG6 ;D -> ERROR MSG
0AEE C3A70A             JMP     SAMSG   ;SEND ABORT MSG TO DBAS
                        ENDIF
                        IF      00000H
                        LXI     H,EMSG6 ;GET POINTER TO ERROR MSG
                        PUSH    H       ;STORE MESSAGE PIONTER IN
                                        ;  PLACE OF THE MAILBOX PTR
                        LXI     H,MSGPD ;DE -> # OF PENDING MSGS
                        INR     M       ;BUMP IT
                        JMP     DDLRM   ;RETURN TO MONITOR AND
                                        ; AWAIT THE ARRIVAL OF A MAILBOX
                        ENDIF
0AF1            ERR7    EQU     $
                        ABORT   EMSG7,1
                        IF      00001H-1
                        LXI     D,EMSG7 ;D -> ERROR MSG
                        JMP     SAMSG   ;SEND ABORT MSG TO DBAS
                        ENDIF
                        IF      00001H
0AF1 210705             LXI     H,EMSG7 ;GET POINTER TO ERROR MSG
0AF4 E5                 PUSH    H       ;STORE MESSAGE PIONTER IN
                                        ;  PLACE OF THE MAILBOX PTR
0AF5 210B42             LXI     H,MSGPD ;DE -> # OF PENDING MSGS
0AF8 34                 INR     M       ;BUMP IT
0AF9 C30707             JMP     DDLRM   ;RETURN TO MONITOR AND
                                        ; AWAIT THE ARRIVAL OF A MAILBOX
```

```
                        ENDIF

0AFC          ERR8      EQU      $
                        ABORT    EMSG8,0
                        IF       00000H-1
0AFC 113205             LXI      D,EMSG8 ;D -> ERROR MSG
0AFF C3A70A             JMP      SAMSG   ;SEND ABORT MSG TO DBAS
                        ENDIF
                        IF       00000H
                        LXI      H,EMSG8 ;GET POINTER TO ERROR MSG
                        PUSH     H       ;STORE MESSAGE PIONTER IN
                                         ;  PLACE OF THE MAILBOX PTR
                        LXI      H,MSGPD ;DE -> # OF PENDING MSGS
                        INR      M       ;BUMP IT
                        JMP      DDLRM   ;RETURN TO MONITOR AND
                                         ; AWAIT THE ARRIVAL OF A MAILBOX
                        ENDIF

0004          ERR9      EQU      4
                        ABORT    EMSG9,0
                        IF       00000H-1
0B02 115105             LXI      D,EMSG9 ;D -> ERROR MSG
0B05 C3A70A             JMP      SAMSG   ;SEND ABORT MSG TO DBAS
                        ENDIF
                        IF       00000H
                        LXI      H,EMSG9 ;GET POINTER TO ERROR MSG
                        PUSH     H       ;STORE MESSAGE PIONTER IN
                                         ;  PLACE OF THE MAILBOX PTR
                        LXI      H,MSGPD ;DE -> # OF PENDING MSGS
                        INR      M       ;BUMP IT
                        JMP      DDLRM   ;RETURN TO MONITOR AND
                                         ; AWAIT THE ARRIVAL OF A MAILBOX
                        ENDIF

0000                    END
```

Information storage facilities fabricated in accordance with the teachings of the invention are extremely flexible and can be adapted to an extremely wide variety of user requirements. For example, if more storage is required, additional data storage devices and storage level processors can be added. If a more complex data base management service is required, additional processors are added at the DBMS level. Similarly, if additional communications capability with external devices is required, additional processors may be added at the communications level. When used in conjunction with one or more host computers, the invention eliminates the requirement for repeated high speed data transfers between the storage facility and the host computers. Thus, each host computer is freed to perform more sophisticated processing functions and thus the computer time is used in a much more effective and efficient manner. Further, the invention provides a cost effectiveness hitherto unavailable in mass information storage facilities with an actual cost saving of several orders of magnitude.

By removing the data base management work load from the host computer, the invention increases system through put and available CPU processing power. Further, the invention reduces software development costs by eliminating the necessity of providing host processor software to handle record formatting, indexing, and buffering. In addition, the invention reduces memory requirements of the host processor by eliminating memory allocations for disk and record buffers in both systems and applications programs. Lastly, the invention premits multiple processors and/or intelligent terminals to access the same disc and is fully capable of communicating with intelligent terminals directly via standard communications lines using both synchronous and asynchronous communications techniques.

While the above provides a full and complete disclosure of the preferred embodiments of the invention, various modifications, alternate constructions and equivalents may be employed without departing from the true spirit and scope of the invention. For example, while the preferred embodiment has been shown as having two processors at the communications and storage levels, and four processors at the DBMS level, the actual number of processors employed at each level is a matter of system configuration design and largely dependent upon the particular requirements of a given application. Moreover, other data storage devices than disk installations may be employed for data storage, as desired. Therefore the above description and illustrations should not be construed as limiting the scope of the invention which is defined by the appended claims.

What is claimed is:

1. A multi-level information storage facility for storing data base information in digital form and for enabling symbolic access to such information in response to information request signals from an external processing device, said facility comprising:

a communications level processor means having an input/output port means for receiving said information request signals from said external processing device, said communications level processor means including means for initiating internal processing of said request signals and means for generating acknowledgment signals for transmission to said external processing device via said input/output port means;

an intermediate level processor means for providing intermediate level processing of said request signals;

first shared memory means coupled to said communications level and said intermediate level processor means for enabling data communication therebetween, said first shared memory means including a first cache memory device for storing initiating request signals generated by said communications level processor means and for storing resultant task signals generated by said intermediate level processor means;

said intermediate level processor means including seek means for interrogating said first cache memory device in a predetermined sequence for said initiating request signals, means for generating intermediate level instruction signals in response to the detection of said initiating request signals, and means for storing said resultant task signals in said first cache memory device;

storage level processor means having an input/output port means adapted to be coupled to a data storage device for controlling operation thereof; and second shared memory means coupled to said intermediate level and said storage level processor means for enabling data communication therebetween, said second shared memory means including a second cache memory device for storing said intermediate level instruction signals from said intermediate level processor means and for storing data received from said storage level processor means;

said storage level processor means including means for interrogating said second cache memory device for said intermediate level instruction signals, means for generating storage level instruction signals in response to the detection of said intermediate level instruction signals for controlling storage and retrieval of portions of said data base information from said storage device, and means for storing said data received from said storage device in said second cache memory device.

2. The combination of claim 1 wherein said communications level processor means includes a plurality of processor units each having input/output port means adapted to be coupled to a plurality of external processing devices.

3. The combination of claim 1 wherein said intermediate level processor means comprises a plurality of processor units coupled to said first shared memory means in parallel for data communication with said first processor means.

4. The combination of claim 1 wherein said storage level processor means includes a plurality of processor units each having input/output port means adapted to be coupled to a separate data storage device for controlling operation thereof.

5. The combination of claim 1 wherein said data storage device comprises a disk storage unit.

6. The combination of claim 1 further including a direct memory access bus coupled to said communications level, intermediate level and storage level processor means and adapted to be coupled to said external processing device for providing a high speed data transfer therebetween.

7. The combination of claim 6 wherein said direct memory access bus includes additional processor means for controlling the operation thereof.

8. The combination of claim 1 wherein said first and second cache memory devices each comprises an expandable cache memory.

* * * * *